(12) United States Patent
Karunamuni

(10) Patent No.: US 11,775,128 B1
(45) Date of Patent: Oct. 3, 2023

(54) DEVICES, METHODS, AND GRAPHICAL USER INTERFACES FOR UPDATING A SESSION REGION

(71) Applicant: Apple Inc., Cupertino, CA (US)

(72) Inventor: Chanaka G. Karunamuni, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/950,766

(22) Filed: Sep. 22, 2022

Related U.S. Application Data

(60) Provisional application No. 63/403,681, filed on Sep. 2, 2022, provisional application No. 63/348,437, filed on Jun. 2, 2022, provisional application No. 63/339,406, filed on May 6, 2022.

(51) Int. Cl.
*G06F 3/0481* (2022.01)
*G06F 3/04886* (2022.01)

(52) U.S. Cl.
CPC ........ *G06F 3/0481* (2013.01); *G06F 3/04886* (2013.01); *G06F 2203/04803* (2013.01)

(58) Field of Classification Search
CPC ............... G06F 3/04886; G06F 3/0481; G06F 2203/04803
See application file for complete search history.

(56) References Cited

U.S. PATENT DOCUMENTS

| | | |
|---|---|---|
| 7,770,125 B1 | 8/2010 | Young et al. |
| 7,996,045 B1 | 8/2011 | Bauer et al. |
| 8,923,572 B2 | 12/2014 | In et al. |
| 8,943,440 B2 | 1/2015 | Adderton |

(Continued)

FOREIGN PATENT DOCUMENTS

| | | |
|---|---|---|
| AU | 2014 202 423 A1 | 5/2014 |
| CN | 103402143 A | 11/2013 |

(Continued)

OTHER PUBLICATIONS

Notice of Allowance, dated Mar. 7, 2023, received in U.S. Appl. No. 17/950,707, 9 pages.

(Continued)

*Primary Examiner* — Mong-Shune Chung

(74) *Attorney, Agent, or Firm* — Morgan, Lewis & Bockius LLP

(57) ABSTRACT

A computer system displays, in a status region that is associated with an active session of first software, first information that includes status information about the first software. While displaying the first information in the status region, the computer system detects occurrence of an event corresponding to a transition to displaying second information that is different from the first information, and, in response, displays a transition that includes: ceasing to display the first information in the status region; displaying the second information in the status region, wherein the second information includes status information about second software that is different from the first software, and the status region is associated with an active session of the second software; and, while transitioning from displaying the first information to displaying the second information in the status region, reducing a size of the status region and then increasing the size of the status region.

69 Claims, 122 Drawing Sheets

(56) References Cited

U.S. PATENT DOCUMENTS

| | | |
|---|---|---|
| 8,990,712 B2 | 3/2015 | Reeves et al. |
| 9,179,086 B2 | 11/2015 | Abello et al. |
| 9,715,706 B2 | 7/2017 | Wu et al. |
| 9,787,938 B2 | 10/2017 | Cranfill et al. |
| 9,886,231 B2 | 2/2018 | Jacobsen et al. |
| 10,019,217 B2 | 7/2018 | Dostal et al. |
| 10,055,088 B1 | 8/2018 | Boggan et al. |
| 10,097,973 B2 | 10/2018 | Gross et al. |
| 10,165,108 B1 | 12/2018 | Douglas |
| 10,261,672 B1 | 4/2019 | Dolbakian et al. |
| 10,606,539 B2 | 3/2020 | Bernstein et al. |
| 10,614,480 B2 | 4/2020 | Genc-Kaya et al. |
| 10,768,356 B1 | 9/2020 | Zhang et al. |
| 2005/0184993 A1 | 8/2005 | Ludwin et al. |
| 2006/0129947 A1 | 6/2006 | Hamzy et al. |
| 2007/0073656 A1 | 3/2007 | Bandi |
| 2007/0101279 A1 | 5/2007 | Chaudhri et al. |
| 2007/0157089 A1 | 7/2007 | Van Os et al. |
| 2007/0157097 A1 | 7/2007 | Peters |
| 2008/0068519 A1 | 3/2008 | Adler et al. |
| 2008/0077984 A1 | 3/2008 | Kim |
| 2008/0307350 A1 | 12/2008 | Sabatelli et al. |
| 2008/0307360 A1 | 12/2008 | Chaudhri et al. |
| 2009/0007007 A1 | 1/2009 | Voros et al. |
| 2009/0100361 A1 | 4/2009 | Abello et al. |
| 2009/0235149 A1 | 9/2009 | Frohwein |
| 2009/0254860 A1 | 10/2009 | Seo et al. |
| 2010/0122207 A1 | 5/2010 | Kim et al. |
| 2010/0169828 A1 | 7/2010 | Kho et al. |
| 2010/0287469 A1 | 11/2010 | Wang et al. |
| 2010/0295789 A1 | 11/2010 | Shin et al. |
| 2011/0004845 A1* | 1/2011 | Ciabarra ............... G06F 3/0481 |
| | | 715/808 |
| 2011/0087985 A1 | 4/2011 | Buchanan et al. |
| 2011/0208359 A1 | 8/2011 | Duchene et al. |
| 2011/0225549 A1 | 9/2011 | Kim |
| 2011/0252346 A1 | 10/2011 | Chaudhri |
| 2011/0312387 A1 | 12/2011 | Heo et al. |
| 2012/0023431 A1 | 1/2012 | Roth et al. |
| 2012/0054663 A1 | 3/2012 | Baek et al. |
| 2012/0079432 A1 | 3/2012 | Lee et al. |
| 2012/0117499 A1 | 5/2012 | Mori et al. |
| 2012/0129495 A1 | 5/2012 | Chae et al. |
| 2012/0188275 A1 | 7/2012 | Shimazu et al. |
| 2012/0233031 A1 | 9/2012 | Chang et al. |
| 2012/0272230 A1 | 10/2012 | Lee |
| 2012/0309433 A1 | 12/2012 | Jeong et al. |
| 2012/0323557 A1 | 12/2012 | Koll et al. |
| 2013/0036357 A1 | 2/2013 | Hendrickson |
| 2013/0050119 A1 | 2/2013 | Nemoto |
| 2013/0139109 A1 | 5/2013 | Kim et al. |
| 2013/0191910 A1 | 7/2013 | Dellinger et al. |
| 2013/0254036 A1 | 9/2013 | Trinh et al. |
| 2013/0305351 A1 | 11/2013 | Narendra et al. |
| 2013/0311920 A1 | 11/2013 | Koo et al. |
| 2013/0332886 A1 | 12/2013 | Cranfill et al. |
| 2014/0051396 A1 | 2/2014 | Kim |
| 2014/0101572 A1 | 4/2014 | Gunderson et al. |
| 2014/0155123 A1* | 6/2014 | Lee ................... H04M 1/72403 |
| | | 455/566 |
| 2014/0165006 A1 | 6/2014 | Chaudhri et al. |
| 2014/0173447 A1 | 6/2014 | Das |
| 2014/0189531 A1 | 7/2014 | Murarka et al. |
| 2014/0189577 A1 | 7/2014 | Shuttleworth et al. |
| 2014/0189593 A1 | 7/2014 | Kurita et al. |
| 2014/0189606 A1 | 7/2014 | Shuttleworth et al. |
| 2014/0189608 A1 | 7/2014 | Shuttleworth et al. |
| 2014/0201681 A1 | 7/2014 | Mahaffey et al. |
| 2014/0215364 A1 | 7/2014 | Kang et al. |
| 2014/0232739 A1 | 8/2014 | Kim et al. |
| 2014/0282084 A1 | 9/2014 | Murarka et al. |
| 2014/0365919 A1 | 12/2014 | Shaw et al. |
| 2014/0365945 A1 | 12/2014 | Karunamuni et al. |
| 2014/0365953 A1 | 12/2014 | Zambetti et al. |
| 2014/0379801 A1 | 12/2014 | Gupta |
| 2015/0057945 A1 | 2/2015 | White et al. |
| 2015/0089411 A1 | 3/2015 | Ban et al. |
| 2015/0095819 A1 | 4/2015 | Hong et al. |
| 2015/0106737 A1 | 4/2015 | Montoy-Wilson et al. |
| 2015/0153929 A1 | 6/2015 | Bernstein et al. |
| 2015/0193099 A1 | 7/2015 | Murphy |
| 2015/0227334 A1 | 8/2015 | Dostal et al. |
| 2015/0281420 A1 | 10/2015 | Wu et al. |
| 2015/0286352 A1 | 10/2015 | Gu |
| 2015/0339009 A1 | 11/2015 | Seo |
| 2015/0346976 A1 | 12/2015 | Karunamuni et al. |
| 2015/0347612 A1 | 12/2015 | Matsumoto |
| 2015/0370425 A1 | 12/2015 | Chen et al. |
| 2016/0004416 A1 | 1/2016 | Kim et al. |
| 2016/0062540 A1 | 3/2016 | Yang et al. |
| 2016/0062570 A1 | 3/2016 | Dascola et al. |
| 2016/0062609 A1 | 3/2016 | Kim et al. |
| 2016/0077720 A1 | 3/2016 | Park |
| 2016/0080551 A1* | 3/2016 | Tseng ................... G06F 3/0488 |
| | | 455/418 |
| 2016/0104486 A1 | 4/2016 | Penilla et al. |
| 2016/0117079 A1 | 4/2016 | Huang |
| 2016/0127652 A1 | 5/2016 | Park et al. |
| 2016/0154549 A1 | 6/2016 | Chaudhri et al. |
| 2016/0191499 A1 | 6/2016 | Momchilov et al. |
| 2016/0209994 A1 | 6/2016 | Kaufthal et al. |
| 2016/0202865 A1 | 7/2016 | Dakin et al. |
| 2016/0239191 A1 | 8/2016 | Krishnasamy |
| 2016/0283090 A1 | 9/2016 | Seo |
| 2016/0309321 A1* | 10/2016 | Song ................... G06F 3/04886 |
| 2016/0364029 A1 | 12/2016 | Miller et al. |
| 2016/0379427 A1 | 12/2016 | Kimura et al. |
| 2017/0046024 A1 | 2/2017 | Dascola et al. |
| 2017/0064555 A1 | 3/2017 | Johansson et al. |
| 2017/0068410 A1 | 3/2017 | Alonso Ruiz et al. |
| 2017/0080346 A1 | 3/2017 | Abbas |
| 2017/0083197 A1 | 3/2017 | Lee et al. |
| 2017/0255476 A1 | 9/2017 | Whitney et al. |
| 2017/0277361 A1 | 9/2017 | Schulze et al. |
| 2017/0277400 A1 | 9/2017 | Lee et al. |
| 2017/0277526 A1 | 9/2017 | Shi |
| 2017/0300180 A1 | 10/2017 | Louch et al. |
| 2017/0357437 A1 | 12/2017 | Peterson et al. |
| 2017/0357439 A1 | 12/2017 | Lemay et al. |
| 2017/0371530 A1 | 12/2017 | Vranjes et al. |
| 2018/0011719 A1 | 1/2018 | Cunningham |
| 2018/0024730 A1 | 1/2018 | Jambou |
| 2018/0048752 A1 | 2/2018 | Zhou |
| 2018/0077570 A1 | 3/2018 | Hassan |
| 2018/0095564 A1 | 4/2018 | Frohwein |
| 2018/0164963 A1 | 6/2018 | Ku et al. |
| 2018/0176097 A1 | 6/2018 | Russell et al. |
| 2018/0181568 A1 | 6/2018 | Leong et al. |
| 2018/0232114 A1 | 8/2018 | Saunshi et al. |
| 2018/0335920 A1 | 11/2018 | Tyler |
| 2018/0335937 A1 | 11/2018 | Hauenstein et al. |
| 2018/0335939 A1 | 11/2018 | Karunamuni et al. |
| 2019/0095068 A1 | 3/2019 | Suzuki et al. |
| 2019/0179500 A1 | 6/2019 | Kim et al. |
| 2019/0212895 A1 | 7/2019 | Tyler |
| 2019/0235687 A1 | 8/2019 | Nam et al. |
| 2019/0302995 A1 | 10/2019 | Robinson et al. |
| 2019/0342252 A1 | 11/2019 | Dascola et al. |
| 2019/0391825 A1 | 12/2019 | Jann et al. |
| 2020/0233539 A1 | 7/2020 | Liu et al. |
| 2020/0333935 A1 | 10/2020 | Tyler |
| 2020/0348822 A1 | 11/2020 | Dascola et al. |
| 2021/0048932 A1 | 2/2021 | Zambetti et al. |
| 2021/0286480 A1 | 9/2021 | Tyler et al. |
| 2021/0286487 A1 | 9/2021 | Tyler et al. |
| 2021/0286488 A1 | 9/2021 | Tyler et al. |
| 2021/0286489 A1 | 9/2021 | Tyler et al. |
| 2021/0286509 A1 | 9/2021 | Tyler et al. |
| 2021/0286510 A1 | 9/2021 | Tyler et al. |
| 2021/0319563 A1 | 10/2021 | Zhang et al. |
| 2021/0389859 A1 | 12/2021 | Tyler |
| 2022/0030651 A1* | 1/2022 | Tsai ................... G06F 1/3265 |
| 2022/0116546 A1 | 4/2022 | Gummadi et al. |
| 2022/0121348 A1 | 4/2022 | Jeon et al. |

(56) References Cited

U.S. PATENT DOCUMENTS

| | | |
|---|---|---|
| 2022/0224665 A1 | 7/2022 | Zhou et al. |
| 2022/0126201 A1 | 9/2022 | Ma et al. |
| 2022/0300303 A1 | 9/2022 | Dong |
| 2022/0326828 A1 | 10/2022 | Tyler |
| 2022/0365645 A1 | 11/2022 | Tyler et al. |
| 2023/0079981 A1 | 3/2023 | Tyler et al. |
| 2023/0161473 A1 | 5/2023 | Tyler |

FOREIGN PATENT DOCUMENTS

| | | |
|---|---|---|
| CN | 104169857 A | 11/2014 |
| CN | 1041556155 A1 | 11/2014 |
| CN | 105094814 A | 11/2015 |
| CN | 105264476 A | 1/2016 |
| CN | 105871684 A | 8/2016 |
| CN | 106201445 A | 12/2016 |
| CN | 106502556 A | 3/2017 |
| CN | 109981878 A | 7/2019 |
| CN | 110678833 A | 1/2020 |
| EP | 1768359 A2 | 3/2007 |
| EP | 2431870 A2 | 3/2012 |
| EP | 2645221 A1 | 10/2013 |
| EP | 2770417 A2 | 8/2014 |
| EP | 2818997 A1 | 12/2014 |
| EP | 3115877 A1 | 1/2017 |
| EP | 3296838 A1 | 3/2018 |
| EP | 3617861 A1 | 3/2020 |
| JP | 2010538394 A | 12/2010 |
| JP | 2012527684 A | 11/2012 |
| JP | 2012242846 A | 12/2012 |
| JP | 2012242847 A | 12/2012 |
| JP | 2013065294 A | 4/2013 |
| JP | 2013131193 | 7/2013 |
| JP | 2014507740 A | 3/2014 |
| JP | 2014164370 A | 9/2014 |
| JP | 2016531340 A | 10/2016 |
| JP | 2018523102 A | 8/2018 |
| JP | 6555129 B2 | 8/2019 |
| KR | 20100124427 A | 11/2010 |
| KR | 2012/0019979 A | 3/2012 |
| KR | 2012/0031357 A | 4/2012 |
| KR | 20130016329 A | 2/2013 |
| KR | 20130059857 A | 6/2013 |
| KR | 20130129056 A | 11/2013 |
| KR | 20130130040 A | 11/2013 |
| KR | 20140062180 A | 5/2014 |
| KR | 20160004306 A | 1/2016 |
| KR | 20160037230 A | 4/2016 |
| KR | 20180009795 A | 1/2018 |
| KR | 20180016131 A | 2/2018 |
| KR | 20180126440 A | 11/2018 |
| KR | 2019-0090982 A | 8/2019 |
| WO | WO 2009/097555 A2 | 8/2009 |
| WO | WO 2015/183504 A1 | 12/2015 |
| WO | WO 2017/027526 A1 | 2/2017 |
| WO | WO 2018/165437 A1 | 9/2018 |
| WO | WO 2022/241014 A1 | 11/2022 |

OTHER PUBLICATIONS

Axuredocs, "Tutorials/Rotating Carousel Slideshow", https://docs.axure.com/axure-rp/tutorials/rotating-carousel-slideshow, Apr. 27, 2019, 9 pages.

Brandon Butch, "7 AWESOME iPhone Widgets for IOS 12!", www.youtube.com/watch?v=2_oML60dqs, 2018, 40 pages.

Coding in Flow, "App Widget Part 5—Widget Stackview / Listview On Click Listener—Android Studio Tutorial", www.youtube.com/watch?v=4RQ40gQd), Jul. 6, 2018, 8 pages.

Gonzales, "Disable Proactive Search on Your iPhone or iPad in iOS 9, Gadget Hacks", https://ios.gadgethacks.com/how-to-disable-proactive-search-your-iphone- or-ipad-ios-9-0162396, Sep. 9, 2015, 7 pages.

Google, "JINA App Drawer, App Organizer, Sidebar & Folders", https://www.jinadrawer.com, May 13, 2020, 12 pages.

IBertz, "Nova Launcher: My Home Screen Setup Tutorial", https://www.youtube.com/watch?v=HSxA3BmPtg4, Jul. 29, 2016, 4 pages.

Jain, "Context Based Adaptation of Application Icons in Mobile Computing Devices", 2013 Third World Congress on Information and Communication Technologies (WICT), IEEE, Dec. 15-18, 2013, 6 pages.

Jansen, "How to Use Nova Launcher to Become an Android Superstar", https://www.digitaltrends.com/mobile/how-to-use-nova-launcher, Nov. 25, 2017, 57 pages.

Knight, "Nova Launcher 101 How to Organize Your App Drawer with Tab Groups", https://android.gadgethacks.com/how-to-/nova-launcher-101-organize-your-app- drawer-with-tab-groups-0182579/, Aug. 8, 2018, 9 pages.

Roe, "The Windows 10 Recycle Bin: All You Need to Know", https://www.digitalcitizen.life/simple-questions-what-recycle-bin, Jun. 1, 2020, 11 pages.

Sinha, "10 Cool Nova Launcher Tricks You Should Know", https://beebom.com/cool-nova-launcher-tricks, Oct. 31, 2017, 16 pages.

Smith, "I Keep Over 200 Apps on My iPhone—Here's the System I Use to Organize Them All", https:/www.businessinsider.com/apple-iphone-apps-organization-home- screen-2018-7#ibreak-my-home-screen-into-three-sections-the-dock-shortcuts-and- folders-2, Apr. 9, 2019, 18 pages.

StateofArt, "LG G2 Quick Tips—Adding Widgets to the Home Screen", https://www.youtube.com/watch?v=9xEwmiNoKok, Oct. 2013, 5 pages.

Techno Window, "How to Add a Widget (Weather & Clock) on Home—Screen—Samsung Galaxy A7 (2018)", https://www.youtube.com/watch?v=Iz3bE8nFaBM, Jan. 25, 2019, 3 pages.

TechwithBrett, "Android 101: Home Screen Customization (Feat, Galaxy S8+)", https://www.youtube.com/watch?v=Z51pw3Gqv5s, Apr. 25, 2017, 3 pages.

Thomas, "Add a Smart App Drawer to Any Launcher & Get Automatic Sorting Features", https://android.gadgethacks.com/how-to/add-smart-app_drawer-any-launcher-get-automatic-sorting-features-0176049/, Jan. 27, 2017, 6 pages.

Wagoner, "Nova Launcher: Everything You Need to Know!", https://www.androidcentral.com/nova-launcher, Nov. 10, 2017, 18 pages.

Wallen, "Pro-Tip: Remove Unnecessary Pages on Your Android Home Screen", https:/www.techrepublic.com/article/pro-tip-remove-unnecessary Pages on Your Android Home Screen, Jul. 3, 2014, 11 pages.

Weisinger, "Foldery Multicon folder widget", https://play.google.com/store/apps/details?id=com.urysoft.folder&hl=en_US, Apr. 20, 2020, 3 pages.

YouTube, "How to Pin a Note to the Home Screen", https://www.youtube.com/watch?v=G2ju31lg_0, Jun. 30, 2018, 3 pages.

YouTube, "Galaxy Note 10.1—How to Remove or Add Widgets and Icons", https://www.youtube.com/watch?v=MSOe-tk-ZmIU, Dec. 31, 2013, 3 pages.

YouTube, "How to Edit Home Screen and Add Widgets (Samsung Galaxy S5)", https://www.youtube.com/watch?v=PRJrAanymL8, Oct. 7, 2014, 3 pages.

YouTube, "How to Move Multiple Icons at Once in iOS 11", https://www.youtube.com/watch?v=Z81-MT2QD8M, Jun. 18, 2017, 7 pages.

YouTube, "How to Resize Widgets on Samsung Galaxy S4", https://www.youtube.com/watch?v=g-hAXHPAnUU, May 22, 2014, 3 pages.

YouTube, "How to Restore Home Screen Layout", https://www.youtube.com/watch?v=R2FJ8dJqW1s, Feb. 13, 2018, 3 pages.

YouTube, "Pocketnow, iOS 9 Beta 1 Hands-On: More Mature by the Update", https://www.youtube,.com/watch?v=KquzF8580-M, Jun. 10, 2015, 4 pages.

YouTube, "Removing Home Screen on Galaxy S7 by Tapping and Holding a Home Screen", https://www.youtube.com/watch?v=I2Ovja1FvGI, Mar. 24, 2016, 3 pages.

YouTube, "StateofTech, Samsung Galaxy S9 Tips—How to Customize the App Drawer", https://www.youtube.com/watch?v=_TGwDH2AmDA, Apr. 18, 2018, 3 pages.

(56) References Cited

OTHER PUBLICATIONS

YouTube, "Windows 10 Tips and Tricks Using Cascade Stacked and Side by Side View and How to Undo", https://www.youtube.com/watch?v=ECu9S96Z968, Mar. 2, 2016, 3 pages.
Notice of Allowance, dated Dec. 14, 2018, received in U.S. Appl. No. 15/715,005, 9 pages.
Notice of Allowance, dated Jun. 25, 2019, received in U.S. Appl. No. 15/715,005, 9 pages.
Notice of Allowance, dated Mar. 4, 2020, received in U.S. Appl. No. 16/354,012, 8 pages.
Notice of Allowance, dated Jul. 1, 2020, received in U.S. Appl. No. 16/354,012, 8 pages.
Office Action, dated Nov. 18, 2022, received in Chinese Patent Application No. 201880032712.8, which corresponds with U.S. Appl. No. 16/354,012, 2 pages.
Office Action, dated Jan. 4, 2021, received in U.S. Appl. No. 17/027,353, 29 pages.
Final Office Action, dated Apr. 6, 2021, received in U.S. Appl. No. 17/027,353, 31 pages.
Office Action, dated Oct. 27, 2021, received in U.S. Appl. No. 17/027,353, 34 pages.
Notice of Allowance, dated Feb. 24, 2022, received in U.S. Appl. No. 17/027,353, 9 pages.
Notice of Allowance, dated Apr. 29, 2022, received in U.S. Appl. No. 17/027,353, 7 pages.
Office Action, dated May 5, 2021, received in Australian Patent Application No. 2020239727, which corresponds with U.S. Appl. No. 17/027,353, 7 pages.
Office Action, dated Oct. 18, 2021, received in Australian Patent Application No. 2020239727, which corresponds with U.S. Appl. No. 17/027,353, 2 pages.
Notice of Allowance, dated Dec. 2, 2021, received in Australian Patent Application No. 2020239727, which corresponds with U.S. Appl. No. 17/027,353, 3 pages.
Certificate of grant, dated Mar. 31, 2022, received in Australian Patent Application No. 2020239727, which corresponds with U.S. Appl. No. 17/027,353, 3 pages.
Innovation Patent, dated Apr. 28, 2021, received in Australian Patent Application No. 2021101401, which corresponds with U.S. Appl. No. 17/027,353, 5 pages.
Office Action, dated May 28, 2021, received in Australian Patent Application No. 2021101401, which corresponds with U.S. Appl. No. 17/027,353, 6 pages.
Certificate of Examination, dated Aug. 12, 2021, received in Australian Patent Application No. 2021101401, which corresponds with U.S. Appl. No. 17/027,353, 4 pages.
Office Action, dated Dec. 18, 2020, received in Danish Patent Application No. 2020-70608, which corresponds with U.S. Appl. No. 17/027,353, 10 pages.
Office Action, dated Aug. 23, 2021, received in Danish Patent Application No. 2020-70608, which corresponds with U.S. Appl. No. 17/027,353, 6 pages.
Office Action, dated Jun. 8, 2022, received in Danish Patent Application No. 2020-70608, which corresponds with U.S. Appl. No. 17/027,353, 5 pages.
Office Action, dated Dec. 2, 2021, received in Indian Patent Application No. 202014041464, which corresponds with U.S. Appl. No. 17/027,353, 10 pages.
Office Action, dated Jan. 28, 2022, received in Japanese Patent Application No. 2020-160219, which corresponds with U.S. Appl. No. 17/027,353, 2 pages.
Final Office Action, dated Sep. 9, 2022, received in Japanese Patent Application No. 2020-160219, which corresponds with U.S. Appl. No. 17/027,353, 2 pages.
Patent, dated Jan. 17, 2023, received in Japanese Patent Application No. 2020-160219, which corresponds with U.S. Appl. No. 17/027,353, 3 pages.
Office Action, dated Oct. 20, 2022, received in Korean Patent Application No. 2020-0124016, which corresponds with U.S. Appl. No. 17/027,353, 16 pages.
Notice of Allowance, dated Apr. 29, 2021, received in U.S. Appl. No. 16/915,971, 9 pages.
Office Action, dated Feb. 2, 2021, received in U.S. Appl. No. 17/027,382, 16 pages.
Notice of Allowance, dated Apr. 28, 2021, received in U.S. Appl. No. 17/027,382, 10 pages.
Notice of Allowance, dated Aug. 31, 2021, received in U.S. Appl. No. 17/027,382, 6 pages.
Office Action, dated Mar. 31, 2021, received in Australian Patent Application No. 2020239725, which corresponds with U.S. Appl. No. 17/027,382, 6 pages.
Office Action, dated Sep. 28, 2021, received in Australian Patent Application No. 2020239725, which corresponds with U.S. Appl. No. 17/027,382, 6 pages.
Office Action, dated Jan. 27, 2022, received in Australian Patent Application No. 2020239725, which corresponds with U.S. Appl. No. 17/027,382, 2 pages.
Notice of Allowance, dated Mar. 2, 2022, received in Australian Patent Application No. 2020239725, which corresponds with U.S. Appl. No. 17/027,382, 3 pages.
Certificate of Grant, dated Jun. 30, 2022, received in Australian Patent Application No. 2020239725, which corresponds with U.S. Appl. No. 17/027,382, 3 pages.
Office Action, dated Dec. 23, 2020, received in Danish Patent Application No. 2020-70636, which corresponds with U.S. Appl. No. 17/027,382, 9 pages.
Office Action, dated Sep. 29, 2021, received in Danish Patent Application No. 2020-70636, which corresponds with U.S. Appl. No. 17/027,382, 4 pages.
Office Action, dated Jul. 1, 2022, received in Danish Patent Application No. 2020-70636, which corresponds with U.S. Appl. No. 17/027,382, 4 pages.
Office Action, dated Dec. 1, 2021, received in Indian Patent Application No. 202014041329, which corresponds with U.S. Appl. No. 17/027,382, 10 pages.
Notice of Allowance, dated Jan. 28, 2022, received in Japanese Patent Application No. 2020-160220, which corresponds with U.S. Appl. No. 17/027,382, 2 pages.
Patent, dated Feb. 21, 2022, received in Japanese Patent Application No. 2020-160220, which corresponds with U.S. Appl. No. 17/027,382, 2 pages.
Office Action, dated Oct. 14, 2022, received in Korean Patent Application No. 2020-0123650, which corresponds with U.S. Appl. No. 17/027,382, 9 pages.
Office Action, dated Jan. 6, 2021, received in U.S. Appl. No. 17/027,400, 45 pages.
Final Office action, dated Apr. 29, 2021, received in U.S. Appl. No. 17/027,400, 46 pages.
Office action, dated Oct. 14, 2021, received in U.S. Appl. No. 17/027,400, 43 pages.
Final Office action, dated Mar. 23, 2022, received in U.S. Appl. No. 17/027,400, 51 pages.
Office action, dated Sep. 29, 2022, received in U.S. Appl. No. 17/027,400, 45 pages.
Office Action, dated Apr. 23, 2021, received in Australian Patent Application No. 2020239726, which corresponds with U.S. Appl. No. 17/027,400, 8 pages.
Notice of Allowance, dated Jul. 23, 2021, received in Australian Patent Application No. 2020239726, which corresponds with U.S. Appl. No. 17/027,400, 3 pages.
Patent, dated Nov. 18, 2021, received in Australian Patent Application No. 2020239726, which corresponds with U.S. Appl. No. 17/027,400, 4 pages.
Office Action, dated Oct. 4, 2021, received in Danish Patent Application No. 2020 70637, which corresponds with U.S. Appl. No. 17/027,400, 4 pages.
Office Action, dated May 20, 2022, received in Danish Patent Application No. 2020 70637, which corresponds with U.S. Appl. No. 17/027,400, 4 pages.
Office Action, dated Dec. 2, 2021, received in Indian Patent Application No. 202014041330, which corresponds with U.S. Appl. No. 17/027,400, 10 pages.

(56) References Cited

OTHER PUBLICATIONS

Office Action, dated Feb. 4, 2022, received in Japanese Patent Application No. 2020-160173, which corresponds with U.S. Appl. No. 17/027,400, 2 pages.
Patent, dated Dec. 19, 2022, received in Japanese Patent Application No. 2020-160173, which corresponds with U.S. Appl. No. 17/027,400, 2 pages.
Office Action, dated Jul. 12, 2022, received in Korean Patent Application No. 2020-0124017, which corresponds with U.S. Appl. No. 17/027,400, 12 pages.
Notice of Allowance, dated Jan. 9, 2023, received in Korean Patent Application No. 2020-0124017, which corresponds with U.S. Appl. No. 17/027,400, 2 pages.
Patent, dated Jan. 30, 2023, received in Korean Patent Application No. 2020-0124017, which corresponds with U.S. Appl. No. 17/027,400, 4 pages.
Office Action, dated Jan. 8, 2021, received in U.S. Appl. No. 17/027,416, 35 pages.
Notice of Allowance, dated Apr. 19, 2021, received in U.S. Appl. No. 17/027,416, 8 pages.
Notice of Allowance, dated Jul. 28, 2021, received in U.S. Appl. No. 17/027,416, 9 pages.
Office Action, dated Apr. 29, 2021, received in Australian Patent Application No. 2020239728, which corresponds with U.S. Appl. No. 17/027,416, 7 pages.
Notice of Acceptance, dated Aug. 20, 2021, received in Australian Patent Application No. 2020239728, which corresponds with U.S. Appl. No. 17/027,416, 3 pages.
Patent, dated Dec. 23, 2021, received in Australian Patent Application No. 2020239728, which corresponds with U.S. Appl. No. 17/027,416, 3 pages.
Office Action, dated Dec. 22, 2020, received in Danish Patent Application No. 2020-70638, which corresponds with U.S. Appl. No. 17/027,416, 6 pages.
Office Action, dated Nov. 5, 2021, received in Danish Patent Application No. 2020239728, which corresponds with U.S. Appl. No. 17/027,416, 5 pages.
Office Action, dated Aug. 17, 2022, received in Danish Patent Application No. 2020239728, which corresponds with U.S. Appl. No. 17/027,416, 2 pages.
Office Action, dated Dec. 2, 2021, received in Indian Patent Application No. 202014041465, which corresponds with U.S. Appl. No. 17/027,416, 8 pages.
Office Action, dated Jan. 28, 2022, received in Japanese Patent Application No. 2020-160174, which corresponds with U.S. Appl. No. 17/027,416, 2 pages.
Notice of Allowance, dated Sep. 5, 2022, received in Japanese Patent Application No. 2020-160174, which corresponds with U.S. Appl. No. 17/027,416, 1 page.
Patent, dated Oct. 3, 2022, received in Japanese Patent Application No. 2020-160174, which corresponds with U.S. Appl. No. 17/027,416, 5 pages.
Office Action, dated Oct. 17, 2022, received in Korean Patent Application No. 2020-0123829, which corresponds with U.S. Appl. No. 17/027,416, 11 pages.
Office Action, dated Dec. 22, 2020, received in U.S. Appl. No. 17/027,429, 23 pages.
Notice of Allowance, dated Apr. 13, 2021, received in U.S. Appl. No. 17/027,429, 9 pages.
Notice of Allowance, dated Oct. 29, 2021, received in U.S. Appl. No. 17/027,429, 7 pages.
Office Action, dated May 6, 2021, received in Australian Patent Application No. 2020239731, which corresponds with U.S. Appl. No. 17/027,429, 6 pages.
Notice of Acceptance, dated Oct. 6, 2021, received in Australian Patent Application No. 2020239731, which corresponds with U.S. Appl. No. 17/027,429, 3 pages.
Office Action, dated Jan. 6, 2021, received in Danish Patent Application No. 2020-70639, which corresponds with U.S. Appl. No. 17/027,429, 9 pages.
Office Action, dated Sep. 9, 2021, received in Danish Patent Application No. 2020-70639, which corresponds with U.S. Appl. No. 17/027,429, 3 pages.
Intent to Grant, dated Oct. 19, 2021, received in Danish Patent Application No. 2020-70639, which corresponds with U.S. Appl. No. 17/027,429, 2 pages.
Notice of Allowance, dated Jan. 10, 2022, received in Danish Patent Application No. 2020-70639, which corresponds with U.S. Appl. No. 17/027,429, 2 pages.
Patent, dated Mar. 21, 2022, received in Danish Patent Application No. 2020-70639, which corresponds with U.S. Appl. No. 17/027,429, 5 pages.
Office Action, dated Dec. 6, 2021, received in Indian Patent Application No. 202014041463, which corresponds with U.S. Appl. No. 17/027,429, 9 pages.
Notice of Allowance, dated Feb. 4, 2022, received in Japanese Patent Application No. 2020-160175, which corresponds with U.S. Appl. No. 17/027,429, 2 pages.
Patent, dated Feb. 16, 2022, received in Japanese Patent Application No. 2020-160175, which corresponds with U.S. Appl. No. 17/027,429, 3 pages.
Office Action, dated Oct. 17, 2022, received in Korean Patent Application No. 2020-0123583, which corresponds with U.S. Appl. No. 17/027,429, 3 pages.
Office Action, dated Jan. 7, 2021, received in U.S. Appl. No. 17/027,441, 15 pages.
Notice of Allowance, dated Apr. 13, 2021, received in U.S. Appl. No. 17/027,441, 5 pages.
Office Action, dated Oct. 21, 2021, received in U.S. Appl. No. 17/027,441, 24 pages.
Notice of Allowance, dated Feb. 25, 2022, received in U.S. Appl. No. 17/027,441, 26 pages.
Office Action, dated May 28, 2021, received in Australian Patent Application No. 2020239732, which corresponds with U.S. Appl. No. 17/027,441, 6 pages.
Office Action, dated Sep. 8, 2021, received in Australian Patent Application No. 2020239732, which corresponds with U.S. Appl. No. 17/027,441, 5 pages.
Notice of Allowance, dated Feb. 16, 2022, received in Australian Patent Application No. 2020239732, which corresponds with U.S. Appl. No. 17/027,441, 3 pages.
Patent, dated Jun. 23, 2022, received in Australian Patent Application No. 2020239732, which corresponds with U.S. Appl. No. 17/027,441, 4 pages.
Office Action, dated Dec. 23, 2020, received in Danish Patent Application No. 2020-70640, which corresponds to U.S. Appl. No. 17/027,441, 9 pages.
Office Action, dated Jul. 23, 2021, received in Danish Patent Application No. 2020-70640, which corresponds with U.S. Appl. No. 17/027,441, 3 pages.
Intent to Grant, dated Dec. 9, 2021, received in Danish Patent Application No. 2020-70640, which corresponds with U.S. Appl. No. 17/027,441, 2 pages.
Notice of Allowance, dated Feb. 10, 2022, received in Danish Patent Application No. 2020-70640, which corresponds with U.S. Appl. No. 17/027,441, 2 pages.
Patent, dated May 11, 2022, received in Danish Patent Application No. 2020-70640, which corresponds with U.S. Appl. No. 17/027,441, 5 pages.
Office Action, dated Dec. 3, 2021, received in Indian Patent Application No. 202014041328, which corresponds with U.S. Appl. No. 17/027,441, 7 pages.
Office Action, dated Feb. 4, 2022, received in Japanese Patent Application No. 2020-160176, which corresponds with U.S. Appl. No. 17/027,441, 2 pages.
Notice of Allowance, dated Oct. 14, 2022, received in Japanese Patent Application No. 2020-160176, which corresponds with U.S. Appl. No. 17/027,441, 2 pages.
Patent, dated Nov. 9, 2022, received in Japanese Patent Application No. 20-160176, which corresponds with U.S. Appl. No. 17/027,441, 2 pages.

(56) References Cited

OTHER PUBLICATIONS

Office Action, dated Jul. 12, 2022, received in Korean Patent Application No. 2020-0124095, which corresponds with U.S. Appl. No. 17/027,441, 11 pages.
Notice of Allowance, dated Jan. 13, 2023, received in Korean Patent Application No. 2020-0124095, which corresponds with U.S. Appl. No. 17/027,441, 2 pages.
Patent, dated Jan. 30, 2023, received in Korean Patent Application No. 2020-0124095, which corresponds with U.S. Appl. No. 17/027,441, 4 pages.
Notice of Allowance, dated Feb. 24, 2022, received in U.S. Appl. No. 17/458,201, 8 pages.
Notice of Allowance, dated Jun. 8, 2022, received in U.S. Appl. No. 17/458,201, 8 pages.
Notice of Allowance, dated Sep. 8, 2022, received in U.S. Appl. No. 17/852,235, 8 pages.
Notice of Allowance, dated Nov. 10, 2022, received in U.S. Appl. No. 17/852,235, 7 pages.
Office Action, dated Feb. 10, 2023, received in U.S. Appl. No. 17/950,707, 9 pages.
Office Action, dated Feb. 15, 2023, received in U.S. Appl. No. 17/967,528, 17 pages.
Office Action, dated Feb. 16, 2023, received in U.S. Appl. No. 17/950,718, 20 pages.
Invitation to Pay Additional Fees, dated Aug. 28, 2018, received in International Patent Application No. PCT/US2018/032395, which corresponds with U.S. Appl. No. 15/715,005, 17 pages.
International Search Report and Written Opinion, dated Nov. 6, 2018, received in International Patent Application No. PCT/US2018/032395, which corresponds with U.S. Appl. No. 15/715,005, 20 pages.
Invitation to Pay Additional Fees, dated Jun. 9, 2021, received in International Patent Application No. PCT/US2021/021776, which corresponds with U.S. Appl. No. 17/027,353, 17 pages.
International Search Report and Written Opinion, dated Aug. 3, 2021, received in International Patent Application No. PCT/US2021/021776, which corresponds with U.S. Appl. No. 17/027,353, 20 pages.
Extended European Search Report, dated Jan. 13, 2023, received in European Patent Application No. 22203850.7, 13 pages.
YouTube, "Android 4.2 Lock Screen Widgets", https://www.youtube.com/watch?v=ZpN8Wyu_z6Y, Nov. 12, 2012, 3 pages.
Notice of Allowance, dated Mar. 31, 2023, received in U.S. Appl. No. 17/027,400, 49 pages.
Notice of Allowance, dated Apr. 5, 2023, received in Chinese Patent Application No. 201880032712.8, which corresponds with U.S. Appl. No. 16/354,012, 2 pages.
Office Action, dated Apr. 19, 2023, received in Australian Patent Application No. 2022203104, 3 pages.
Notice of Allowance, dated Jun. 22, 2023, received in U.S. Appl. No. 17/950,680, 10 pages.
Final Office Action, dated May 25, 2023, received in U.S. Appl. No. 17/950,718, 21 pages.
Office Action, dated Jun. 29, 2023, received in U.S. Appl. No. 17/967,528, 17 pages.
Office Action, dated Apr. 13, 2023, received in U.S. Appl. No. 18/099,839, 6 pages.
Notice of Allowance, dated Jun. 13, 2023, received in U.S. Appl. No. 18/099,839, 6 pages.
Patent, dated Jun. 30, 2023, received in Chinese Patent Application No. 201880032712.8, which corresponds with U.S. Appl. No. 17/027,353, 5 pages.
Office Action, dated Apr. 26, 2023, received in Korean Patent Application No. 2020-0124016, which corresponds with U.S. Appl. No. 17/027,353, 2 pages.

\* cited by examiner

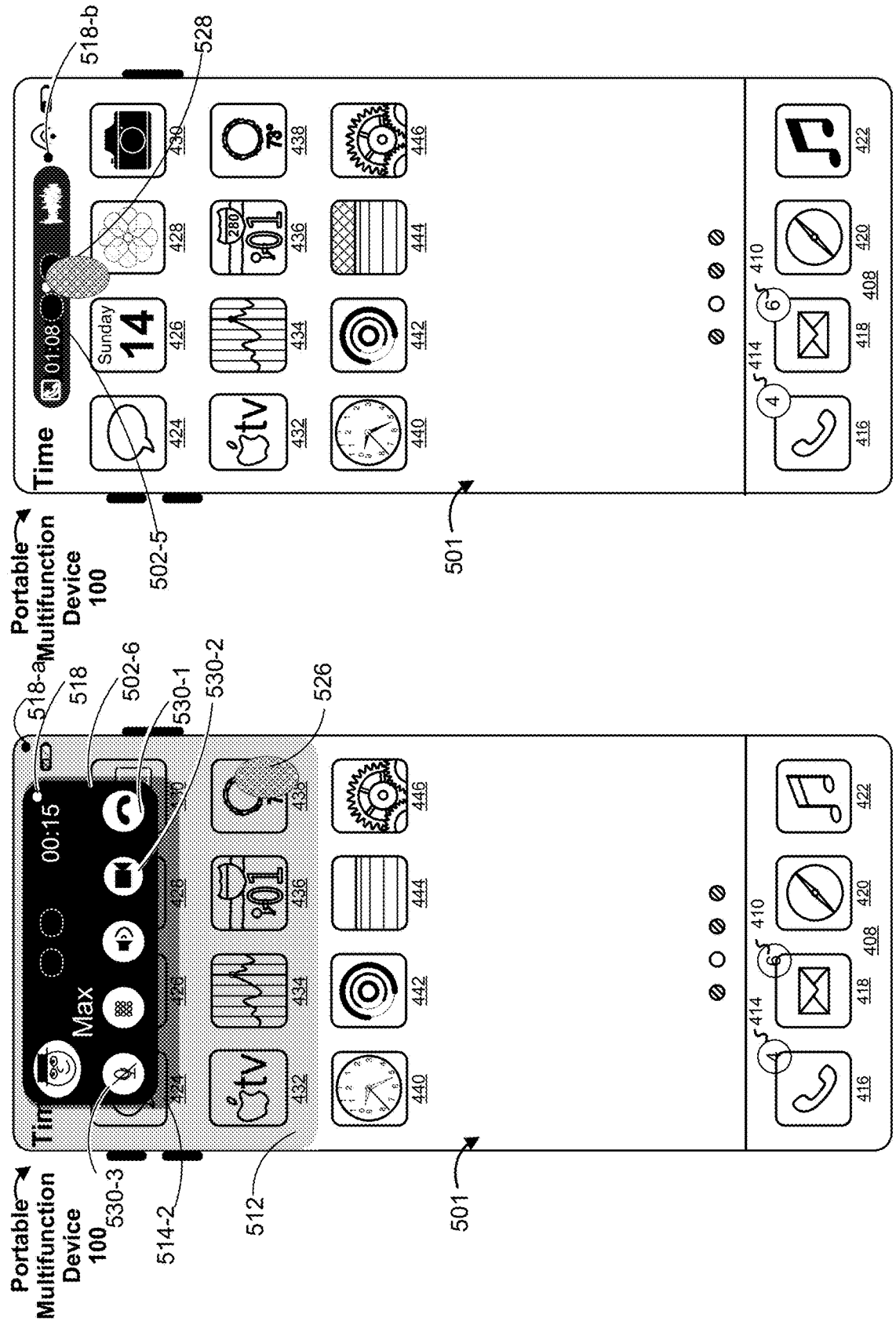

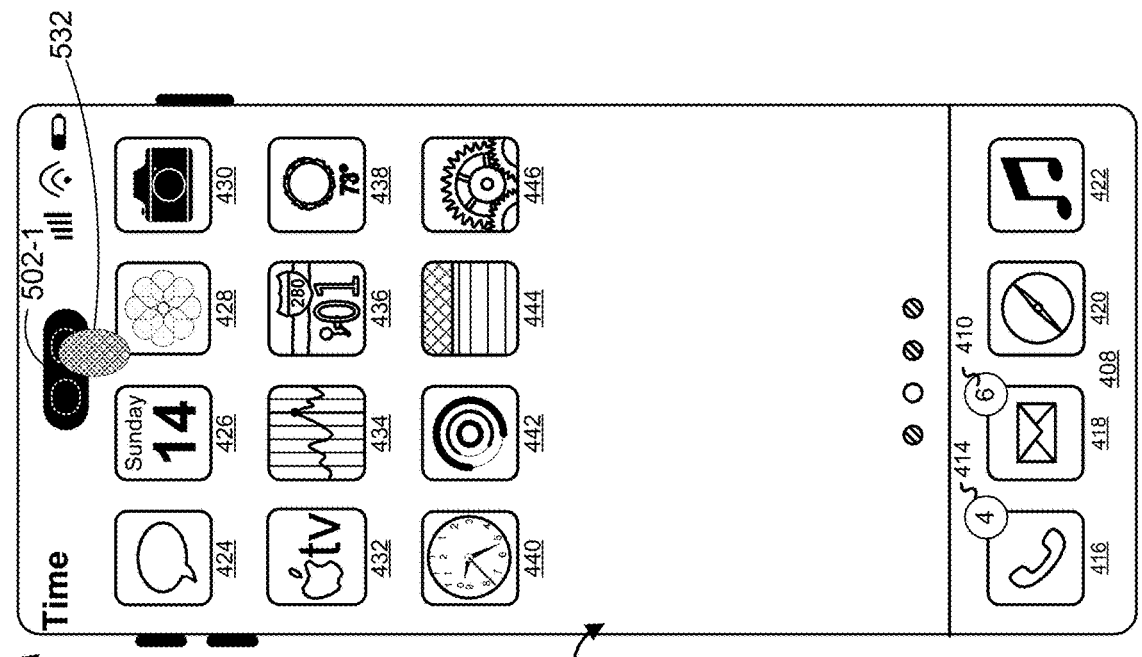
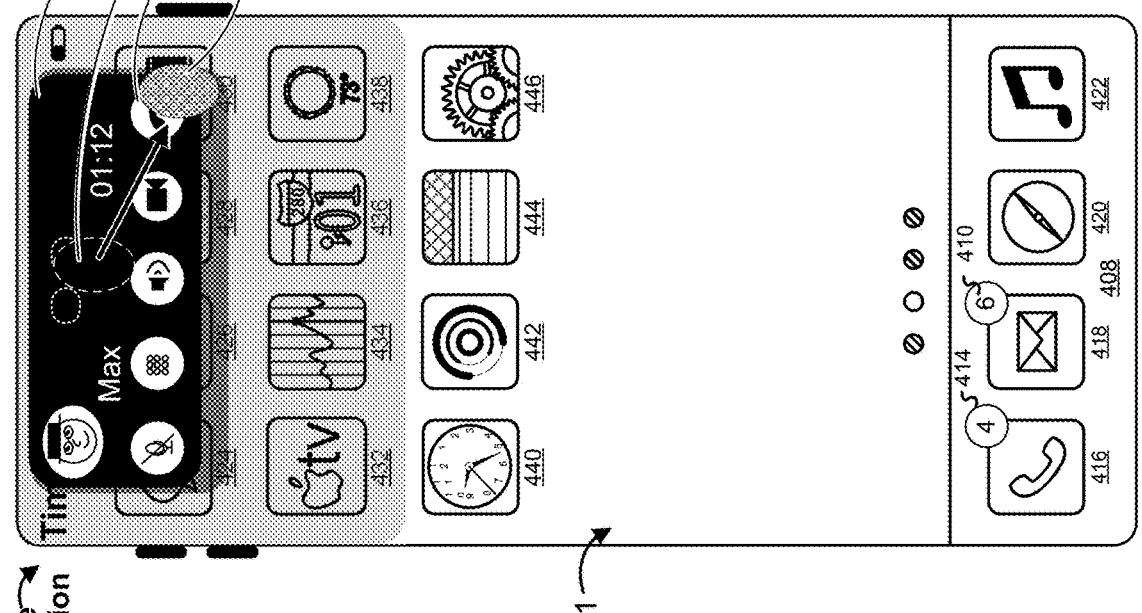

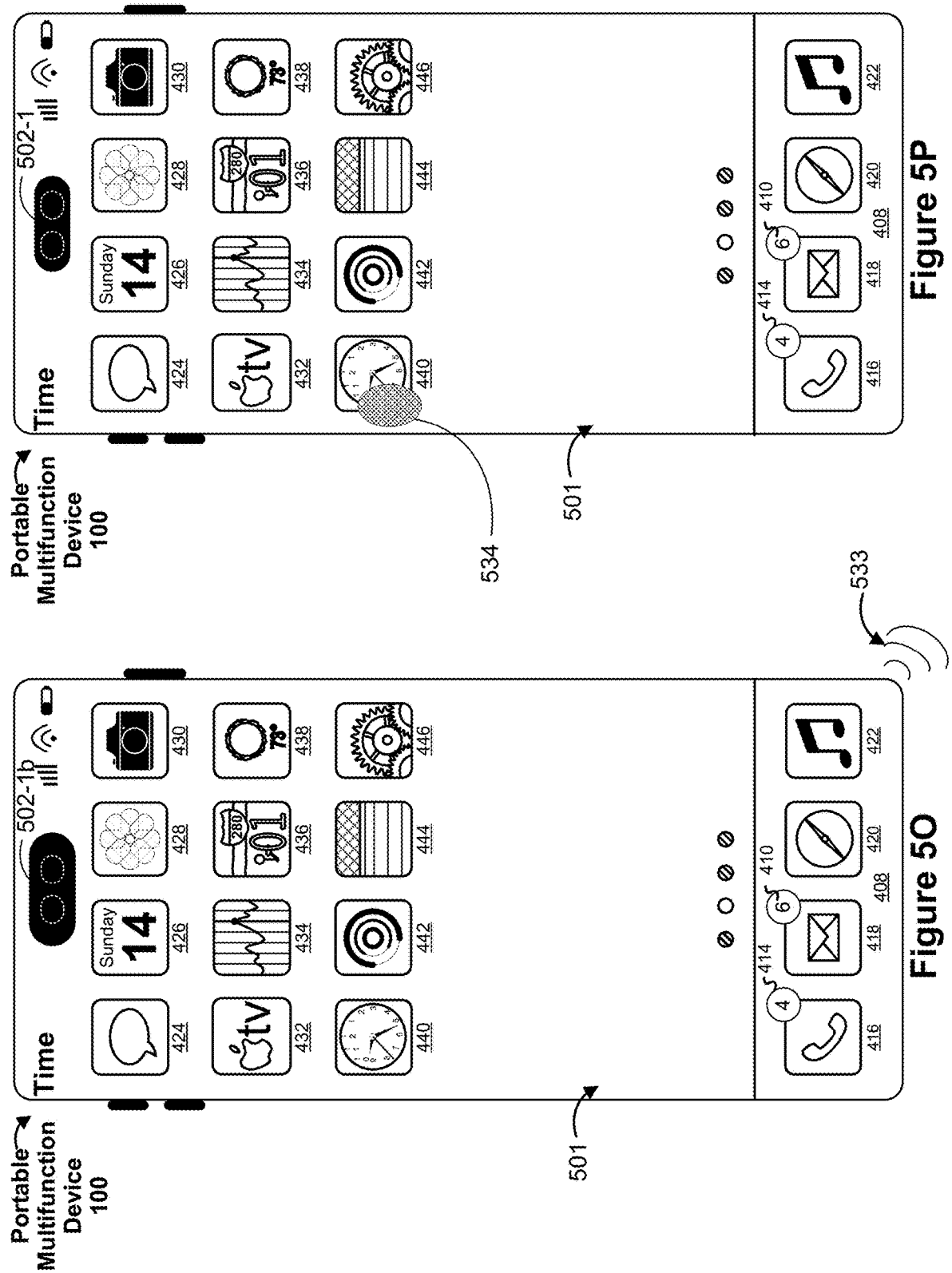

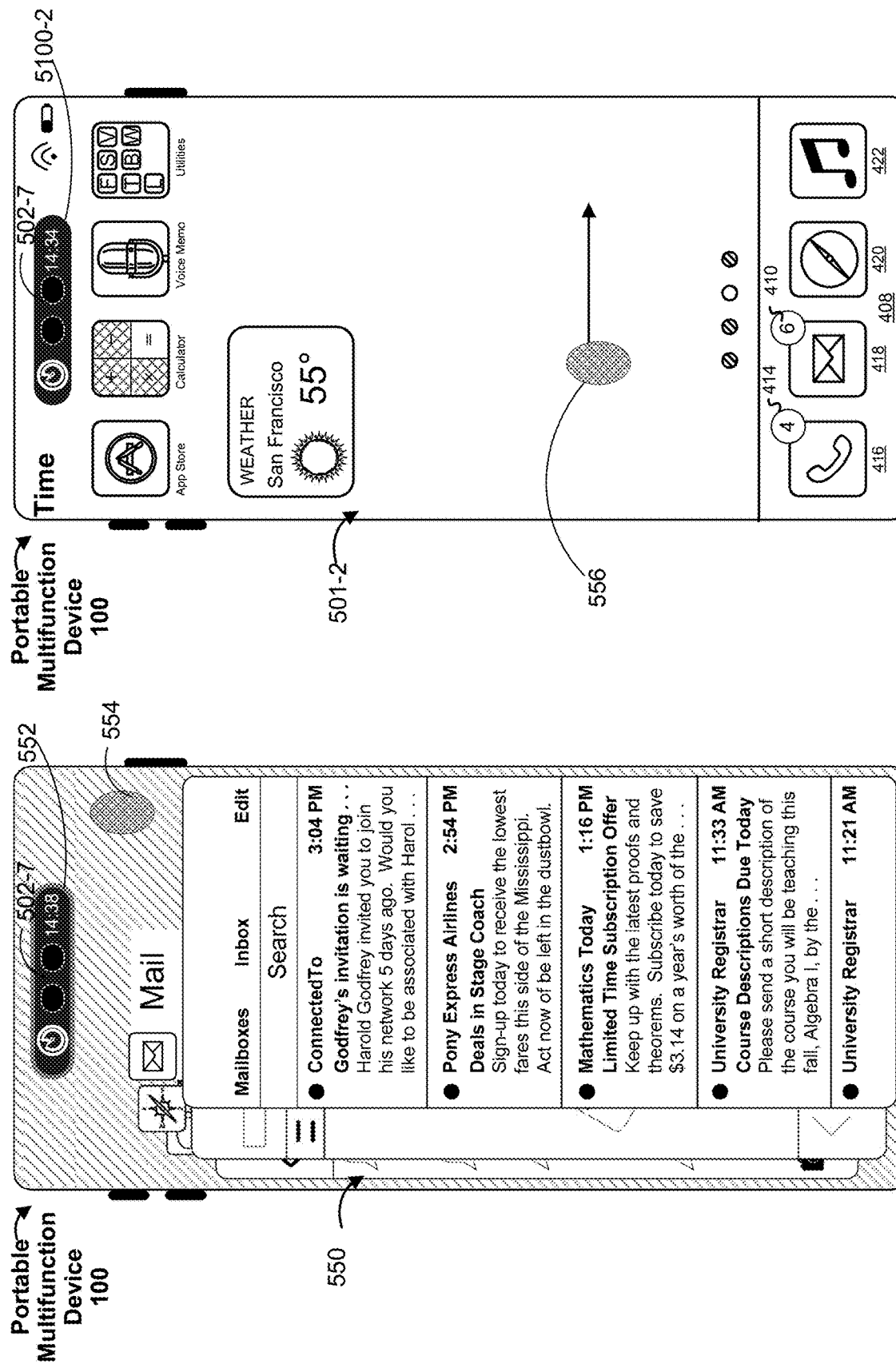

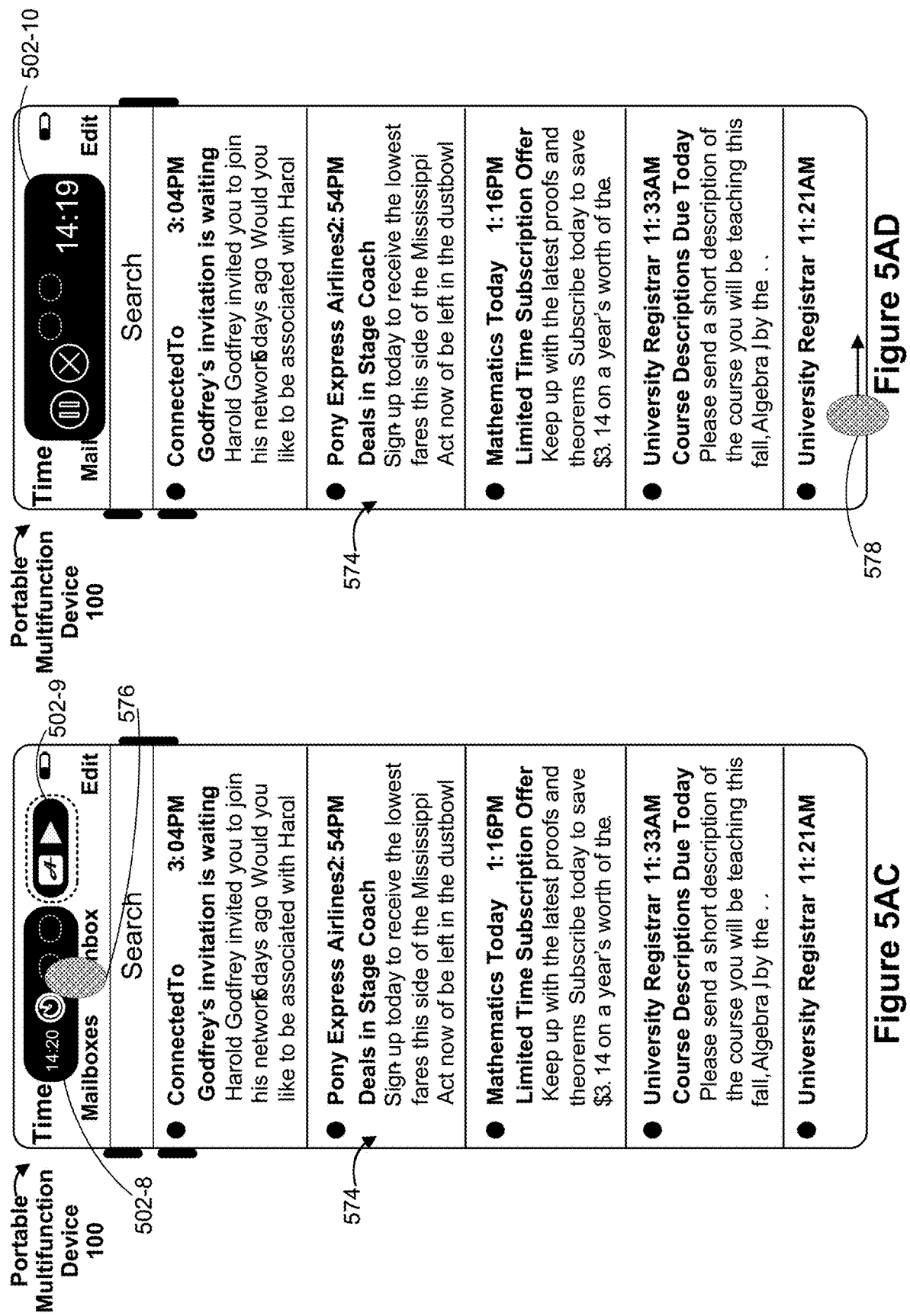

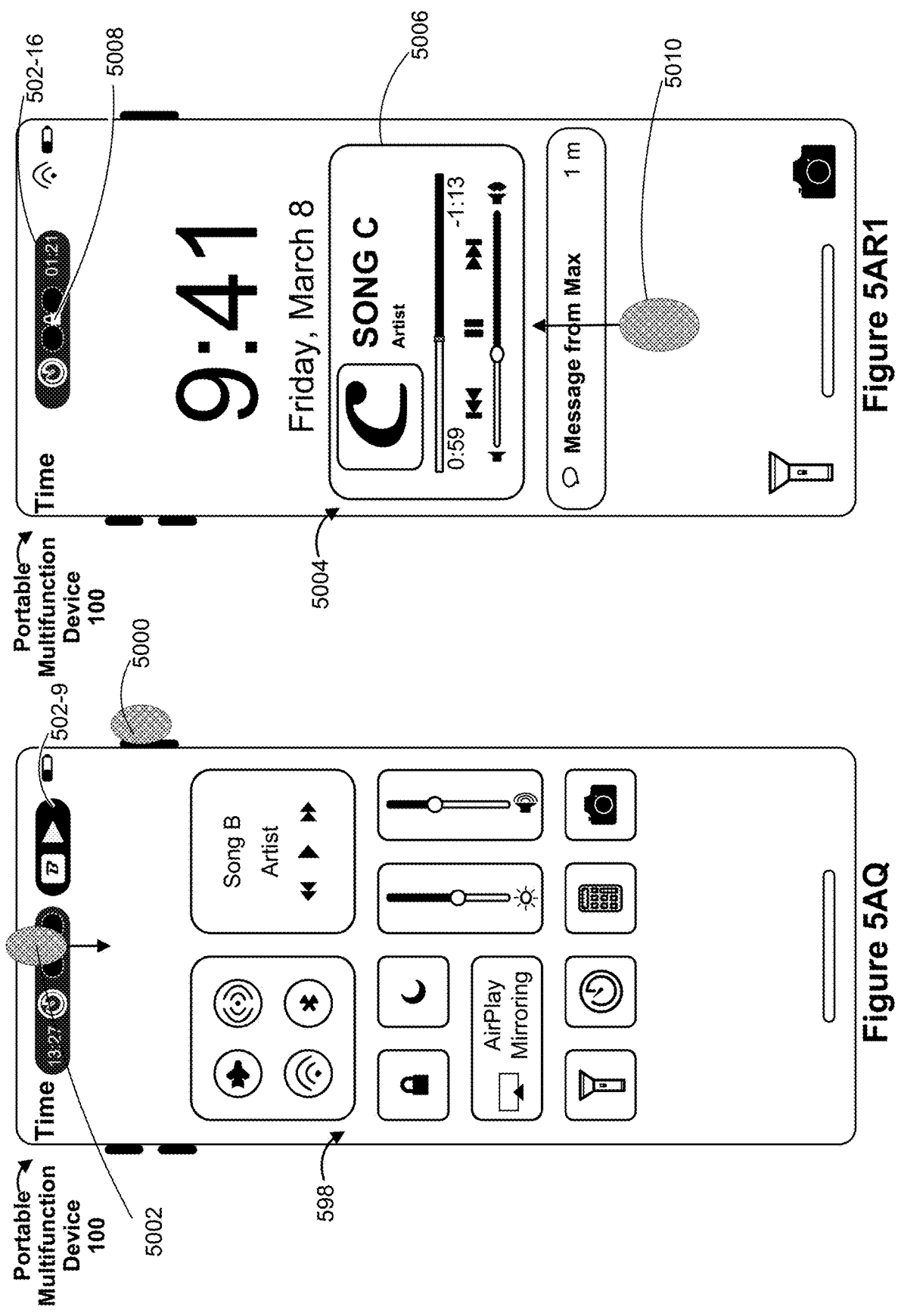

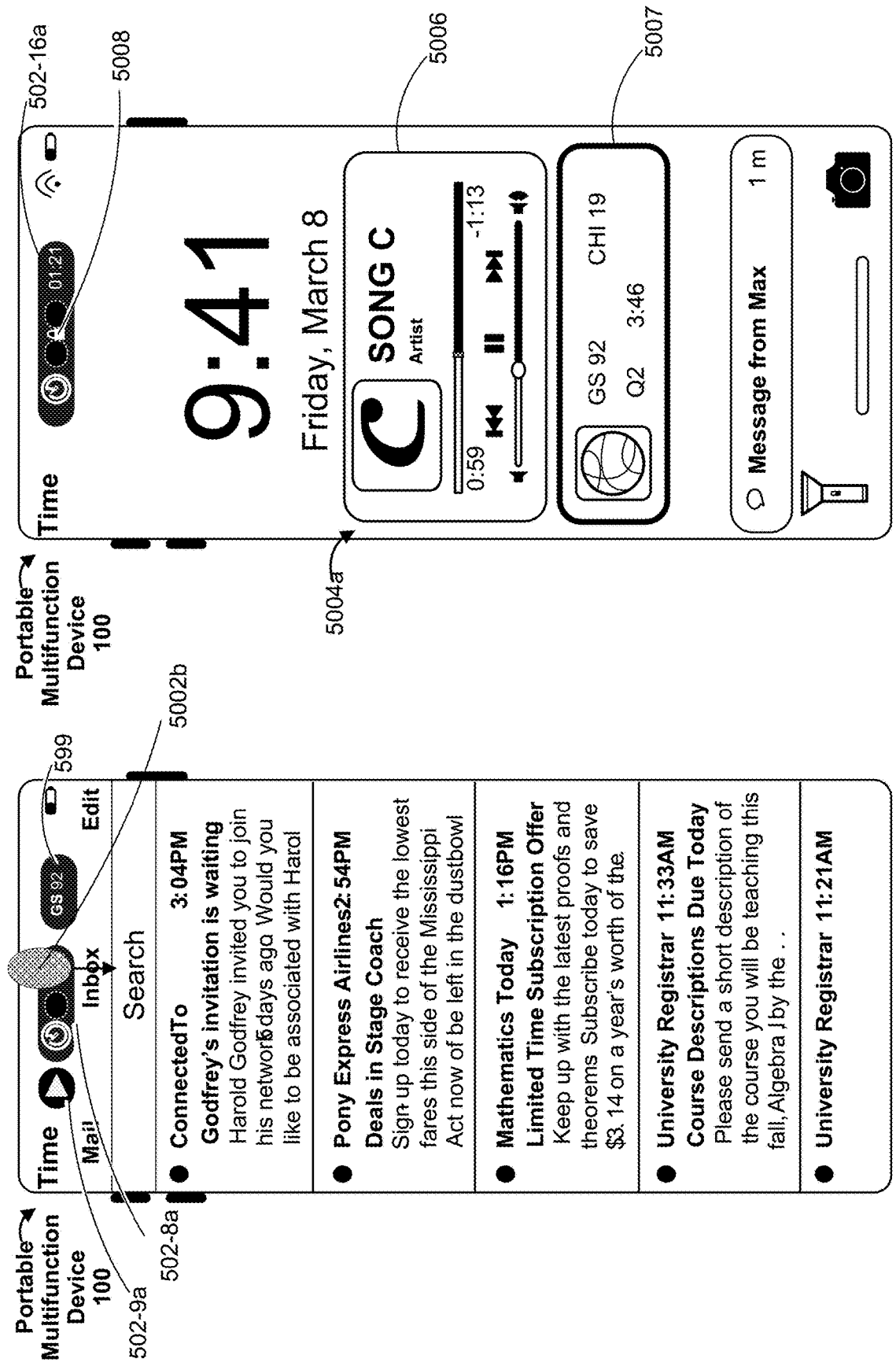

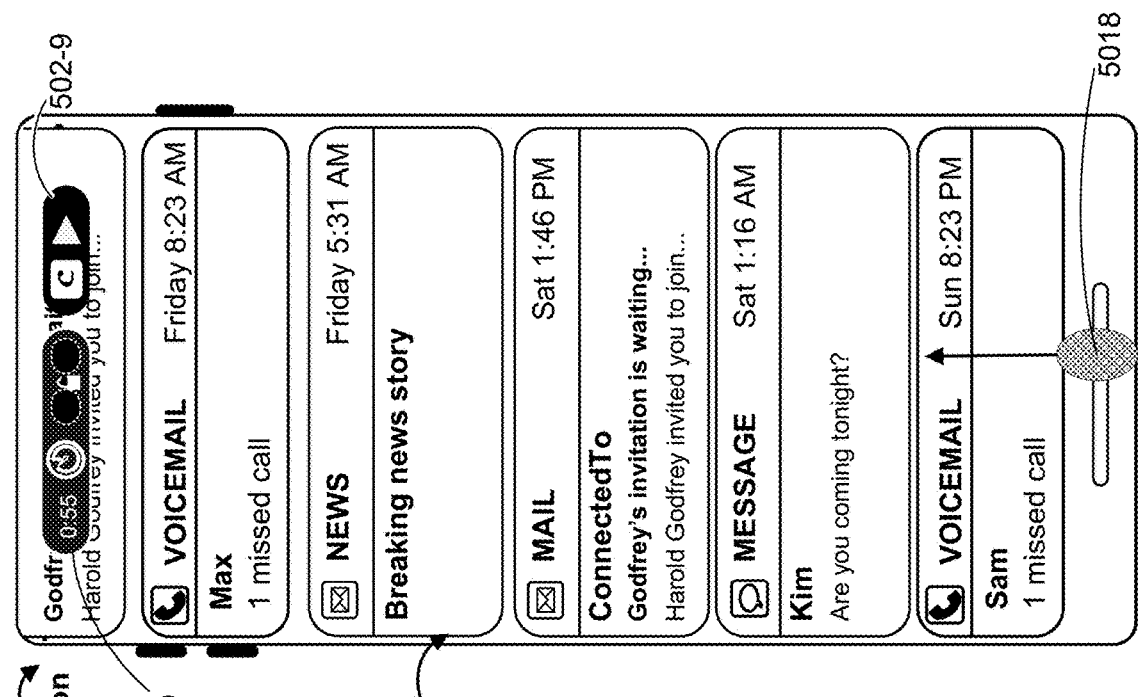
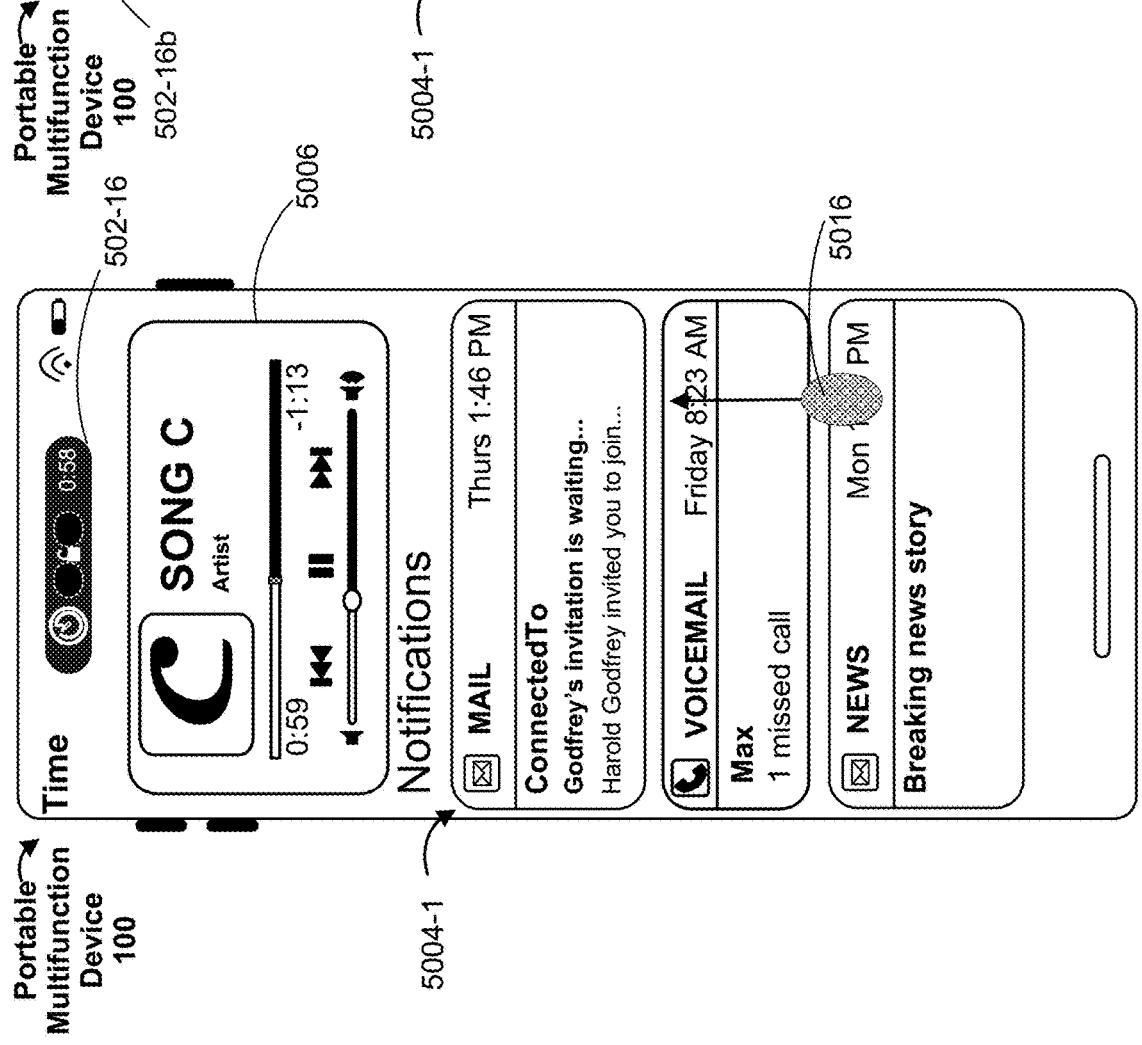
Figure 5AU
Figure 5AV

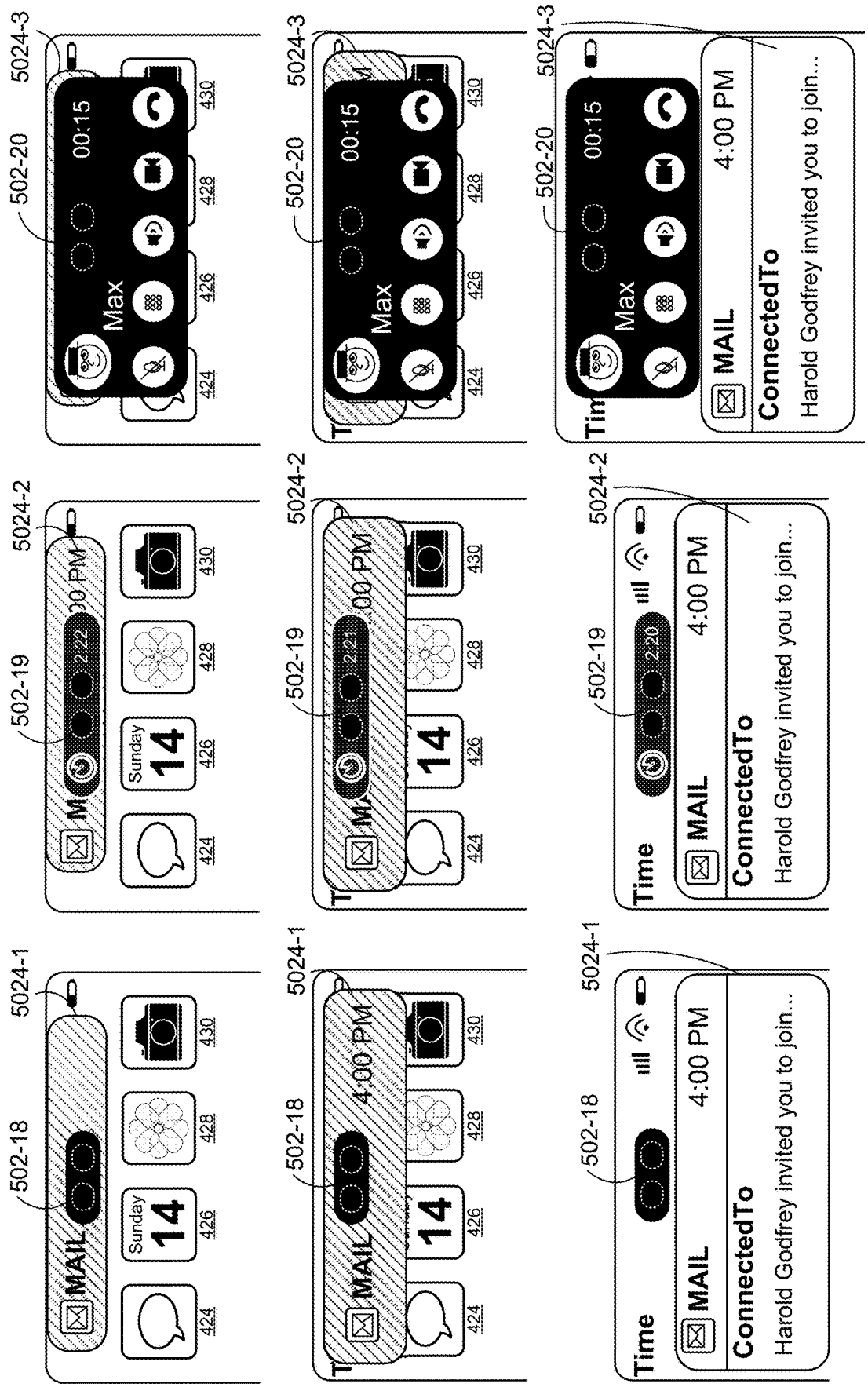

Figure 5BE1

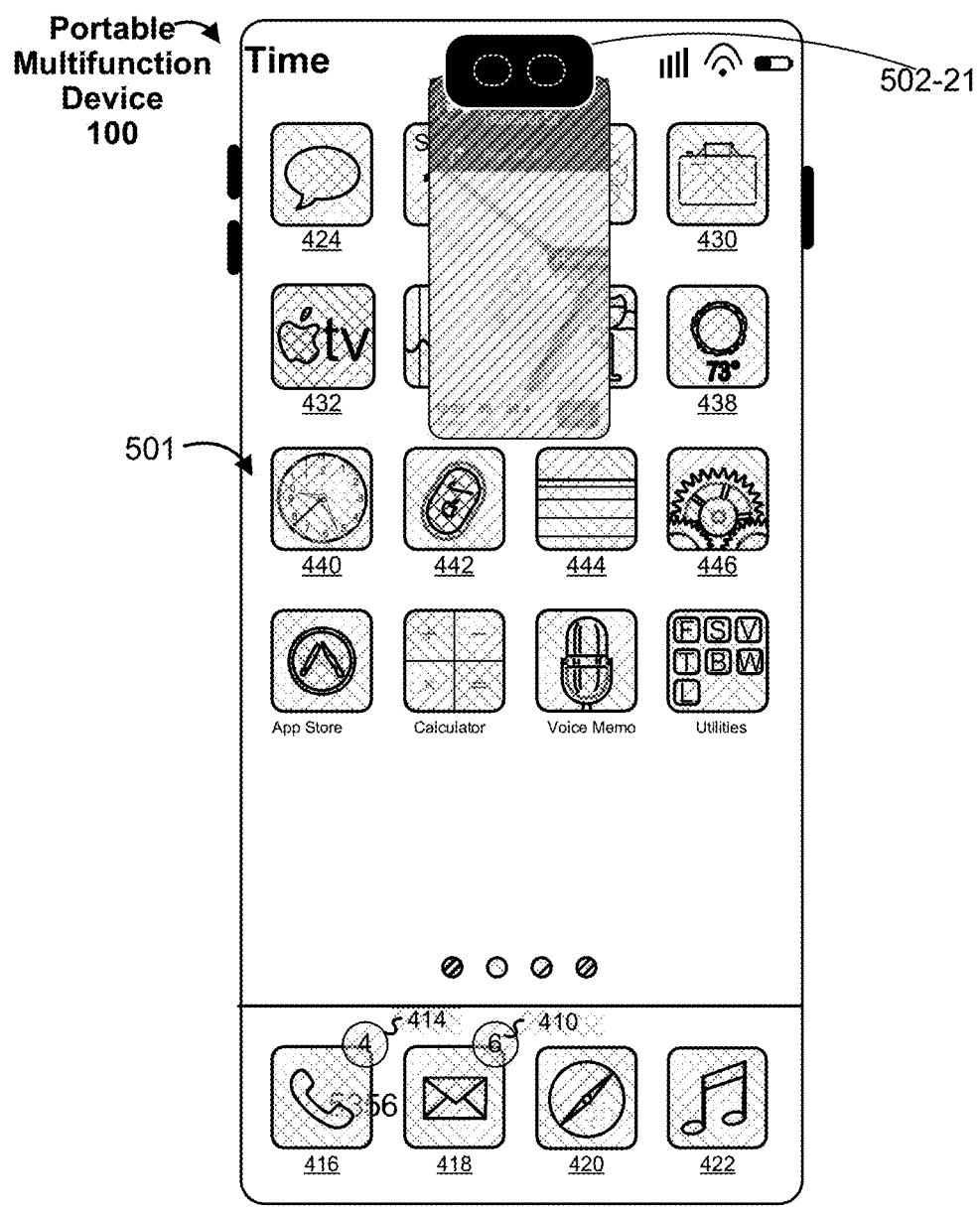
Figure 5BE2

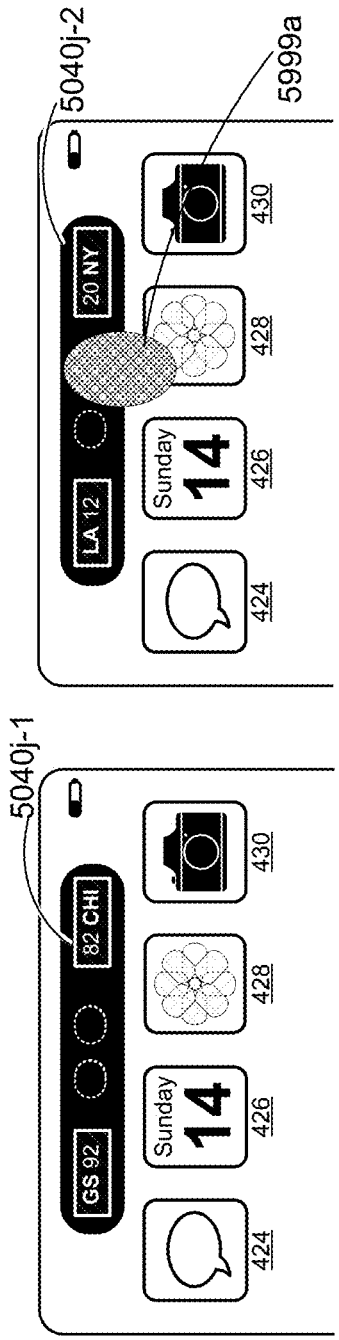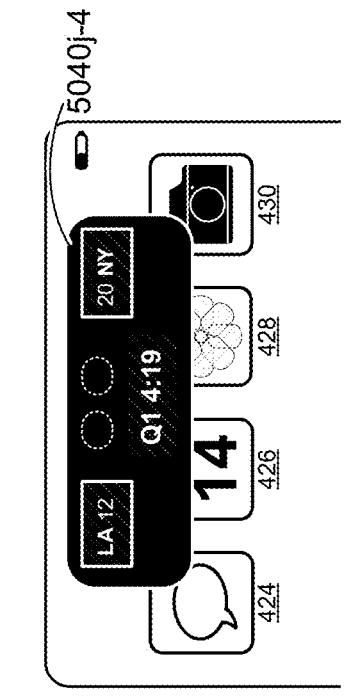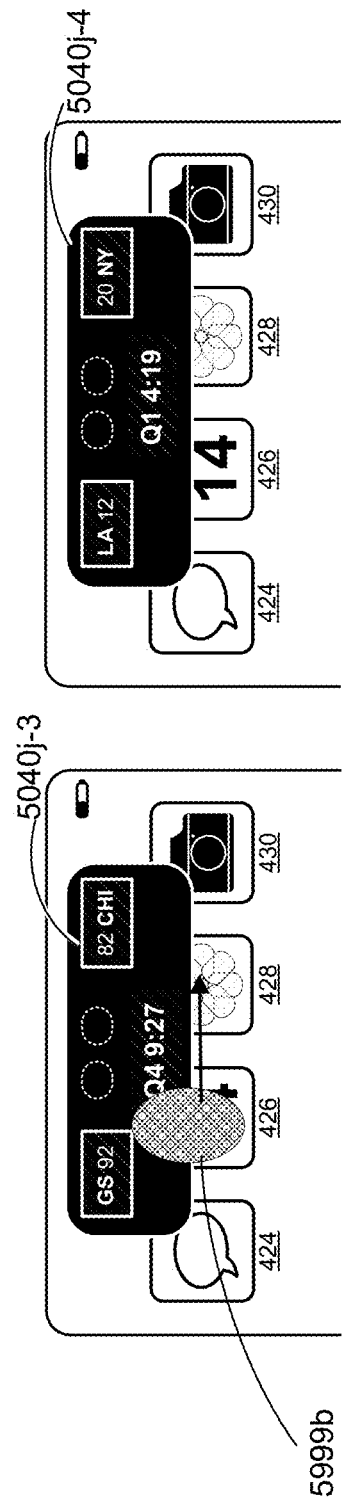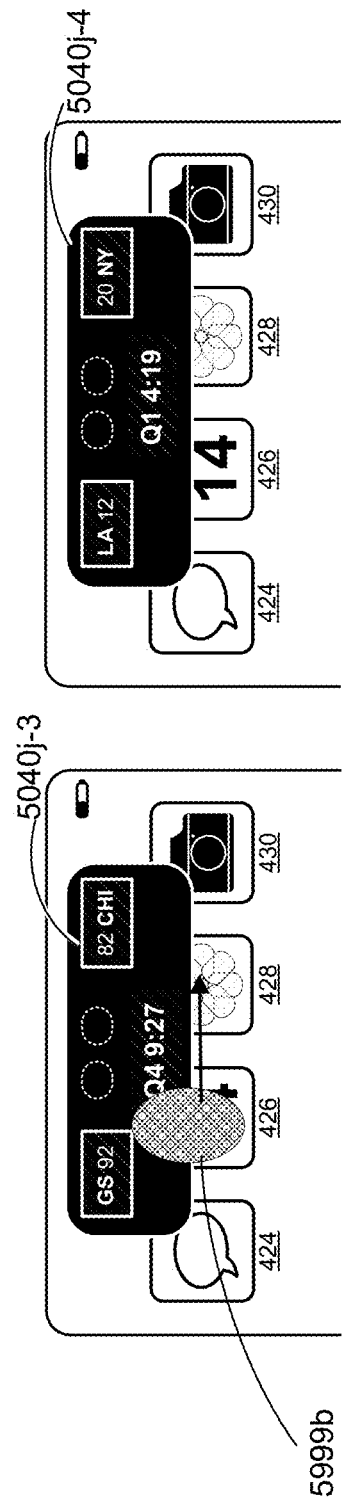
Figure 5BM1
Figure 5BM2
Figure 5BM3
Figure 5BM4

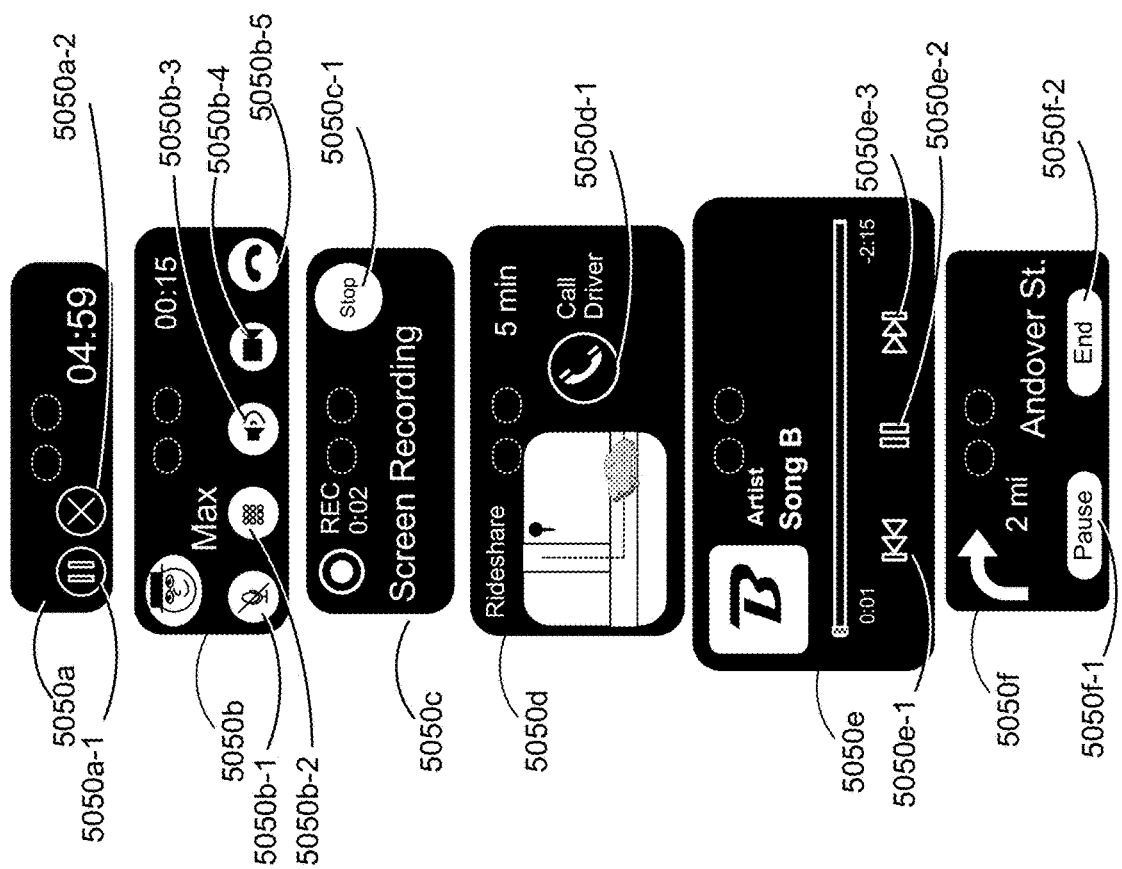
Figure 5BO
Figure 5BN

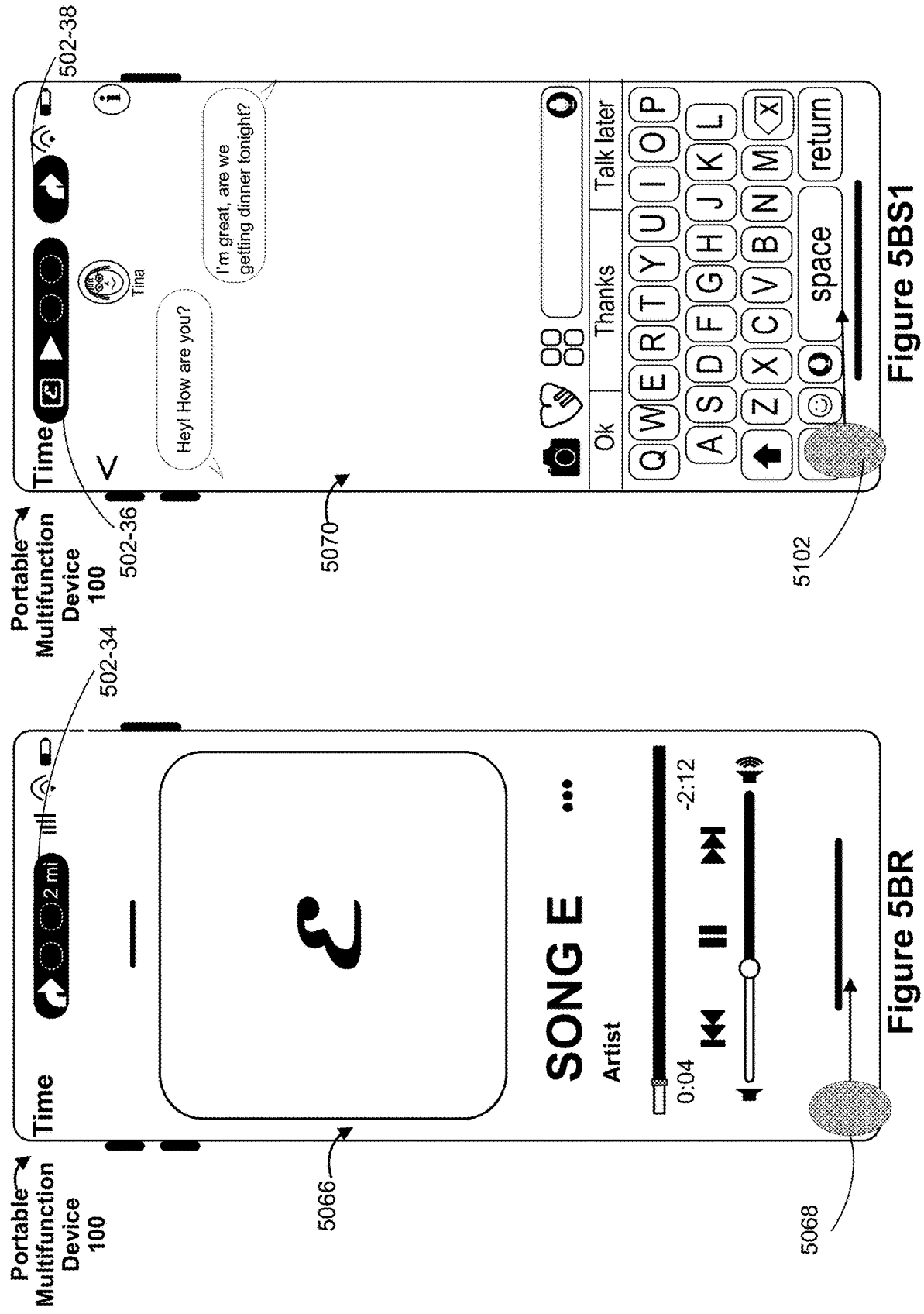

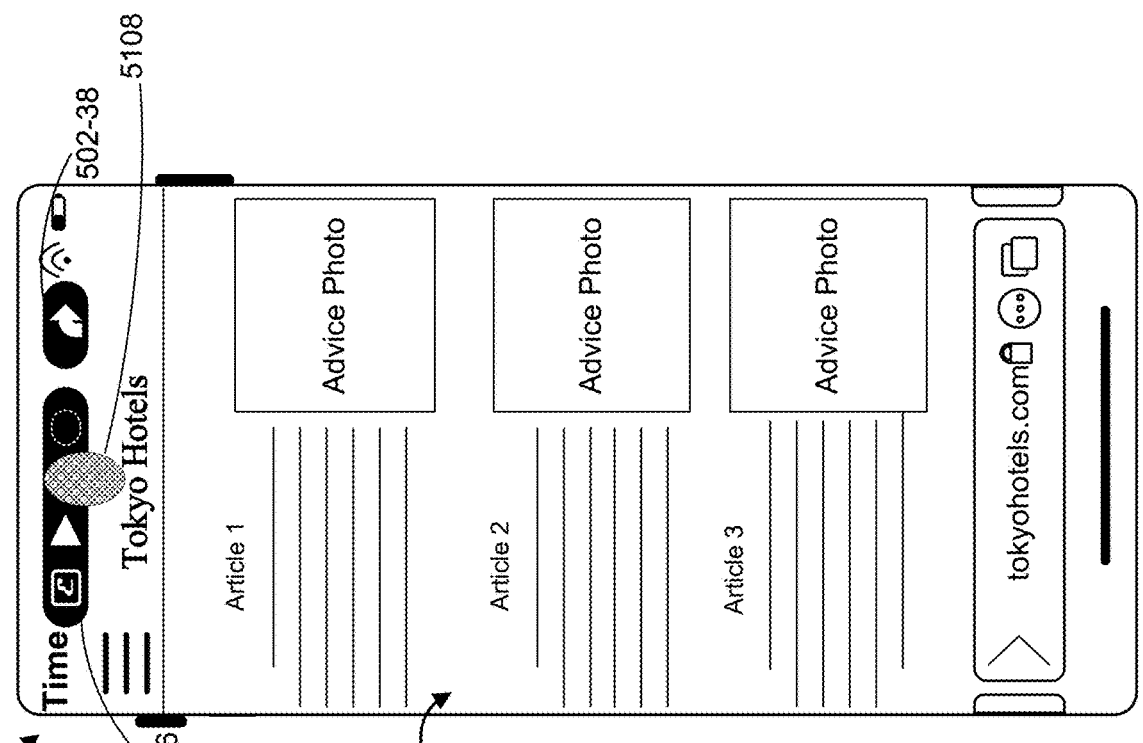
Figure 5BS3
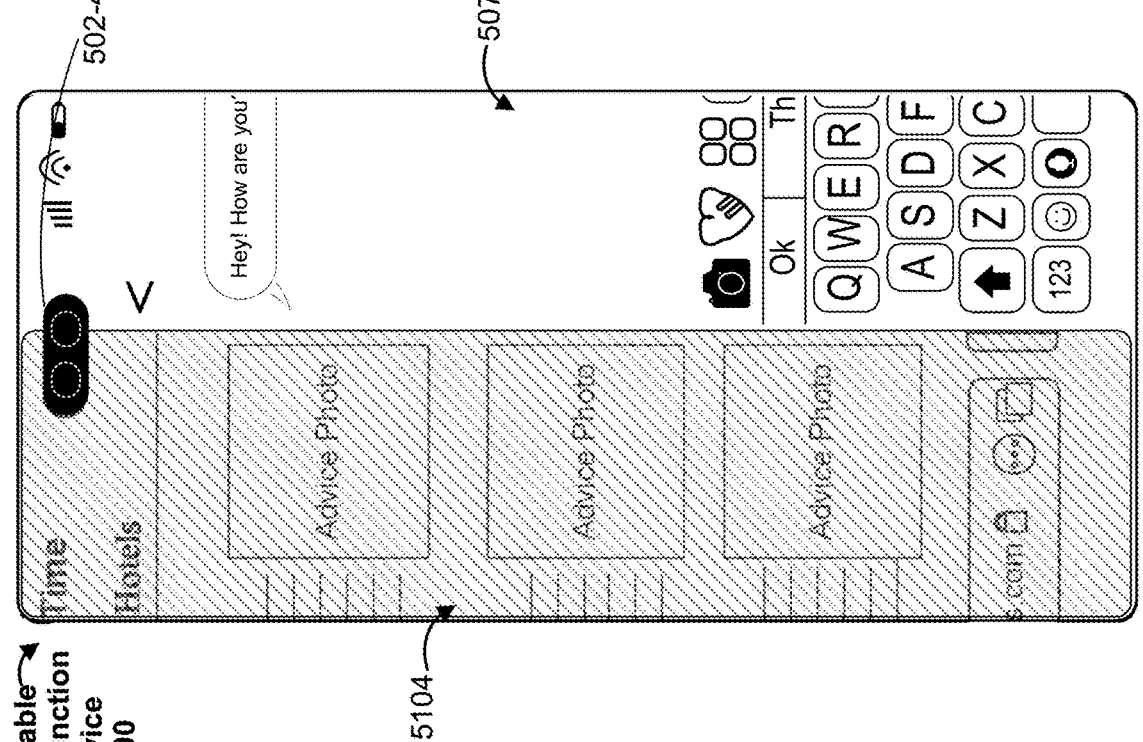
Figure 5BS2

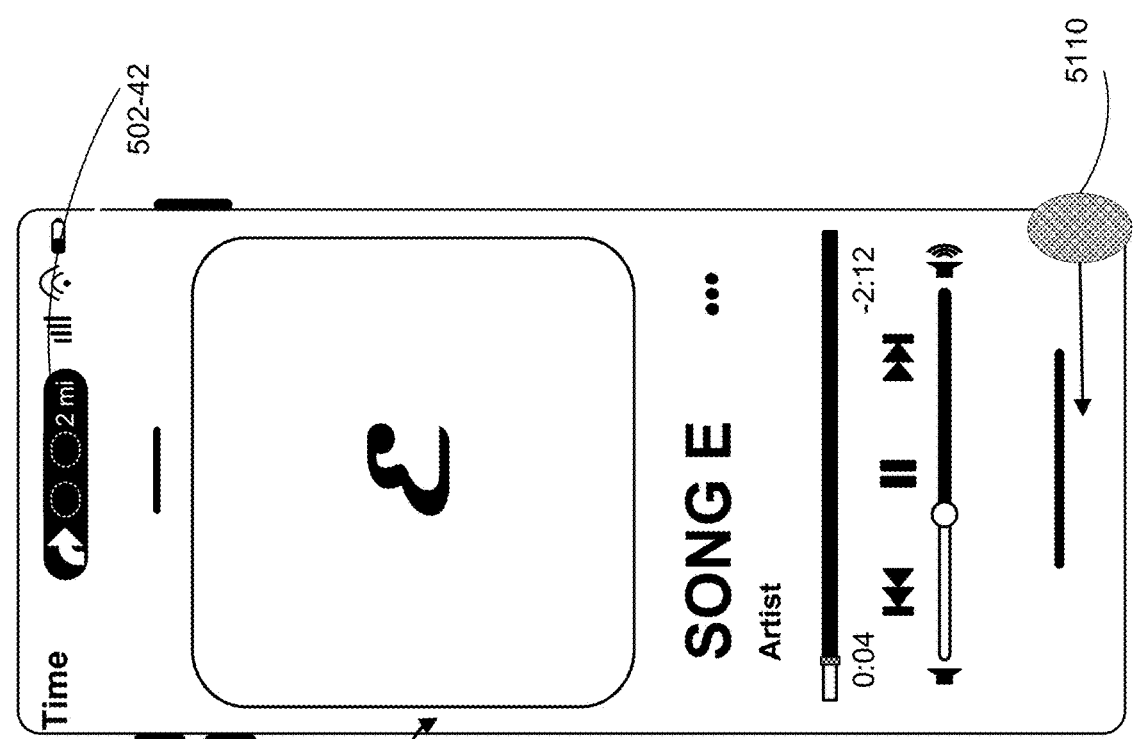
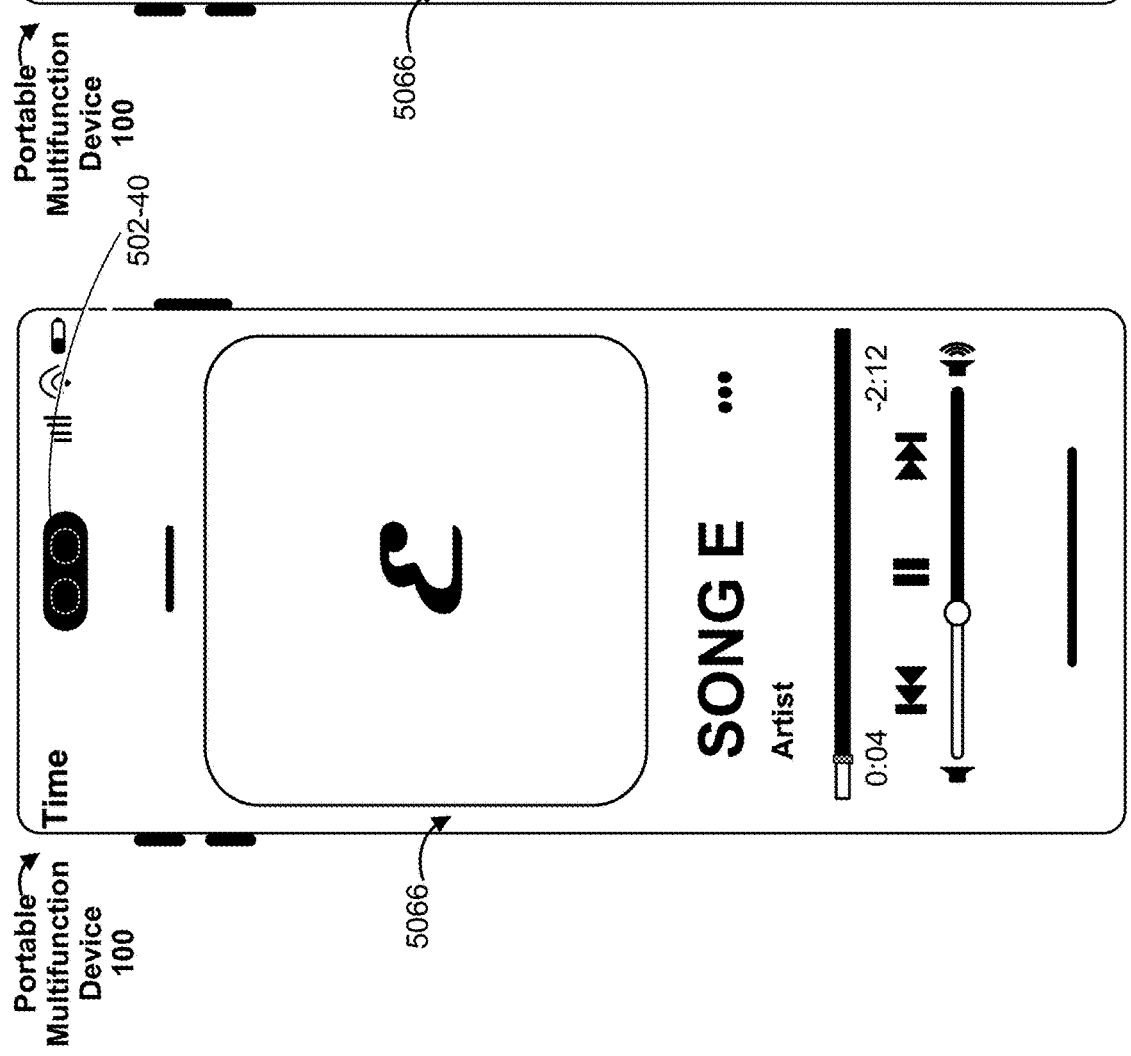

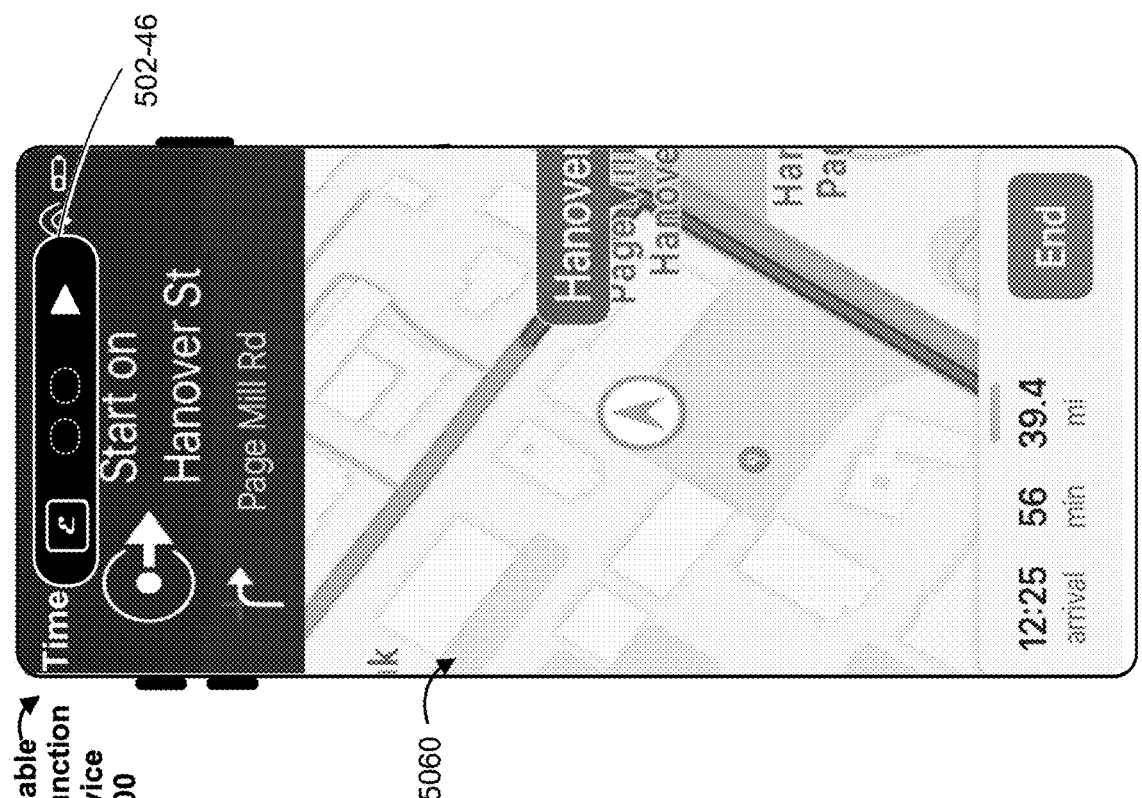
Figure 5BS7
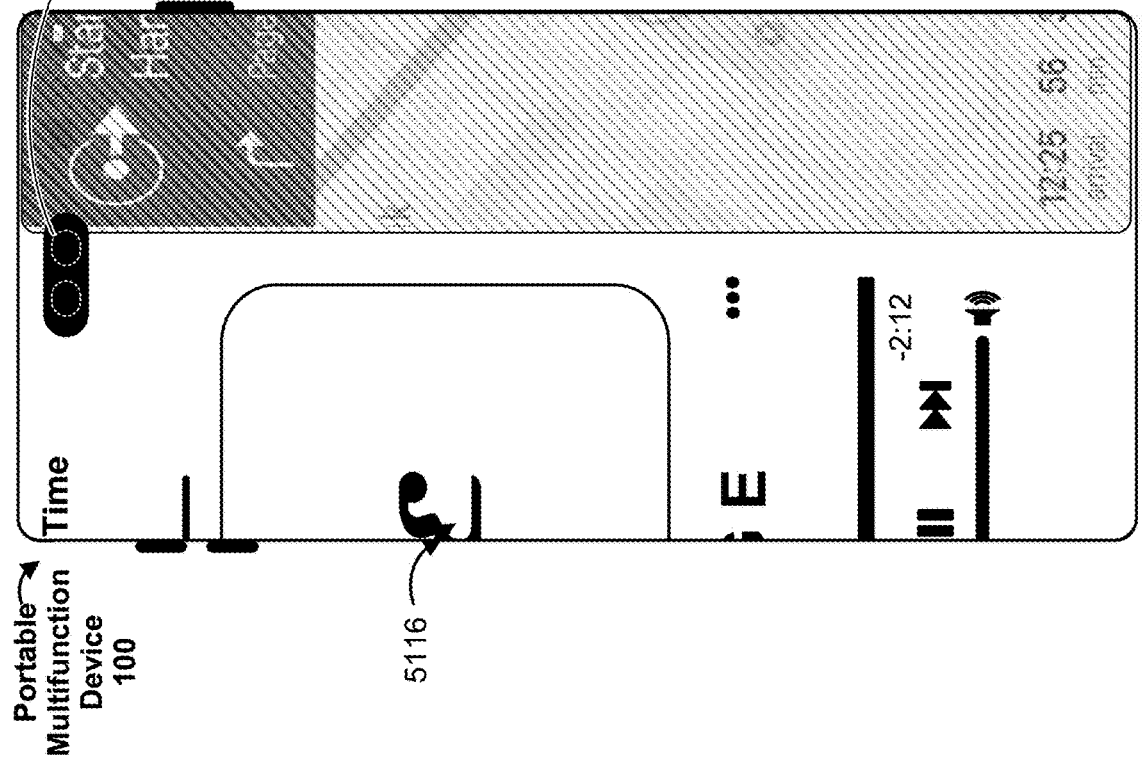
Figure 5BS6

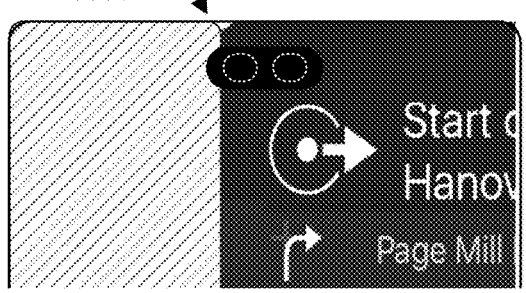
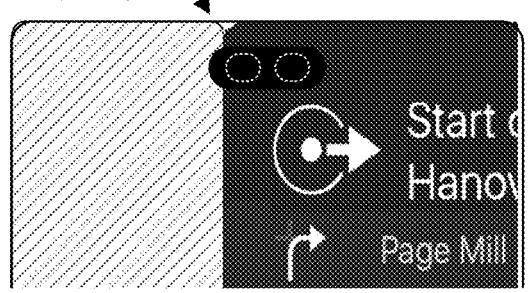
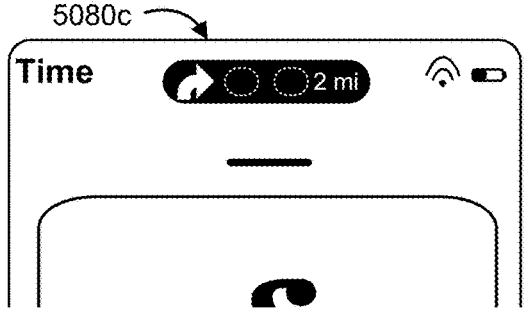
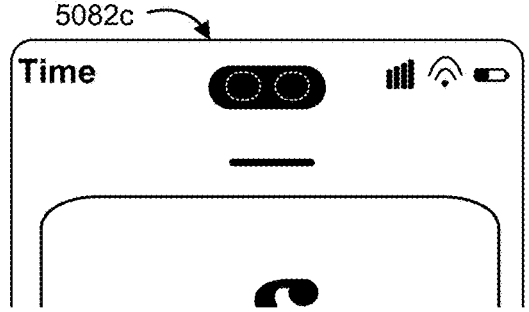
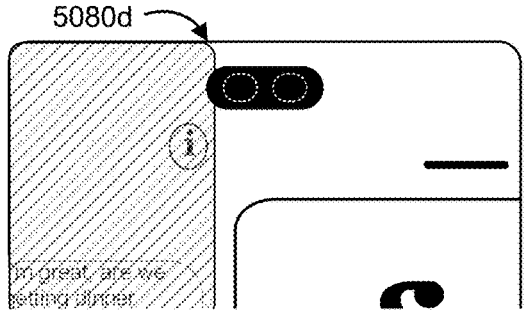
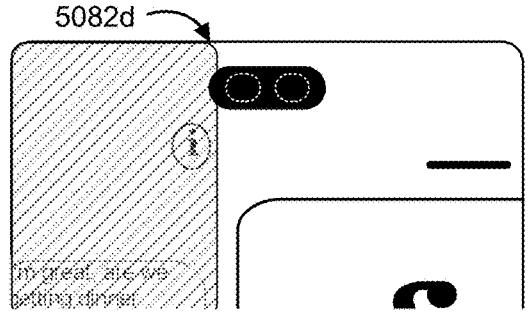
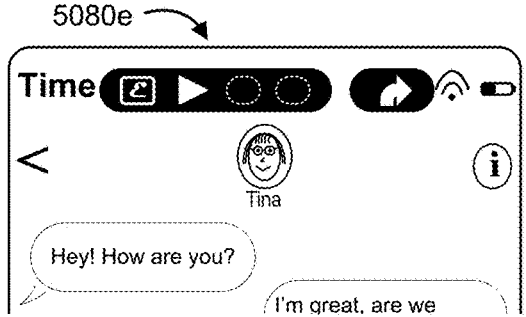
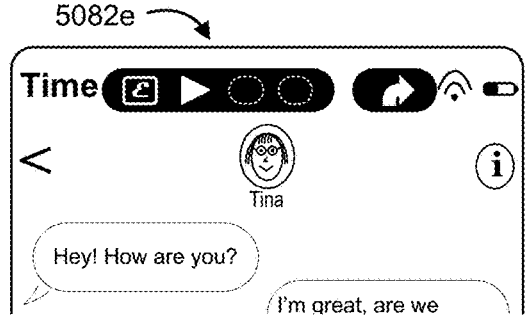
slower
faster
Figure 5BT
Figure 5BU

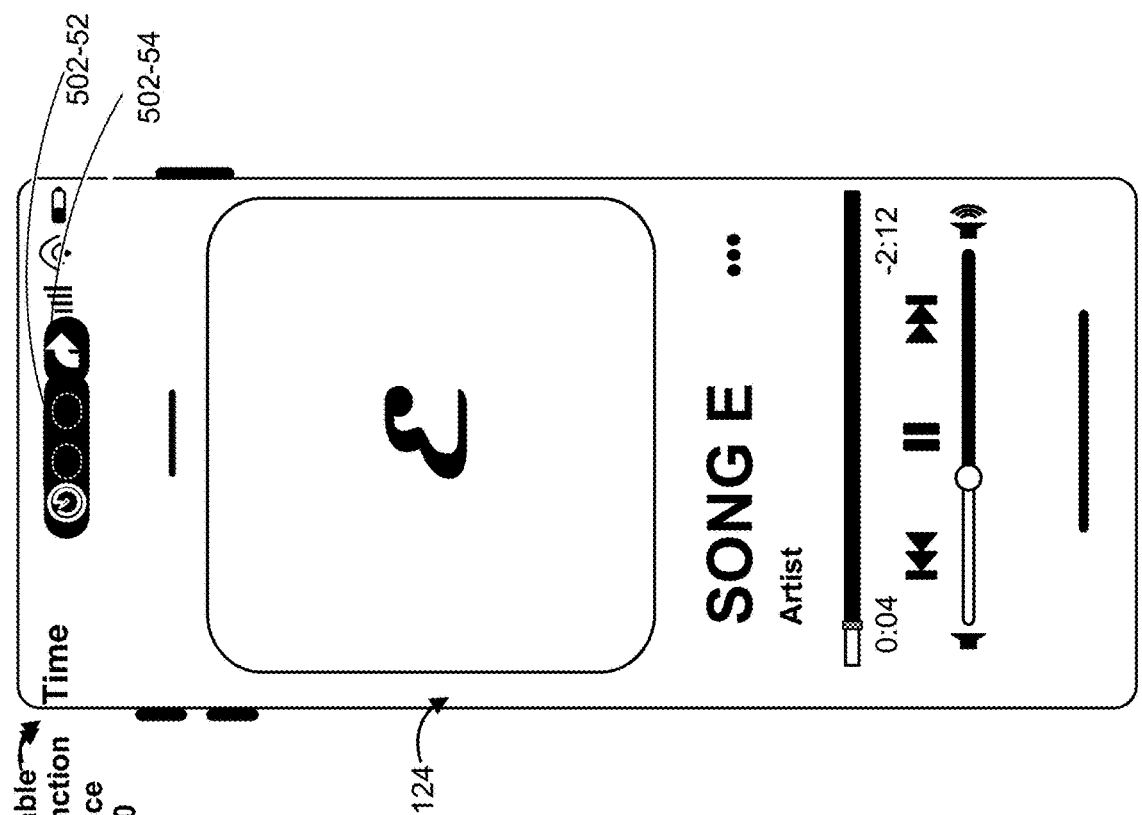
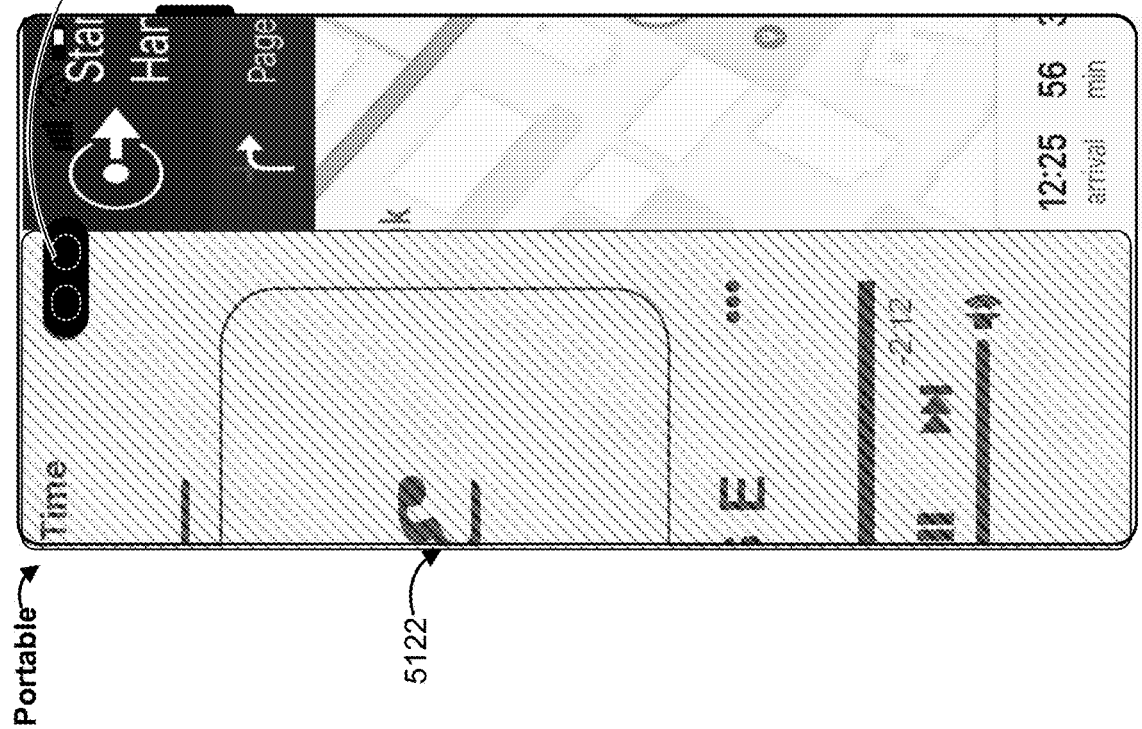
Figure 5BY
Figure 5BX

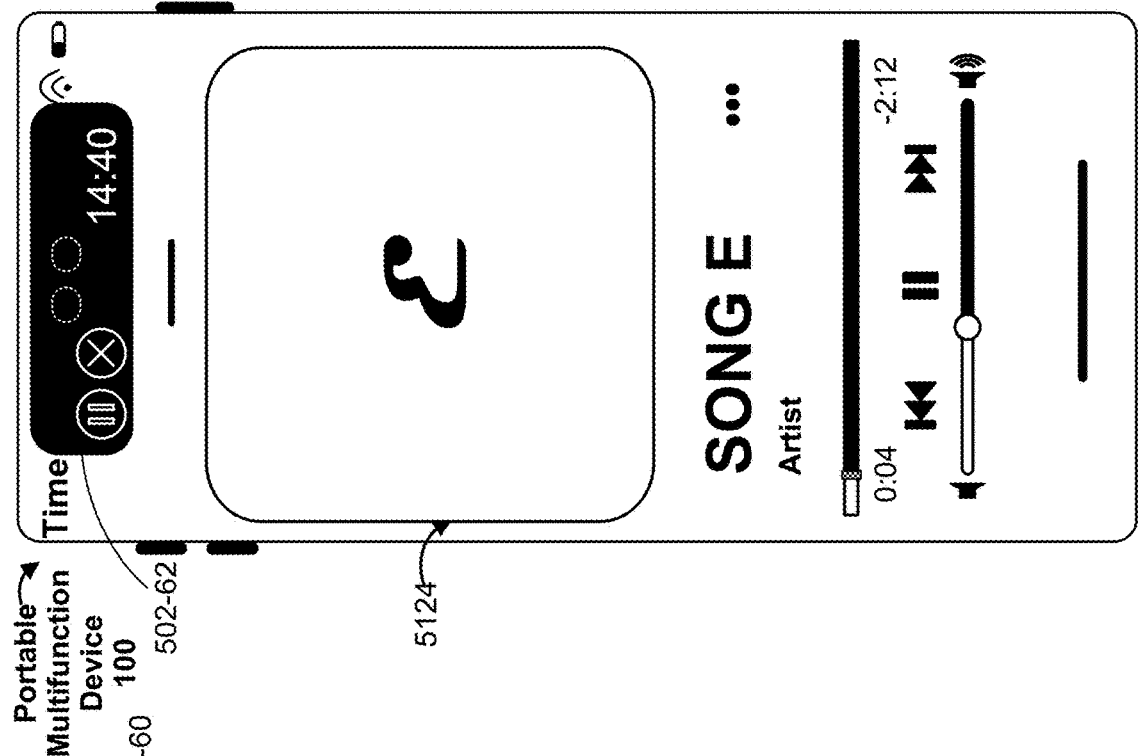
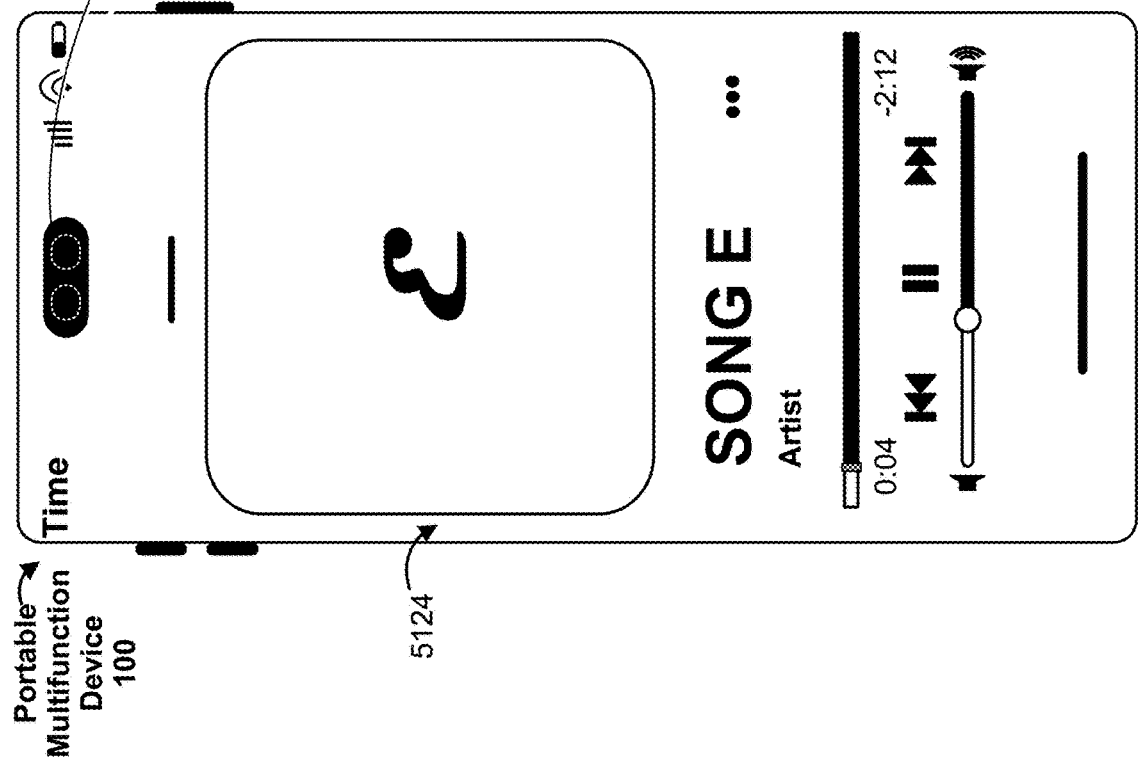
Figure 5CB
Figure 5CC

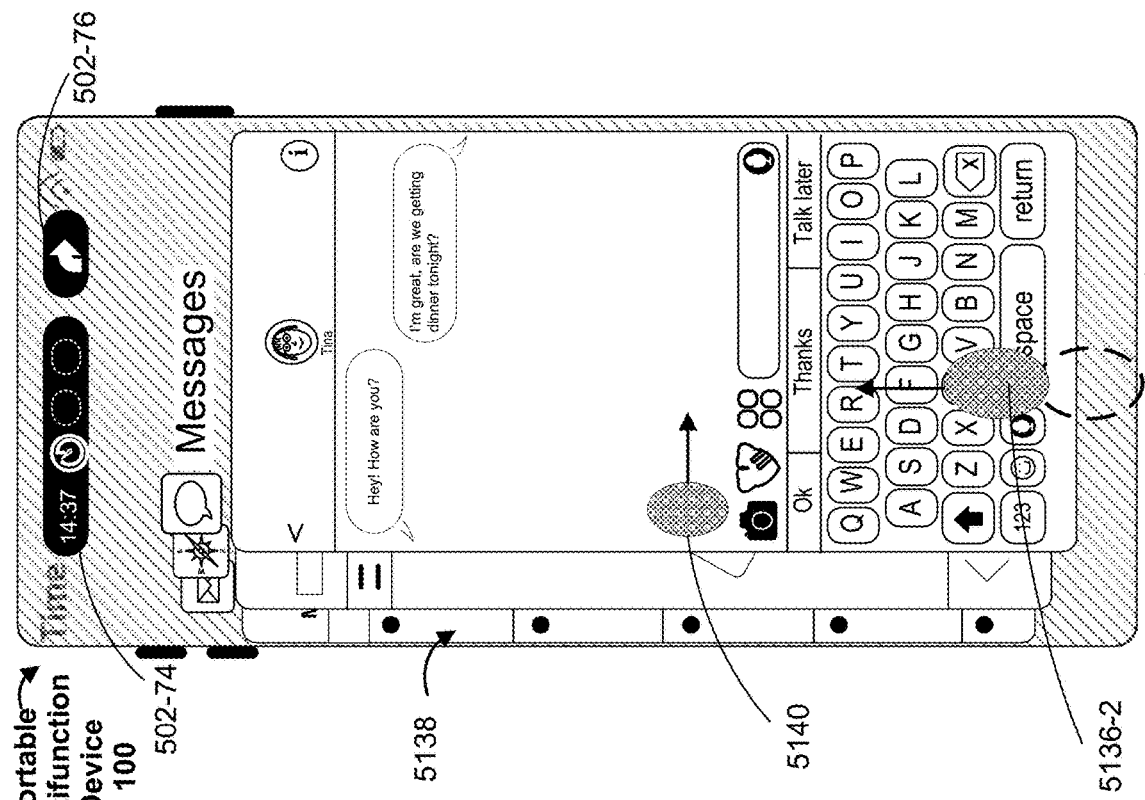
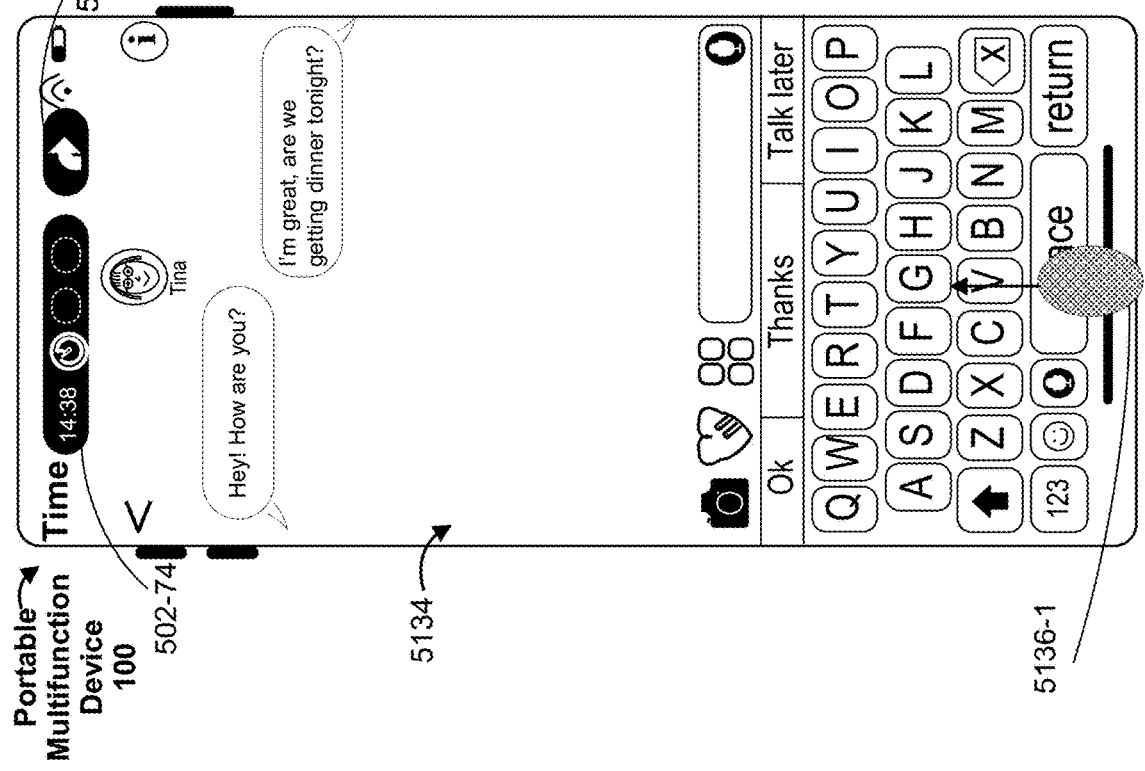

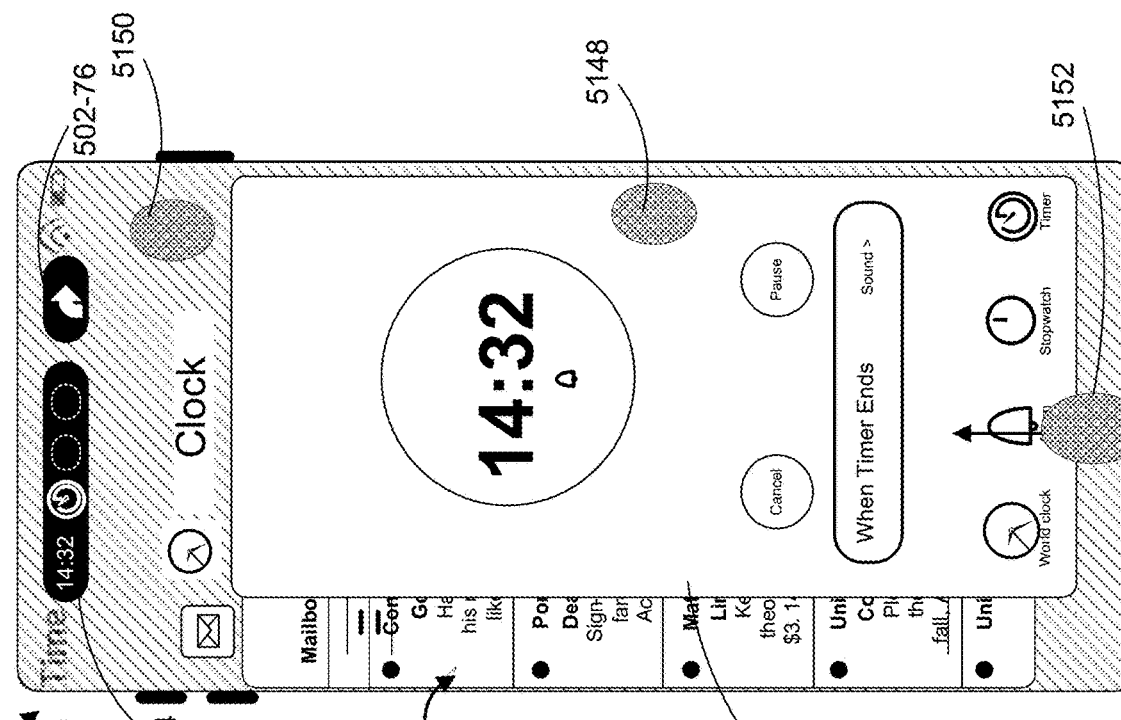
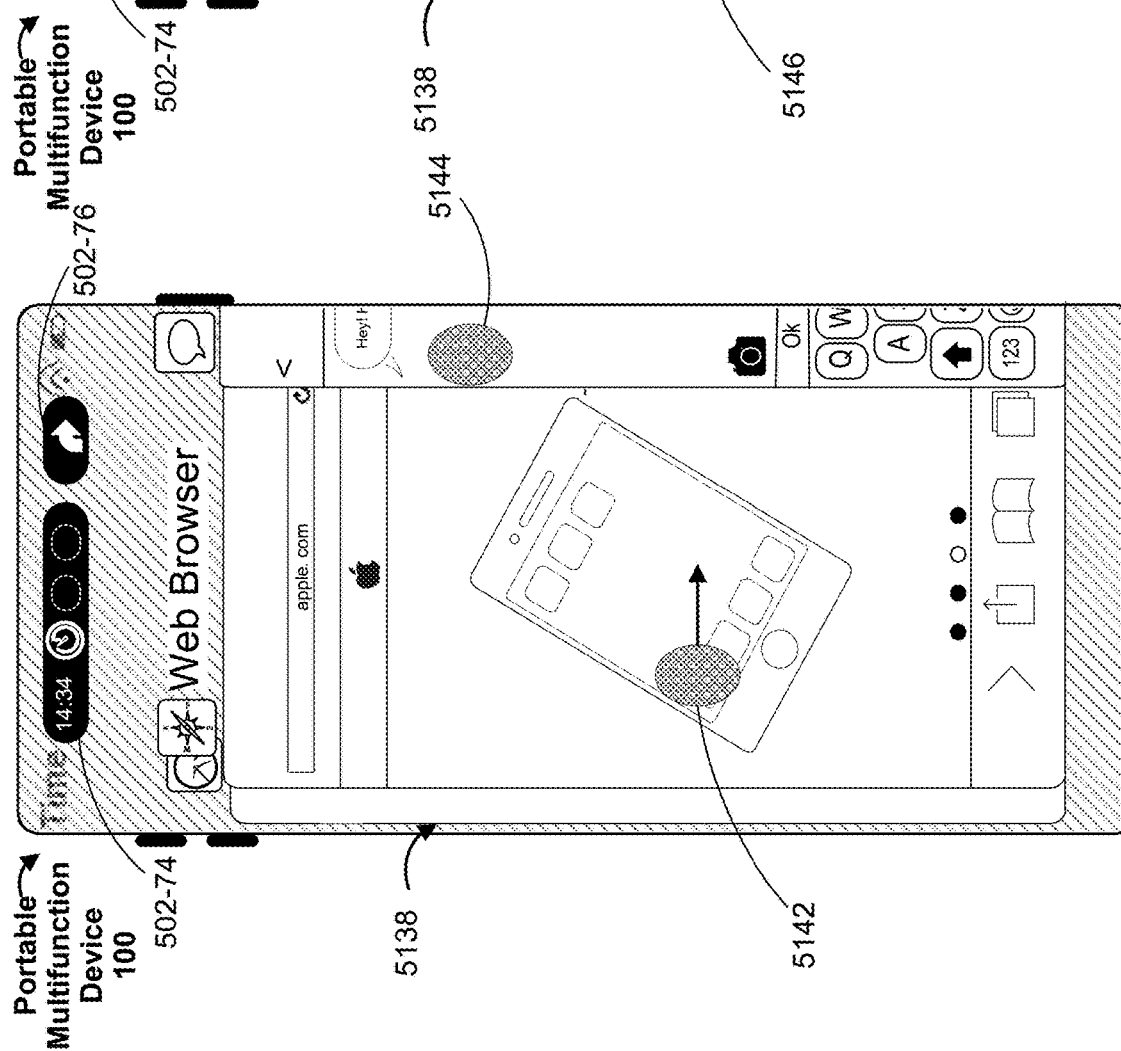

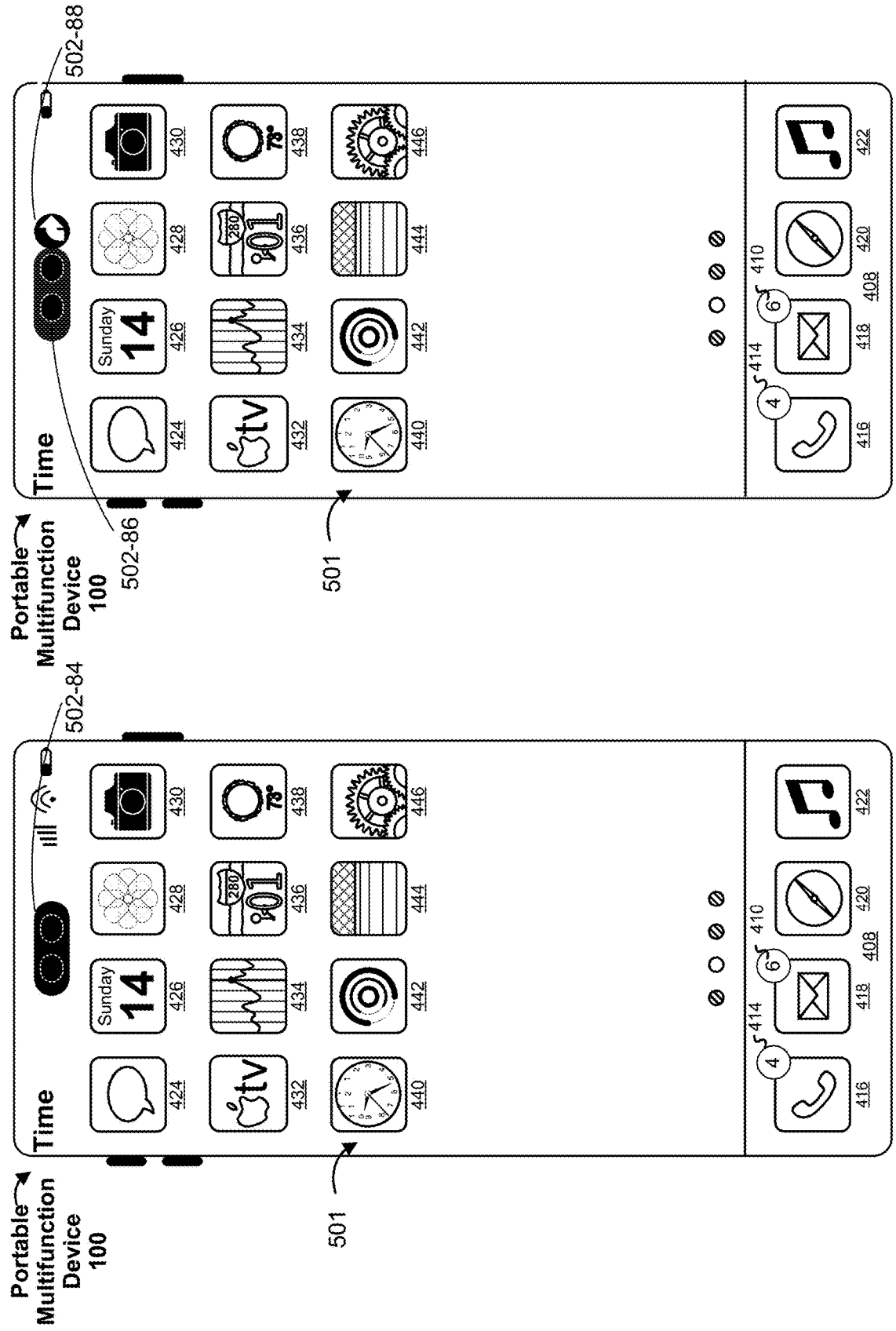

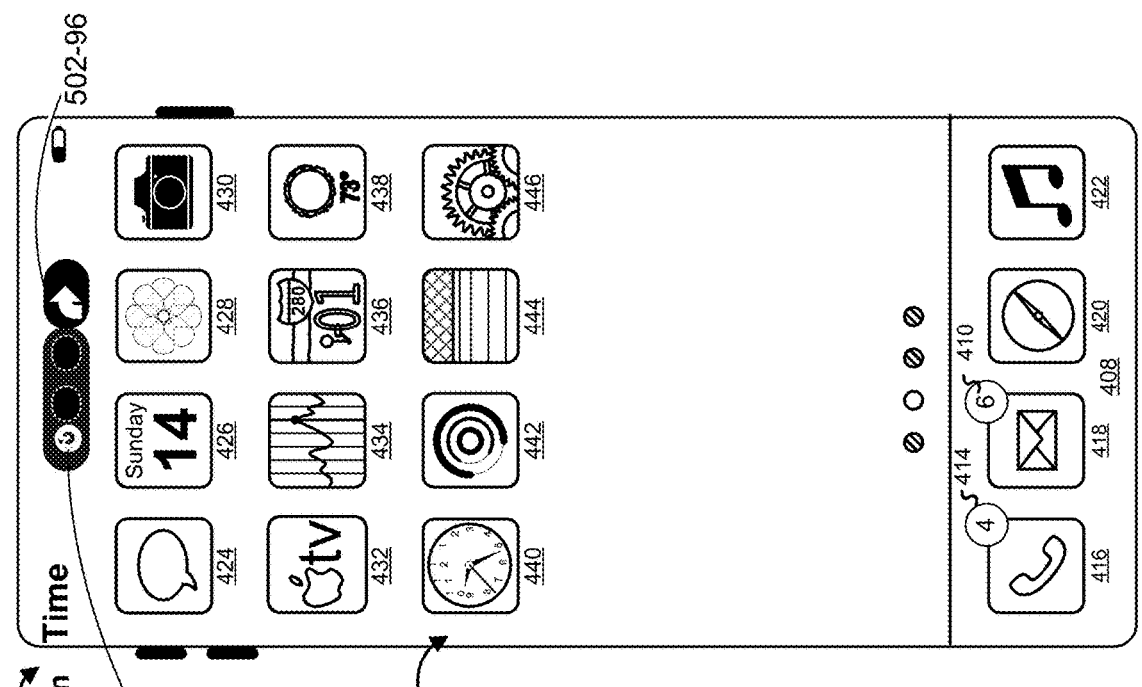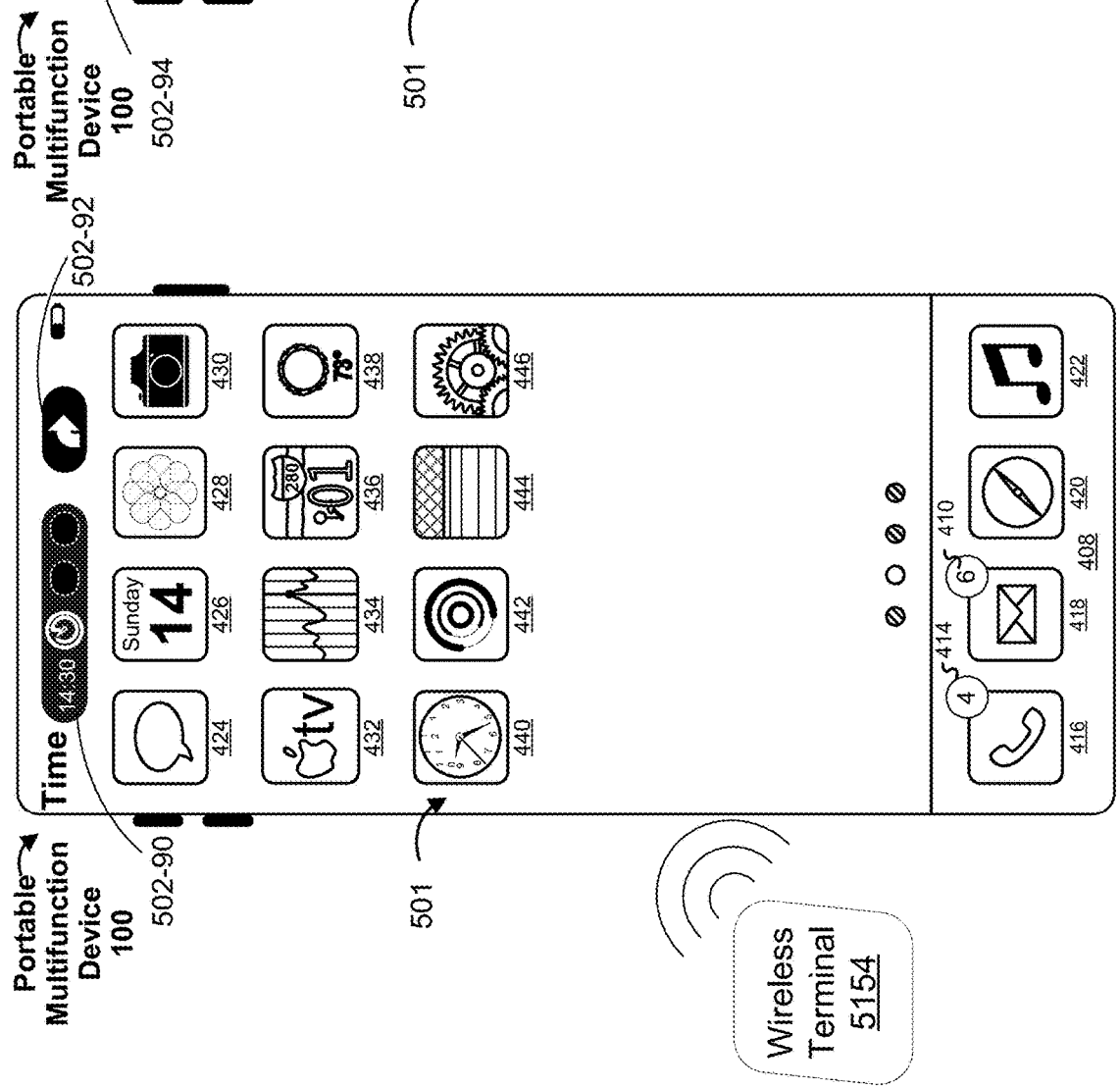

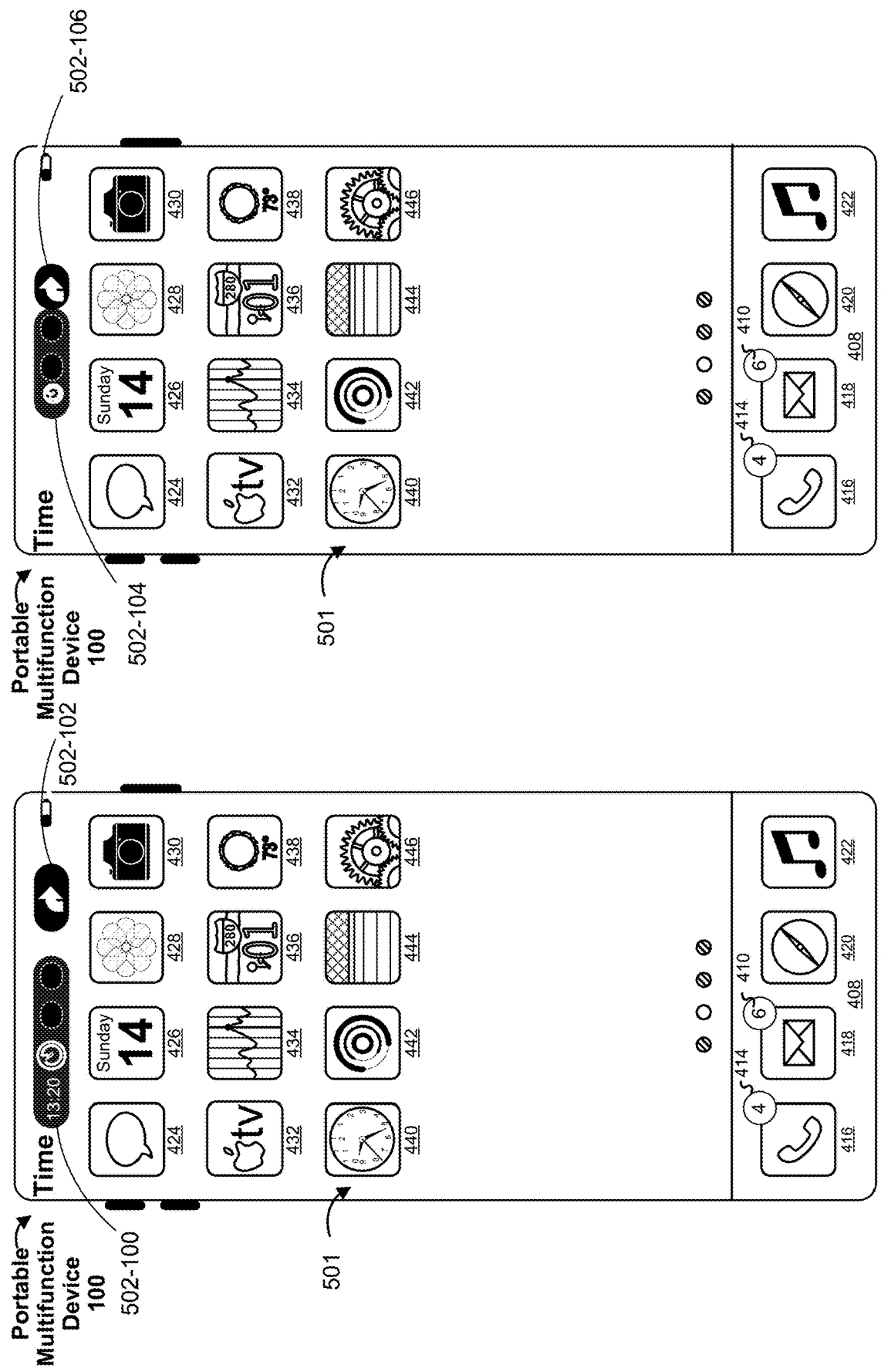

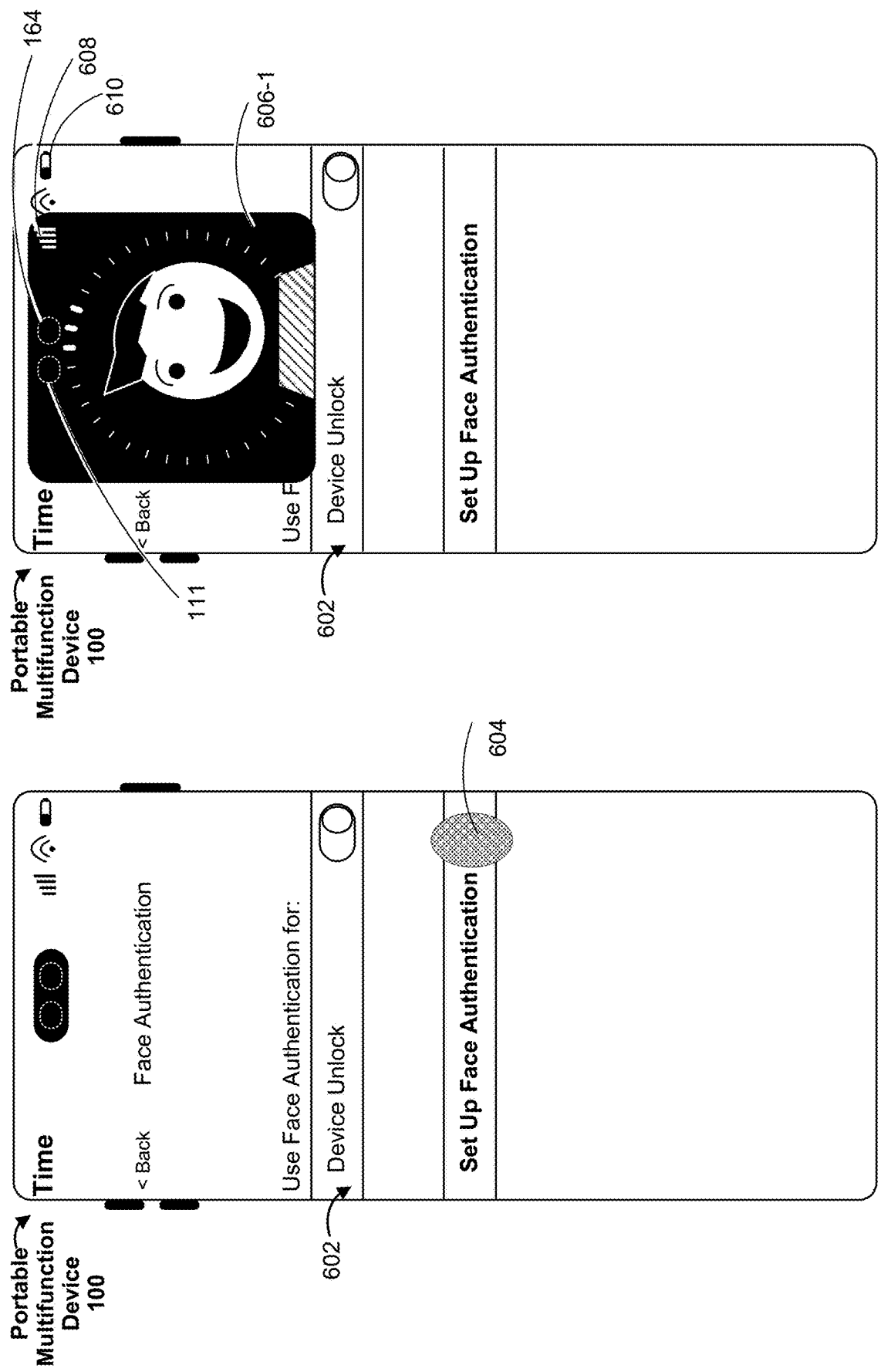

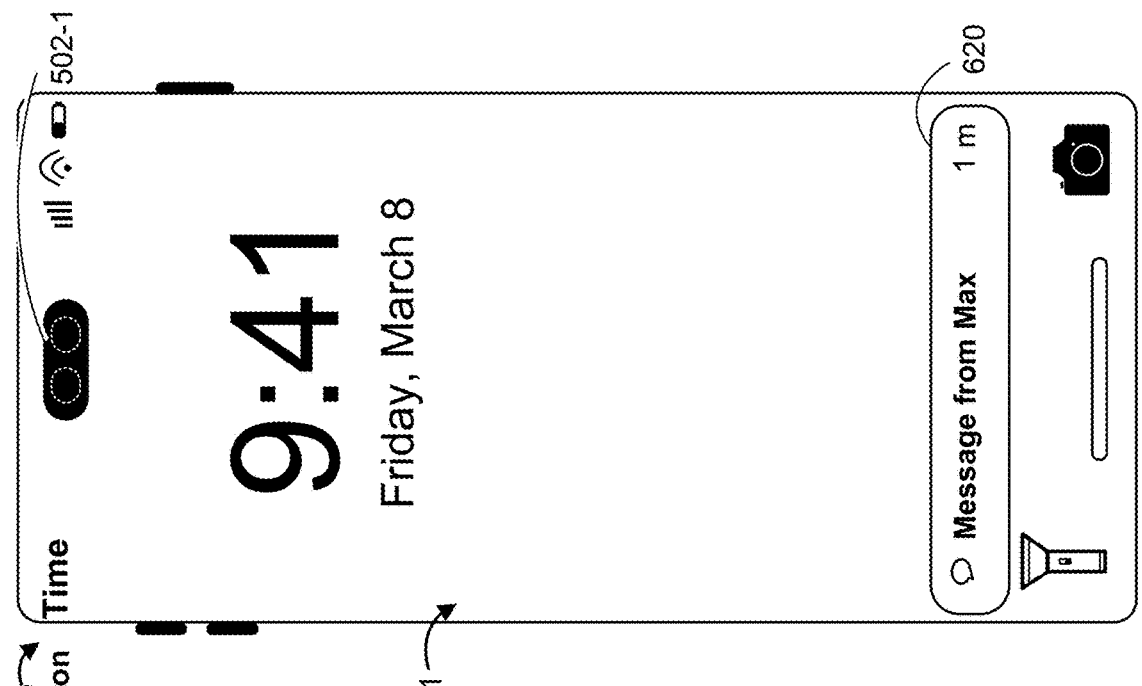
Figure 6E1
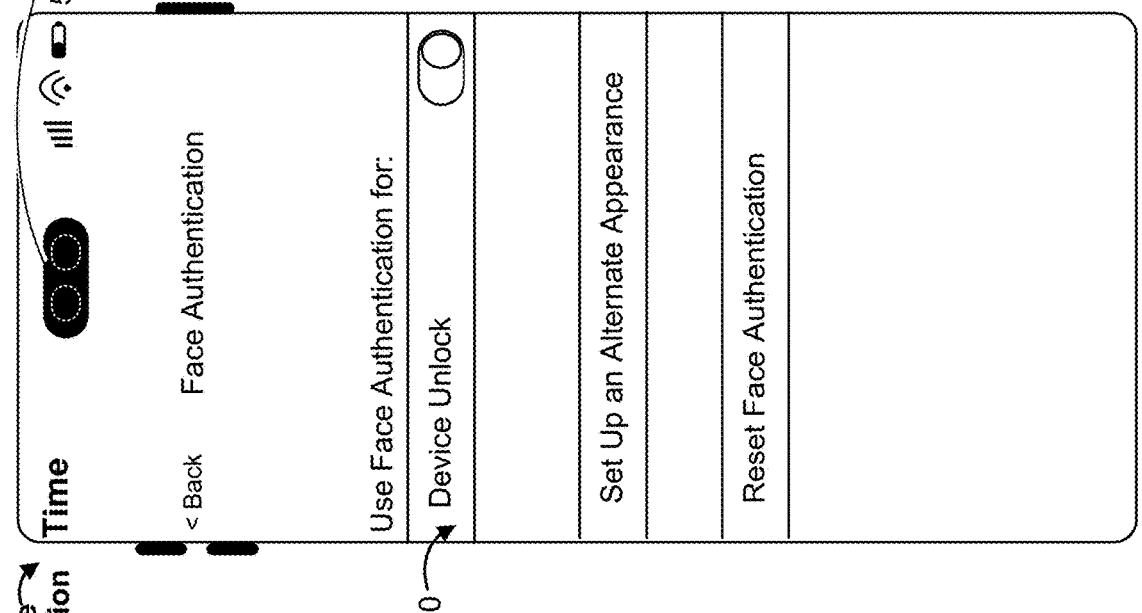
Figure 6E2

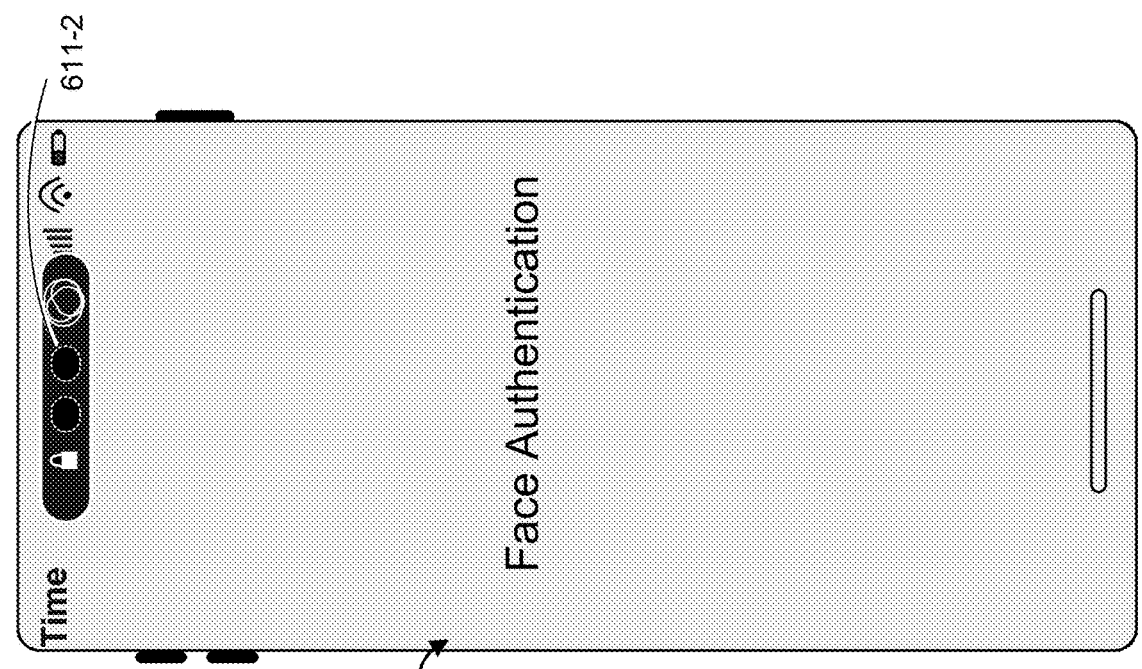
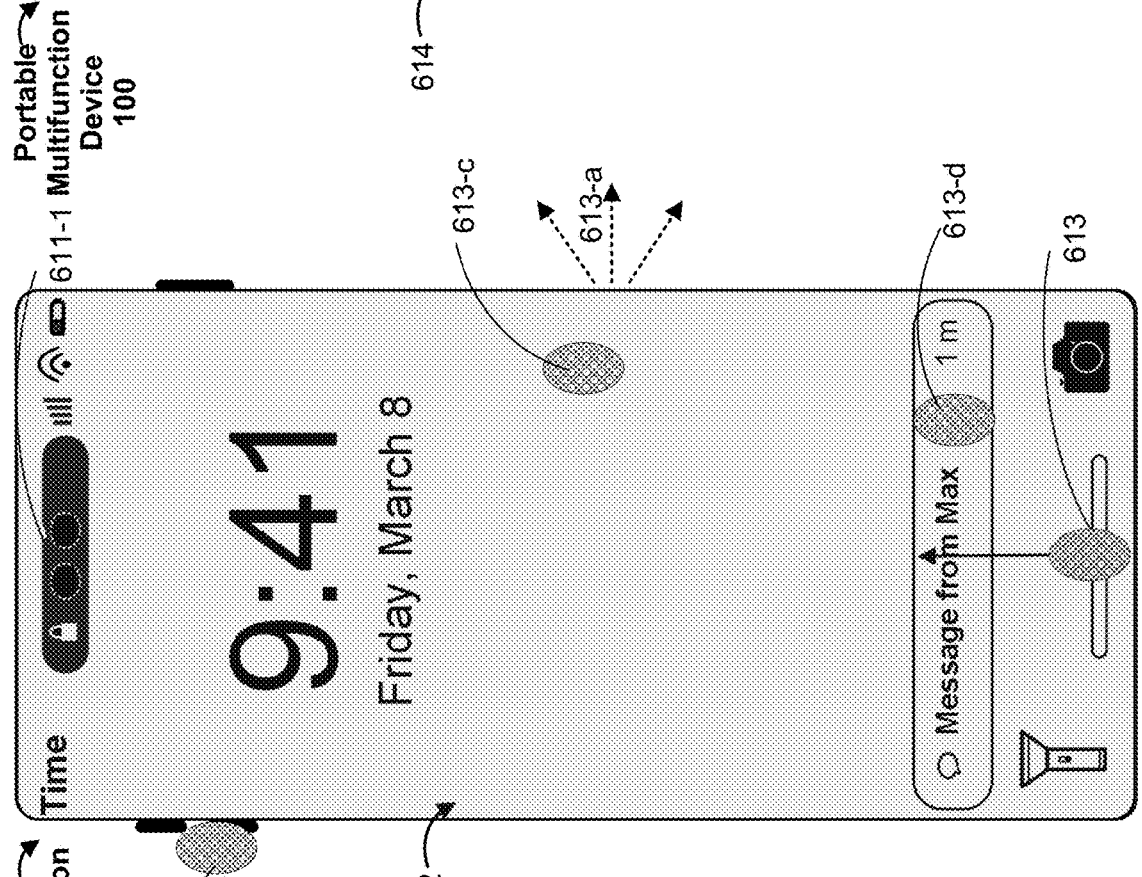

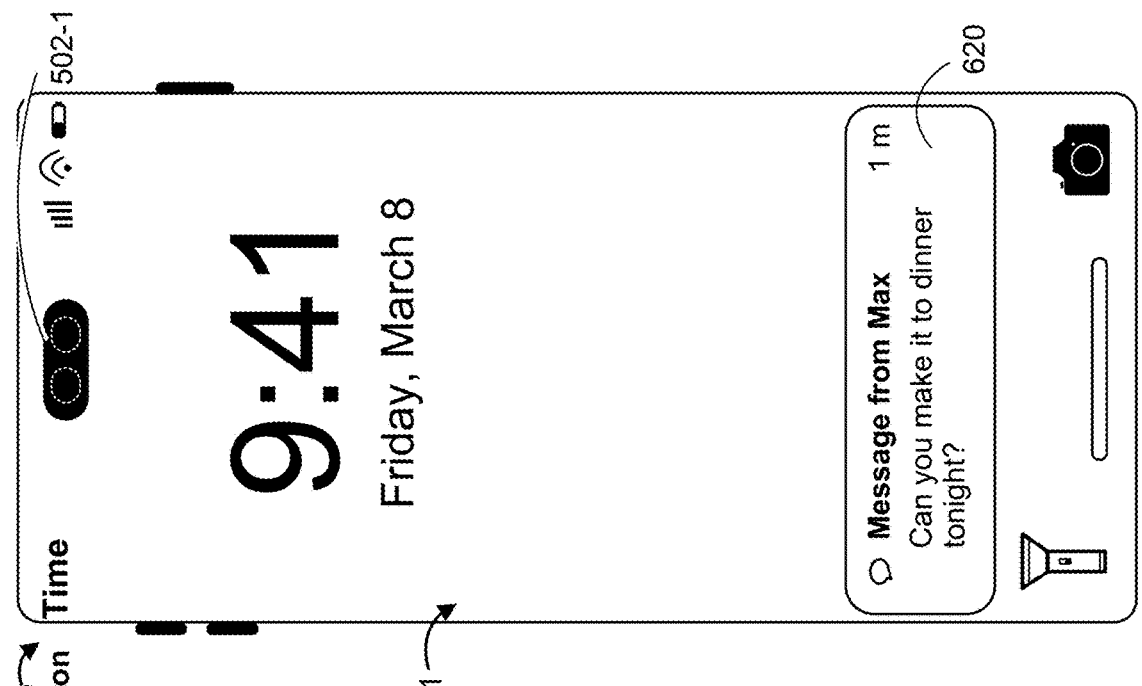
Figure 6G2
Figure 6G1

Figure 7B1

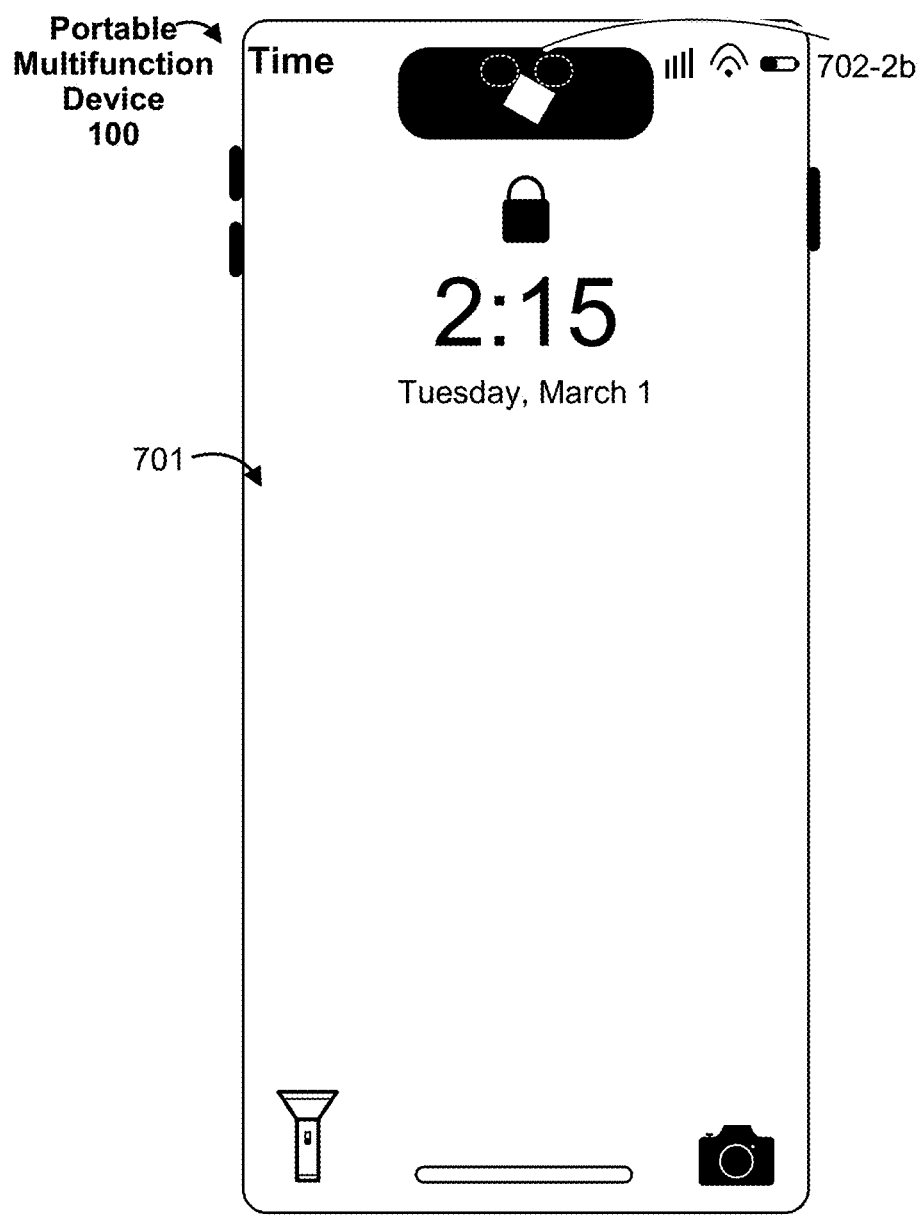
Figure 7B2

9000

9020 The status information includes information associated with an accessory connection.

9022 The status information includes information associated with an ongoing timer.

9024 The status information includes information associated with media playback.

9026 The status information includes information associated with sharing media content via a wireless communication channel.

9028 The status information includes information associated with a virtual assistant.

9030 The status information includes information associated with biometric authentication.

9032 The status information includes information associated with a workout activity.

9034 The status information includes information associated with an ongoing event that has periodic updates.

9036 The status information includes navigation instructions.

9038 The status information includes an indication of a battery level of the computer system.

9040 The status information includes an indication of the computer system participating in one or more hotspot connections

9042 Display, in a third display region of the display area, wherein the third display region is between a first sensor region of the one or more sensor regions and a second sensor region of the one or more sensor regions, a second user interface object that includes second status information.

9044 The second status information includes a privacy indicator that is displayed in accordance with a determination that a microphone or a camera of the computer system is currently collecting data.

9046 The second status information includes a lock icon representing a lock state of the computer system.

9048 The third display region of the display area is displayed with a background color that encompasses the second user interface object.

9050 The second status information is displayed in the second user interface object in the third display region while the first user interface object is displayed in a first state. While the first user interface object is displayed in a second state, move the second user interface object including the second status information to a fourth display region that is outside of the first display region.

9052 Update display of the first user interface object to display of a third user interface object, wherein the third user interface object includes additional status information provided by the respective software than the status information that is included in the first user interface object.

9054 The first user interface object is updated to the third user interface object in response to detection of an event associated with the respective software.

9056 The first user interface object is updated to the third user interface object in response to detection of the computer system being located within a predefined proximity of a wireless terminal.

9058 The first user interface object is updated to the third user interface object in response to detecting a first type of user input.

9060 In accordance with a determination that the first user interface object is updated to the third user interface object in response to detecting the first type of user input, provide non-visual feedback to the user.

9078 While the first type of user input is ongoing:
display the third user interface object; and
detect an end of the first type of user input at a respective portion of
the third user interface object that corresponds to a respective
control; and
in response to detecting the end of the first type of user input:
    in accordance with a determination that the end of the first
type of user input is at a portion of the third user interface object
that corresponds to a first control, perform a first operation
corresponding to the first control; and
    in accordance with a determination that the end of the first
type of user input is at a portion of the third user interface object
that corresponds to a second control, perform a second operation,
distinct from the first operation, corresponding to the second
control.

9080 In response to detecting a user input that overlaps with at least a portion of the first display region:
in accordance with a determination that an active session is displayed in the first display region and in accordance with a determination that the user input is a third type of user input, update display of the first user interface object to display the third user interface object;
in accordance with a determination that an active session is displayed in the first display region and in accordance with a determination that the user input is a fourth type of user input, display a user interface associated with the application for the active session; and
in accordance with a determination that there is not an active session displayed in the first display region, display a fourth user interface object in the first region.

9082 In response to detecting a user input in the first display region corresponding to a respective user interface object that includes status information provided by respective software, display an application user interface for the respective software in the second display region of the display generation component.

9083 In accordance with a determination that the computer system is in a first orientation display the first user interface object in the first display region that encompasses the one or more sensor regions.
In accordance with a determination that the computer system is in a second orientation, display the first user interface object in a portion of the first display region that is distinct from a portion of the first display region that encompasses the one or more sensor regions.

9084 While displaying the third user interface object, in accordance with a determination that a time threshold is satisfied, automatically contract the third user interface object and display the first user interface object.

9086 In response to detecting a user input outside of the first display region, automatically contract the third user interface object and display the first user interface object.

9088 While displaying the third user interface object, display a shadow proximate to the third user interface object, wherein the shadow overlaps content displayed in the second display region of the display generation component.

9090 Display a border that encompasses the first user interface object that is displayed in the first display region.

9092 Display the first user interface object with a background color that matches a color of the one or more sensors positioned within the one or more sensor regions; and
increase a size of the first user interface object, including expanding the background color outward from the one or more sensor regions.

9094 Display status information in the third user interface object, wherein the status information in the third user interface object includes visual elements that are selected so as to avoid overlapping locations of the one or more sensors in the first display region.

9096 Display an animation for a respective application, wherein displaying the animation includes:
initially displaying a fifth user interface object in a display area that is between the one or more sensor regions;
increasing a size of the fifth user interface object to a position that overlaps the one or more sensor regions, and
displaying the fifth user interface object in the second display region while decreasing a size of the first display region that encompasses the one or more sensor regions.

9098 Detect one or more user inputs that are provided on the one or more sensor regions.

9100 While the first display region does not include a user interface object, display in the second display region, one or more status indicators; and in accordance with a determination that the first user interface object is displayed in the first display region, cease to display at least one of the one or more status indicators.

9102 Determine whether a first status indicator or a second status indicator corresponds to an active connection; and
in accordance with a determination that the first status indicator corresponds to the active connection and that the second status indicator does not correspond to the active connection:
   continue to display the first status indicator; and
   cease display of the second status indicator.

9104 In accordance with a determination that the first user interface object in the first display region is to increase in size, cease to display one or more additional status indicators of the one or more status indicators.

9106 The first user interface object is displayed with a background color that matches a color of the one or more sensors positioned within the one or more sensor regions.

9108 Detect a user input corresponding to a request to display a user interface for a respective application.

9110 In response to detecting the user input corresponding to the request to display a user interface for the respective application, display the user interface for the respective application in the second display region; and continue to display the first user interface object in the first display region, wherein the first user interface object includes updated status information.

9112 Detect a user input corresponding to a request to display a user interface for second respective software. In response to detecting the user input corresponding to the request to display a user interface for second respective software, display the user interface for the second respective software in the second display region; and continue to display the first user interface object in the first display region, wherein the first user interface object includes updated status information.

9114 In accordance with a determination that the respective software is providing status information for a first event and a second event, switch display of the status information for the first event to display of the status information for the second event in the first user interface object displayed in the first display region.

1018 The second user interface that is associated with respective software that is different from the respective application comprises a user interface of a second application executing on the computer system.

1020 The status region encompasses one or more sensors of the computer system.

1022 The first user interface comprises a lock screen user interface, and detecting the user input corresponding to a request to dismiss the first user interface comprises detecting a gesture corresponding to a request to dismiss the lock screen user interface.

1024 While detecting the gesture corresponding to a request to dismiss the lock screen user interface, display the first user interface as moving in a direction of the gesture

1026 The gesture is a swipe gesture.

1028 The swipe gesture is initiated at an edge of the display generation component.

1030 In response to detecting the user input corresponding to the request to dismiss the first user interface, animate the first user interface that includes the user interface of the respective application as being displayed under the status region.

1032 Animating the first user interface further includes shrinking the first user interface to a size that corresponds to the status region.

1034 Shrinking the first user interface to a size that corresponds to the status region comprises:
shrinking the first user interface to display a downscaled version of the first user interface;
shifting the downscaled version of the first user interface upward, and after shifting the downscaled version of the first user interface upward, further shrinking the downscaled version of the first user interface to the size that corresponds to the status region.

1036 Increase a size of the status region in a first direction, wherein the first direction is a same direction as the animation.

1038 Increase a size of the status region in a perpendicular direction, wherein the indication of a current state of the respective application is displayed in the status region while the size of the status region is increased.

1040 The status region is a predefined region of the display area.

1042 The status region is displayed at a predefined region of the display area while displaying a user interface for a first application or a user interface for a second application.

---

1044 Detect a user input corresponding to a request to navigate to a respective user interface associated with the respective application; and
in response to the user input corresponding to a request to navigate to the respective user interface:
cease to display the indication of a current state of the respective application in the status region; and
display the respective user interface in the display area outside of the status region, including displaying, in the respective user interface, a user interface of the respective application.

1046 Detect a user input corresponding to a request to navigate to a wake screen user interface; and
in response to the user input corresponding to a request to navigate to the wake screen user interface, ceasing to display the indication of a current state of the respective application in the status region.

1048 In response to detecting the user input corresponding to a request to navigate to the respective user interface, animating a transition between displaying the indication of a current state of the respective application in the status region and displaying the respective user interface in the display area outside of the status region.

1050 In response to detecting the user input corresponding to a request to navigate to the respective user interface, in accordance with a determination that an indication of a current state of a second application is displayed in the status region, continue to display a current state of the second application in the status region while displaying the user interface of the respective application in the second display region.

1052 Detect a user input corresponding to a request to navigate to a second application; and
in response to detecting the user input corresponding to a request to navigate to the second application, in accordance with a determination that an indication of a current state of the second application is displayed in the status region, animate a transition between displaying the indication of a current state of the second application in the status region and displaying a representation of the second application in the display area outside of the status region.

1054 Display an indication of an alert, including initially displaying the indication of the alert at a portion of the display region that is at least partially occluded by the status region;
animate the indication of the alert as moving from a top of the status region to below the status region; and
display the indication of the alert at a portion of the display region that is adjacent to the status region.

1056 Animating the indication of the alert includes increasing a size of the indication of the alert.

1058 Animating the indication of the alert includes changing a visual property of the indication of the alert.

1060 The respective application is a first software application executing on the computer system, and the indication of a current state of the first software application is displayed in the status region while the status region is associated with an active session of the first software application.

After the status region ceases to be associated with the active session of the first software application, detect one or more user inputs corresponding to a request to associate the status region with an active session of a second software application executing on the computer system, wherein the second software application is different from the first software application; and
in response detecting the one or more user inputs corresponding to the request to associate the status region with an active session of the second software application, while a state of the second software application continues to change, display in the status region an indication of a current state of the second software application.

1114 One or more sensors are encompassed within the status region.

1116 While displaying the second user interface in the application user interface region, detect a user input corresponding to a request to display a third user interface in the application user interface region;
in response to detecting the user input corresponding to the request to display the third user interface in the application user interface region, and in accordance with a determination that the second user interface is associated with a third application that is different from the first application and from the respective software:
    maintain display of the status region; and
    display the third user interface of the third application in the application user interface region.

1118 In accordance with a determination that the status region is associated with an active session of a second application that is different from the first application, determine a priority of the first application and the second application, wherein the application with higher priority is displayed in the first portion of the status region.

1120 The second portion of the status region is displayed as a user interface element that is distinct from a user interface element for the first portion, wherein the user interface element for the second portion is displayed adjacent to the user interface element for the first portion of the status region.

1122 The second user interface displayed in the application user interface region is displayed between the user interface element for the second portion of the status region and the user interface element for the first portion of the status region.

1124 Detect a user input corresponding to a request to cease display of a fourth user interface for a fourth application that is displayed in the application user interface region;
in response to detecting the user input corresponding to the request to cease display of the fourth user interface in the application user interface region and in accordance with a determination that the status region is associated with an active session of a first application and an active session of a second application that is different from the first application:
    cease to display the fourth user interface in the application user interface region; and
    replace display of the second indication of a current state of the second application with a third indication of a current state of the fourth application in the second portion of the status region.

1126 Replacing display of the second indication of a current state of the second application with the third indication of a current state of the fourth application in the second portion of the status region is performed in accordance with a determination that the fourth application is associated with a higher priority than the second application.

1128 Detect a user input corresponding to a request to display a fifth user interface; and in response to detecting the user input corresponding to a request to display the fifth user interface, display, outside of the status region, an indication of a current state of a respective application in the fifth user interface.

---

1130 In response to detecting the user input corresponding to a request to display a fifth user interface, concurrently display, outside of the status region, the indication of a current state of the respective application and an indication of a current state of a second respective application in the fifth user interface.

---

1132 In accordance with a determination that one or more indications of respective current states of respective applications are displayed in the status region, continue to display at least one indication of the one or more indications of respective current states of respective applications in the status region while displaying the fifth user interface.

---

1134 Detect a user input of a first type directed to the status region; and in response to detecting the user input of the first type directed to the status region:

in accordance with a determination that the user input corresponds to the first portion of the status region that is displaying the first indication of the current state of the first application, display the first user interface of the first application in the application user interface region;

in accordance with a determination that the user input corresponds to the second portion of the status region that is displaying the second indication of the current state of the second application, display the second user interface of the second application in the application user interface region.

---

1136 Detect a user input of a second type directed to the status region; and in response to detecting the input of the second type directed to the status region:

in accordance with a determination that the user input corresponds to the first portion of the status region that is displaying the first indication of the current state of the first application, expand the first portion of the status region;

in accordance with a determination that the user input corresponds to the second portion of the status region that is displaying the second indication of the current state of the second application, expand the second portion of the status region.

1138 While displaying, in the first portion of the status region, the first indication of a current state of the first application, detect a user input corresponding to a request to display a user interface for the first application; and
in response to detecting the user input corresponding to a request to display the first user interface for the first application:
    cease to display the first indication of a current state of the first application in the first portion of the status region; and
    display the user interface for the first application in the application user interface region.

1140 While displaying the user interface for the first application in the application user interface region, detect a user input corresponding to a request to display a user interface for the second application;
in response to detecting the user input corresponding to a request to display the user interface for the second application:
    display the first indication of a current state of the first application in the first portion of the status region;
    cease to display the second indication of the current state of the second application in the status region; and
    display the user interface for the second application in the application user interface region.

1142 In response to detecting the user input corresponding to a request to display the user interface for the first application, replace display of the first indication of a current state of the first application in the first portion of the status region with display of a fourth indication of a current state of a fifth application, including updating the displayed fourth indication as the state of the fifth application changes.

1144 Detect a user input corresponding to a request to cease display of a user interface for a sixth application that is displayed in the application user interface region; and
in response to detecting the user input corresponding to the request to cease display of the user interface in the application user interface region and in accordance with a determination that the status region is associated with active sessions of two or more applications, display, in a third portion of the status region that is different from the first portion and the second portion, a fifth indication of a current state of the sixth application.

1146 A size of the application user interface region is more than twice a size of the status region.

1148 The first portion of the status region is displayed with a colored outline of a first color; and the second portion of the status region is displayed with a colored outline of a second color that is distinct from the first color.

1222 Providing the feedback associated with the user input includes expanding the status region. In accordance with a determination that a first threshold amount of time has elapsed since detecting an end of the user input corresponding to the status region, contract the status region.

1224 Detecting the end of the user input includes detecting liftoff of a contact that was part of the input from a touch-sensitive surface.

1226 Providing the feedback associated with the user input includes expanding the status region. While continuing to detect the user input corresponding to the status region, in accordance with a determination that the user input has been maintained with respect to the status region for a second threshold amount of time, contract the status region.

1228 Providing the feedback associated with the user input includes, in accordance with a determination that the user input is maintained with respect to the status region for a third threshold amount of time while the status region is not associated with an active session of a respective application, generating a first tactile output.

1230 The operation associated with the respective application is performed in accordance with a determination that the user input is maintained with respect to the status region for the third threshold amount of time while the status region is associated with an active session of a respective application, and performing the operation associated with the respective application includes expanding the status region and displaying, in the expanded status region, information about the respective application without generating the first tactile output.

1232 While continuing to detect the user input corresponding to the status region for the third threshold amount of time:
 in accordance with a determination that the user input is maintained with respect to the status region for a fourth threshold amount of time, contract the status region.

1234 While a user input corresponding to the status region is not being detected: in accordance with a determination that the status region is associated with an active session of a respective application:
    display in the status region information about the respective application, and displaying an animation of the status region that includes changing a size of the status region followed by reversing at least a portion of the change in size of the status region.

1236 While a user input corresponding to the status region is not being detected:
in accordance with a determination that the status region is not associated with an active session of a respective application, maintain the size of the status region.

1238 Display the animation of the status region without regard to whether the status region is displayed in a first mode in which the status region includes a first amount of information about the respective application or displayed in a second mode in which the status region is expanded and includes a second amount of information about the respective application, wherein the second amount of information is greater than the first amount of information.

1240 The animation of the status region is displayed while the status region is displayed in a first mode in which the status region includes a first amount of information about the respective application. While a user input corresponding to the status region is not being detected:
in accordance with the determination that the status region is associated with an active session of a respective application:
    while the status region is displayed in a second mode in which the status region is expanded and includes a second amount of information about the respective application that is less than the first amount of information, animate the status region less than when the status region is displayed in the first mode.

1242 In accordance with the determination that the status region is associated with the active session of the respective application:
    in accordance with a determination that the active session is a first type of session, the animation of the status region changes the size of the status region at a first rate of change; and
    in accordance with a determination that the status region is a second type of session, the animation of the status region changes the size of the status region at a second rate of change that is different from the first rate of change.

1244 Displaying the information about the respective application includes displaying one or more user interface elements associated with the respective application, and the animation of the status region changes the size of the status region at a rate that corresponds to respective rates of change in size of the displayed one or more user interface elements associated with the respective application.

1246 The animation of the status region changes the size of the status region at a rate that is based on a degree of urgency of the information about the respective application that is displayed in the status region.

1248 While a user input corresponding to the status region is not being detected:
in accordance with a determination that the status region is associated with an active session of a respective application and the active session is a first type of session:
    display information about the respective application in the status region, and display an animation of the status region that includes changing a size of the status region followed by reversing at least a portion of the change in size of the status region; and
    in accordance with a determination that the status region is associated with the active session of the respective application and the active session is a second type of session, display the information about the respective application in the status region without displaying the animation of the status region.

1250 While a user input corresponding to the status region is not being detected: in accordance with a determination that the status region is associated with an active session of a first application and with an active session of a second application:

display, in a first portion of the status region, information about the first application, and display a first animation of the first portion of the status region that includes changing a size of the first portion of the status region followed by reversing at least a portion of the change in size of the first portion of the status region;

display, in a second portion of the status region, information about the second application, and display a second animation of the second portion of the status region that includes changing a size of the second portion of the status region followed by reversing at least a portion of the change in size of the second portion of the status region.

1252 The first animation changes the size of the first portion of the status region in a different manner than the second animation changes the size of the second portion of the status region.

1320 The computer system is in communication with one or more cameras. Display, in the biometric enrollment user interface, a representation of a user of the computer system, wherein the representation of the user is captured via the one or more cameras.

1322 In accordance with a determination that the capturing of the biometric information about the biometric feature of the user is completed successfully, display, in the biometric enrollment user interface, an indication of successful capture of biometric information.

1324 Display, in the status region, an indication of whether the computer system is in a locked state or an unlocked state.

1326 Displaying, in the status region, the indication of whether the computer system is in the locked state or the unlocked state includes:
while the computer system is in the locked state, displaying, in the status region, an indication that the computer system is in the locked state; and
while the computer system is in the unlocked state:
  displaying, in the status region, an indication that the computer system is in the unlocked state for a threshold amount of time; and
  after the threshold amount of time has elapsed, forgoing displaying, in the status region, the indication that the computer system is in the unlocked state.

1328 The computer system is in communication with one or more sensors that are positioned within two or more sensor regions that are encompassed by the status region, and the indication of whether the computer system is in the locked state or the unlocked state is displayed in display area of the status region between a first sensor region and a second sensor region of the two or more sensor regions.

1330 After performing the biometric enrollment process:
detect one or more user inputs corresponding to a request for biometric authentication of a user of the computer system; and
in response to detecting the one or more user inputs:
  display, in the status region, feedback about a status of a biometric authentication process performed to authenticate the user to use the computer system.

1332 In response to detecting the one or more user inputs, expand the status region, wherein the feedback about the status of the biometric authentication process is displayed in the expanded status region.

1420 In response to receiving the voice command directed to the virtual assistant, associate the first display region with an active session of a respective application associated with the operation performed, wherein the visual elements displayed in the first display region represent the active session of the respective application and indicate a current state of the respective application.

1422 Performing the operation responsive to the voice command includes setting a timer, and the visual elements displayed in the first display region include one or more elements of a timer user interface

1424 Performing the operation responsive to the voice command includes setting an alarm, and the visual elements displayed in the first display region include one or more elements of an alarm clock user interface.

1426 Performing the operation responsive to the voice command includes obtaining navigation instructions to a destination, and the visual elements displayed in the first display region include one or more of the navigation instructions to the destination.

1428 Display, in display area outside of the first display region, a user interface of respective software that is different from the respective application whose active session is associated with the first display region;
after updating the first display region in response to receiving the voice command directed to the virtual assistant, detect one or more user inputs directed to the user interface of the respective software; and
in response to detecting the one or more user inputs directed to the user interface of the respective software:
  perform one or more operations defined by the respective software while continuing to display, in the first display region, the visual elements representing the active session of the respective application and indicating the current state of the respective application, including updating the visual elements in accordance with one or more changes in the current state of the respective application.

1430 Displaying the outcome of the operation performed in response to the voice command includes displaying text and/or image content that is responsive to the voice command.

1432 The visual elements include the text and/or image content and are positioned so as to avoid overlapping locations of the one or more sensors in the first display region.

1434 Prior to detecting the user input invoking the virtual assistant of the computer system:
in accordance with a determination that the first display region is associated with an active session of a first application, display, in the first display region, an indication of a current state of the first application; and
in accordance with a determination that the first display region is associated with an active session of a second application, display, in the second display region, an indication of a current state of the second application.

1520 The first display state is selected for the system user interface region when the computer system has selected a first size for the system user interface region. The second display state is selected for the system user interface region when the computer system has selected a second size for the system user interface region.

1522 The first size of the system user interface region corresponds to an unexpanded state of the system user interface region. Displaying the system user interface region with the first visual edge treatment includes displaying the system user interface region without a border. The second size of the system user interface region corresponds to an expanded state of the system user interface region. Displaying the system user interface region with the second visual edge treatment includes displaying the system user interface region with a border.

1524 The first size of the system user interface region corresponds to an unexpanded state of the system user interface region. Displaying the system user interface region with the first visual edge treatment includes displaying the system user interface region without a shadow. The second size of the system user interface region corresponds to an expanded state of the system user interface region. Displaying the system user interface region with the second visual edge treatment includes displaying the system user interface region with a shadow.

1526 The second size of the system user interface region corresponds to a first expanded state of the system user interface region, and the system user interface region is displayed without a shadow, and the background of the interior portion of the system user interface region is displayed with the first appearance when the computer system has selected a third size for the system user interface region that corresponds to a second expanded state of the system user interface region that is different from the first expanded state.

1528 While displaying the system user interface region in an expanded state with a shadow, displaying the shadow with a lower intensity while the system user interface is expanded to a first extent than while the system user interface is expanded to a second extent that is greater than the first extent.

1546 The first user interface includes video content displayed in an unexpanded state in a portion of the first user interface.
Detect a request to display the video content of the first user interface in an expanded state. In response to detecting the request to display the video content of the first user interface in the expanded state:
    expand the video content; and
    cease to display the system user interface region.

1548 The first display state is selected for the system user interface region when the system user interface region includes first content of a first software application; and
the second display state is selected for the system user interface region when the system user interface region includes second content of a second software application.

1550 The first software application is different from the second software application;
displaying the system user interface region with the first visual edge treatment, in accordance with the determination that the system user interface region includes the first content of the first software application, includes displaying a border of the system user interface region in a first color that is associated with the first software application; and
displaying the system user interface region with the second visual edge treatment, in accordance with the determination that the system user interface region includes the second content of the second software application, includes displaying the border of the system user interface region in a second color that is associated with the second software application, wherein the first color that is associated with the second software application is different from the second color that is associated with the first software application.

1552 The first software application is the same as the second software application;
displaying the system user interface region with the first visual edge treatment, in accordance with the determination that the system user interface region includes the first content of the first software application, includes displaying a border of the system user interface region in a color that is associated with the first content; and
displaying the system user interface region with the second visual edge treatment, in accordance with the determination that the system user interface region includes the second content of the second software application, includes displaying the border of the system user interface region in a color that is associated with the second content, wherein the second content is different from the first content, and the color that is associated with the second content is different from the color that is associated with the first content.

1554 Displaying the system user interface region with the first visual edge treatment includes displaying a border of the system user interface region in a color that corresponds to a light mode when the computer system is displaying the first user interface in the light mode;
displaying the system user interface region with the second visual edge treatment includes displaying the border of the system user interface region in a color that corresponds to a dark mode when the computer system is displaying the first user interface in the dark mode, wherein the color that corresponds to the dark mode is different from the color that corresponds to the light mode.

1556 While displaying the system user interface region with a respective visual edge treatment, display an animation that changes an appearance of the respective visual edge treatment over time.

1614 The display area includes a user interface region that is adjacent to the status region, and the status region is visually distinguished from the user interface region

1616 Visually distinguishing the status region from the user interface region includes displaying the status region with a border, wherein the border contracts as the status region is reduced in size and expands as the status region is increased in size

1618 Visually distinguishing the status region from the user interface region includes displaying a background of the user interface region with a first range of values for a respective visual property and displaying a background of the status region with a second value, different from the first range of values, for the respective visual property, wherein reducing the size of the status region reduces a size of the background of the status region, and increasing the size of the status region increases the size of the background of the status region

1620 The second information is displayed in the status region as the size of the status region is increased

1622 Cease to display the first information gradually over a first period of time; and display the second information gradually over a second period of time; wherein the first period of time partially overlaps with the second period of time

1624 After displaying the second information in the status region:
cease to display the second information in the status region;
display third information in the status region, wherein the third information is different from the second information; and
while transitioning from displaying the second information in the status region to displaying the third information in the status region, reduce a size of the status region and, after reducing the size of the status region, increase the size of the status region

1626 Displaying the third information includes redisplaying the first information

1628 The third information is displayed in response to detecting occurrence of a second event corresponding to a transition to displaying the third information, and the third information includes status information about third software that is different from the first software and from the second software

1630 While displaying, in the status region, first respective information, detect occurrence of a third event corresponding to a transition to displaying fourth information;
    after detecting the occurrence of the third event, detect occurrence of a fourth event corresponding to a transition to displaying fifth information that is different from the fourth information;
    in response to detecting the occurrence of the third event, display a transition that includes:
        ceasing to display the first respective information in the status region;
        in accordance with a determination that the occurrence of the fourth event is detected after a predefined threshold amount of time since detecting the occurrence of the third event, prior to displaying a transition responsive to detecting the occurrence of the fourth event:
            displaying the fourth information in the status region; and
            while transitioning from displaying the first respective information in the status region to displaying the fourth information in the status region, reducing the size of the status region and, after reducing the size of the status region, increasing the size of the status region; and
        in accordance with a determination that the occurrence of the fourth event is detected within the predefined threshold amount of time since detecting the occurrence of the third event:
            reducing the size of the status region while ceasing to display the first respective information in the status region, without increasing the size of the status region in response to detecting the occurrence of the third event

1632 Detecting the occurrence of the first event includes detecting, via the one or more input devices, a first input corresponding to a request to switch from displaying, in display area outside of the status region, a user interface of a first application to displaying a user interface of a second application that is different from the first application

1634 While second respective information is displayed in the status region, detect a second input corresponding to a request to switch from displaying, in display area outside of the status region, the user interface of the second application to displaying a user interface of a third application that is different from the second application; and
   in response to detecting the second input:
      switch from displaying the user interface of the second application to displaying the user interface of the third application; and
      display a transition that includes:
         reducing a size of the status region; and
         after reducing the size of the status region, increasing the size of the status region (A)

Figure 16C

1650 The first information further includes status information about the second software;
    the status information about the first software is displayed in a first portion of the status region, and the status information about the second software is displayed in a second portion of the status region that is different from the first portion;
    detecting the occurrence of the first event includes detecting, via one or more input devices of the computer system, an input directed to the second portion of the status region; and
    displaying the second information in the status region in response to detecting the occurrence of the first event includes displaying additional status information about the second software 1652 The second software is a software application executing on the computer system, and the first event is an event associated with a change in status of the software application 1654 Detecting the occurrence of the first event includes detecting that the computer system is brought into proximity with a wireless terminal 1656 The first event corresponds to a system operation of the computer system

Figure 16F

DEVICES, METHODS, AND GRAPHICAL USER INTERFACES FOR UPDATING A SESSION REGION

RELATED APPLICATIONS

This application claims priority to U.S. Provisional Application Ser. No. 63/403,681, filed Sep. 2, 2022, U.S. Provisional Application Ser. No. 63/348,437, filed Jun. 2, 2022, and U.S. Provisional Application Ser. No. 63/339,406, filed May 6, 2022, which are hereby incorporated by reference in their entireties.

TECHNICAL FIELD

This relates generally to electronic devices with touch-sensitive surfaces, including but not limited to electronic devices with touch-sensitive surfaces that include one or more sensors and a display area having a session region.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics.

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for viewing status information and accessing controls for controlling applications. Such methods and interfaces optionally complement or replace conventional methods for viewing status information and accessing controls for controlling applications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method includes, at a computer system that is in communication with one or more sensors and with a display generation component having a display area, wherein the one or more sensors are positioned within one or more sensor regions that are surrounded by the display area, and the display generation component is not capable of displaying content within the one or more sensor regions, displaying, in a first display region of the display area, a first user interface object that includes status information provided by respective software about a state of the computer system, wherein the first display region encompasses the one or more sensor regions. The method includes displaying, in a second display region of the display generation component that is different from the first display region, a user interface of an application that is different from the respective software, wherein the second display region at least partially surrounds the first display region. The method further includes, as the state of the computer system changes, displaying in the first user interface object updated status information provided by the respective software about the changed state of the computer system, wherein the updated status information includes visual elements that are selected so as to avoid overlapping locations of the one or more sensors in the first display region.

In accordance with some embodiments, a method includes, at a computer system that is in communication with a display generation component having a display area, wherein the display area includes a status region, displaying, in display area outside of the status region, a first user interface that includes a user interface of a respective application executing on the computer system, including, updating the user interface of the respective application in accordance with one or more changes in a state of the respective application. The method includes detecting a user input corresponding to a request to dismiss the first user interface and, in response to detecting the user input corresponding to the request to dismiss the first user interface, ceasing to display, in the display area outside of the status region, the first user interface that includes the user interface of the respective application. The method includes, while the state of the respective application continues to change, displaying in the status region an indication of a current state of the respective application and displaying, in the display area outside of the status region, a second user interface that is associated with respective software that is different from the respective application. The method further includes detecting a user input to navigate from the second user interface that is associated with respective software that is different from the respective application to a third user interface and in response to detecting the user input to navigate from the second user interface, displaying the third user interface in the display area outside of the status region while continuing to display, in the status region, the indication of a current state of the respective application.

In accordance with some embodiments, a method includes, at a computer system that is in communication with a display generation component having a display area, wherein the display area includes a status region and an application user interface region that is separate from the status region, and the application user interface region at least partially surrounds the status region, displaying, in the application user interface region, a first user interface of a first application. The method includes detecting a user input corresponding to a request to display a second user interface in the application user interface region and in response to detecting the user input corresponding to the request to display the second user interface in the application user interface region, and in accordance with a determination that the second user interface is associated with respective software that is different from the first application, ceasing to display the first user interface of the first application in the application user interface region and displaying the second user interface in the application user interface region. The method further includes, in accordance with a determination that the status region is associated with an active session of a second application that is different from the first application, displaying, in a first portion of the status region, a first indication of a current state of the first application, including updating the displayed first indication as the state of the first application changes and displaying, in a second portion of the status region that is different from the first portion, a second indication of a current state of the second application, including updating the displayed second indication as the state of the second application changes, wherein the first portion of the status region and the second portion of the status region are displayed concurrently with the second user interface. The method includes, in accordance with a determination that the status region is not associated with an active session of a second application that is different from the first application, displaying, in the status region, the first indication of the current state of the first application in the status region without displaying, in the status region, an indication of a current state of a second application, wherein the status region is displayed concurrently with the second user interface.

In accordance with some embodiments, a method includes, at a computer system that is in communication with a display generation component having a display area, wherein the display area at least partially encompasses a status region, detecting a user input corresponding to the status region and in response to detecting the user input corresponding to the status region, in accordance with a determination that the status region is associated with an active session of a respective application, performing an operation associated with the respective application. The method includes, in accordance with a determination that the status region is not associated with an active session of a respective application, providing feedback associated with the user input without displaying information about a respective application in the status region and without performing an operation associated with a respective application.

In accordance with some embodiments, a method includes, at a computer system that is in communication with a display generation component having a display area, wherein the display area includes a status region, displaying, in the display area outside of the status region, a first user interface that includes a respective user interface element for initiating enrollment of a biometric feature of a user. The method includes detecting a user input directed to the respective user interface element to initiate enrollment of a biometric feature of the user. The method further includes, in response to detecting the user input, performing a biometric enrollment process, including, while maintaining display of the first user interface in the display area outside of the status region, displaying, in the status region, a biometric enrollment user interface, and updating the biometric enrollment user interface in the status region during the biometric enrollment process, including while capturing biometric information about the biometric feature of the user, to indicate a current status of the biometric enrollment process.

In accordance with some embodiments, a method includes, at a computer system that is in communication with one or more sensors and with a display generation component having a display area, wherein the one or more sensors are positioned within one or more sensor regions that are surrounded by the display area, the display generation component is not capable of displaying content within the one or more sensor regions, and a first display region of the display area encompasses the one or more sensor regions, detecting a user input invoking a virtual assistant of the computer system. The method includes, in response to detecting the user input invoking the virtual assistant, displaying, in the first display region, a visual indication that the virtual assistant is active. The method further includes, receiving a voice command directed to the virtual assistant and, in response to receiving the voice command directed to the virtual assistant, performing, at the computer system, an operation responsive to the voice command and updating the first display region, including displaying an outcome of the operation performed in response to the voice command, wherein the updating includes displaying visual elements that are selected so as to avoid overlapping locations of the one or more sensors in the first display region.

In accordance with some embodiments, a method includes, at a computer system that is in communication with a display generation component having a display area, wherein the display area includes a system user interface region, displaying, in display area outside of the system user interface region, a first user interface. The method includes, in accordance with a determination that the system user interface region is displayed in a first display state, displaying the system user interface region with a first visual edge treatment; and displaying a background of an interior portion of the system user interface region with a first appearance. The method further includes, in accordance with a determination that the system user interface region is displayed in a second display state distinct from the first display state, displaying the system user interface region with a second visual edge treatment that is distinct from the first visual edge treatment and displaying the background of the interior portion of the system user interface region with the first appearance.

In accordance with some embodiments, a method includes, at a computer system that is in communication with a display generation component having a display area, wherein the display area includes a status region, displaying, in the status region, first information that includes status information about first software. The status region is associated with an active session of the first software. The method includes, while displaying, in the status region, the first information, detecting occurrence of a first event corresponding to a transition to displaying second information that is different from the first information. The method includes, in response to detecting the occurrence of the first event, displaying a transition that includes: ceasing to display the first information in the status region; displaying the second information in the status region, wherein the second information includes status information about second software that is different from the first software, and the status region is associated with an active session of the second software; and, while transitioning from displaying the first information in the status region to displaying the second information in the status region, reducing a size of the status region and, after reducing the size of the status region, increasing the size of the status region.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for providing status updates, thereby increasing the effectiveness, efficiency, and user satisfaction with such devices. Such methods and interfaces may complement or replace conventional methods for providing status updates.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6M illustrate example user interfaces for enrolling in biometric authentication in accordance with some embodiments.

FIGS. 7A-7E illustrate example user interfaces for updating a session region for using a stored payment method in accordance with some embodiments.

FIGS. 9A-9G are flow diagrams of a process for updating status information within a region of a display area in accordance with some embodiments.

FIGS. 10A-10D are flow diagrams of a process for continuing to display updated status information in a status region while switching display between different user interfaces in accordance with some embodiments.

FIGS. 11A-11D are flow diagrams of a process for displaying updated status information for at least one application in a status region of the display in accordance with some embodiments.

FIGS. 12A-12E are flow diagrams of a process for interacting with a status region to perform an operation in accordance with some embodiments.

FIGS. 13A-13E are flow diagrams of a process for displaying biometric enrollment information in a status region in accordance with some embodiments.

FIGS. 14A-14C are flow diagrams of a process for displaying updates for a virtual assistant in a sensor region in accordance with some embodiments.

FIGS. 15A-15E are flow diagrams of a process for changing a visual appearance of a session region depending on a current state of the device in accordance with some embodiments.

FIGS. 16A-16F are flow diagrams of a process for transitioning between displaying different types of information in a status region in accordance with some embodiments.

DESCRIPTION OF EMBODIMENTS

Many electronic devices have graphical user interfaces that allow a user to navigate between application user interfaces and/or system user interfaces. Some methods for navigating between user interfaces enable multitasking, such that a respective application continues to update in the background even after navigating away from the respective application user interface. For example, with these methods, a user may need to navigate back to the respective application user interface in order to view the updates. In the embodiments described below, an improved method for providing status updates for a plurality of applications within a persistent session region is provided. This method streamlines the user's ability to view real-time status information for active sessions, thereby eliminating the need for extra, separate steps to navigate back to the respective user interface of the respective application to view a status update.

The methods, devices, and GUIs described herein use haptic feedback to improve user interface interactions in multiple ways. For example, they make it easier to indicate hidden thresholds and indicate user interface components that represent selectable options.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or tactile feedback to the user, reducing the number of inputs needed to perform an operation, providing additional control options without cluttering the user interface with additional displayed controls, performing an operation when a set of conditions has been met without requiring further user input, improving privacy and/or security, reducing the amount of display area needed to display notifications and/or status information and thus increasing the amount of display area available for other applications to display information, and/or additional techniques. These techniques also reduce power usage and improve battery life of the device by enabling the user to use the device more quickly and efficiently. Saving on battery power, and thus weight, improves the ergonomics of the device.

Figure 14A:
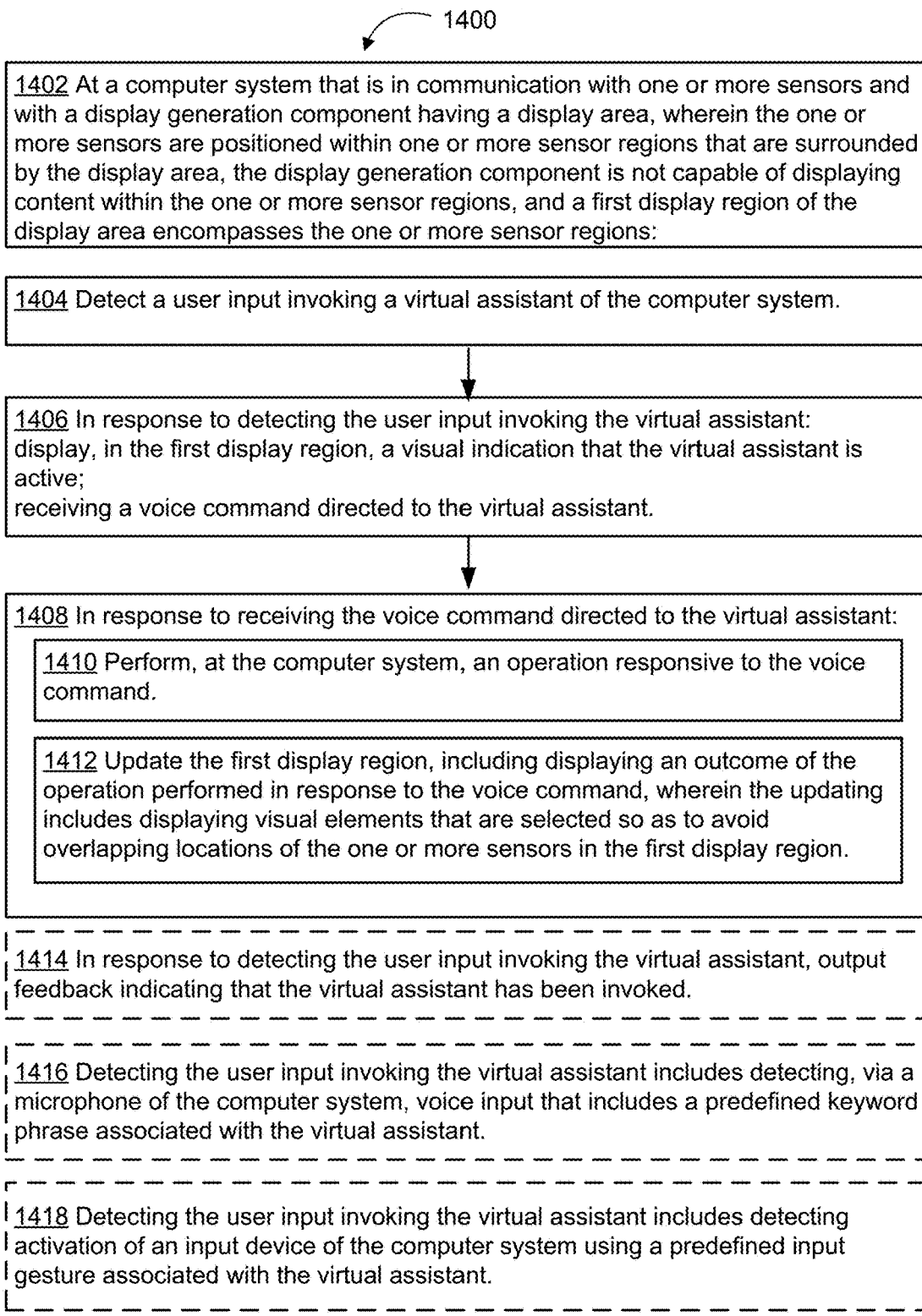
Figure 15A:
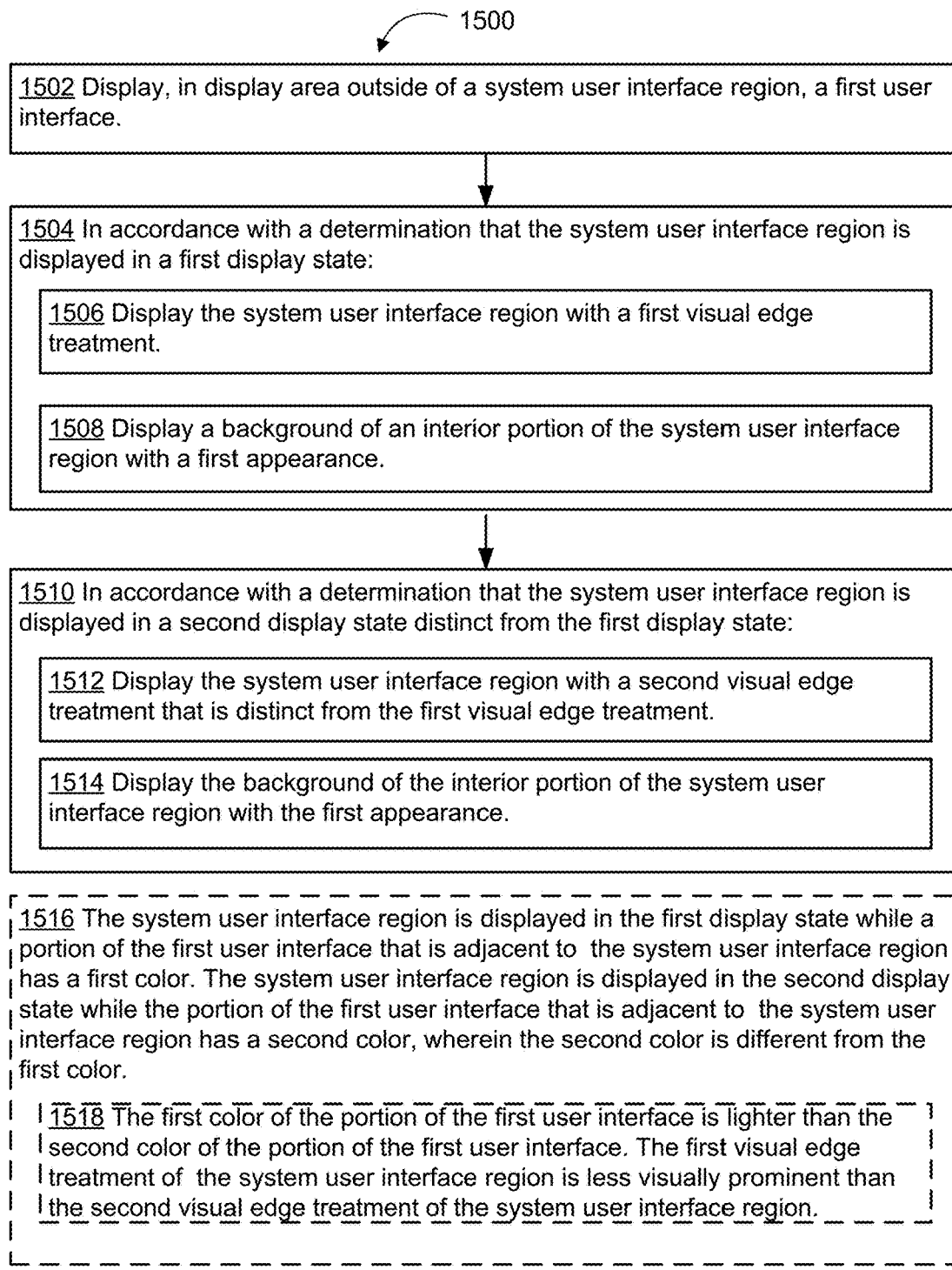
Figure 15C:
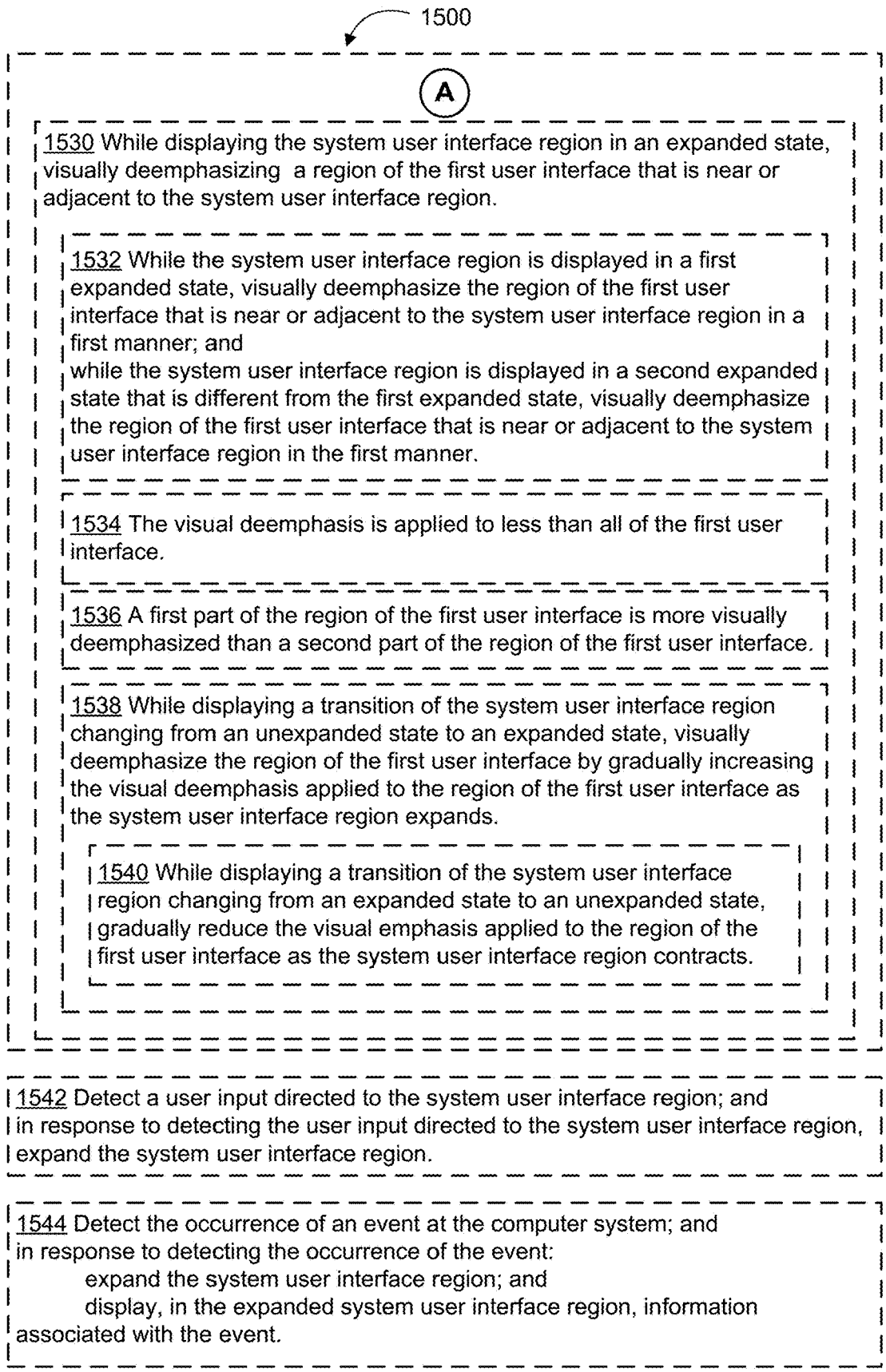
Figure 16A:
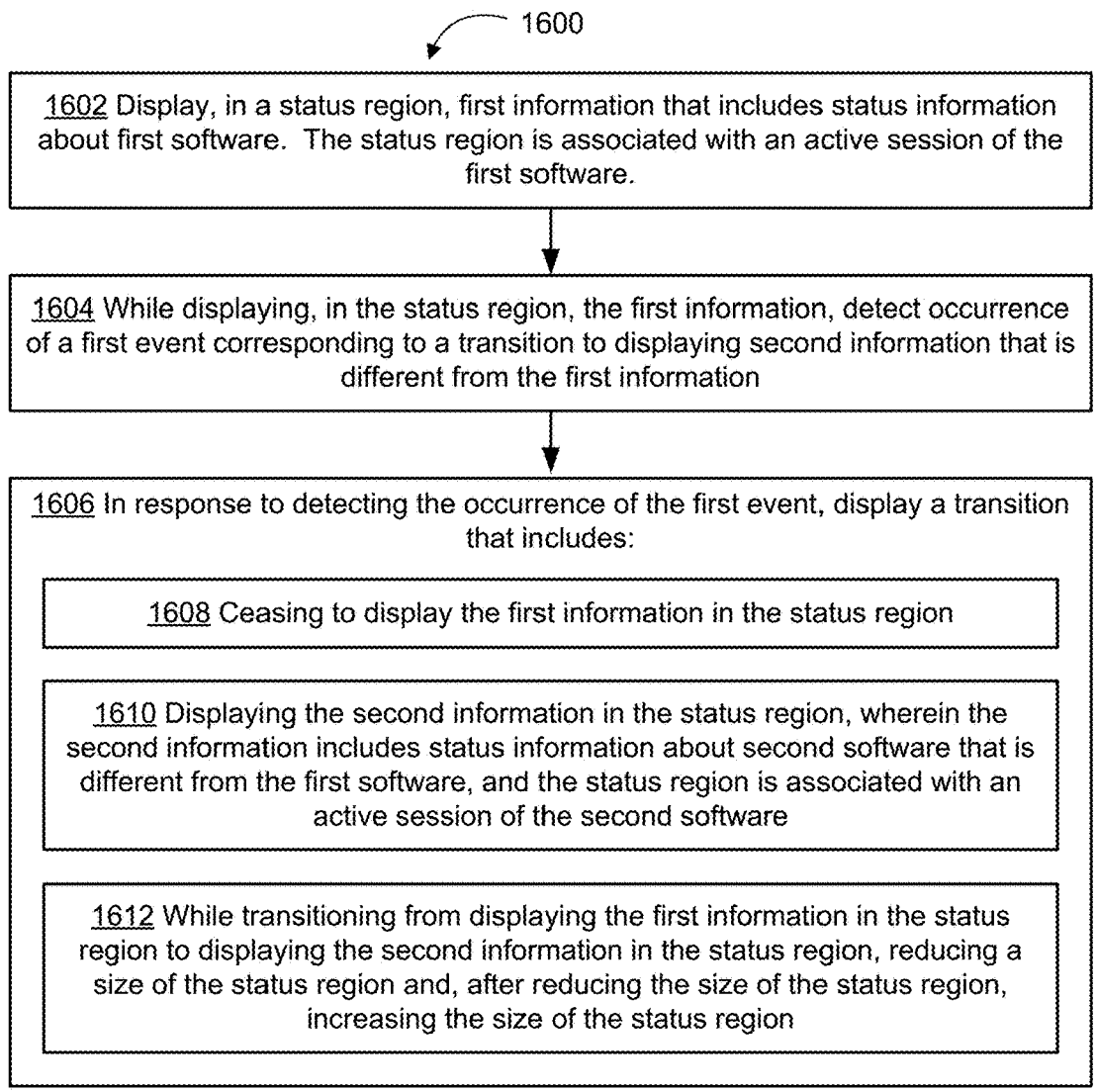
Figure 16D:
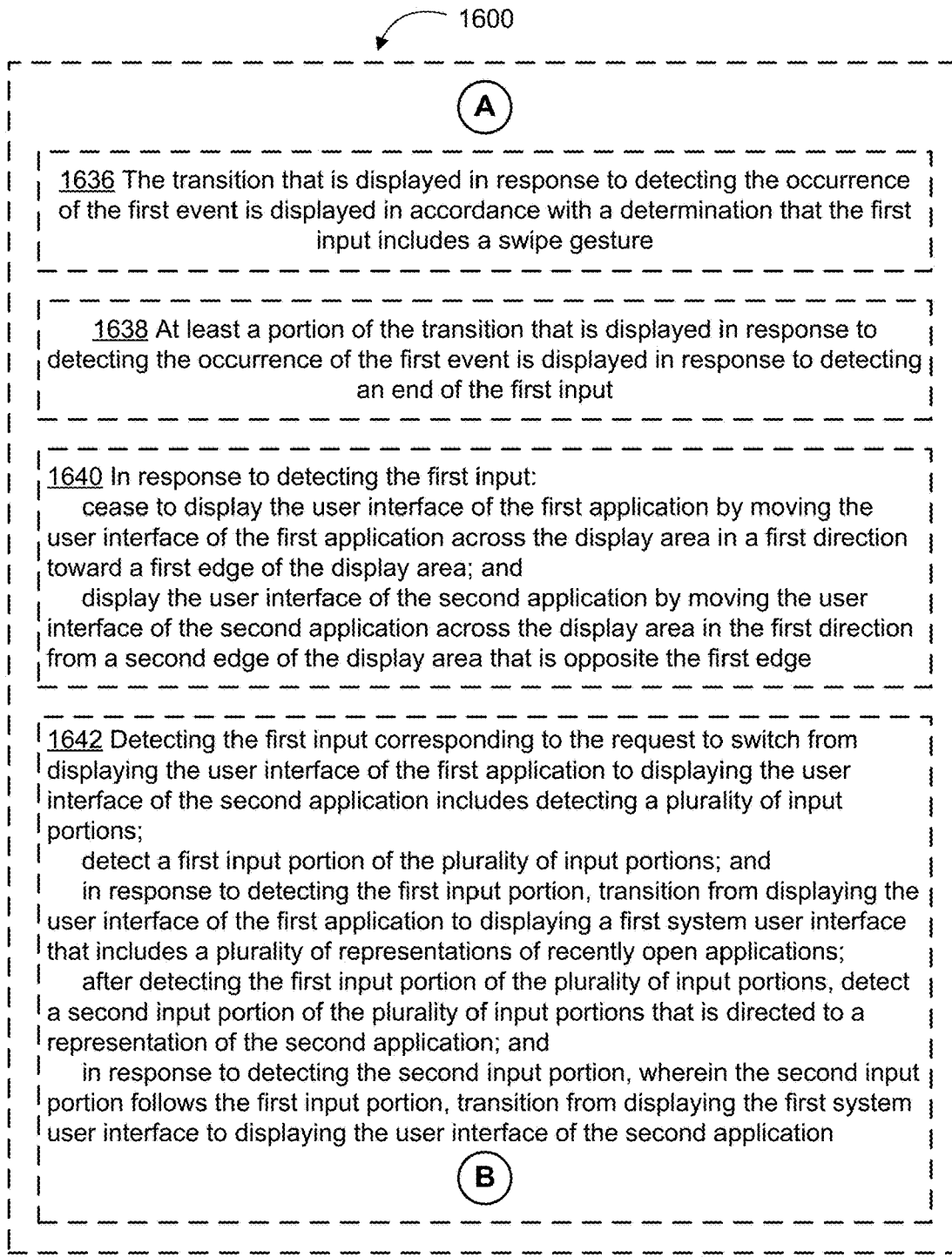
Figure 16E:
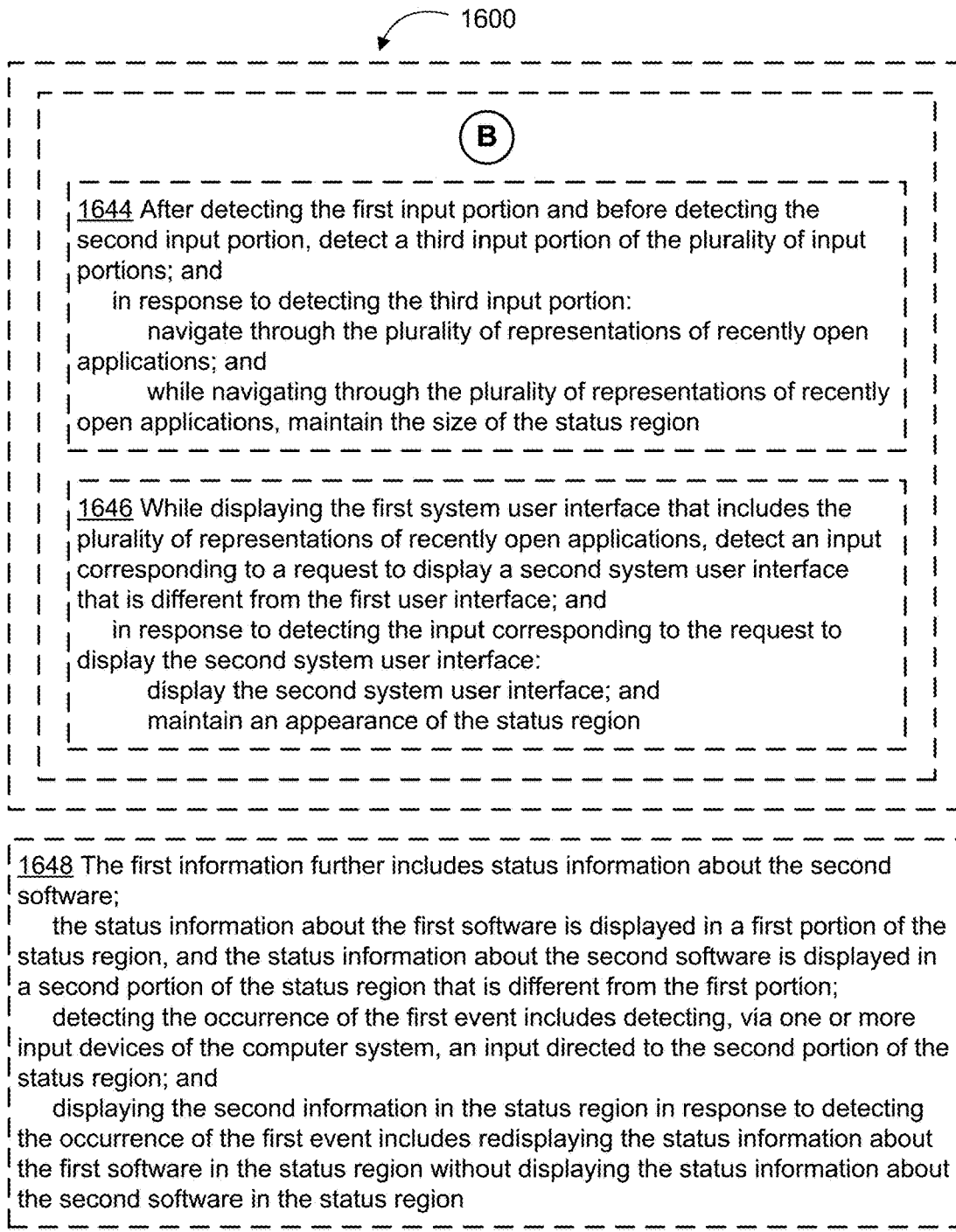

Below, FIGS. 1A-1B, 2, and 3 provide a description of example devices. FIGS. 4A-4B and 5A-5CY illustrate example user interfaces for updating status information in a session region. FIGS. 6A-6M illustrate example user interfaces for enrolling in biometric authentication. FIGS. 7A-7E illustrate example user interfaces for updating a session region for using a stored payment method in accordance with some embodiments. FIGS. 8A-8G illustrate example user interfaces for updating a session region for a virtual assistant in accordance with some embodiments. FIGS. 9A-9G are flow diagrams of a process for updating status information within a region of a display area in accordance with some embodiments. FIGS. 10A-10D are flow diagrams of a process for continuing to display updated status information in a status region while switching display between different user interfaces in accordance with some embodiments. FIGS. 11A-11D are flow diagrams of a process for displaying updated status information for at least one application in a status region of the display in accordance with some embodiments. FIGS. 12A-12E are flow diagrams of a process for interacting with a status region to perform an operation in accordance with some embodiments. FIGS. 13A-13E are flow diagrams of a process for displaying biometric enrollment information in a status region in accordance with some embodiments. FIGS. 14A-14C are flow diagrams of a process for displaying updates for a virtual assistant in a sensor region in accordance with some embodiments. FIGS. 15A-15E are flow diagrams of a process for changing a visual appearance of a session region depending on a current state of the device in accordance with some embodiments. FIGS. 16A-16F are flow diagrams of a process for transitioning between displaying different types of information in a status region in accordance with some embodiments. The user interfaces in FIGS. 5A-5CY, 6A-6M, 7A-7E, and 8A-8G are used to illustrate the processes in FIGS. 9A-9G, 10A-10D, 11A-11D, 12A-12E, 13A-13E, 14A-14C, 15A-15E, and 16A-16F.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
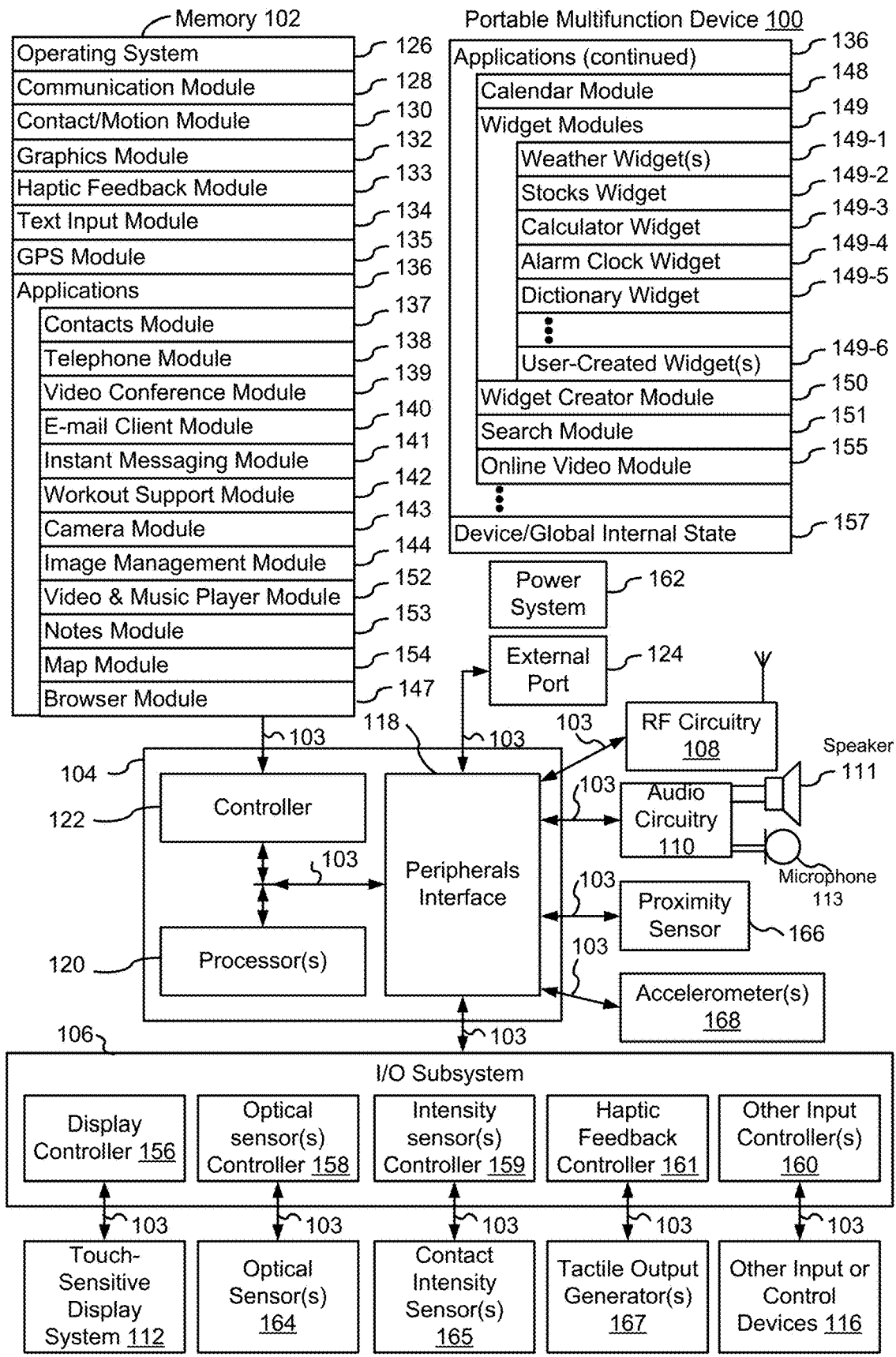
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., a single button that rocks in opposite directions, or separate up button and down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
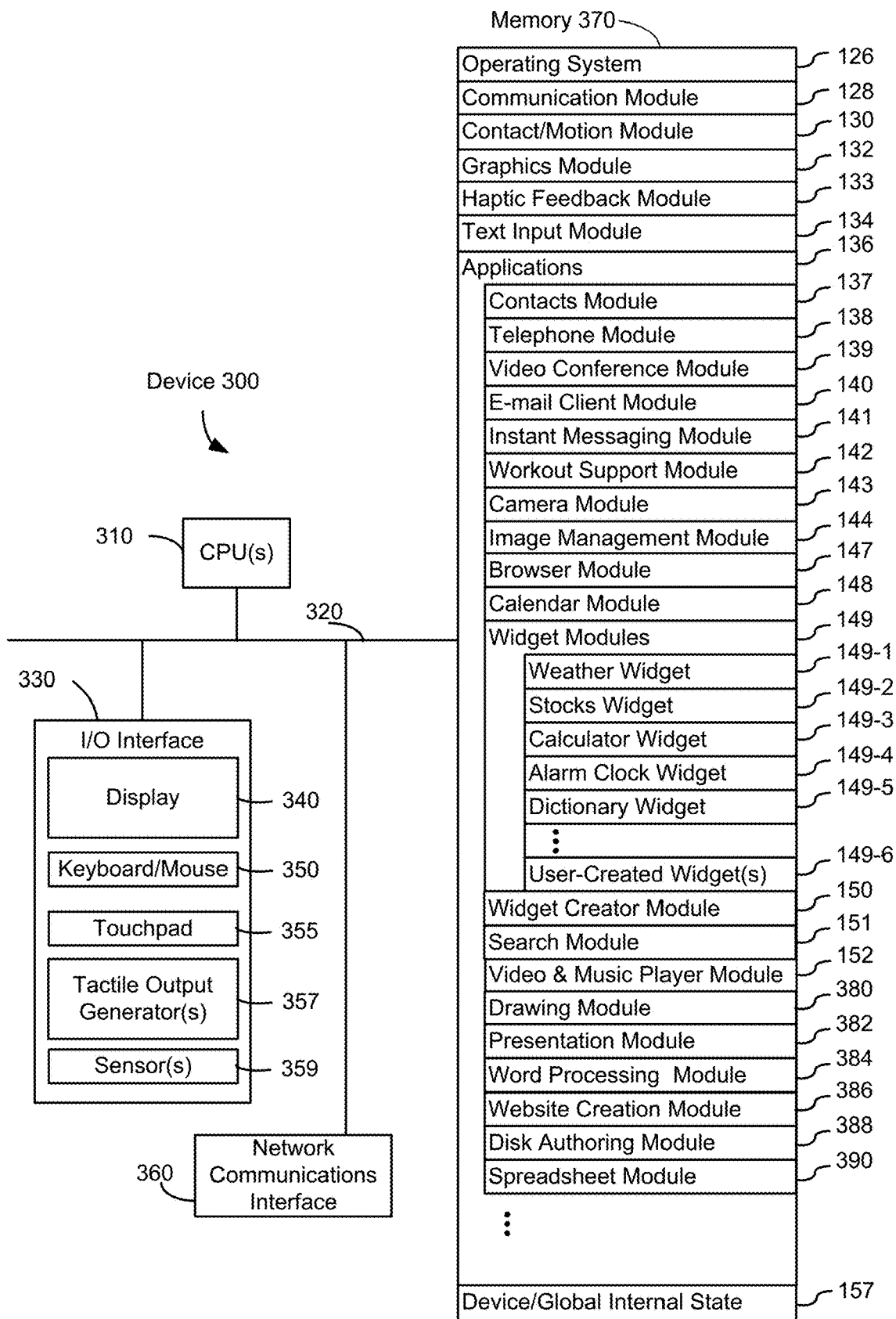
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif. In some embodiments, the external port is a USB Type-C connector that is the same as, or similar to and/or compatible with the USB Type-C connector used in some electronic devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
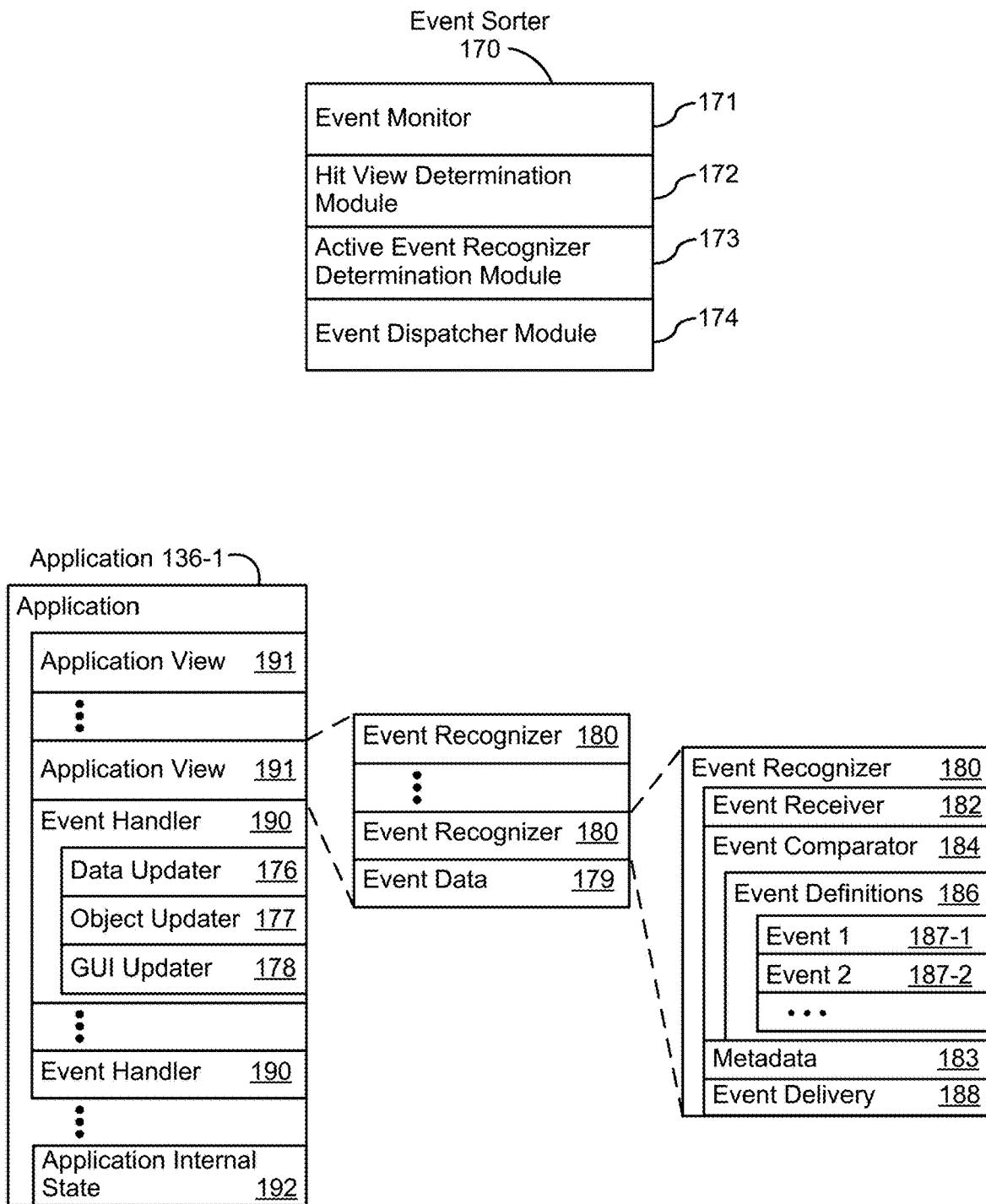
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
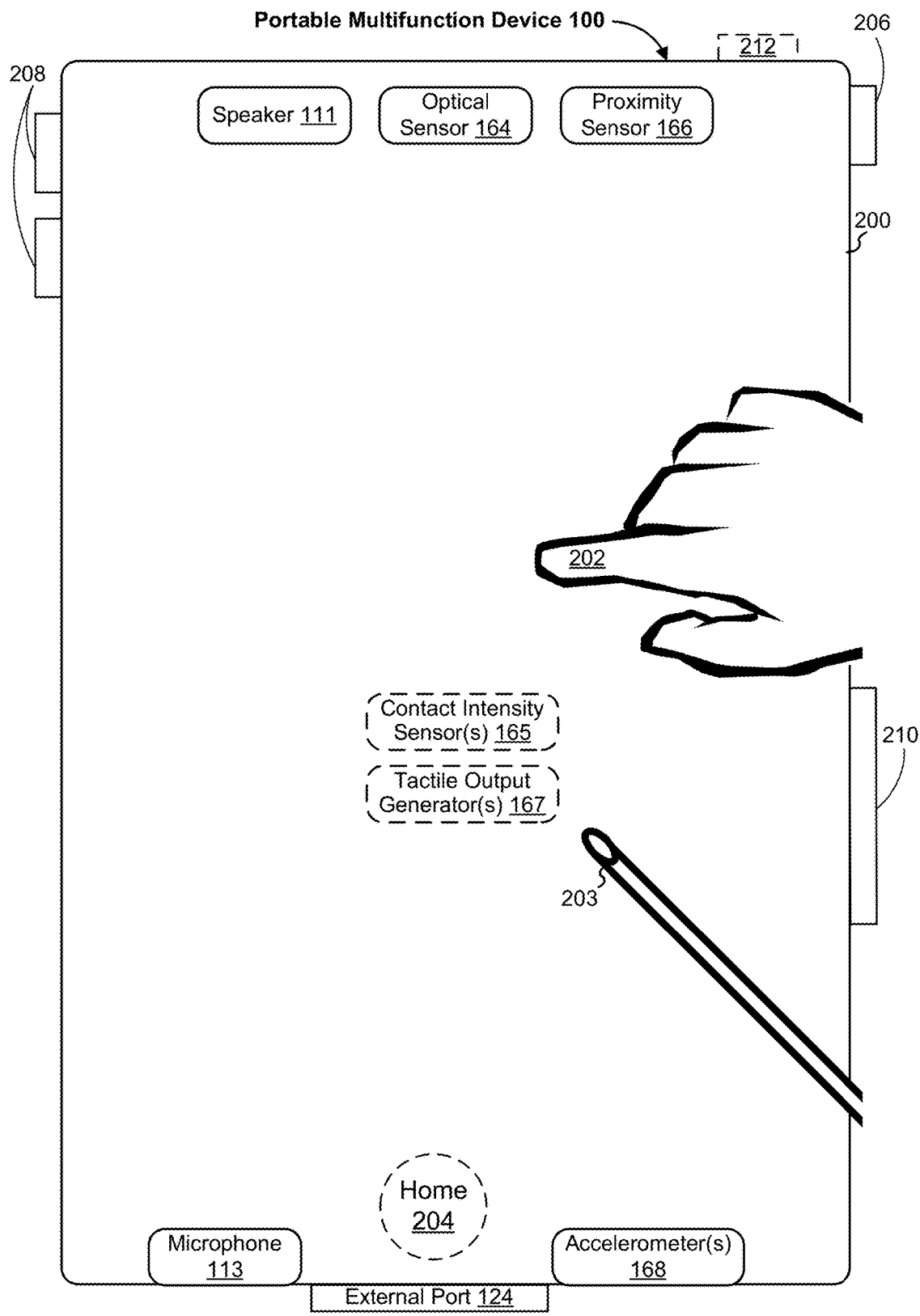
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display, or as a system gesture such as an upward edge swipe.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and/or docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
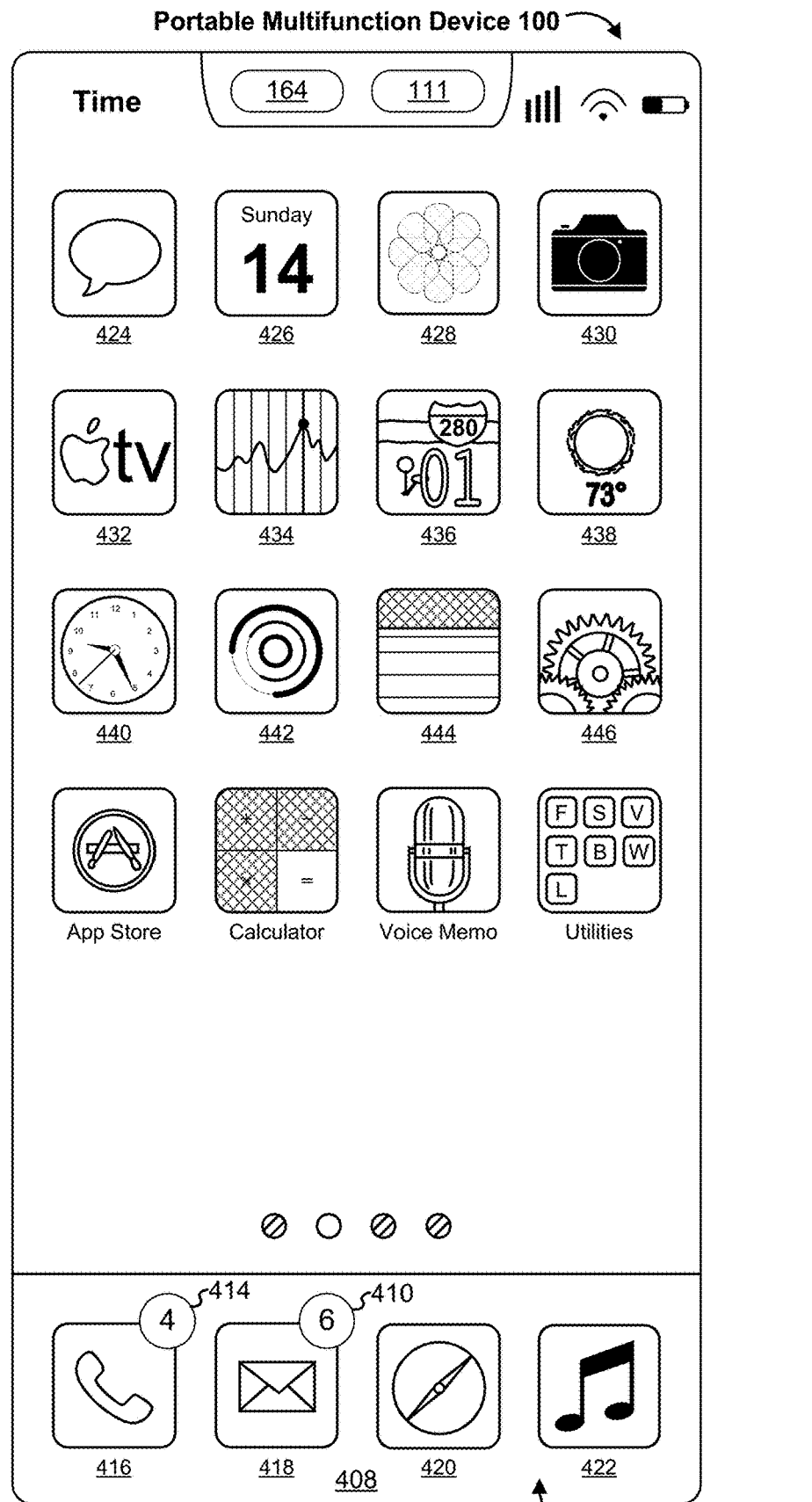
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";

Icon 428 for image management module 144, labeled "Photos";
Icon 430 for camera module 143, labeled "Camera";
Icon 432 for online video module 155, labeled "Online Video";
Icon 434 for stocks widget 149-2, labeled "Stocks";
Icon 436 for map module 154, labeled "Maps";
Icon 438 for weather widget 149-1, labeled "Weather";
Icon 440 for alarm clock widget 149-4, labeled "Clock";
Icon 442 for workout support module 142, labeled "Workout Support";
Icon 444 for notes module 153, labeled "Notes"; and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
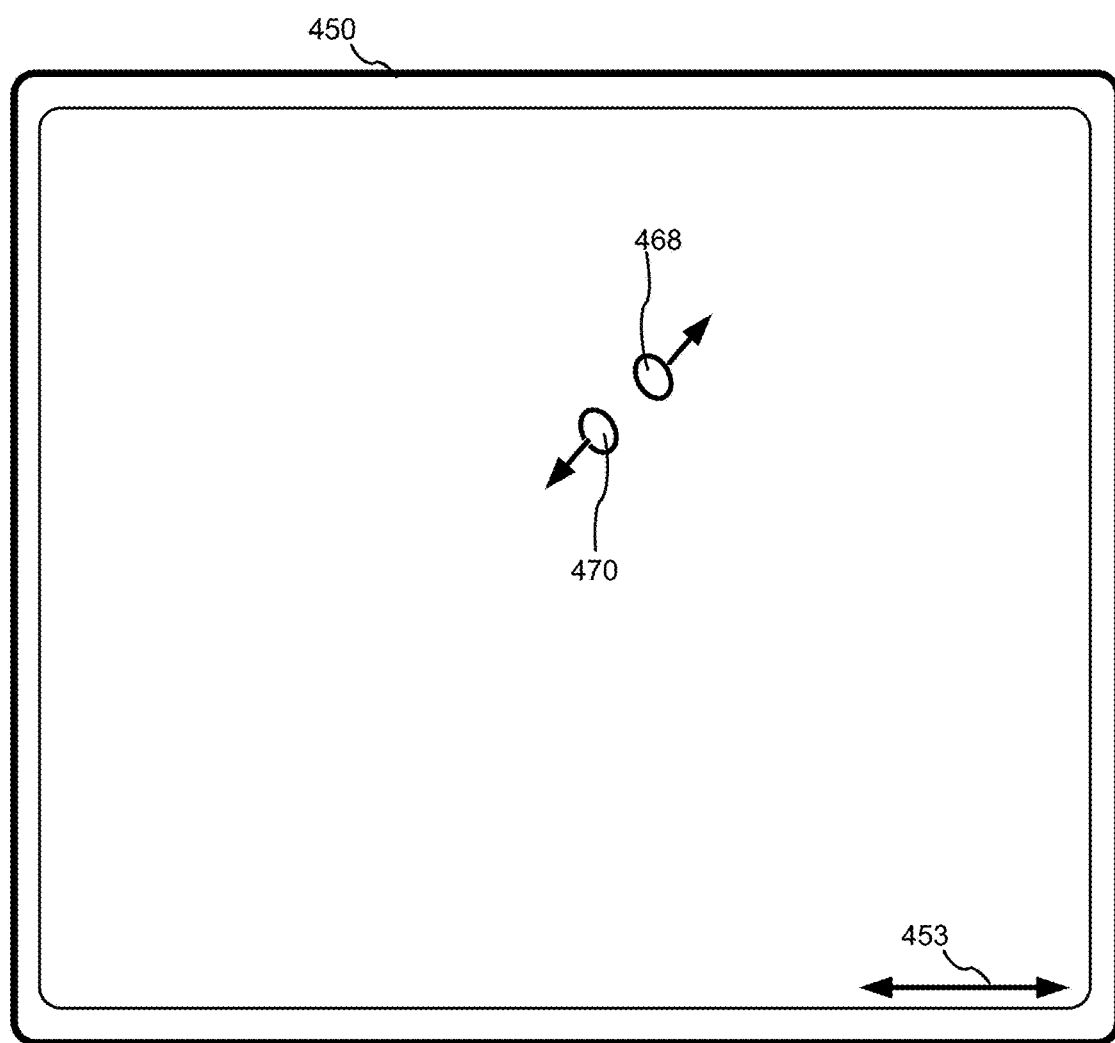
FIG. 4B illustrates an example user interface for a multifunction device with a touch-sensitive surface that is separate from the display in accordance with some embodiments.
Figure 4B:
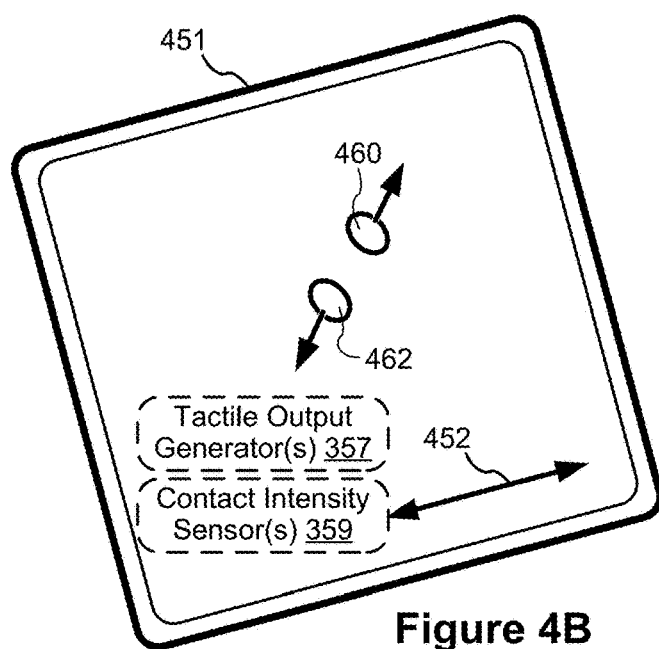

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 5A:
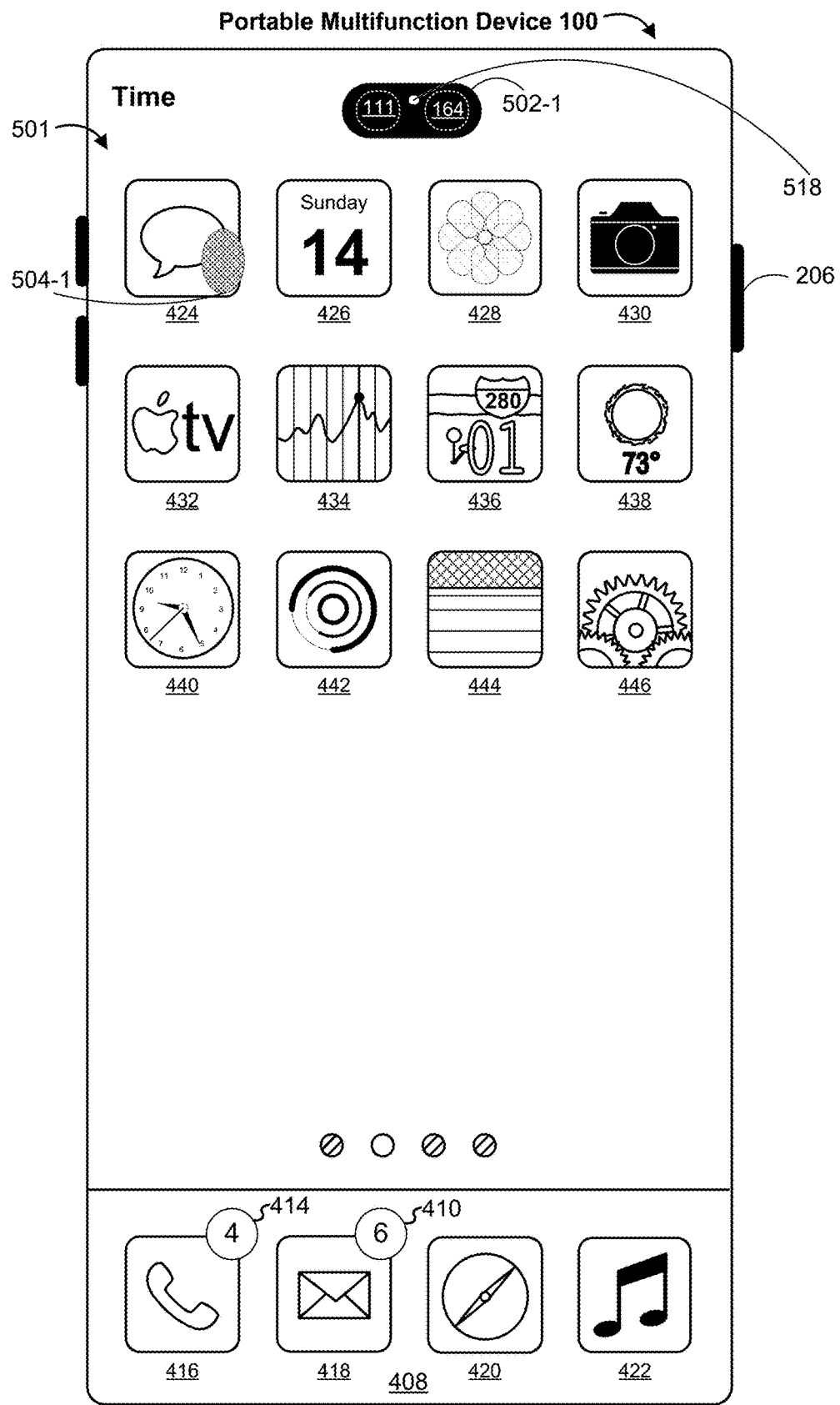
FIGS. 5A-5CY illustrate example user interfaces for updating status information in a session region in accordance with some embodiments.
Figure 5B:
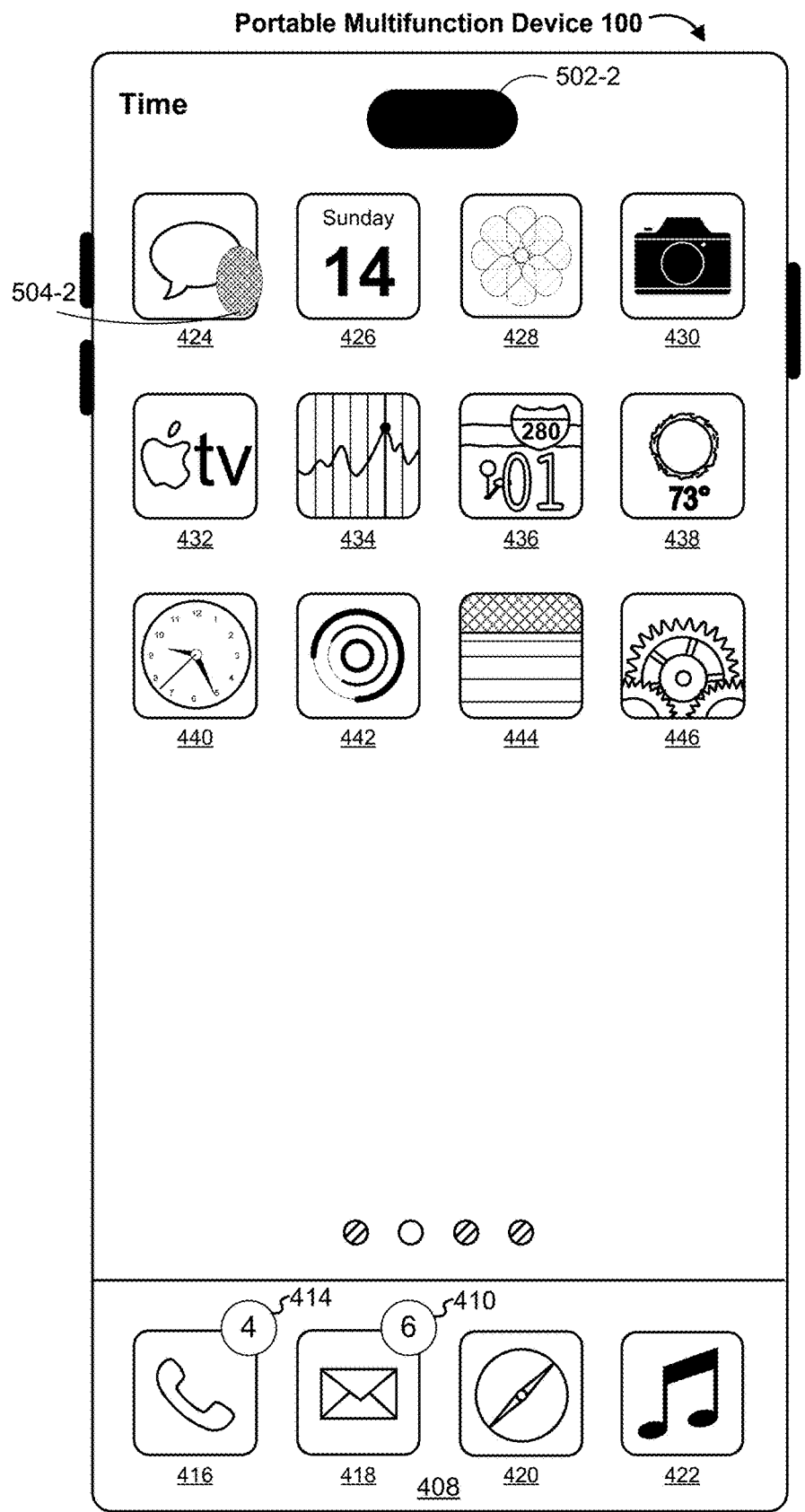
Figure 5D:
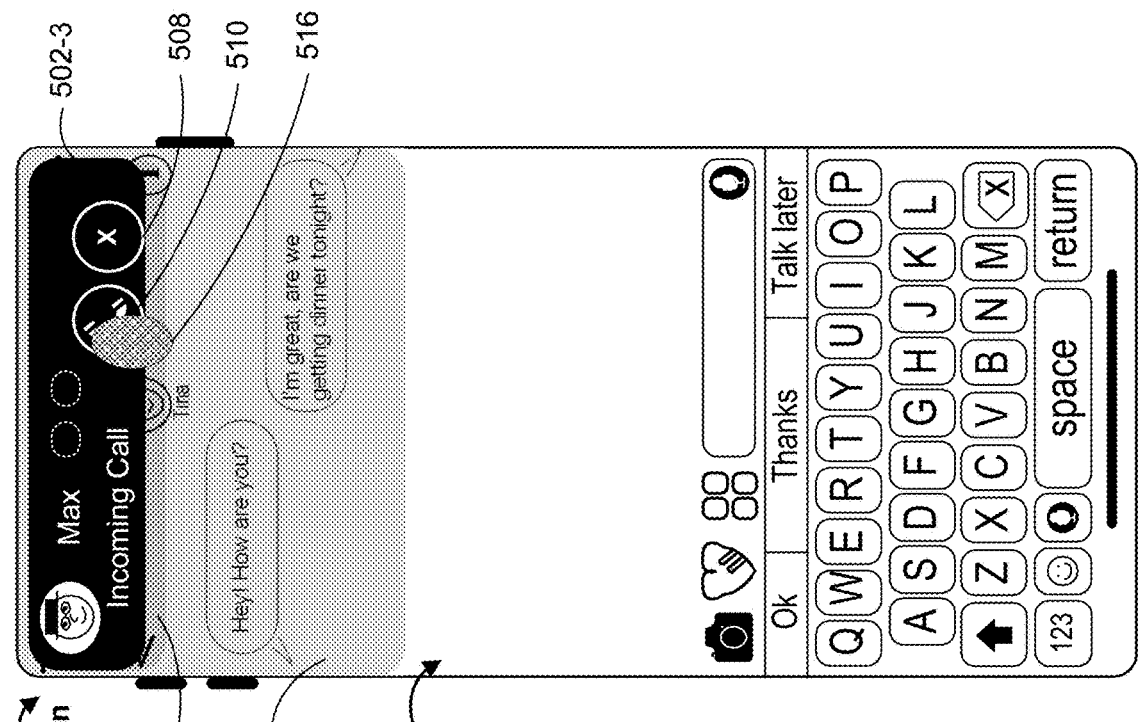
Figure 5C:
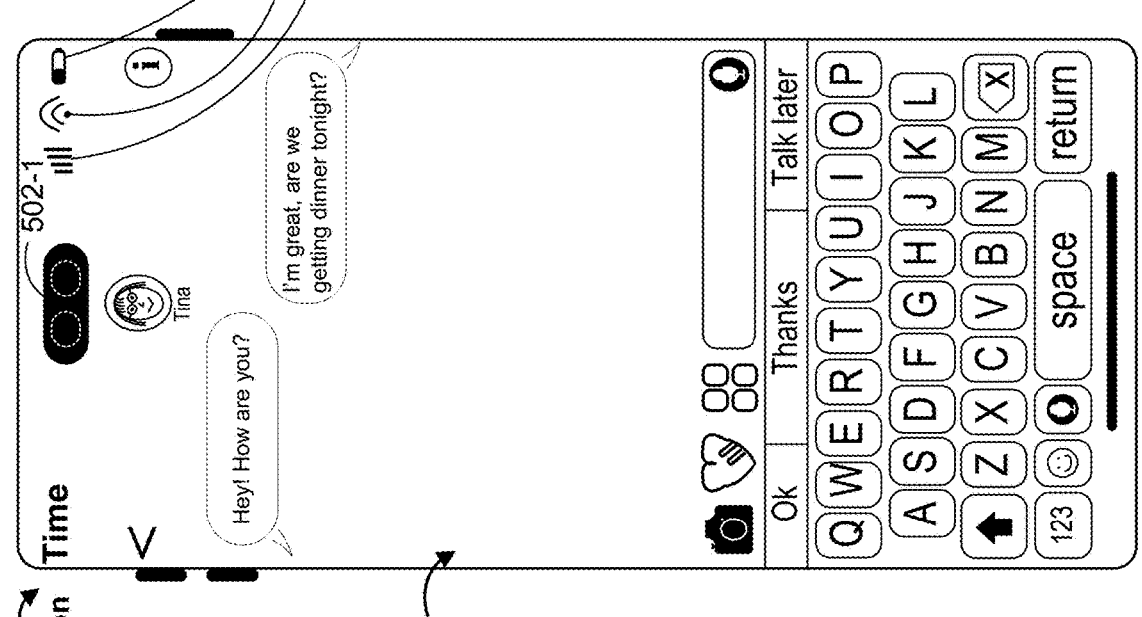

FIGS. 5A-5CY illustrate example user interfaces for updating status information in a session region in accordance with some embodiments. FIGS. 6A-6M illustrate example user interfaces for enrolling in biometric authentication in accordance with some embodiments. FIGS. 7A-7E illustrate example user interfaces for updating a session region for using a stored payment method in accordance with some embodiments. FIGS. 8A-8G illustrate example user interfaces for updating a session region for a virtual assistant in accordance with some embodiments. The user interfaces in these figures are used to illustrate the processes described below, including the processes in FIGS. 9A-9G, 10A-10D, 11A-11D, 12A-12E, 13A-13E, 14A-14C, 15A-15E, and 16A-16F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5CY illustrate example user interfaces for updating status information in a session region in accordance with some embodiments.

FIG. 5A illustrates an example user interface of a home screen (also called a home user interface) 501 of a portable multifunction device 100. In some embodiments, portable multifunction device 100 is a computer system, a handheld mobile device, tablet, or other client device. In some embodiments, the home screen user interface includes icons for navigating to a plurality of applications that are executed, or executable, by the device 100. In some embodiments, a user is enabled to interact with the device 100 using one or more gestures, including touch inputs. For example, a tap input on a respective application icon causes the respective application to launch, or otherwise open a user interface for the respective application, on the display area of device 100. In some embodiments, a plurality of views (also called pages) for the home screen user interface is available. For example, a user is enabled to swipe or otherwise navigate between the plurality of views, wherein multiple views, and in some embodiments each view, of the home screen user interface includes different application icons for different applications. In some embodiments, the application icons are different sizes, such as an application widget that displays information for the respective application, wherein the application widget is larger than the application icons.

In some embodiments, the device 100 includes a session region 502-1 that includes one or more sensors (e.g., speaker 111 and/or one or more optical sensors 164). In some embodiments, the one or more sensors are positioned within one or more cutouts (also called sensor regions) in a display of the device 100. In some embodiments, the session region 502-1 encompasses the one or more sensor cutouts for the one or more sensors. In some embodiments, additional sensors are located within the session region 502-1, wherein the cutouts illustrated in FIG. 5A includes one or more sensors in the cutout (e.g., one or more additional sensors are positioned in the same cutout as speaker 111, and/or one or more additional sensors are positioned in the same cutout as optical sensor(s) 164, such as a structured light emitter or projector). It will be understood that in some embodiments, alternative shapes and/or numbers of cutouts (e.g., more than two or fewer than two), as well as numbers of sensors in a respective cutout, are implemented. In some embodiments, the cutouts are not visible from the surface of device 100. In some embodiments, the device displays an outline of the session region 502-1. For example, the device displays the black session region 502-1 that encompasses the cutouts for speaker 111 and optional sensors 164. In some embodiments, the device displays the session region 502-1 with a color that matches, or otherwise blends with, a color of the sensors that are positioned within the cutouts.

In some embodiments, a region that is between two of the sensor cutouts is maintained with a same color as the color of the sensors. For example, the region that is between two of the sensor cutouts comprises a display that displays a color selected to match the color of the hardware of the sensors. In some embodiments, at least one of the sensor cutouts includes a camera as the sensor in the sensor cutout. In some embodiments, the region that is between two of the sensor cutouts displays content (e.g., a privacy indicator and/or a lock indicator). Specific examples of the region between sensor cutouts are provided herein in the figures and accompanying descriptions.

In some embodiments, a privacy indicator 518 is optionally displayed in the region that is between two of the sensor cutouts. In the example of FIG. 5A, privacy indicator 518 is displayed in session region 502-1 in the region between the cutout for speaker 111 and the cutout for sensor(s) 164. As described in more detail herein, privacy indicator 518 typically indicates current or recent use of the camera, microphone, and/or location sensors to capture information about the device, the environment of the device, or other user-specific and/or user-identifying information, such as by an application executing on device 100. In some embodiments, displaying the privacy indicator to indicate use of the camera, microphone, and/or location sensors is optional for an application for which a session is not displayed in the session region. In some embodiments, the privacy indicator is displayed with enhanced brightness in some circumstances, such as when the device 100 is in a bright environment (e.g., in sunlight), to make the privacy indicator more noticeable to the user. In some embodiments the privacy indicator has different colors for different types of data that are being captured (e.g., when location data is being collected the privacy indicator is a first color, such as blue or purple; when visual data is being collected the privacy indicator is a second color such as green, white, or yellow; and/or when audio data is being collected, the privacy indicator is a third color such as orange, red, or brown). In some embodiments multiple privacy indicators are displayed concurrently when multiple types of data are being collected concurrently. In some embodiments, a single privacy indicator is displayed when more than one type of data is being collected (e.g., a privacy indictor that indicates that visual data is being collected if both visual and audio data are being collected, or a privacy indicator that indicates that audio data is being collected is displayed if both audio data and location data are being collected).

In some embodiments, the session region 502-1 is displayed with a shape that includes a curvature that matches a curvature of the display (e.g., the corners of the display) of device 100, such as the shape of the corners of touch screen 112 in FIG. 5A. In some embodiments, the session region maintains the curvature that matches the curvature of the display even as the session region is expanded to show additional information and/or controls for the session, as described below.

In some embodiments, session region 502-1 that is displayed without active sessions (e.g., without status information), and/or session regions described herein that are displayed with at least one active session (e.g., with status information), are displayed at a predefined position of the display as the user navigates between different user interfaces. For example, the session region is displayed within a same area of the display while the device 100 displays application user interfaces, a home screen user interface, and optionally a wake screen user interface (e.g., at the top of touch screen 112, as shown throughout the figures).

FIG. 5B illustrates the home screen user interface as described with reference to FIG. 5A. FIG. 5B further illustrates session region 502-2 that does not include one or more sensors within the session region 502-2. For example, in some embodiments, the one or more sensors are not positioned within cutouts of the display of device 100. In some embodiments, the session region 502-2 that does not include one or more sensors is enabled to perform all of the functions described herein (e.g., any of the same functions described herein as for session region 502-1). Although most examples describe herein illustrate one or more sensors within the session region, in some embodiments, the session region is displayed regardless of whether the one or more sensors are encompassed by the session region.

FIG. 5A illustrates a user input 504-1, such as a tap input, selecting an icon 424 for a messaging application. User input 504-2 in FIG. 5B is analogous to user input 504-1 in FIG. 5A. In response to the user input 504-1 (or user input 504-2), the device 100 displays a user interface 500 for the messaging application, as illustrated in FIG. 5C. As illustrated in FIG. 5C, the device 100 maintains display of the session region 502-1 (or analogously, session region 502-2) while the user navigates between user interfaces on device 100 (e.g., from a home screen user interface to the user interface for the messaging application). In some embodiments, while the device 100 displays the user interface 500, the device 100 receives a request to initiate a communication session. For example, device 100 receives an incoming telephone call (e.g., from "Max"). In some embodiments, in response to receiving the incoming telephone call, the device 100 updates the session region 502-1 to an expanded session region 502-3, as illustrated in FIG. 5D. In some embodiments, the expanded session region 502-3 includes information about the incoming request and/or one or more controls for interacting with the incoming request. For example, the session region 502-3 includes contact information associated with the incoming call (e.g., information indicating that the call is from "Max") and/or a stored contact photo or icon associated with the contact. In some embodiments, the session region 502-3 further includes a plurality of control options, including an option 510 to accept the call and an option 508 to decline the call, as shown in the FIG. 5D example.

In some embodiments, the session region 502-3 is displayed with a visual effect on at least one side of the session region 502-3. For example, a shadow 514-1 is displayed for session region 502-3. In some embodiments, a size and/or darkness of the shadow is selected in accordance with a current size of the session region. For example, while the session region is displayed at a minimized size (e.g., its minimum size) (e.g., session region 502-1), such as when there are no active sessions associated with the session region, the session region is displayed without a shadow or other visual effect. In some embodiments, while the session region is minimized, the session region is considered to be an empty session region (e.g., even if some status information is displayed in the status region, if the displayed status region fits in the minimized status region, such as between sensor regions, such as privacy indicator information or device lock/unlock state information). In some embodiments, while the session region is displayed at a first size that is larger than its minimized size (e.g., a condensed size, such as that of session region 502-3, in which a first set of information and/or interaction options for an active session are displayed), the session region is displayed with a shadow 514-1, the shadow 514-1 having a first size and a first darkness level (or collectively, a first intensity). In some embodiments, while the session region is displayed at a second size that is larger than the first size (e.g., an expanded size, such as that of session region 502-5 in FIG. 5I, in which a greater second set of information and/or interaction options for the active session are displayed), the session region is displayed with a shadow 514-2 having a second size and a second darkness level (or collectively, a second intensity), wherein the second size and/or the second darkness level is greater than the first size and/or the first darkness level (e.g., the second intensity is greater than the first intensity).

FIG. 5D further illustrates that, while the session region 502-3 is displayed with an expanded size, wherein the expanded size includes one or more controls and/or additional information for a current session (e.g., for the phone call) associated with the session region, a visual effect is applied to a portion of the display area that is outside of the session region. For example, a blurred visual effect 512 is applied to a portion of the user interface 500 to emphasize the session region 502-3, in that the session region 502-3 appears to be displayed on top of a visually deemphasized portion, optionally less than all, of the user interface 500. In some embodiments, the blurred visual effect 512 is applied to a top third or a top half of the user interface 500, or other fraction or percentage. In some embodiments, the blurred visual effect 512 has a predefined size (e.g., is maintained in size) regardless of a current size of the session region, including whether the session region is expanded or collapsed (or minimized). In some embodiments, the blurred visual effect 512 changes in intensity based on an area of the user interface 500 to which it is applied. For example, in some embodiments, the blurred visual effect 512 is a gradient effect that generates more blurring in the user interface closer to the session region and less blurring in the user interface farther from the session region. For example, the blurred visual effect 512 gradually decreases the amount of blurring of user interface 500 as a distance from the session region increases. In some embodiments, the gradient of the blurred visual effect 512 is applied (e.g., progresses) in one direction (e.g., downward) along the user interface.

In some embodiments, the blurred visual effect 512 is displayed gradually (e.g., as moving outward and/or downward from the session region and/or as increasing in intensity over time, optionally by progressing through a plurality of intermediate states over time) in accordance with a size of the session region increasing. For example, while the session region is collapsed or minimized, optionally no blurred visual effect 512 is applied to the user interface surrounding the session region. In some embodiments, as the session region gradually expands, optionally while animating outward from the collapsed session region to an expanded session region, the blurred visual effect 512 gradually (optionally at the same or a proportional rate to the session region expanding) shifts onto the display. In some embodiments, the blurred visual effect 512 gradually shifts from a top edge of the display downward. In some embodiments, in accordance with the session region collapsing from its expanded size to its condensed size or to its minimized size, the blurred visual effect 512 gradually shifts out of the display, optionally by sliding up and off the top edge of the display and/or decreases in intensity to fade out.

In some embodiments, the device 100 detects a user input 516, such as a tap input or other gesture, selecting the option 510 to accept the call. In response to the user input 516, the device establishes the communication session (e.g., between the calling user "Max" and the user of device 100), and automatically shrinks the session region 502-3 to a condensed active session size, as illustrated as session region 502-4 in FIG. 5E, wherein the condensed active session size is a non-expanded view of an active session. The non-expanded view of an active session, however, is nevertheless expanded relative to the minimized (e.g., minimum) session region size (e.g., the size of session region 502-1). For example, in FIG. 5C, no sessions are active, and thus session region 502-1 is displayed at a minimized size that does not include information for an active session, while in FIG. 5E, there is an active session for the communication session (e.g., phone call with "Max"), so the session region is expanded (e.g., to the left and/or right, and/or upward, and/or downward), relative to its minimized size, to include information about the ongoing session (yet is less expanded than in FIGS. 5D and 5I, for example).

In some embodiments, one or more status indicators (e.g., a current device time labeled "Time", battery indicator 506, cellular network indicator 503, and/or Wi-Fi indicator 505) are displayed while the session region is minimized, as shown in FIG. 5C. In some embodiments, as the status region is increased in size from the minimized size (FIG. 5C) to a condensed size or to an expanded size (FIG. 5D), one or more status indicators are repositioned on the display (e.g., to accommodate the session region increasing in size). For example, as session region 502-1 (FIG. 5C) is updated to session region 502-3 (FIG. 5D), the "Time" indicator is optionally moved to the left, and the battery indicator 506, cellular network indicator 503, and/or Wi-Fi indicator 505 are optionally moved to the right. In some embodiments, the battery indicator 506, cellular network indicator 503, and/or Wi-Fi indicator 505 are compressed and displayed closer to one another, optionally as one or more of battery indicator 506, cellular network indicator 503, and/or Wi-Fi indicator 505 cease to be displayed.

Figure 5F:
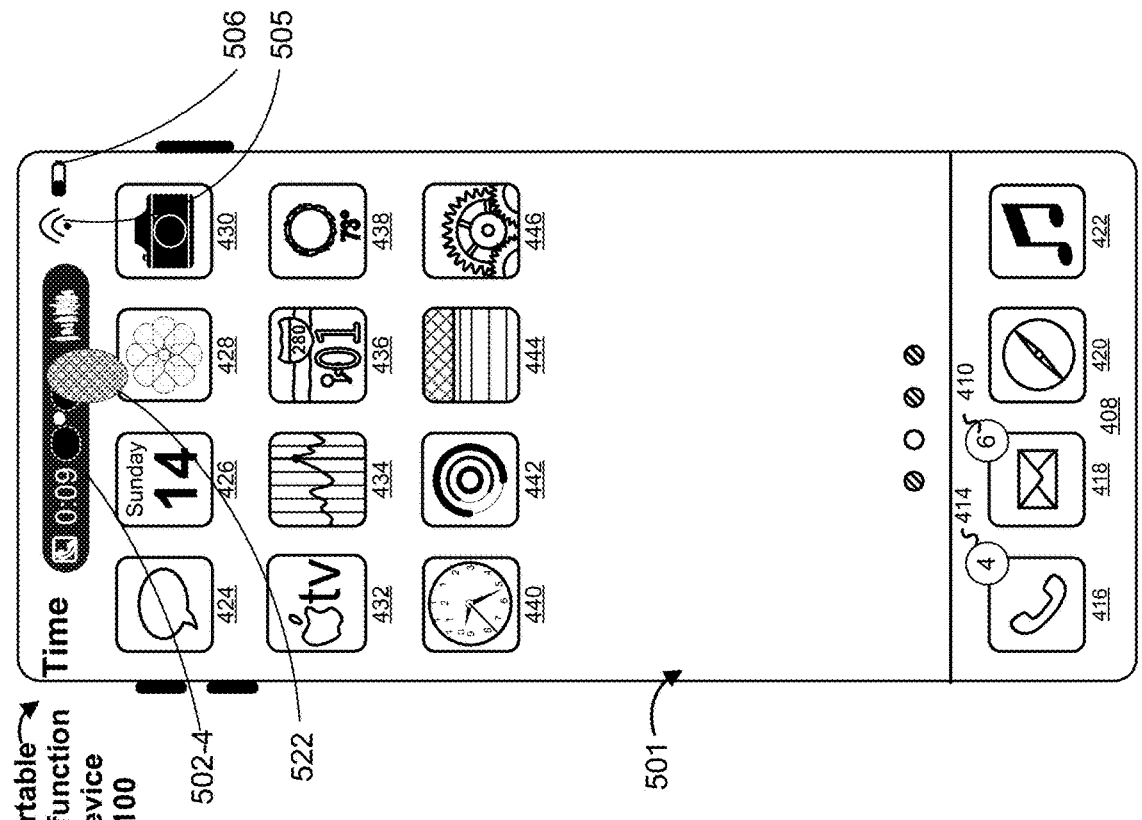

In some embodiments, while the session region is expanded, one or more status indicators (e.g., battery indicator 506, cellular network indicator 503, and/or Wi-Fi indicator 505) cease to be displayed. For example, based on a current size of the session region, one or more status indicators are removed from the display. In some embodiments, all of the status indicators are no longer displayed (e.g., as illustrated in FIG. 5D), for example while the session region is expanded over the entire portion of the display in which the one or more status indicators are displayed. In some embodiments, the one or more status indicators that are removed are selected based on a current state of device 100, particularly in circumstances in which fewer than all of the one or more status indicators are removed. For example, the device is enabled to switch between a mode of using cellular data and a mode of using Wi-Fi. In some embodiments, the indicator that matches the current mode of the device 100 continues to be displayed, and an indicator for a mode of the device 100 that is not currently active is not displayed (e.g., removed). For example, in FIG. 5E, the cellular network indicator 503 is displayed, while the Wi-Fi indicator 505 is hidden, optionally in accordance with a determination that the device 100 is using the cellular network and is not connected to, or not actively using, Wi-Fi (e.g., for the ongoing phone call). In FIG. 5F, the cellular network indicator 503 is hidden, while the Wi-Fi indicator 505 is displayed, optionally in accordance with a determination that the device 100 is connected to and/or using Wi-Fi and not actively using the cellular network (e.g., for the ongoing phone call). In some embodiments, if the device changes from being connected to and/or actively using Wi-Fi to being connected to and/or actively using the cellular network (or vice-versa), the currently displayed status indicator is dynamically updated to reflect the current type of connection.

In some embodiments, as the session region changes size, a number and spacing of status indicators changes dynamically (e.g., in FIG. 5C, Time is shown to the left of the session region and a cellular signal indicator, Wi-Fi indicator, and battery indicator are displayed to the right of the session region), as the session region expands (or additional session regions are added), the number of status indicators changes (e.g., removing the cellular signal indicator as shown in 6E and 6F). In some embodiments, as the session region size changes one or more of the status indicators gradually move to create more room (e.g., if the session region is increasing in size) or to fill in empty space (e.g., if the session region is decreasing in size). In some embodiments, the movement of the status indicators changes a spacing between the status indicators (e.g., increasing or decreasing the space between adjacent status indicators). In some embodiments, where there is only a single status indicator, the status indicator moves to the left or to the right as the session region gets larger or smaller in order to maintain the status indicator generally centered in the region between the edge of the display and the edge of the session region that is closest to the status indicator. In some embodiments, the changes in size of the session region are gradual and the corresponding changes in number and/or spacing of the status bar indicators is also gradual. While specific examples of status indicators are described above, it should be understood that the device may display a variety of status indicators in the status region, including indicators of notifications, network activity, wireless connectivity, Bluetooth connectivity, headphone connection, location information use, virtual private network connection status, or the like.

Figure 5E:
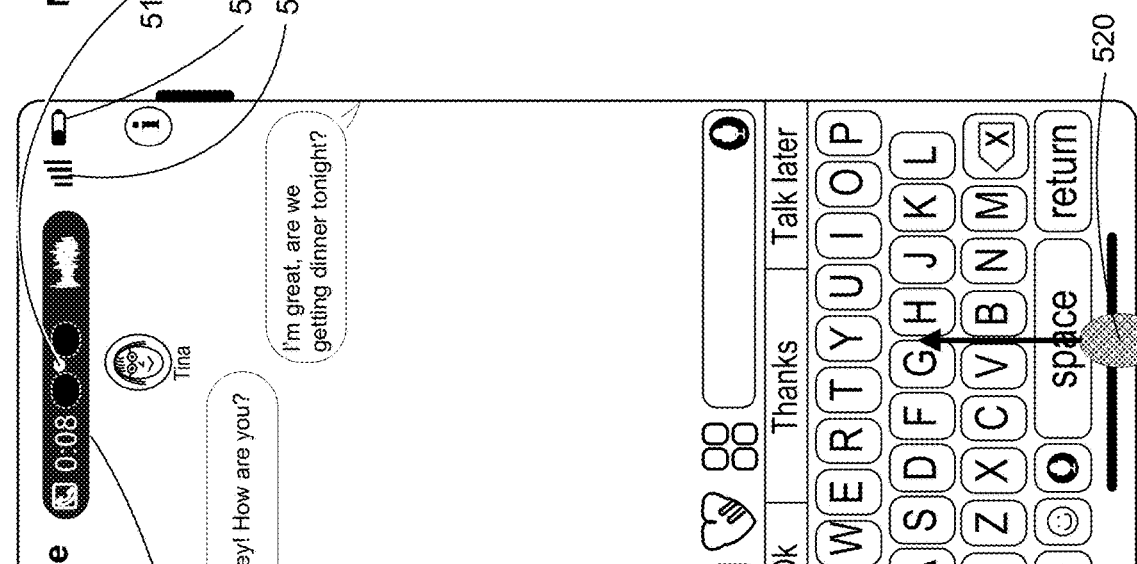

In some embodiments, at the condensed active session size shown in FIG. 5E, session region 502-4 comprises information for a current session. For example, session region 502-4 displays information for the ongoing communication session. In some embodiments, the information includes an indication of an application, or software, that is currently in use for the active session. For example, a phone icon is displayed and a length of time that the phone call has been ongoing is displayed. In some embodiments, an audio waveform is displayed to illustrate incoming and/or outgoing audio information (e.g., that is part of the phone call). In some embodiments, different portions (e.g., along one axis such as the horizontal) of the waveform represent different audio frequencies, and in some such embodiments, the height of a respective portion (e.g., of the different portions) of the waveform represents the amplitude of the audio signal for a frequency or frequency band corresponding to the respective portion of the waveform.

In some embodiments, the audio waveform comprises at least two portions, including a first portion (e.g., a leftmost or left-aligned portion) and a second portion (e.g., a rightmost or right-aligned portion). In some embodiments, the first portion displays incoming audio (e.g., audio received during the phone call), and the second portion displays outgoing audio (e.g., audio detected by one or more microphones of device 100 that is transmitted to one or more other call participants during the phone call), or vice-versa. In some embodiments, the first portion of the audio waveform is displayed with a first color, such as blue or green (or a first range of colors such as a blue-green spectrum of colors), and the second portion of the audio waveform is displayed with a second color that is distinct from the first color, such as red or orange (or a second range of colors such as a red-orange spectrum of colors). As such, the audio waveform visually distinguishes between different audio sources (e.g., incoming versus outgoing audio data). In some embodiments, the audio waveforms at least partially overlap. In some embodiments, each audio waveform (e.g., for incoming and outgoing audio) is assigned a different range of the audio waveform such that, when concurrently displayed, both audio waveforms are at least partially overlapping and non-overlapping. For example, the incoming audio is only or primarily displayed on the left-aligned portion of the audio waveform and the outgoing audio is only or primarily displayed on the right-aligned portion of the audio waveform.

In some embodiments, the session region 502-4 includes a privacy indicator 518 (e.g., as also described herein with reference to FIG. 5A) that is optionally displayed in a display area between the sensor cutouts (e.g., for speaker 111 and/or sensors 164), and that indicates current or recent use of the camera, microphone, and/or location sensors to capture information about the device or the environment of the device. For example, the session region 502-4 surrounds each of the sensor cutouts, and is enabled to display one or more icons or other visual elements between the sensor cutouts (e.g., the area between the sensors is part of the display of device 100). In some embodiments, while the session region displays an active session, the privacy indicator 518 is displayed outside of the session region, for example in the corner of the display (e.g., next to or above the battery indicator 506). In some embodiments, initially displaying privacy indicator 518, for example in response to device 100 starting to use one or more sensors that trigger display of privacy indicator 518, includes gradually changing (e.g., reducing) a degree of blurring of privacy indicator 518 (e.g., progressing through a plurality of intermediate display states). In some embodiments, ceasing to display privacy indicator 518, for example in response to device 100 ceasing to use the one or more sensors that triggered the display of privacy indicator 518, is performed without gradually changing the degree of blurring of privacy indicator 518 (e.g., the degree of blurring of privacy indicator 518 is maintained whether or not other visual properties, such as opacity and/or brightness, of privacy indicator 518 are gradually changed as privacy indicator 518 ceases to be displayed).

In some embodiments, the session region 502-4 updates the displayed information while the session continues to be active. For example, while the communication session is ongoing, the length of time that the phone call has been ongoing is updated (e.g., from 0:08 in FIG. 5E to 0:09 in FIG. 5F), and the audio waveform is updated in accordance with the current audio data. For example, if "Max" is providing audio data, the portion of the audio waveform for incoming audio is animated in accordance with the audio data, whereas if the user of device 100 is not providing any audio data (e.g., the user of device 100 is not speaking), the portion of the audio waveform for outgoing audio is displayed as flat (e.g., without a waveform or as a waveform with zero volume).

In some embodiments, in response to a user input 520 (e.g., a swipe input, a drag gesture, a button press, or other user input), device 100 ceases displaying the user interface 500 and displays the home user interface 501. In some embodiments, as the user navigates between an application user interface, such as the messaging application user interface 500, and other application user interfaces and/or other system user interfaces, such as the home screen user interface 501, display of the session region 502-4 is maintained. Accordingly, the user is enabled to view up-to-date information about an ongoing session as the user interacts with other applications on the device 100.

Figure 5H:
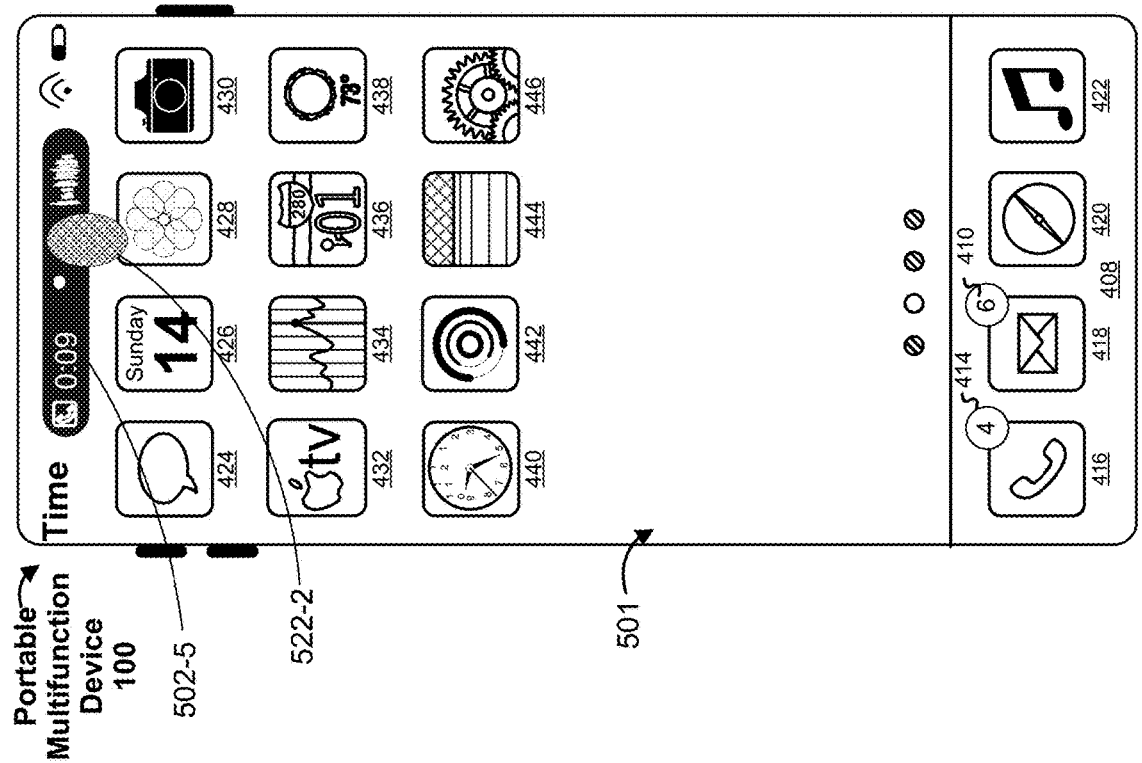
Figure 5G:
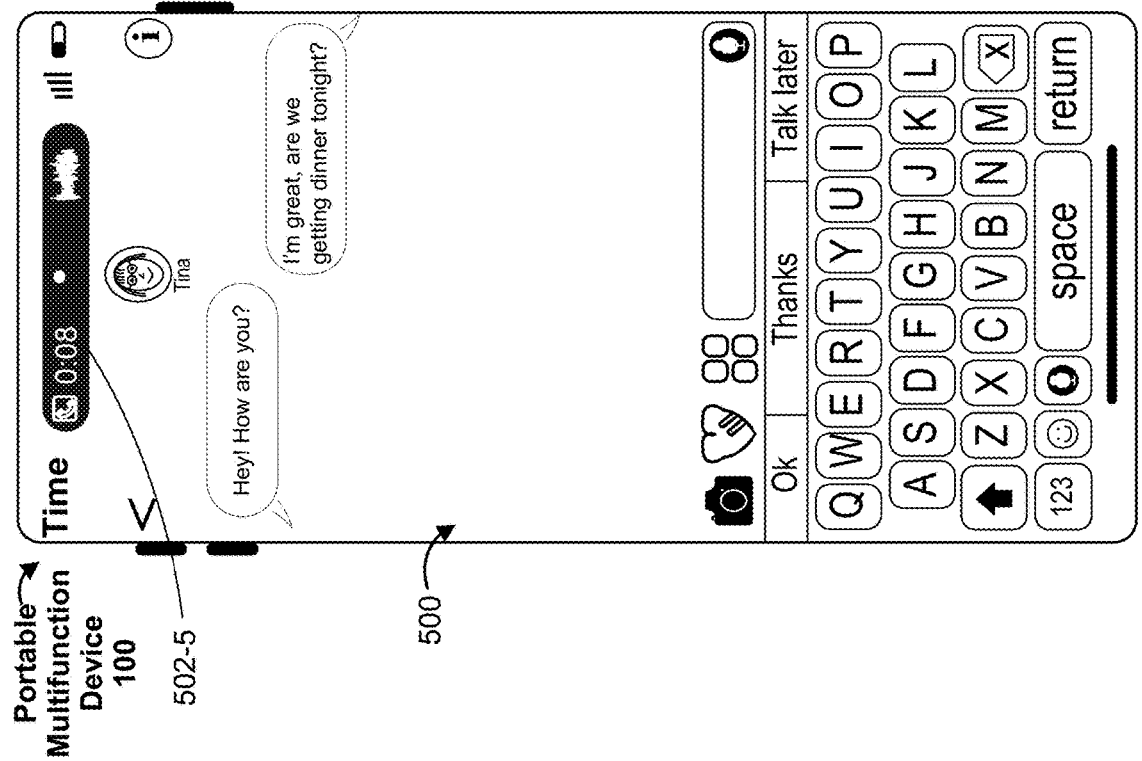

FIGS. 5G-5H illustrate session region 502-5 that is displayed on a device 100 in an embodiment in which device 100 is configured without one or more sensors in the session region 502-5. For example, the features and functions described above with reference to FIGS. 5E-5F are also features and functions enabled for the device as illustrated in FIG. 5G-5H. Accordingly, the session region 502-5 displays the same information for an active session regardless of whether one or more sensor cutouts and/or one or more sensors are positioned within the sensor region. For example, session region 502-5 in FIG. 5G has the same appearance as session region 502-4 in FIG. 5E, and session region 502-5 in FIG. 5H has the same appearance as session region 502-4 in FIG. 5F.

In some embodiments, in response to detecting a user input 522 as shown in FIG. 5F (or an analogous user input 522-2 as shown in FIG. 5H), such as a tap input, the session region 502-4 (or session region 502-5) expands to display additional information about the active session in session region 502-6, as illustrated in FIG. 5I In some embodiments, in addition to expanding the display of the session region to session region 502-6, the device 100 provides non-visual output, such as audio and/or haptic output. As noted above, in some embodiments, a size and/or darkness of shadow 514-2 is based on a size of the session region 502-6. For example, a larger session region corresponds to a larger size and/or a darker shadow (e.g., as shown for session region 502-6) than the shadow for a smaller region (e.g., as shown for session region 502-3). In some embodiments, one or more session regions are displayed without a shadow, for example, in the minimized session region and/or condensed session regions associated with certain applications (e.g., session regions 502-1 and 502-4).

In some embodiments, the visual effect, such as the blurred visual effect 512, is displayed over a same portion of the currently displayed user interface 501 in FIG. 5I as the portion of the user interface 500 described with reference to FIG. 5D.

FIG. 5I illustrates expanded session region 502-6 that includes a plurality of control options for controlling operations of the software and/or application associated with the current session. For example, during the ongoing communication session, in response to the user providing a first type of input (e.g., a tap input 522) on the session region 502-4, a plurality of control options, including a control 530-1 to end the communication session, a control 530-2 to initiate a video communication session, and/or a control 530-3 to mute/unmute a microphone of device 100 are displayed. In some embodiments, additional and/or alternative control options are also displayed, such as a keypad control for entering digits and/or a speaker control for toggling speakerphone on or off for the communication session. It will be understood that different applications and/or software associated with a respective session will provide different sets of controls for the respective session. For example, controls for controlling the communication session are provided in FIG. 5I; in another example, controls for stopping and/or pausing a timer are provided during a timer session; and in yet another example, controls for media playback are provided for a media player session. In some embodiments, in response to the user interacting with a respective control in the session region 502-6, device 100 performs an operation that corresponds to the control. For example, in response to the user selecting control 530-3, the device 100 mutes (if currently muted) or unmutes (if currently unmuted) a microphone and ceases to provide outgoing audio data to the communication session with "Max," as described with reference to FIGS. 5K-5M.

In some embodiments, privacy indicator 518 is optionally displayed at a different location while the session region 502-6 is expanded than while the session region is condensed or minimized. For example, the privacy indicator 518 is optionally displayed at an edge of expanded session region 502-6 or displayed outside of the session region 502-6 (e.g., in the background next to the status indicator of the battery or in a top corner of the display), and is not displayed between the sensor cutouts. For example, FIG. 5I illustrates privacy indicator 518-a is optionally and alternatively displayed outside of expanded session region 502-6, in a corner of the display area, in contrast to privacy indicator 518 displayed at the edge of expanded session region 502-6. In some embodiments, session region is expanded to a size that leaves a small region near the edge of the display unoccupied (e.g., as illustrated in FIGS. 5D, 5AK, 5AM, and 5AY, in which case the privacy indicator is displayed in between the edge of the session region and the edge of the display that is close to the session region, including the top, left, or right sides in FIG. 5D or 5AY, or the top edge in FIG. 5AK or 5AM). In some embodiments, privacy indicator 518 is optionally displayed at a different location while the session region is condensed than while the session region is minimized (as well as at yet another different location while the session region is expanded). For example, in FIG. 5J, privacy indicator 518-b is alternatively displayed outside of the condensed session region 502-5, optionally next to (e.g., to the right or to the left of) session region 502-5, instead of within session region 502-5 (e.g., in between sensor regions).

In some embodiments, while the session region 502-6 is expanded and displaying the plurality of control options, the user is unable to interact with user interface elements displayed in the user interface 501 that is outside of the session region 502-6. For example, a user input 526 on an application icon 438 optionally does not launch the application associated with icon 438. Instead, in some embodiments, a user input 526 detected outside of the session region 502-6 simply causes the session region 502-6 to contract, or otherwise reduce in size, back to its condensed size as session region 502-5, as well as optionally causing any corresponding visual effects, such as a shadow and/or a blur effect, to cease to be displayed. In some embodiments, the session region continues to update the information related to the ongoing session, such as updating the length of time that the communication session has been ongoing, even as the size of the session region changes. In some embodiments, while the session region 502-6 is expanded, at least a portion of the content displayed in the user interface outside of the session region 502-6 is occluded, at least partially by a visual effect (e.g., a shadow and/or a blur effect around session region 502-6) and/or completely occluded by the session region 502-6. Accordingly, FIG. 5J shows, in response to user input 526, session region 502-6 reduced to its condensed size as session region 502-5, and shadow 514-2 and blur effect 512 having ceased to be displayed.

FIG. 5J illustrates detecting a user input 528 that at least partially overlaps with the session region 502-5. In some embodiments in which one or more sensors are positioned within the session region, device 100 is enabled to detect user inputs that occur over the one or more sensors, and treats such user inputs as inputs directed to the session region. For example, if a user taps on a portion of device 100 that corresponds to at least one sensor that is within the session region, the device 100 interprets the user input on the sensor as an input directed to the session region. In some embodiments, in response to a user input 528 that is directed to the session region 502-5 and in particular at least partially to a sensor region within session region 502-5, the session region 502-5 is expanded to session region 502-6 (e.g., of FIG. 5K). In some embodiments, based on the type of user input 528 directed to the session region 502-5, different operations are performed. For example, in response to detecting the user input directed to session region 502-5, if the user input is a tap user input, the device 100 displays an application user interface that corresponds to the active session displayed in the session region 502-5 (e.g., a phone call user interface displayed outside of the session region, instead of the home user interface 501), and if the user input is a long press user input, the device 100 displays the expanded session region 502-6 (e.g., while maintaining display of the home user interface 501, and without displaying the application user interface).

Figure 5L:
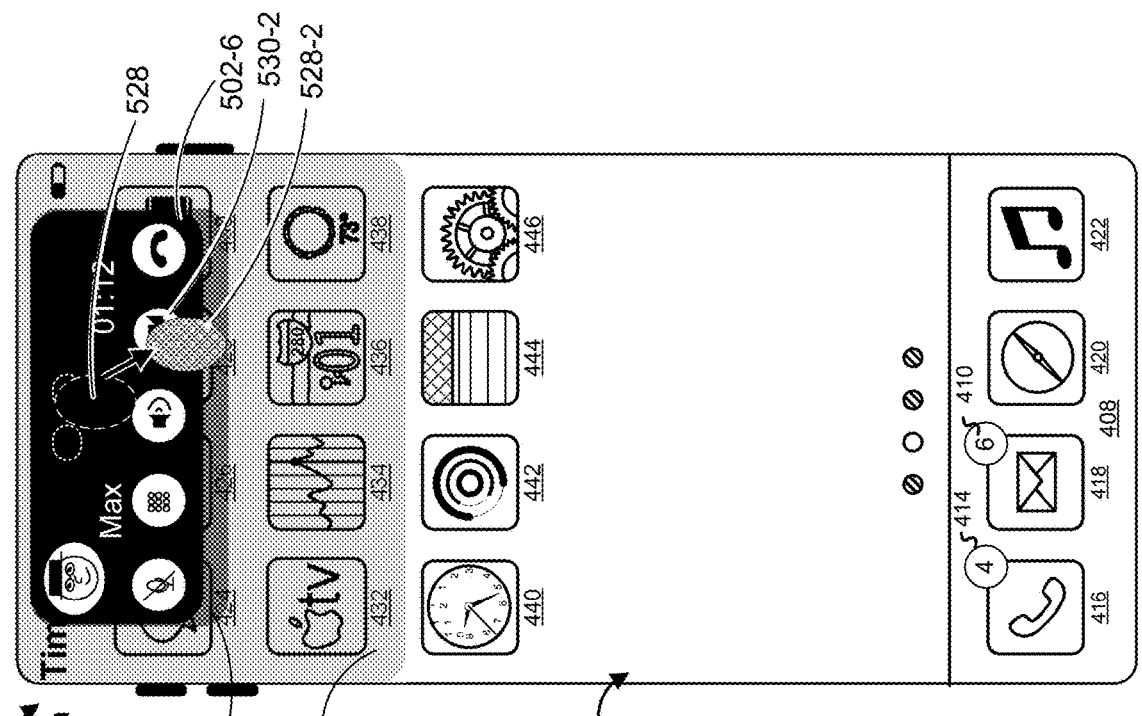
Figure 5K:
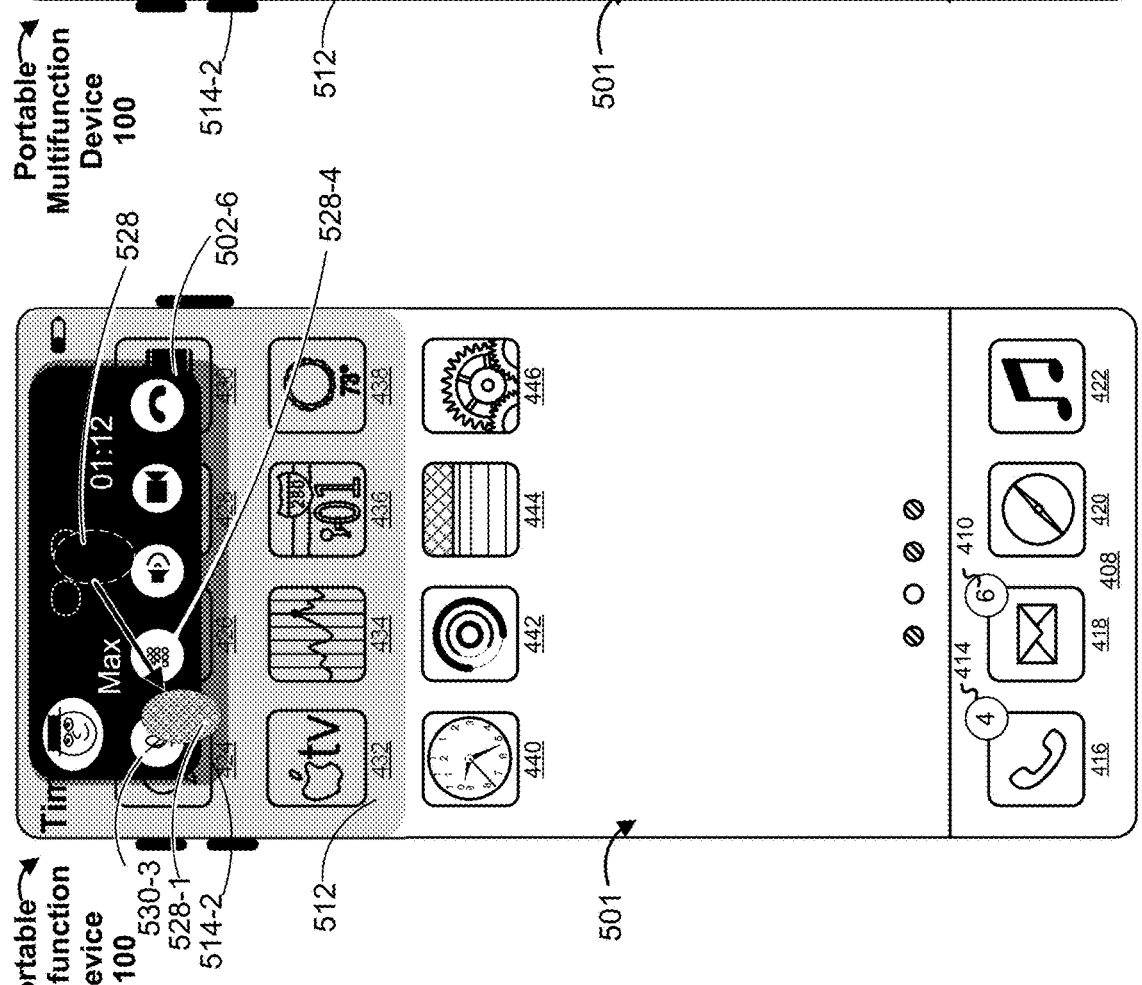

FIGS. 5K-5M illustrate examples of a user selecting one of the control options that is displayed in the expanded session region 502-6. In some embodiments, the user maintains the user input 528, illustrated in FIG. 5J, by continuing to contact the display of device 100. For example, the user initiates the contact at the location of user input 528 (FIG. 5J) and is enabled to, while maintaining contact with the display, move the contact to perform a drag, or swipe, gesture. In some embodiments, the session region 502-5 is expanded to the expanded session region 502-6 in response to a first portion (e.g., a long press portion) of user input 528, and the movement of the contact (e.g., a drag portion) occurs during a second, continued portion of user input 528 that immediately follows the first portion. In some embodiments, a location on the display at which the user stops the contact (also referred to herein as lifting-off of the contact) is selected. For example, in FIG. 5K, the user drags user input 528 to a position on the display that corresponds to the control 530-3 before the user lifts off the contact 528-1 from over the control 530-3. In response to the user lifting off the contact 528-1 from over the control 530-3, the device 100 mutes a microphone and ceases to provide audio output to the communication session, thus performing the operation associated with control 530-3, as well as optionally provides audio and/or haptic feedback in response to the lifting off of the contact 528-1.

In some embodiments, as the user moves the contact around the display area, in response to the contact partially overlapping a control option, an audio and/or haptic output is optionally provided by device 100 to indicate that the user input is enabled to select a control option, and indicating that the control option is currently selected for activation, if the user input 528 were lifted off from its current location. For example, in the process of moving to the control 530-3 in FIG. 5K, the contact 528-1 moves over keypad control 528-4, in response to which device 100 generates an audio and/or tactile feedback indicative that contact 528-1 is over an activatable control option. However, in scenarios in which contact 528-1 is not lifted off while over keypad control 528-4, a keypad is not displayed in response to user input 528. For example, as the contact from user input 528 moves around session region 502-6, device 100 provides a non-visual output (e.g., an audio and/or haptic output) to alert the user as the contact moves over any of the control options (e.g., each time the contact moves over a respective control option). For example, a first non-visual output is generated in response to user input 528 moving over a first control option, followed by a second non-visual output generated in response to user input 528 moving off of or away from the first control option and over a second control option instead (or in some embodiments moving off of and then back over the same first control option), and so on.

FIG. 5L illustrates an example of the user lifting-off the contact 528-2 that was initiated as user input 528 over control option 530-2 for initiating a video communication session. In response to the user lifting-off the contact 528-2 from over control option 530-2, the device 100 initiates a video call. Similarly, in FIG. 5M, in response to the user lifting off the contact 528-3 while at a position that overlaps with control option 530-1 for ending the communication session, the device 100 ends the ongoing communication session (e.g., hangs up the phone call with "Max").

In some embodiments, in accordance with a determination that the ongoing session has ended, for example, by hanging up the phone call in FIG. 5M, the session region 502-1 is redisplayed as shown in FIG. 5N. In some embodiments, the session region 502-1 is maintained on the display while the device 100 is on and in an active state (e.g., not in sleep or low-powered state). Thus, even after the user has ended the communication session that was displayed in session region 502-6, the device 100 contracts the session region 502-1 to its minimized state in which there are no active sessions and continues to display the session region 502-1.

FIG. 5N illustrates detecting a user input 532 on the session region 502-1. In some embodiments, in accordance with a determination that no active sessions are currently associated with the session region 502-1, in response to the user input 532, the session region 502-1 expands, wherein the expanded session region 502-1b, illustrated in FIG. 5O, optionally expands a background color of the session region (e.g., black) in all directions. In some embodiments, the session region 502-1 expands in one direction more than another direction or in one direction but not in other directions. For example, the session region expands in the horizontal direction but not the vertical direction (e.g., while device 100 is in portrait mode as shown in FIG. 5O), or more generally lengthens (e.g., in the longer dimension) while changing less (or without changing) in width (e.g., the shorter dimension). In some embodiments, the session region is expanded to the session region 502-1b for a predetermined period of time (e.g., 0.2 seconds, 0.5 seconds, 1 second, 5 seconds, 10 seconds, 30 seconds, or 60 seconds). In some embodiments, after expanding to the session region 502-1b, the session region automatically contracts back to its minimized size as session region 502-1 in FIG. 5P (e.g., in response to expiration of the predetermined period of time).

In some embodiments, the session region 502-1 expands to session region 502-1b directly in response to initial detection of user input 532. In some embodiments, the session region 502-1 expands to session region 502-1b in accordance with a determination that user input 532 is ongoing (e.g., has been maintained) for a threshold amount of time (e.g., user input 532 is an input, such as a press and hold input that is maintained for at least 1 second, 2 seconds, 3 seconds, or 5 seconds). In some embodiments, the session region 502-1b optionally contracts, or decreases in size, in accordance with an end of user input 532 (e.g., in response to liftoff of user input 532). In some embodiments, the session region 502-1b optionally contracts regardless of the status of user input 532, for example, the session region 502-1b contracts after the predetermined period of time has elapsed (e.g., since initial detection of user input 532, or since session region 502-1 was expanded to session region 502-1b), even if user input 532 is still ongoing. In some embodiments, in response to user input 532, and optionally in accordance with a determination that user input 532 is ongoing for the threshold amount of time, the device 100 optionally outputs non-visual feedback, such as a tactile output and/or an audio output (e.g., as illustrated by output 533 in FIG. 5O). In some embodiments, if there is an active session associated with the session region, and a user input is detected on the session region, the device 100 optionally provides a different non-visual feedback (e.g., a different tactile output and/or a different audio output), or does not provide a tactile and/or audio output while providing additional information about the active session, as described with reference to FIGS. 5AL-5AM.

Figure 5R:
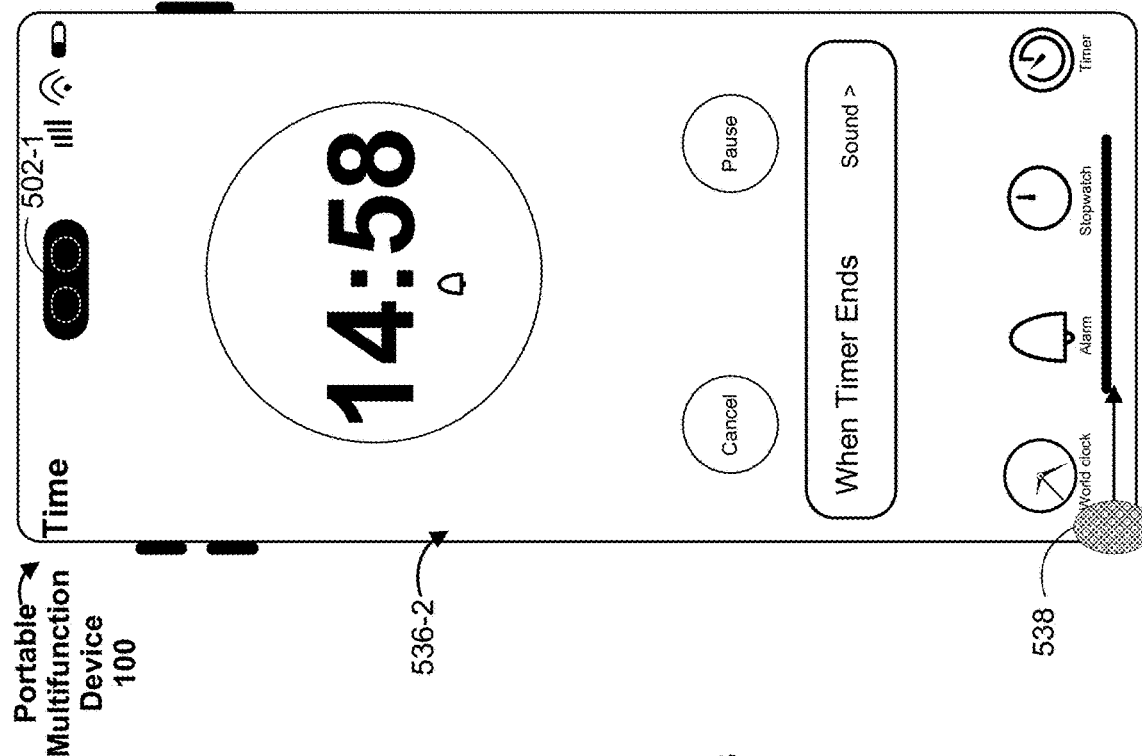
Figure 5Q:
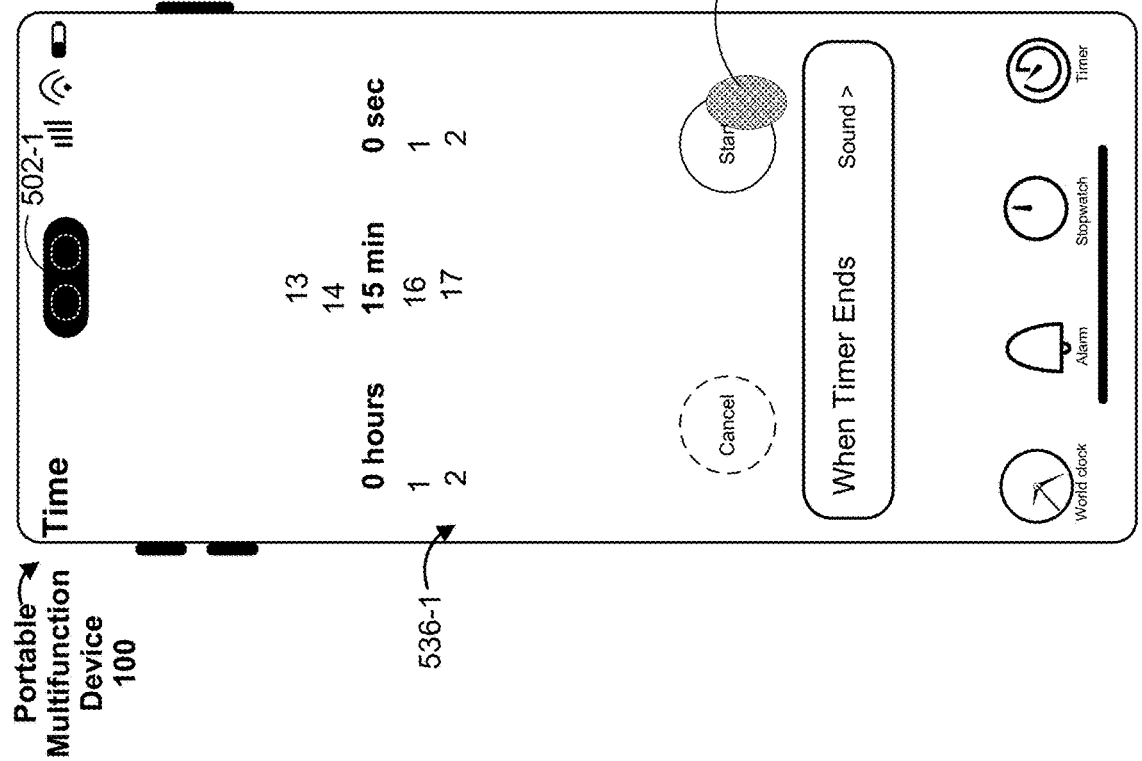

FIG. 5P illustrates a user input 534, such as a tap input or a press and hold gesture, detected on an icon 440 for a clock application. In some embodiments, in response to detecting the user input 534, the device 100 displays a user interface 536-1 for the clock application, as illustrated in FIG. 5Q. In some embodiments, the user interface 536-1 provides the user with an option to set a timer on device 100 and select a sound or other notification to alert the user when the timer has completed. FIG. 5Q illustrates the user starting a timer for 15 minutes by selecting, via user input 538, a start button in user interface 536-1. In some embodiments, as illustrated in FIG. 5Q, while the user is interacting with the user interface for the clock application, the session region 502-1 continues to be displayed. In FIGS. 5Q-5R, the session region 502-1 is not associated with a currently active session, and thus appears as a solid-colored background (e.g., black or another solid color).

Figure 5T:
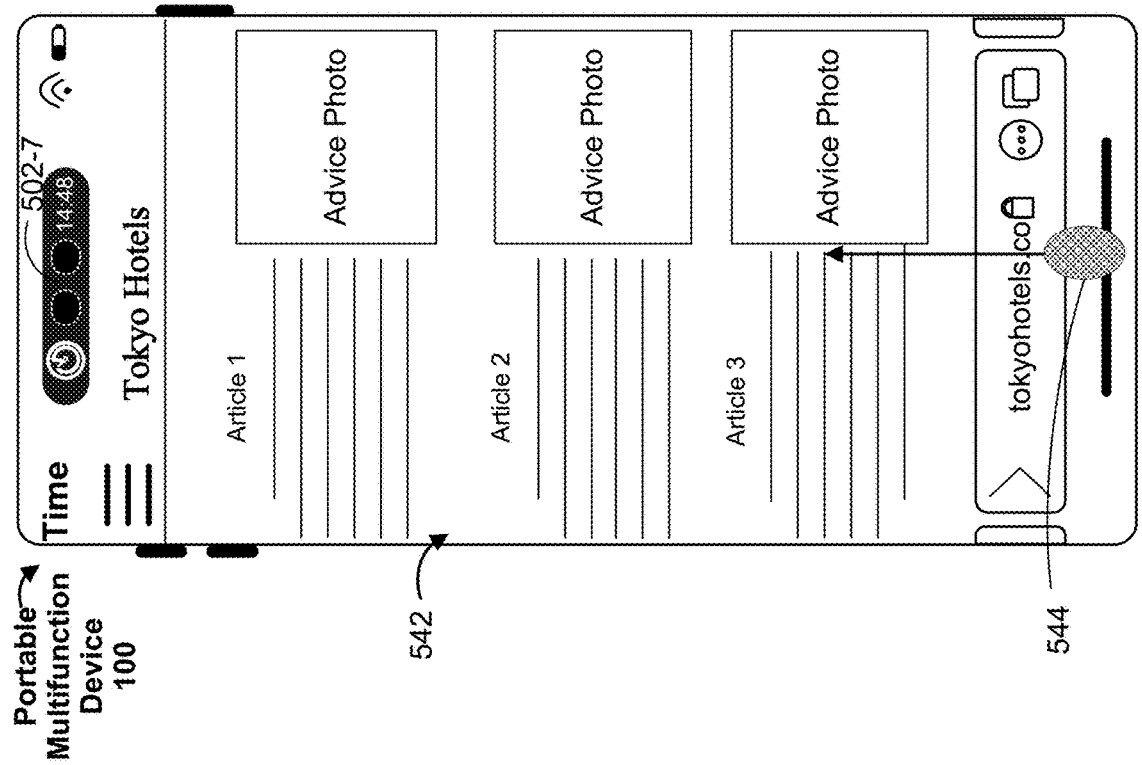
Figure 5S:
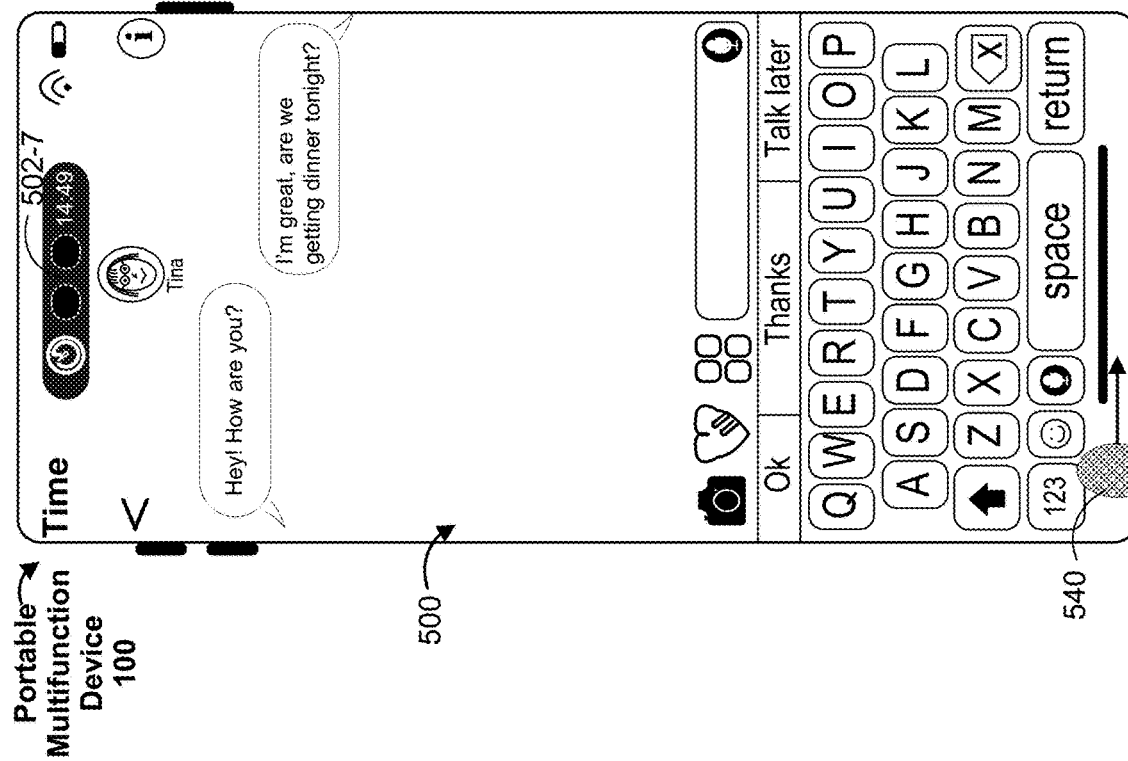

FIG. 5R illustrates a second user interface 536-2 for the clock application that includes a display of a timer counting down. In some embodiments, the device 100 detects a user input to switch from displaying the second user interface 536-2 for the clock application to another user interface. For example, the user is enabled to navigate from an application user interface for a first application to an application user interface for a second application and/or to a system user interface (e.g., a home screen and/or a wake screen). In some embodiments, a swipe gesture, such as input 538, at a particular portion of the display (e.g., at a bottom edge in a horizontal direction (e.g., left or right)) allows the user to navigate between application user interfaces for applications that are currently open or otherwise executing on device 100. For example, as illustrated in FIGS. 5R-5S, the user switches between the second user interface 536-2 for the clock application to the user interface 500 for the messaging application. In some embodiments, the application user interface that is displayed in response to the application switching input 538 is the user interface for the most recent previously opened application, or the user interface for the next (or previous) application in a sequence of open or recently open applications (e.g., the messaging application or another recently open application) after the clock application.

FIG. 5S further illustrates that, in response to the user input 538 that causes the device 100 to cease displaying the second user interface 536-2, information about the ongoing timer is displayed in the session region 502-7 while the user interface 500 is displayed on the rest of the display (e.g., because that information is no longer visible in the main application region). In some embodiments, the timer is one of a plurality of event types associated with an application that is displayed in the session region 502-7. For example, as described in more detail below with respect to FIG. 5BL, the session region displays continuous updates for a plurality of session types while the session is active and/or ongoing, including for an active timer session. In some embodiments, the session region 502-7 displays an application icon (e.g., the timer icon to the left of the sensors) identifying an application associated with the active session, and displays a first set of information about the active session, such as a countdown of the time remaining on the timer (e.g., "14:49" in FIG. 5S) (e.g., to the right of the sensors). In some embodiments, as described above, while the session region is large enough to display information about a currently active session, one or more status indicators are removed (e.g., the cellular connection status indicator is not displayed in FIG. 5S), particularly if the session region is expanded so as to occupy at least some of the display area in which status indicators are displayed (e.g., the top right area of the display in FIG. 5S). In some embodiments, all of the status indicators are optionally removed (e.g., in accordance with a determination that the session region is expanded in the horizontal direction so as to overlap all of the status indicators, such as by overlapping at least a part of every status indicator).

In some embodiments, the session region 502-7 continues to be displayed as the user navigates between other application user interfaces. For example, in FIG. 5S, a user input 540 (e.g., an edge swipe gesture from left to right) is detected, and in response to the user input 540, the device 100 displays, as shown in FIG. 5T, a user interface 542 for another application (e.g., a web browser), optionally wherein the application was recently opened on device 100 or is the next (or previous) application in the sequence of open applications after the messaging application. As illustrated in FIG. 5T, the session region 502-7 continues to update by changing the amount of time remaining on the timer (e.g., "14:48" in FIG. 5T).

Figure 5V:
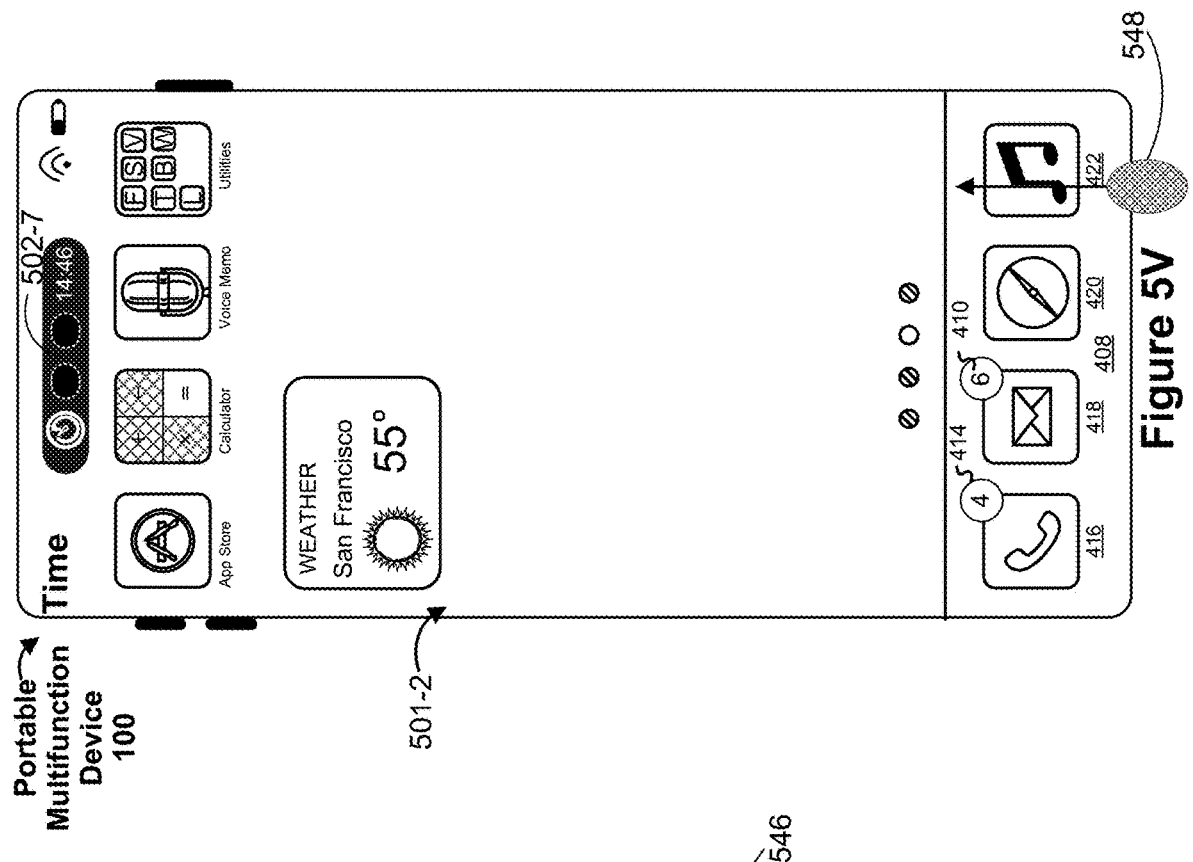
Figure 5U:
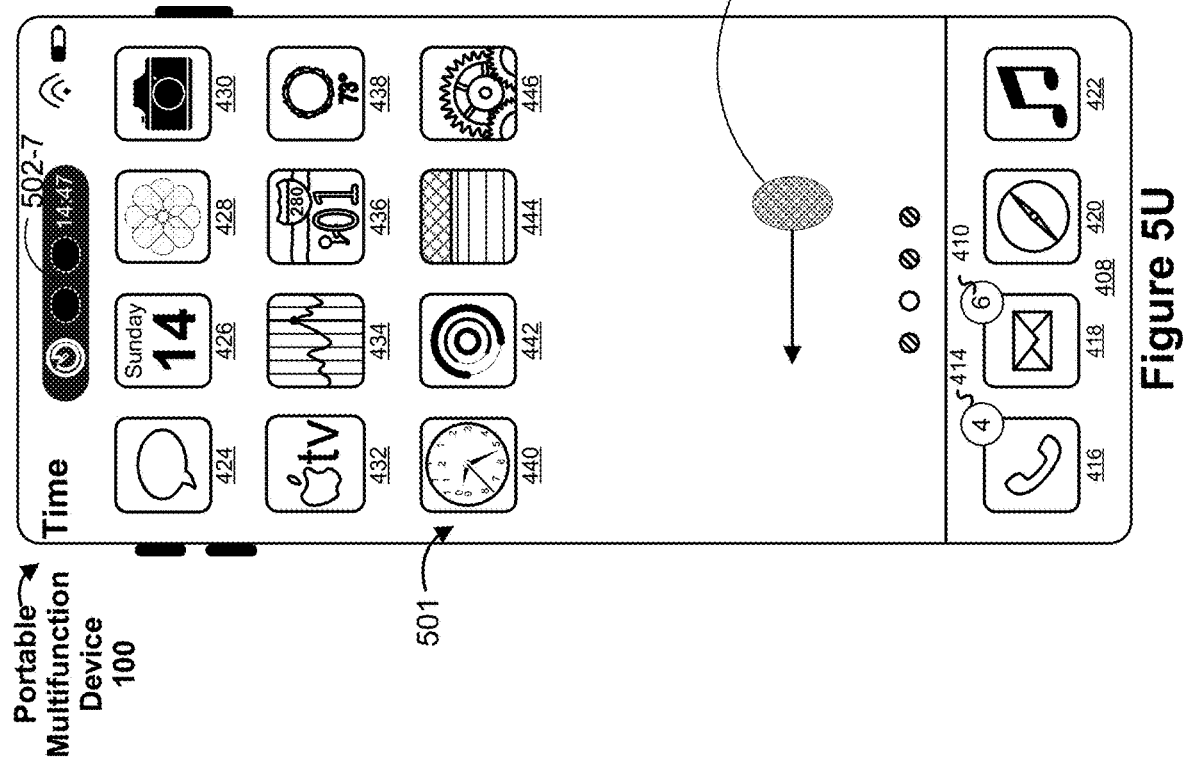

In some embodiments, in response to a user input 544 (e.g., a swipe up gesture initiated at a bottom portion or bottom edge of the display or other system navigation input or home navigation input), as shown in FIG. 5T, to navigate to a system user interface (e.g., a home screen user interface), the device displays home screen user interface 501 and continues to update the active timer session in the session region 502-7, as illustrated in FIG. 5U, which indicates that the amount of time remaining on the timer has changed further (e.g., to "14:47"). In some embodiments, the user is enabled to navigate to other system user interfaces, such as to another view of the home screen user interface 501-2 via a left swipe input 546, as illustrated in FIG. 5V. As the user navigates between the system user interface views, the session region 502-7 is maintained and updated with the time remaining in the active timer session (e.g., "14:46" in FIG. 5V). As shown throughout the figures, the time remaining in the active timer session continues to count down until the timer ends (e.g., as shown in FIG. 5AY) or is stopped.

In some embodiments, device 100 detects a user input 548 for entering an application switching view that displays a plurality of representations of applications that are currently executing, for example in the background, on the device 100 and/or correspond to recently open applications. In some embodiments, the user input 548 is a swipe gesture in a first direction (e.g., upward, downward, left to right, or right to left), optionally that is initiated at an edge of the display. In some embodiments, in response to the user input 548, the application switching user interface 550 is displayed, as shown in FIG. 5W. In some embodiments, in the application switching user interface 550, a background of the application switching user interface 550 is obscured (e.g., blurred, darkened, or otherwise visually deemphasized).

As illustrated in FIG. 5W, in some embodiments, the session region 502-7 is optionally maintained while displaying the application switching user interface 550, and continues to be updated, as indicated by the amount of time remaining having dropped further (e.g., to "14:38" in FIG. 5W). In some embodiments, the session region 502-7 is not displayed while displaying the application switching user interface. In some embodiments, in the application switching user interface, the user is enabled to select an application to display (e.g., by tapping the representation for the respective application) and/or to navigate between other open applications (e.g., by swiping across the open representations of applications to view additional representations of applications). In some embodiments, while a background of an area behind the session region 502-7 is visually deemphasized, a border 552 is displayed around the edges of the session region 502-7 (sometimes referred to as a keyline). In some embodiments, the border 552 is displayed with a color that is selected in accordance with the application associated with the current session. For example, for the timer session, the border 552 is orange (e.g., while for another application session, such as a phone call, the border would be green and/or for a maps navigation session, the border 552 would be blue). In some embodiments, the color of the border 552 is selected in accordance with content that is being updated in the session region. For example, for a media playback session, a color of the border 552 is selected based on a color associated with the currently playing (or currently selected, if playback is paused or not yet started) media item. In some embodiments, the color associated with the currently playing media item comprises a color sampled from cover art for the media item (e.g., from an album cover for a current song, or from a book cover for a current audiobook). As such, for a same application with an active session represented in the session region, the border 552 of the session region optionally changes in accordance with the content currently presented or updated by the application in the session region.

In some embodiments, the border 552 is present in all views of the session region while the session region is associated with an active session. For example, in some circumstances the border 552, though present, is displayed with a color that is similar to a color of the background in the user interface that surrounds the session region. Thus, in some user interfaces, the border 552 is not prominently displayed to the user (e.g., the border blends in with the background).

In some embodiments, the border 552 emphasizes the display of the session region 502-7 such that the session region 502-7 is delineated as distinct from the background (e.g., even if a fill color of the session region is otherwise the same as the fill color of the surrounding user interface just outside of the session region). In some embodiments, the border 552 is displayed to distinguish the session region while the session region is expanded (e.g., includes status information for one or more applications) and not displayed while the session region is minimized (e.g., so that the session region optionally blends into the background). For example, as described in more detail below, in dark mode and/or while displaying a user interface with a dark background that has a color similar to the color of the session region, the session region is displayed with a more prominent keyline.

In some embodiments, device 100 detects a user input 554 to exit out of the application switching user interface 550, such as by a tap input on (or other selection input directed to) a background portion of the application switching user interface 550 that is not associated with a representation of an application. In response to the user input 554, the device 100 updates the display to return to the system user interface (e.g., the home screen user interface, optionally the same second page 501-2 of the home screen as in FIG. 5V, just prior to navigating to the application switching user interface 550), as illustrated in FIG. 5X. In some embodiments, the session region 502-7 remains displayed with the updated time remaining for the active timer session (e.g., having dropped further to "14:34" in FIG. 5X). In some embodiments, the user interacts with the home screen user interface 501-2, for example via user input 556 (e.g., a swipe or other navigation input) in FIG. 5X, to navigate (e.g., from left to right) to the first view of the home screen user interface 501 as shown in FIG. 5Y, with the session region 502-7 continuing to be updated, as indicated by the amount of time remaining having dropped further in FIG. 5Y (e.g., to "14:28").

Figure 5Z:
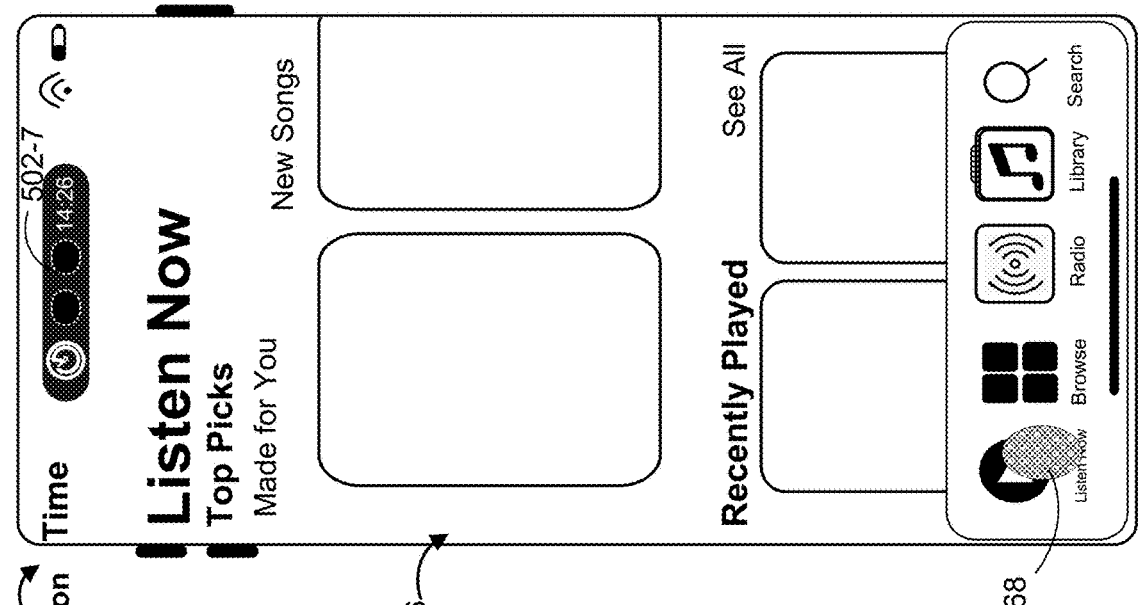
Figure 5Y:
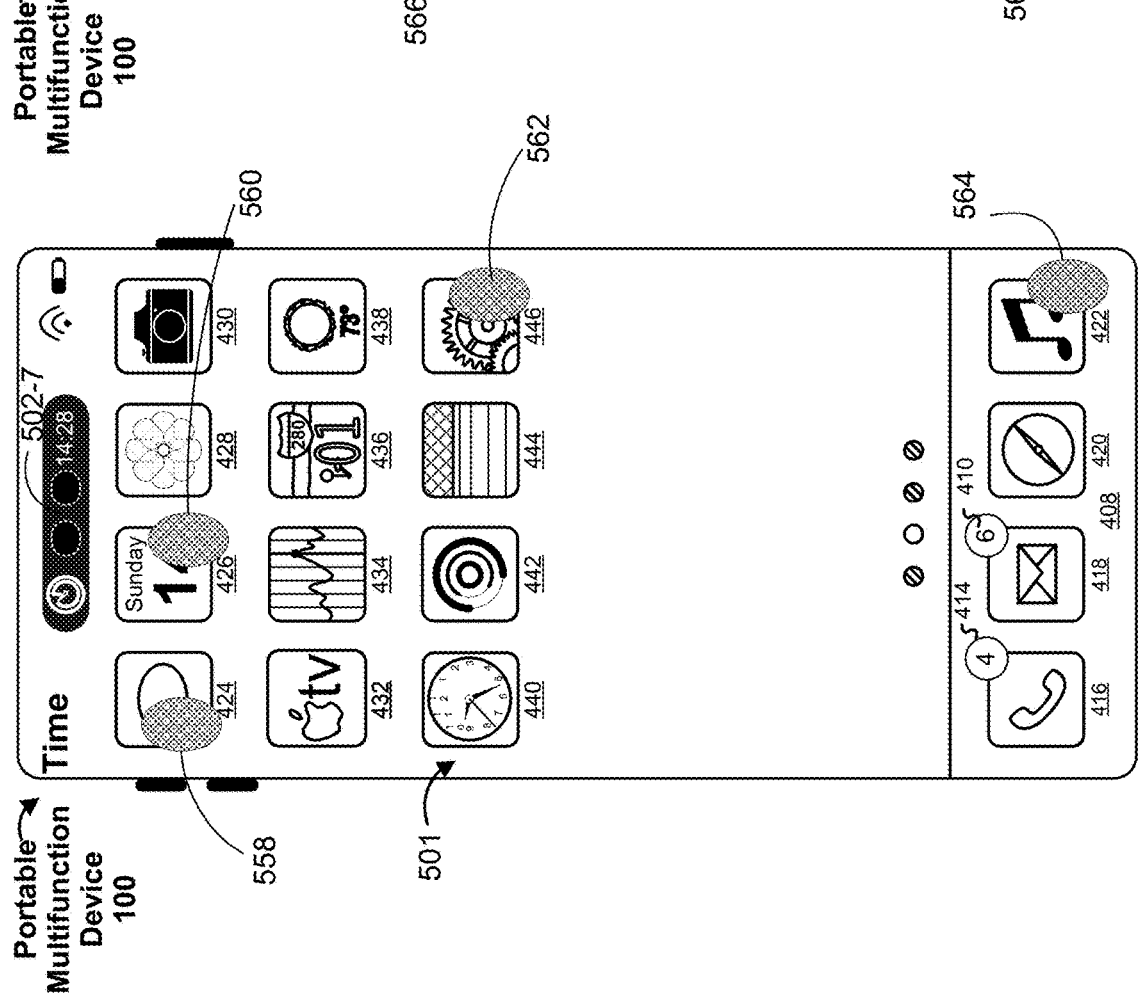
Figure 5A:
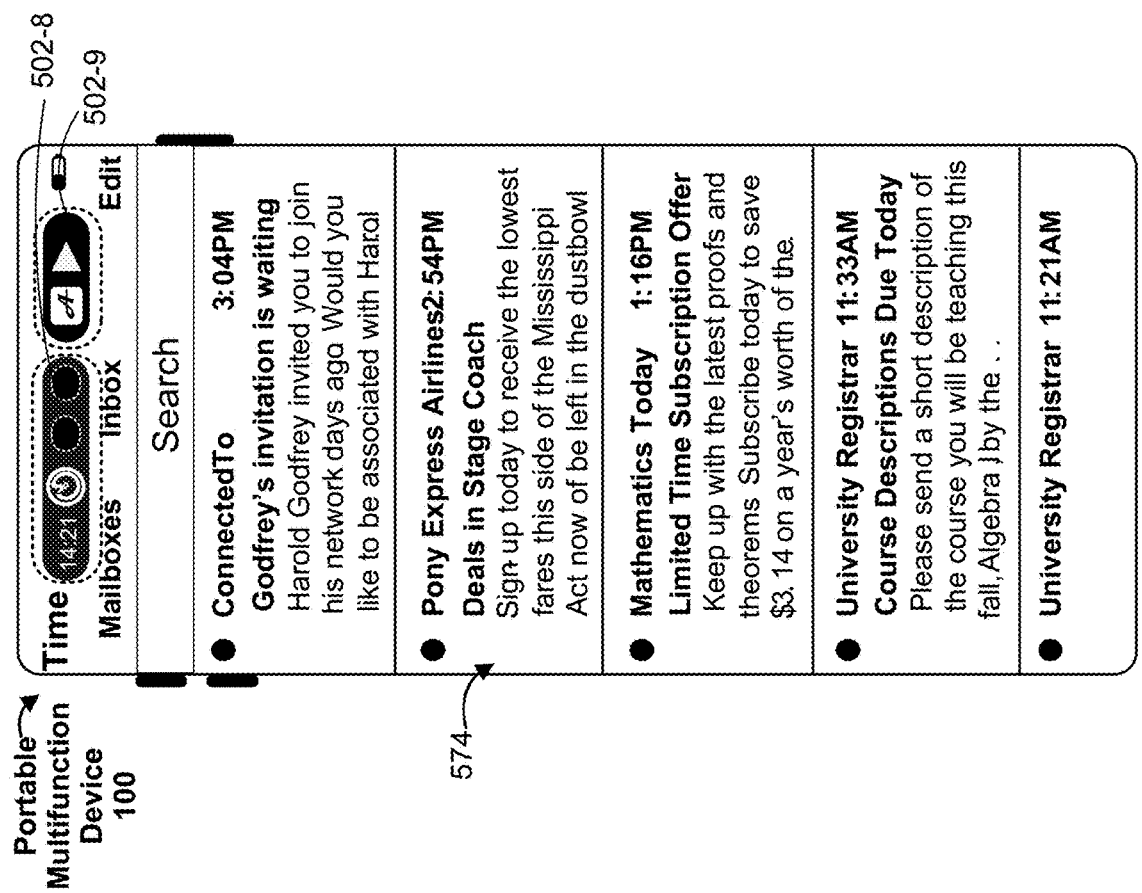
Figure 5A:
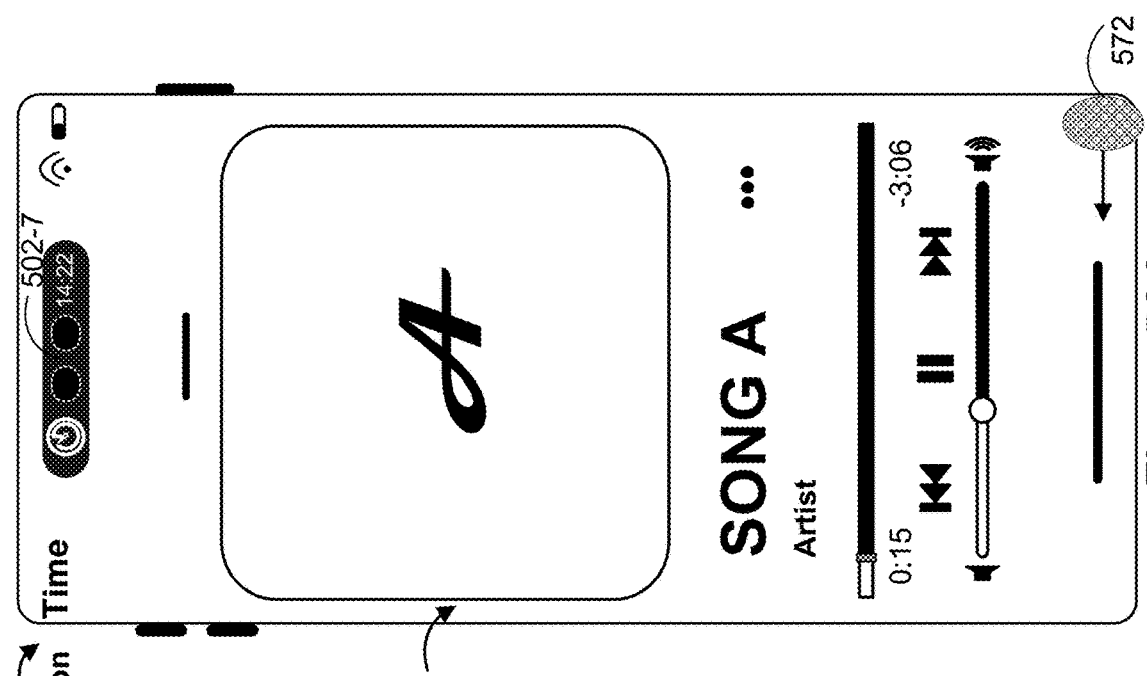
Figure 5A:
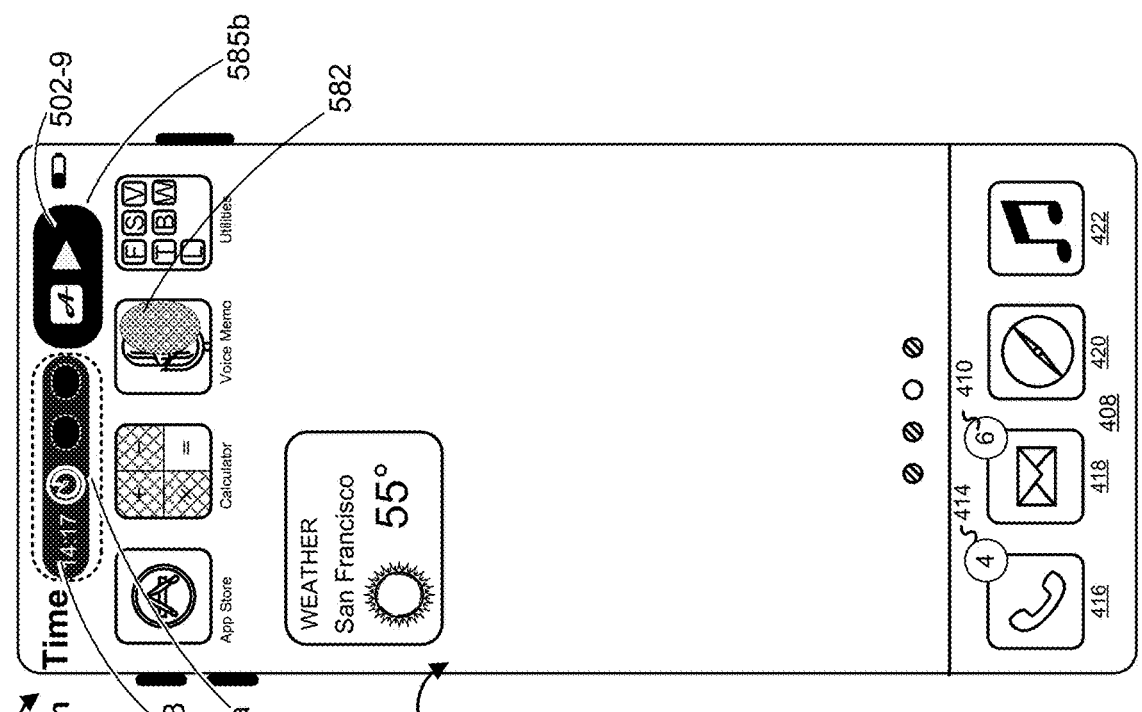
Figure 5A:
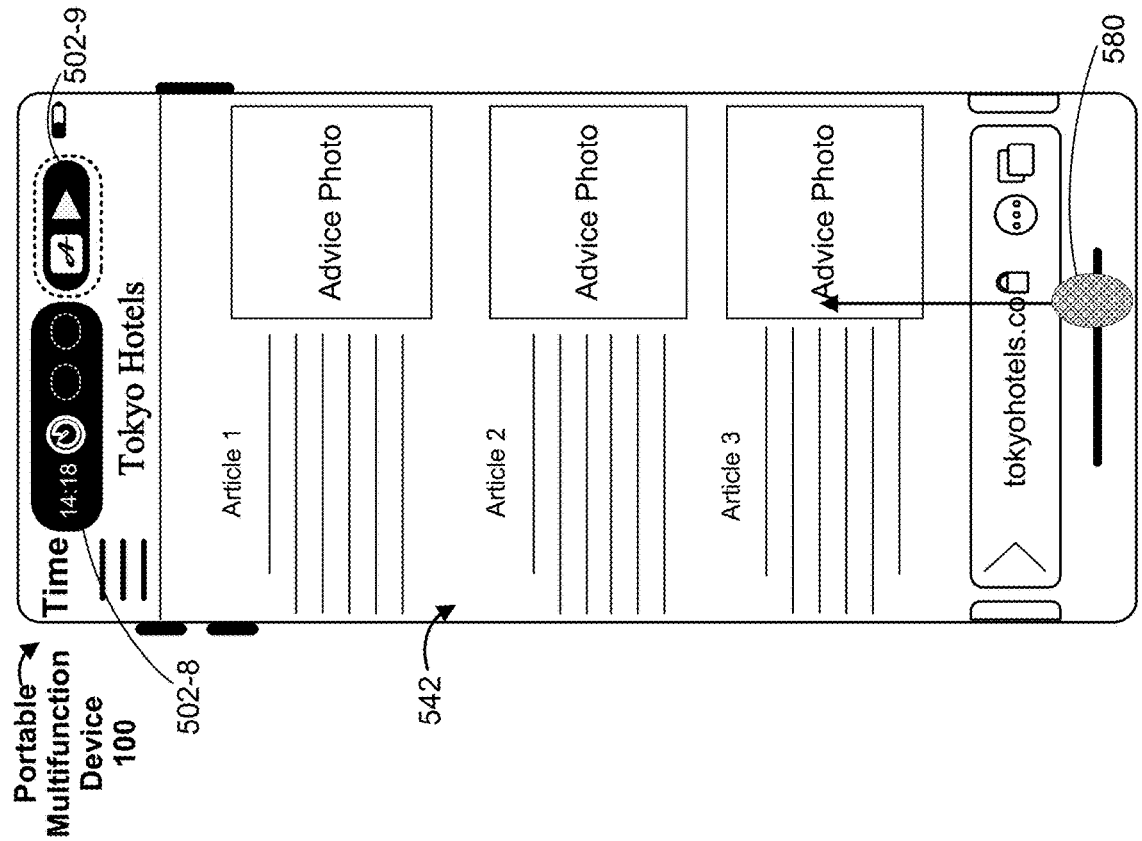
Figure 5A:
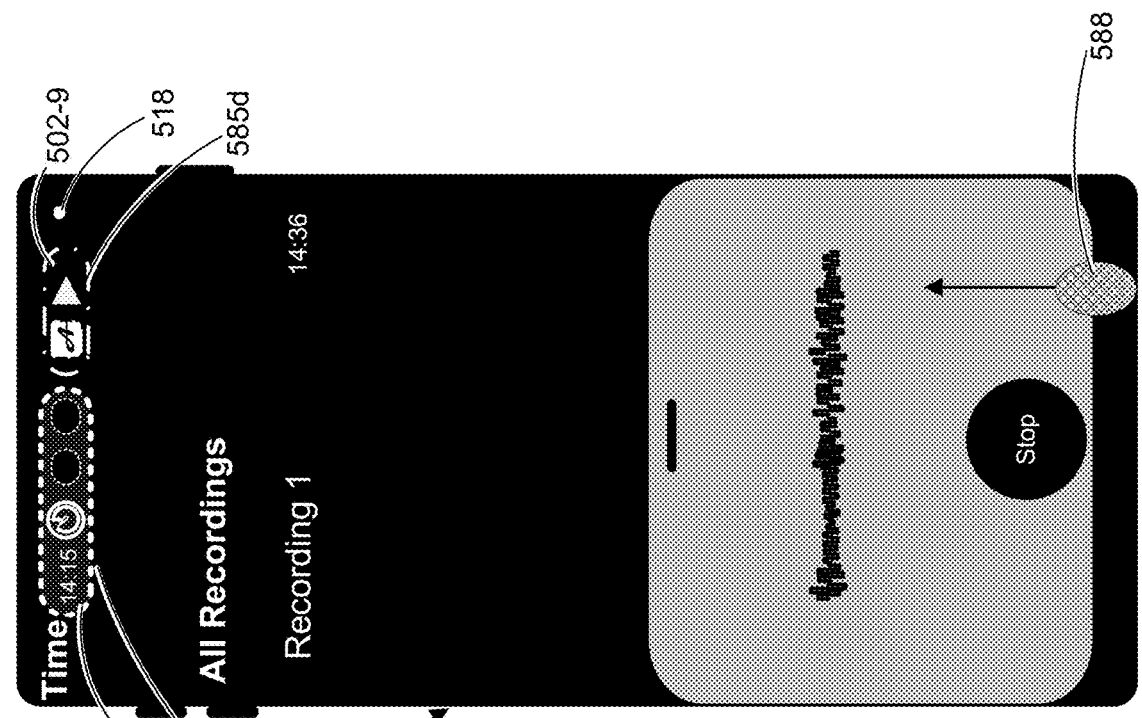
Figure 5A:
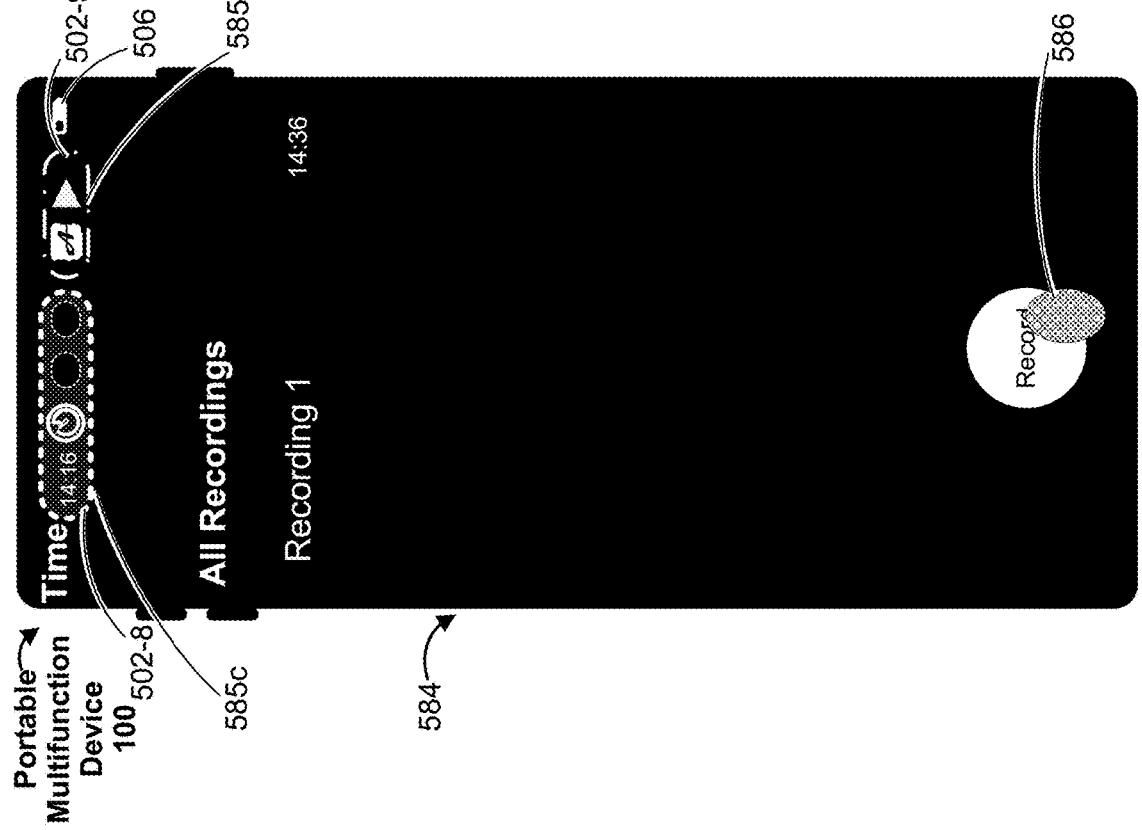
Figure 5A:
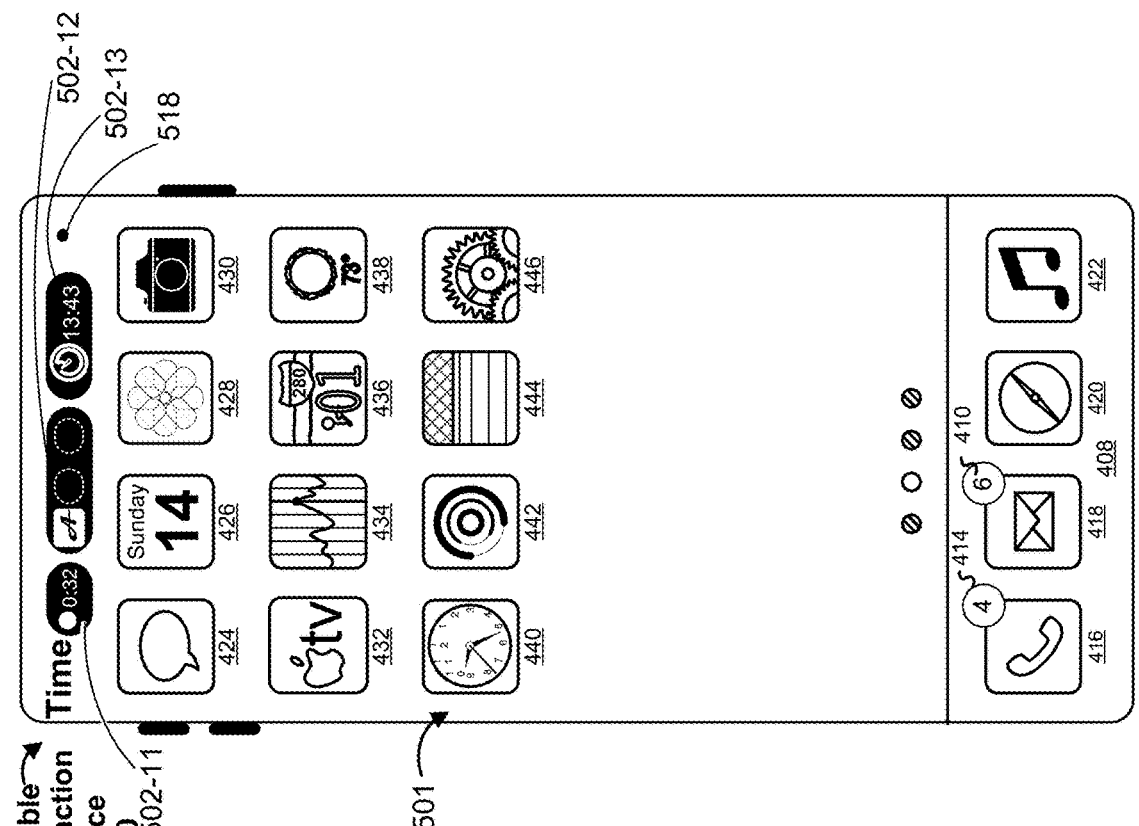
Figure 5A:
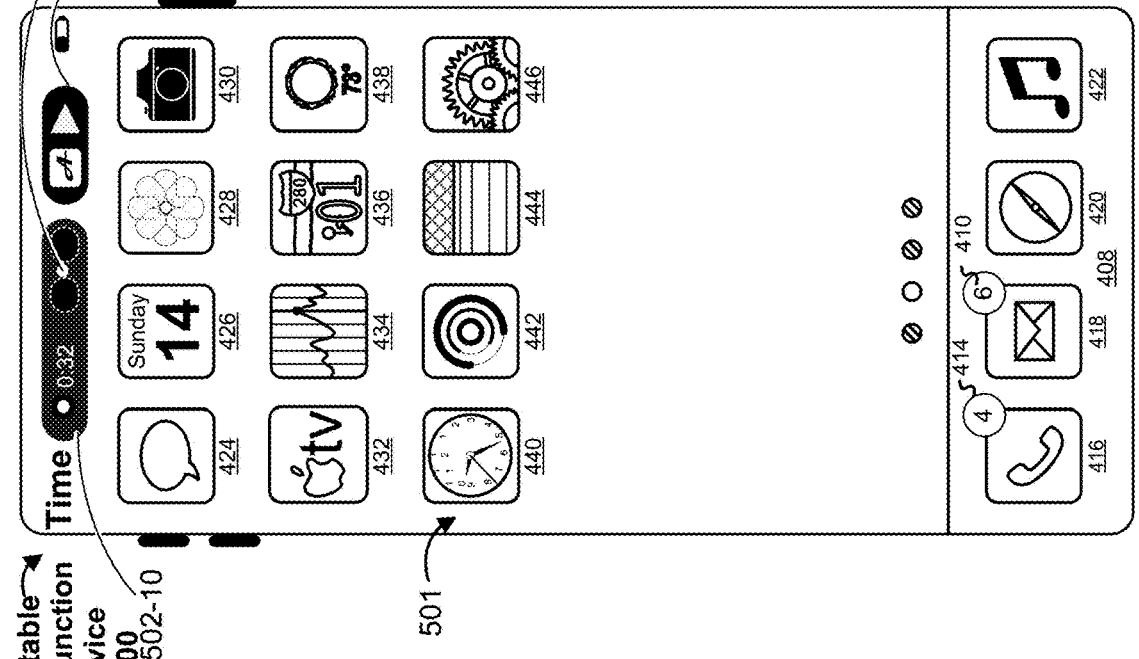
Figure 5A:
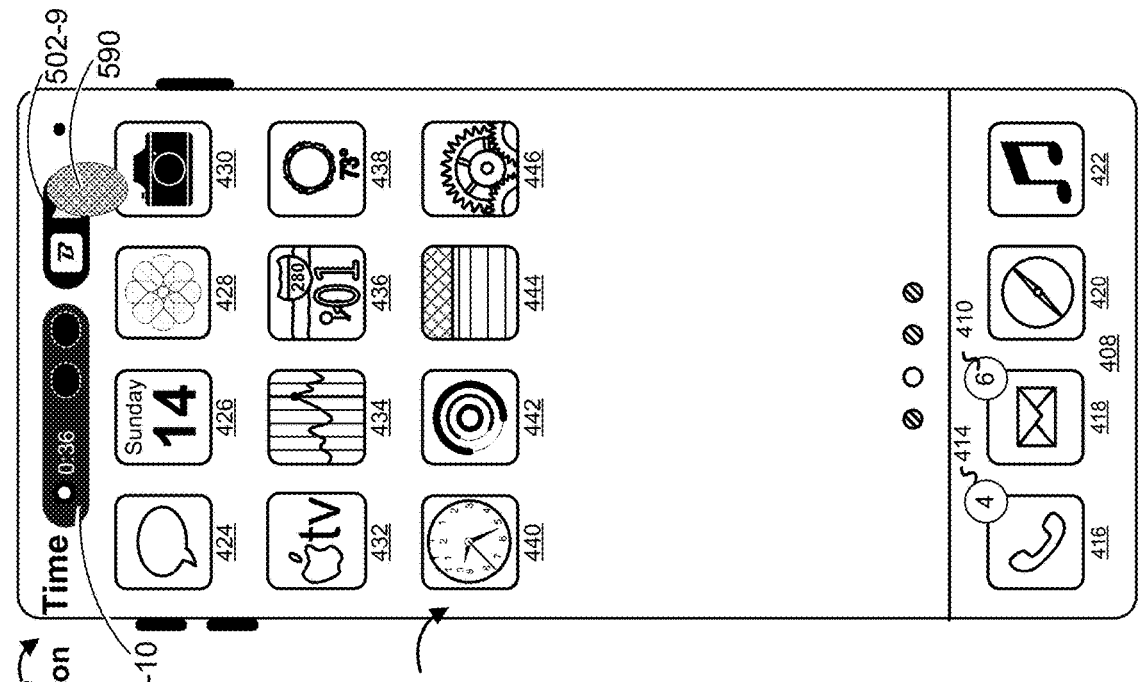
Figure 5A:
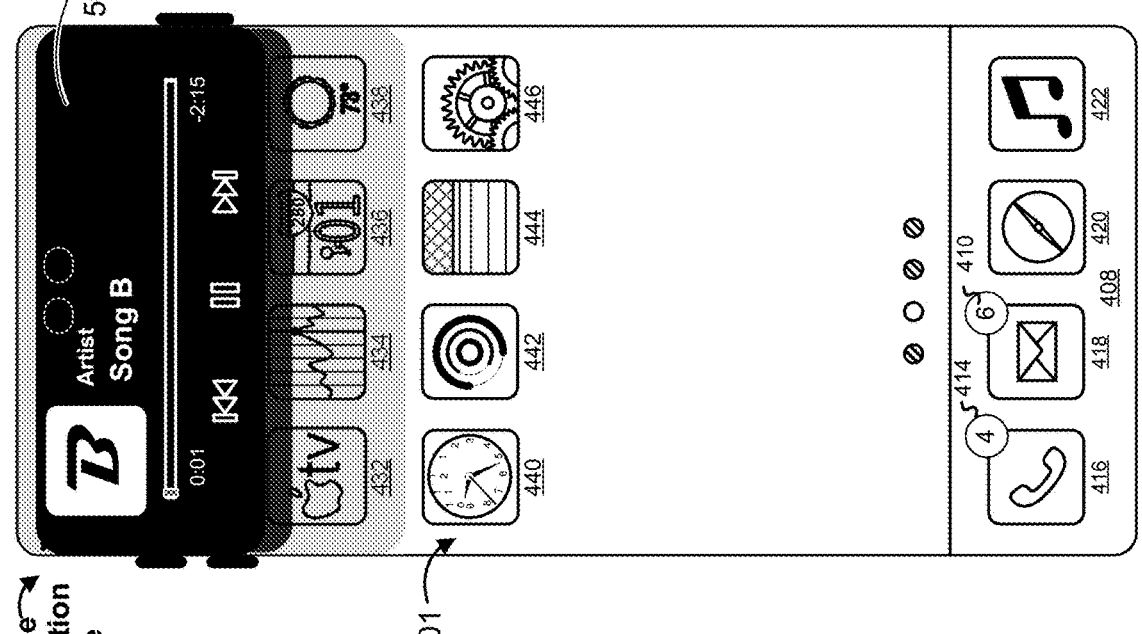
Figure 5A:
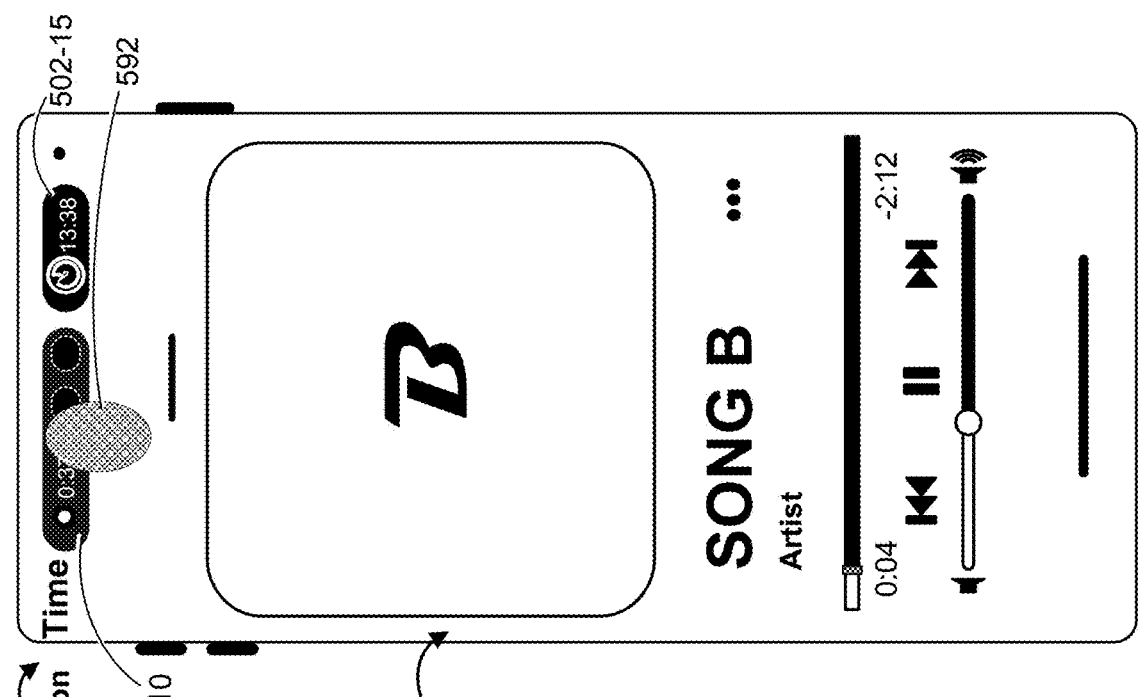
Figure 5A:
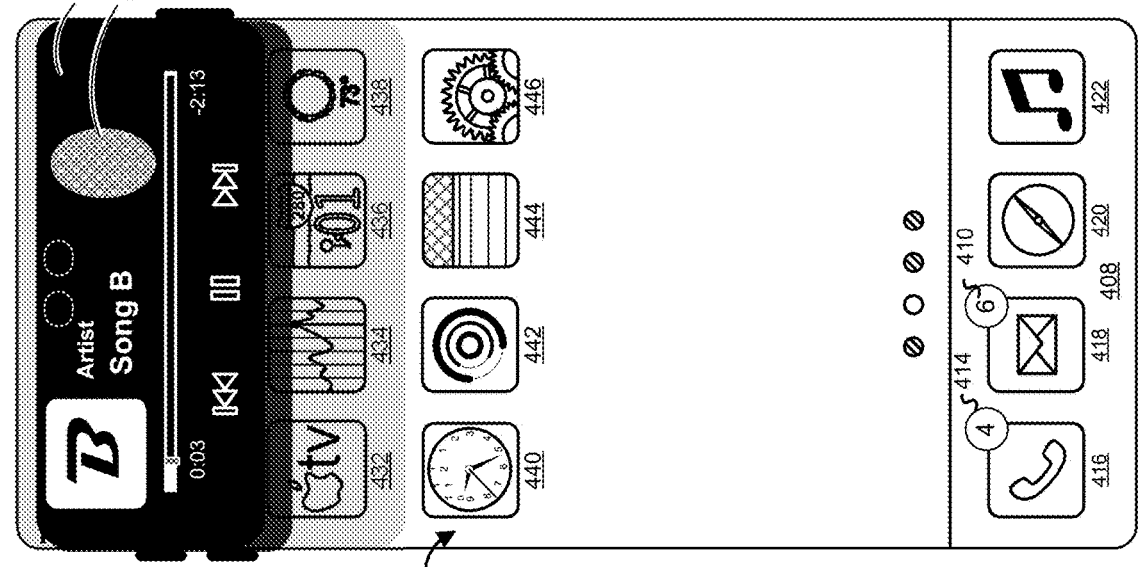
Figure 5A:
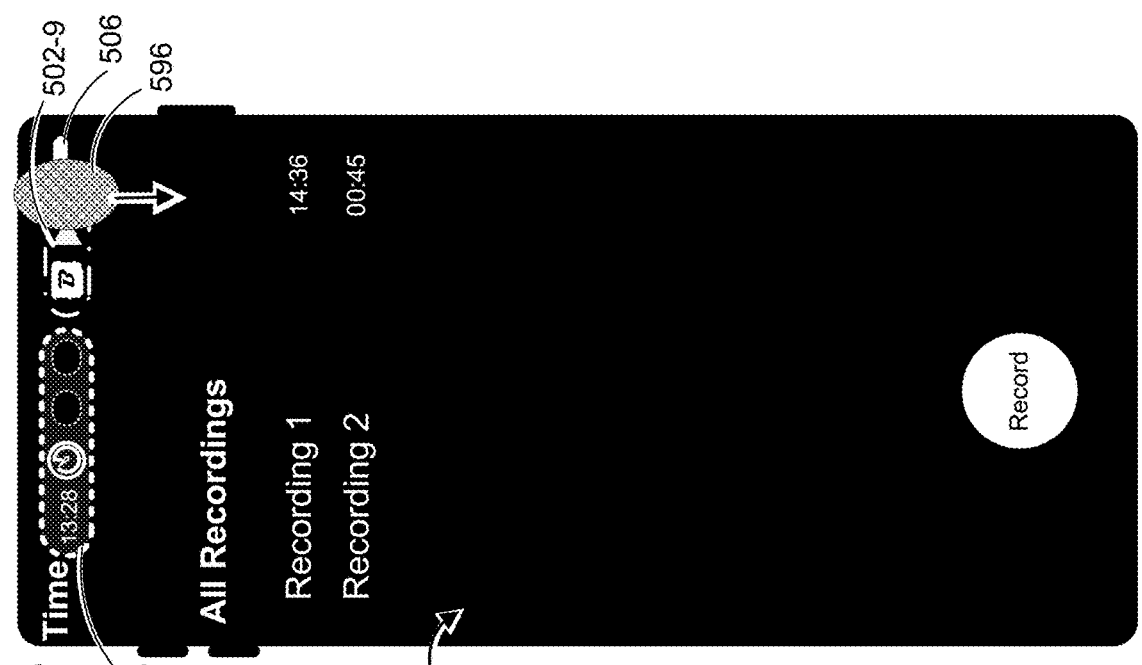
Figure 5A:
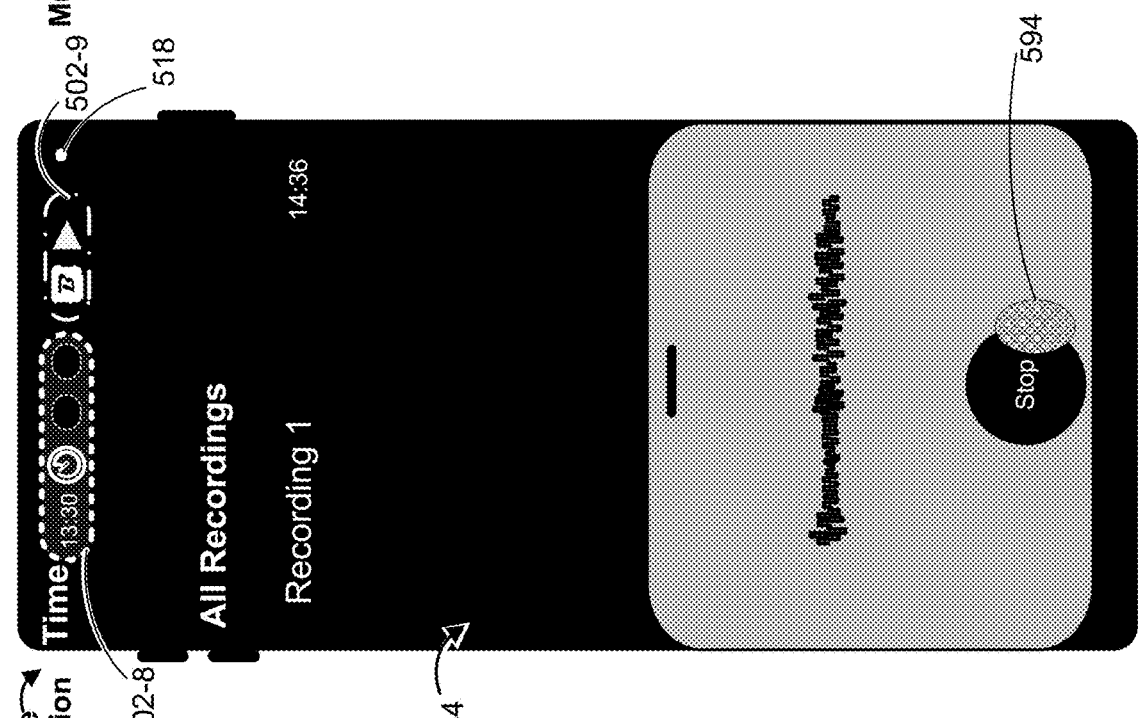
Figure 5A:
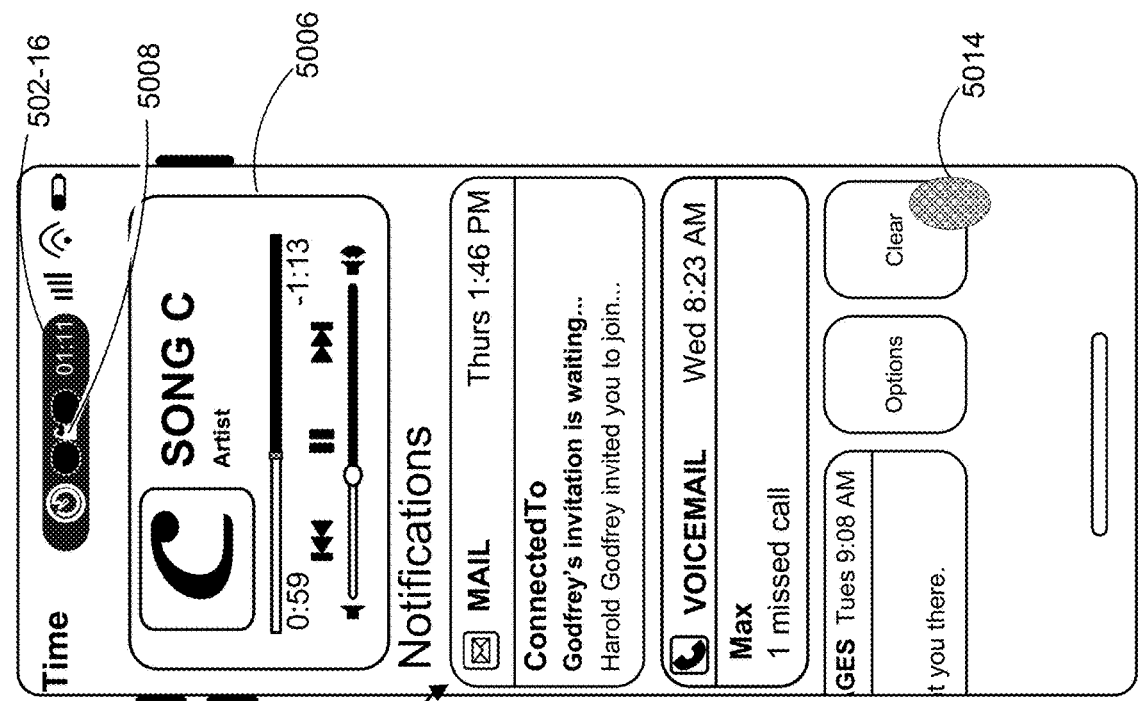
Figure 5A:
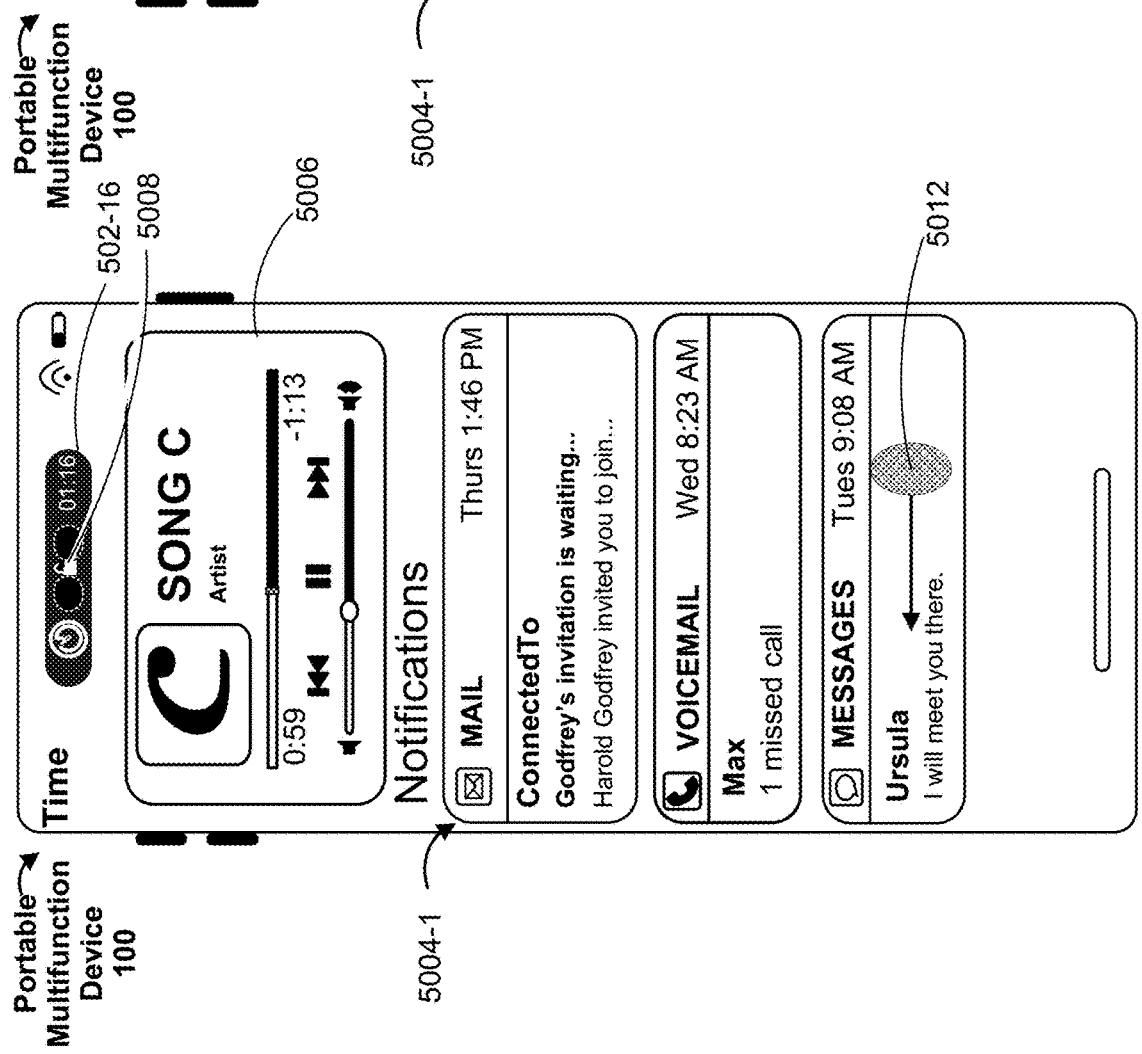
Figure 5A:
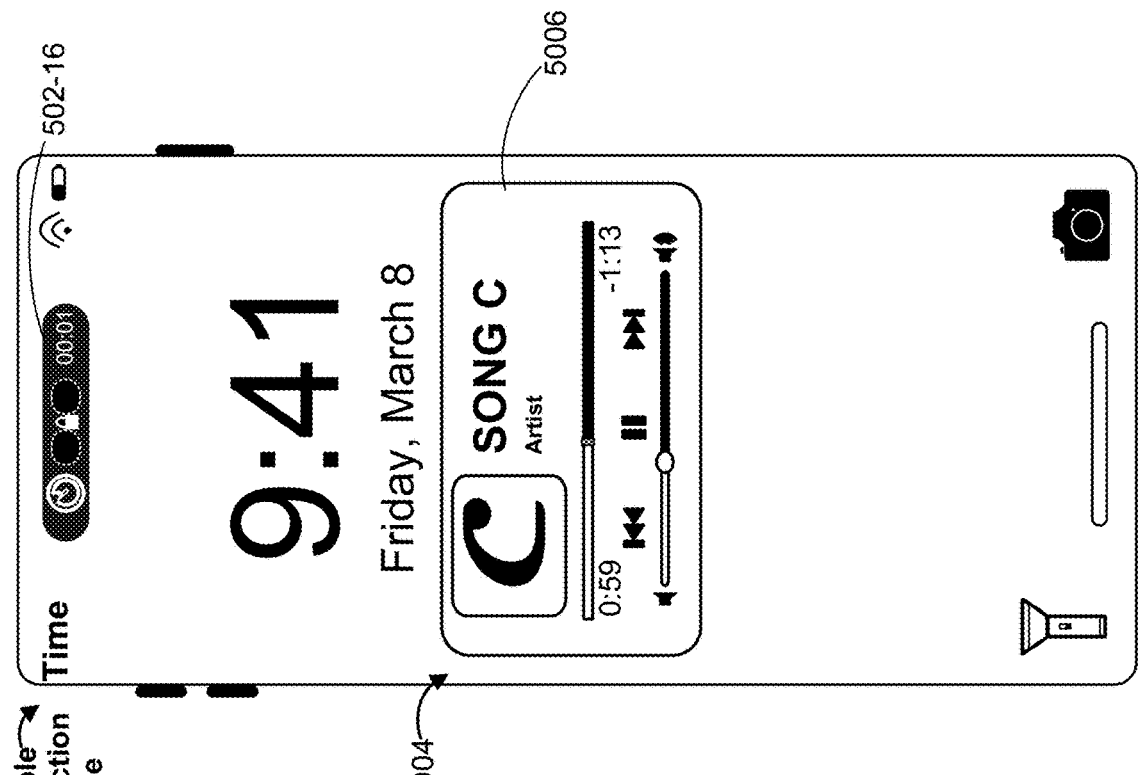
Figure 5A:
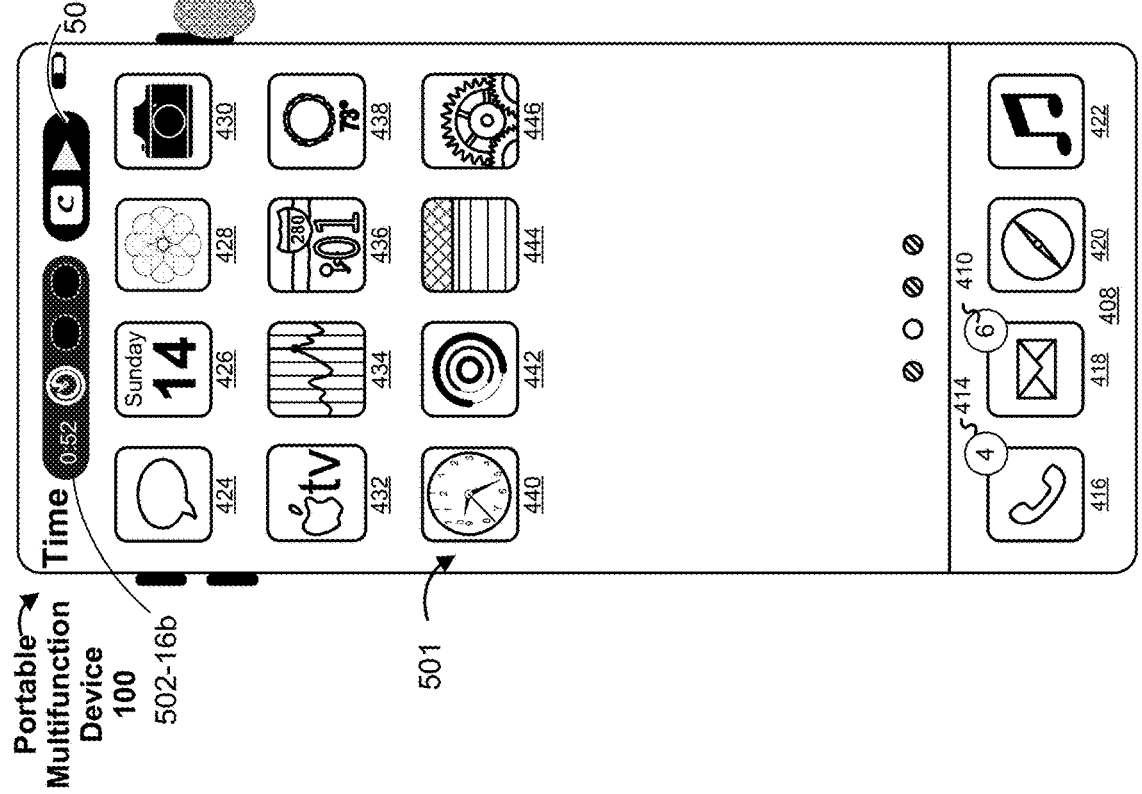
Figure 5A:
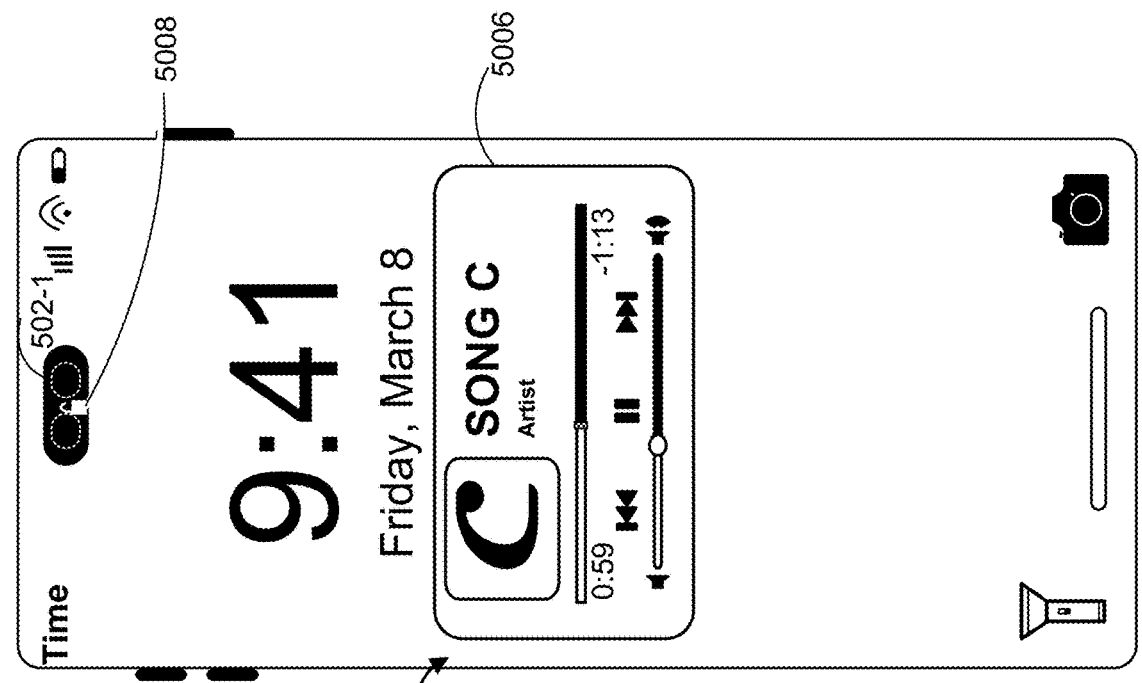
Figure 5A:
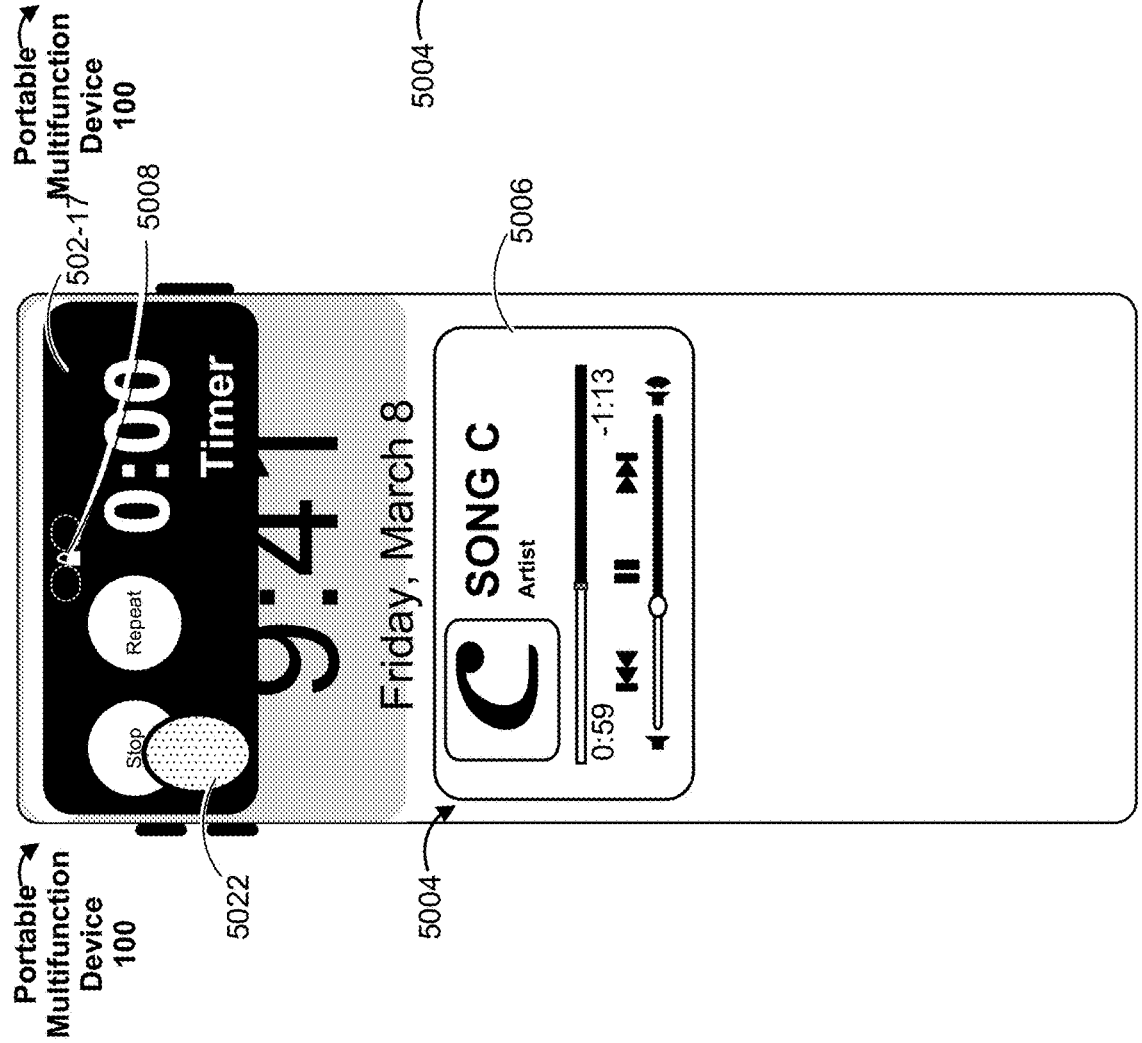
Figure 5B:
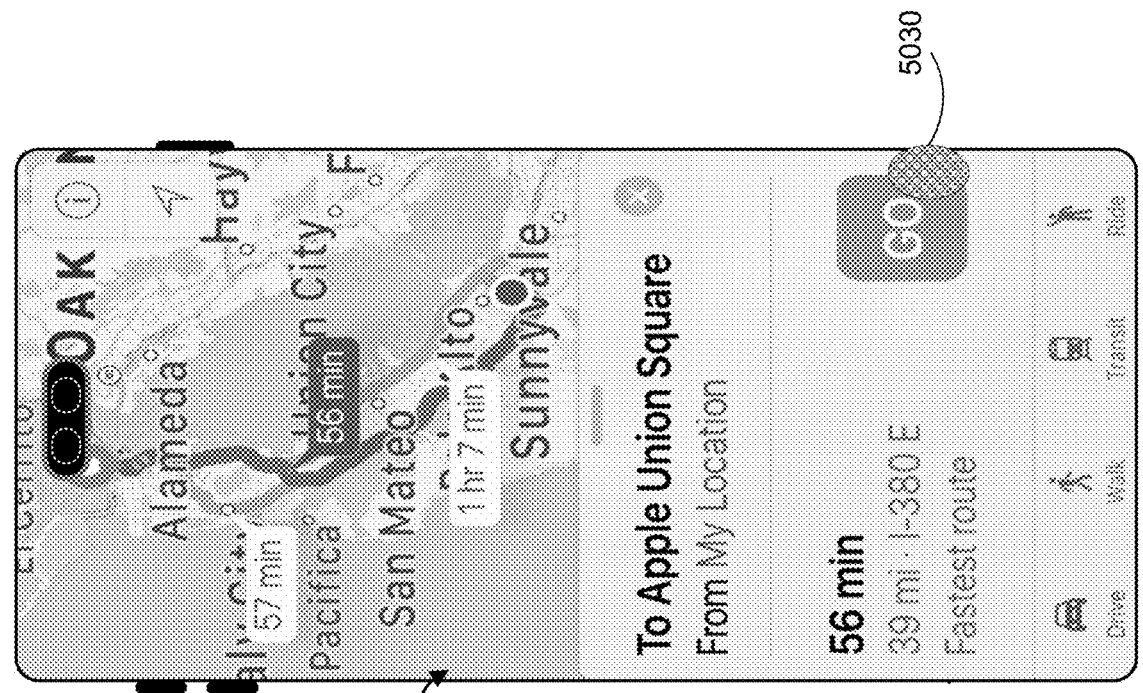
Figure 5B:
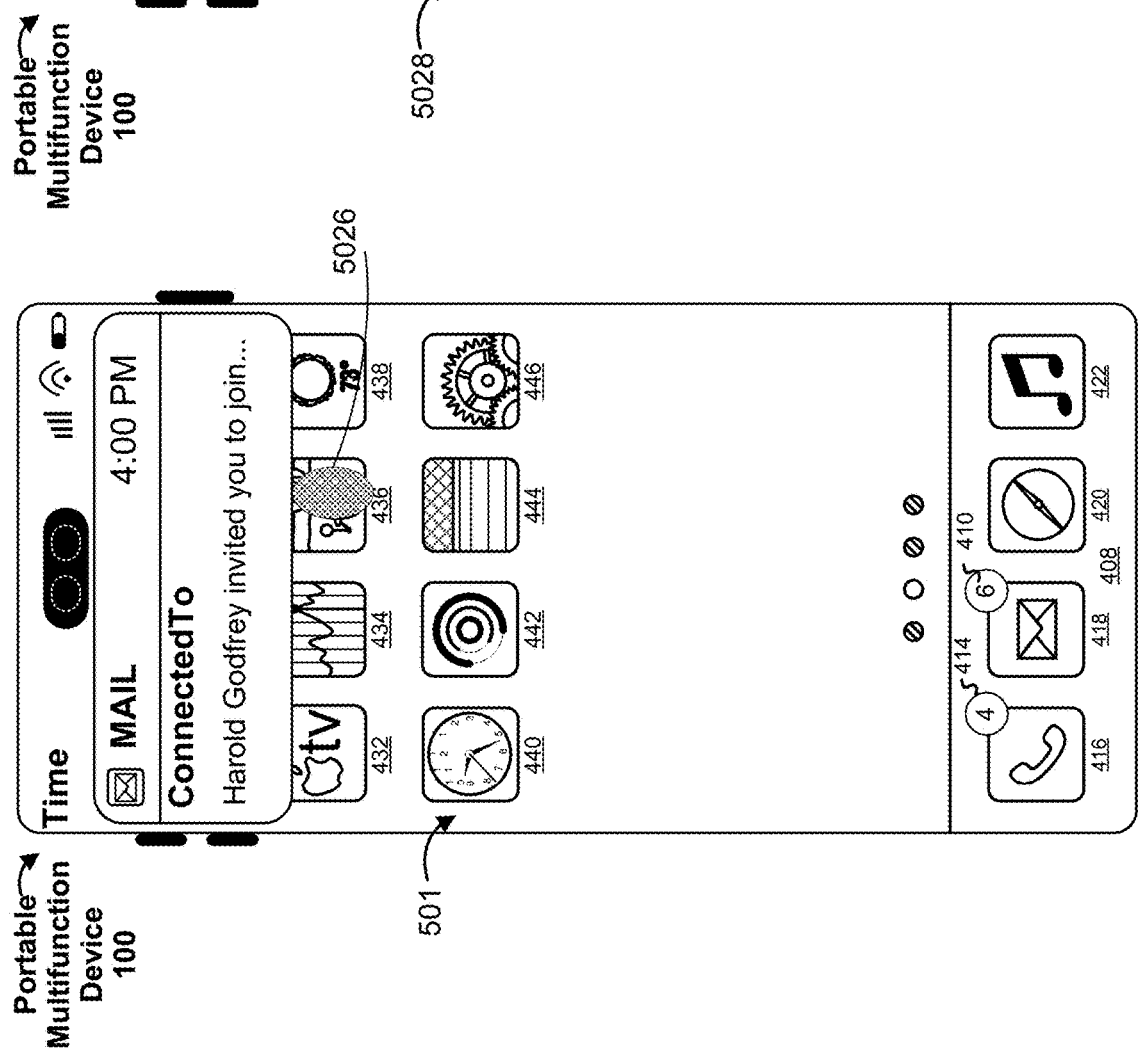
Figure 5B:
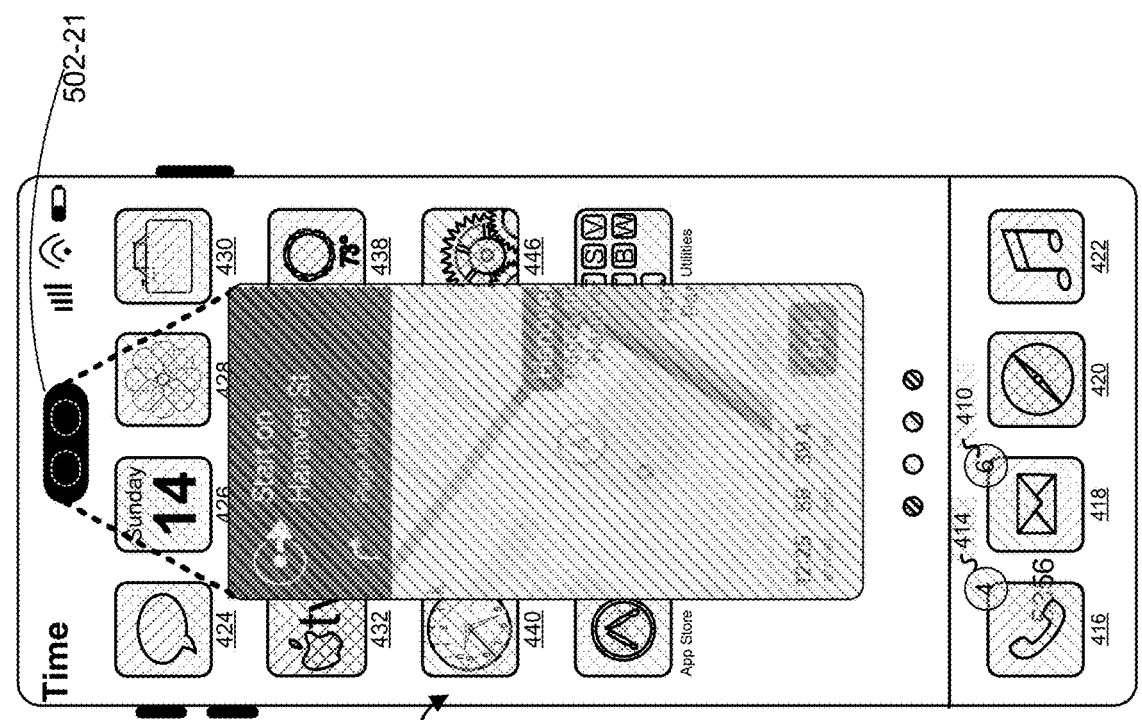
Figure 5B:
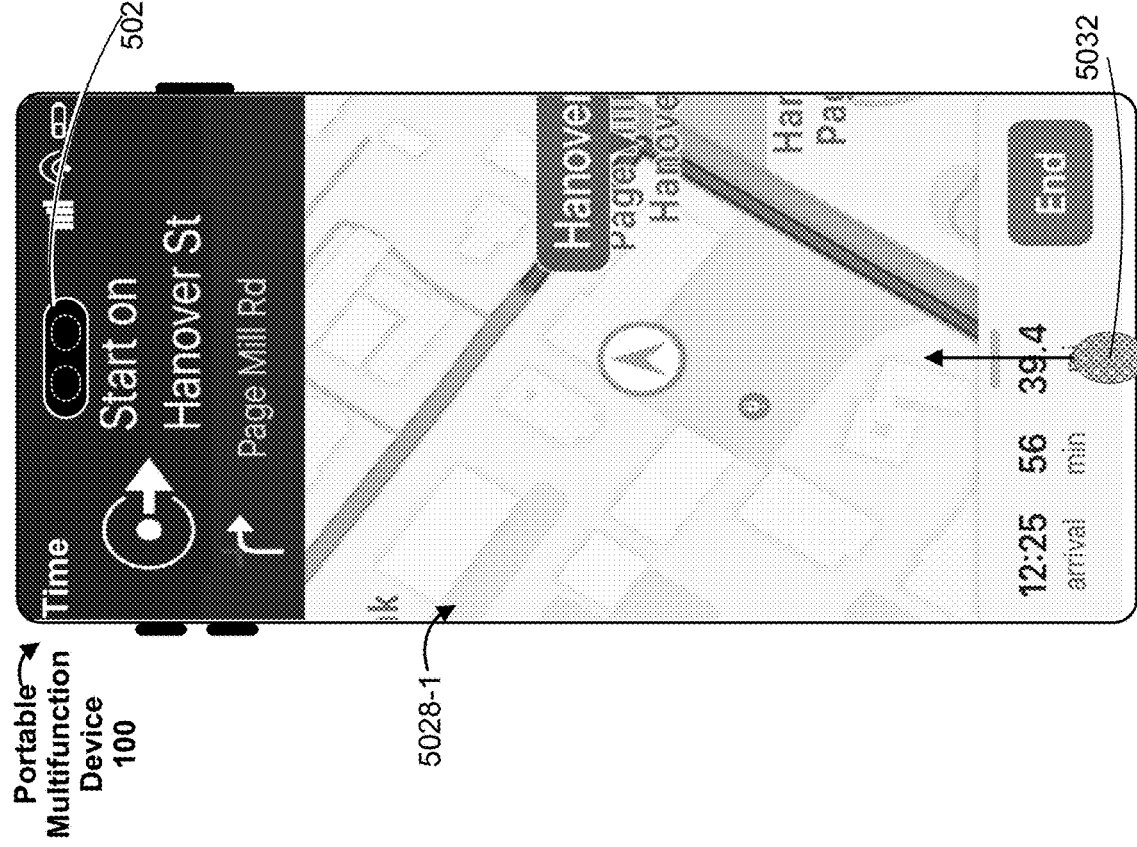
Figure 5B:
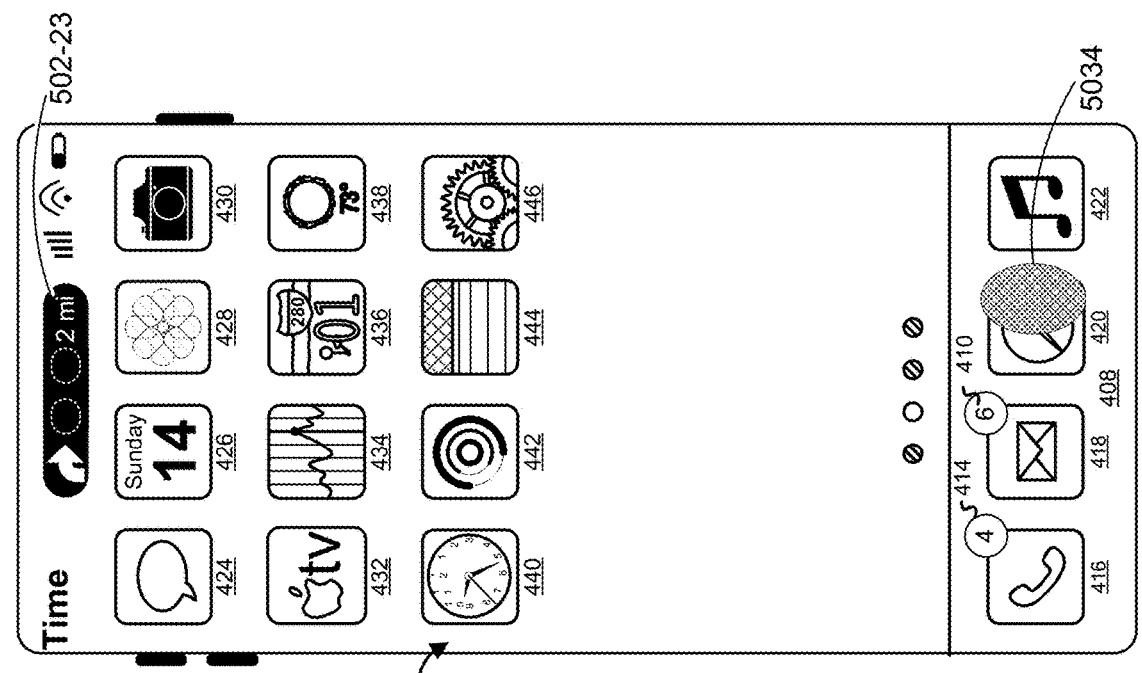
Figure 5B:
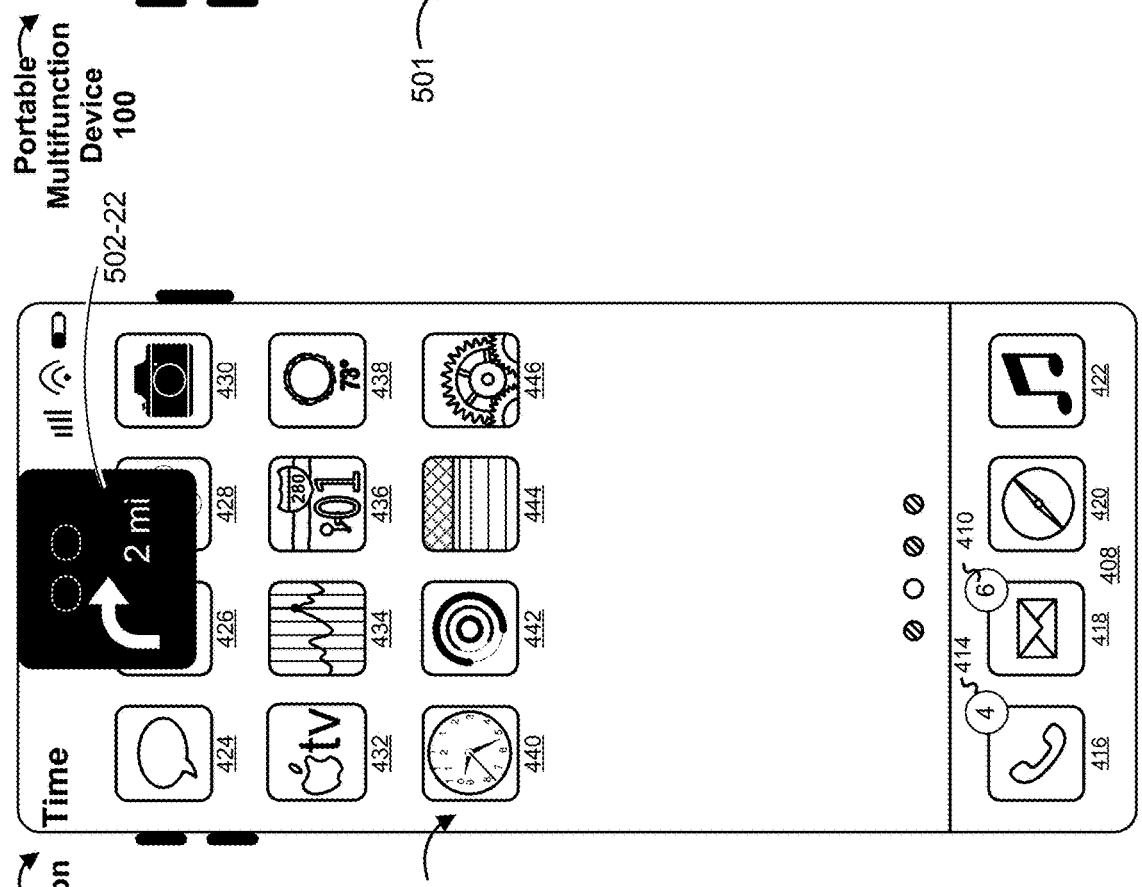
Figure 5B:
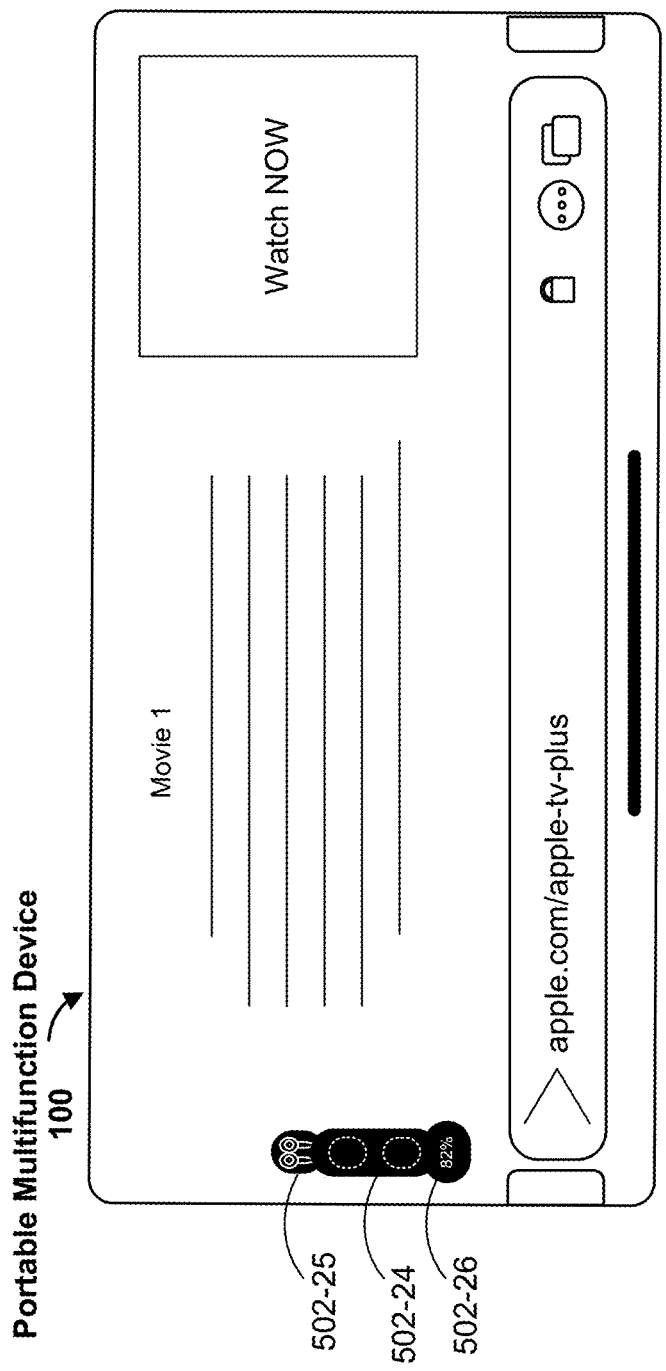
Figure 5B:
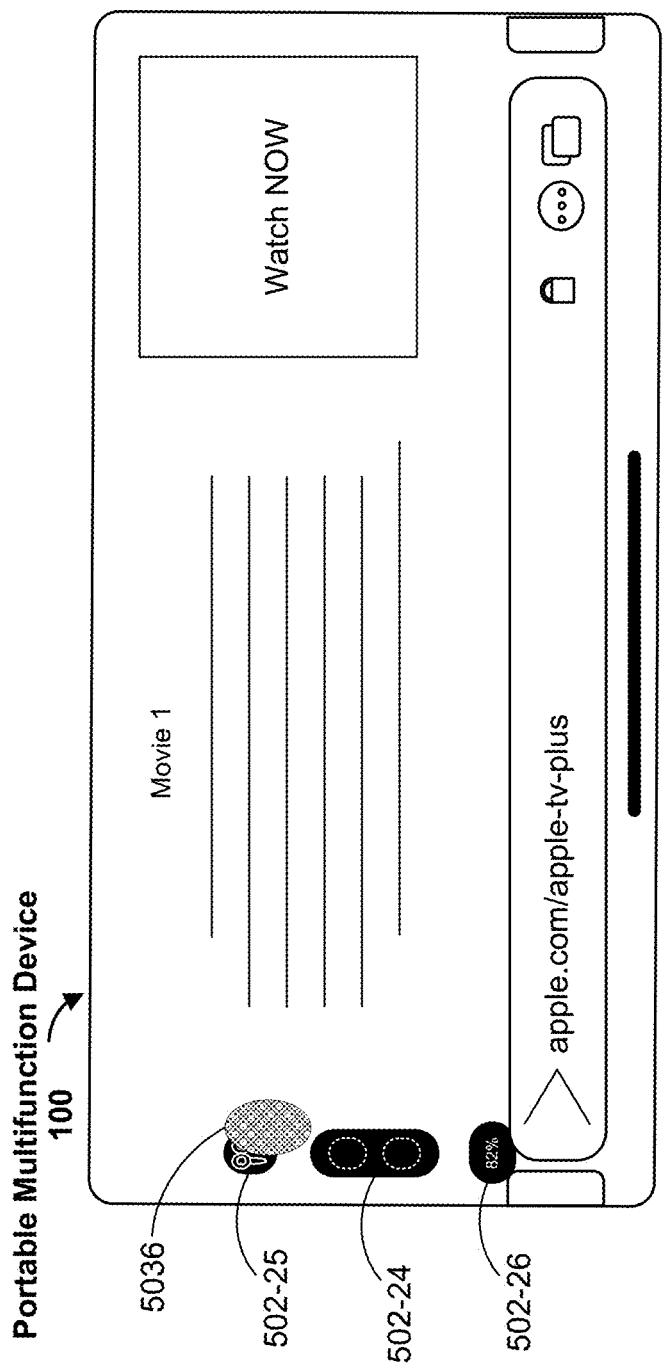
Figure 5B:
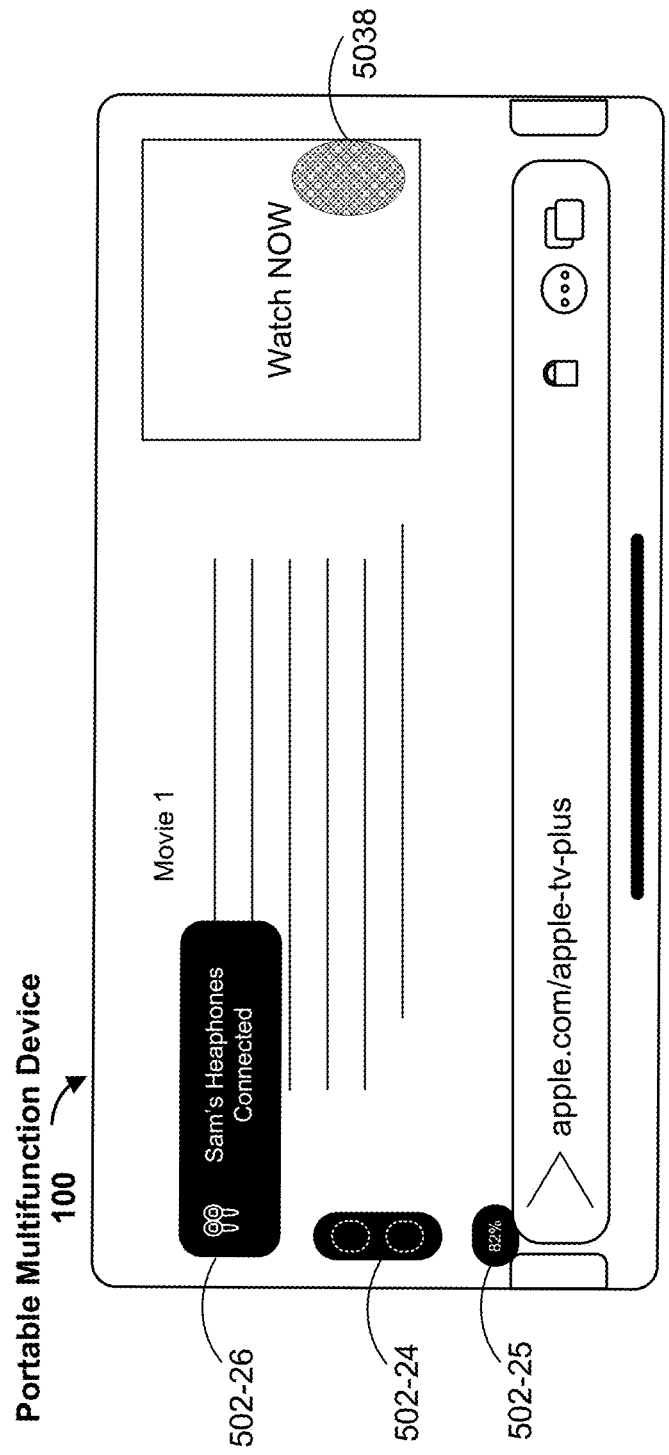
Figure 5B:
Figure 5B:
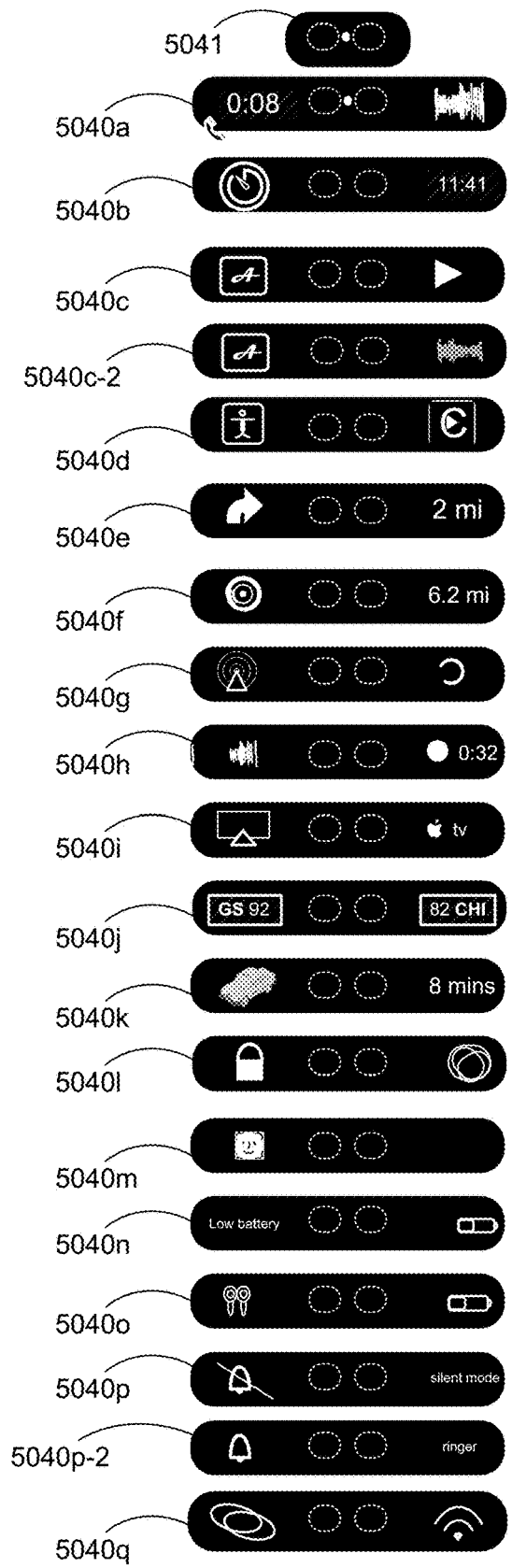
Figure 5B:
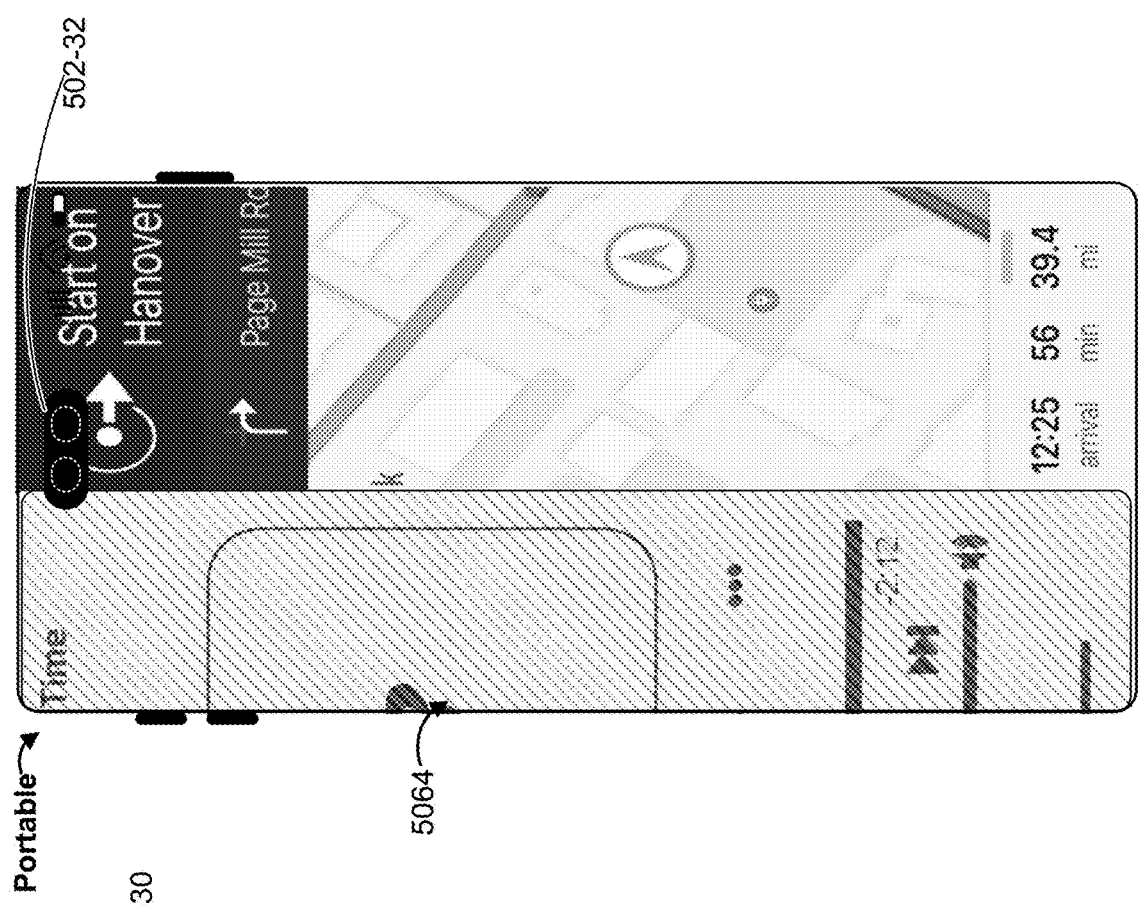
Figure 5B:
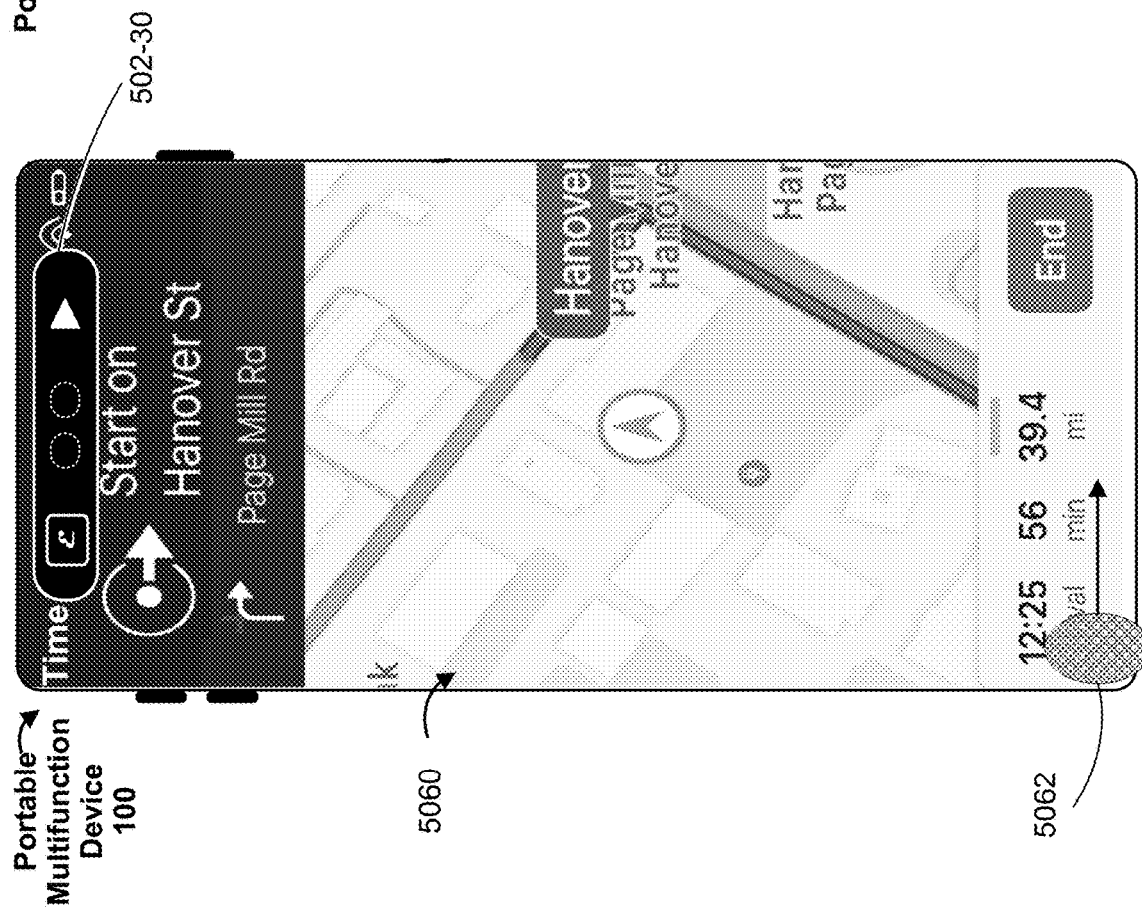
Figure 5B:
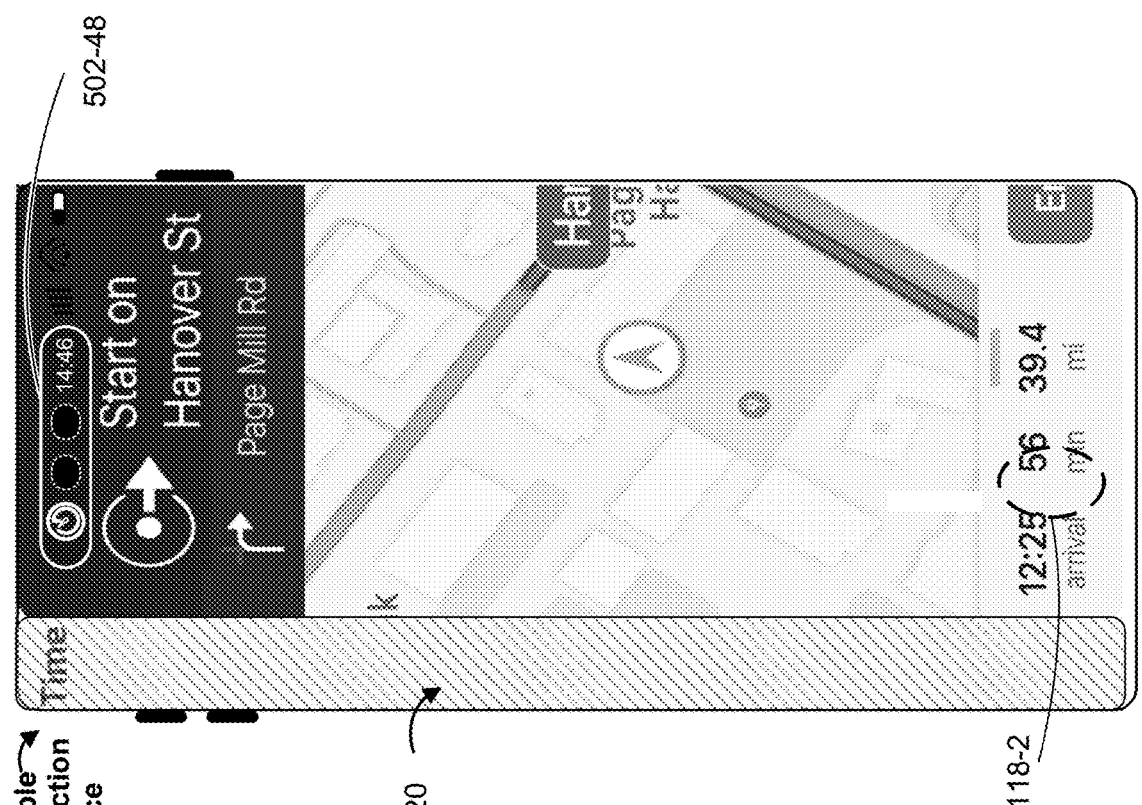
Figure 5B:
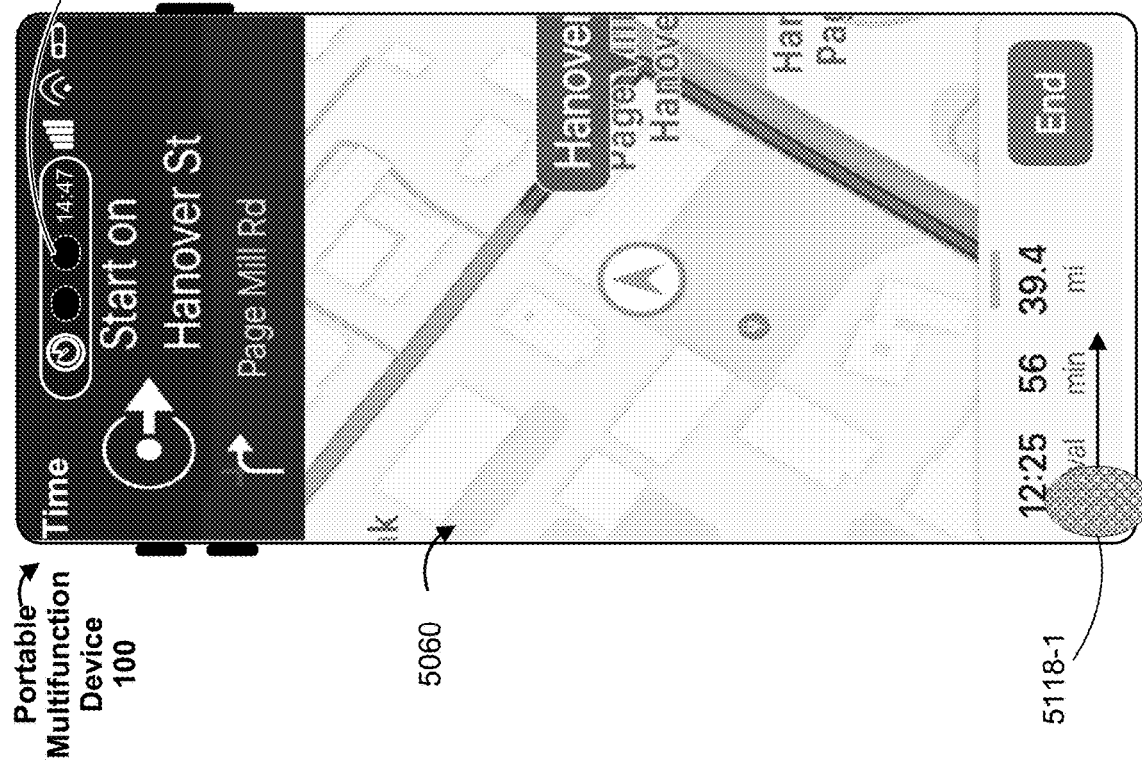
Figure 5C:
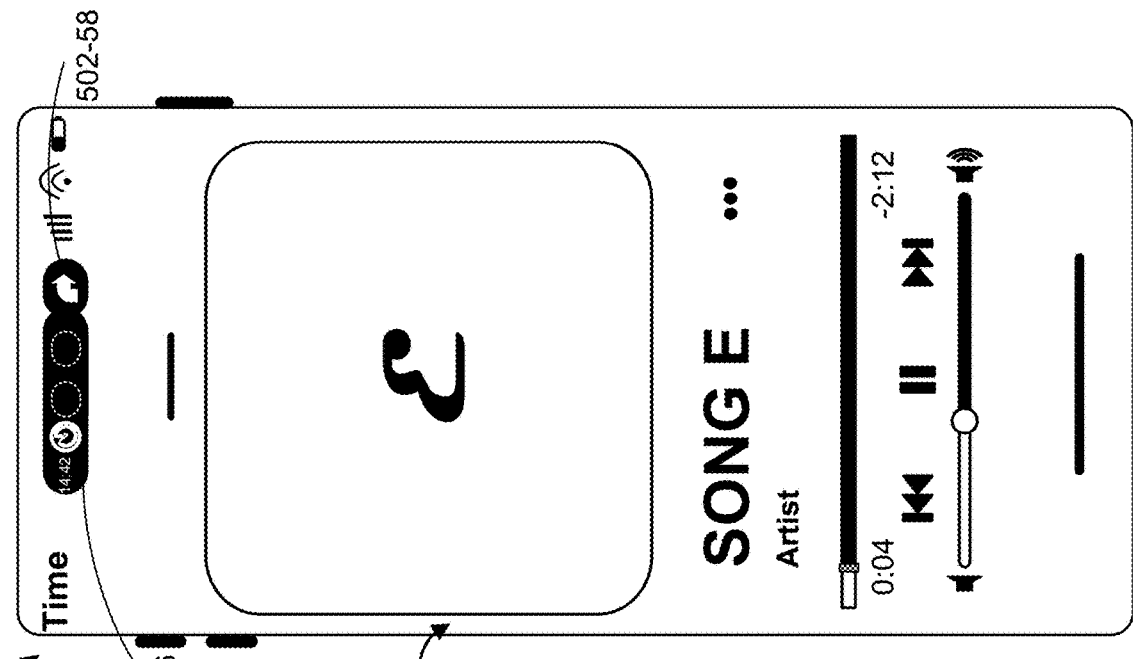
Figure 5B:
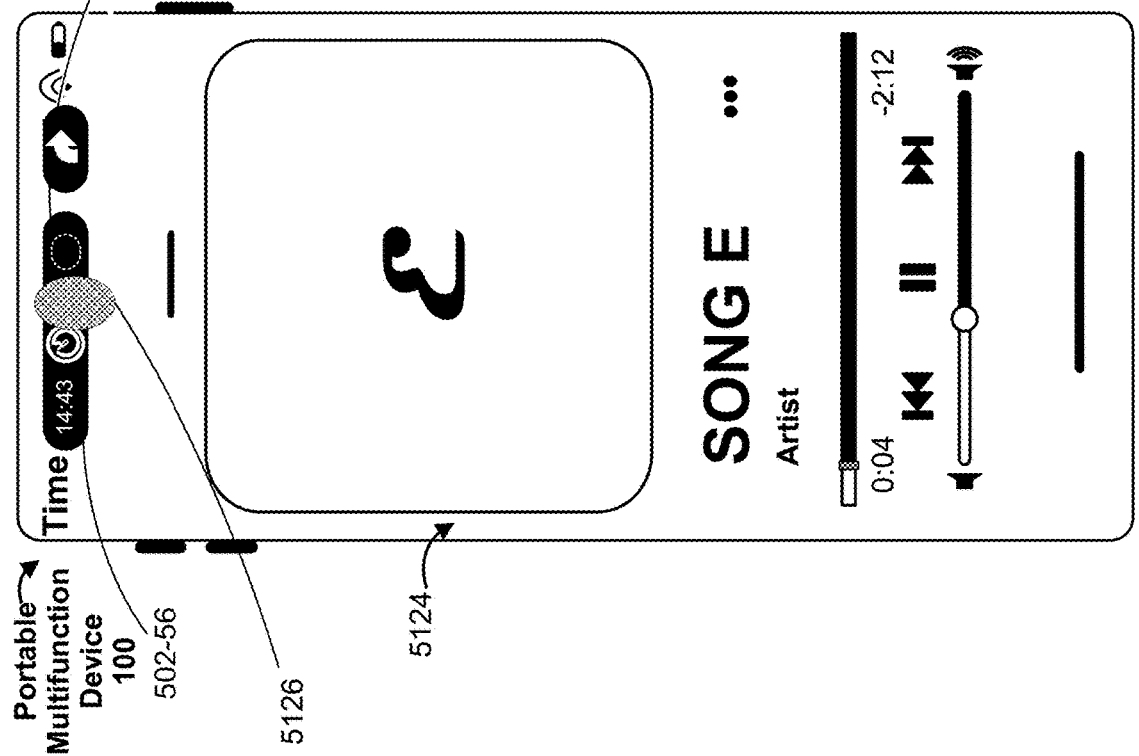
Figure 5C:
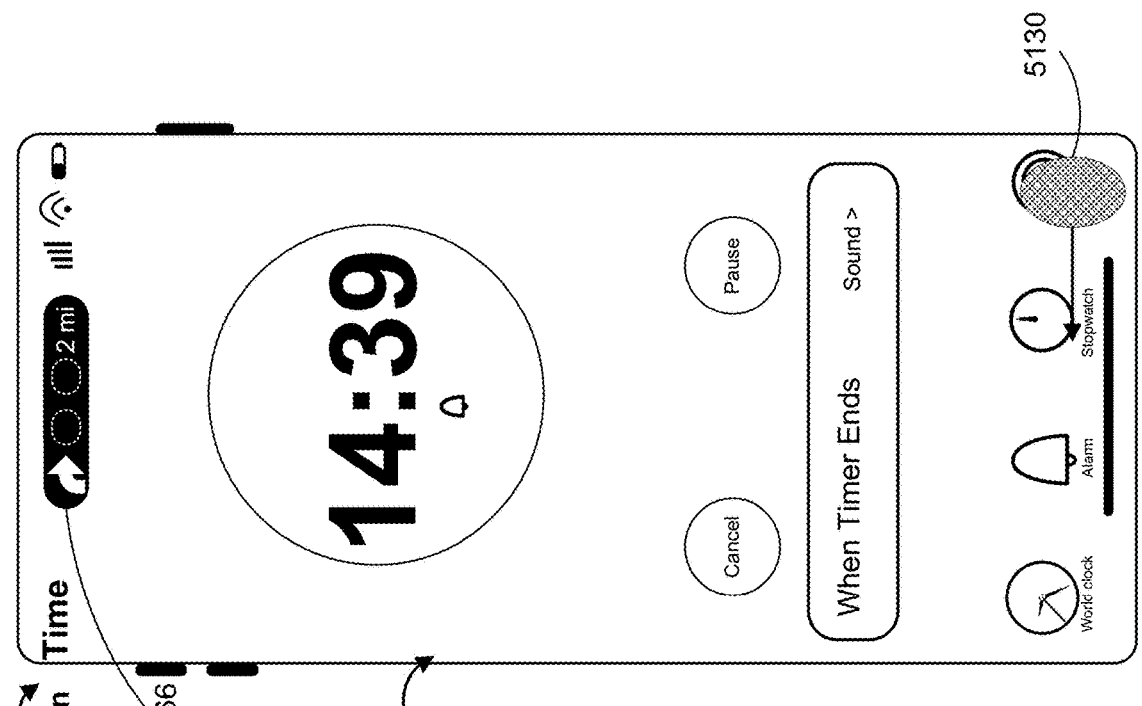
Figure 5C:
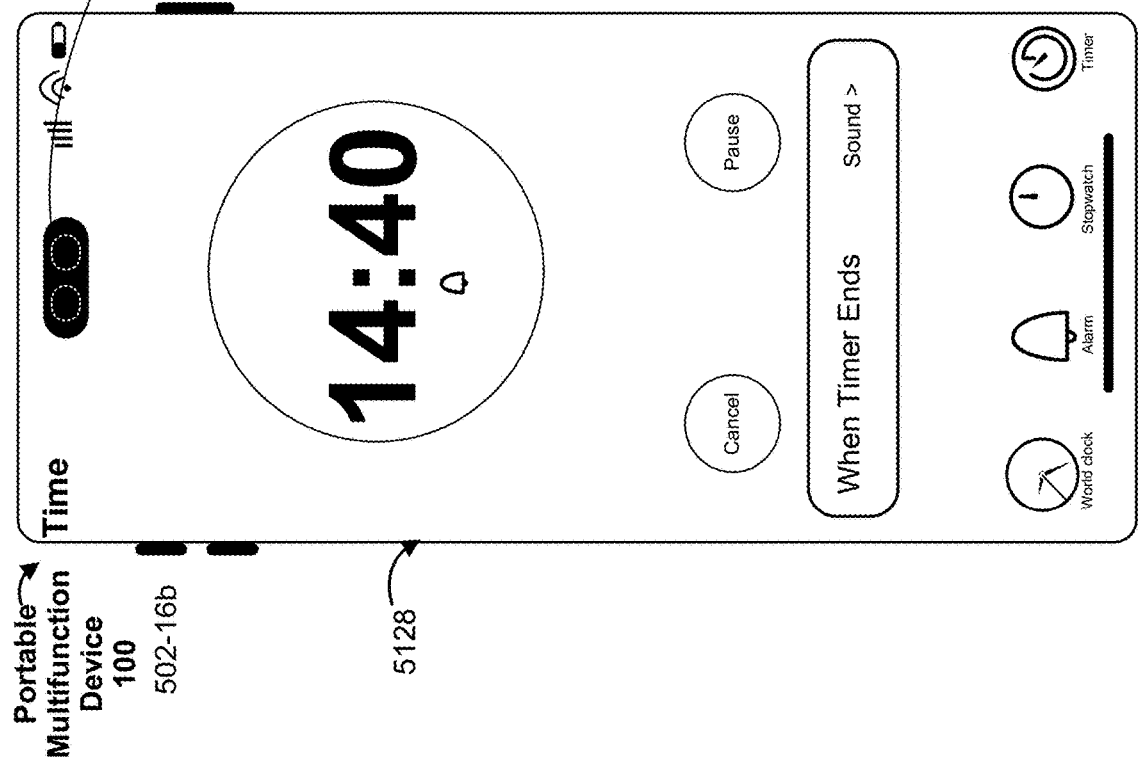
Figure 5C:
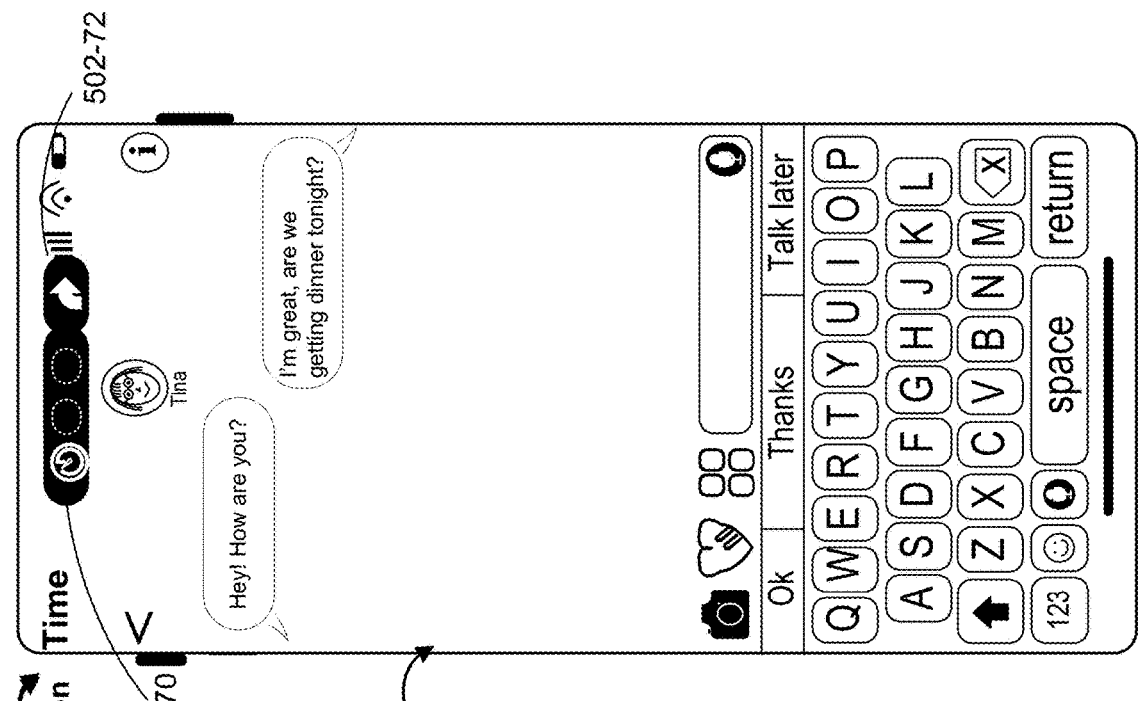
Figure 5C:
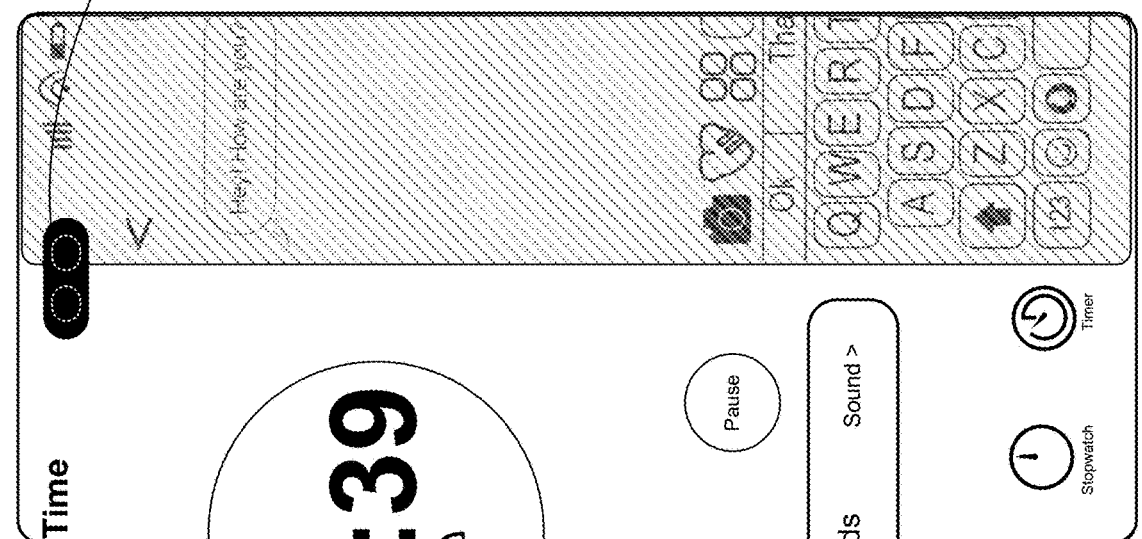
Figure 5C:
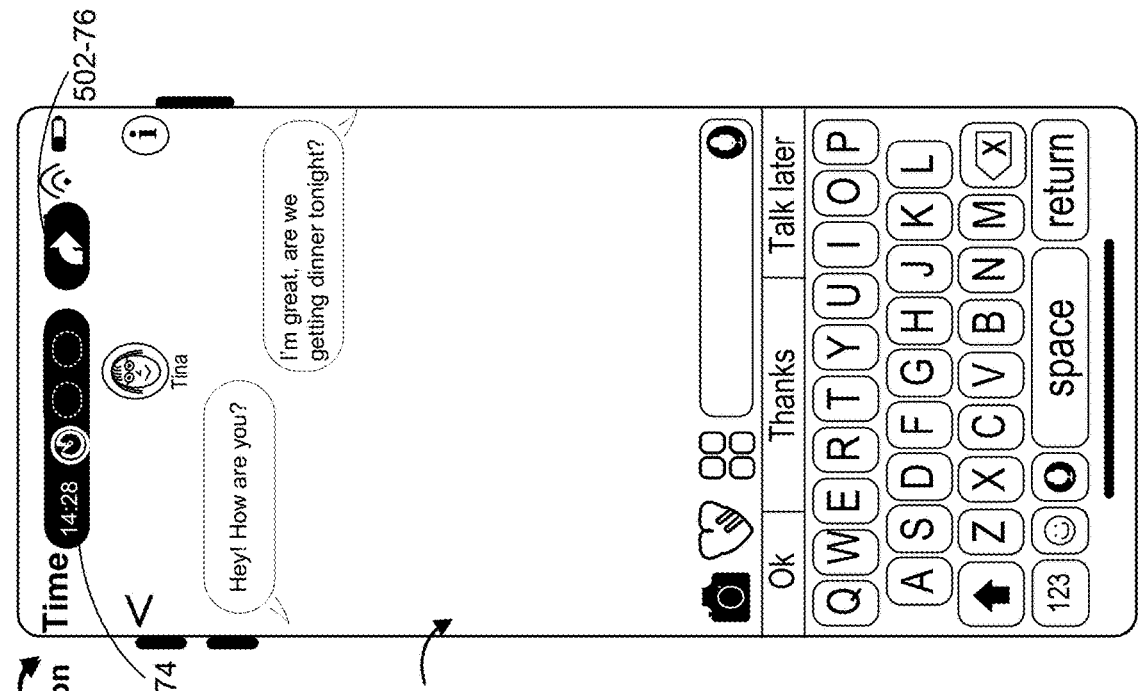
Figure 5C:
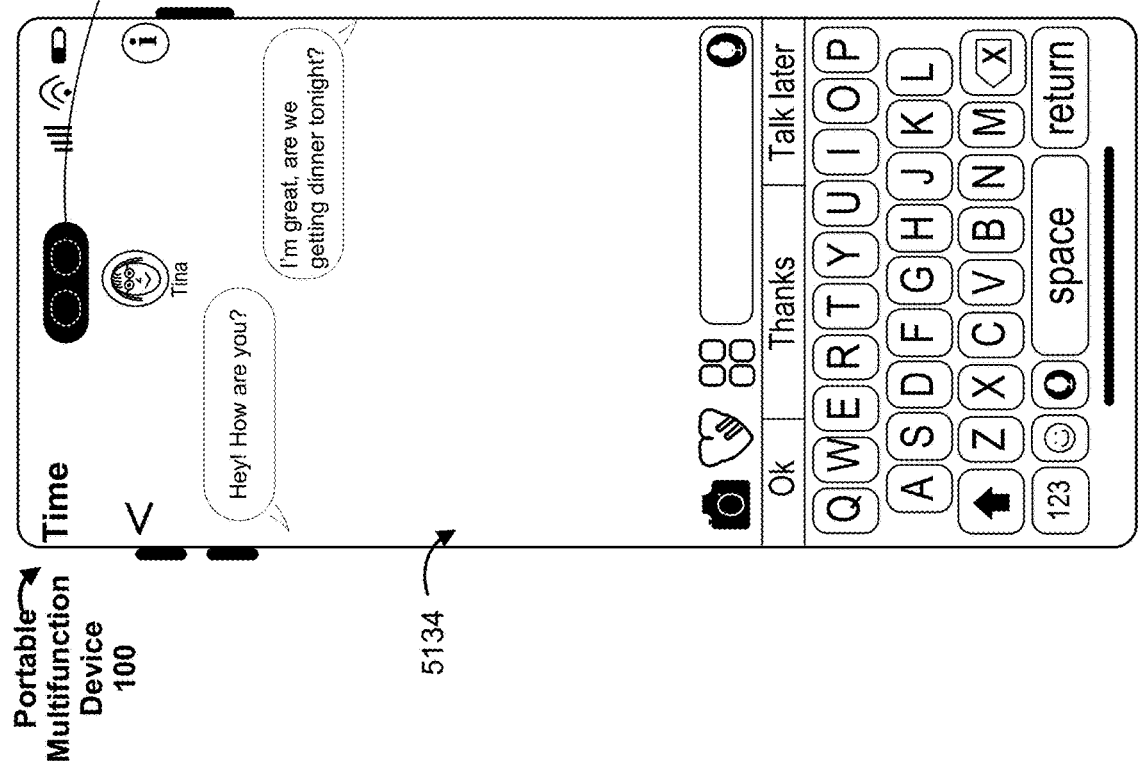
Figure 5C:
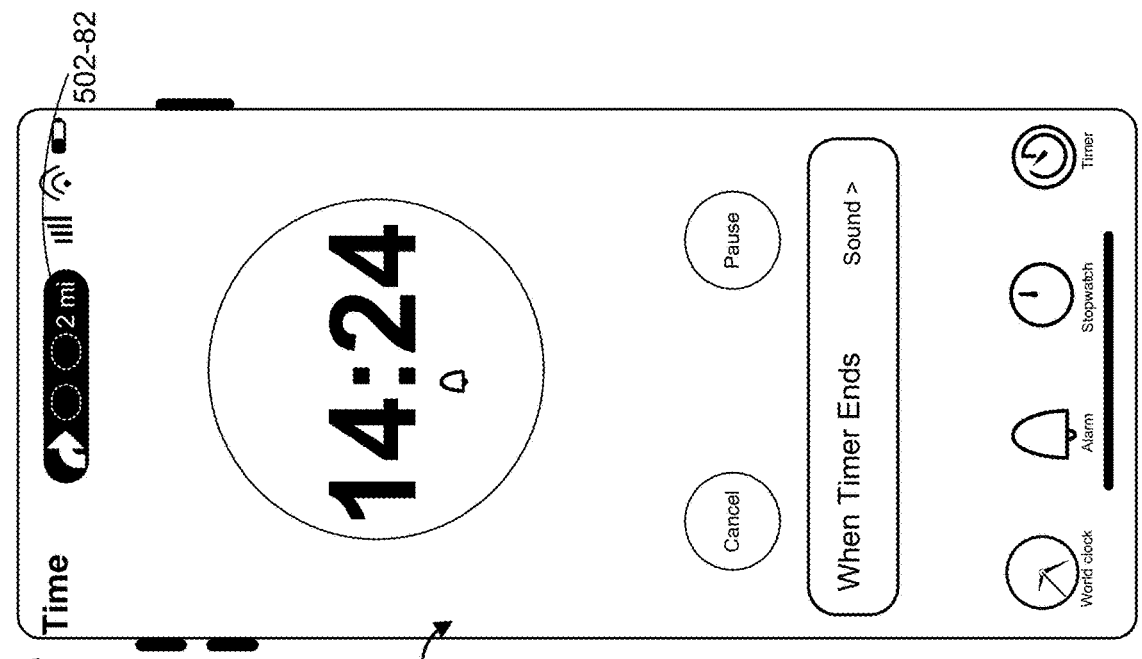
Figure 5C:
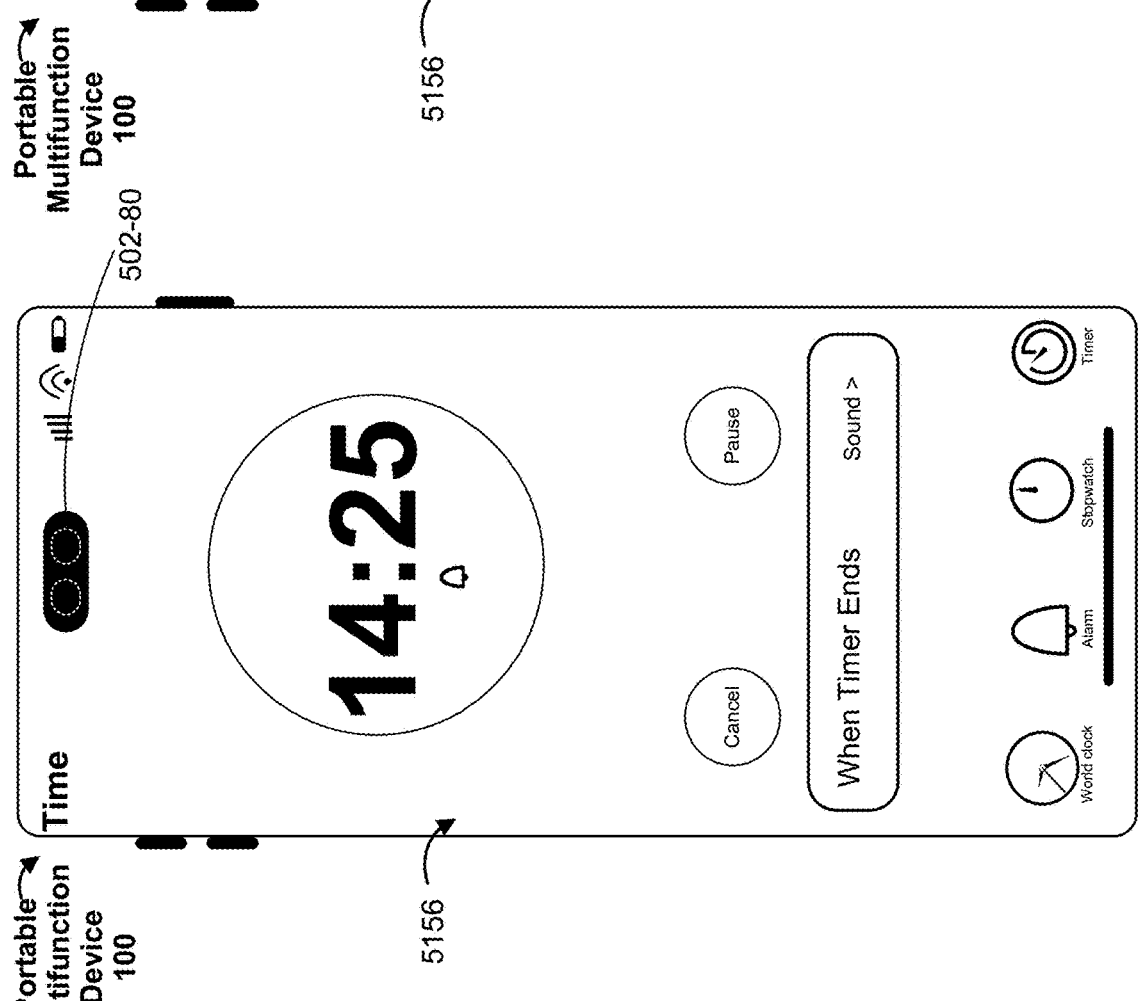
Figure 5C:
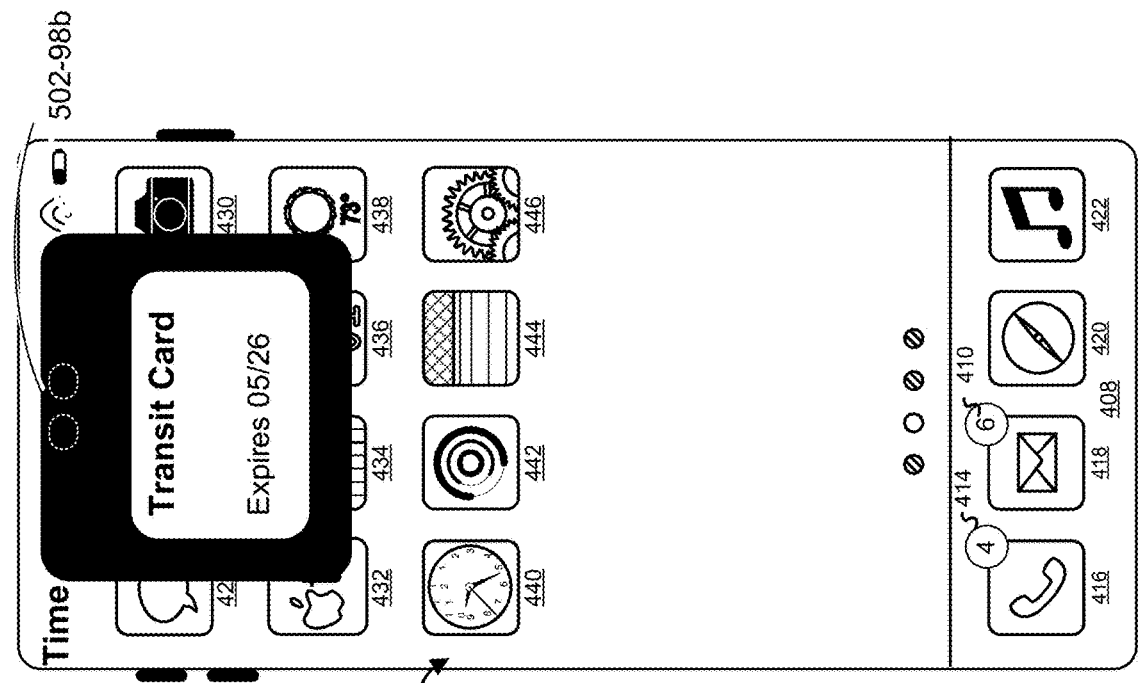
Figure 5C:
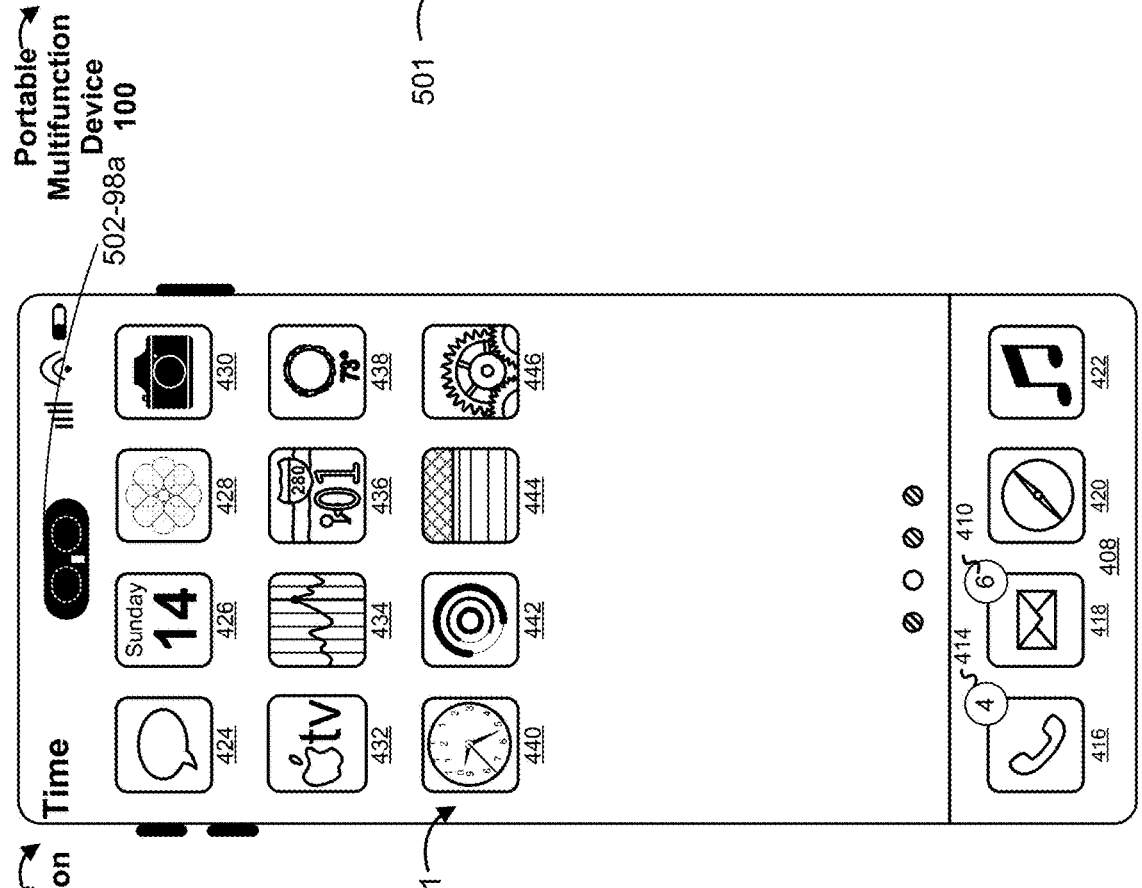
Figure 5C:
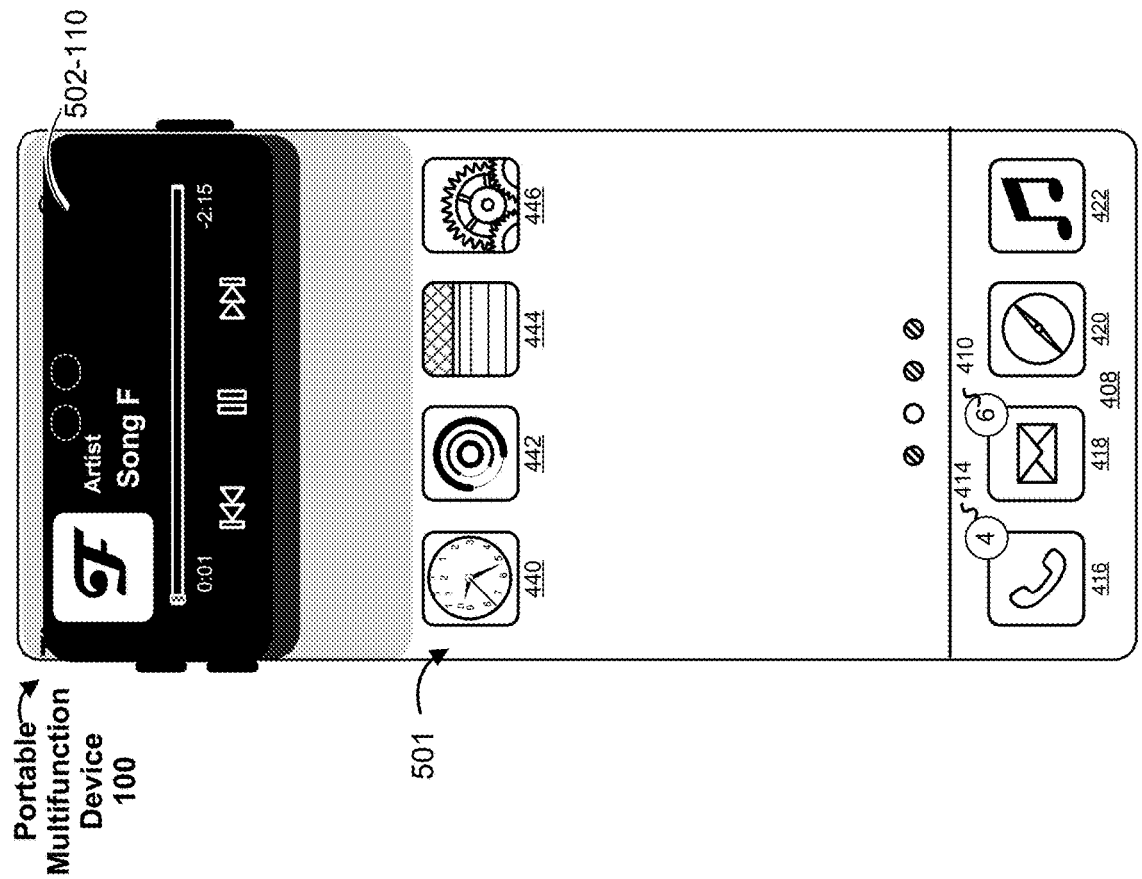
Figure 5C:
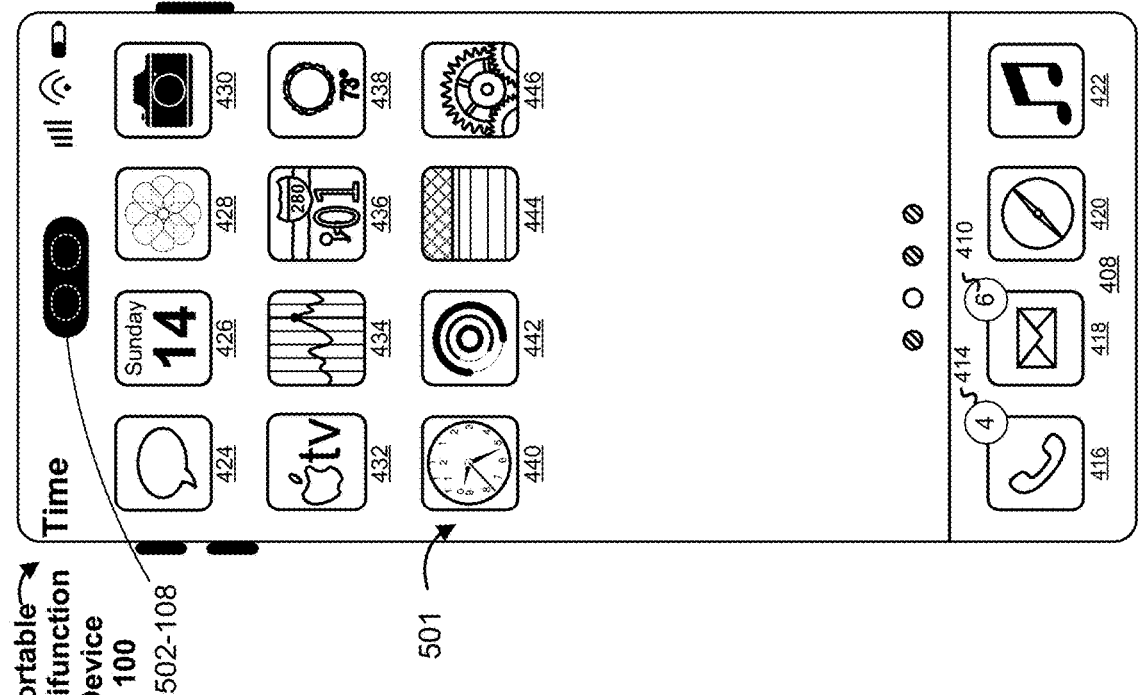

FIG. 5Y illustrates a plurality of distinct inputs that may be directed to different user interface objects displayed in home screen user interface 501. In some embodiments, each of the inputs corresponds to a request to open an application associated with the respective application icon selected by the input. For example, user input 558 on icon 424 for the messaging application opens a user interface for the messaging application (e.g., user interface 500), user input 560 on icon 426 for a calendar application opens a user interface for the calendar application, user input 562 on icon 446 for a settings application opens a user interface with a menu for changing a plurality of settings of device 100, and user input 564 on (or directed to) icon 422 for a music application opens a user interface for the music application. In some embodiments, as the user navigates to different user interfaces for different applications, the session region 502-7 continues to be displayed and continues to be updated with the length of time remaining on the current timer session.

In some embodiments, as described in more detail below, the user is enabled to initiate an additional session by interacting with a respective application, and the session region is updated to reflect two or more currently active sessions at the same time. For example, as noted above, user input 564 on icon 422 for a music application causes the device 100 to display a user interface 566 for the music application, which is illustrated in FIG. 5Z.

FIG. 5Z illustrates a user input 568, such as a tap input, requesting to initiate playback of a media content item (e.g., by selecting the "Listen Now" button). In some embodiments, the user interface 566 of the music application is updated to user interface 570, to display information for the currently playing media content item, as illustrated in FIG. 5AA. In some embodiments, the currently playing media content item (e.g., song, audiobook, and/or video), or media content playback in general from the music application, corresponds to an active session, and thus, if the user navigates away from viewing the active media playback session in the music application user interface (e.g., navigates away from user interface 570), session information for the active session will move to the session region 502-7. In some embodiments, the request to navigate away from user interface 570 is a request to display another application user interface, such as mail application user interface 574, via user input 572. In some embodiments, the user input 572 is a swipe gesture along a respective portion (e.g., a bottom edge or side) of the display.

FIG. 5AB illustrates that, while displaying a user interface for an application, such as mail application user interface 574, that does not correspond to an active session or that is different from at least one other application that has an active session, the session region displays information for at least the one active session. In the example in FIG. 5AB, the session region displays information for two currently active sessions, including the active timer session (initiated as shown in FIGS. 5R-5S) and the active media playback session (e.g., initiated while displaying the music application as shown in FIGS. 5Z-5AB). In some embodiments, while two or more sessions are concurrently active, the session region 502-7 separates into two portions: a first portion for timer session region 502-8 and a second portion for media playback session region 502-9, optionally wherein each portion is a different size and/or at least one portion encompasses the one or more sensor cutouts. For example, in order to fit information for both sessions concurrently on the display, the information for the timer session shifts to the right of the sensors and the information for the media playback session is in a distinct user interface element to the right of the sensors. In some embodiments, at least one of the portions of the session region encompasses the one or more sensors. For example, in FIG. 5AB, first portion of session region 502-8 encompasses the one or more sensor cutouts. In some embodiments, second portion of session region 502-9 optionally encompasses the one or more sensor cutouts. In some embodiments, one sensor cutout is encompassed by first portion of session region 502-8 and the other sensor cutout is encompassed by second portion of session region 502-9. In some embodiments, for two active sessions, the session region is divided into three portions, wherein information about the currently active sessions is displayed in separate regions for each active session, one to the right and one to the left of a third portion of the session region that encompasses the one or more sensor cutouts. For example, the third portion of the session region that encompasses the one or more sensor cutouts (e.g., a center portion of the session region between the right and left active session portions) does not display active session information.

In some embodiments, while a session is active in the session region, the session region is displayed with an animation that periodically expands and contracts a size of the session region. In some embodiments, the session region periodically expands and contracts optionally while the session region is displayed as a condensed version of the session region and/or while the session region is displayed as an expanded version of the session region (e.g., with one or more activatable control options displayed within the expanded session region, such as in session region 502-3 and in session region 502-6). In some embodiments, as illustrated in FIG. 5AB, the dotted lines illustrate an outer limit of the animation to which a respective corresponding portion of the session region increases in size before contracting back to the size of the respective portion as illustrated in FIG. 5AB. In some embodiments, the animation of expanding and contracting (also referred to herein as oscillating) the respective portion of the session region is repeated periodically (e.g., every 0.01, 0.05, 0.1, 0.2, 0.5, 1, 2, or 5 seconds) while the session is active. In some embodiments, the periodic oscillating animation expands the background (e.g., background color) of the respective portion of the session region without displaying additional information in the expanded area, and optionally maintaining the information at a same size while the background expands. In some embodiments, while there are two or more portions of the session region, the session region portions optionally expand and contract at different times, at different rates, and/or according to different oscillation patterns. For example, as illustrated in FIG. 5AC, the first portion of the session region 502-8 is expanded to an enlarged size (e.g., the size indicated by the dashed lines in FIG. 5AB). In some embodiments, while the first portion of the session region 502-8 is expanded, the second portion of the session region 502-9, corresponding to a different session (e.g., a media playback session) is not expanded. In some embodiments, as the first portion of the session region 502-8 shrinks back down to its size illustrated in FIG. 5AB, the second portion of the session region 502-9 expands to an enlarged size indicated by the dashed lines in FIGS. 5AB-5AC. In some embodiments, the first portion of the session region 502-8 and the second portion of the session region 502-9, and optionally additional portions of the session region, expand and contract periodically at different times. For example, the session regions change size at staggered times, as illustrated in FIGS. 5AE-5AF in which first portion of the session region 502-8 is expanded when second portion of the session region 502-9 is not expanded, and vice versa. In some embodiments, each portion of the session region is animated according to a same period or a different period. For example, the first portion of the session region completes the animation of expanding and contracting every 0.5 seconds while the second portion of the session region completes the animation of expanding and contracting every 0.6 seconds. In some embodiments, the animations of different portions of the session region have the same phase or are out of phase (e.g., for two animations with the same or approximately the same period, one is optionally started earlier than the other).

In some embodiments, a rate of oscillation of the session region is based on the respective application with which the session region is associated. In some embodiments, while the session region is associated with two or more different applications represented in distinct portions of the session region, a rate of oscillation of a respective portion is based on the respective application associated with that portion. For example, the rate of oscillation is based on a rate of animation of user interface elements that are displayed in the session region for the respective application. In some embodiments, the rate of oscillation is based on an urgency of the session. For example, for an alert that is time-sensitive, or otherwise considered urgent, such as an alert for an incoming communication session or an alert for a navigation instruction for a maps session, the rate of oscillation is optionally faster than a rate of oscillation for a non-urgent alert, such as for an ongoing voice recording session. In some embodiments, a first type of session associated with a first application causes the session region to oscillate (e.g., an ongoing communication session, a timer, and/or a maps session), and a second type of session associated with a second application does not cause the session region to oscillate (e.g., a low battery alert and/or a silent mode alert).

In some embodiments, the rate of oscillation is different for oscillation while the session region is expanded than for oscillation while the session region is condensed for an active session. For example, in some embodiments, both the condensed and expanded session regions oscillate. In some embodiments, an expanded session region has a slower rate of oscillation than the condensed session region. In some embodiments, an expanded session region optionally does not oscillate whereas the condensed session region does oscillate. In some embodiments, in accordance with a determination that the session region is minimized (e.g., there is no active session displayed in the session region, as illustrated in FIG. 5A, or status information displayed in the session region fits in the minimized status region, such as between sensor regions), the session region does not oscillate. In some embodiments, if the session region is minimized yet includes status information that fits in the minimized status region (e.g., a privacy indicator or lock indicator displayed between sensor regions), the session region oscillates.

In some embodiments, in response to a user input 576 (FIG. 5AC), such as a tap input or a long press and hold gesture, that is detected on the first portion of the session region 502-8, the first portion of the session region 502-8 is enlarged to session region 502-10 that includes additional information about the active session, including one or more controls for the active session, as illustrated in FIG. 5AD. For example, session region 502-10 provides a control option to pause the timer and a control option to stop the timer, which ends the active timer session. In some embodiments, in response to a user input on a respective control (e.g., a tap input or other selection input), the operation corresponding to the respective control is performed. In some embodiments, an animation is provided to display session region 502-10 expanding from the first portion of the session region 502-8 progressively through a plurality of intermediate display states between display of session region 502-8 and display of session region 502-10. In some embodiments, a size of the expanded session region 502-10 covers a portion of the display in which the second portion of the session region 502-9 was displayed. In some embodiments, the second portion of the session region 502-9 ceases to be displayed, optionally until the expanded session region 502-10 shrinks back down to the first portion of the session region 502-8. In some embodiments, if no user inputs are detected on the session region 502-10, the session region 502-10 automatically returns to a size of the first portion of the session region 502-8 after a predetermined time period (e.g., 1, 3, 5, 15, 30, or 60 seconds), as illustrated in FIGS. 5AD-5AE. In some embodiments, the session region 502-10 returns to the size of the first portion of the session region 502-8 in response to detecting a user input that is outside of the session region 502-10 (which in some embodiments is treated not only as a user input to dismiss the expanded session region 502-10 and return to the condensed session region 502-8, but also a user input interacting with a corresponding portion of the user interface that is displayed outside of the session region (e.g., mail application user interface 574 in FIG. 5AD)).

FIG. 5AD further illustrates a user input 578 that corresponds to a request to display a user interface for another application. In some embodiments, user input 578 is a drag gesture along a bottom edge, a swipe gesture, a tap input or another user input to navigate between user interfaces on the device 100. In response to the user input 578, the device 100 displays a user interface 542 for the web browser application. As noted above and further illustrated by FIGS. 5AE-5AF, in some embodiments, after changing display of the user interface displayed outside of the session region, the first portion of the session region 502-8 and second portion of the session region 502-9 continue to be displayed. For example, FIG. 5AE illustrates a user input 580, such as a swipe up (or other home navigation input such as a button press), to return to a view of the home screen user interface 501-2 (e.g., if, from the scenario in FIG. 5Y, the user swiped left to switch from home screen user interface 501-1 back to home screen user interface 501-2, as shown in FIG. 5X, before providing user input 564 on music application icon 422 to open user interface 566 for the music application, as shown in FIG. 5Z). In some embodiments, while displaying the home screen user interface 501-2 in FIG. 5AF, the first portion of the session region 502-8 and second portion of the session region 502-9 continue to be displayed while animating each portion of the session region to expand and contract periodically.

FIG. 5AF illustrates a user input 582 selecting an application icon for opening a voice memo application. In response to the user input 582, the device displays a user interface 584 (FIG. 5AG) for recording a voice memo in the voice memo application. In some embodiments, the user interface 584 comprises a dark (e.g., black, dark grey, or dark blue) background with brighter and/or more luminant colors for foreground elements (relative to a background) such as text, buttons, and status indicators such as the time and the battery indicator. In some embodiments, in accordance with the portion of the display that surrounds the portions of the session region, including first portion of the session region 502-8 and second portion of the session region 502-9, having a color that satisfies a threshold amount of luminance (e.g., has less than a threshold amount of luminance), one or more visual properties of the respective borders of the respective portions of the session regions change (e.g., relative to when the portion of the display that surrounds the session region portions has more than the threshold amount of luminance), optionally without changing the content displayed within the session region (e.g., the inner portion of the session region is maintained with a color that matches a color of the one or more sensors).

For example, if the user interface is displayed with a dark user interface element surrounding the session regions 502-8 and 502-9 and/or if the device 100 is in dark mode, the border 585c of session region 502-8 and/or border 585d of session region 502-9 is displayed with a more prominent visual effect than if the user interface is displayed with a light user interface element surrounding the session region 502 (e.g., including portions 502-8 and 502-9) and/or if the device is in light mode. For example, while the user interface is displayed with a light background, the border 585a of session region 502-8 and the border 585b of session region 502-9 are displayed with a less prominent visual effect, where the visual effect includes a thinner, more transparent and/or dimmer border, than while the user interface is displayed with a dark background.

In some embodiments, the respective borders of the session regions 502-8 and 502-9 are displayed or updated in accordance with a current size of the session region. For example, while a session region is minimized the border is optionally displayed without a distinct color and/or contrast (e.g., instead, the border is displayed as a small amount of pixels having a color that matches a color of the background of the session region to display a crisp edge), and while the session region is expanded, the border is optionally displayed with a colored and/or more prominent keyline.

In some embodiments, a border of a respective session region changes over time. For example, the border of the session region is animated to increase and/or decrease in thickness periodically, optionally in accordance with a rate of oscillation of the session region.

FIG. 5AG illustrates a user input 586 selecting a button to start recording a new voice memo. In response, recording of a new voice memo is initiated, as indicated in FIG. 5AH by updated voice memo user interface 584 and by privacy indicator 518 displayed in the corner of the display, instead of the battery indicator 506. Privacy indicator 518 is displayed to indicate current or recent use of the camera, microphone, and/or location sensors to capture information about the device or the environment of the device. In the example in FIG. 5AH, privacy indicator 518 indicates, at a minimum, current use of the microphone for recording the voice memo. In some embodiments, in circumstances in which the session region is empty while voice recording is ongoing, privacy indicator 518 is displayed between the sensor regions in the session region. In some such circumstances, according to some embodiments, no border is displayed around the session region (e.g., because the session region with only the privacy indicator 518 displayed is considered to be empty), for example as illustrated by session region 5041 (FIG. 5BL); whereas according to some embodiments, a border is displayed (e.g., because the session region with only the privacy indicator 518 displayed is not considered to be empty). In some embodiments, while the voice memo is being recorded, the user requests to navigate to another user interface, and to minimize and/or close out of the user interface 584 for the voice memo application. For example, user input 588 in FIG. 5AH corresponds to a swipe up gesture to return to the home screen user interface.

In some embodiments, in response to user input 588, the device 100 displays the home screen user interface 501. Although FIG. 5AI and other figures that follow show home screen user interface 501, it is noted that in some embodiments device 100 returns instead to home screen user interface 501-2, based on home screen user interface 501-2 being the last displayed home screen user interface (e.g., as in FIG. 5AF, just prior to the voice memo application being displayed). In some embodiments, the session region concurrently displays indications for up to two active sessions. For example, after the user started a voice recording, three active sessions are ongoing on device 100: a timer session, a media playback session, and a voice recording session. In some embodiments, the applications associated with the active sessions are ranked according to relative priority. In some embodiments, the priority order is automatically determined by device 100, for example a communication session and a map navigation session are prioritized higher than a timer session. In some embodiments, a user is enabled to change the priority order by selecting which application sessions take higher priority over other application sessions (e.g., via a settings application, settings file, assignment of a high priority to a respective application, assignment of a respective application to one of a plurality of predefined priority levels, or other method of implementing user-defined priority). In some embodiments, if the session region only displays up to two active sessions concurrently, the top two highest-priority application sessions are displayed in the session region (e.g., as two distinct portions of the session region). For example, in FIG. 5AI, the voice recording session 502-10 has a higher priority ranking than the timer session 502-8 (e.g., and the media playback session 502-9 has a higher priority ranking than the timer session 502-8), and thus the portion of the session region that displayed the timer session 502-8 is no longer displayed, and the session region instead displays information for the voice recording session 502-10 (e.g., along with the media playback session 502-9). In addition, privacy indicator 518 is displayed in voice recording session region 502-10 (e.g., due to the microphone being used for the voice memo being recorded).

In some embodiments in which assignment of an active session to a respective portion of the session region is, for up to two active sessions, based on priority (e.g., with the higher priority session displayed in the left session region portion and the lower priority session displayed in the right session region portion), a third newly-displayed session takes the place of the lowest priority session regardless of whether the newly displayed session is higher or lower priority than the other displayed session. For example, if the media playback session 502-9 were the lowest priority session and the voice recording session 502-10 the highest priority session, the voice recording session 502-10 would take the place of the media playback session 502-9 in the right portion of the session region while the timer session 502-8 continued to be displayed in the left portion of the session region (e.g., despite the voice recording session 502-10 being higher priority than the timer session 502-8), to reduce the amount of reshuffling in the session region.

In some embodiments, as illustrated in FIG. 5AJ, the device 100 is enabled to display up to three active sessions concurrently in the session region. In some embodiments, the portions of the session region are smaller while additional session portions are displayed (e.g., the portions when two sessions are displayed are smaller than when one session is displayed, and optionally the portions when three sessions are displayed are smaller than when two sessions are displayed). For example, FIG. 5AJ illustrates three portions of the session region that display information for each of the three active sessions: a timer session 502-13, a media playback session 502-12, and a voice recording session 502-11. In some embodiments, the arrangement of the three portions is based on the session priorities (e.g., the highest priority application session is on the left and the lowest priority application session is on the right). In some embodiments, the arrangement of the three portions is based on an order in which the sessions became active (e.g., the application with a session that has been ongoing for the longest period of time is displayed on the far right or left). In some embodiments, the arrangement of the three portions of the session region is determined so as to minimize moving the application sessions that were already displayed before the third session was active (e.g., the media playback session is maintained on the far right side because the media playback session was previously displayed there and/or the timer session is maintained on the far left side or in the center portion because the timer session was previously displayed there).

In some embodiments, in accordance with a determination that the portions of the session region and/or the session region take up more space (e.g., in the horizontal direction) as additional active sessions are added, one or more status indicators are optionally removed. For example, as the session region requires additional space on the display, the time and/or the battery indicator cease to be displayed so that the session region can expand closer to an edge of the display (e.g., in portrait mode, expanding closer to a vertical edge while taking up more space along the horizontal edge). For example, as illustrated in FIG. 5S, the cellular network indicator 503 (FIG. 5R) is hidden (e.g., ceases to be displayed, at least temporarily) due to the addition of the timer session expanding the session region from session region 502-1 to session region 502-7. In another example, as illustrated in FIG. 5AB, the Wi-Fi indicator 505 (FIG. 5AA) is hidden due to the further addition of media playback session 502-9 to the session region. In addition, whereas in FIG. 5AI privacy indicator 518 is displayed in voice memo session region 502-10, in FIG. 5AJ, privacy indicator 518 is displayed in the corner (e.g., the top right corner) of the display, outside of voice recording session region 502-11 (e.g., due to insufficient space in voice recording session region 502-11 and/or due to the privacy indicator 518 not being relevant to the media playback session region 502-12 and therefore not displayed between the sensor regions within media playback session region 502-12), and replacing battery indicator 506 (e.g., due to insufficient space in the top part of the display outside of the session region portions 502 and/or in some embodiments due to privacy indicator 518 being relevant to more than one displayed session region portion). In some embodiments, due to adding the third active session (e.g., the voice recording session) to the status region, as illustrated in FIG. 5AJ, one or more additional status indicators are hidden (e.g., the current time and/or the battery indicator). In some embodiments, when a session region is expanded further (e.g., to include one or more activatable control options), as illustrated in FIG. 5AK in which the session region 502-14 for the current media playback session is expanded to occupy all or substantially all of the width of the display, all of the status indicators, including the time, the battery indicator, and the privacy indicator 518, are no longer displayed.

In some embodiments, as illustrated in FIG. 5AK, the session region automatically expands (e.g., downward and/or outward, such as for a session region that is generally centered in a top portion of the display) from the sensor cutouts in accordance with an event occurring in one of the active sessions, optionally without receiving one or more user inputs directed to the session region. For example, a media content item (indicated by the "A" cover art in session region 502-9 in FIG. 5AI, and in session region 502-12 in FIG. 5AJ) that was playing in the media playback session completes playback and a next media content item (e.g., "Song B") begins playback. In some embodiments, the event of automatically beginning to play a different media content item causes the session region to automatically expand to display additional information about the session that corresponds to the event. For example, session region 502-14 includes additional information about the playback of "Song B" and includes control options for controlling the session (e.g., skip back, pause, and skip forward). In some embodiments, display of the expanded session region 502-14 is animated as a transition from session region 502-8 that expands outward.

In some embodiments, after a predetermined amount of time has passed or after detecting a user input outside of the session region 502-14, the expanded session region 502-14 automatically shrinks back down to session region 502-9 illustrated in FIG. 5AL. In some embodiments, as the expanded session region is shrinking down to a smaller size, the content (e.g., session information and/or controls) that is displayed in the expanded session gradually fades, while optionally shrinking, at a rate selected such that the content disappears before the content would be displayed as overlapping with the sensors. In some embodiments, the content displayed in the session region 502-14 is positioned within the session region 502-14 to avoid overlapping with the one or more sensor cutouts. More generally, for a session region that encompasses one or more sensor cutouts, active session content displayed in the session region is positioned within the session region to avoid overlapping with the one or more sensor cutouts.

As illustrated, session region 502-9 is updated to include current playback information about the media playback session (e.g., the "B" cover art associated with "Song B" is displayed in session region 502-9 instead of the "A" cover art associated with "Song A," which was displayed in the session region 502-8 in FIG. 5AI, and in the session region 502-9 in FIG. 5AJ). Session region 502-10 also continues to be updated with current information about the active session, for example the session region 502-10 displays that the voice recording has been ongoing for 0:36 seconds in FIG. 5AL, increased from 0:32 seconds in FIG. 5AI.

FIG. 5AL illustrates a user input 590 directed to the session region 502-9. In some embodiments, depending on the type of user input 590, the device 100 performs a different set of operations. For example, as illustrated in FIG. 5AM, in response to a first type of user input, such as a long press user input in which the user maintains contact with the display for a threshold amount of time, the session region 502-9 expands to display additional information about the session in session region 502-14 without opening, or displaying a user interface outside of the session region for, the application associated with the session, where expanded session region 502-14 includes one or more selectable controls for performing respective operations associated with media playback (e.g., to play, pause, skip back, skip forward, and/or scrub through currently selected media) in response to user input directed to a respective selectable control. In some embodiments, the session region 502-9 expands without providing a tactile and/or audio output. In some embodiments, as illustrated in FIG. 5AN, in response to a second type of input, such as a tap input, an application user interface 570 for the application associated with the session region 502-9 is displayed, optionally without displaying the expanded session region 502-14 (e.g., without displaying the user interface illustrated in FIG. 5AM) (e.g., in response to a second type of user input 590 in FIG. 5AL, device 100 transitions directly from FIG. 5AL to FIG. 5AN).

In some embodiments, a second user input 591 (e.g., a tap input or other selection input) detected on the expanded version of the session region 502-14 in FIG. 5AM causes the device to open the application user interface 570 for the media player application (FIG. 5AN) from the expanded session region 502-14 (e.g., device 100 is configured to transition from intermediate FIG. 5AM to FIG. 5AN in response to user input 591, after a first type of user input 590 in FIG. 5AL caused device 100 to transition from FIG. 5AL to intermediate FIG. 5AM).

In some embodiments, the session region ceases displaying, in the session region, information about the media player application while the user interface 570 for the media player application is displayed outside of the session region. For example, because the session information is displayed in the application user interface, the session information does not also need to be displayed in the session region. In some embodiments, while displaying the user interface 570 for the media player application in FIG. 5AN, the session region for the active timer session is redisplayed while also continuing to display session region 502-10 for the active voice recording. For example, because the device 100 displays up to two active sessions concurrently, the device replaces display of the session for the media player with display of the timer session 502-15 in the session region.

FIG. 5AN further displays a user input 592 selecting the session region 502-10 for the active voice recording session. In some embodiments, in accordance with a determination that the user input is the second type of user input (e.g., a tap input or other selection input), and in response to the user input 592, the application user interface 584 for the voice memos application is displayed, as illustrated in FIG. 5AO. In some embodiments, while the user interface 584 for the voice memos application is displayed, the session region ceases to display session information for the voice recording (e.g., in FIG. 5AO, voice memo session region 502-10 is no longer displayed). In some embodiments, the device 100 optionally redisplays the media player session in the second portion of session region 502-9 and moves display of the active timer session region to the first portion of the session region 502-8 (e.g., in accordance with a determination that the active timer session was initiated before the media player session was initiated).

FIG. 5AO illustrates a user input 594, such as a tap user input, that selects the "Stop" button in the voice memos application user interface 584. In some embodiments, in accordance with the user input requesting to stop the voice recording, the voice recording session is no longer active, as indicated in FIG. 5AP in which the stopped recording is listed as "Recording 2," the "Stop" button has been changed back to a "Record" button for starting a new recording, and privacy indicator 518 is no longer displayed, with battery indicator 506 (or another currently active, system-determined, or user-defined status indicator) redisplayed instead. As such, if the user navigates away from the user interface of the voice memos application while a voice recording is not ongoing, there is no active session for the voice memos application, and the session region does not display information for the voice memos application (e.g., as in FIGS. 5AQ and 5AW), optionally until a next active session for the voice memos application is initiated (e.g., another voice recording is started).

FIG. 5AP displays a user input 596 that is detected while displaying the user interface 584 for the voice memos application. In some embodiments, user input 596 is a swipe gesture, a drag gesture, a press and hold gesture, or another gesture for navigating to a control user interface 598. In some embodiments, in response to the user input 596, the device 100 displays control user interface 598, as illustrated in FIG. 5AQ.

In some embodiments, the control user interface 598 enables a user to modify one or more settings of device 100 and/or to quickly access one or more shortcuts for applications stored on device 100. For example, the user is enabled to change a volume setting and/or a brightness setting (e.g., using one or more slider bars), turn on or off Bluetooth, Wi-Fi, network connectivity, Airplane mode, and further is enabled to select and/or deselect icons for turning on a flashlight, opening a camera application, opening a calculator application, and/or opening a timer application. In some embodiments, the control user interface 598 is customizable by the user such that the user selects which settings and/or shortcuts for applications to include in the control user interface 598.

In some embodiments, as illustrated in FIG. 5AQ, device 100 is configured to receive one or more user inputs, such as user input 5000 and/or user input 5002. In some embodiments, user input 5000 is a user input (e.g., a long press, a tap, or other selection user input) on a physical, or simulated, button that optionally is on a side of the display of device 100. In some embodiments, user input 5002 is a drag or swipe gesture that is initiated at a top edge of the display of the device. In some embodiments, each of user input 5000 and user input 5002 cause the device 100 to display a wake screen user interface 5004 and/or a cover sheet user interface. For example, the wake screen user interface 5004 is a user interface that is displayed after the display of device 100 has entered a low power state during which the display is at least partially off, in response to an input prompting device 100 to come out of the low power state. In some embodiments, in the low power state, the display optionally displays an "always on" indicator of a time and/or date. For example, in response to the user input 5000 in FIG. 5AQ, the device 100 enters a low power state (e.g., the display turns off), and FIG. 5AR1 represents the user interface that is displayed when the device is prompted to come out of the low power state.

In some embodiments, in response to the user input 5000 in FIG. 5AQ, the device enters a locked state in which a password, passcode and/or biometric authentication is required to unlock the device, wherein the device has limited functionality in the locked state and must be unlocked before accessing respective applications and/or data stored on device 100. In some embodiments, the wake screen user interface is displayed regardless of whether the device is in the locked state or has already been unlocked (e.g., the wake screen user interface is displayed upon waking the device before the user accesses the home screen user interface and/or other application user interfaces). In some embodiments, the cover sheet user interface includes the same characteristics as the wake screen user interface, but the user is enabled to view the cover sheet user interface optionally without entering the locked and/or low power state of the device. In some embodiments, one or more alerts (e.g., system alerts and/or notifications) are displayed on the wake screen user interface and/or the cover sheet user interface, optionally in response to a user input (e.g., a swipe gesture upward in the middle of the display, such as user input 5010 in FIG. 5AR1, or another gesture).

FIG. 5AR1 illustrates that, for one or more applications that have active sessions, in some embodiments, the active session is not displayed in the session region that includes the one or more sensor cutouts. For example, in FIG. 5AR1, the media playback session 502-9 is no longer displayed in the session region, and instead is displayed as a distinct user interface element 5006 on the wake screen user interface 5004. In some embodiments, the session is animated as moving out and/or away from the session region to the user interface element 5006. In some embodiments, the user interface element 5006 includes information about the currently playing media item (e.g., a title, artist, and/or cover art associated with the media item) and/or a plurality of controls (e.g., skip back, pause and/or play, skip forward, and optionally a volume control slider) for controlling the media playback session, and which are activatable by user input to performing a respective operation associated with media playback. In some embodiments, the user interface element 5006 is displayed at a predefined portion of the display area (e.g., under the date or at the bottom of the display area above the flashlight and/or camera icons). In some embodiments, one or more applications continue to be represented in the session region (e.g., the active timer session 502-16, optionally because the wake screen user interface 5004 is not configured to display a distinct user interface element for the timer application).

FIGS. 5AR2-5AR3 illustrate an example of moving two or more sessions from the session region to a coversheet user interface 5004a. In some embodiments, while there are three active sessions, including media playback session 502-9a, timer session 502-8a and sports session 599, in response to user input 5002b requesting to display a coversheet user interface 5004a, the device 100 displays the coversheet user interface 5004a (FIG. 5AR3) and two or more of the active sessions are displayed as user interface elements, including user interface element 5006 (e.g., for the media playback session) and user interface element 5007 (e.g., for the sports session), outside of the session region. In some embodiments, one or more sessions are optionally continued to be displayed in the session region (e.g., timer session 502-16a).

In some embodiments, even if the device has entered a low power state, the device maintains current information for the active sessions. For example, upon exiting the low power state, displaying the wake screen user interface 5004 includes displaying the session region 502-16 for the active timer session (e.g., with 01:21 time remaining). In some embodiments, a lock indicator 5008 is optionally displayed between the sensor cutouts in the session region to indicate that the device is in the locked state. In some embodiments, a lock indicator is displayed on the display outside of the session region (e.g., above the time "9:41" displayed on the wake screen user interface 5004).

FIG. 5AR1 illustrates a user input 5010 for requesting to view one or more alerts, wherein the user input 5010 is detected on the wake screen user interface 5004. In some embodiments, the user input 5010 is a swipe gesture in a first direction (e.g., upwards, downwards, right, or left) within a predefined area of the wake screen user interface 5004 (e.g., away from an edge of the display). In some embodiments, in response to the user input 5010, the device 100 displays a plurality of alerts (e.g., system alerts and/or notifications associated with respective applications) received by or occurring at device 100, as shown in FIG. 5AS. In some embodiments, while the notification view is displayed on the wake screen user interface, the user interface elements displayed on wake screen user interface 5004 appear to scroll up and off the display. For example, as illustrated in wake screen user interface 5004-1 in FIG. 5AS, the user interface element 5006 has shifted upward within the user interface.

FIG. 5AS further illustrates that, in accordance with a determination that the device 100 has been unlocked (e.g., using a passcode, fingerprint authentication, facial authentication, iris authentication or another biometric or non-biometric authentication), the lock indicator 5008 that is displayed between the sensor cutouts is updated to an unlocked appearance to indicate that device 100 is in an unlocked state. In some embodiments, the session region 502-16 continues to be updated as the timer session counts down the remaining time on the timer.

In some embodiments, the user is enabled to interact with the plurality of alerts, including opening an application that is associated with a respective alert and/or dismissing and/or silencing a respective alert. For example, FIG. 5AS illustrates a user input 5012, such as a swipe gesture from right to left, on a notification from the messages application, and as shown in FIG. 5AT, subsequent user input 5014 selects an option to clear the notification. As such, in FIG. 5AU, the notification from the messages application has been removed from the notification view, and a next notification in the list of alerts (e.g., for a news story) is displayed in place of the removed messages application notification. In some embodiments, the user is enabled to scroll to view additional alerts. For example, user input 5016 in FIG. 5AU is a swipe gesture in an upward direction, and in response to user input 5016, additional notifications are displayed on the user interface 5004-1, as illustrated in FIG. 5AV. According to some embodiments, the session region 502-16 continues to be updated as the timer session counts down the remaining time on the timer throughout the various interactions with the wake screen user interfaces described with respect to FIGS. 5AR1-5AU.

In some embodiments, as the user scrolls through additional notifications, such as in FIG. 5AV, the user interface element 5006 for the media playback session is scrolled out of view on the display. In some embodiments, in accordance with a determination that the user interface element 5006 is no longer displayed in the user interface 5004-1, the media playback session is displayed (e.g., redisplayed) in the session region 502-9 (e.g., the second portion of the session region), optionally concurrently with another active session (e.g., the active timer session 502-16b) in the first portion of the session region.

FIG. 5AV illustrates a user input 5018 requesting to dismiss the wake screen user interface 5004 and to display home screen user interface 501. In some embodiments, user input 5018 is a swipe up that is initiated at a predefined area of the display near the bottom edge. In some embodiments, as the user input 5018 progresses, the wake screen user interface 5004 is displayed as shifting on the display in a same direction as the user input 5018 (e.g., the wake screen user interface 5004 is displayed as sliding up and off the display).

In some embodiments, after navigating away from the wake screen user interface 5004, the lock indicator 5008 is no longer displayed in the session region. In some embodiments, the lock indicator 5008 is displayed with an unlocked appearance (e.g., as an open lock) for a predetermined amount of time (e.g., since a time when device 100 was unlocked), then automatically ceases to be displayed in response to the predetermined amount of time elapsing. In some embodiments, the active sessions continue to be displayed in the session region (e.g., in the first and second portions of the session region) as the user navigates between the wake screen user interface 5004 and other system user interfaces (e.g., home screen user interface 501) and/or application user interfaces for applications executing on the device 100. In some embodiments, user input 5020 is an input that activates the physical or virtual button on the side of the device to put the device 100 in the low power state.

In some embodiments, the device 100 is brought out of the low power state in response to a user input (e.g., a user touching the screen, a user picking up the device, and/or a user touching a button of the device). In some embodiments, the device 100 automatically leaves the low power state in response to an event (e.g., in response to receiving an alert and/or in response to an event from an application). FIG. 5AX, like FIG. 5AR1, illustrates the wake screen user interface 5004 that is initially displayed in response to the device leaving the low power state (e.g., and transitioning to a wake state), with media playback session 502-9 being transitioned out of the session region to user interface element 5006 (e.g., a media playback widget for the wake screen user interface 5004), and with the timer session 502-16 being displayed in the session region. In some embodiments, the device automatically enters the locked mode while in the low power state.

In some embodiments, in response to an event for a current session, the session region automatically expands without detecting a user input on the session region. For example, in FIG. 5AY, the timer has ended and the session region 502-16 (FIG. 5AX) expands to session region 502-17 (FIG. 5AY). In some embodiments, the device 100 optionally provides audio and/or haptic output in addition to expanding the session region in accordance with an event of an ongoing session. In some embodiments, the device 100 provides audio and/or haptic output while expanding the session region in accordance with a determination that the session region was expanded in response to a user input, but does not provide audio and/or haptic output (or optionally provides a different audio and/or haptic output) in accordance with the session region expanding as a result of an event of the session. Examples of events of an ongoing session that optionally cause the device to expand the session region include when a new media item begins playback (FIG. 5AK), when a timer ends (FIG. 5AY), when a new navigation instruction is in close proximity, when a connection is made (e.g., to share media items via a device-to-device network) or new media items are being shared, and/or when the device is in proximity to a wireless terminal for accessing a payment method stored on device 100, as illustrated in FIG. 5BG.

FIG. 5AZ illustrates that after the timer has ended, and the session for the timer is no longer active, the session region has no active sessions and is displayed as session region 502-1, optionally including display of lock indicator 5008 as an open lock, for the predetermined amount of time, in accordance with the device 100 being unlocked.

FIGS. 5BA1-5BA3 illustrate examples of receiving an alert (e.g., a system alert or notification) while displaying the session region in different states. For example, in FIG. 5BA1, the empty session region 502-18 does not include any active sessions. FIG. 5BA2 illustrates an example of an incoming alert while there is one active session (e.g., a timer session) displayed at a condensed size for the session region 502-19. FIG. 5BA3 illustrates an active session region 502-20 for an ongoing communication session that includes a plurality of controls for the session. In some embodiments, session region 502-19 and/or 502-20 are outlined with a colored border, optionally having a color that is based on the application associated with the active session in the session region.

In some embodiments, the incoming alert (e.g., notification 5024-1, notification 5024-2, and/or notification 5024-3) is animated as entering the display of device 100 from a top edge of the display. In some embodiments, the incoming alert is displayed as sliding down from the top of the display to a position lower in the display. In some embodiments, the incoming alert is initially displayed with a visual deemphasis (e.g., a blurred effect, a low opacity, and/or a low level of luminance). In some embodiments, the incoming alert is displayed with visual properties such that it appears to slide behind the session region that is displayed. In some embodiments, a size of the alert changes as it slides onto the display (e.g., from smaller to larger) to appear as if the alert is getting closer.

As illustrated in FIGS. 5BA1-5BA3, in some embodiments, the alert does not change its animation based on a size of the session region 502 (e.g., the same animation of the alert is displayed for different sizes of the session region 502). In some embodiments, after the alert has moved past the displayed session region, such that the alert is no longer occluded by the session region, the alert is displayed with less visual deemphasis (or, optionally, no visual deemphasis) and/or the alert is increased in size (e.g., providing a visual effect that simulates the alert moving toward the user after sliding behind the session region). In some embodiments, the alert is displayed underneath and/or proximate to the session region, and changes its final position based on a current size of the session region (e.g., alert 5024-1 and alert 5024-2 are displayed at a respective vertical position due to the respective heights of session regions 502-18 and 502-19, whereas alert 5024-3 is displayed at a lower vertical position on the display due to the increased height of session region 5024-3).

FIG. 5BB illustrates the alert 5024-1 of the final state in FIG. 5BA1 in context, displayed over home user interface 501, and a user input 5026 (e.g., a tap input) requesting to open a maps application associated with icon 436 of home user interface 501. In response to the user input 5026, a user interface 5028 for the maps application is displayed, as illustrated in FIG. 5BC. In some embodiments, the user interface 5028 for the maps application surrounds the session region on all sides. FIG. 5BC further illustrates a user input 5030 to initiate navigation to a destination using the maps application.

FIG. 5BD illustrates a user interface 5028-1 for the maps application that includes navigation instructions. In some embodiments, the session region 502-21 is optionally displayed with a border in accordance with a determination that the user interface surrounding the session region satisfies a luminance threshold (e.g., if the content around the session region is dark, a prominent border is displayed and if the content around the session region is light, a second border is displayed that is less prominent than the first border). In some embodiments, while the maps application is providing navigation instructions, a user input 5032 corresponding to a request to leave the maps application user interface 5028-1 is detected.

FIGS. 5BE1-5BE2 illustrate an animated transition for minimizing the display of the maps application user interface 5028-1 and displaying the home screen user interface 501, in response to the user input 5032. In some embodiments, the animated transition includes shrinking the maps application user interface 5028-1, including scaling down the content within the user interface 5028-1 (optionally while maintaining display of the content as it is displayed in the full-sized user interface 5028-1), and moving the scaled-down version of the user interface 5028-1 upward toward the session region. In some embodiments, the user interface 5028-1 is scaled down and moved upward on the display at respective rates such that the width of the scaled-down user interface 5028-1 matches a current width of the session region 502-21 (e.g., when the scaled-down user interface 5028-1 reaches a vertical position on the display that is at or near a vertical position of the session region 502-21, as indicated by the dashed lines in FIG. 5BE1). For example, the user interface 5028-1 appears to slide under and/or behind the session region 502-21 (e.g., as shown in FIG. 5BE2). In some embodiments, the animated transition includes expanding the session region 502-21, optionally concurrently with the shrinking of the maps application user interface 5028-1 (e.g., session region 502-21 is wider in FIG. 5BE2 than in FIG. 5BE1). In some embodiments, during the animated transition, the home screen user interface 501 is visually deemphasized (e.g., blurred and/or displayed with decreased opacity and/or decreased luminance). In some embodiments, the user interface 5028-1 continues to move upward on the display until it touches a top edge of the display of device 100, optionally being displayed above the session region 502-21.

In some embodiments, as illustrated in FIG. 5BF, after the user interface 5028-1 has been scaled down to a width that matches the width of the session region, the device 100 ceases display of the scaled-down version of the user interface 5028-1 and instead displays information about the navigation session in the session region 502-22. For example, instead of continuing to display a map with step-by-step instructions, the session region 502-22 includes an indication of a next step for the navigation (e.g., a right turn in 2 miles). In some embodiments, session region 502-22 is maintained for a threshold time period (e.g., 0.1, 0.2, 0.5, 1, 2, 5, 15, 30 or 60 seconds) at the end of the animated transition before automatically minimizing to session region 502-23, illustrated in FIG. 5BG. In some embodiments, the session region 502-23 is automatically, without user input, no longer displayed in accordance with a determination that the navigation instructions have concluded (e.g., the user has arrived at the destination). In some embodiments, the session region 502-23 is no longer displayed in accordance with a determination that the user has requested to end the navigation session.

FIG. 5BG illustrates a user input 5034 requesting to open a web browser application associated with icon 420 in the home screen user interface 501. FIG. 5BH illustrates a user interface for the web browser application while device 100 is rotated to a landscape (e.g., horizontal) orientation from a portrait orientation (e.g., a vertical orientation, as in FIG. 5BG). In some embodiments, device 100 is enabled to be rotated such that the downward direction is defined relative to the user's view of the device. For example, if the user turns the device from a vertical orientation to a horizontal orientation, in some embodiments, the display of the device 100 is updated to change a direction of the text, images and/or other content to match the current orientation of the device, as described with reference to FIG. 5BK.

In some embodiments, while the device 100 is in the landscape orientation, as in FIG. 5BH, a session for a single application is displayed in distinct portions of the session region (e.g., portions 502-24, 502-25, and 502-26). For example, in FIG. 5BH, a session for a wireless headphone connection is initiated. In some embodiments, the portions of the session region comprise distinct user interface elements (e.g., bubbles) that appear to animate out of the session region 502-24 that optionally includes the one or more sensor cutouts in the vertical direction (e.g., above and below the session). For example, because the device 100 is oriented in the landscape orientation, to minimize an intrusion of the session region blocking user interface elements in the user interface for the web browser application, the session region displays information about the session above and below the session region 502-24 that encompasses the sensor cutouts. In some embodiments, if there are two active sessions, portion 502-25 of the session region optionally displays information for a first session of the two active sessions and portion 502-26 of the session region optionally displays information for a second session of the two active sessions.

FIG. 5BI illustrates that, after the animation shown in FIG. 5BH, the user interface elements for the session region are maintained, optionally as separate user interface elements, at a predefined distance away from the session region. In some embodiments, at least one of the portions of the session region include the sensor region(s) (e.g., rather than both separating from session region 502-24, at least one of sensor region portion 502-25 or 502-26 extends and remains connected to session region 502-24). In some embodiments, a user input 5036 (e.g., a tap input or other selection input) is detected on a portion of the session region (e.g., portion 502-25). In some embodiments, the portion 502-25 of the session region displays an indication of headphones that are currently connected and/or paired with device 100. In some embodiments, the portion 502-26 includes an indication of a current battery level of the headphones (e.g., "82%"). In some embodiments, portion 502-24 of the session region is maintained with a background color that matches a color of the sensors in the sensor cutouts, without displaying information in the portion 502-24 of session region.

FIG. 5BJ illustrates that in response to the user input 5036, portion 502-26 of the session region expands to display additional information about the headphones that are currently connected and/or paired with device 100. In some embodiments, portion 502-24 and/or portion 502-25 continue to be displayed without expanding or displaying additional information. In some embodiments, portion 502-24 and/or portion 502-25 of the session region also expand and/or display additional information in response to the user input 5036. FIG. 5BJ further illustrates a user input 5038 selecting, in the web browser application, an option to begin playback of a video.

FIG. 5BK illustrates a plurality of orientations of device 100 (e.g., device 100a, device 100b, device 100c, and device 100d) while displaying a video (e.g., Movie A) playing. In some embodiments, device 100a and device 100b illustrate a landscape orientation. Device 100a illustrates the sensor cutouts, which are indicated by the dotted lines, on the left side of device 100a. In some embodiments, while the user interface is dark, the sensors arranged in the sensor cutouts are optionally not visible, or are otherwise not displayed with any user interface elements to draw attention to the sensor cutouts, such that the sensors blend in with the user interface. In some embodiments, while the user interface (e.g., or a portion of the user interface that surrounds the portions of the session region 502-25 and 502-26) is displayed with a dark background (e.g., having a threshold amount of luminance), an edge treatment is displayed as a border that surrounds each of the portions 502-25a and 502-26a of the session region. In some embodiments, portion 502-25a is displayed whereas portion 502-26a is not displayed. In some embodiments, while content is played in a full-screen mode, the portions of the session region 502-25a and 502-26a are optionally not displayed. In some embodiments, in accordance with a determination that portions 502-25a and 502-26a display information for a same session (e.g., both portions display information for the headphone connection session), a color of the border of portion 502-25a is a same color as the color of the border of portion 502-26a. In some embodiments, if the portions of the session region display information for different sessions, optionally associated with distinct applications, the color of the border of the respective portion is selected based on the application associated with the respective session region (e.g., a timer session optionally displays an orange border, a communication session optionally displays a green border, and/or a maps navigation session optionally displays a blue border). For example, in FIG. 5BN, a border of portion 5042-1 of the session region for a voice recording session is displayed with a first color, and border of portion 5042-2 of the session region for a navigation session is displayed with a second color distinct from the first color.

In some embodiments, if the user rotates the device 180 degrees, such that the sensor cutouts are on the right side of the device 100b while the device 100b is in the landscape orientation, the portions of the session regions 502-25b and 502-26b continue to be displayed proximate to the sensor cutouts (e.g., on the right side). In some embodiments, the portions of the session region optionally change in relative position. For example, portion 502-26b is displayed above portion 502-25b in device 100b, while portion 502-25a is displayed above portion 502-26a in device 100a. In some embodiments, portion 502-25b is displayed whereas portion 502-26b is not displayed. In some embodiments, while device 100 is in the landscape orientation (e.g., as are device 100a and device 100b in FIG. 5BK), the session region does not display information that is updated over time about an active session (e.g., while the minimized session region may be displayed to minimize the appearance of one or more sensor regions, the session region is not expanded to continually display status information that is updated over time such as for timers, media playback, or other sessions described herein, although the session region is in some embodiments briefly expanded, as shown in FIG. 5BK, to display alerts and other session events).

In some embodiments, in accordance with a determination that the device is in a portrait orientation (e.g., device 100c and device 100d), the session region is displayed as a single session region 502-24a (e.g., instead of as separate user interface elements proximate to the sensor cutouts). In some embodiments, session region 502-24a optionally displays a battery icon and/or a percentage of battery remaining to indicate a battery level of the connected headphones. In some embodiments, a border is displayed around session region 502-24a in accordance with a determination that the background is dark enough (e.g., satisfies a threshold amount of luminance).

In some embodiments, if the device is rotated 180 degrees from the orientation of device 100c to device 100d, the session region 502-24b is displayed at a portion of the display that encompasses the sensor cutouts and/or sensors of device 100. For example, session region 502-24b is displayed at the bottom of the display to encompass the sensors that are positioned at the bottom of the display while in the orientation of device 100d.

In some embodiments, in accordance with a determination that the device is displaying content in a full screen mode, for example, in Figure BK the video content is played back to take up the entire user interface area (not including the session region), respective borders for the respective portions of the session region are optionally not displayed. For example, the session region is displayed without prominence to better blend in with the content displayed in the full screen mode.

FIG. 5BL illustrates examples of information displayed in session regions for a plurality of applications. The examples provided in FIG. 5BL represent a snapshot in time of the respective session region, and it will be understood that the status information is updated within the session region as a status of the application changes. In some embodiments, the examples of session regions 5041 and 5040a-5040q are displayed in the session region concurrently with a respective user interface that is displayed outside of the session region on device 100. For example, in FIGS. 5E-5F, the session region 502-4 is optionally displayed with one of the session regions 5041 or 5040a-5040q, depending on the type of session, if any, that is active at a respective time. For example, while FIGS. 5E-5F illustrate a communication session, any of the session region examples 5041 and 5040a-5040q are enabled to be displayed at the location of the session region 502-4 (FIG. 5E). In some embodiments, session region 5041 includes a privacy indicator (e.g., privacy indicator 518), without displaying any status information for an active session (e.g., if there are no active sessions). In some embodiments, session region 5040a corresponds to a communication session (e.g., a phone call and/or a video conference) that includes an icon for the application associated with the session (e.g., a telephone icon), a length of time the communication session is ongoing (e.g., "0:08"), optionally a privacy indicator (e.g., the dot between sensor cutouts in sensor region 5040a) displayed between the sensor cutouts to indicate a microphone of device 100 is currently being accessed by an application, and an audio waveform indicating audio data incoming and/or outgoing during the communication session.

In some embodiments, session region 5040b corresponds to a timer session, and includes an icon for the timer application and an amount of time remaining on the timer. In some embodiments, session region 5040c corresponds to a media playback session, and includes a representation of the currently playing media content item (e.g., cover art for the media content item) and a play icon indicating that playback is ongoing. In some embodiments, session region 5040c-2 corresponds to a media playback session (e.g., for a music application or other media playback application) that includes a representation of the currently playing media content item (e.g., cover art for the media content item) and a sound waveform indicator. In some embodiments, the sound waveform indicator is generated based on a current audio output of the currently playing media content item, such that the sound waveform is updated as the audio output changes over time. In some embodiments, the sound waveform indicator is displayed with one or more colors that are selected based on the representation of the currently playing media content item. For example, one or more prominent colors are sampled or otherwise identified from the cover art for the media content item, and the waveform is displayed with one or more of the prominent colors. In some embodiments, the sound waveform indicator is superimposed on at least a portion of the cover art, optionally on at least a portion of a blurred or visually modified version of the cover art.

In some embodiments, session region 5040*d* corresponds to an accessibility session and includes an icon for the accessibility application and an indication of a connected device for the accessibility session (e.g., a connected hearing aid).

In some embodiments, session region 5040*e* corresponds to a navigation session for a maps application and includes an indication of a next step in the navigation (e.g., turn right) and an indication of when the next step occurs (e.g., in 2 miles).

In some embodiments, session region 5040*f* illustrates a health and/or fitness session and includes an icon for a workout application and an indication of a current workout (e.g., distance covered, amount of time of the ongoing workout, and/or calories burned in the workout).

In some embodiments, session region 5040*g* illustrates a session for sharing content (e.g., via device-to-device Wi-Fi), which includes a sharing icon and a progress indicator that updates as the sharing process is in progress until it completes.

In some embodiments, session region 5040*h* illustrates a session region for a voice recording session which includes an audio waveform indicating audio data that is recorded in the voice recording, a recording indicator and an amount of time the voice recording has been ongoing. Session region 5040*h* optionally includes a privacy indicator, indicating that a microphone of device 100 is being accessed by an application.

In some embodiments, session region 5040*i* illustrates a session region for remotely displaying and/or sharing content from device 100 with a distinct display device, including an indication that the device 100 is sharing its display and optionally an indication of the application that is being displayed on the distinct display device (e.g., an application for streaming video content, wherein the video content is playing on the distinct display device).

In some embodiments, session region 5040*j* illustrates a session region for a sports application, including indications of a current score for each team participating the active sports session (e.g., during a respective game).

In some embodiments, session region 5040*k* illustrates a session region for a rideshare session, including an icon representing the rideshare application and an amount of time until the rideshare arrives and/or drops off the user.

In some embodiments, session region 5040*l* illustrates a session region displayed while the device is in a locked mode, and the device is authenticating the user to unlock the device. In some embodiments, session region 5040*l* includes a lock icon and a progress animation indicating that the device is in the process of authenticating the user.

In some embodiments, session region 5040*m* illustrates a session region for a biometric authentication, including an icon representing the authentication prompt, to prompt the user to perform the biometric authentication (e.g., look at the camera and/or provide a fingerprint).

In some embodiments, session region 5040*n* illustrates a low battery session that is provided by the system software of device 100 in accordance with a determination that the battery of device 100 has less than a threshold amount of charge remaining.

In some embodiments, session region 5040*o* illustrates a session region for a connected device (e.g., connected headphones and/or speaker(s)) that includes an indication of the device that is connected and optionally an indication of a battery level of the connected device.

In some embodiments, session region 5040*p* illustrates a session region for silent mode, which includes an indication (e.g., a bell icon with a line struck through) that silent mode has been initiated or enabled (e.g., and ringer mode disabled) and optionally a description of "silent mode." In some embodiments, session region 5040*p*-2 illustrates a session region for a ringer mode, which includes an indication (e.g., a bell) that a ringer has been initiated or enabled (e.g., and silent mode disabled), optionally including animating the bell indication as shaking, and optionally a description of "ringer." In some embodiments, a user is enabled to toggle device 100 between the silent mode and the ringer mode. In some embodiments, in response to detecting that the mode has been toggled between silent and ringer mode, the session region 5040*p* and/or 5040*p*-2 shakes (e.g., repeatedly from right to left, as described by the shake animation in FIGS. 6H-6J), optionally including shaking the bell indicator within the session region while the session region shakes.

In some embodiments, session region 5040*q* illustrates a session region for an active hotspot session, including an icon representing at least one device is currently linked via the hotspot connection and optionally an indication of a strength of the signal of the hotspot connection.

In some embodiments, one or more of the session regions 5040*a*-5040*q* are displayed while a corresponding session is ongoing. In some embodiments, a session region associated with a respective application and/or software is displayed for a predetermined amount of time before automatically ceasing display of the session region. For example, session region 5040*p* for silent mode is optionally displayed for 2 seconds or 10 seconds after the device 100 has initiated silent mode, but is not maintained in the display while the device 100 continues to be in silent mode.

FIGS. 5BM1-5BM2 illustrate updating a session region, for a same application, to display two or more sets of information for the application. For example, during an active session for a sports application, two or more games that are concurrently active have different sets of information (e.g., different scores and/or different teams) for the respective game. In some embodiments, while two or more sets of information are available, the session region periodically rotates between displaying the two or more sets of information. For example, in FIG. 5BM1, the session region 5040*j*-1 indicates a current score for GS vs CHI, and in FIG. 5BM2, the session region 5040*j*-2 indicates a current score for LA vs NY. In some embodiments, the games need not be of a same type (e.g., basketball, baseball, football, and/or hockey). Instead, in accordance with a determination that a respective application associated with the session region includes two or more sets of information, each set of information is displayed for a predefined amount of time (e.g., 1, 2, 5, 10, 15, 30, 60, 90, or 120 seconds) before replacing display with another set of information for the predefined amount of time. In some embodiments, the sets of information automatically change from the first set of information to the second set of information in accordance with an event occurring for a respective set. For example, while displaying the first set of information, a team scores in the game associated with the second set of information, and the device 100 automatically replaces display of the first set of information with the second set of information to indicate the event occurrence (optionally without regard to the predefined amount of time). In some embodiments, in response to a user input (e.g., of a particular type, such as a long press) directed to session region 5040j-1 in its condensed form as shown in FIG. 5BM1, device 100 expands the session region to session region 5040-j3 to display additional information, such as the current playing period (e.g., quarter or half) and/or an amount of time remaining in the current playing period, as shown in FIG. 5BM3. An analogous user input directed to session region 5040j-2 in FIG. 5BM2 would similarly result in the session region expanding to session region 5040-j4 in FIG. 5BM4.

FIGS. 5BM3-5BM4 illustrate displaying two sets of information in an expanded session region, optionally in response to a user input 5999b. For example, while an expanded session region 5040j-3 is displayed, including displaying a first set of information for a first event (e.g., a first game for the sports application), a user input 5999b is detected. In some embodiments, user input 5999b is a swipe input, for example from left to right, and in response to user input 5999b, the device 100 updates display, in the expanded session region, to display a second set of information for a second event (e.g., a second game for the sports application)

FIG. 5BN illustrates examples of a plurality of active sessions concurrently displayed in the session region. It will be understood that the session regions illustrated in FIG. 5BN are examples of concurrent sessions, but that alternative and/or additional arrangements of active sessions are also used, depending on which applications have currently active sessions and/or the relative priorities of the active sessions. To that end, a session region includes a portion 5042-1 for a current voice recording that encompasses the sensor cutouts (e.g., the sensor region), and optionally includes a privacy indicator displayed between the sensor cutouts, and concurrently displays portion 5042-2 for a navigation session. In some embodiments, the concurrent sessions are displayed with different sizes, and the information displayed for in each portion of the session region is based on a size allotted for the respective application within a portion of the session region.

In some embodiments, device 100 displays animations while transitioning the session region from a first state to a second state, including expanding and/or minimizing the session region, and/or updating the session region with information from a first session of a first type to a second session of a second type (e.g., as described with reference to FIGS. 5BT-5BU). In some embodiments, a type of animation displayed during the transition between session states is based at least in part on a current size of the session region. For example, device 100 displays a first animated transition from an expanded timer session to another session state (e.g., a condensed timer session or another session, such as a music session), including animating the numbers (e.g., representing the time remaining on the timer) to optionally shift the numbers up and/or down while decreasing a text size of the numbers. In some embodiments, if the timer session is a condensed timer session (e.g., smaller than an expanded timer session), device 100 displays a second animated transition, distinct from the first animated transition, from the condensed timer session to another session state, including crossfading the numbers in the condensed timer session with text and/or icons to be displayed in the other session, without shifting the numbers up and/or down as they change. As such, animated transitions between sessions displayed in the session region depend on a current size of the session region (e.g., condensed or expanded) when the transition is initiated.

In some embodiments, the different types of animations are used during different display states of the session region. For example, animating the numbers of a timer to shift the numbers up and/or down while changing the value displayed (e.g., mimicking the mechanical rotation or flipping of digits on a clock) is optionally performed while the session region is in an expanded state (e.g., with more room for the animation), whereas crossfading the numbers without shifting the numbers up and/or down while changing the value displayed is optionally performed while the session region is in the condensed timer session (e.g., with less room for the animation).

As another example, portion 5043-1 of the session region includes a timer session, and optionally encompasses the sensor cutouts, and portion 5043-2 includes a session for biometric authentication. In some embodiments, portion 5044-1 of the session region includes an indication of a currently connected set of headphones, and portion 5044-2 includes session information for a workout session, and optionally encompasses the sensor cutouts. In some embodiments, portion 5045-1 of the session region indicates a session for silent mode, and optionally encompasses the sensor cutouts, and portion 5045-2 includes an indication of a media streaming application session concurrently with portion 5045-3 that includes an indication of a currently connected set of headphones. Accordingly, in some embodiments, three or more sessions are concurrently displayed in portions of the session region, optionally with each session displayed in a distinct user interface element as a respective portion of the session region.

In some embodiments, portion 5046-1 of the session region indicates an active hotspot connection session, and portion 5046-2 of the session region indicates a media playback session. In some embodiments, portion 5047-1 displays a sharing session for sharing media content with other devices (e.g., via device-to-device Wi-Fi, NFC, and/or Bluetooth), and portion 5047-2 displays a session for a voice recording. In some embodiments, a separate user interface element is displayed as encompassing the sensor cutouts, and the portions of the session regions that display information for active sessions are displayed next to (e.g., to the right and/or left of) the user interface element that encompasses the sensor cutouts.

In some embodiments, portion 5048-1 of the session region displays an indication of a connected set of headphones, portion 5048-2 of the session region displays an indication of silent mode and optionally includes the one or more sensor cutouts, and portion 5048-3 displays a screen recording session.

FIG. 5BO illustrates a plurality of examples of expanded session regions. As described above, in some embodiments, the session region expands in response to a user input (e.g., a tap input and/or a long press input) directed to the session region (e.g., while it is minimized, for example as session regions 5040a-5040q). In some embodiments, the session region expands in response to an event and/or update that occurs in the application associated with the session, without detecting a user input (e.g., a timer going off, a song change, or an upcoming navigation instruction). In some embodiments, each expanded session region 5050 includes one or more controls for interacting with the application associated with the session. For example, expanded session region 5050*a* illustrates an expanded timer session, optionally with control 5050*a*-1 for stopping (e.g., pausing) and/or control 5050*a*-2 for canceling the timer. In some embodiments, session region 5050*b* illustrates an expanded communication session, optionally with controls, including control 5050*b*-1 for muting, control 5050*b*-2 for accessing a keypad, control 5050*b*-3 for initiating use of speakerphone, control 5050*b*-4 for initiating a video call, and/or control 5050*b*-5 for ending the communication session. In some embodiments, session region 5050*c* illustrates an expanded screen recording session optionally with a control 5050*c*-1 for stopping the screen recording. In some embodiments, session region 5050*d* illustrates an expanded rideshare session that optionally includes a control 5050*d*-1 for contacting a driver of the rideshare. In some embodiments, session region 5050*e* illustrates an expanded media playback session that optionally includes controls, including a control 5050*e*-1 for skipping to a previous content item, a control 5050*e*-2 for pausing the content item, and/or a control 5050*e*-3 for skipping to a next content item. In some embodiments, session region 5050*f* illustrates an expanded navigation session that optionally includes controls, including a control 5050*f*-1 for pausing and/or a control 5050*f*-2 for ending the navigation instructions. In some embodiments, the user is enabled to select any of the controls described above to cause the device 100 to perform one or more operations associated with the respective control (e.g., in response to a user input selecting control 5050*c*-1, the device 100 stops screen recording).

FIGS. 5BP-5CY illustrate transitioning between application user interfaces. In some embodiments, while displaying a user interface 5060 for a first application, such as a maps application, an active media playback session is displayed in the session region 502-30. In some embodiments, session region 502-30 includes a border (e.g., similar to border 552 (FIG. 5W)) that is displayed around the edges of session region 502-30. In some embodiments, session region 502-30 is displayed with a background of a first color, optionally selected to match the color of the one or more sensors positioned within the region, as described above with reference to FIG. 5A. In some embodiments, the device 100 detects user input 5062 that corresponds to a request to switch between applications, such as an edge swipe gesture or other application switching user input for switching between display of the user interface 5060 to another application user interface. For example, in response to user input 5062, the device 100 optionally displays an animated transition that includes sliding user interface 5060 in a first direction (optionally corresponding to a direction of user input 5062), and concurrently sliding user interface 5066 for a music application onto the user interface.

FIG. 5BQ illustrates an example of the animated transition displayed in user interface 5064, which includes a portion of the user interface 5060 that is sliding off the display area, and a portion of the user interface 5066 that is sliding onto the display area. In some embodiments, while displaying the animated transition for switching between application user interfaces, the session region 502-30 is optionally minimized as session region 502-32, wherein session region 502-32 does not display status information for an active session, even while one or more sessions remain active (e.g., the media playback session and/or the navigation session are active, but not displayed in the session region during the animated transition). In some embodiments, the border of session region 502-30 is displayed as gradually contracting, or closing in, to show the edges of the session region 502-30 surrounding a smaller display area as the session region 502-30 decreases in size to minimized session region 502-32. For example, as the session region 502-30 decreases in size, the border of session region 502-30 is maintained along the edges of the decreasing size of the session region 502-30. In some embodiments, the background color of the session region 502-30 is maintained as a size of the session region changes, including displaying a same background color of minimized session region 502-32.

In some embodiments, as displayed in FIG. 5BR, while the user interface 5066 for the music application, which corresponds to the media playback session displayed in session region 502-30 (FIG. 5BP), the device 100 does not display an indication of the media playback session in the session region, and instead displays the active navigation session in session region 502-34, which is associated with continued operation of the maps application for which the user interface is no longer displayed by device 100. For example, because the user interface 5066 is for the application associated with the media playback session, the media playback session is not displayed in the session region.

In some embodiments, the device 100 detects another user input 5068, such as an edge swipe gesture or other user input, for switching between display of the user interface 5066 to another application user interface. In some embodiments, in response to user input 5068, the device 100 optionally displays an animated transition (e.g., the animated transition described with reference to FIG. 5BQ), and displays user interface 5070 for a messaging application (or another application distinct from the applications corresponding to user interfaces 5060 and 5062), as illustrated in FIG. 5BS1. In some embodiments, while displaying user interface 5070 for the messaging application, the device 100 displays indications for the active media playback session and for the active navigation session in the session region. For example, the media playback session is displayed in portion 502-36 of the session region, which optionally encompasses the one or more sensor cutouts, concurrently with the navigation session displayed in portion 502-38 of the session region.

In some embodiments, in accordance with a determination that user input 5068 satisfies quick-switching criteria and/or in accordance with a determination that the user interface 5066 is displayed for less than a threshold amount of time before detecting user input 5068, the device 100 optionally forgoes expanding (or forgoes fully expanding) the session region 502-32 to session region 502-34. For example, if the user navigates between display of user interface 5060, user interface 5066, and user interface 5070 in less than a threshold amount of time, the device 100 forgoes expanding the session region to session region 502-34, and maintains the minimized session (or mostly minimized) region 502-32 without displaying status information for an active session.

FIG. 5BS1 further illustrates detecting a user input 5102, such as an edge swipe gesture (optionally corresponding to an edge of the display area, such as the bottom edge) or other user input, for switching between display of the user interface 5070 to another application user interface. In some embodiments, in response to user input 5102, the device 100 optionally displays an animated transition (e.g., the animated transition described with reference to FIG. 5BQ) of the user interface in the display area outside of the session region, as illustrated in user interface 5104 in FIG. 5BS2. In some embodiments, the animated transition of the display area outside of the session region includes displaying the previously displayed user interface 5070 as sliding off the display (e.g., gradually sliding off of the display with a progression that is based on a progression of a user input such as a swipe gesture over time and/or with a speed that is based on a speed of a user input such as a swipe gesture), optionally in a direction corresponding to a direction of the user input 5102, and a user interface for another application (e.g., user interface 5106 for a web browsing application, in FIG. 5BS2) sliding onto the display. In some embodiments, device 100 further displays an animated transition that optionally includes minimizing the session region, including optionally merging and/or decreasing a size of portions 502-36 and 502-38 of the session region to a minimal size, illustrated as minimized session region 502-40. In some embodiments, as described with reference to FIG. 5BY, the animated transition includes gradually minimizing and/or expanding the session region as content displayed in the session region is optionally updated (e.g., from displaying session information for one or more first applications to displaying session information for one or more second applications). It is noted more generally that one or more aspects of the animated transition of the display area outside of the session region (e.g., involving displaying the previously displayed user interface as sliding off the display and displaying a user interface for another application sliding onto the display) optionally apply analogously to any of the examples of switching application user interfaces described herein, such as with respect to FIGS. 5BP-5BS7, 5BV-5BW, and/or 5CE-5CG, as well as optionally the examples of FIGS. 5R-5T.

In some embodiments, after displaying the animated transition(s) (e.g., for the display area outside of the session region and/or for the session region), device 100 displays user interface 5106 (FIG. 5BS3) for a web browsing application, or a user interface for another application, in the display area outside of the session region. In some embodiments, as illustrated in FIG. 5BS3, the session region is updated from the minimized session region 502-40 to redisplay the active sessions that were displayed before detecting user input 5102. For example, in FIG. 5BS3, portion 502-36 corresponding to a music session and portion 502-38 corresponding to a navigation session are redisplayed concurrently with display of user interface 5106 for the web browsing application. As such, device 100 maintains and/or redisplays the active sessions even while the user interface displayed outside of the session region is updated to a different application user interface.

FIG. 5BS3 further illustrates detecting user input 5108 directed to portion 502-36 corresponding to the music session. In some embodiments, user input 5108 is a tap input, or other user input, corresponding to a request to open an application user interface for the application associated with the music session displayed in portion 502-36. In response to user input 5108, device 100 displays user interface 5066 for the music application, as illustrated in FIG. 5BS4. In some embodiments, in response to user input 5108, device 100 displays an animated transition of the session region. For example, as illustrated in FIGS. 5BS3-5BS5, during the animated transition, the first portion 502-36 and the second portion 502-38 of the session region (FIG. 5BS3) decrease in size and appear to merge into minimized session region 502-40 (FIG. 5BS4), and then the minimized session region 502-40 is expanded to display session region 502-42 (FIG. 5BS5).

In some embodiments, as illustrated in FIG. 5BS5, while the user interface 5066 for the music application is displayed, device 100 displays the session region 502-42 corresponding to the navigation session, optionally without displaying an active session corresponding to the music session in the session region. For example, as described above with reference to FIG. 5AN, respective session information is not displayed while the user interface for the application corresponding to the respective session is currently displayed in the display area outside of the session region.

FIG. 5BS5 illustrates detecting user input 5110, optionally a swipe user input in a respective direction, such as from right to left, and optionally corresponding to an edge of the display area, such as the bottom edge, that corresponds to a request to display a user interface for another application. In response to detecting user input 5110, device 100 displays an animated transition of the display area outside of the session region, as illustrated by user interface 5116 in FIG. 5BS6. For example, the user interface for the music application is displayed as sliding off the display, optionally in the direction of the user input, such as from right to left, and the user interface for the maps application is displayed as sliding onto the display, optionally from the opposite edge of the display and in the direction of the user input. In some embodiments, the animated transition is analogous to (e.g., the reverse of) the animation described with reference to FIG. 5BQ. As described above, in some embodiments, the device 100 displays an animated transition of the session region, including displaying minimized session region 502-44 during the animated transition.

In response to detecting user input 5110, a user interface 5060 for the maps application is displayed, as illustrated in FIG. 5BS7. In some embodiments, the session region gradually increases in size, from the minimized session region 502-44, to display one or more active sessions, including replacing display of the navigation session 502-42 with display of music session 502-46. For example, device 100 displays the session region 502-46 that corresponds to the music session, which was previously not displayed while the user interface for the music application was displayed in the display area outside of the session region. Similarly, in some embodiments, while the user interface 5060 for the maps application is displayed (FIG. 5BS7) in the display area outside of the session region, the session region does not display a session corresponding to the navigation session, which is associated with the maps application.

FIG. 5BT and FIG. 5BU illustrate examples of the session region optionally expanding while transitioning between user interfaces for respective applications. FIG. 5BT illustrates the session region (e.g., within user interfaces 5080a-5080e) in accordance with a determination that a user input (e.g., user input 5068) does not satisfy quick-switching criteria (e.g., a slower user input than the user input detected in FIG. 5BU). For example, the user input does not satisfy the quick-switching criteria if the user navigates between the user interface for the maps application 5080a to the user interface for the music application 5080c, and views the user interface for the music application 5080c for at least a threshold amount of time. In some embodiments, while the user is viewing the user interface for the music application 5080c, the session region is expanded to display status information for the navigation session (e.g., to session region 502-34). In some embodiments, in response to detecting a user input to navigate to the messaging application, the session region is minimized during the transition (e.g., in user interface 5082d), before displaying status information for the active sessions in the session region (e.g., in portions 502-36 and 502-38 of the session region). In some embodiments, the session region is minimized during the animated transitions between user interfaces (e.g., animated transition in user interface 5080b and 5080d).

FIG. 5BU illustrates the session region (e.g., within user interfaces 5082a-5082e) in accordance with a determination that a user input (e.g., user input 5068) satisfies quick-switching criteria (e.g., a faster user input than the user input detected in FIG. 5BT). For example, in accordance with a determination that the user navigates from the user interface for the maps application 5082a to the user interface for the music application 5082c, and then to the user interface for the messaging application 5082e, without pausing for the threshold amount of time while the user interface for the music application 5082c is displayed, the session region continues to be displayed in its minimized state, without expanding the session region to display status information for the navigation session. In some embodiments, the session region is minimized during the animated transitions between user interfaces (e.g., animated transition in user interface 5082b and 5082d).

FIG. 5BV illustrates displaying user interface 5060 for the maps application and session region 502-48 for a timer session. In response to detecting a user input to switch to another application user interface (e.g., user input 5118-1), device 100 displays an animated transition between the application user interfaces optionally without displaying an animated transition of the session region 502-48. For example, device 100 displays an animated transition for the display area outside of the session region, optionally without displaying an animated transition of the session region.

In some embodiments, device 100 displays an animated transition of the session region 502-48, including minimizing the session region, after detecting a user input has ceased (e.g., detecting liftoff of user input 5118-1). For example, FIG. 5BW illustrates an end of the user input 5118-1, as liftoff 5118-2. FIG. 5BW further illustrates that, prior to detecting liftoff 5118-2, session region 502-48 is maintained, without animating the session region. In some embodiments, the animated transition of the display area outside of the session region, illustrated in user interface 5120 in FIG. 5BW, begins in response to detecting user input 5118-1 and is displayed while user input 5118-1 is ongoing (e.g., without requiring liftoff 5118-2 to have taken place, optionally in contrast to what is required for displaying the animated transition of the session region 502-48).

FIG. 5BX illustrates that, in accordance with a determination that the user input has ceased (e.g., by detecting liftoff 5118-2), the animated transition of the session region is initiated, including gradually decreasing a size of session region 502-48 to minimized session region 502-50, optionally while continuing the animated transition of the display area outside of the session region, including concurrently sliding the user interface for the maps application off the display and sliding the user interface for the music application onto the display.

In some embodiments, the animated transition of the session region further includes displaying minimized session region 502-50 as increasing in size to display first portion 502-52 and second portion 502-54 of the session region, as illustrated in FIG. 5BY. For example, the animated transition of the session region, which is optionally initiated upon detecting liftoff 5118-2, includes shrinking the session region 502-48 by gradually decreasing a size of the text and/or icons displayed in the session region and/or removing the text and/or icons, and decreasing an area of the session region by gradually displaying the boundaries of the session region moving inward until the session region is displayed as the minimized session region 502-50 (FIG. 5BX). In some embodiments, the animated transition of the session region 502-48 is initiated in response to initially detecting user input 5118-1 (e.g., without requiring liftoff 5118-2 to have taken place and without requiring user input 5118-1 to meet additional criteria). In some embodiments, the animated transition of the session region 502-48 is initiated in response to detecting user input 5118-1 and satisfaction of additional criteria, such as detecting movement of user input 5118-1, optionally in accordance with a determination that user input 5118-1 has moved by a threshold amount, is moving with a threshold speed, and/or is moving in a particular range of directions (e.g., within a threshold angular distance of a reference direction). In some embodiments, the minimized session region 502-50 continues to be displayed until the animated transition between the application user interfaces in the display area outside of the session region is complete. For example, in FIG. 5BY, the user interface for the music application 5124 is displayed at the end of the animated transition illustrated in user interface 5122 in the display area outside of the session region.

In some embodiments, the animated transition of the session region continues by gradually increasing a size of minimized session region 502-50 to display first portion 502-52 and second portion 502-54 of the session region, including gradually displaying (e.g., by fading in, increasing in size, bringing in focus or sharpening, and/or otherwise animating) text and/or icons in the session region. In some embodiments, the portions are displayed as extending outward from the minimized session region. For example, in FIG. 5BY, first portion 502-52 displays an icon for the timer application, and as the first portion 502-52 expands, the first portion 502-52 displays the icon as a larger icon and/or displays additional text (e.g., the time remaining on the timer, 14:43), as illustrated in first portion 502-56 in FIG. 5BZ. In some embodiments, one or more of the portions of the session region optionally separates to the right and/or left of the area corresponding to the minimized session region. For example, second portion 502-54 is animated as gradually separating (e.g., as a distinct user interface element that resembles a bubble) from the minimized session region while the navigation icon gradually increases in size, as illustrated in second portion 502-58 in FIG. 5BZ. It is noted more generally that one or more aspects of the animated transitions of the session region described herein optionally apply analogously to any of the examples of session region transitions described herein, such as with respect to FIGS. 5BP-5BZ and/or 5CE-5CH.

FIG. 5BZ illustrates that, while displaying the user interface for the music application 5124, the device 100 detects a user input 5126 directed to first portion 502-56 of the session region, corresponding to a timer session. In some embodiments, the user input 5126 comprises a first type of user input, such as a long press, also referred to herein as a press and hold, input. In some embodiments, the user input 5126 comprises a second type of user input, such as a tap input. In some embodiments, the device 100 updates the display in response to the user input 5126 and based on the type of input 5126 that is detected.

For example, in accordance with a determination that the user input 5126 is the first type of user input, such as the long press input, the device 100 expands the session region corresponding to the session displayed in first portion 502-56 (e.g., via a transition to FIG. 5CC). In some embodiments, in accordance with a determination that the user input 5126 is the second type of user input, such as a tap input, the device 100 displays a user interface of the application (e.g., a clock application) associated with the session displayed in first portion 502-56 corresponding to a timer session (e.g., via a transition to FIG. 5CE).

In some embodiments, in response to detecting user input 5126 (e.g., of the first type of input or of the second type of input), device 100 animates a transition of the session region, including shrinking, merging, and/or otherwise decreasing in size, the first portion 502-56 and/or second portion 502-58 of the session region, including shrinking text and/or icons displayed within the respective portion, as illustrated in FIG. 5CA. In some embodiments, the transition of the session region further includes bringing the first portion 502-56 and/or second portion 502-58 closer to a midpoint (e.g., optionally predefined as a point between two or more sensors (e.g., speaker 111 and optical sensors 164) of the session region, or another point that is substantially centered in the display width). For example, a distance between the distinct user interface elements of first portion 502-56 and second portion 502-58 gradually decreases, as shown in FIG. 5CA.

In some embodiments, the animated transition of the session region gradually decreases the sizes of the portions of the session region until the session region is minimized as session region 502-60 (FIG. 5CB) or session region 502-64 (FIG. 5CD). For example, the text and/or icons decrease in size, and optionally move closer to the midpoint, before the device ceases display of the text and/or icons.

In some embodiments, the device 100 displays a transition between displaying text and/or icons in the session region by crossfading, or otherwise partially overlapping, the display of the text and/or icons of the session regions displayed before and after the animated transition. For example, while decreasing a size of text and/or icons displayed in first portion 502-56 and/or second portion 502-58 of the session region, the device 100 initiates display of the text and/or icons of session region 502-62, including fading the text and/or icons onto the display and/or gradually increasing a size of the text and/or icons. It will be understood that, in some embodiments, the device forgoes minimizing the session region into a fully minimized session region 502-60 in order to display the text and/or icons of the session regions crossfading. For example, the animated transition includes shrinking the text and/or icons of first portion 502-56 and second portion 502-58 without displaying the minimized session region 502-60 that does not include any text and/or icons. In other words, during the animated transition, the text and/or icons displayed in session region 502-62 at least partially overlap with display of the text and/or icons of first portion 502-56 and second portion 502-58 of the session region. In some embodiments, displaying the minimized session region 502-60 occurs amid the crossfading of the session regions displayed before and after the animated transition. For example, some of the partial overlap, between the text and/or icons of the session region displayed before the animated transition and the text and/or icons of the session region displayed after the animated transition, is displayed before the minimized session region 502-60 is displayed (e.g., as the session region is decreased in size), and some (e.g., the rest) of the partial overlap is displayed after the minimized session region 502-60 is displayed (e.g., as the session region is increased in size).

FIG. 5CC illustrates that, in response to detecting the first type of user input as user input 5126, the device displays expanded session region 502-62 that includes one or more additional controls for the timer session while continuing to display the user interface for the music application 5124. In some embodiments, expanded session region 502-62 is displayed for a threshold amount of time before device 100 automatically, without additional user input, redisplays the session region that was displayed before detecting user input 5126, including displaying first portion 502-56 and second portion 502-58. In some embodiments, ceasing to display expanded session region includes performing the animated transition in reverse. For example, the expanded session region is animated to decrease in size to minimized session region 502-60, and the first portion 502-56 and second portion 502-58 are animated as increasing in size and moving outward from the minimized session region 502-60.

FIG. 5CD illustrates that, in response to detecting the second type of user input, such as a tap input, as user input 5126, the device 100 displays, in the display area outside of the session region, a user interface for the clock application 5128 associated with the session of first portion 502-56. In some embodiments, while replacing display of the user interface for the music application 5124 with display of the user interface for the clock application 5128, the device 100 displays the animated transition of the session region described with reference to FIG. 5CA (e.g., by gradually decreasing the size of the session region until it is displayed as a minimized session region, and then gradually increasing the size of the session region to display an active session). In some embodiments, device 100 animates minimized session region 502-64 to gradually increase in size and to display text and/or icons, until displaying session region 502-66 corresponding to the navigation session, as illustrated in FIG. 5CE. As described with reference to FIG. 5AN, in some embodiments, while the user interface for the clock application 5128 is displayed in the display area outside of the session region, the portion of the session region corresponding to the timer session associated with the clock application is not displayed. For example, in FIG. 5CE, only the navigation session is displayed in session region 502-66.

FIG. 5CE illustrates detecting user input 5130 corresponding to a request to switch display of the application user interface from the clock application user interface 5128 to another application user interface (e.g., a user interface for the messaging application 5134, FIG. 5CG). In some embodiments, in response to detecting user input 5130, device 100 displays an animated transition of the session region (e.g., as described with reference to FIG. 5BQ), including minimizing session region as minimized session region 502-68 and/or displaying an animated transition of the display area outside of the session region, including animating a sliding transition in user interface 5132 between the user interface for the clock application 5128 and the user interface for the messaging application 5134.

FIG. 5CG illustrates device 100 displaying a user interface for the messaging application 5134. In some embodiments, the session region is updated, optionally by displaying an animated transition that displays the portions of the session regions extending outward (e.g., to the right and/or left) of the minimized session region 502-68. For example, FIG. 5CG illustrates first portion 502-70 of the session region corresponding to a timer session includes a timer icon, and second portion 502-72 of the session region corresponding to the navigation session includes a right turn icon. In some embodiments, the animation of the session region includes displaying the first portion 502-70 as continuing to increase in size, and as displaying additional information, such as the text indicating an amount left on the timer, as illustrated by first portion 502-74 in FIG. 5CH. In some embodiments, during the animated transition, the second portion 502-72 continues to increase in size, including increasing a size of the second portion and/or increasing a size of the right turn icon, and shifts farther away from the display area in which the minimized session region was displayed. For example, in FIG. 5CH, second portion 502-76 is displayed as a separate user interface element with a non-zero distance between second portion 502-76 and first portion 502-74.

FIG. 5CH illustrates detecting a user input 5136-1, such as an edge swipe input in the upward direction (e.g., away from the bottom edge of the display area), or another type of user input, such as a double tap or other activation of a home button, corresponding to a request to view a multitasking user interface 5138 (FIG. 5CI). In some embodiments, multitasking user interface 5138 (FIG. 5CI) includes a plurality of representations of applications that are currently executing on, or running in the background of, device 100. In some embodiments, the edge swipe input is in a different direction (e.g., downward, to the left, or the right). For example, the plurality of representations of applications are displayed in a stack such that the user is enabled to navigate (e.g., by swiping across the stack and/or by tapping a portion of a respective representation of an application within the stack) between the representations of applications. In some embodiments, the user is further enabled to close one or more applications from the multitasking user interface 5138, and the user is enabled to navigate to one or more system user interfaces (e.g., a home screen and/or a wake screen user interface) from multitasking user interface 5138.

In some embodiments, while displaying the multitasking user interface 5138, and optionally while transitioning to display of the multitasking user interface 5138, the device 100 continues to display the session region, including first portion 502-74 and second portion 502-76 of the session region, optionally without displaying a minimized session region. For example, in response to detecting user input 5136-1, the session region that is displayed while detecting user input 5136-1 is maintained without displaying an animated transition. In some embodiments, during the transition from displaying messaging user interface 5134 to displaying multitasking user interface 5138, the device 100 optionally displays an animated transition of the session region (e.g., including minimizing the session region before redisplaying the same sessions in the session region).

In some embodiments, in accordance with a determination that user input 5136-1 satisfies a threshold (e.g., a time threshold, a distance of swipe threshold, or a velocity of input threshold), as illustrated by the continuation of user input 5136-1 as user input 5136-2 (FIG. 5CI), the device 100 displays a system user interface, such as the home screen user interface 501 (optionally with an animated transition of the status region, such as by transitioning to FIG. 5CP, or without an animated transition of the status region, such as by transitioning directly to FIG. 5CR instead of first to FIGS. 5CP-5CQ).

In some embodiments, device 100 detects a user input 5140, such as a swipe input directed to the stack, corresponding to a request to view a representation of an application of the plurality of representations of application displayed in the stack in multitasking user interface 5138 (or more generally, to navigate through the stack). For example, in response to user input 5140, device 100 updates display of the stack of representations of applications from displaying a representation of a messaging application in a center region of the display area (e.g., a prominent or featured position in the multitasking user interface 5138) (FIG. 5CI) to displaying a representation of a web browser application (FIG. 5CJ) in the center region of the display area. In some embodiments, portions of other representations of applications are also displayed in the stack. For example, in FIG. 5CJ, a representation of a web browser application is displayed in the center of the multitasking user interface 5138 and portions of the representations of the messaging application and of the clock application are also displayed within the stack (e.g., immediately preceding and immediately following the representation of the web browser application in the stack).

In some embodiments, as illustrated in FIG. 5CJ, in response to detecting user input 5144 corresponding to a request to display a user interface for the messaging application (e.g., a tap input directed to the portion of the representation of the messaging application or other user input), the device 100 displays the user interface for the messaging application 5134, as illustrated in FIG. 5CL. In some embodiments, the device 100 optionally displays an animated transition of the session region, including minimizing the session region while updating the display area outside of the session region from the multitasking user interface 5138 to the user interface for the messaging application 5134. For example, in FIG. 5CL, minimized session region 502-78 is displayed before redisplaying the first portion 502-74 and second portion 502-76 of the session region, as illustrated in FIG. 5CM.

In some embodiments, the device 100 does not display the animated transition, and the minimized session region 502-78 in FIG. 5CL is optionally not displayed. For example, the device 100 maintains display of the first portion 502-74 and the second portion 502-76 of the session region while updating the user interface displayed in the display area outside of the session region (e.g., from multitasking user interface 5138 (FIG. 5CJ) to the messaging application user interface 5134 (FIG. 5CM)). In some embodiments, the device 100 forgoes displaying the animated transition in accordance with a determination that the same user interface (e.g., messaging application user interface 5134) that was displayed just prior to displaying the multitasking user interface 5138 is redisplayed just after displaying the multitasking user interface 5138, and/or in accordance with a determination that the session region will display the same session(s) (e.g., first portion 502-74 and second portion 502-76 of the session region) before and after updating the user interface in the display area outside of the session region (e.g., from multitasking user interface 5138 (FIG. 5CJ) to the messaging application user interface 5134 (FIG. 5CM)).

FIG. 5CJ illustrates that, in response to detecting user input 5142 corresponding to a request to view the representation of the clock application in the center of the multitasking user interface 5138 (or more generally, to further navigate through the stack), the device 100 updates the user interface to replace display of the representation of the web browser application with the representation 5146 of the clock application in the center region of the display area, as illustrated in FIG. 5CK.

FIG. 5CK illustrates detecting a user input corresponding to a request to display the home user interface 502. In some embodiments, a user input such as user input 5150 in a region of multitasking user interface 5138 in which the stack is not displayed, such as user input 5150 in the top right corner of multitasking user interface 5138 above representation 5146 of the clock application, corresponds to a request to display the home user interface 502. Alternatively, or additionally, in some embodiments, a user input that includes a gesture from an edge of the display area, such as user input 5152, corresponds to a request to display the home user interface 502. In some embodiments, user input 5150 corresponds to a tap input. In some embodiments, user input 5152 corresponds to a swipe input in a first direction, such as in the upward direction. In some embodiments, in response to detecting user input 5150 or user input 5152, the device 100 displays the home user interface 502 illustrated in FIG. 5CP.

In some embodiments, in response to detecting user input 5150, the device 100 optionally displays an animated transition of the session region, including minimizing the first portion 502-74 and the second portion 502-76 of the session region, as illustrated in FIG. 5CK, to minimized session region 502-84, as illustrated in FIG. 5CP. In some embodiments, after displaying minimized session region 502-84, the animated transition of the session region further includes displaying the first portion 502-86 and second portion 502-88 of the session region as expanding outward from the minimized session region 502-84, as illustrated in FIG. 5CQ, until each portion is fully displayed as first portion 502-90 and second portion 502-92 of the session region, as illustrated in FIG. 5CR. In some embodiments, the device 100 forgoes displaying the animated transition illustrated in FIGS. 5CP-5CQ, and maintains the first portion 502-74 and second portion 502-76 (FIG. 5CK) as first portion 502-90 and second portion 502-92 (FIG. 5CR) without minimizing the session region.

FIG. 5CK further illustrates detecting a user input 5148 corresponding to a request to display the user interface for the clock application. For example, user input 5148 is a tap input directed to the representation 5146 of the clock application. In some embodiments, in response to detecting user input 5148, device 100 displays the user interface for the clock application 5156, as illustrated in FIG. 5CN. In some embodiments, in response to user input 5148, the session region is animated to display minimized session region 502-80. In some embodiments, the session region is animated in accordance with a determination that the session region displays distinct session information while displaying the user interface for the clock application 5156 than the session information displayed while displaying the multitasking user interface 5138. For example, because the session region changes (e.g., from displaying first portion 502-74 corresponding to a timer session and second portion 502-76 corresponding to a navigation session (FIG. 5CK)), device 100 displays an animated transition before displaying session region 502-82 corresponding to the navigation session (FIG. 5CO), without displaying a timer session in the session region while the user interface for the clock application (5156) associated with the timer session is displayed in the display area outside of the session region. In some embodiments, device 100 forgoes displaying an animated transition of the session region in accordance with a determination that the session region will display the same session(s) before and after updating the user interface in the display area outside of the session region.

FIG. 5CR illustrates device 100 detecting that device 100 is within a threshold proximity to, or otherwise within range of a wireless terminal 5154, such as a near-field communication (NFC) reader that outputs an NFC signal or another wireless signal (e.g., Bluetooth, BLE, or other close-range communication). In some embodiments, in response to detecting the wireless signal output by wireless terminal 5154, device 100 initiates display of an animated transition of the session region, optionally without detecting user input (e.g., via an input mechanism other than proximity to wireless terminal 5154). For example, the animated transition is initiated automatically without user intervention upon detecting wireless terminal 5154. In some embodiments, the animated transition of the session region comprises updating the session(s) displayed in the session region from the currently displayed session(s) to a session for a stored version of a card (e.g., a payment method, a credit card, a membership card and/or a transit card) to be shared with the wireless terminal 5154 via wireless signal. For example, FIG. 5CS illustrates part of the animated transition during which first portion 502-90 and second portion 502-92 of the session region, illustrated in FIG. 5CR, decrease in size and/or forgo displaying text and/or icons within the respective portion of the session region, shown as first portion 502-94 and second portion 502-96 in FIG. 5CS. For example, first portion 502-94 ceases to display the amount of time remaining on the timer, and the timer icon decreases in size as the size of the first portion 502-94 of the session region decreases and appears to collapse into the area of a minimized session region. Similarly, a size of the second portion 502-96 of the session region decreases as the second portion 502-96 moves closer to, and at least partially overlaps, the area of the minimized session region.

FIG. 5CT further illustrates the animated transition after the session region is minimized. In some embodiments, a size of session region 502-98*a* increases outward from, while still including, the minimized session region. In some embodiments, session region 502-98*a* displays an animation of a card spinning and increasing in size to display session region 502-98*b*, as described with reference to FIGS. 7A-7C. For example, session region 502-98*b* in FIG. 5CU illustrates the icon representing the stored card as fully expanded.

FIG. 5CV illustrates device 100 displaying home user interface 501 and displaying first portion 502-100 of the session region corresponding to a timer session and second portion 502-102 of the session region corresponding to a navigation session. In some embodiments, a music session of a music application is currently active. In some embodiments, the music session is not displayed in the session region illustrated in FIG. 5CV.

In some embodiments, the device 100 detects an application event corresponding to one or more of the active sessions. For example, the application event is one or more of a timer ending or reaching a time threshold such as 1 minute, 10 seconds, or the like (e.g., for a timer session), an upcoming navigation step (e.g., for a navigation session), or a transition between media items being played back (e.g., for a music session). It will be understood that additional application events are detected for different active sessions, based on the application associated with the session. In some embodiments, the application event is detected for an active session regardless of whether the session is currently displayed in the session region. For example, as described below, an application event for a music application is detected while the session region displays session information for a timer session and a navigation session (e.g., without displaying session information for the music session).

In some embodiments, in response to detecting the application event, such as the end of playback of a first media item and the start of playback of a second media item in a music session, the device 100 automatically, without user intervention, displays an animated transition to minimize the displayed portions of the session region and display an expanded session region for the application associated with the application event. For example, the device detects playback of media item E has ended, and playback of media item F has started. FIG. 5CW illustrates that, in response to detection of the application event, the device 100 decreases the sizes of first portion 502-104 and second portion 502-106 of the session region, until the session region is minimized as minimized session region 502-108 (FIG. 5CX). In some embodiments, after minimizing the session region 502-108, the device 100 gradually increases the size of the session region to display expanded session region 502-110 (FIG. 5CY) for the music session. In some embodiments, the animated transition does not fully minimize the session region, and/or in some embodiments, text and/or icons of the session region cross-fade and/or partially overlap (e.g., optionally spanning when the session region is minimized, fully or not), as described with reference to FIGS. 5CA-5CC.

In some embodiments, the animated transition described with reference to FIGS. 5CV-5CY is initiated in response to detecting a system-level event. For example, one or more events associated with an operating system of device 100 causes the device to display an animated transition that includes gradually minimizing and/or gradually expanding the session region to display information for the system-level event. In some embodiments, the system-level event comprises performing authentication (e.g., biometric, passcode, password and/or another form of authentication) or detecting an error and/or alert status, such as a low battery alert or loss of a wireless connection. In some embodiments, in response to detecting the system-level event, the session region is updated to display information, including text and/or icons, indicating the system-level event. For example, in response to detecting a low battery system-level event, the session region displays a current battery level and/or a battery icon that indicates a battery level (e.g., session region 5040n, FIG. 5BL). In some embodiments, the session region continues to be updated in accordance with a status of the system-level event, for example, to show progress of authentication, as described in more detail with reference to FIGS. 6F-6L.

In some embodiments, expanded session region 502-110 is displayed for a threshold time period (e.g., 5 seconds, 30 seconds, or another time period), and, after the threshold time period has expired, and optionally in accordance with a determination that a user input has not been detected within the threshold time period, the expanded session region 502-110 is automatically, without user input, minimized to session region 502-108 before redisplaying first portion 502-100 and second portion 502-102 of the session region (FIG. 5CV).

FIGS. 6A-6M illustrate example user interfaces for setting up biometric authentication, in particular using face authentication, for device 100. In some embodiments, the device 100 enables the user to unlock the device 100 (e.g., starting from a locked state) so that the user is enabled to interact with applications and/or access data stored on the device 100. In some embodiments, a settings user interface 602 is provided for setting up face authentication. In some embodiments, the settings user interface 602 optionally provides an option for setting up another type of authentication, such as fingerprint authentication and/or a passcode. In some embodiments, settings user interface 602 is accessed from a settings application stored on device 100.

FIG. 6A illustrates a user input 604, such as a tap user input or other selection user input, corresponding to a request to set up face authentication. In response to user input 604, the device 100 displays a user interface element 606-1 in the session region that optionally includes the one or more sensor cutouts and/or one or more sensors (e.g., speaker 111 and/or one or more optical sensors 164), as illustrated in FIG. 6B. In some embodiments, the one or more optical sensors 164 are used for biometric enrollment. In some embodiments, user interface element 606-1 includes a representation of the user's face, as detected by one or more optionally front-facing cameras and/or one or more other biometric sensors such as depth sensors. In some embodiments, the one or more front-facing cameras and/or one or more other biometric sensors such as depth sensors are positioned within the one or more sensor cutouts in the session region. In some embodiments, user interface element 606-1 includes an indication of progress in setting up the biometric authentication (e.g., face or iris authentication). For example, the device 100 optionally instructs the user to move the user's face around, such that the one or more cameras and/or one or more other biometric sensors such as depth sensors capture different views of the user's face, and as the user moves the user's face around, the progress indicator lights up a portion of an outer circle of the progress indicator and/or displays another progress indicator to indicate that the user is progressing in the process to set up biometric authentication (e.g., face or iris authentication).

In some embodiments, as illustrated in FIG. 6B, one or more status indicators of the device 100 are optionally displayed within and/or outside of the user interface element 606-1. For example, in accordance with a determination that the user interface element 606-1 extends and covers one or more of the status indicators, the one or more status indicators (e.g., network connection indicator 608) is displayed within the user interface element, optionally while maintaining display of the status indicators that are not covered by the user interface element 606-1 outside of the user interface element 606-1 (e.g., battery indicator 610). In some embodiments, as described above, one or more status indicators are optionally not displayed while displaying the user interface element 606 in the status region (e.g., network connection indicator 608 is not displayed). In some embodiments, all of the status indicators are optionally not displayed (e.g., if, or in situations in which, the user interface element 606-1 is expanded horizontally to overlap the locations at which all of the status indicators would otherwise be displayed).

Figure 6C:
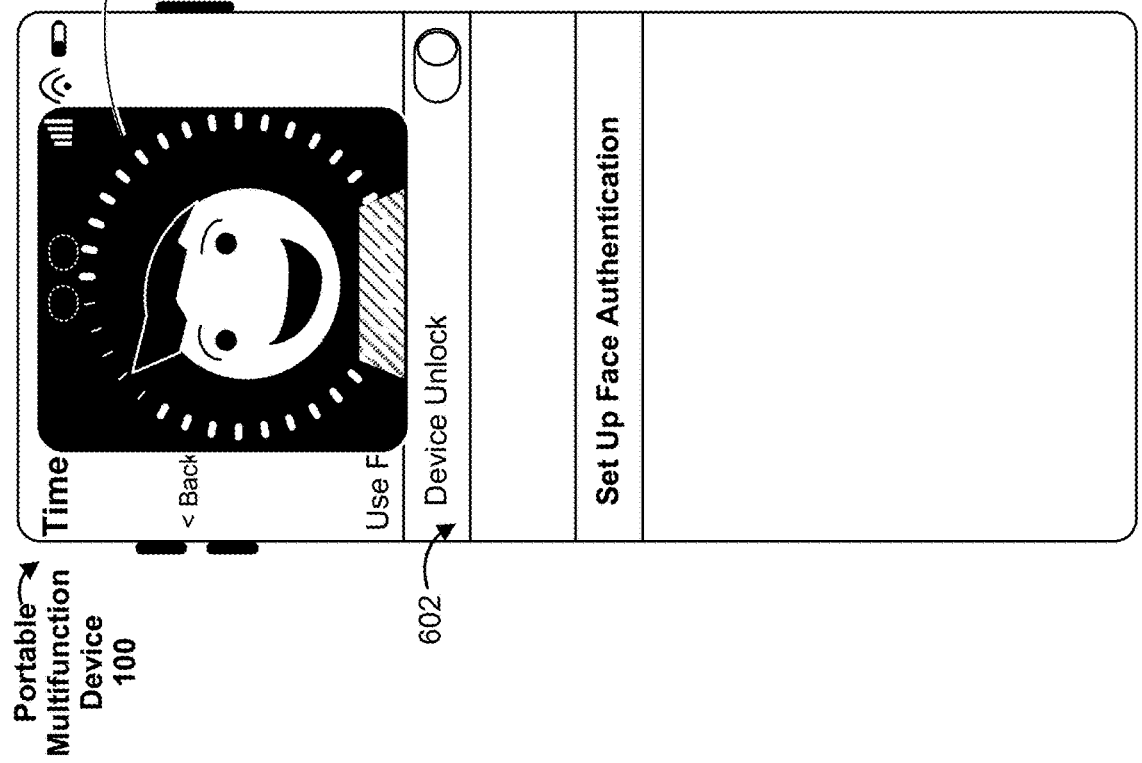

FIG. 6C illustrates that, as the user progresses in setting up biometric authentication (e.g., face or iris authentication), for example by providing various angles and/or views of the user's face, the progress indicator updates in the user interface element 606-2 displayed in the session region. In some embodiments, the progress indicator updates by illuminating or otherwise visually distinguishing a portion of a progress circle and/or progress bar.

Figure 6D:
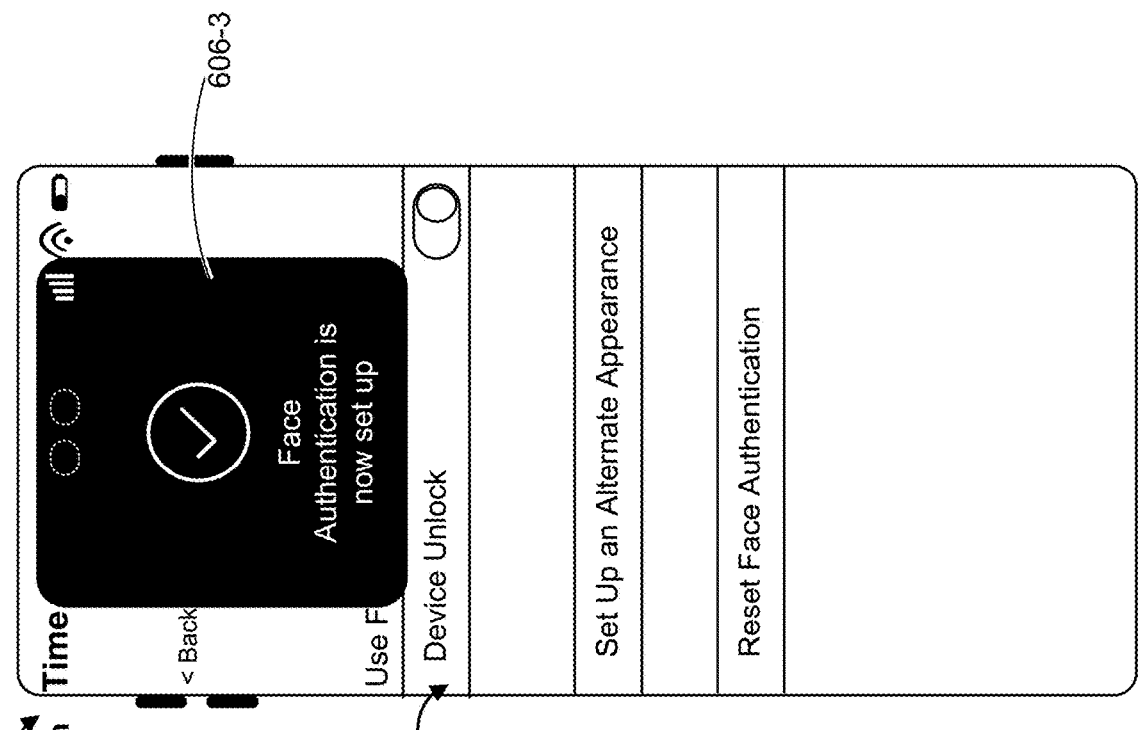

FIG. 6D illustrates after the user has completed the biometric authentication (e.g., face or iris authentication) process, and optionally completing the progress indicator (e.g., completing the progress circle), the user interface element 606-3 is updated to include an indication of success. For example, the user interface element 606-3 displays a check mark or other indication of success that biometric authentication (e.g., face or iris authentication) has been set up. In some embodiments, the user interface 610 optionally is also updated in accordance with successfully enrolling in biometric authentication. For example, user interface 610 includes options for setting up an alternate appearance and/or resetting the biometric authentication.

FIG. 6E1 illustrates user interface 610 is displayed, and that the user interface element 606-3 shrinks down and/or ceases to be displayed such that the session region 502-1 is displayed without displaying information about biometric authentication (e.g., face or iris authentication). In some embodiments, user interface element 606-3 automatically disappears without additional user input after a predefined threshold amount of time (e.g., 0.1, 0.2, 0.5, 1, 5, 15, 30, 60, 90, or 120 seconds).

FIG. 6E2 illustrates user interface 611 is displayed while device 100 is in a locked state. In some embodiments, user interface 611 is a wake screen user interface. In some embodiments, device 100 displays user interface 611 concurrently with minimized session region 502-1, optionally without displaying a lock indication in the session region, and a notification 620. In some embodiments, notification 620 is displayed without displaying content for the notification, or other hidden information. For example, notification 620 indicates there is a message from Max without displaying text and/or image content of the message. In some embodiments, multiple notifications and/or widgets or a combination thereof that correspond to the same application and/or sender or different applications and/or senders are displayed on the wake screen with hidden information when the device is locked.

FIG. 6F illustrates an example of session region 611-1 displaying a lock indication (e.g., an icon of a locked lock) in accordance with the device 100 being in the locked state. In some embodiments, while displaying the lock indication in session region 611-1, device 100 optionally visually deemphasizes the display of user interface 612. For example, user interface 612 is dimmed (e.g., compared to user interface 611, FIG. 6E2). In some embodiments, the session region 611-1 is optionally displayed concurrently with wake screen user interface 612. In some embodiments, the lock indication is optionally not displayed in the session region, and is displayed at another position in the wake screen user interface 612 (e.g., above the time indication). In some embodiments, the device 100 detects a user input 613 (e.g., a swipe input or other input such as raising the device (e.g., movement indicated by arrows 613-a), pressing a button (e.g., user input 613-b pressing a button, or another user input on another button of device 100), touching a fingerprint sensor, and/or tapping on a touch-sensitive surface such as a touch-sensitive display (e.g., user input 613-c directed to a portion of the wake screen user interface and/or user input 613-d corresponding to a request to view a notification)) requesting to navigate to the home screen user interface, display an unlocked version of the wake screen user interface and/or display an application user interface. In some embodiments, while the device 100 is in the locked state, in response to the user input 613, the device 100 attempts to authenticate the user, optionally using a fingerprint, biometric authentication, a passcode, or another form of authentication. In some embodiments, the device is in a low power display state (sometimes referred to as an "always on display" state) while the device is locked and the user interface is displayed with reduced brightness to reduce power consumption from the display, and an input on the device (e.g., as described above with reference to FIG. 6F) to wake the device (e.g., transition the device from the low power display state to a higher power display state) causes the device to transition from the low power display state to a higher power display state and attempt to authenticate the user (e.g., either while displaying the content that was displayed on the wake screen in the low power display state, as shown in FIG. 6G1, or while displaying an authentication user interface that removes at least some of the content that was displayed on the wake screen in the low power state, such as user interface 614 of FIG. 6G except without visual deemphasis).

In some embodiments, in response to detecting a user input requesting to display an unlocked version of the wake screen user interface, in accordance with a determination that the authentication attempt is successful, device 100 displays wake screen user interface 611 (FIG. 6G2) that includes an expanded version of the notification 620. In some embodiments, multiple notifications and/or widgets or a combination thereof that correspond to the same application and/or sender or different applications and/or senders are that were previously displayed on the wake screen with hidden information when the device was locked are displayed with revealed information that was previously hidden (e.g., hidden information) once the device is unlocked. In some embodiments, the user interface 611 in FIG. 6G2 is displayed without a visual deemphasis. For example, user interface 611 is displayed with a brightness level greater than the brightness level of user interface 612 (FIG. 6F).

FIG. 6G illustrates a user interface 614 that indicates the form of authentication, for example biometric authentication (e.g., face or iris authentication), being used, and/or prompts the user to engage in a particular form of authentication (e.g., by looking at device 100, or placing a finger on a fingerprint sensor of device 100). In some embodiments, displaying user interface 614 includes visually deemphasizing (e.g., applying a blurred effect, darkening, and/or changing an opacity of) a background of the user interface while the device 100 attempts to authenticate the user (e.g., by scanning the user's face, iris, and/or fingerprint). In some embodiments, displaying user interface 614 includes displaying the background of the user interface without visually deemphasizing (e.g., applying a blurred effect, darkening, and/or changing an opacity of) the background while the device 100 attempts to authenticate the user (e.g., by scanning the user's face, iris, and/or fingerprint). In some embodiments, while the device 100 attempts to authenticate the user, session region 611-2 is updated to display an animated indication that the device 100 is processing. In some embodiments, the animated indication comprises a plurality of circles or orbs that animate as shifting around each other during processing. In some embodiments, while the device 100 attempts to authenticate the user, the session region increases in size, optionally while the animated indication that the device 100 is processing is displayed. In some embodiments, the session region oscillates in size (e.g., as described with reference to FIGS. 5AB-5AF) as device 100 collects and/or analyzes biometric data for authentication. For example, while device 100 determines whether or not to authenticate the user, the session region oscillates in size.

In some embodiments, the lock indication is optionally displayed in a region of the user interface outside of the session region (e.g., above the time indication) while the device is locked, and in accordance with a determination that there is an attempt to unlock the device 100, the lock indication optionally moves (e.g., is moved by device 100) so as to be displayed in the session region.

In some embodiments, during the authentication attempt, a progress of the authentication and/or device unlock is displayed. For example, in some embodiments, a size and/or location of the session region changes during the authentication attempt. In some embodiments if the device is in a low power display state where content on a display of the device is dimmed when an input that corresponds to a request to unlock the device is detected (e.g., as illustrated in FIG. 6F), the content on the display of the device is brightened while displaying an indication that the device is determining whether or not to unlock the device (e.g., instead of being dimmed, as shown, the user interface in FIG. 6G is alternatively displayed without dimming, to indicate to the user that the device is responding to the request to unlock the device). In the example shown in FIG. 5G1, user interface 612-2 displays the content that was displayed in the low power display state when an input that corresponds to a request to unlock the device was detected (e.g., as illustrated in FIG. 6F), without dimming, and with an indication that the device is determining whether or not to unlock the device, as shown in session region 611-2b.

In some embodiments, an ongoing session is displayed in the session region while displaying the home screen user interface while the device 100 is locked (e.g., in FIG. 5AX, session region 502-16 includes a timer session). In some embodiments, in response to detecting an authentication attempt while an ongoing session is displayed in the session region, device 100 ceases to display the active session in the session region and displays the authentication animation described with reference to FIGS. 6F-6L. In other words, in response to detecting an authentication attempt, the authentication session is prioritized over other active session(s) that are displayed in the session region. In some embodiments, in ceasing to display the active session in the session region and displaying the authentication animation, device 100 displays an animated transition that includes minimizing the session region, as described with reference to FIG. 5BT. In some embodiments, after the authentication attempt is complete, or otherwise ceases (e.g., the device is unlocked or remains locked), the active session(s) are optionally redisplayed in the session region. For example, after the device is unlocked, the timer session (e.g., displayed in session region 502-16, FIG. 5AX) is redisplayed in the session region 611-6. In some embodiments, in accordance with a determination that a session becomes active while an authentication attempt is in progress, the session region forgoes displaying, or delays displaying, an indication of the session during the authentication attempt.

In some embodiments, after the authentication attempt is complete, device 100 displays an animated transition between the session region displaying the authentication status and the session region for another session, such as by minimizing the session region, as described with reference to FIG. 5BT.

Figure 6I:
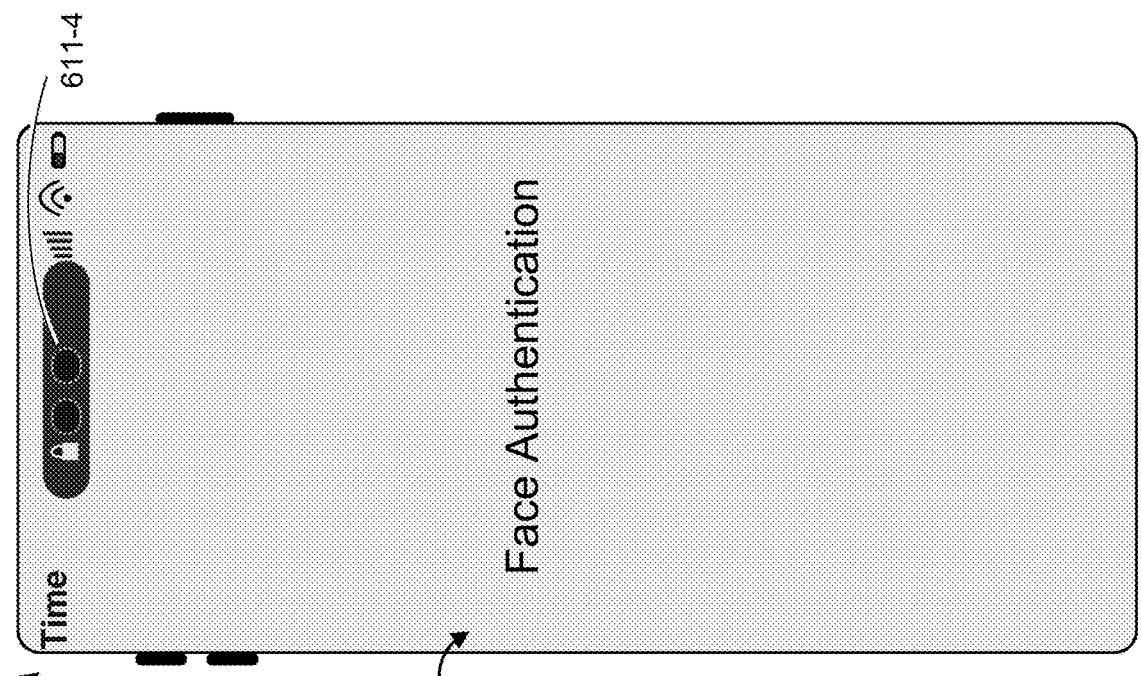
Figure 6H:
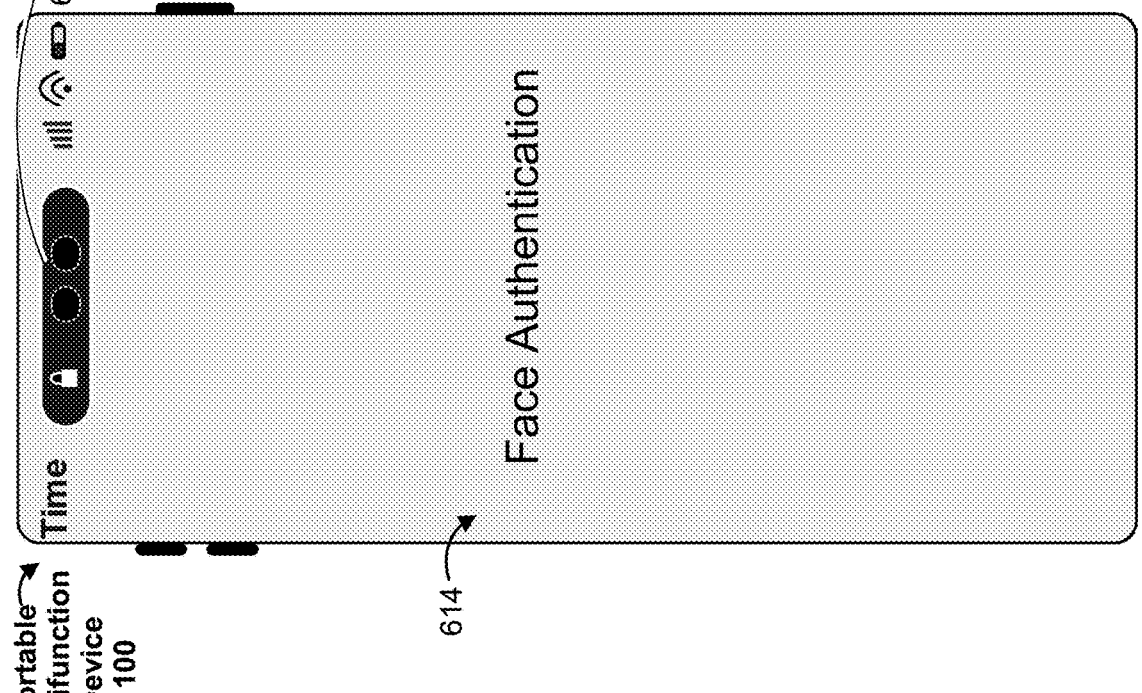
Figure 6K:
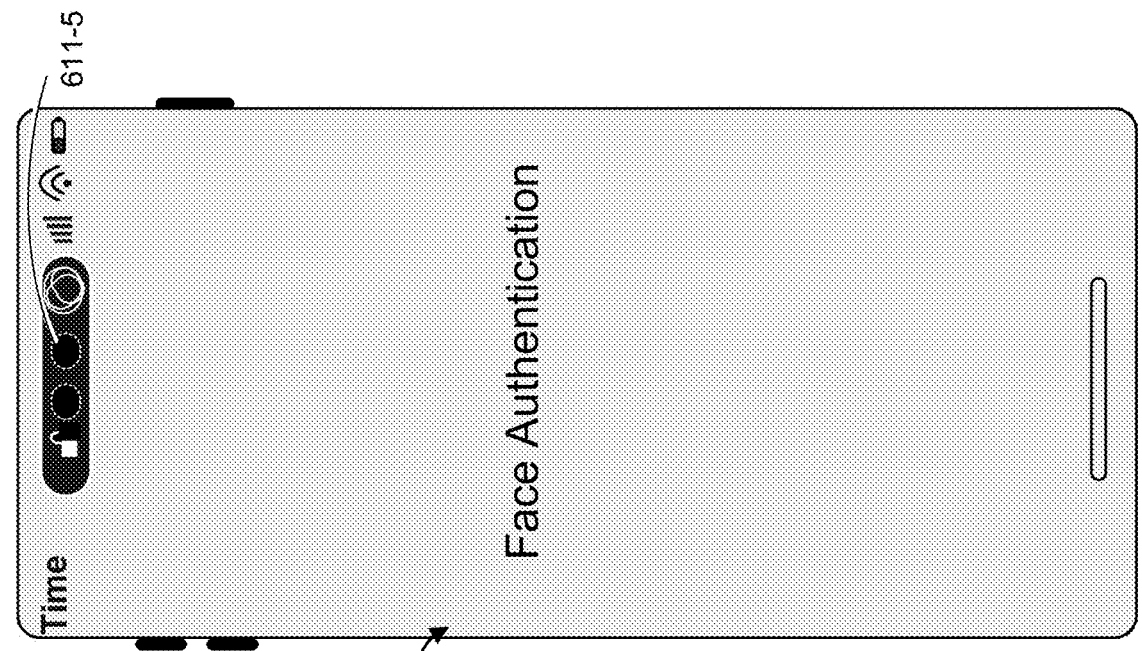
Figure 6J:
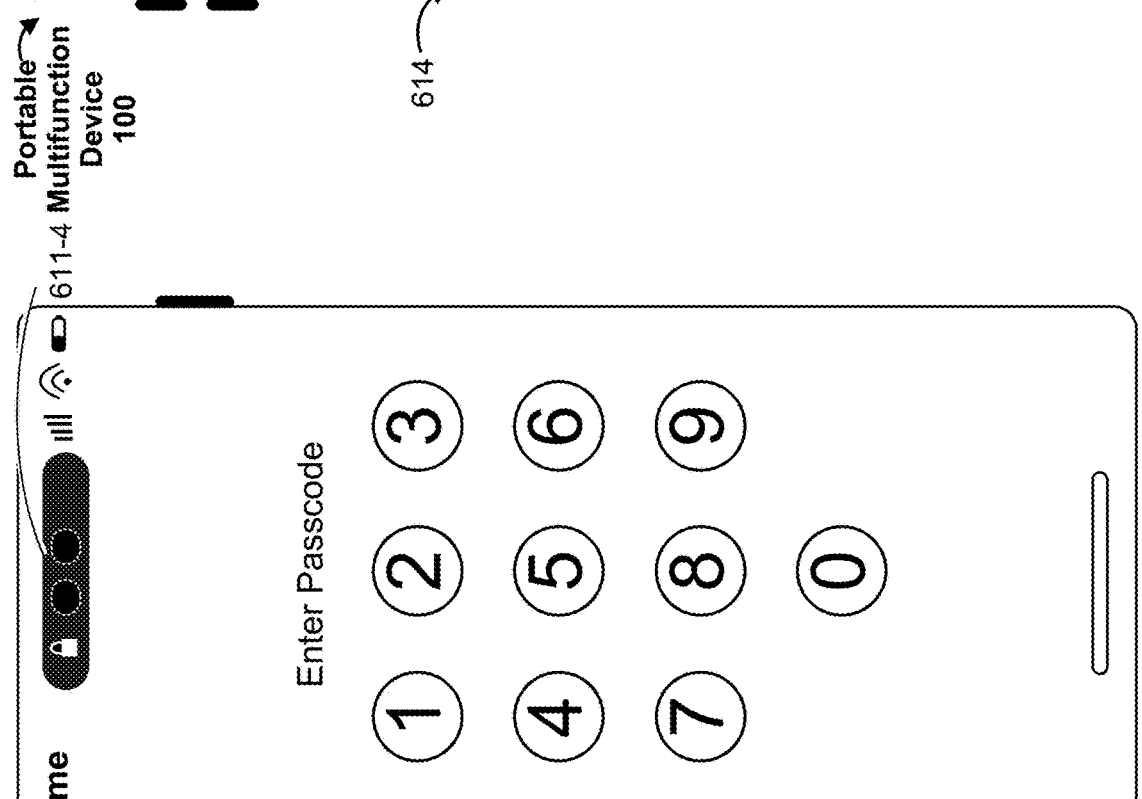

FIGS. 6H-6J illustrate session region 611-3 and session region 611-4 updating in accordance with a determination that the device 100 was not able to authenticate the user using biometric authentication. For example, if the device 100 fails to authenticate the user via biometric authentication (e.g., face or iris authentication), the session region optionally updates by shifting (e.g., shakes) from right to left and/or in other directions while maintaining display of the lock indication. For example, in FIG. 6H, session region 611-3 shifts to the left before shifting to the right as session region 611-4 (FIG. 6I). In some embodiments, the lock indication is maintained in a same position relative to the session region. In some embodiments, the lock indication is maintained in a same position relative to the one or more sensor cutouts.

In some embodiments, authentication is used to unlock the device, as described herein, and is optionally also used to confirm payment information and/or to authorize filling in stored data automatically (e.g., to provide permission for autofill of information such as a username, password, passkey, address, credit card information, phone number and/or address). In some embodiments, the session region displays a lock icon and/or displays a prompt requesting authentication (e.g., session region 5040m, FIG. 5BL) before completing the authentication attempt for confirming payment and/or filling in stored data. In some embodiments, the session region 611-3 shifts to the left and right if the authentication attempt is unsuccessful for confirming payment information and/or filling in stored data.

FIG. 6J illustrates a passcode user interface 616 that prompts the user to enter a passcode. In some embodiments, the passcode is used as an alternative form of authentication, optionally after one or more biometric authentication attempts fail. In some embodiments, while displaying the passcode user interface 616, the session region 611-4 continues to display a lock indication while the device 100 remains in the locked state. In some embodiments, the user is enabled to type in a passcode using a plurality of selection inputs (e.g., tap inputs or other selection inputs) on a keypad and/or keyboard.

FIG. 6K illustrates an example of session region 611-5 updating in accordance with a successful biometric authentication attempt. For example, in response to the device successfully authenticating the user at user interface 614 in FIG. 6G, the session region updates from session region 611-2 to session region 611-5, which includes an indication that the device 100 is unlocked (e.g., an icon of an unlocked lock). In some embodiments, an unlock progress animation (e.g., the lock icon transitioning in multiple steps from locked to unlocked) is displayed concurrently (e.g., in the session region) while updating the display to the unlocked user interface (e.g., home screen user interface 618, FIG. 6L). In some embodiments, in accordance with a determination that the authentication is successful, the indication that the device 100 is unlocked (e.g., the icon of an unlocked lock) moves from display within the session region to display on the user interface outside of the session region. In some embodiments if the device is in a low power display state where content on a display of the device is dimmed when an input that corresponds to a request to unlock the device is detected (e.g., as illustrated in FIG. 6F), the content on the display of the device is brightened while displaying an indication that the device is determining whether or not to unlock the device (e.g., instead of being dimmed, as shown, the user interface in FIG. 6K is alternatively displayed without dimming, to indicate to the user that the device is responding to the request to unlock the device).

Figure 6M:
Figure 6L:
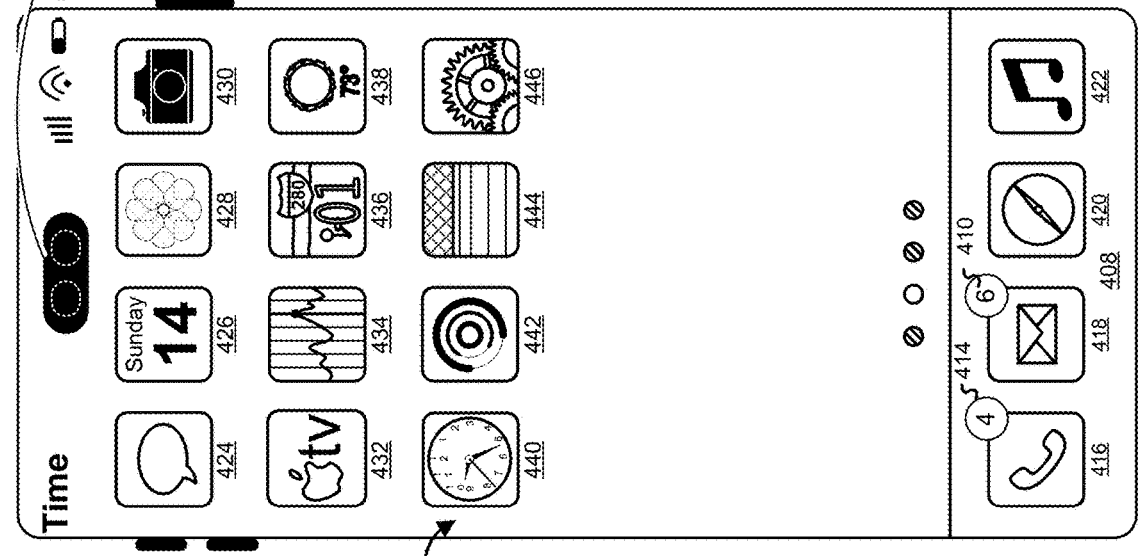

FIG. 6L illustrates a home screen user interface 618 that is displayed in response to user input 613 (FIG. 6F) and in accordance with a determination that the device is in the unlocked state. For example, the device 100 authenticates the user (e.g., using biometric authentication and/or a passcode) before displaying the home screen user interface 618 and allowing the user to interact with applications and/or view data of device 100.

FIG. 6M illustrates an example of the wake screen user interface 612 while displaying session region 611-6 in accordance with a determination that the device is in the unlocked state. For example, session region 611-1 (FIG. 6F) is displayed concurrently with the wake screen user interface 612 only while the device 100 is in the locked state. In some embodiments, the device 100 enters the locked state at a predetermined amount of time (e.g., a predetermined amount of time during which no user inputs are detected, or during which no events in a predefined set of events are detected) that is optionally selected by the user (e.g., every 5 minutes, every 1 hour, or every 24 hours). In some embodiments, the device 100 optionally enters the locked state in response to a user input activating button 206 or set of buttons.

FIGS. 7A-7D illustrate example user interfaces that include updating session region 702-1 in accordance with a determination that device 100 has approached, or is in a predefined proximity of, a wireless terminal. For example, in some embodiments, device 100 stores one or more payment methods, e.g., corresponding to one or more debit cards, credit cards, other payment cards, or access authorization cards, such that device 100, when tapped to a terminal (e.g., using NFC or other close-range communication), automatically prompts the user to use a stored payment method. Stored payment methods are sometimes herein called stored cards.

Figure 7A:
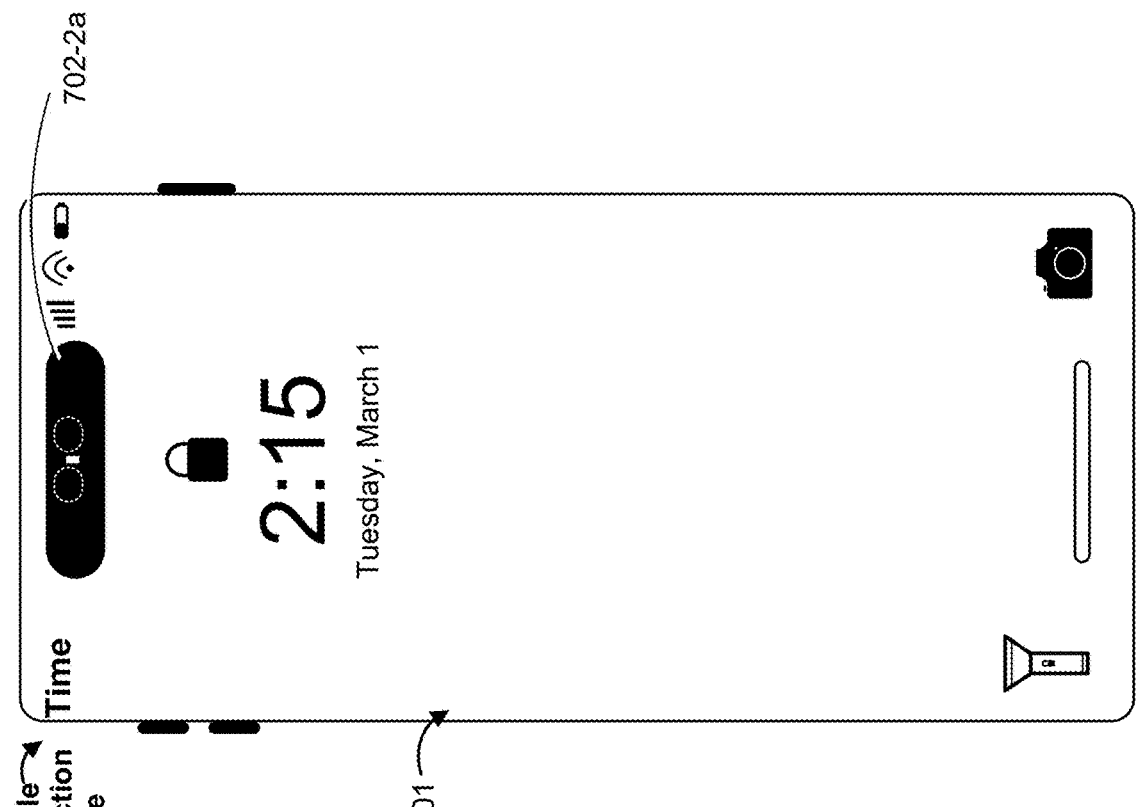
Figure 7A:
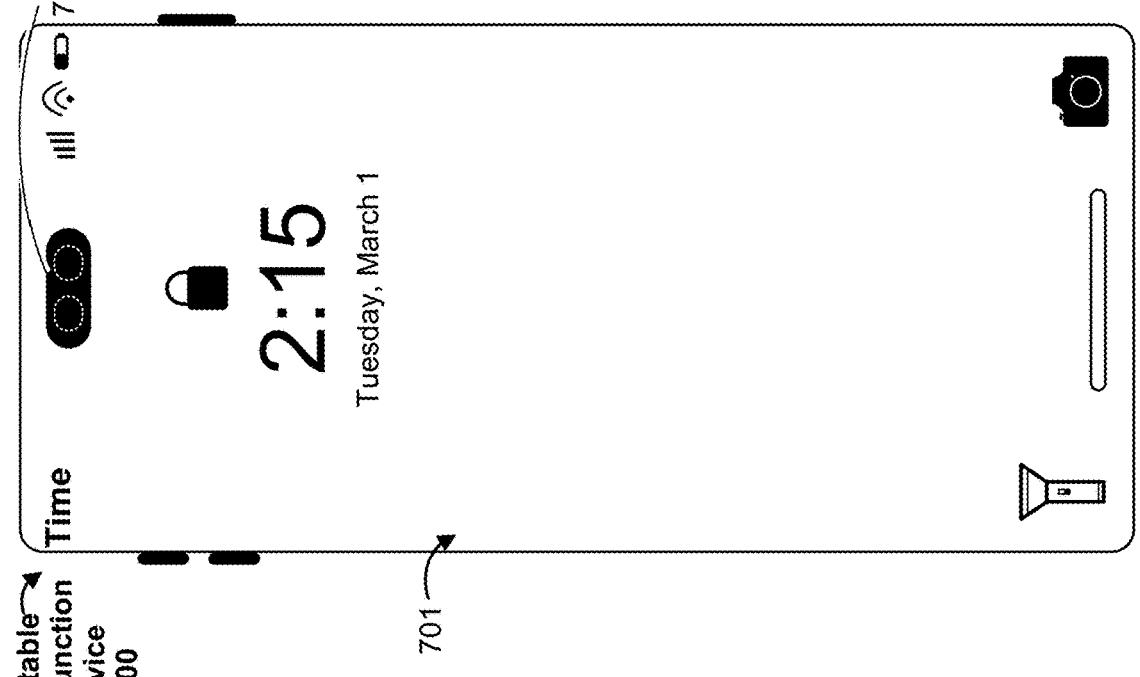
Figure 7D:
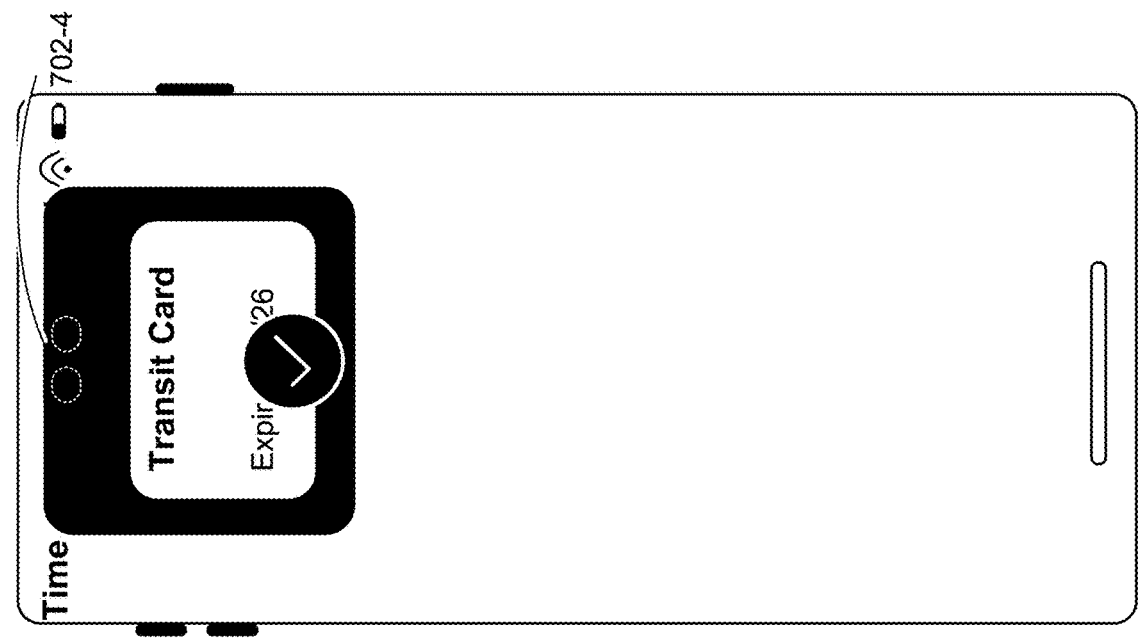
Figure 7C:
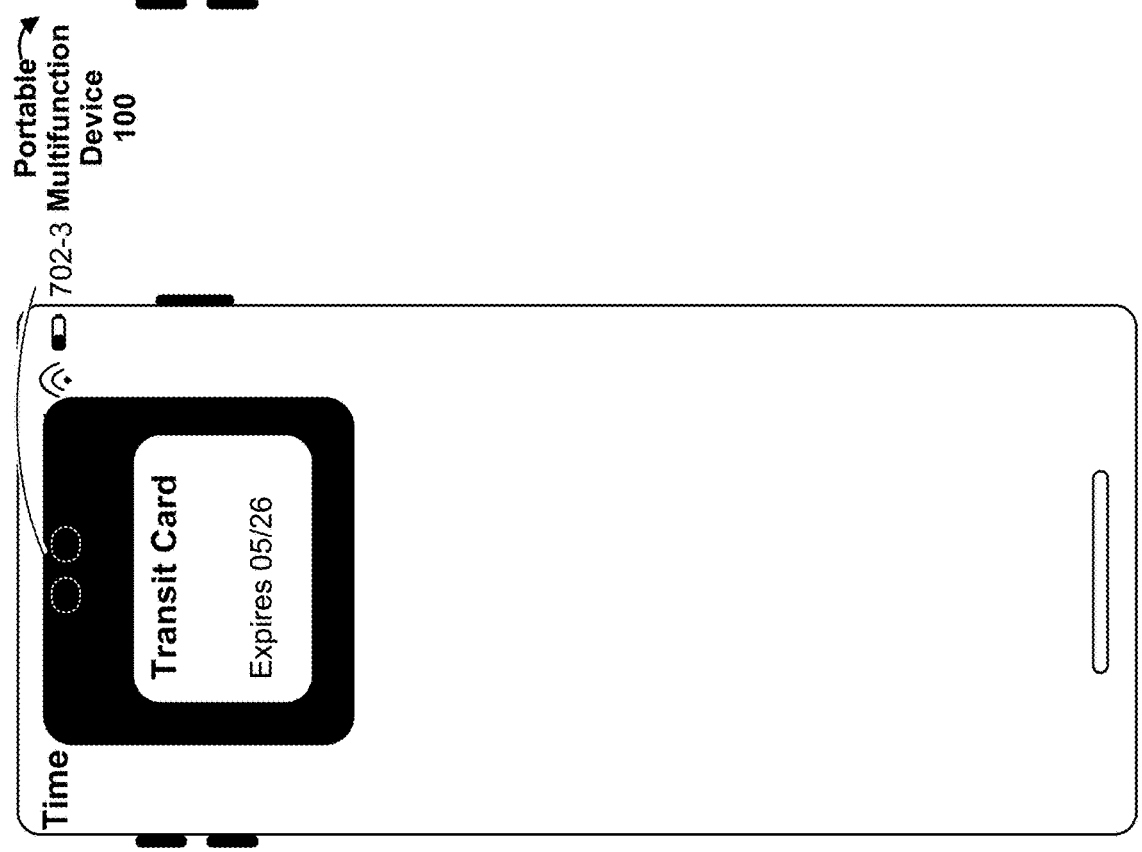

FIG. 7A illustrates displaying session region 702-1 with a wake screen user interface 701. In some embodiments, in accordance with a determination that the device 100 is near a wireless terminal, session region 702-2 updates to include an indication of a stored card, as illustrated in FIGS. 7B1-7B2. Although the examples described with reference to FIGS. 7A-7E display session region 702 over a wake screen user interface, it will be understood that the session region 702 is displayed with the same behavior, even while other user interfaces (e.g., a home screen user interface and/or an application user interface) are displayed by device 100. For example, while a user is interacting with an application user interface, in accordance with a determination that the device 100 is within proximity of a wireless terminal (e.g., within a threshold distance or within a spatial region around the wireless terminal with a threshold wireless signal strength), the session region 702 is displayed over the application user interface that is currently displayed on device 100. In some embodiments, an icon representing the stored card is optionally displayed between two sensor cutouts. In some embodiments, the icon representing the stored card illustrated in session region 702-2*a* (FIG. 7B1) is animated by increasing in size, rotating (e.g., spinning or shaking, as illustrated in session region 702-2*b* (FIG. 7B2)), and/or moving position to below or between the sensor cutouts while the session region 702-2*b* expands to session region 702-3, as illustrated in FIG. 7C. For example, session region 702-3 illustrates the icon representing the stored card as fully expanded. In some embodiments, the icon representing the stored card displays information about the stored card (e.g., a name of the card and/or an expiration of the card). In some embodiments, the device 100 optionally prompts the user to authenticate (e.g., using a passcode, biometric authentication, and/or fingerprint authentication) before the device 100 displays the expanded stored card (FIG. 7C). In some embodiments, the device 100 prompts the user to authenticate after the device 100 displays the expanded stored card (FIG. 7C), but before the device 100 approves the use of the stored card and/or displaying the confirmation indication in FIG. 7D.

In some embodiments, while the stored card is expanded in session region 702-3, the device 100 attempts to authenticate the user before approving the use of the stored card. In some embodiments, in accordance with a determination that the device 100 has successfully authenticated the user (e.g., using face authentication, fingerprint authentication, and/or a passcode), a confirmation indication is displayed in session region 702-4, such as a check mark that optionally overlays the icon representing the stored card. In some embodiments, in accordance with a determination that the authentication has not been provided, or that the authentication is not successful, the device 100 optionally outputs feedback indicating that the authentication was not successful. For example, the device 100 optionally outputs a tactile output, an audio output and/or a visual output (e.g., shaking the session region) to indicate the authentication was not successful.

Figure 7E:
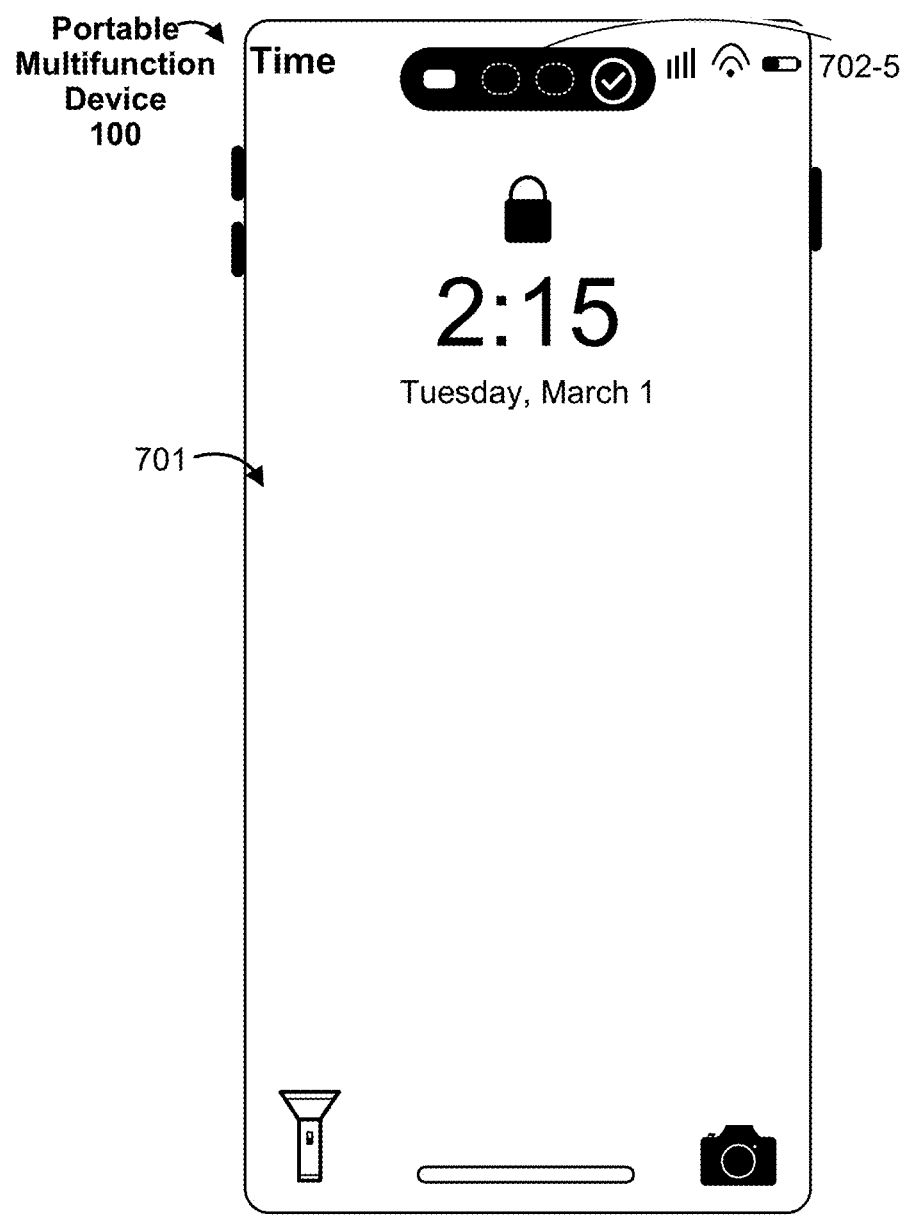

In some embodiments, after the device authenticates the user and approves (or obtains approval for) use of the stored card, the icon representing the session region 702-4, and the stored card and/or the confirmation indication optionally shrink in size to session region 702-5, illustrated in FIG. 7E. In some embodiments, the session region 702-5 continues to display a smaller version of the indication of the stored card (optionally to the left of the sensor cutouts) and the confirmation indication (optionally to the right of the sensor cutouts).

Figure 8B:
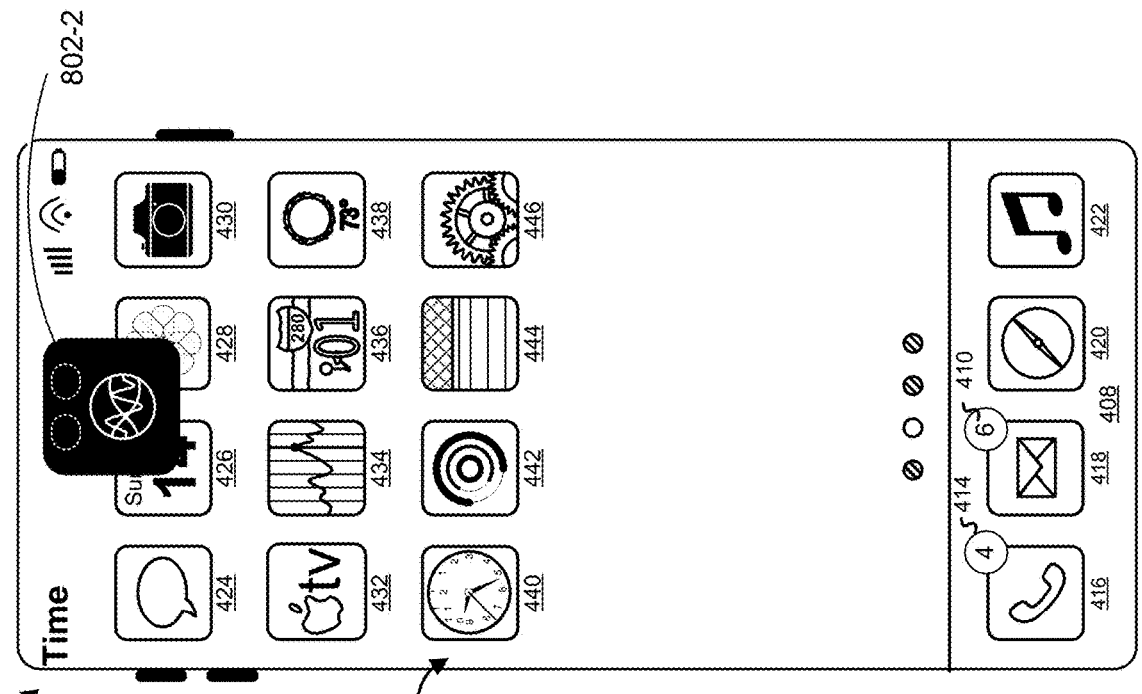
FIGS. 8A-8G illustrate example user interfaces for updating a session region for a virtual assistant in accordance with some embodiments.
Figure 8A:
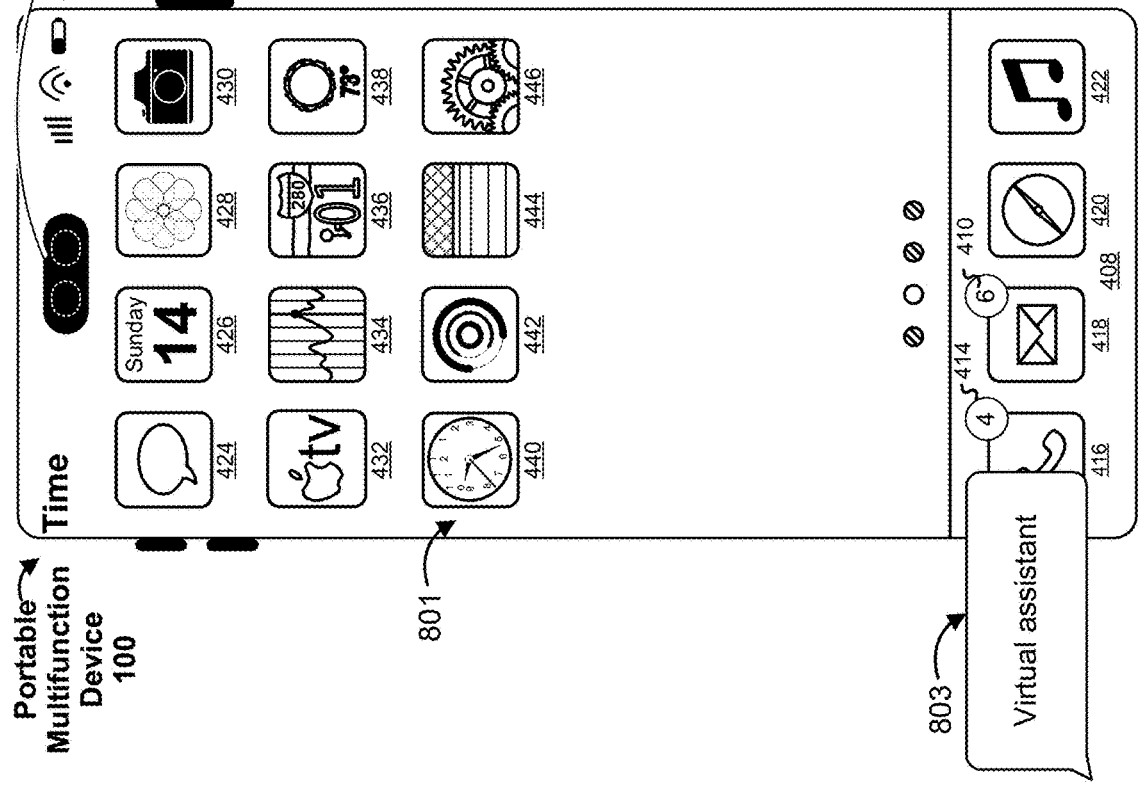

FIGS. 8A-8G illustrate examples user interfaces for updating a session region as the user interacts with a virtual assistant of device 100. FIG. 8A illustrates displaying a home user interface 801 and session region 802-1, which has no active sessions. In some embodiments, if there are one or more active sessions, the one or more active sessions optionally remain displayed in the session region while the session region updates to interact with the virtual assistant, as described below. In some embodiments, the one or more active sessions are ceased to be displayed while the session region is updated to display interactions with the virtual assistant. FIG. 8A further illustrates a user invoking the virtual assistant using a voice command 803. In some embodiments, the virtual assistant is invoked using another type of input (e.g., holding a button, selecting an option displayed in the user interface, or another input with device 100).

FIG. 8B illustrates session region 802-2 that is expanded and updated to display an indication of the virtual assistant that is invoked in response to voice command 803. In some embodiments, the indication of the virtual assistant includes an animated waveform (e.g., in an orb or other 2D or 3D geometric shape). In some embodiments, the indication of the virtual assistant is displayed with one or more visual features and/or colors that animate in accordance with a current state of the virtual assistant. For example, the indication of the virtual assistant animates the waveform in accordance with a detected voice command (e.g., to represent incoming audio data).

Figure 8D:
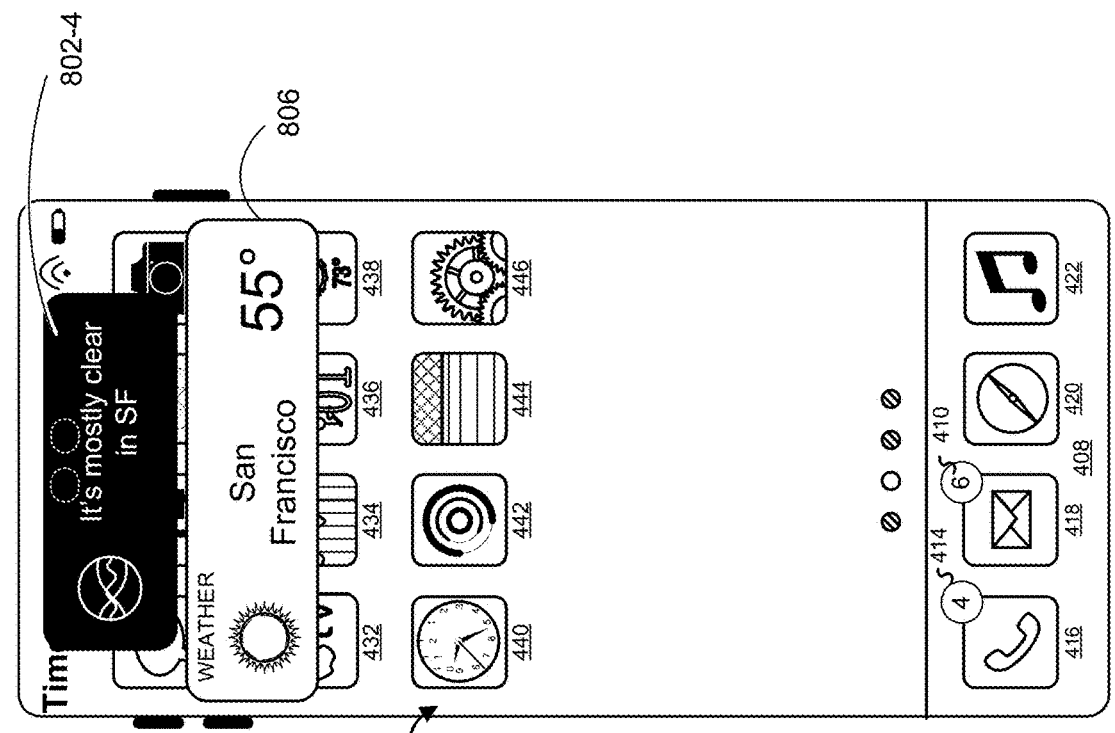
Figure 8C:
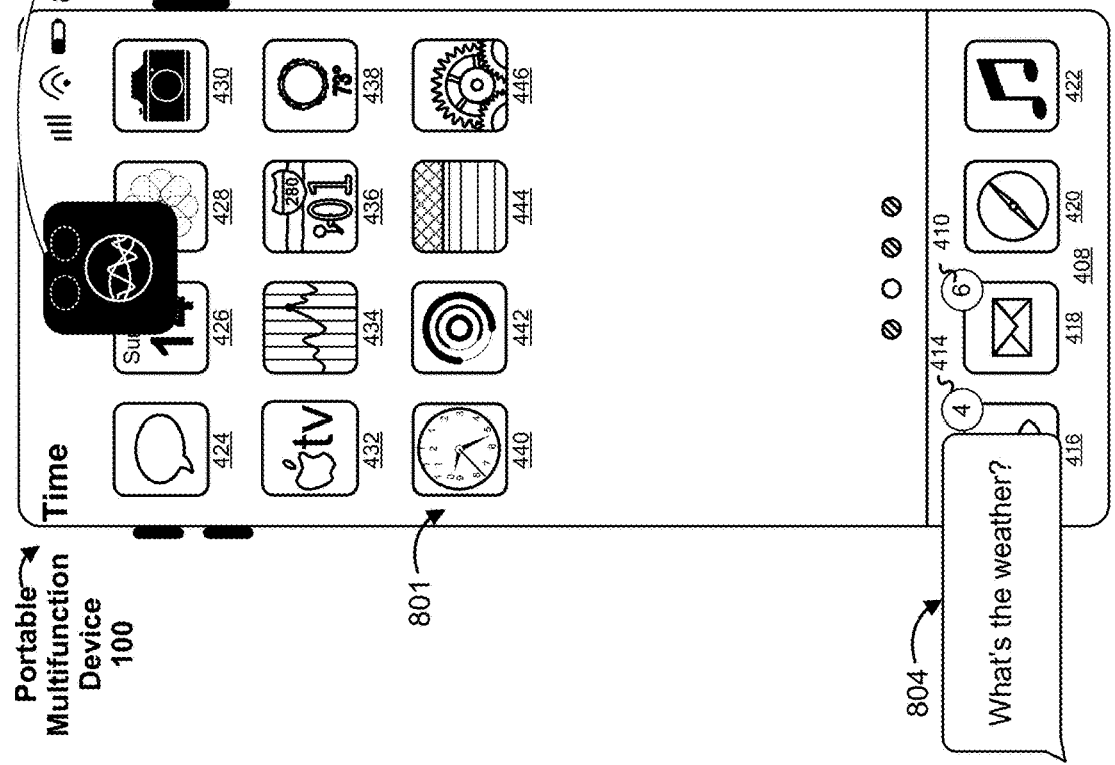

FIG. 8C illustrates session region 802-3 that is animated while detecting a voice command 804 asking the virtual assistant, "What's the weather?" In some embodiments, in response to voice command 804, the device 100 optionally updates the session region 802-4 to display a response to the voice command 804 ("it's mostly clear in SF"), as illustrated in FIG. 8D. In some embodiments, the virtual assistant optionally provides the response to the voice command 804 via an audio output. In some embodiments, the device 100 optionally displays a separate user interface element 806, outside of session region 802-4, that provides additional information and/or context related to voice command 804. For example, the device 100 displays information from a weather application in user interface element 806. In some embodiments, session region 802-4 and/or user interface element 806 automatically, without user input, cease to be displayed after being displayed for a threshold time period (e.g., 0.25, 0.5, 1, 3, 5, 15, 30, 60, 90, or 120 seconds) and/or after detecting a user input corresponding to a request to navigate to another user interface and/or another application.

Figure 8F:
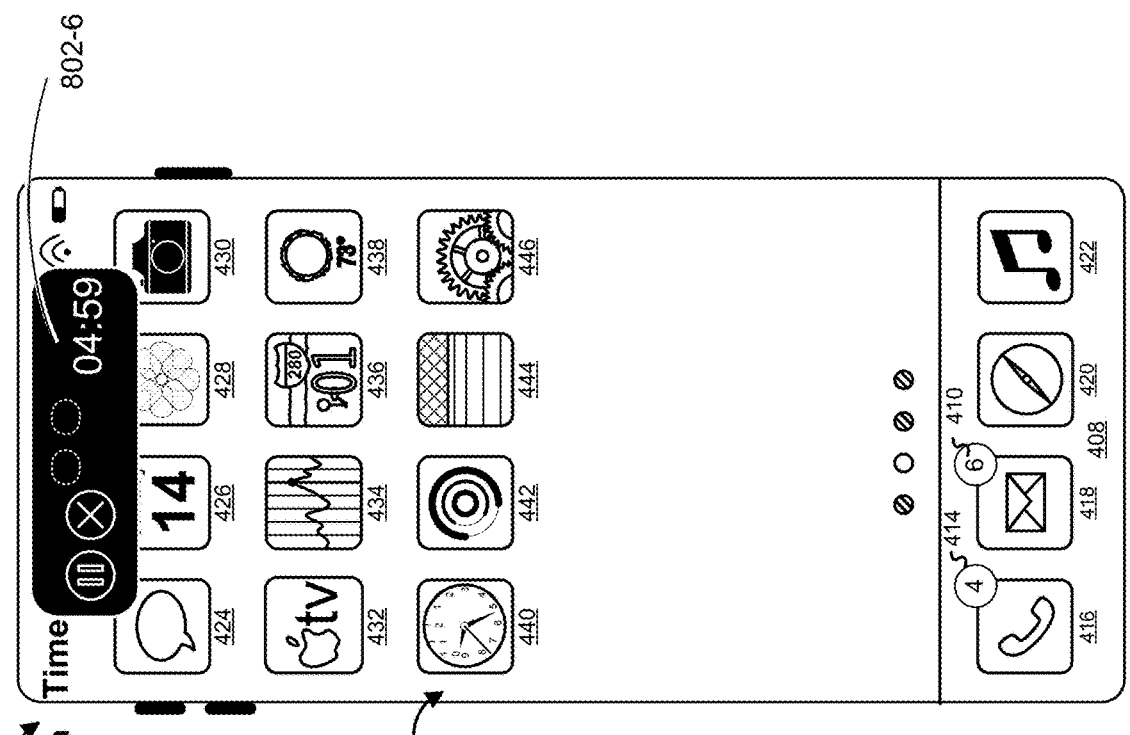
Figure 8E:
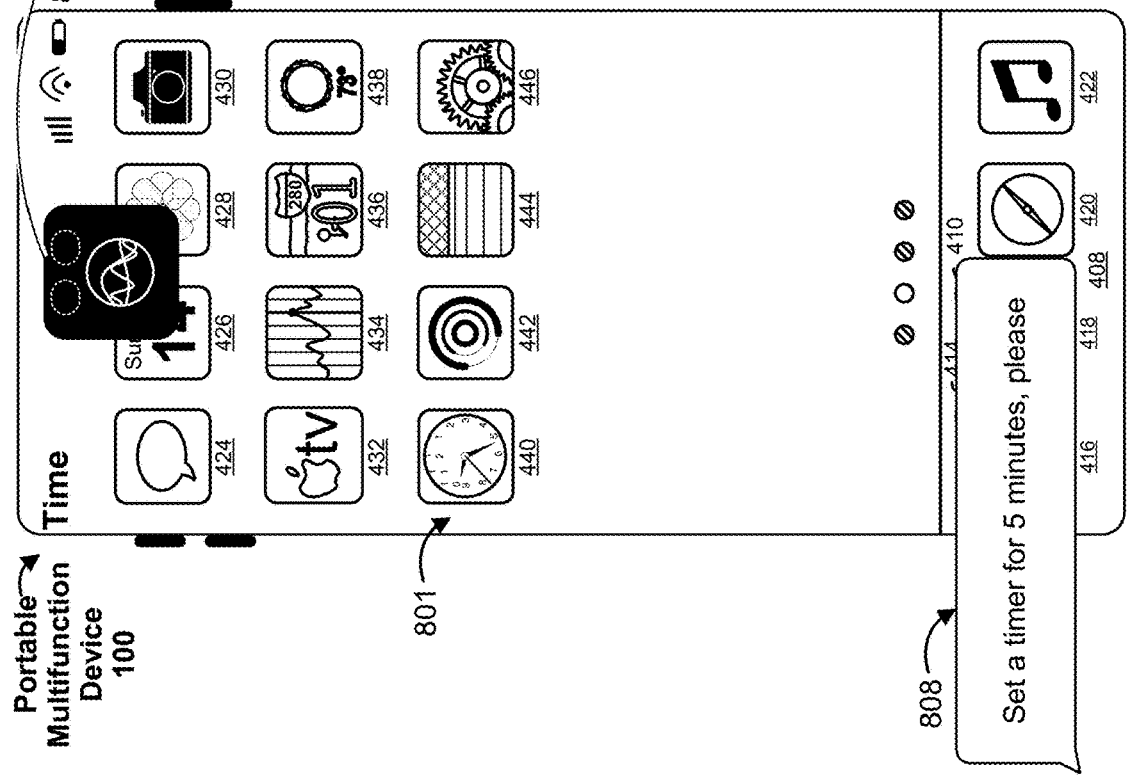

FIG. 8E illustrates another example of a voice command 808 that is received after the user has invoked the virtual assistant such that session region 802-5 is expanded to display the indication of the virtual assistant is ready to receive a command. In some embodiments, the voice command 808 is an instruction to the virtual assistant to set a timer (e.g., in a timer or clock application) for a user-specified amount of time, for example to set a timer for 5 minutes. In some embodiments, in response to voice command 808, the session region updates to session region 802-6, illustrated in FIG. 8F, to show the user that the virtual assistant has set the timer (e.g., by showing in the session region a remaining amount of time until the expiration of the user-specified amount of time).

In some embodiments, the session region 802-6 is optionally displayed with information for another application (e.g., other than the timer or clock application) in response to a voice command that causes device 100 to initiate a session that is represented in the session region. For example, as described with reference to FIG. 5BL, the session region displays information for a plurality of applications. For example, if the user provides a voice command for directions to a destination, a navigation session using the maps application is displayed in the session region 802-6.

In some embodiments, the session region 802-6 is initially displays as an expanded session region in response to voice command 808. In some embodiments, after the session region 802-6 is displayed for a predetermined amount of time (e.g., 5 seconds, 30 seconds, or 1 minute), the session region 802-6 automatically shrinks in size to session region 802-7, illustrated in FIG. 8G, while continuing to update status information for the timer session in session region 802-7.

FIGS. 9A-9G are flow diagrams illustrating method 9000 of updating status information within a region of a display area in accordance with some embodiments. Method 9000 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 9000 are, optionally, combined and/or the order of some operations is, optionally, changed.

In some embodiments, the method 9000 is performed at a computer system that is (9002) in communication with one or more sensors (e.g., one or more optical sensors) and with a display generation component having a display area, wherein the one or more sensors are positioned within (e.g., entirely within) one or more sensor regions that are surrounded by the display area, and the display generation component is not capable of displaying content within the one or more sensor regions (e.g., one or more non-display regions that form holes in the display area, such as sensor cutouts for speaker 111 and/or optical sensors 164). In some embodiments, one or more other components, such as light emitters, proximity sensors, biometric sensors, speakers and/or microphones, are alternatively or additionally positioned within the one or more sensor regions of the display area.

The computer system displays (9004), in a first display region (e.g., a session display region, also called a session region or status region that encompasses one or more of the sensor regions) of the display area, a first user interface object (e.g., session region 502-4) that includes status information provided by respective software (e.g., an operating system or a first software application executing on the computer system) about a state of the computer system, wherein the first display region encompasses the one or more sensor regions (e.g., the non-display regions are cutouts from the first display region). In some embodiments, the boundary of the first display region may partially coincide with (e.g., without crossing) portions of the boundaries of the non-display regions.

The computer system displays (9006), in a second display region of the display generation component that is different from the first display region, a user interface of an application (e.g., a second software application different from a first software application providing the information in the first user interface object, or a system application, such as an application launcher (e.g., a home screen that includes representations of applications)) that is different from the respective software (in some embodiments, the application is a different software module than the respective software), wherein the second display region at least partially surrounds (optionally completely surrounds or partially surrounds the first display region by extending above, below, to the left, and/or to the right of) the first display region (e.g., a boundary of the second display region encompasses the boundary of the first display region). In some embodiments, the first display region is a cutout (e.g., a hole or protrusion from an edge) from an otherwise convex shape that bounds the second display region. The boundary of the second display region may partially coincide with (e.g., without crossing) portions of the boundary of the first display region. In some embodiments, the boundary of the first display region is an interior boundary of the second display region. In some embodiments, the boundary of the first display region encompasses a boundary of a third display region (e.g., which similarly may partially coincide with the boundary of the first display region), such as a third display region that is between two or more non-display regions in which optical sensors are positioned. For example, the second display region includes the content of user interface 500 for the messaging application, which is distinct from the first display region that displays session region 502-4 in FIG. 5E. The user interface 500 completely surrounds the session region 502-4, which is displayed as an island within the display.

As the state of the computer system changes, the computer system displays (9008) in the first user interface object updated status information provided by the respective software about the changed state of the computer system, wherein the updated status information includes visual elements that are selected so as to avoid overlapping locations of the one or more sensors in the first display region (e.g., without updating the user interface of the application, displayed in the second display region, with the updated status information provided by the respective software about the changed state of the computer system, and independently of any change in state of, or interactions with, the application whose user interface is displayed in the second display region). For example, as described with reference to FIGS. 5E-5F, status information for the ongoing phone call updates within the session region 502-4 over time, including as the user interface displayed in the second display region changes from the messaging application user interface 500 to home screen user interface 501. Displaying status information about a state of the computer system in a dedicated status region that encompasses one or more display cutouts for one or more sensors, and displaying the status information with visual elements that are selected so as to avoid overlapping the cutouts causes the device to automatically reduce the visual intrusiveness of the display cutouts and make more efficient use of the display area, as well as automatically optimize the placement of the status information to avoid truncation or distortion of the status information.

In some embodiments, the first user interface object that includes status information surrounds (9010) the one or more sensor regions. In some embodiments, the first user interface object surrounds the one or more sensor regions on at least three sides (e.g., left, right, top and/or bottom). For example, as illustrated in FIGS. 5E-5F, the session region 502-4 surrounds the sensor cutouts that optionally include speaker 111 and/or optical sensors 164. In some embodiments, the first user interface object is displayed as expanding from the one or more sensor regions, as illustrated by session region 502-6 in FIG. 5I In some embodiments, a background color of the first user interface object is a same color as the one or more sensor regions, such that the first user interface object appears seamlessly displayed as an expansion of the one or more sensor regions. For example, the background color of session region 502-4 is a same color as the color of the sensor cutouts and/or a color of the sensors arranged within the sensor cutout. Displaying the status region in a part of the display area that surrounds the one or more sensor regions causes the device to automatically reduce the intrusiveness of the display cutouts.

In some embodiments, the status information includes (9012) status information for a communication session. For example, in FIG. 5D, session region 502-3 displays information to initiate a communication session and FIGS. 5I and 5J illustrate the session region displaying information and/or controls for an ongoing communication session. In some embodiments, the communication session is a phone call, a video call. In some embodiments, the status information includes duration information (e.g., a length of time of an ongoing communication session) and/or an audio waveform, as described with reference to FIG. 5E. Displaying, in the status region, status information for a communication session reduces the number of inputs and the amount of display area needed for viewing feedback about a state of the device.

In some embodiments, the status information for the communication session includes (9014) an audio waveform, including a first audio waveform representing incoming audio and a second audio waveform representing outgoing audio, as described with reference to FIG. 5E. Displaying an audio waveform that composites distinct waveforms for incoming and outgoing audio provides feedback about a state of the device.

In some embodiments, the first audio waveform representing incoming audio is displayed (9016) with a first color and the second audio waveform representing outgoing audio is displayed with a second color distinct from the first color, as described with reference to FIG. 5E. Using different colors to differentiate incoming and outgoing audio waveforms in a composite audio waveform improves the feedback provided about a state of the device.

In some embodiments, the first audio waveform representing incoming audio and the second audio waveform representing outgoing audio at least partially overlap (9018). For example, the first audio waveform is displayed for a first range and the second audio waveform is displayed for a second range, wherein the first range and the second range have a portion, less than all, of the ranges that overlap. In some embodiments, the first audio waveform and the second audio waveform partially overlap and partially do not overlap (e.g., the leftmost portion of the range of the first audio waveform does not overlap with the rightmost portion of the range of the second audio waveform, and the rightmost portion of the range of the first audio waveform overlaps with the leftmost portion of the range of the second audio waveform), as described with reference to FIG. 5E. Displaying incoming and outgoing audio waveforms in a composite audio waveform as partially overlapping reduces the amount of display area needed to provide feedback about a state of the device.

In some embodiments, the status information includes (9020) information associated with an accessory connection. In some embodiments, the status information indicates whether an accessory (e.g., headphones, display, and/or external controllers (such as keyboard, mouse, and/or handheld controllers)) is currently paired with (optionally connected via Bluetooth, Bluetooth Low Energy (BLE), device-to-device Wi-Fi, or cabled connection) the computer system, as described with reference to session region 5040o in FIG. 5BL and with reference to portions 502-25 and 502-26 of the session region in FIGS. 5BH-5BI. In some embodiments, the status information for the accessory connection includes information for the accessory, such as an indication (e.g., icon and/or text) identifying the accessory (e.g., portion 502-25 of the session region, FIG. 5BH) and/or battery status information of the accessory (e.g., portion 502-26 of the session region, FIG. 5BH). Displaying, in the status region, information associated with an accessory connection, such as status information about the accessory, reduces the number of inputs and the amount of display area needed for viewing feedback about a state of the device.

In some embodiments, the status information includes (9022) information associated with an ongoing timer. (In some embodiments, the status information includes a countdown of time remaining on the timer and/or an icon or other graphical representation of a timer, as illustrated in FIGS. 5Q-5T and as session region 5040b, illustrated in FIG. 5BL. Displaying, in the status region, information associated with an ongoing timer, such as status information including the amount of time remaining on the timer, reduces the number of inputs and the amount of display area needed for viewing feedback about a state of the device.

In some embodiments, the status information includes (9024) information associated with media playback. For example, the status information includes an indication that media playback has started or stopped, and/or an indication of a current media item or a media item that has started playing such as a name or graphical indicator such as album art of the media item, as described with reference to session region 5040c in FIG. 5BL. In some embodiments, a first set of status information is included while the session region is in the condensed state (e.g., portion 502-9 of the session region, FIG. 5AL) and a second set of status information is included while the region is in an expanded state (e.g., session region 502-14, FIG. 5AM). Displaying, in the status region, information associated with media playback, such as a status of media playback and/or information identifying which media item is currently selected for playback, reduces the number of inputs and the amount of display area needed for viewing feedback about a state of the device.

In some embodiments, the status information includes (9026) information associated with sharing media content via a wireless communication channel. In some embodiments, the wireless communication channel includes a device-to-device WiFi connection, Bluetooth connection, and/or BLE connection, as described with reference to session region 5040g in FIG. 5BL. In some embodiments, the status of sharing media content includes an indication of progress that updates as the media content is being shared (e.g., incrementally adjusting the indication of progress over time as more of the media content is shared). Displaying, in the status region, information associated with wireless media sharing, such as current sharing progress and/or type of wireless connection being used, reduces the number of inputs and the amount of display area needed for viewing feedback about a state of the device.

In some embodiments, the status information includes (9028) information associated with a virtual assistant (e.g., indicating a status of a virtual assistant, as described with reference to session region 802-2 in FIG. 8B). In some embodiments, the indication of the virtual assistant indicates that the virtual assistant is active (e.g., listening, fetching results, and/or displaying a response to a voice command). In some embodiments, the indication of the virtual assistant is a representation of the virtual assistant, and optionally comprises a glowing orb that changes color, pattern, size, and/or translucency in accordance with one or more detected voice commands. Displaying, in the status region, information associated with a virtual assistant, such as an activity state of the virtual assistant, a transcription of a voice command directed to the virtual assistant, and/or a response to a command directed to the virtual assistant, reduces the number of inputs and the amount of display area needed for viewing feedback about a state of the device.

In some embodiments, the status information includes (9030) information associated with biometric authentication. In some embodiments, the status of biometric authentication (e.g., face authentication, iris authentication, and/or fingerprint authentication) includes an indication of whether biometric data is being collected (e.g., during scanning of the face, iris, and/or finger), an indication of success of the biometric authentication, and/or an indication of failure of the biometric authentication. For example, as described with reference to FIGS. 6F-6K, and illustrated as session region 5040m in FIG. 5BL, a status for biometric authentication is displayed in the session region. Displaying, in the status region, information associated with biometric authentication, such as whether biometric data is being captured or authenticated and/or success or failure of requested biometric authentication, reduces the number of inputs and the amount of display area needed for viewing feedback about a state of the device.

In some embodiments, the status information includes (9032) information associated with a workout activity, for example, as illustrated in session region 5040f in FIG. 5BL. In some embodiments, the workout activity is being logged by the computer system, or by an electronic device communicatively coupled to the computer system (e.g., an external fitness monitor, heartrate monitor, and/or watch). In some embodiments, the status of the workout activity includes an amount of time the workout activity is ongoing and/or an indication of a type of activity (e.g., walk, jog, run, cycle, or swim). In some embodiments, the status of the workout activity includes a metric associated with the workout activity (e.g., a duration of the workout activity, an indication of calories burned during the workout activity, an indication of an intensity of the workout activity, and/or an indication of the progress toward reaching an activity metric threshold). Displaying, in the status region, information associated with a workout activity reduces the number of inputs and the amount of display area needed for viewing feedback about a state of the device.

In some embodiments, the status information includes (9034) information associated with an ongoing event that has periodic updates. For example, for a sports game, the status information includes a score and optionally timing information (e.g., time remaining in a quarter or half), as illustrated in FIGS. 5BM1-5BM2. Displaying, in the status region, information updates for an ongoing event reduces the number of inputs and the amount of display area needed for viewing such information using the device.

In some embodiments, the status information includes (9036) navigation instructions. For example, the status information provides step-by-step directions to navigate to a selected destination, wherein a next step is displayed in the status information, as described with reference to FIGS. 5BF-5BG. Displaying navigation instructions in the status region reduces the amount of display area needed for using the device to perform navigation.

In some embodiments, the status information includes (9038) an indication of a battery level of the computer system. In some embodiments, the status of the batter comprises a system alert indicating a low battery in accordance with a determination that the computer system has less than a threshold amount of battery remaining (e.g., 5%, 10%, or 20%). In some embodiments, the status information that includes a status of the battery of the computer system is displayed in response to determining that the computer system has less than a threshold amount of battery remaining and is distinct from a battery status that is optionally displayed regardless of a current amount of battery (e.g., the battery indicator displayed in the status bar outside of the first display region is distinct from the status information that includes the status of a battery of the computer system). In some embodiments, the status of the battery of the computer system includes a textual indication, such as "low battery" and/or an icon displayed (e.g., an empty battery icon and/or a red battery icon), as illustrated in session 5040n in FIG. 5BL. Displaying, in the status region, battery status information reduces the number of inputs and the amount of display area needed for viewing feedback about a state of the device.

In some embodiments, the status information includes (9040) an indication of the computer system participating in one or more hotspot connections. In some embodiments, the status information is displayed in accordance with a determination that the computer system is acting as a hotspot, wherein a second computer system is connected to the hotspot. In some embodiments, the status information is displayed in accordance with a determination that the computer system is linked to a second computer system that is acting as a hotspot, for example, as illustrated in session 5040q of FIG. 5BL. Displaying, in the status region, information about hotspot connection status reduces the number of inputs and the amount of display area needed for viewing feedback about a state of the device.

In some embodiments, the computer system displays (9042), in a third display region of the display area, wherein the third display region is between a first sensor region of the one or more sensor regions and a second sensor region of the one or more sensor regions, a second user interface object that includes second status information. In some embodiments, the second user interface object includes second status information for any of the various types of status information described herein, so long as the second status information in the second user interface object is a different type from the status information displayed elsewhere in the first user interface object. In some embodiments, the first sensor region corresponds to a camera and the second sensor region corresponds to another sensor. In some embodiments, a respective sensor region includes a plurality of sensors (e.g., the second sensor region includes a biometric sensor and another sensor). In some embodiments, the first user interface object encompasses the second user interface object. In some embodiments, the first display region encompasses the third display region. In some embodiments, the second status information includes privacy indicator 518 (FIG. 5E) that is optionally displayed in accordance with a camera, microphone, or other sensor currently collecting data and/or a lock icon 5008 (FIG. 5AY-5AZ) that is displayed between the sensor cutouts. Concurrently displaying different types of status information in the status region further reduces the number of inputs and the amount of display area needed for viewing feedback about a state of the device by providing feedback about the states of multiple aspects of the device at the same time.

In some embodiments, the second status information includes (9044) a privacy indicator that is displayed in accordance with a determination that a microphone or a camera of the computer system is currently collecting data, for example as described with reference to privacy indicator 518 in FIG. 5E. Displaying, in the status region, a privacy indicator provides improved security and privacy by alerting the user that the microphone and/or camera of the computer system are active and enabled to collect data.

In some embodiments, the second status information includes (9046) a lock icon representing a lock state of the computer system. In some embodiments, in accordance with a determination that the computer system is locked, the lock icon appears as a closed lock icon 5008, for example as described with reference to FIG. 5AY. In some embodiments, in accordance with a determination that the computer system is unlocked, the lock icon 5008 appears as an open lock, as illustrated in FIG. 5AZ. Displaying, in the status region, a lock icon indicating whether the computer system is locked or unlocked provides improved security and privacy by providing feedback about the lock status of the device.

In some embodiments, the third display region of the display area is displayed (9048) with a background color that encompasses the second user interface object. In some embodiments, the background color is selected as a color that matches the one or more sensors, as described with reference to FIG. 5A. In some embodiments, the background color is maintained without displaying the second user interface object (e.g., no user interface object is displayed between the two sensors). For example, behind the privacy indicator 518 and/or behind the lock icon 5008, the background of the region between the sensor cutouts is displayed with a same color as the session region, and optionally the same color as the sensor region. Displaying the area between sensor regions with a uniform background color that is typically selected to match a color of the sensor regions and sensors therein causes the device to automatically reduce the visual intrusiveness of the display cutouts and improve the visual emphasis on information displayed in the area between and around the sensor regions.

In some embodiments, the second status information is displayed (9050) in the second user interface object in the third display region while (e.g., in accordance with a determination that) the first user interface object is displayed in a first state (e.g., a condensed state). In some embodiments, while the first user interface object is displayed in a second state (e.g., an expanded state, in which display of the first user interface object has been updated, as described herein, to a third user interface object that includes additional status information beyond the status information that was included in the first user interface object while the first user interface object was displayed in the first state), the computer system moves the second user interface object including the second status information to a fourth display region that is outside of the first display region (e.g., outside of the status region, which has optionally expanded to display the first user interface object in the second, often expanded, state). For example, in FIG. 5I, privacy indicator 518 is moved to a different portion of the user interface (optionally that is not between the sensor cutouts). In some embodiments, the fourth display region is encompassed by the second display region (e.g., in which an application user interface is displayed), and is separated from the first display region. For example, in FIG. 5I, privacy indicator 518 would be displayed outside of the session region 502-6. In some embodiments, display area within the session region that was used to display the second user interface object while the first user interface object was displayed in the first state is reallocated to the additional information displayed in the first user interface object while the first user interface object is displayed in the second state. Where the status region is used to display status information for multiple aspects of the computer system (e.g., active sessions of software applications and/or system software), when the status region is expanded to show additional information for a particular aspect of the computer system (e.g., a particular active session), moving status information about other aspects out of the status region causes the device to automatically allocate more display area to and improve the visual emphasis on the additional information for the particular aspect being featured.

In some embodiments, the computer system updates (9052) display of the first user interface object to display of a third user interface object, wherein the third user interface object includes additional status information provided by the respective software than the status information that is included in the first user interface object. In some embodiments, the third user interface object is a larger, or expanded, version of the first user interface object, for example as described with reference to FIGS. 5H-5I, session region 502-5 is expanded to session region 502-6. In some embodiments, the third user interface object (e.g., expanded session region 502-6) and the first user interface object (e.g., condensed session region 502-5) are associated with the same respective software that provides information about the state of the computer system. In some embodiments, the first user interface object is within a status region, wherein the status region can expand to display the third user interface object including the additional status information, optionally occluding content displayed in the second display region outside of the status region (e.g., session region 502-6 occludes a portion of the content displayed in user interface 501 (FIG. 5I)). Expanding the status region to include additional status information enables the user to view additional feedback about a state of the device in a consistent region of the display, thereby reducing an amount of time needed to perform a particular operation in the device.

In some embodiments, the first user interface object is updated (9054) to the third user interface object in response to detection of an event associated with the respective software. For example, in accordance with a determination that a next step in navigation instructions will occur within a predefined threshold (e.g., within 1 mile and/or within 2 minutes), the first user interface is expanded into the third user interface to display additional information for the next step in the navigation instructions. In some embodiments, in accordance with playback of a next media content item (e.g., one song ends and another song begins), as illustrated in FIGS. 5AI and 5AK, the first user interface object (e.g., session region 502-9) is automatically expanded to the third user interface object (e.g., session region 502-14). In some embodiments, in accordance with a timer ending, as described with reference to FIG. 5AY, the first user interface object automatically expands to the third user interface object (e.g., session region 502-17). In some embodiments, in accordance with a determination that the first user interface object is updated to the third user interface object in response to detection of an event associated with the respective software, the third user interface object automatically shrinks, for example after a predefined amount of time (e.g., after being displayed as expanded for 30 seconds) and/or after the event ends (e.g., the navigation step is completed), and the third user interface object automatically contracts back to the first user interface object. Expanding the status region to include additional status information in response to the occurrence of a software event causes the device to automatically present additional feedback about a state of the device when appropriate.

In some embodiments, the first user interface object is updated (9056) to the third user interface object in response to detection of the computer system being located within a predefined proximity of a wireless terminal, for example as described with reference to FIGS. 7A-7E. In some embodiments, detecting that the computer system is located within a predefined proximity (e.g., distance threshold) of a wireless terminal is based on detection of a short-range wireless signal emitted by the wireless terminal (e.g., Bluetooth, near-field communication (NFC), radio-frequency identification (RFID), or other short range communication protocol). In some embodiments, the first user interface object represents a stored secure credential, such as a payment method (e.g., a credit card, debit card, or other transactional financial account), an identification card (e.g., a passport, driver license, health record card, or other form of identification), or a wireless entry key (e.g., for a vehicle, building, or other access-controlled location). In some embodiments, in response to the computer system being brought into proximity with the wireless terminal, the secure credential is transmitted to the wireless terminal for use by the wireless terminal to authenticate the user of the computer system (e.g., to verify the user's identity, to make a payment or other transaction, or to unlock a door). Expanding the status region, in response to detecting that the computer system has been brought into proximity with a wireless terminal (e.g., for presenting a secure credential), to include additional status information indicative of communication with the wireless terminal (e.g., the presentation of the secure credential) provides improved security and privacy by providing feedback in situations involving transfer of secure information about the user of the computer system.

In some embodiments, the first user interface object is updated (9058) to the third user interface object in response to detecting a first type of user input, for example user input 522-2 in FIG. 5H causes the session region 502-5 to expand to session region 502-6, as illustrated in FIG. 5I. In some embodiments, the user input is a long press (e.g., a touch and hold input) or a drag input. In some embodiments, a second type of user input (e.g., a tap input) causes the computer system to replace display of the first user interface object with display of an application view for the respective software. For example, in response to the second type of user input, the application for the respective software is launched and displayed, in the second display region. Expanding the status region to include additional status information in response to a user input, particularly a user input that is directed to the status region, reduces the number of inputs needed to access additional feedback about a state of the device.

In some embodiments, in accordance with a determination that the first user interface object is updated to the third user interface object in response to detecting the first type of user input, the computer system provides (9060) non-visual feedback to the user. In some embodiments, the non-visual feedback includes audio and/or tactile outputs, as described with reference to FIGS. 5H-5I and FIG. 5AY, while the session region is expanded. In some embodiments, the non-visual feedback is provided while the first user interface object is replaced with the third user interface object (e.g., during an animated transition between the first user interface object and the third user interface object). In some embodiments, the non-visual feedback is provided after displaying the third user interface object. Providing non-visual feedback when expanding the status region in response to a user input causes the device to automatically indicate when the status region is responding to user input regardless of the nature of the visual feedback.

In some embodiments, in accordance with a determination that the first user interface object is updated to the third user interface object in response to detection of an event associated with the respective software (and/or in accordance with a determination that the first user interface object is updated to the third user interface object without detecting the first type of user input), the computer system forgoes providing (9062) non-visual feedback to the user, for example, as described with reference to FIG. 5AY as session region 502-17 expands in accordance with a timer ending, without detecting a user input requesting to expand the session region. Forgoing providing non-visual feedback when automatically expanding the status region in response to a software event causes the device to automatically indicate when the expanding of the status region is caused by an event other than a user input.

In some embodiments, displaying the third user interface object includes (9064) displaying one or more user-selectable controls for controlling the respective software. In some embodiments, the one or more user-selectable controls are displayed at different regions within the third user interface object, for example the controls 530-1 through 530-3 for controlling the communication session, illustrated in FIG. 5I. Displaying, in the expanded status region, one or more user-selectable controls for controlling the respective software reduces the number of inputs needed to perform operations associated with the respective software.

In some embodiments, the third user interface object is displayed (9066) at a portion of the user interface proximate to a portion of the user interface at which the first user interface object was displayed. In some embodiments, the third user interface object expands from, and proximate to, the first user interface object. For example, as illustrated in FIG. 5I, the expanded session region 502-6 is expanded outward and downward from the condensed session region 502-5. Expanding the status region proximate to the unexpanded (e.g., minimized) status region enables the user to view the additional status information in a consistent region of the display, thereby reducing an amount of time needed to perform a particular operation on the device.

In some embodiments, while displaying the first user interface object, in response to detecting a user input corresponding to any portion of the first user interface object, the computer system performs (9068) a first action. In some embodiments, the first action is expanding the first user interface object to the third user interface object. In some embodiments, while displaying the third user interface object, in response to detecting a user input on a first portion of the third user interface object, the computer system performs a second action, and in response to detecting a user input on a second portion of the third user interface object, performs a third action distinct from the second action. In some embodiments, the third user interface object has multiple controls, each control corresponding to a different action. For example, a phone call expanded version allows the user to mute, hang up the phone call, put on speaker, add a call, or initiate a video call, whereas an input on any portion of the first user interface object (e.g., the minimized session of the phone call) causes the device to either expand the user interface object (to the third user interface object) or to open the application associated with the first user interface object, depending on the type of input (e.g., tap versus long press) without regard to which portion of the first user interface object the input occurs. For example, as described with reference to FIGS. 5K-5M, the user is enabled to select a respective control by lifting off the user input (e.g., user input 528-1, user input 528-2 or user input 528-3) over the respective control to cause the device to perform an operation associated with the respective control. Performing a respective action in response to a user input corresponding to any portion of the unexpanded status region reduces an amount of time needed to perform a particular operation on the device, whereas performing one of multiple possible actions in response to a user input corresponding to a particular portion of the expanded status region, in which different portions are associated with different actions, reduces the number of inputs needed to access and perform different operations on the device.

In some embodiments, in response to detecting the first type of user input (such as a long press, a drag, a swipe, or other gesture), the computer system displays (9070) the third user interface object without displaying a user interface for an application associated with the respective software. For example, in FIG. 5I, expanded session region 502-6 is displayed without displaying an application user interface for the communication application. Expanding the status region in response to a first type of user input reduces the number of inputs needed to access additional status information and/or perform operations of the respective software associated with the status region.

In some embodiments, in response to detecting a second type of user input (such as a tap or other gesture) on a portion of the third user interface object (e.g., that does not correspond to a control), the computer system displays (9072) a user interface for an application associated with the respective software and, optionally, ceases display of the third user interface object. For example, a user input 591 directed to the expanded session 502-14 (FIG. 5AM) causes the device to open the application associated with the expanded session (e.g., display user interface 570 for the music application in FIG. 5AN). Displaying an application user interface associated with the respective software associated with the status region, in response to a user input directed to the status region, reduces the number of inputs needed to perform a particular operation on the device.

In some embodiments, while the first type of user input is ongoing, the computer system displays (9074) the third user interface object, detects an end of the first type of user input at a portion of the third user interface object that corresponds to a control, and in response to detecting the end of the first type of user input at a portion of the third user interface object that corresponds to a control, performs an operation corresponding to the control. For example, lifting off at a first location, the system performs a first operation corresponding to the control. In some embodiments, in response to detecting an end of the user input (e.g., lift off), an operation for controlling the application is performed without opening the application, as described with reference to user inputs 528-1 through 528-3 in FIGS. 5K-5M. Where a status region was expanded in response to an ongoing input to include one or more controls for performing operations of respective software associated with the status region, performing an operation corresponding to the control at which the input ends enables the same user input to be used first to expand the status region and then to select a subsequently-displayed control, thereby reducing the number of inputs and the amount of time needed to perform a particular operation on the device.

In some embodiments, while the first type of user input is ongoing, the computer system displays (9076) the third user interface object, detects the first type of user input at a portion of the third user interface object that corresponds to a control, and provides an output indicating that the first type of user input is at a portion of the third user interface object that corresponds to a control. In some embodiments, the output is a non-visual output, for example an audio and/or haptic output. In some embodiments, the output is distinct from the non-visual output generated while the third user interface object is expanded or in conjunction with expanding to the third user interface object. For example, as user input 528-1 passes over control 530-3 in FIG. 5K, an audio and/or haptic output is provided to indicate the user input 528-1 is positioned over a control. Providing an output indicating when an ongoing user input is over a control provides feedback about a state of the device by indicating that the portion of the user interface at which the input is positioned is interactive (e.g., and can be activated by lifting off or otherwise ending the input), which may be particularly helpful when the control is visually obscured by the user's finger (e.g., in touchscreen or other direct manipulation implementations).

In some embodiments, while the first type of user input is ongoing, the computer system displays (9078) the third user interface object and detects an end of the first type of user input at a respective portion of the third user interface object that corresponds to a respective control. In some embodiments, in response to detecting the end of the first type of user input, in accordance with a determination that the end of the first type of user input is at a portion of the third user interface object that corresponds to a first control, the computer system performs a first operation corresponding to the first control. In some embodiments, in accordance with a determination that the end of the first type of user input is at a portion of the third user interface object that corresponds to a second control, the computer system performs a second operation, distinct from the first operation, corresponding to the second control. For example, lifting off at a first location, the system performs a first operation corresponding to the control, such as muting and/or unmuting a microphone during a telephone call (e.g., user input 528-1 (FIG. 5K) selects mute control 530-3). In some embodiments, the system performs a second operation distinct from the first operation if the user input lifts off at a second location corresponding to a second control, such as initiating a video call from the telephone call (e.g., user input 528-2 (FIG. 5L) selects control 530-2). In some embodiments, additional and/or controls are displayed, optionally for different applications that are active in the session region, and lifting off on any of the controls causes the computer system to perform an operation associated with the respective control (e.g., hanging up a telephone call, skipping forward in music, pausing music, pausing a timer, and/or stopping a voice recording). In some embodiments, in response to detecting an end of the user input (e.g., lift off), an operation for controlling the application is performed without opening the application, as described with reference to FIGS. 5K-5M. Where a status region was expanded in response to an ongoing input to include one or more controls for performing operations of respective software associated with the status region, performing an operation corresponding to the control at which the input ends, where different operations would be performed if the input were to end at different controls, presents different interaction options simultaneously, which reduces the number of inputs and the amount of time needed to perform operations on the device.

In some embodiments, in response to detecting a user input that overlaps with at least a portion of the first display region, in accordance with a determination that an active session is displayed in the first display region and in accordance with a determination that the user input is a third type of user input, the computer system updates (9080) display of the first user interface object to display the third user interface object. In some embodiments, in accordance with a determination that an active session (e.g., a first user interface object that includes status information provided by respective software) is displayed in the first display region and in accordance with a determination that the user input is a fourth type of user input, the computer system displays a user interface associated with the application for the active session. In some embodiments, in accordance with a determination that there is not an active session displayed in the first display region, the computer system displays a fourth user interface object in the first region (optionally the fourth user interface object does not include information (e.g., the fourth user interface object is a black color that expands out from the first user interface object, as illustrated in FIGS. 5N-5O)). For example, in FIG. 5N, there is no active session in session region 502-1, and user input 532 causes the device to animate the session region 502-1*b* (FIG. 5O), and in FIG. 5J, there is an active session in session region 502-5, and user input 528 causes the device to display expanded session region 502-6. In some embodiments, the fourth user interface object is an expanded version of the sensor regions that automatically shrinks after a predetermined amount of time (e.g., regardless of the type of input that is detected). In some embodiments, expanding the third user interface object in the first display region includes expanding the third user interface object around the one or more sensor regions (as part of a same user interface object as the first user interface object) in accordance with a determination that the device is in portrait mode. In some embodiments, expanding the third user interface object comprises displaying a separate user interface object in accordance with a determination that the device is in landscape mode. Disambiguating based on the type of user input as well as whether the status region is associated with an active session, to determine whether to expand the status region to include additional information, display an associated application user interface, or display other feedback enables different types of operations associated with the status region to be performed without displaying additional controls.

In some embodiments, in response to detecting a user input in the first display region corresponding to a respective user interface object that includes status information provided by respective software, the computer system displays (9082) an application user interface for the respective software in the second display region of the display generation component, and optionally ceases display of the respective user interface object. For example, as described with reference to FIG. 5AL, user input 590 causes the device to open a user interface of the respective application (e.g., user interface 570 for the music application) associated with session region 502-9, as illustrated in FIG. 5AN. Displaying an application user interface associated with the respective software associated with the status region, in response to a user input directed to the status region, reduces the number of inputs needed to perform a particular operation on the device.

In some embodiments, in accordance with a determination that the computer system is in a first orientation (e.g., portrait mode, referring to a mode in which the computer system or at least the display generation component is oriented vertically, or upright, for example so as to be more tall than wide), the computer system displays (9083) the first user interface object in the first display region that encompasses the one or more sensor regions. In some embodiments, in accordance with a determination that the computer system is in a second orientation (e.g., a landscape mode, referring to a mode in which the computer system or at least the display generation component is oriented horizontally, or sideways, for example so as to be more wide than tall), the computer system displays the first user interface object in a portion of the first display region that is distinct from a portion of the first display region that encompasses the one or more sensor regions, as illustrated in FIG. 5BI (e.g., portion 502-25 is distinct from portion 502-24 and portion 502-26 of the session region) and FIG. 5BK. In some embodiments, the first display region includes a plurality of portions, wherein at least one portion encompasses the one or more sensor regions and another portion is displayed as a distinct user interface element (e.g., a separate bubble) in the first display region. In some embodiments, the portion of the first display region (e.g., portion 502-24) that is distinct from the portion of the first display region that encompasses the one or more sensor regions is adjacent to the one or more sensor regions. Displaying status information in display area surrounding one or more sensor regions while the computer system is in portrait mode, versus displaying the status information in display area adjacent to yet distinct from the status region that includes one or more sensor regions, causes the device to automatically adjust how the status information is presented based on the device orientation, to present the status information in a more legible way and to make more efficient use of the display area.

In some embodiments, while displaying the third user interface object, in accordance with a determination that a time threshold is satisfied, the computer system automatically contracts (9084) the third user interface object and displays the first user interface object. (e.g., shrinking the third user interface object (the expanded session) to the first user interface object (e.g., the minimized session)) In some embodiments, while shrinking the third user interface object, which decreases a size of the first display region, content displayed in the third user interface object is faded, and optionally moved in or shrunk down along with the third user interface object, or otherwise visually deemphasized to disappear before the content would appear to overlap with the one or more sensors. Automatically shrinking the expanded status region back to the unexpanded status region after a threshold amount of time (e.g., that the expanded status region has been displayed and/or since the user has interacted with the expanded status region) causes the device to automatically reduce the number of displayed controls and reduce clutter in the user interface when no longer likely to be needed.

In some embodiments, in response to detecting a user input outside of the first display region, the computer system automatically contracts (9086) the third user interface object and displays the first user interface object. In some embodiments, a tap input outside of the session region causes the user interface object to return to the minimized version (e.g., first user interface object) from the expanded version (e.g., third user interface object). In some embodiments, the user is not enabled to interact with one or more user interface objects that are displayed in the second region of the display generation component while the third user interface object is displayed. For example, while the session region is in the expanded mode, optionally, the second display region is not responsive to user inputs such that a user input received in the second display region causes the third user interface object to shrink down to the first user interface object, without performing an action that corresponds to the location of the received user input, as described with reference to FIG. 5I, user input 526 directed to a portion of user interface 501 that is outside of session region 502-6 causes the session region to condense to session region 502-5, optionally without causing the device 100 to launch an application associated with icon 438 where the input was detected. Shrinking the status region back to the unexpanded status region in response to detecting a user input outside of the display area where the status region is displayed enables the expanded status region to be dismissed without displaying additional controls, and avoids accidental interaction with content outside of the status region.

In some embodiments, while displaying the third user interface object (e.g., session region 502-3), the computer system displays (9088) a shadow (e.g., shadow 514-1, FIG. 5D) proximate to the third user interface object, wherein the shadow overlaps content displayed in the second display region of the display generation component. In some embodiments, the shadow is displayed with more prominence (e.g., a darker shade, and/or a larger area) while the session region is larger, and is displayed with less prominence while the session region is smaller. For example, different applications cause the third user interface object to be displayed at different sizes. In some embodiments, the size of the third user interface object is determined by the controls and/or information displayed in the third user interface object for the respective application, and the shadow is more prominent with a larger third user interface object (e.g., for a first application) than the shadow for a smaller third user interface object (e.g., for a second application). Displaying a shadow proximate to the expanded status region and overlapping displayed content outside of the status region causes the device to automatically give visual emphasis to the expanded status region and visually deemphasize the content outside of the status region (which in some embodiments is not interactive while the status region is expanded), thereby also providing feedback about a state of the device.

In some embodiments, the computer system displays (9090) a border that encompasses the first user interface object that is displayed in the first display region. In some embodiments, the border is displayed with a color that corresponds to the respective software that provides the status information displayed in the first user interface object. For example, as described with reference to FIG. 5AG, portion 502-8 of the session region is displayed with a first border and portion 502-9 of the session region is displayed with a second border having a color based on the application associated with the portion 502-9 of the session region. In some embodiments, the border that encompasses the first user interface object is described with reference to method 1500. Displaying a border that encompasses the status region causes the device to automatically delineate the status region from other displayed content.

In some embodiments, the computer system displays (9092) the first user interface object with a background color that matches a color of the one or more sensors positioned within the one or more sensor regions and increases a size of the first user interface object, including expanding the background color outward from the one or more sensor regions. In some embodiments, the first user interface object is increased in size until it is displayed as the third user interface object, wherein the third user interface object is an expanded version of the first user interface object. In some embodiments, a background of the session region is a same color as the one or more sensor regions (e.g., the session region obscures a size, shape, and/or location of the one or more sensor regions), as described with reference to FIG. 5A. Where a background color of the status region matches a color of the one or more sensors positioned in the sensor regions encompassed by the status region, expanding the background color outward from the one or more sensor regions when expanding the status region causes the device to automatically maintain reduced visual intrusiveness of the sensor regions and give a consistent appearance to the status region as a whole.

In some embodiments, the computer system displays (9094) status information in the third user interface object, wherein the status information in the third user interface object includes visual elements that are selected so as to avoid overlapping locations of the one or more sensors in the first display region. In some embodiments, the expanded session region has location of content (e.g., images/text) selected to avoid sensor regions within the session region. For example, in FIG. 5I, the status information and/or controls are arranged within the session region 502-6 to avoid overlap with the sensor cutouts. Displaying, in the status region, visual status information elements that are selected so as to avoid overlapping sensor regions within the status region causes the device to automatically reduce the visual intrusiveness of the sensor regions and make more efficient use of the display area, as well as automatically optimize the placement of the status information to avoid truncation or distortion of the status information.

In some embodiments, the computer system displays (9096) an animation for a respective application, wherein displaying the animation includes initially displaying a fifth user interface object in a display area that is between the one or more sensor regions (e.g., as illustrated in session region 702-2, FIG. 7B1), increasing a size of the fifth user interface object to a position that overlaps the one or more sensor regions, wherein the fifth user interface object is optionally occluded by, or otherwise appears hidden behind, the one or more sensor regions, and displaying the fifth user interface object (e.g., at its maximum size) in the second display region while decreasing a size of the first display region that encompasses the one or more sensor regions. In some embodiments, the animation of the fifth user interface object starts from between sensors, moves under sensors as session region expands and then moves to the side of sensors as session region contracts (e.g., card authentication). In some embodiments, the animation further includes displaying the fifth user interface object as animated, such that the fifth user interface object expands and/or rotates, wherein the fifth user interface object initially fits between the sensors, and after expanding outside of the first display region, additional information is displayed in the fifth user interface object. In some embodiments, the animation further includes displaying, in accordance with a determination that the application has verified an activity, a graphical element (e.g., a green check mark) in the first display region on the left and/or right side of the one or more sensor regions. In some embodiments, the fifth user interface object is the representation of a stored card, and the animation is the animation described with reference to FIGS. 7A-7E. When using an animation to indicate status of a respective application associated with the status region, displaying an animation of a visual element that appears or expands from between sensor regions encompassed by the status region and that proceeds to move around the sensor regions causes the device to automatically reduce the visual intrusiveness of the sensor regions and make more efficient use of the display area, as well as automatically optimize the placement of the status information to avoid truncation or distortion of the status information, while providing feedback about a state of the device.

In some embodiments, the computer system detects (9098) one or more user inputs that are provided on the one or more sensor regions. In some embodiments, the one or more user inputs partially overlap a portion of the one or more sensor regions and/or a portion of the first display region. For example, a user's finger touches both a sensor region and a portion of the display that encompasses the sensor region. For example, user input 522 in FIG. 5F and user input 532 in FIG. 5N overlap the one or more sensors that are positioned within the sensor cutouts. Making the status region responsive to user inputs that are provided on the one or more sensor regions encompassed within the status region increases the amount of touch-sensitive area available for detecting inputs directed to the status region, so that the user need not be as precise in providing inputs to the status region, which reduces the amount of time needed to perform an operation associated with the status region.

In some embodiments, while the first display region does not include a user interface object, the computer system displays (9100) in the second display region, one or more status indicators (e.g., or other user interface objects), and in accordance with a determination that the first user interface object is displayed in the first display region, ceases to display at least one of the one or more status indicators. In some embodiments, the one or more status indicators include time, network connectivity, WIFI connectivity, battery status, mobile carrier, unread notifications, and/or shortcut to frequently accessed applications or device functions. For example, as described with reference to FIGS. 5D-5F, while session region 502-3 is expanded, none of the indicators 503, 506 or 505 are displayed and/or one or more of the indicators are not displayed. In some embodiments, a subset, less than all, of the status indicators are displayed, for example indicators 503 and 506 are displayed in FIG. 5E, without displaying indicator 505. In some embodiments, one or more status indicators remain displayed, and are optionally repositioned within the display, such as a privacy indicator 518 is repositioned optionally outside of the session region. Ceasing to display one or more of the status indicators that are outside of the status region when the status region is displayed or expanded causes the device to automatically reduce clutter in the user interface and make more efficient use of the display area.

In some embodiments, the computer system determines (9102) whether a first status indicator or a second status indicator corresponds to an active connection and in accordance with a determination that the first status indicator corresponds to the active connection and that the second status indicator does not correspond to the active connection, continues to display the first status indicator and ceases display of the second status indicator. For example, while the computer system is connected via multiple types of protocols, such as Wi-Fi and cellular, connection status indicators representing each protocol are displayed in the second display region (e.g., outside of the status region). In this example, in accordance with the status region being expanded (e.g., due to displaying the first user interface object), such that there is insufficient display area for all of the connection status indicators: if the computer system is actively communicating over Wi-Fi instead of a cellular network, the Wi-Fi status indicator remains displayed in the second display region whereas the cellular status indicator ceases to be displayed; if the computer system is actively communicating over the cellular network rather than Wi-Fi, the cellular status indicator remains displayed whereas the Wi-Fi status indicator ceases to be displayed. For example, as described with reference to FIGS. 5E-5F, indicator 503 is replaced with indicator 505 in accordance with the type of connection that is currently in use. Ceasing to display one connection status indicator while continuing to display another, particularly where the connection status indicator that continues to be displayed represents the communication protocol that the computer system is actively using for communication, causes the device to automatically reduce clutter in the user interface and provide feedback about a state of the device that is more relevant to the current context.

In some embodiments, in accordance with a determination that the first user interface object in the first display region is to increase in size (e.g., to the third user interface object or expanded version of the first user interface object), the computer system ceases to display (9104) one or more additional status indicators of the one or more status indicators. In some embodiments, all of the status indicators are no longer displayed. In some embodiments, the number of status indicators that are removed is selected in accordance with a size of the respective user interface object that is currently displayed in the first display region. For example, in FIG. 5D, while session region 502-3 is expanded to overlap the status indicators 503, 504, and 505, all of the status indicators are not displayed. Ceasing to display more of the status indicators that are outside of the status region when the status region is further expanded causes the device to automatically reduce clutter in the user interface and make more efficient use of the display area.

In some embodiments, the first user interface object is displayed (9106) with a background color that matches a color of the one or more sensors positioned within the one or more sensor regions. In some embodiments, the first user interface object has a border that is a different color. In some embodiments, the corner curvature of the first user interface object (e.g., whether expanded or condensed) matches corner curvature of the display area, as described with reference to FIG. 5A. Displaying the status region with a background color that matches a color of the one or more sensors positioned in the sensor regions encompassed by the status region causes the device to automatically reduce the visual intrusiveness of the sensor regions and give a consistent appearance to the status region as a whole.

In some embodiments, the computer system detects (9108) a user input corresponding to a request to display a user interface for a respective application (e.g., that is distinct from respective software corresponding to the first user interface object), and in response to detecting the user input corresponding to the request to display a user interface for the respective application, displays the user interface for the respective application in the second display region. In some embodiments, the computer system continues to display the first user interface object in the first display region, wherein the first user interface object includes updated status information. In some embodiments, the computer system continues to display the second user interface object in the first display region if there are two active sessions (e.g., the first UI object and the second UI object remain displayed). In some embodiments, if a user interface object was displayed for the respective application, the computer system ceases display of the user interface object for the respective application while the user interface for the respective application is displayed in the second display region. For example, as described with reference to FIG. 5AN-5AO, while user interface 570 for the music application is displayed, the session region 502-9 for the active media playback session is no longer displayed, while the portions 502-8 and 502-15 of the session region for other active application sessions continue to be displayed. Continuing to display and update the status region for an active session while detecting user inputs outside of the status region interacting with other aspects of the computer system, such as to display and interact with a user interface for a different application than that of the active session, reduces the number of inputs needed to view status information for the active session while making more efficient use of the display area.

In some embodiments, the computer system detects (9110) a user input corresponding to a request to display a user interface for second respective software (e.g., user input 5002 and/or user input 5000 (FIG. 5AQ) and, in response to detecting the user input corresponding to the request to display a user interface for second respective software, displays the user interface for the second respective software in the second display region (e.g., wake screen user interface 5004 (FIG. 5AR1)). In some embodiments, the computer system continues to display the first user interface object (e.g., session region 502-16) in the first display region, wherein the first user interface object includes updated status information. In some embodiments, second respective software includes a home user interface, a wake user interface, a coversheet, an application switching user interface, a search user interface and/or widgets user interface. In some embodiments, optionally another user interface object ceases to be displayed in the first display region (e.g., portion 502-9 of the session region is no longer displayed in FIG. 5AR1) and/or is displayed as a user interface object within the second display region (e.g., as user interface element 5006 in wake screen user interface 5004). Continuing to display and update the status region for an active session while detecting user inputs outside of the status region interacting with other aspects of the computer system, such as to switch between application user interfaces and system user interfaces, reduces the number of inputs needed to view status information for the active session while making more efficient use of the display area.

In some embodiments, in accordance with a determination that the respective software is providing status information for a first event and a second event, the computer system switches (9112) display of the status information for the first event to display of the status information for the second event in the first user interface object displayed in the first display region. In some embodiments, the status information for the first event and the status information for the second event are alternated such that the status information for one event is displayed in the first user interface object at a given time. For example, the computer system ceases display of the status information for the first event and displays the status information for the second event. In some embodiments, the first event and the second event are distinct events associated with the same respective software (e.g., a same application). For example, two sports events that are concurrently active, or otherwise ongoing continue to be updated by the respective software (e.g., scores, time remaining, and/or other updates are provided for each event), are displayed in a same first user interface object that is associated with the respective software, as described with reference to FIGS. 5BM1-5BM2. In some embodiments, the status update for each respective event is displayed for a predetermined amount of time, before periodically switching to the status information for the other event. In some embodiments, more than two events are ongoing (e.g., three or more events are active), and the first user interface object alternates display of the status information for each ongoing event.) In some embodiments, while the first user interface object is displayed in a first state (e.g., a condensed state), the transitions (e.g., alternating or cycling) through status information for multiple events occurs automatically. In some embodiments, while the first user interface object is displayed in a second state (e.g., an expanded state, in which display of the first user interface object has been updated, as described herein, to a third user interface object that includes additional status information beyond the status information that was included in the first user interface object while the first user interface object was displayed in the first state), the transitions through status information for the multiple event occur in response to user inputs (e.g., the status information is transitioned manually, in that the status information for a respective event remains displayed until a user input for navigating through different sets of status information, such as a tap or swipe gesture or other input directed to the status region, is detected). While the status region includes status information for an active session and is in a condensed state, automatically cycling through status information for multiple events causes the device to automatically provide more status information without displaying additional controls or using more display area and without requiring additional user input. While the status region is in a more expanded state, cycling through status information for the multiple events in response to user input enables the user to manually control when and how long to view status information for a particular event when appropriate for the context (e.g., when implicitly requested via a user input to expand the status region and view more detailed status information) without displaying additional controls for doing so.

It should be understood that the particular order in which the operations in FIGS. 9A-9G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1300, 1400, 1500, and 1600) are also applicable in an analogous manner to method 9000 described above with respect to FIGS. 9A-9G. For example, the session regions and user inputs described above with reference to method 9000 optionally have one or more of the characteristics of the session regions and user inputs described herein with reference to other methods described herein (e.g., methods 1000, 1100, 1200, 1300, 1400, 1500, and 1600). For brevity, these details are not repeated here.

FIGS. 10A-10D are flow diagrams illustrating method 1000 of continuing to display updated status information in a status region while switching display between different user interfaces in accordance with some embodiments.

Method 1000 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

In some embodiments, the method 1000 is performed at a computer system that is in communication with a display generation component having a display area, wherein the display area includes a status region (e.g., also referred to herein as a session region, such as session region 502-1 in FIG. 5R). In some embodiments, the status region corresponds to a first display region of the display area. In some embodiments the status region is a cutout from the overall display area and in some embodiments forms an island in the surrounding display area.

The computer system displays (1002), in display area outside of the status region (e.g., in a second display region of the display area), a first user interface (e.g., user interface 536-2, FIG. 5R) that includes a user interface of a respective application executing on the computer system, including, updating the user interface of the respective application in accordance with one or more changes in a state of the respective application. In some embodiments the user interface of the respective application is displayed in an application user interface region that optionally adjoins and surrounds the status region (e.g., the boundary of the status region forms an interior boundary of a second display region where the user interface of the respective application is displayed). In some embodiments the user interface of the respective application is displayed over substantially all (e.g., greater than 80%, 85%, 90%, or 95%) of the display area outside of the status region. In some embodiments the user interface of the respective application is displayed over less than all (e.g., between 20% and 80%) of the display area outside of the status region, such as in a widget region (e.g., the first user interface being a wake screen user interface, also sometimes called a lock screen user interface if displayed while the computer system is in a locked state with the display generation component active, and that includes one or more widget regions for respective application user interfaces) that optionally does not surround the status region (e.g., the boundary of the status region is not within the boundary of a second display region occupied by the user interface of the respective application). In some embodiments, the computer system continually updates the first user interface to reflect ongoing changes in the state of the respective application. For example, a user interface of a map application operating in a navigation mode is updated as navigation progresses (e.g., to show successive steps during turn-by-turn navigation or updates to a delivery or updates to a ride of a ride share service). In another example, a user interface of a music or podcast application is updated with playback information about the content currently being played (e.g., as playback progresses through one or more audio tracks). In yet another example, a user interface of a stopwatch or timer application (e.g., a clock application, in a stopwatch, alarm, or timer mode) is updated as the stopwatch counts up or the timer counts down, respectively.

The computer system detects (1004) a user input (e.g., user input 538, FIG. 5R) corresponding to a request to dismiss the first user interface. In some embodiments, the user input comprises a request for display of a different user interface that is in some embodiments associated with different software, such as a home screen user interface that is associated with system software, such as an application launcher or operating system, instead of an application user interface or a wake screen or cover sheet user interface.

The computer system, in response to detecting the user input corresponding to the request to dismiss the first user interface, ceases (1006) to display, in the display area outside of the status region, the first user interface that includes the user interface of the respective application, and while the state of the respective application continues to change (e.g., while the respective application remains active), displays, in the status region, an indication of a current state of the respective application (e.g., session region 502-7, FIG. 5S, optionally by displaying a subset of elements from the first user interface of the respective application). In some embodiments the displayed indication continues to be updated in accordance with further change in the state of the respective application (e.g., as illustrated in FIGS. 5S-5AA, the session region 502-7 continues to update a time remaining for the active timer session). In some embodiments the status region dynamically changes in size, expanding as needed to accommodate the current state indication being displayed while optionally remaining an island within the surrounding display area. In some embodiments the user interface of the respective application is minimized and replaced with the representative current state indication in the status region in response to detecting the user input corresponding to the request to dismiss the first user interface. In some embodiments the minimized user interface of the respective application is restored (e.g., to display area that is outside of the status region) in response to a first type of user input (e.g., a long press and hold or a tap input) directed to the status region. In some embodiments, in response to a second type of user input (e.g., distinct from the first type of user input), a size of the status region is increased and additional information (e.g., or controls) for the respective application are displayed in the status region. For example, the status region displays a subset of the navigation, album/track/playback, stopwatch or timer information that otherwise would have been displayed in the larger maps, music or podcast, or clock user interface, respectively (e.g., a smaller subset prior to detecting the second type of user input, and a larger subset in response to detecting the second type of user input). The computer system displays, in the display area outside of the status region (e.g., in a third display region of the display generation component that is optionally different from the second display region), a second user interface that is associated with respective software that is different from the respective application (e.g., user interface 500 for a messaging application is displayed outside of session region 5027-, FIG. 5S). In some embodiments, the respective application is system software, such as an application launcher or operating system, or a third software application that is different from the first software application and from the second software application. In some embodiments the second user interface is displayed in the same display area outside of the status region as was the first user interface, and optionally in the same display area outside of the status region as was the user interface of the respective application. In some embodiments the second user interface is displayed in more of the display area outside of the status region than was the user interface of the respective application (e.g., the user interface of the respective application was displayed only within a widget region that partially occupies the display area outside of the status region, and the second user interface is displayed over substantially all of the display area outside of the status region).

The computer system detects (1008) a user input (e.g., user input 540, FIG. 5S) to navigate from the second user interface that is associated with respective software that is different from the respective application to a third user interface.

The computer system, in response to detecting the user input to navigate from the second user interface, displays (1010) the third user interface (e.g., user interface 542 for a web browser application, FIG. 5T) in the display area outside of the status region while continuing to display, in the status region, the indication of a current state of the respective application. For example, the current state of the respective application is maintained in the status region while the user navigates between other user interfaces, including other application user interfaces and/or other system user interfaces (e.g., a home user interface, a wake screen user interface). When navigating away from a user interface of an application that is displayed outside of a status region, transitioning to displaying status information about the application in the status region enables the user to continue to view the status information while the application is actively updating, thereby reducing the number of inputs and the amount of display area needed for viewing feedback about a state of the device.

In some embodiments, the first user interface of the respective application is (1012) an application view of the respective application. For example, user interface 536-2 in FIG. 5R is an application view for the timer, or clock, application. In some embodiments, the application view comprises and expanded, maximized and/or full screen view that takes up the display area that is outside of the status region. Transitioning from displaying an application user interface outside of the status region to displaying status information about the application in the status region reduces the number of inputs and the amount of display area needed for viewing feedback about a state of the device.

In some embodiments, the first user interface of the respective application is (1014) a user interface element corresponding to the respective application that is displayed in a user interface that is displayed as a wake screen. For example, in FIG. 5AR1, an active session for the music application is displayed as user interface element 5006 (e.g., displayed on the wake screen user interface 5004), and in response to a user input (e.g., user input 5016, FIG. 5AU) to navigate to another user interface (e.g., the home screen or scrolling past a certain point within the wake screen), the music session is minimized into the status region (e.g., as portion 502-9 of the session region, FIG. 5AV) while displaying the other user interface. Transitioning from displaying an application user interface in a portion of a wake screen outside of the status region to displaying status information about the application in the status region when the wake screen is dismissed reduces the number of inputs and the amount of display area needed for viewing feedback about a state of the device while enabling the user to use the display area outside of the status region to access other aspects of the device.

In some embodiments, the second user interface that is associated with respective software that is different from the respective application comprises (1016) a home user interface of the operating system of the computer system. In some embodiments, the home user interface (e.g., home screen user interface 501) includes representations of a plurality of applications (e.g., application icons) for navigating between applications executing on the computer system. In some embodiments, the home user interface includes different sizes of representations of a plurality of applications, such as widgets and application icons. Transitioning from displaying an application user interface outside of the status region to displaying status information about the application in the status region when transitioning to displaying a home user interface outside of the status region reduces the number of inputs and the amount of display area needed for viewing feedback about a state of the device while enabling the user to use the display area outside of the status region to access other aspects of the device.

In some embodiments, the second user interface that is associated with respective software that is different from the respective application comprises (1018) a user interface of a second application executing on the computer system. For example, the user is enabled to navigate between applications and/or to navigate between applications and user interfaces of software of the computer system (e.g., home user interfaces and wake screen user interfaces). For example, user input 540 (FIG. 5S) causes the device to display a user interface 542 for a web browser application. Transitioning from displaying an application user interface outside of the status region to displaying status information about the application in the status region when switching to displaying a user interface of a different application outside of the status region reduces the number of inputs and the amount of display area needed for viewing feedback about a state of the device while enabling the user to use the display area outside of the status region to access other aspects of the device.

In some embodiments, the status region encompasses (1020) one or more sensors of the computer system. In some embodiments, the one or more sensors are positioned within cutouts of the display area, as described with reference to FIG. 5A, session region 502-1 includes sensor cutouts, optionally wherein the sensor cutouts include at least optical sensors 164 and/or speaker 111. Displaying the status region around one or more sensor regions in which one or more sensors are positioned causes the device to automatically reduce the visual intrusiveness of the sensor regions and make more efficient use of the display area.

In some embodiments, the first user interface comprises (1022) a lock screen (also referred to herein as a wake screen, particularly a wake screen in a locked state) user interface, and detecting the user input corresponding to a request to dismiss the first user interface comprises detecting a gesture corresponding to a request to dismiss the lock screen user interface. For example, user input 5018 in FIG. 5AV is a request to dismiss wake screen user interface 5004-1. In some embodiments, the gesture is a swipe gesture that is initiated within a predefined distance of the bottom edge of the display. In some embodiments, the swipe gesture is an upward swipe gesture or a drag gesture. In some embodiments, the user input corresponding to the request to dismiss the first user interface includes a button press (e.g., of a hardware button, such as a home button to display a home user interface), or selection of a displayed affordance, such as a notification or alert (e.g., to display an application associated with the notification or alert). Transitioning from displaying a lock screen user interface outside of the status region in response to a particular gesture reduces the number of inputs needed to dismiss the lock screen user interface to access other aspects of the device.

In some embodiments, while detecting the gesture corresponding to a request to dismiss the lock screen user interface, the computer system displays (1024) the first user interface as moving in a direction of the gesture. For example, a swipe up gesture causes the first user interface to shift up in a same direction as the swipe gesture, as described with reference to FIG. 5AV. In some embodiments, the first user interface shifts at a rate that is proportional to an amount of movement of the gesture. For example, as the gesture progress from an initial position to an end position, the first user interface is displayed as sliding off the display generation component as if being dragged by the gesture. Where a lock screen user interface is dismissed from outside of the status region in response to a particular gesture, moving the lock screen user interface out of the display area in the direction of the gesture provides improved security and privacy by correlating the amount that the lock screen user interface is dismissed to the movement of the input.

In some embodiments, the gesture is (1026) a swipe gesture. For example, user input 5018 is a swipe gesture. In some embodiments, the gesture is a swipe gesture in a predefined direction, such as upward, downward, to the left, or to the right. Transitioning from displaying a lock screen user interface outside of the status region in response to a directional swipe gesture reduces the number of inputs needed to dismiss the lock screen user interface.

In some embodiments, the swipe gesture is (1028) initiated at an edge of the display generation component. In some embodiments, the edge is a bottom edge of the display. For example, user input 5018 is a swipe gesture from a bottom edge of the display. Transitioning from displaying a lock screen user interface outside of the status region in response to a directional edge swipe gesture enables the lock screen user interface to be dismissed using a distinctive system gesture and reduces the number of inputs needed to dismiss the lock screen user interface.

In some embodiments, in response to detecting the user input corresponding to the request to dismiss the first user interface, the computer system animates (1030) the first user interface that includes the user interface of the respective application as being displayed under the status region. In some embodiments, the first user interface is concurrently decreased in size and moves toward the status region. In some embodiments, after the smaller version of the user interface reaches the status region, the user interface appears to slide below the status region such that a portion of the user interface is occluded by the status region. For example, FIGS. 5BD-5BG illustrate an animation in which the user interface 5028-1 is animated as transitioning below session region 502-21. Displaying an animation of the user interface outside of the status region moving toward and underneath the status region when transitioning to displaying the status information in the status region indicates that the user interface that was outside of the status region will be represented in the status region, thereby providing feedback about a state of the device.

In some embodiments, animating the first user interface further includes (1032) shrinking the first user interface to a size that corresponds to the status region. In some embodiments, the first user interface shrinks to fit under the status region as the application is moving in the direction of the status region (e.g., shrinking while moving upward), as illustrated in FIG. 5BE. In some embodiments, the first user interface shrinks to a size at which a width of the first user interface is a same, or smaller, width as the current width of the session region. In some embodiments the shrinking of the first user interface during the animation occurs gradually by progressing through a plurality of intermediate states over time. Displaying an animation of the user interface outside of the status region shrinking while moving toward the status region when transitioning to displaying the status information in the status region indicates that the user interface that was outside of the status region will be represented in the status region, thereby providing feedback about a state of the device.

In some embodiments, shrinking the first user interface to a size that corresponds to the status region comprises (1034) shrinking the first user interface (optionally from all directions to maintain original proportions of the first user interface) to display a downscaled version of the first user interface, shifting the downscaled version of the first user interface upward, and after shifting the downscaled version of the first user interface upward, further shrinking the downscaled version of the first user interface (optionally from all directions) to the size that corresponds to the status region, as described with reference to FIG. 5BE. In some embodiments, the first user interface shrinks while moving the first user interface upwards. In some embodiments, the first user interface shrinks a predefined amount before moving toward the session region, and optionally shrinks an additional amount during and/or after moving toward the session region. Displaying an animation of the user interface outside of the status region shrinking and then moving toward the status region when transitioning to displaying the status information in the status region indicates that the user interface that was outside of the status region will be represented in the status region, thereby providing feedback about a state of the device.

In some embodiments, the computer system increases (1036) a size of the status region in a first direction, wherein the first direction is a same direction as the animation. For example, in FIG. 5BF, session region 502-22 is increased in size relative to session region 502-21, and optionally extends above a top edge of session region 502-21 (e.g., session region 502-22 is vertically extended to a top edge of the display). In some embodiments, after the first user interface is displayed under the status region, the status region expands upward (e.g., to a top edge of the display), as if ingesting the first user interface, before the status region shrinks down and is redisplayed with a nonzero distance between the top of the status region and the top edge of the display. When animating the application user interface outside of the status region toward the status region, displaying an animation of the status region temporarily expanding in the direction of the animation of the application user interface gives the visual effect of the status region absorbing the user interface, to indicate that the user interface that was outside of the status region will be represented in the status region, thereby providing feedback about a state of the device.

In some embodiments, the computer system increases (1038) a size of the status region in a perpendicular direction, wherein the indication of a current state of the respective application is displayed in the status region while the size of the status region is increased. For example, in FIG. 5BG, session region 502-23 is larger, in a horizontal direction, as compared to session region 502-21 in FIG. 5BE. During an animation of the user interface outside of the status region moving toward the status region and transitioning to status information displayed in the status region, temporarily expanding the status region perpendicular to a dimension in which the status region ultimately expands to display the status information gives the visual effect of the status region absorbing the user interface, to indicate that the user interface that was outside of the status region will be represented in the status region, thereby providing feedback about a state of the device.

In some embodiments, the status region is (1040) a predefined region of the display area. In some embodiments, the status region is a same predefined region for a system user interface, such as the home screen, and/or for one or more applications. For example, the status region comprises session region 502-1, that optionally includes a sensor region, as described with reference to FIG. 5A. As illustrated in FIG. 5BK, as an orientation of the device changes, the status region is maintained at the same predefined region, relative to hardware of the device. Displaying the status region in a predefined region of the display area while displaying different user interfaces of the computer system outside of the status region provides feedback about a state of the device in a consistent region of the display, thereby reducing an amount of time needed to perform a particular operation on the device.

In some embodiments, the status region is (1042) displayed at a predefined region of the display area while displaying a user interface for a first application or a user interface for a second application. In some embodiments, the status region is at a different region of the display while displaying a user interface for a third application, as described with reference to FIG. 5A. Displaying the status region in a predefined region of the display area while displaying different application user interfaces outside of the status region provides feedback about a state of the device in a consistent region of the display, thereby reducing an amount of time needed to perform a particular operation on the device.

In some embodiments, the computer system detects (1044) a user input corresponding to a request to navigate to a respective user interface associated with the respective application (e.g., the first user interface, a user interface of the respective application or a wake screen user interface that is enabled to display a widget for the respective application (e.g., a condensed user interface of the respective application that is displayed in a portion of, and distinct from other widgets, notifications, and buttons in, the wake screen user interface)). In some embodiments, the user input is a tap input or other selection input directed to an application icon for the respective application. In some embodiments, the user input is a swipe and/or tap input directed to a representation of the respective application while displaying representations of open applications in a multitasking user interface. In some embodiments, the user input is a swipe input, such as a bottom edge swipe in a first direction, to switch from a currently displayed user interface to a user interface for the respective application. In some embodiments the user input is a system gesture, such as a downward swipe input from a top edge of a touch-sensitive surface or another edge or a press of a button, to display a wake screen user interface. In some embodiments, in response to the user input corresponding to a request to navigate to the respective user interface, the computer system ceases to display the indication of a current state of the respective application in the status region and displays the respective user interface in the display area outside of the status region (e.g., the second display region), including displaying, in the respective user interface, a user interface of the respective application. In some embodiments, while the respective application or wake screen is currently displayed, session information for the respective application is no longer displayed in the session region even while the session remains active, for example as described in FIGS. 5AQ-5AR1. When navigating to a user interface in which a user interface of an application with an active session is displayed outside of the status region, ceasing to display status information about the application in the status region causes the device to automatically reduce the number of displayed controls and reduce redundancy in the user interface.

In some embodiments, the computer system detects (1046) a user input corresponding to a request to navigate to a wake screen user interface. In some embodiments the wake screen is in a locked state (e.g., with reduced functionality of the computer system available, such as by limiting notifications to showing condensed, generalized, and/or nonidentifying information or imposing other access limits) while the computer system is in a locked state. In some embodiments, the wake screen is in an unlocked state (e.g., with greater functionality of the computer system enabled, such as by showing expanded, more detailed, and/or identifying information for notifications) while the computer system is in an unlocked state (e.g., as a result of a user of the computer system being authenticated). In some embodiments, in response to the user input corresponding to a request to navigate to the wake screen user interface, the computer system ceases to display the indication of a current state of the respective application in the status region, and optionally displays an indication of the current state of the respective application in another portion of the display area that is outside of the status region (e.g., in accordance with a determination that the wake screen is configured to display a widget, also called a platter, for the respective application). For example, in FIG. 5AR1 the media playback session (also referred to as a music session) moves from being displayed in the status region (e.g., portion 502-9 of the session region) to being displayed in a platter (e.g., user interface element 5006) that is below the time/date on the wake screen. In some embodiments, while displaying the wake screen user interface, the indication of the current state of the respective application is optionally maintained in the status region. For example, for a first application (e.g., a timer application), the indication of the current state of the first application is maintained in the status region (e.g., session region 502-16 continues to display the active timer session) while displaying the wake screen user interface (e.g., in accordance with a determination that the wake screen is not configured to display a widget for the first application), but for a second application (e.g., a music application), the indication of the current state of the second application is no longer displayed in the status region (e.g., in accordance with a determination that the wake screen is configured to display a widget for the second application, in which case the widget for the second application is displayed in the wake screen instead of the indication in the status region of the current state of the second application). When navigating to a user interface, such as a wake screen user interface, in which a user interface of an application with an active session is displayed outside of the status region, ceasing to display status information about the application in the status region causes the device to automatically reduce the number of displayed controls and reduce redundancy in the user interface.

In some embodiments, in response to detecting the user input corresponding to a request to navigate to the respective user interface (e.g., the user interface of the respective application, or the wake screen), the computer system animates (1048) a transition between displaying the indication of a current state of the respective application in the status region and displaying the respective user interface in the display area outside of the status region. In some embodiments, animating the transition includes expanding the indication of a current state of the respective application, wherein the user interface for the respective application is displayed as animating from the indication at its initial size in the status region. For example, user interface element 5006 is displayed animating out of the portion 502-9 of the session region in a transition from FIG. 5AQ to FIG. 5AR1. In some embodiments, the status region is also referred to herein as the sensor region, in which the status region encompasses the one or more sensors. Displaying an animated transition from displaying status information for the application in the status region to displaying the user interface for the application outside of the status region provides feedback about a state of the device.

In some embodiments, in response to detecting the user input corresponding to a request to navigate to the respective user interface (e.g., the user interface of the respective application, or the wake screen), in accordance with a determination that an indication of a current state of a second application is displayed in the status region, the computer system continues (1050) to display a current state of the second application in the status region while displaying the user interface of the respective application in the second display region. In some embodiments, while a session is active for an application, the status region continues to display information for the active session unless the application user interface for the respective application is displayed. For example, in FIG. 5AR1, the timer session remains displayed in the session region. In some embodiments, in response to detecting the user input corresponding to the request to navigate to the respective application, in accordance with the determination that the indication of a current state of a second application is displayed in the status region, a user interface for the second application is also displayed in display area outside of the status region via an animated transition from displaying the indication of a current state of the second application in the status region (e.g., at least partially concurrently with the animated transition for the respective application). In some embodiments, whether the user interface for the second application is displayed in display area outside of the status region is based on a determination as to whether a widget for the second application is available (e.g., on a wake screen or other system user interface). When transitioning from displaying, in the status region, status information for an application with an active session to displaying a user interface of the application outside of the status region, continuing to display status information about a second application with an active session in the status region reduces the number of inputs needed to view status information about other active sessions and makes more efficient use of the display area.

In some embodiments, the computer system detects (1052) a user input (e.g., a tap input, a long press, or another selection input) corresponding to a request to navigate to a second application. In some embodiments, the user input corresponding to the request to navigate to the second application is a user input selecting an affordance associated with the second application, such as a notification for the second application displayed on a wake screen, an icon for the second application displayed on a home user interface, or a representation of the second application displayed in an application switching selection user interface. In some embodiments the user input corresponding to the request to navigate to the second application is a user input for switching directly to the second application from the respective application (e.g., a right swipe gesture along a bottom edge of a touch-sensitive surface or other system gesture). In some embodiments, in response to detecting the user input (e.g., a tap input, a long press, or another selection input) corresponding to a request to navigate to the second application, in accordance with a determination that an indication of a current state of the second application is displayed in the status region, the computer system animates a transition between displaying the indication of a current state of the second application in the status region and displaying a representation of the second application in the display area outside of the status region. In some embodiments, the user is enabled to navigate between user interfaces for applications that have current sessions displayed in the status regions by selecting the portion of the status region corresponding to the respective application to open the user interface for the respective application. In some embodiments, displaying a user interface for a respective application includes animating the portion of the status region corresponding to the respective application that enlarges the status region to a size of the user interface for the respective application, and displaying additional information for the respective application that is not displayed in the status region. In some embodiments in accordance with a determination that an indication of a current state of a second application is not displayed in the status region, the status region is maintained (e.g., any indications of current states of other applications that are displayed in the status region continue to be displayed in the status region). For example, in response to user input 592, the user interface 584 (FIG. 5AO) is displayed as animating out from the portion 502-15 of the session region in FIG. 5AN. Displaying an animated transition from displaying status information for multiple applications in the status region to displaying user interfaces for the multiple applications outside of the status region provides feedback about a state of the device.

In some embodiments, the computer system displays (1054) an indication of an alert (e.g., a notification or a system alert, optionally in response to an alert event, such as an incoming notification), including initially displaying the indication of the alert at a portion of the display region that is at least partially occluded by the status region. In some embodiments, the indication of the alert appears behind (and/or encompasses) the status region, as illustrated in FIGS. 5BA1-5BA3. In some embodiments, the computer system animates the indication of the alert as moving from a top of the status region to below the status region and displays the indication of the alert at a portion of the display region that is adjacent (e.g., below) to the status region. Displaying an animation of an alert moving onto the display past the status region, including through a position at which the alert is at least partially occluded by the status region to a position at which the alert is fully visible next to the status region, illustrates receipt of the alert, thereby providing feedback about a state of the device.

In some embodiments, animating the indication of the alert includes (1056) increasing a size of the indication of the alert. In some embodiments, the size of the indication of the alert (e.g., system alert or notification) increases as the indication of the alert slides down from a top edge of the display. In some embodiments, the size of the indication of the alert increases while the indication of the alert is at least partially occluded by the status region (e.g., the alert travels under the status region and the alert increases in size as it lowers within the display region), as described with reference to FIGS. 5BA1-5BA3. Displaying an animation of an alert increasing in size while appearing makes the alert increasingly prominent, thereby providing feedback about a state of the device.

In some embodiments, animating the indication of the alert includes (1058) changing a visual property of the indication of the alert. In some embodiments, changing the visual property includes changing a degree of deemphasis of the indication of the alert such as changing a blur level (e.g., from more blurred to less blurred), and/or changing an opacity of the indication, as described with reference to FIGS. 5BA1-5BA3. Displaying an animation of a visual property of an alert changing such as by becoming less visually deemphasized (e.g., less blurred and/or less transparent) while appearing makes the alert increasingly prominent, thereby providing feedback about a state of the device.

In some embodiments, the respective application is (1060) a first software application executing on the computer system, and the indication of a current state of the first software application is displayed in the status region while the status region is associated with an active session of the first software application. In some embodiments, after the status region ceases to be associated with the active session of the first software application (e.g., the active session of the first application ends), the computer system detects one or more user inputs corresponding to a request to associate the status region with an active session of a second software application executing on the computer system (e.g., in any manner described herein for associating the status region with an active session, including for example launching an application and dismissing the application user interface amid ongoing updates from the application, or issuing a command to a virtual assistant to initiate an active session), wherein the second software application is different from the first software application. In some embodiments, in response detecting the one or more user inputs corresponding to the request to associate the status region with an active session of the second software application, while a state of the second software application continues to change (e.g., even after dismissing a user interface of the second software application that was displayed outside of the status region), the computer system displays in the status region an indication of a current state of the second software application. In some embodiments, the indication of a current state of a respective application is displayed without regard to whether the respective application is a first software application executing on the computer system or a second software application executing on the computer system. In some embodiments, the status region displays information for a plurality of applications. In some embodiments, the indication of the current state of the respective application is different for every application. For example, a first application (e.g., a timer application) corresponds to a first indication (e.g., a timer icon and/or an amount of time remaining on a timer) displayed in the status region and a second application (e.g., a music application) corresponds to a second indication (e.g., an indication of a currently playing media item) displayed in the status region. For example, FIG. 5AB illustrates concurrently displaying two sessions for two distinct applications in the session region. Displaying information about the current states of different active applications in the same status region enables the user to view different types of status information for the computer system, as appropriate for the current context, in a consistent region of the display, thereby reducing the number of inputs and amount of time needed for viewing feedback about a state of the device.

It should be understood that the particular order in which the operations in FIGS. 10A-10D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1100, 1200, 1300, 1400, 1500, and 1600) are also applicable in an analogous manner to method 1000 described above with respect to FIGS. 10A-10D. For example, the session regions and user inputs described above with reference to method 1000 optionally have one or more of the characteristics of the session regions and user inputs described herein with reference to other methods described herein (e.g., methods 9000, 1100, 1200, 1300, 1400, 1500, and 1600). For brevity, these details are not repeated here.

FIGS. 11A-11D are flow diagrams illustrating method 1100 of displaying updated status information for at least one application in a status region of the display in accordance with some embodiments. Method 1100 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

In some embodiments, the method 1100 is performed at a computer system (1102) that is in communication with a display generation component having a display area, wherein the display area includes a status region (e.g., a session display region, such as session region 502-1, FIG. 5A) and an application user interface region that is separate from the status region, and the application user interface region at least partially surrounds the status region (or at least extends above, below, to the left, and to the right of the status region, or is otherwise outside of the status region, for example if the status region is a cutout from the application user interface region, and/or from the overall display area, and in some embodiments forms an island in the surrounding display area).

The computer system displays (1104), in the application user interface region, a first user interface of a first application. For example, in FIG. 5AA, user interface 570 for a music application is displayed.

The computer system detects (1106) a user input corresponding to a request to display a second user interface in the application user interface region. For example, user input 572 in FIG. 5AA corresponds to a request to display another application user interface.

The computer system, in response to detecting the user input corresponding to the request to display the second user interface in the application user interface region, and in accordance with a determination that the second user interface is associated with respective software that is different from the first application ceases (1108) to display the first user interface of the first application in the application user interface region and displays the second user interface in the application user interface region (optionally replacing display of the first user interface of the first application in the application user interface region). For example, in FIG. 5AB, user interface 574 replaces display of user interface 570 in FIG. 5AA.

The computer system, in accordance with a determination that the status region is associated with an active session of a second application that is different from the first application (and optionally different from the respective software), displays (1110), in a first portion of the status region, a first indication of a current state of the first application, including updating the displayed first indication as the state of the first application changes (e.g., associating the status region with an active session of the first application, while the first application remains active) and displays, in a second portion of the status region that is different from the first portion, a second indication of a current state of the second application, including updating the displayed second indication as the state of the second application changes (e.g., in accordance with the status region already being associated with an active session of the second application), wherein the first portion of the status region and the second portion of the status region are displayed concurrently with the second user interface. For example, first portion 502-8 of the session region in FIG. 5AB continues to display active timer session, and second portion 502-9 is displayed concurrently in the session region. In some embodiments an active session of a respective application involves the respective application continuing to execute and change state on the computer system, and the session region is used to indicate, in a persistent and consistently located display region, the state changes of the respective application during the active session. In some embodiments the second portion of the status region is adjacent to the first portion of the status region. In some embodiments the first portion of the status region surrounds one or more sensor regions in which the display generation component is not capable of displaying content, while the second portion of the status region does not surround one or more sensor regions in which the display generation component is not capable of displaying content.

The computer system, in accordance with a determination that the status region is not associated with an active session of a second application that is different from the first application (and optionally different from the respective software) (e.g., there is no active session other than that of the first application), displays (1112), in the status region (e.g., in the second portion of the status region and/or in the first portion of the status region), the first indication of the current state of the first application in the status region without displaying, in the status region, an indication of a current state of a second application, wherein the status region is displayed concurrently with the second user interface. For example, if in FIG. 5AA, the timer session was not active in session region 502-7, the entire session region in FIG. 5AB displays status information for the media playback session, without status information for another session. In some embodiments the status region is dynamically changed in size, and is expanded and/or partitioned as appropriate, to accommodate current status information for any number of (e.g., two, three, or more) applications that have active sessions associated with the status region. In some embodiments, if an active session for a respective application ends, current status information about the respective application ceases to be displayed in the status region. In some embodiments, the status region is reduced in size in accordance with ceasing to display the current status information about the respective application (e.g., if no other application sessions remain active). In some embodiments if a session for a first application remains active when a session for a second application ends, some or all of the portion of the status region that was allocated to the second application's session is reallocated to the first application's active session (and/or to the active session(s), if any, of one or more additional applications), and optionally additional status information for the first application (and/or for the one or more additional applications with active sessions, if any) is displayed in the reallocated portion. In some embodiments the application user interface region is dynamically changed in size to accommodate corresponding changes in size of the status region (e.g., some display area is reallocated from the application user interface region to the status region as the status region expands, for example as an active session is added to the status region, or conversely some display area is reallocated from the status region to the application user interface region as the status region shrinks, for example as an active session is removed from the status region). Displaying information about the current states of multiple active applications in the same status region enables the user to view different types of status information for the computer system at the same time and in a consistent region of the display, thereby reducing the number of inputs and amount of time needed for viewing feedback about a state of the device.

In some embodiments, one or more sensors are (1114) encompassed within the status region, as described with reference to FIG. 5A. Displaying status information in a dedicated status region that encompasses one or more sensor regions in which one or more sensors are positioned causes the device to automatically reduce the visual intrusiveness of the sensor regions and make more efficient use of the display area.

In some embodiments, while displaying the second user interface in the application user interface region, the computer system detects (1116) a user input corresponding to a request to display a third user interface in the application user interface region. In some embodiments, in response to detecting the user input corresponding to the request to display the third user interface in the application user interface region, and in accordance with a determination that the second user interface is associated with a third application that is different from the first application and from the respective software (and from the second application), the computer system maintains display of the status region (e.g., including maintaining display of the first indication of a current state of the first application, and, if an active session of a second application is associated with the status region, maintaining display of the second indication of a current state of the second application) and displays the third user interface of the third application in the application user interface region. In some embodiments maintaining display of the status region includes updating the status region one or more times in accordance with one or more changes in the state of the first application and one or more changes in the state of the second application, if any. In some embodiments the second user interface of the respective software ceases to be displayed in the application user interface region. In some embodiments the second user interface of the respective software and the third user interface of the third application are concurrently displayed in the application user interface region (e.g., in different parts of the application user interface region). For example, as illustrated in FIGS. 5AE-5AF, the user interface 542 is updated to user interface 501-2, and the session region continues to display the active sessions, including portion 502-8 for the timer session and portion 502-9 for the media playback session. Continuing to display and update the status region for one or more active sessions while detecting user inputs interacting with other aspects of the computer system outside of the status region, such as to switch between application user interfaces and system user interfaces, reduces the number of inputs needed to view status information for the active session(s) while making more efficient use of the display area.

In some embodiments, in accordance with a determination that the status region is associated with an active session of a second application that is different from the first application, the computer system determines (1118) a priority of the first application and the second application, wherein the application with higher priority is displayed in the first portion of the status region. For example, as described with reference to FIG. 5AI, in some embodiments, a number of sessions that are concurrently displayed is limited, and a priority of applications determines which sessions to display in the session region. Where multiple applications have active sessions represented in the status region, arranging the status information for the active sessions based on relative priorities of the multiple applications causes the device to automatically present status information with a degree of prominence according to the importance of the status information, thereby reducing the amount of time needed to view feedback about a relevant state of the device. In some embodiments, the second portion of the status region is displayed (1120) as a user interface element that is distinct from a user interface element for the first portion, wherein the user interface element for the second portion is displayed adjacent to the user interface element for the first portion of the status region. In some embodiments, the user interface element for the second portion is a bubble user interface element that is a distinct shape and/or size from the user interface element for the first portion of the status region, for example, portion 502-10 of the session region in FIG. 5AI is distinct from portion 502-9 in the session region. In some embodiments, the first user interface element is displayed as encompassing one or more sensors and the second user interface element is displayed without encompassing the one or more sensors. Where multiple applications have active sessions represented in the status region, displaying the status information for the second active session in a distinct second portion of the status region causes the device to automatically delineate the different sets of status information, thereby reducing the amount of time needed to view feedback about a state of the device. In some embodiments, the second user interface displayed in the application user interface region is displayed (1122) between the user interface element for the second portion of the status region and the user interface element for the first portion of the status region. In some embodiments, there is a non-zero amount of space between the first portion and the second portion of the status region. In some embodiments, the non-zero amount of space between the first portion and the second portion displays a portion of the application user interface region. For example, between portion 5020-10 and portion 502-9 of the session region in FIG. 5AI, the application user interface region is displayed. Where multiple applications have active sessions represented in the status region and displayed in distinct portions of the status region, and an application user interface is displayed outside of the status region, displaying content of the application user interface in display area that is between the distinct portions of the status region causes the device to automatically reduce the visual intrusiveness of the portions of the status region and make more efficient use of the display area.

In some embodiments, the computer system detects (1124) a user input corresponding to a request to cease display of a fourth user interface for a fourth application that is displayed in the application user interface region. In some embodiments, the request to cease display of the fourth user interface is a request to display a fifth user interface. In some embodiments, in response to detecting the user input corresponding to the request to cease display of the fourth user interface in the application user interface region and in accordance with a determination that the status region is associated with an active session of a first application and an active session of a second application that is different from the first application, the computer system ceases to display the fourth user interface in the application user interface region, optionally continues to display the first indication of a current state of the first application in the first portion of the status region, and replaces display of the second indication of a current state of the second application with a third indication of a current state of the fourth application in the second portion of the status region. For example, as illustrated in FIG. 5AI, only two of the three active sessions are displayed in the session region, with the voice recording session replacing the timer session while maintaining display of the media playback session in portion 502-9. Where status information for two applications with active sessions is displayed in the status region, replacing the status information for one of the applications with status information for a third application with an active session enables relevant status information to be presented without displaying additional controls.

In some embodiments, replacing display of the second indication of a current state of the second application with the third indication of a current state of the fourth application in the second portion of the status region is performed (1126) in accordance with a determination that the fourth application is associated with a higher priority than the second application. For example, as described with reference to FIG. 5AI, in some embodiments, voice recording session (portion 502-10) replaces the timer session (portion 502-9) in accordance with the voice recording application having a higher priority than the timer application. In some embodiments, accordance with a determination that the fourth application is associated with a lower priority than the second application, the computer system forgoes displaying the third indication of the current state of the fourth application in the portion of the status region. In some embodiments, the indication that is replaced by the fourth application is based on application priority (e.g., a priority is determined of the first session, the second session, and the fourth session and the top two highest priority sessions are concurrently displayed without displaying an indication for the lowest priority session). Where more than two applications have active sessions, displaying the status information for two of the higher priority applications in the status region causes the device to automatically present more important status information rather than less important status information, thereby reducing the amount of time needed to view relevant feedback about a state of the device.

In some embodiments, the computer system detects (1128) a user input corresponding to a request to display a fifth user interface (e.g., a cover sheet user interface, wake screen user interface, or lock screen user interface). In some embodiments, the fifth user interface is displayed as sliding over the display area from top to bottom. In some embodiments, the fifth user interface displays a list of alerts (e.g., notifications and/or system alerts). In some embodiments, the fifth user interface is a wake screen user interface. In some embodiments, the user input comprises a swipe gesture that is initiated at a top edge of the display area. In some embodiments, in response to detecting the user input corresponding to a request to display the fifth user interface, the computer system displays, outside of the status region, an indication of a current state of a respective application in the fifth user interface. In some embodiments, an indication of the current state of the respective application was displayed in the status region before displaying the fifth user interface. For example, the indication is moved from the status region to be displayed in the application user interface region. For example, media playback session that is displayed in portion 502-9 in FIG. 5AQ is displayed in user interface element 5006 while the user interface 5004 is displayed in FIG. 5AR1. In some embodiments, two or more sessions that are displayed in the session region move out of the session region and onto the user interface 5004a (e.g., coversheet user interface), for example, media playback session in portion 502-9a of the session region and sports session displayed in portion 599 of the session region (FIG. 5AR2) move out of the session region and are displayed as user interface elements (e.g., user interface element 5006 and user interface element 5007) in the user interface 5004a (FIG. 5AR3). Transitioning from displaying application status information in the status region to displaying a user interface of the application outside of the status region causes the device to automatically present the status information in a more prominent way when appropriate.

In some embodiments, in response to detecting the user input corresponding to a request to display a fifth user interface, the computer system concurrently displays (1130), outside of the status region, the indication of a current state of the respective application and an indication of a current state of a second respective application in the fifth user interface. For example, in FIGS. 5AR2-5AR3, the timer session continues to be displayed in session region 502-16a while the media playback session is displayed in user interface element 5006 and the sports session moves from portion 599 of the session region to being displayed as a user interface element 5007 that includes status information for the sports session. Transitioning from displaying status information for multiple applications in the status region to displaying user interfaces of the applications outside of the status region causes the device to automatically present the status information in a more prominent way when appropriate.

In some embodiments, in accordance with a determination that one or more indications of respective current states of respective applications are displayed in the status region, the computer system continues (1132) to display at least one indication of the one or more indications of respective current states of respective applications in the status region while displaying the fifth user interface. For example, in FIG. 5AR, the timer session continues to be displayed in session region 502-16 while the media playback session is displayed in user interface element 5006. Continuing to display respective application status information in the status region while other status information for other applications is transitioned out of the status region into a user interface displayed outside of the status region causes the device to automatically reduce the number of inputs needed to view the status information about the respective application while presenting the other status information in a more prominent way when appropriate.

In some embodiments, the computer system detects (1134) a user input of a first type (e.g., a tap input or other selection input) directed to the status region. In some embodiments, in response to detecting the user input of the first type directed to the status region, in accordance with a determination that the user input corresponds to the first portion of the status region that is displaying the first indication of the current state of the first application, the computer system displays the first user interface of the first application in the application user interface region (and optionally launches the first application), and in accordance with a determination that the user input corresponds to the second portion of the status region that is displaying the second indication of the current state of the second application, the computer system displays the second user interface of the second application in the application user interface region. For example, as described with reference to FIGS. 5AL-5AO, user input 590 on media playback session opens a user interface 570 for the media playback application (e.g., music application), and user input 592 opens user interface 584 for a voice recording application (e.g., voice memos application). Where multiple active sessions are represented in different portions of the status region, displaying an application user interface associated with the active session represented in a respective portion of the status region, in response to a particular type of user input directed to the respective portion of the status region, reduces the number of inputs needed to perform a particular operation on the device and enables different types of operations associated with the status region to be performed without displaying additional controls.

In some embodiments, the computer system detects (1136) a user input of a second type (e.g., a long press input or other selection input) directed to the status region (e.g., wherein the second type of input is different from the first type of input). In some embodiments, in response to detecting the input of the second type directed to the status region, in accordance with a determination that the user input corresponds to the first portion of the status region that is displaying the first indication of the current state of the first application, the computer system expands the first portion of the status region. In some embodiments, the computer system increases the size of the first portion of the status region. In some embodiments, the computer system optionally ceases to display the second indication in the second portion of the status region. In some embodiments, in accordance with a determination that the user input corresponds to the second portion of the status region that is displaying the second indication of the current state of the second application, the computer system expands the second portion of the status region. For example, in FIGS. 5AL-5AM, in accordance with user input 590 being the second type of input, expanded session region 502-14 is displayed. Where multiple active applications are represented in different portions of the status region, expanding the status region to show additional information for a respective application, in response to a particular type of user input directed to the respective portion of the status region, reduces the number of inputs needed to perform a particular operation on the device and enables different types of operations for different applications associated with the status region to be performed without displaying additional controls.

In some embodiments, while displaying, in the first portion of the status region, the first indication of a current state of the first application, the computer system detects (1138) a user input corresponding to a request to display a user interface for the first application. In some embodiments, the user input is an input on a home screen user interface that selects an application icon to launch the application. In some embodiments, the user input is an input of a first type on the first portion of the status region. In some embodiments, in response to detecting the user input corresponding to a request to display the first user interface for the first application, the computer system ceases to display the first indication of a current state of the first application in the first portion of the status region and displays the user interface for the first application in the application user interface region. In some embodiments, the computer system continues to display a second indication of a current state of the second application in the second (or the first) portion of the status region while displaying the first user interface for the first application. For example, while the first application is displayed in the application user interface region, the indication of a current state of the first application ceases to be displayed in the status region, and optionally, one or more other indications of other active applications (e.g., the second application) continue to be displayed in the status region). For example, in FIG. 5AN, while the user interface 570 for the media playback application (or music application) is displayed, the session region does not include an indication for the media playback session, even while the music continues playing on device 100. For example, as described with reference to FIGS. 5BP-5BR, while the user interface 5066 for the music application is displayed, the session region 502-34 displays the active navigation session without displaying an indication of the active media playback session that is associated with the music application. When navigating to a user interface, displayed outside of the status region, for an application that has an active session represented in the status region, ceasing to display status information about the application in the status region (e.g., while continuing to display, in the status region, status information for active sessions of other applications) causes the device to automatically reduce the number of displayed controls and reduce redundancy in the user interface.

In some embodiments, while displaying the user interface for the first application in the application user interface region, the computer system detects (1140) a user input corresponding to a request to display a user interface for the second application. In some embodiments, the user input is a user input detected on the second portion of the status region that is displaying the second indication of a current state of the second application. In some embodiments, in response to detecting the user input corresponding to a request to display the user interface for the second application, the computer system displays the first indication of a current state of the first application in the first portion of the status region, ceases to display the second indication of the current state of the second application in the status region, and displays the user interface for the second application in the application user interface region. For example, as illustrated in FIGS. 5AN-5AO, user input 592 causes the device to switch from displaying the voice recording session in portion 502-15 to displaying the media playback session in portion 502-9, while the user interface 584 for the voice recording application is displayed. In some embodiments, as illustrated in FIGS. 5BP-5BR, while a user interface for the application associated with a respective session is displayed, the session region ceases display of the session associated with the application. Where a user interface of a first application is displayed outside of the status region while status information of another application is displayed in the status region, replacing the status information in the status region with status information of the first application when navigating away from the user interface of the first application (including to a user interface of the other application) outside of the status region reduces the number of inputs and amount of time needed for viewing feedback about a state of the device concerning the recently viewed first application.

In some embodiments, in response to detecting the user input corresponding to a request to display the user interface for the first application, the computer system replaces (1142) display of the first indication of a current state of the first application in the first portion of the status region with display of a fourth indication of a current state of a fifth application, including updating the displayed fourth indication as the state of the fifth application changes. In some embodiments, prior to detecting the user input corresponding to the request to display the user interface for the first application, the first indication of the current state of the first application was displayed in the status region whereas the fourth indication of the current state of the fifth application was not displayed in the status region because the first application (e.g., the active session of the first application) took priority over the fifth application (e.g., the active session of fifth application) with respect to being displayed in the status region. In some embodiments in accordance with displaying the user interface for the first application in the application user interface region (e.g., outside of the status region) in response to the requesting input, the active session for the first application ceases to be represented in the status region (as it would be redundant of the application user interface region), thus making room available in the status region for another, lower priority, active session (in this case of the fifth application). For example, as illustrated in FIGS. 5AN-5AO, the device 100 replaces display of the voice recording session in portion 502-15 to displaying the media playback session in portion 502-9, while the user interface 584 for the voice recording application is displayed. For example, FIGS. 5BP-5BR illustrate that navigating away from user interface 5060 for a maps application, to a user interface for a music application, causes the device 100 to cease display of the media playback session 502-30 in the session region and initiate display of the navigation session 502-34 in the session region while the user interface 5066 of the music application is displayed. When ceasing to display status information about a particular application in the status region in accordance with navigating to a user interface of the particular application outside of the status region, replacing the status information about the particular application in the status region with status information about another application causes the device to automatically reallocate available space in the status region to other status information, thereby reducing the number of inputs and amount of time needed for viewing feedback about a state of the device.

In some embodiments, the computer system detects (1144) a user input corresponding to a request to cease display of a user interface for a sixth application that is displayed in the application user interface region. In some embodiments, the user input corresponding to a request to cease display of an application user interface displayed in the application user interface region corresponds to a request to display a system user interface or a user interface of a different application. In some embodiments, the user input corresponding to a request to cease display of the application user interface displayed in the application user interface region includes a touch input (e.g., including a gesture, such as a swipe or pinch gesture, performed with one or more touches, or other touch input), button press (e.g., of a hardware button that is part of the computer system or part of a peripheral such as a mouse or stylus), and/or voice command. In one example, an edge swipe input from an edge toward a center of a touch-sensitive display (e.g., from the bottom edge upward, from the top edge downward, from the left edge to the right, or from the right edge to the left) navigates away from an application user interface to a system user interface (e.g., an application switching selection user interface, a home user interface, or a control panel user interface). In another example, an edge swipe input in a direction along an edge (e.g., a swipe that includes movement toward the left or right along a bottom or top edge, or a swipe that includes movement upward or downward along a left or right edge) of a touch-sensitive display navigates away from a first application's user interface to a second application's user interface. One of ordinary skill in the art will recognize that navigation between different user interfaces may be analogously performed using any other input mechanism described herein. In some embodiments, in response to detecting the user input corresponding to the request to cease display of the user interface in the application user interface region and in accordance with a determination that the status region is associated with active sessions of two or more applications (e.g., the first application and the second application), the computer system displays, in a third portion of the status region that is different from the first portion and the second portion, a fifth indication of a current state of the sixth application, for example three active sessions (e.g., in portions 502-11, 502-12 and 502-13 of the session region), are concurrently displayed in FIG. 5AJ. In some embodiments, one of the first, second and third portions of the status region includes the one or more sensors. In some embodiments, each of the first, second and third portions is a displayed as a distinct user interface element (e.g., a bubble) with a non-zero amount of display between the first, second and third portion of the status region. In some embodiments, each portion is displayed with a same background color. In some embodiments, the background color matches a color of the one or more sensors (e.g., black). Displaying information about the current states of multiple active applications in the same status region enables the user to view different types of status information for the computer system at the same time and in a consistent region of the display, thereby reducing the number of inputs and amount of time needed for viewing feedback about a state of the device.

In some embodiments, a size of the application user interface region is (1146) more than twice a size of the status region. In some embodiments, the size of the status region is dynamically updated to replace more and/or less of the application user interface region. For example, the size of the status region increases, and the size of the application user interface region decreases accordingly. In some embodiments, the size of application user interface region is more than 10× the size of the status region. For example, a size of the displayed user interface 500 for the messaging application in the application user interface region is more than twice the size of session region 502-1 in FIG. 5C. Displaying a status region that is significantly smaller than the user interface region outside of the status region causes the device to automatically make more efficient use of the display area when providing feedback about a state of the device.

In some embodiments, the first portion of the status region is displayed (1148) with a colored outline of a first color; and the second portion of the status region is displayed with a colored outline of a second color that is distinct from the first color, as described with reference to portions 502-8 and 502-9 of the session region in FIG. 5AO. In some embodiments, the color of the colored outline is dependent upon the application that is associated with the indication displayed in the respective portion. For example, a voice memo application is associated with a first color (e.g., red), a phone application is associated with a second color (e.g., green), a maps application is associated with a second color (e.g., blue). In some embodiments, more than one application is associated with a same color such that two applications share as same colored outline color. Associating different colors with different applications or system software, and displaying the outline of the status region, or of different portions of the status region, with the different colors based on which software have an active session associated with the status region, is described in more detail herein with reference to method 1500. Where multiple applications have active sessions represented in different portions of the status region, displaying different color borders around the different portions of the status region causes the device to automatically delineate and visually distinguish the different sets of status information, thereby reducing the amount of time needed to view feedback about a state of the device.

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 1200, 1300, 1400, 1500, and 1600) are also applicable in an analogous manner to method 1100 described above with respect to FIGS. 11A-11D. For example, the session regions and user inputs described above with reference to method 1100 optionally have one or more of the characteristics of the session regions and user inputs described herein with reference to other methods described herein (e.g., methods 9000, 1000, 1200, 1300, 1400, 1500, and 1600). For brevity, these details are not repeated here.

FIGS. 12A-12E are flow diagrams illustrating method 1200 of interacting with a status region to perform an operation in accordance with some embodiments. Method 1200 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

In some embodiments, method 1200 is performed at a computer system that is in communication with a display generation component having a display area, wherein the display area at least partially encompasses a status region (also referred to herein as a session region and/or a session display region). In some embodiments the status region occupies less than all of the display area, as illustrated by session region 502-1 in FIG. 5A. In some embodiments the status region is a cutout from the display area, and in some embodiments forms an island in the surrounding display area (e.g., the boundary of the status region is within the boundary of the display area). In some embodiments the status region is surrounded by a separate, typically larger, application user interface display region.

The computer system detects (1202) a user input corresponding to the status region. For example, user input 528 in FIG. 5J is directed to session region 502-5.

The computer system, in response to detecting (1204) the user input corresponding to the status region, in accordance with a determination that the status region is associated with an active session of a respective application, performs (1206) an operation associated with the respective application (e.g., launching the respective application or dynamically expanding the status region to display additional information about the respective application). For example, the status region 502-5 expands to status region 502-6 (FIG.

5K) in response to user input 528 and/or an application user interface for an application associated with status region 502-5 is displayed.

In some embodiments, in accordance with a determination that the status region is not associated with an active session of a respective application, the computer system provides (1208) feedback associated with the user input (e.g., visual, tactile, and/or audio feedback responsive to the user input, such as changing a size of (e.g., shrinking or expanding) the status region, providing tactile output, and/or providing audio output) without displaying information about a respective application in the status region and without performing an operation associated with a respective application. For example, in FIG. 5N, user input 532 is directed to session region 502-1, without an active session, and the device increases a size of session region 502-1 to session region 502-1*b* (FIG. 5O) in response to user input 532. In some embodiments, prior to detecting the user input corresponding to the status region, in accordance with a determination that the status region is associated with an active session of a respective application, the computer system displays information about the respective application in the status region (which is optionally supplemented in response to a user input directed to the status region), whereas, in accordance with a determination that the status region is not associated with an active session of a respective application, the computer system does not display information about the respective application in the status region. In some embodiments, while the status region is not associated with an active session of a respective application, the status region has zero or negligible display area (e.g., less than a threshold amount of the display area such as less than 1%. 2%. 3% or 5% of the available display area), and in some such circumstances, detecting a user input corresponding to the status region includes detecting a user input corresponding to the one or more interior boundaries of the display area. In some embodiments the boundary of the status region closely outlines one or more sensor regions, which have non-negligible area, and in which one or more sensors are positioned (e.g., the boundary of the status region outlines an area mostly occupied by the one or more sensor regions, such as more than 90%, 95%, 98% or 99% of the status region). In some embodiments while the status region is associated with an active session of a respective application, the status region is expanded to occupy a non-negligible display area. In response to a user input directed to a status region, performing an operation associated with an application whose status is represented in the status region, or otherwise providing feedback associated with the user input causes the device to automatically indicate that the status region is interactive with feedback appropriate to the current context.

In some embodiments, one or more sensors (e.g., one or more optical sensors) are positioned (1210) within one or more sensor regions that are surrounded by the display area (e.g., the display generation component is not capable of displaying content within the one or more sensor regions of the display area (e.g., one or more non-display regions that form holes in the display area in that content cannot be displayed in the non-display regions even though a top surface of the display, for example the glass overlay of a display, is in some embodiments continuous over the non-display regions)), and the status region (e.g., a session display region) encompasses the one or more sensor regions of the display area. Although many examples are described herein with respect to user interfaces displayed around a status region of the display area that includes one or more sensors (e.g., positioned within one or more interior boundaries of the display area that are encompassed by the boundary of the status region), the examples described herein are also applicable to a status region of the display area that does not have any sensors within it, for example as described with reference to FIG. 5B. Displaying a dedicated status region that encompasses one or more sensor regions in which one or more sensors are positioned causes the device to automatically reduce the visual intrusiveness of the sensor regions and make more efficient use of the display area.

In some embodiments, the computer system maintains (1212) display of the status region while displaying, in display area outside of the status region, a first user interface and detecting a user input to navigate from the first user interface to a second user interface (e.g., while displaying the first user interface). In some embodiments the user input to navigate from the first user input to a second user input includes a touch input (e.g., including a gesture, such as a swipe or pinch gesture, performed with one or more touches, or other touch input), button press (e.g., of a hardware button that is part of the computer system or part of a peripheral such as a mouse or stylus), and/or voice command. In one example, an edge swipe input from an edge toward a center of a touch-sensitive display (e.g., from the bottom edge upward, from the top edge downward, from the left edge to the right, or from the right edge to the left) navigates away from an application user interface to a system user interface (e.g., an application switching selection user interface, a home user interface, or a control panel user interface). In another example, an edge swipe input in a direction along an edge (e.g., a swipe that includes movement toward the left or right along a bottom or top edge, or a swipe that includes movement upward or downward along a left or right edge) of a touch-sensitive display navigates away from a first application's user interface to a second application's user interface. One of ordinary skill in the art will recognize that navigation between different user interfaces may be analogously performed using any other input mechanism described herein. In some embodiments, in response to detecting the user input to navigate from the first user interface to the second user interface, the computer system displays in the display area outside of the status region, the second user interface. For example, as described with reference to FIGS. 5S-5T, in response to user input 540 to change the displayed user interface, the session region 502-7 is maintained while the user interface is updated in the display area outside of the session region. Displaying a status region that is updated with information about an active session and that persists during navigation between user interfaces in display area outside of the status region reduces the number of inputs and amount of time and display area needed to view current status information about the active session while enabling continued interaction with other aspects of the device.

In some embodiments, performing the operation associated with the respective application includes displaying (1214), in display area outside of the status region, a user interface of the respective application (e.g., launching the respective application). For example, in FIGS. 5AN-5AO, in response to user input 592, a user interface for the application associated with the portion 502-15 of the session region (e.g., a voice recording application) is displayed. In some embodiments in combination with displaying the user interface of the respective application, the computer system ceases to display in the status region information about the respective application, and optionally reduces a size of the status region (e.g., in accordance with the reduction in the amount of information displayed in the status region). While the status region is associated with an active session of a respective application, displaying a user interface of the respective application in response to a user input directed to the status region reduces the number of inputs needed to perform a particular operation on the device.

In some embodiments, performing the operation associated with the respective application includes (1216) expanding (e.g., enlarging) the status region and displaying, in the expanded status region, information about (e.g., one or more elements of a user interface of) the respective application (e.g., content of the respective application such as graphics, text, and/or one or more controls). For example, in FIGS. 5H-5I, in response to user input 522-2, the session region 502-5 is expanded to session region 502-6. In some embodiments, while the status region is associated with the active session of the respective application, before the input corresponding to the status region, first information about the respective application (e.g., a first set of elements of a user interface of the respective application) is displayed in the status region, and second information (e.g., a larger second set of elements of the user interface of the respective application) is displayed in the expanded status region in response to the input corresponding to the status region. While the status region is associated with an active session of a respective application, expanding the status region to include additional information about the respective application in response to a user input directed to the status region reduces the number of inputs needed to perform a particular operation on the device.

In some embodiments, in accordance with the determination that the status region is not associated with an active session of a respective application, the computer system provides (1218) the feedback associated with the user input includes expanding the status region, as described with reference to FIGS. 5N-5P. In some embodiments the status region is expanded in response to a first portion of the user input corresponding to the status region, in some embodiments whether or not the status region is associated with an active session of a respective application. More generally, in some embodiments, if the status region is not associated with an active application session, the feedback that is provided in response to the user input includes a first magnitude of a respective type of feedback (e.g., a first magnitude of visual change, such as a first amount of increase in size and/or a first degree of change in color, and/or first magnitude(s) of audio and/or tactile feedback), whereas, if the status region is associated with an active application session, feedback including a second magnitude of the respective type of feedback is provided in response to the user input (whether as part of or in addition to performing the operation associated with the respective application), where the second magnitude is greater than the first magnitude (e.g., a greater second magnitude of visual change, such as a greater second amount of increase in size and/or a greater second degree of change in color, and/or greater second magnitude(s) of audio and/or tactile feedback). In some embodiments, one or more types of feedback that are provided in response to the user input have a lower magnitude when the status region is associated with an active application session than when the status region is not associated with an active application session (e.g., lower magnitude feedback for one or more visual, audio, and/or tactile output properties). While the status region is not associated with an active session of a respective application, expanding the status region in response to a user input directed to the status region indicates that the status region is interactive though without a current active session, thereby providing feedback about a state of the device.

In some embodiments, prior to expanding the status region, the computer system displays (1220) content in display area outside of the status region, wherein expanding the status region obscures a portion of the content that was displayed in the display area outside of the status region. For example, in FIG. 5I, expanded session region 502-6 at least partially obscures the content displayed in user interface 501. In some embodiments the portion of the content is redisplayed when the status region is contracted (e.g., the expansion of the status region is reversed). In some embodiments expanding the status region causes some content that was displayed in the display area outside of the status region to be repositioned (e.g., one or more displayed user interface elements are moved and displayed more compactly in the reduced display area that is outside of the expanded status region). Obscuring or otherwise deemphasizing content displayed outside of the status region when the status region is expanded causes the device to automatically give visual emphasis to the expanded status region.

In some embodiments, providing the feedback associated with the user input includes (1222) expanding (e.g., increasing a size of) the status region. In some embodiments, in accordance with a determination that a first threshold amount of time has elapsed since detecting an end of the user input corresponding to the status region, the computer system contracts (e.g., reversing the increase in the size of) the status region. For example, as described with reference to FIGS. 5I-5J, in some embodiments, session region 502-6 returns to condensed session region 502-5 after the first threshold amount of time has elapsed. Where the status region is expanded in response to a user input, shrinking the status region when a threshold amount of time has elapsed since detecting an end of the user input causes the device to automatically cease providing feedback associated with the user input when no longer relevant.

In some embodiments, detecting the end of the user input includes (1224) detecting liftoff of a contact that was part of the input from a touch-sensitive surface. For example, in FIGS. 5N-5O, in response to the user lifting off contact 532, the session region returns to its minimized size 502-1. In some embodiments, reversing the increase in size of the status region is performed directly in response to detecting the end of the user input corresponding to the status region, such as in response to liftoff of a touch input from the status region. Where the status region is expanded in response to a user input, shrinking the status region in response to detecting an end of the user input, such as by liftoff of a contact from a touch-sensitive surface, causes the device to automatically cease providing feedback associated with the user input when no longer relevant.

In some embodiments, providing the feedback associated with the user input includes (1226) expanding (e.g., increasing a size of) the status region. In some embodiments, while continuing to detect the user input corresponding to the status region, in accordance with a determination that the user input has been maintained with respect to the status region for a second threshold amount of time (e.g., since initial detection of the user input), the computer system contracts (e.g., reverses the increase in the size of) the status region. For example, in FIG. 5N, if user input 532 is maintained after the session region has expanded to session region 502-1b, the session region automatically contracts back to session region 502-1 even if the user input 532 is still ongoing. In some embodiments if the user input ceases to be detected before the second threshold amount of time has elapsed, the status region is contracted in response to the second threshold amount of time elapsing (e.g., after the user input has already ended). In some embodiments, the second threshold amount of time is measured from initial detection of the user input, without regard to whether the input continues to be maintained throughout the entirety of the second threshold amount of time. Where the status region is expanded in response to a user input, shrinking the status region after the status region has been expanded for a threshold amount of time, even if the user input is still ongoing, causes the device to automatically cease providing feedback associated with the status region when no longer relevant.

In some embodiments, providing the feedback associated with the user input includes (1228), in accordance with a determination that the user input is maintained with respect to the status region (e.g., continues to correspond to the status region) for a third threshold amount of time while the status region is not associated with an active session of a respective application, generating a first tactile output (e.g., in addition to expanding the status region as part of providing the feedback associated with the user input, where the expanding of the status region optionally is not conditional on the determination that the user input be maintained for the third threshold amount of time). For example, in FIG. 5O, session region 502-1b is expanded and a tactile output is provided. After an input to expand the status region has been maintained for a threshold amount of time, providing a tactile output to indicate that the status region is not associated with an active session provides feedback about a state of the device.

In some embodiments, the operation associated with the respective application is performed (1230) in accordance with a determination that the user input is maintained with respect to the status region for the third threshold amount of time while the status region is associated with an active session of a respective application, and performing the operation associated with the respective application includes expanding the status region and displaying, in the expanded status region, information about the respective application without generating the first tactile output. For example, session region 502-6 is displayed (FIG. 5I) even if user input 522-2 has maintained contact with the device for the third threshold amount of time, optionally without the first tactile output. In some embodiments the first tactile output is generated in combination with displaying the information about the respective application. In some embodiments, a different, second tactile output is generated instead. In some embodiments no tactile output is generated. After an input to expand the status region has been maintained for a threshold amount of time, and if the status region is associated with an active session, forgoing providing a tactile output that indicates that the status region is not associated with an active session, and optionally instead providing a different tactile output that indicates that the status region is associated with an active session, provides feedback about a state of the device.

In some embodiments, while continuing to detect the user input corresponding to the status region for the third threshold amount of time (e.g., after performing the operation associated with the respective application if the status region is associated with an active session, or providing the feedback associated with the user input if the status region is not associated with an active session), the computer system, in accordance with a determination that the user input is maintained with respect to the status region for a fourth threshold amount of time, contracts (1232) (e.g., reverses expansion of) the status region (e.g., the fourth threshold amount of time is reached when or after the third threshold amount of time is reached). For example, expanded session region 502-6 automatically contracts to condensed session region 502-5 after the fourth threshold amount of time in FIGS. 5I-5J. In some embodiments the status region is increased from a first size to a second size in response to initial detection of the user input corresponding to the status region. In some embodiments if the status region is not associated with an active session, the status region is contracted (e.g., back to the first size) in response to the fourth threshold amount of time elapsing since initial detection of the input, and the fourth threshold amount of time is at least the third threshold amount of time (e.g., the status region is contracted in conjunction with or after the tactile output is generated). In some embodiments, if the status region is associated with an active session of a respective application, the status region is expanded to include additional information about the respective application (e.g., further increased to a third size) in response to the input being maintained with respect to the status region for the third threshold amount of time, and later contracted (e.g., back to the first size) in response to the fourth threshold amount of time elapsing since the third threshold amount of time elapsed (e.g., the fourth threshold amount of time and the third threshold amount of time are consecutive time periods). Where the status region is expanded in response to a user input, shrinking the status region after the status region has been expanded for a threshold amount of time, even if the user input is still ongoing, causes the device to automatically cease providing feedback associated with the status region when no longer relevant.

In some embodiments, while a user input corresponding to the status region is not being detected (e.g., prior to detecting the user input of operation 1202), in accordance with a determination that the status region is associated with an active session of a respective application, the computer system displays (1234) in the status region information about the respective application, and displaying an animation of the status region that includes changing a size of the status region followed by reversing at least a portion of the change in size of the status region (e.g., oscillating in size, optionally repeatedly over time). For example, as described with reference to FIGS. 5AB-5AF, active sessions optionally oscillate in size. In some embodiments the status region expands and then contracts, for example to represent breathing in and out. Displaying an animation that oscillates the size of the status region if the status region is associated with an active session causes the device to automatically give visual emphasis to the status region while status information in the status region is actively being updated, thereby providing feedback about a state of the device.

In some embodiments, while a user input corresponding to the status region is not being detected (e.g., prior to detecting the user input of operation 1202), in accordance with a determination that the status region is not associated with an active session of a respective application, the computer system maintains (1236) the size of the status region. For example, the computer system displays the status region with a fixed size, without displaying the animation of the status region that changes the size of the status region back and forth (e.g., illustrated in FIGS. 5AB-5AF), and optionally without displaying in the status region information about a respective application. Maintaining the size of the status region (e.g., without displaying an animation that oscillates the size of the status region) if the status region is not associated with an active session causes the device to automatically forgo visual emphasis of the status region while the status region is not actively being updated, thereby providing feedback about a state of the device.

In some embodiments, the computer system displays (1238) the animation of the status region without regard to whether the status region is displayed in a first mode in which the status region includes a first amount of information about the respective application or displayed in a second mode in which the status region is expanded and includes a second amount of information about the respective application, wherein the second amount of information is greater than the first amount of information. For example, as described with reference to FIG. 5AC, expanded and/or condensed sessions optionally oscillate. Displaying an animation that oscillates the size of the status region if the status region is associated with an active session, whether the status region is in a condensed or further expanded state, causes the device to automatically give visual emphasis to the status region while status information in the status region is actively being updated, thereby providing feedback about a state of the device.

In some embodiments, the animation of the status region is displayed (1240) while (e.g., in accordance with a determination that) the status region is displayed in a first mode in which the status region includes a first amount of information about the respective application. In some embodiments, while a user input corresponding to the status region is not being detected, in accordance with the determination that the status region is associated with an active session of a respective application, while (e.g., in accordance with a determination that) the status region is displayed in a second mode in which the status region is expanded and includes a second amount of information about the respective application that is less than the first amount of information, the computer system animates the status region less than when the status region is displayed in the first mode, as described with reference to FIG. 5AC. In some embodiments animating the expanded status region less means maintaining the size of the expanded status region when displayed in the second display mode (e.g., displaying the expanded status region with a fixed size, by not displaying an animation that oscillates the size of the expanded status region, or by displaying an animation that oscillates the size of the expanded status region by a zero amount), whereas the status region in the first display mode oscillates in size (e.g., by a non-zero amount). In some embodiments animating the expanded status region less includes changing the size of the status region by a lesser amount and/or with a slower rate of change in the size of the status region. While the status region is associated with an active session, animating the size of the status region less when the status region is expanded than when the status region is condensed causes the device to automatically give visual emphasis to the smaller and less prominent condensed status region while status information in the status region is actively being updated (where visual emphasis is less important for the expanded status region, which is already more prominent due to its larger size), thereby providing feedback about a state of the device.

In some embodiments, in accordance with the determination that the status region is associated with the active session of the respective application (1242), in accordance with a determination that the active session is a first type of session (e.g., because the associated respective application is a first type of application and/or in a first class of applications), the animation of the status region changes the size of the status region at a first rate of change, and in accordance with a determination that the status region is a second type of session (e.g., because the associated respective application is a second type of application and/or in a second class of applications), the animation of the status region changes the size of the status region at a second rate of change that is different from the first rate of change, as described with reference to FIG. 5AC. Animating the size of the status region differently for different associated applications causes the device to automatically modify the manner of animation in a way that is appropriate for and indicative of the type of status information being displayed in the status region for a particular application, thereby providing feedback about a state of the device.

In some embodiments, displaying the information about the respective application includes (1244) displaying one or more user interface elements associated with (e.g., one or more elements of a user interface of) the respective application, and the animation of the status region changes the size of the status region at a rate that corresponds to (e.g., is based on) respective rates of change in size of the displayed one or more user interface elements associated with the respective application. For example, where an icon representing the respective application is displayed in the status region and changes in size at a particular rate, in some embodiments the status region changes in size at the same rate or at a rate that corresponds to the rate of change in size of the icon, as described with reference to FIG. 5AB. Animating the size of the status region at a rate that corresponds to the rate of animation of visual elements displayed in the status region causes the device to automatically give consistent visual emphasis to the status region and the visual elements displayed in the status region, thereby providing feedback about a state of the device.

In some embodiments, the animation of the status region changes (1246) the size of the status region at a rate that is based on (e.g., is selected based on) a degree of urgency of the information about the respective application that is displayed in the status region. In some embodiments in accordance with a determination that the information displayed in the status region is more urgent, the animation changes the size of the status region more quickly and/or sharply (e.g., a faster, more prominent, and/or more insistent animation that is more likely to draw a user's attention), whereas in accordance with a determination that the information displayed in the status region is less urgent, the animation changes the size of the status region more slowly and/or smoothly (e.g., a calmer animation), as described with reference to FIG. 5AB. Animating the size of the status region at a rate that is selected based on the urgency of the status information being displayed in the status region causes the device to automatically modify the manner of animation in a way that is appropriate for and indicative of the type of status information being displayed in the status region for a particular application, thereby providing feedback about a state of the device.

In some embodiments, while a user input corresponding to the status region is not being detected (e.g., prior to detecting the user input of operation 1202), in accordance with a determination that the status region is associated with an active session of a respective application and the active session is a first type of session, the computer system displays (1248) information about the respective application in the status region, and displaying an animation of the status region that includes changing a size of the status region followed by reversing at least a portion of the change in size of the status region (e.g., oscillating in size, optionally repeatedly over time). In some embodiments the status region expands and then contracts, for example to represent breathing in and out. In some embodiments, in accordance with a determination that the status region is associated with the active session of the respective application and the active session is a second type of session (e.g., the respective application is a second type of application and/or in a second class of applications), the computer system displays the information about the respective application in the status region without displaying the animation of the status region (e.g., maintaining the size of the status region), as described with reference to FIG. 5AB. For example, low battery notifications and other system status alerts are displayed in the status region without displaying the breathing animation of the status region. Animating the size of the status region differently for different associated applications, including animating the size of the status region for some applications but maintaining the size of the status region for other applications without displaying the animation, causes the device to automatically modify the manner of animation in a way that is appropriate for and indicative of the type of status information being displayed in the status region for a particular application, thereby providing feedback about a state of the device.

In some embodiments, while a user input corresponding to the status region is not being detected, in accordance with a determination that the status region is associated with an active session of a first application and with an active session of a second application, the computer system displays (1250), in a first portion of the status region, information about the first application, and displaying a first animation of the first portion of the status region that includes changing a size of the first portion of the status region followed by reversing at least a portion of the change in size of the first portion of the status region (e.g., oscillating in size, optionally repeatedly over time) and displays, in a second portion of the status region, information about the second application, and displaying a second animation of the second portion of the status region that includes changing a size of the second portion of the status region followed by reversing at least a portion of the change in size of the second portion of the status region (e.g., oscillating in size, optionally repeatedly over time). For example, as described with reference to FIGS. 5AE-5AF, both portion 502-8 of the session region and portion 502-9 of the session region oscillate. Where multiple applications have active sessions, and the active sessions are represented in different portions of the status region, animating the sizes of the different portions of the status region causes the device to automatically give visual emphasis to the different portions of the status region while status information in the different portions of the status region is actively being updated, thereby providing feedback about a state of the device.

In some embodiments, the first animation changes (1252) the size of the first portion of the status region in a different manner than the second animation changes the size of the second portion of the status region. For example, the first animation changes the size of the first portion of the status region at a different rate, in a different pattern of increases and decreases, and/or by a different amount than the second animation changes the size of the second portion of the status region. For example, as described with reference to FIGS. 5AE-5AF, portion 502-8 of the session region oscillates at a different rate than portion 502-9 of the session region. Where multiple applications have active sessions, and the active sessions are represented in different portions of the status region, animating the size of the different portions of the status region differently causes the device to automatically modify the manner of animation in a way that is appropriate for and indicative of the type of status information being displayed in a respective portion of the status region for a particular application, thereby providing feedback about a state of the device.

It should be understood that the particular order in which the operations in FIGS. 12A-12E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 1100, 1300, 1400, 1500, and 1600) are also applicable in an analogous manner to method 1200 described above with respect to FIGS. 12A-12E. For example, the session regions and user inputs described above with reference to method 1200 optionally have one or more of the characteristics of the session regions and user inputs described herein with reference to other methods described herein (e.g., methods 9000, 1000, 1100, 1300, 1400, 1500, and 1600). For brevity, these details are not repeated here.

FIGS. 13A-13E are flow diagrams illustrating method 1300 of displaying biometric enrollment information in a status region in accordance with some embodiments. Method 1300 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 1300 are, optionally, combined and/or the order of some operations is, optionally, changed.

In some embodiments, a method 1300 is performed at a computer system that is in communication with a display generation component having a display area, wherein the display area includes a status region (e.g., a session display region). In some embodiments the status region is a cutout from the display area, and in some embodiments forms an island in the surrounding display area (e.g., the boundary of the status region is within the boundary of the display area). In some embodiments the status region is encompassed within a separate, typically larger, application user interface display region (e.g., which surrounds, or at least extends above, below, to the left, and to the right of the status region).

The computer system displays (1302), in the display area outside of the status region (e.g., in an application user interface display region that encompasses the status region), a first user interface that includes a respective user interface element for initiating enrollment of a biometric feature of a user (e.g., a settings user interface for biometric authentication capabilities of the computer system, using for example facial recognition and/or fingerprint recognition), for example user interface 602 in FIG. 6A.

The computer system detects (1304) a user input directed to the respective user interface element to initiate enrollment of a biometric feature of the user, for example user input 604.

The computer system, in response to detecting the user input, performs (1306) a biometric enrollment process, including, while maintaining display of the first user interface in the display area outside of the status region displaying (1308), in the status region, a biometric enrollment user interface (e.g., including expanding the first display region while maintaining the status region as an island within the surrounding display area, such as within the first user interface) and updating (1310) the biometric enrollment user interface in the status region during the biometric enrollment process, including while capturing biometric information about the biometric feature of the user (e.g., via one or more optical and/or biometric sensors that are in communication with the computer system), to indicate a current status of the biometric enrollment process (e.g., including indicating that the biometric enrollment process has started, that biometric information is being captured, that the capturing of the biometric information has successfully completed or that one or more errors occurred during the capturing of biometric information, and/or other relevant status information about the biometric enrollment process). For example, session region 606-1 in FIG. 6B is a biometric enrollment user interface. In response to a user initiating biometric enrollment from a displayed user interface, indicating a current status of the biometric enrollment process in a dedicated status region that is expanded partially over the user interface provides feedback about a state of the device while making more efficient use of the display area.

In some embodiments, the computer system is (1312) in communication with one or more sensors, the one or more sensors are positioned within (e.g., entirely within) one or more sensor regions that are encompassed by the status region (e.g., surrounded by display area), and the display generation component is not capable of displaying content within the one or more sensor regions. For example, optical sensors 164, illustrated in FIG. 6B are encompassed by the session region 606-1. In some embodiments the one or more sensors include a depth sensor that captures data about a part of the user, such as the user's face, by projecting and analyzing a set of invisible dots to create a depth map of the part of the user, and/or an infrared sensor that captures an infrared image of the part of the user. Displaying the status region around one or more display cutouts for one or more sensors causes the device to automatically reduce the visual intrusiveness of the display cutouts and make more efficient use of the display area.

In some embodiments, the one or more sensors include (1314) a biometric sensor, and the biometric information about the biometric feature of the user is captured via the biometric sensor. For example, in addition to, or instead of, speaker 111 and/or optical sensors 164, one or more biometric sensors are positioned within the sensor cutouts illustrated in FIG. 6B. In some embodiments, optical sensors 164 include a biometric sensor. In some embodiments the biometric sensor is a sensor system that includes a depth sensor that captures data about a part of the user, such as the user's face, to create a depth map of the part of the user; an infrared sensor that captures an infrared image of the part of the user; a visible spectrum (red, green, and blue (RGB)) optical sensor (also called an RGB camera or more generally a camera); and/or a structured light emitter (also called a 3D scanner) that emits light that is used by the one or more sensors when capturing biometric data (e.g., by using the emitter to project light onto a physical surface and using the one or more sensors to capture and analyze the light pattern as reflected by the surface to determine the shape and features of the surface). Displaying feedback about a biometric enrollment process in a status region around a biometric sensor provides improved security and privacy by directing the user's focus toward the biometric sensor so as to improve the accuracy of the biometric information that is captured by the biometric sensor.

In some embodiments, prior to detecting the user input directed to the respective user interface element to initiate the enrollment of the biometric feature of the user, the computer system displays (1316), in the display area outside of the status region, one or more status indicators, wherein a respective status indicator indicates a state of a respective feature of the computer system (e.g., different status indicators indicate the state of different features). For example, status indicators for cellular network (e.g., indicator 608), Wi-Fi, and/or battery level (e.g., indicator 610) are displayed in FIG. 6A, before initiating enrollment of the biometric feature. In some embodiments the one or more status indicators include an icon indicating that the computer system is connected to an internet network (e.g., Wi-Fi), an icon indicating connection to a cellular network, text label(s) with the name of the network(s) to which the computer system is connected, an icon indicating connection to a mobile hotspot, an icon indicating a current time, an icon graphically indicating a current battery level and/or a text label that indicates the current battery level, and/or an icon indicating that notifications at the computer system are currently being deemphasized or silenced, or any combination thereof. In some embodiments more than one status indicator indicates the state of the same feature (e.g., an icon and a text label for the same feature, such as for battery level and/or cellular network connection). In some embodiments, in response to detecting the user input, the computer system expands the displayed status region (e.g., to have an increased display area, to better accommodate displaying the biometric enrollment user interface in the status region), wherein the biometric enrollment user interface is displayed in the expanded status region, and displays, in the expanded status region, a subset (e.g., one or more) of the one or more status indicators (e.g., instead of in the display area outside of the status region). For example, indicator 608 is displayed within session region 606-1, while indicator 610 is displayed outside of session region 608-1 in FIG. 6B. In some embodiments a status indicator that at least partially overlaps with the expanded status region is displayed in (e.g., subsumed into) the expanded status region rather than being repositioned elsewhere outside of the expanded status region. Moving one or more status indicators from outside of the status region to within the status region when the status region is expanded enables the status indicators to continue to be visible, to provide feedback about a state of the device.

In some embodiments, the subset of the one or more status indicators includes (1318) all of the one or more status indicators (e.g., the expanded status region overlaps with at least part of every status indicator that was displayed outside of the unexpanded status region). For example, in some embodiments, in FIG. 6B, all of the indicators (e.g., including indicators 608 and 610) are optionally displayed within the session region 606-1. In some embodiments all of the one or more status indicators are displayed in the expanded status region in accordance with the status region expanding over substantially all (e.g., at least 85%, 90%, 93%, or 95%) of a respective edge of the display area along which the one or more status indicates were displayed. In other words, if the status region expands so as to span nearly an entire edge (e.g., a top edge, left edge, or other edge) of the display area, and there is not enough display area left along that edge outside of the status region for displaying status indicators, any status indicators that were displayed along that edge before the status region expanded are displayed instead in the expanded status region. Moving all displayed status indicators from outside of the status region to within the status region when the status region is expanded enables the status indicators to continue to be visible while allowing the status region to be expanded as much as possible, to provide feedback about a state of the device.

In some embodiments, the computer system is (1320) in communication with one or more cameras (e.g., positioned within one or more sensor regions that are encompassed by the status region), and the computer system displays, in the biometric enrollment user interface, a representation of a user of the computer system, wherein the representation of the user is captured via the one or more cameras. For example, a representation of the user's face is provided within session region 606-1 in FIG. 6B, wherein the representation of the user is optionally captured by one or more optical sensors 164, and the user's representation updates as the user moves. Presenting a live camera preview of a user while enrolling a biometric feature of the user provides improved security and privacy by providing visual feedback indicating the person whose biometric information is being captured.

In some embodiments, in accordance with a determination that the capturing of the biometric information about the biometric feature of the user is completed successfully, the computer system displays (1322), in the biometric enrollment user interface, an indication of successful capture of biometric information. For example, FIG. 6C illustrates that an amount of progress is displayed within session region 606-2 by filling in, or otherwise lighting up, a circular progress bar that goes around the representation of the user's face. In some embodiments in accordance with a determination that the capturing of the biometric information has not yet successfully completed, the computer system continues capturing (or attempting to capture) biometric information and optionally continues to display, in the biometric enrollment user interface, a representation of the user (e.g., captured via one or more cameras) and/or an indication of current progress toward successfully capturing the biometric information. In some embodiments in accordance with a determination that the capturing of the biometric information is not successfully completed within a threshold amount of time (e.g., before the expiration of a threshold time period for capturing biometric information), the computer system displays, in the biometric enrollment user interface, an indication of failure to capture biometric information (e.g., an error message) and optionally ceases to display, in the biometric enrollment user interface, the representation of the user. Displaying an indication that biometric information has been successfully captured provides feedback about a state of the device.

In some embodiments, the computer system displays (1324), in the status region, an indication of whether the computer system is in a locked state or an unlocked state, for example as illustrated in session region 611-1 of FIG. 6F. In some embodiments the indication includes a closed lock symbol while the computer system is in a locked state and an open lock symbol while the computer system is in an unlocked state. In some embodiments the indication of whether the computer system is in the locked state or the unlocked state is displayed while a lock screen user interface is displayed in display area outside of the status region and/or within a threshold amount of time since the computer system has been unlocked in response to authentication of a user. In some embodiments the indication of whether the computer system is in the locked or unlocked state is displayed while displaying a user interface via the display generation component (e.g., while the display generation component is on). Indicating, in the status region, whether the computer system is currently locked or unlocked provides feedback about a state of the device in a consistent region of the display improving security of the device by clearly indicating whether the device is locked or unlocked.

In some embodiments, displaying, in the status region, the indication of whether the computer system is in the locked state or the unlocked state includes (1326), while the computer system is in the locked state, displaying, in the status region, an indication that the computer system is in the locked state (e.g., persistently for as long as the computer system remains in the locked state with the display generation component on). In some embodiments, while the computer system is in the locked state, the user interface displayed via the display generation component is a lock screen user interface, as illustrated in FIG. 6F. In some embodiments, displaying, in the status region, the indication of whether the computer system is in the locked state or the unlocked state includes, while the computer system is in the unlocked state, displaying, in the status region, an indication that the computer system is in the unlocked state (e.g., the unlocked lock icon in session region 611-2, FIG. 6G) for a threshold amount of time. In some embodiments the indication that the computer system is in the unlocked state is displayed for the threshold amount of time following the computer system being unlocked in response to authentication of a user. In some embodiments, displaying, in the status region, the indication of whether the computer system is in the locked state or the unlocked state includes after the threshold amount of time has elapsed, the computer system forgoes displaying, in the status region, the indication that the computer system is in the unlocked state (e.g., ceasing to display the indication that the computer system is in the unlocked state, or more generally ceasing to display the indication whether the computer is in the locked state or the unlocked state, while maintaining display of other portions of a displayed user interface). Persistently indicating that the computer system is locked versus indicating that the computer system is unlocked for only a certain amount of time and then ceasing to display the indication that the computer system is locked causes the device to automatically provide feedback about the current authentication state of the device when appropriate and otherwise reduce clutter in the user interface.

In some embodiments, the computer system is (1328) in communication with one or more sensors that are positioned within two or more sensor regions that are encompassed by the status region (e.g., and the display generation component is not capable of displaying content within the two or more sensor regions), and the indication of whether the computer system is in the locked state or the unlocked state is displayed in display area of the status region between a first sensor region (e.g., a depth camera, a structured light emitter, and/or proximity sensor) and a second sensor region (e.g., an RGB camera) of the two or more sensor regions, for example lock icon 5008 illustrated in FIGS. 5AY and 5AZ is displayed between the sensor cutouts. Indicating the current authentication state of the computer system in display area between sensor regions in the status region causes the device to automatically reduce the visual intrusiveness of the display cutouts and makes more efficient use of the display area.

In some embodiments, after performing the biometric enrollment process, the computer system detects (1330) one or more user inputs corresponding to a request for biometric authentication of a user of the computer system (e.g., to unlock the computer system, to authorize making a payment via the computer system, or to automatically fill one or more fields in a form). Examples of inputs corresponding to a request for biometric authentication of a user of the computer system include one or more (typically at least two) presses of a side or home button of the computer system (e.g., to authorize using a secure credential such as for payment, transit, and/or identification), or the activation of a software affordance that triggers biometric (e.g., face, iris, and/or fingerprint) authentication, such as a software button for logging into an account or accessing a secure application (e.g., e-mail, financial, health, or other accounts associated with sensitive personal information). For example, user input 613 in FIG. 6F corresponds to a request to unlock the device 100. In some embodiments, in response to detecting the one or more user inputs, the computer system displays, in the status region, feedback about a status of a biometric authentication process performed to authenticate the user to use the computer system, for example in session region 611-2 in FIG. 6G. In some embodiments the biometric authentication process is performed in response to detecting the one or more inputs. In some embodiments displaying the feedback about the status of the biometric authentication process includes, while performing the biometric authentication process, displaying an indication that the biometric authentication process is in progress and/or an indication as to which step or portion of the biometric authentication process is currently being performed. In some embodiments displaying the feedback about the status of the biometric authentication process includes, in accordance with a determination that the user is not authenticated to use the computer system, displaying an indication that the biometric authentication process failed (e.g., that the computer system remains locked, that the payment failed, or that the form fields were not filled). In some embodiments displaying the feedback about the status of the biometric authentication process includes, in accordance with a determination that the user is authenticated to use the computer system, displaying an indication that the biometric authentication process succeeded (e.g., that the computer system is being unlocked, that the payment succeeded, or that the form fields were filled). Displaying feedback about a status of a biometric authentication process in a status region provides improved security and privacy by keeping the user informed of authentication progress while reducing the display area needed for viewing feedback about a state of the device.

In some embodiments, in response to detecting the one or more user inputs, the computer system expands (1332) the status region, wherein the feedback about the status of the biometric authentication process is displayed in the expanded status region. For example, in some embodiments, session 611-2 (FIG. 6G) is displayed as an expanded session region. In some embodiments expanding the status region moves a centroid of the status region relative to the display area (e.g., the status region is expanded more in one direction than in the opposite direction, such as expanded more downward than upward). Expanding the status region to display the feedback about the status of the biometric authentication progress causes the device to automatically optimize the display area for displaying feedback about a state of the device.

In some embodiments, displaying the feedback about the status of the biometric authentication process includes (1334), in accordance with a determination that the user is not authenticated to use the computer system (e.g., in response to failure of the biometric authentication of the user), displaying an animation of the status region shaking (e.g., moving quickly back and forth, vertically, horizontally, and/or by rotating), for example as described with reference to session region 611-3 and session region 611-4 in FIGS. 6H and 6I. In some embodiments where the status region encompasses one or more sensor regions in which one or more sensors are positioned, the status region encompasses the one or more sensor regions even during the shaking of the status region (e.g., the shaking of the status region does not move the status region so much that the sensor regions cease to be fully encompassed within the boundary of the status region). For example, the status region is not moved so far to the right such that any part of any sensor region extends beyond the left boundary of the status region (and analogously for other movement directions). Displaying an animation of the status region shaking when biometric authentication has failed provides feedback about a state of the device.

In some embodiments, the one or more inputs corresponding to the request for biometric authentication correspond to (1336) a request to unlock the computer system and are received while the computer system is in a locked state. For example, user input 613 (FIG. 6F) is detected while the device 100 is in a locked state. Requiring successful biometric authentication to unlock the computer system, and displaying an animation of the status region shaking when the biometric authentication has failed, without unlocking the computer system, provides improved security and privacy and provides feedback about a state of the device.

In some embodiments, the one or more inputs corresponding to the request for biometric authentication correspond to (1338) a request to authorize using a secure credential (e.g., making a payment, presenting a transit identifier, and/or presenting an identification card) via the computer system (e.g., presenting the secure credential over a short range wireless connection to a wireless terminal such as NFC, Bluetooth, and/or Wi-Fi). For example, the user input 613 corresponds to a request to use a stored payment method, and the device 100 initiates the steps for biometric authentication before allowing the user to use the stored payment method. Requiring successful biometric authentication to use the computer system to present a secure credential (e.g., to make a transaction or present identification), and displaying an animation of the status region shaking when the biometric authentication has failed, without authorizing the use of the secure credential, provides improved security and privacy and provides feedback about a state of the device.

In some embodiments, the one or more inputs corresponding to the request for biometric authentication correspond to (1340) a request to automatically populate one or more fields in a form displayed via the display generation component of the computer system (e.g., while the computer system is unlocked) with information stored by the computer system (e.g., a user name, password, address, phone number, and/or credit card information), as described with reference to FIG. 6H. Requiring successful biometric authentication to automatically fill in fields in a form on the computer system with personal information (e.g., a name, a user name, password, address, telephone number, and/or billing information) stored by the computer system, and displaying an animation of the status region shaking when the biometric authentication has failed, without automatically filling in the form fields, provides improved security and privacy and provides feedback about a state of the device.

In some embodiments, the one or more inputs correspond to (1342) a request to unlock the computer system (e.g., detecting the one or more inputs includes detecting that the computer system is being lifted, detecting that a user's face or iris or other biometric feature is brought into view of one or more cameras of the computer system, and/or detecting a swipe gesture or other system wake gesture on an input device such as a touchscreen of the computer system). In some embodiments, the one or more inputs are detected while the computer system is in a locked state and while displaying, in display area outside of the status region, a first user interface that is accessible while the computer system is in the locked state (e.g., a lock screen user interface or a lock screen widgets user interface). For example, session region 611-2 (FIG. 6G) provides visual feedback that the device 100 is attempting to authenticate the user. Requiring successful biometric authentication to unlock the computer system, and displaying feedback about a status of a biometric authentication process in a status region while displaying a locked-state system user interface in display area outside of the status region, provides improved security and privacy while making more efficient use of the available display area.

In some embodiments, in response to detecting the one or more user inputs, in accordance with a determination that the user is authenticated to use the computer system, the computer system displays (1344), in the status region, an animation indicating that the computer system is being unlocked (e.g., animating the opening of a closed lock and/or displaying a check mark), and while (e.g., concurrently with) displaying the animation indicating that the computer system is being unlocked, the computer system displays, in display area outside of the status region, a transition from the first user interface to a second user interface that is not accessible while the computer system is in the locked state, as described with reference to FIGS. 6K-6L. In some embodiments, the second user interface comprises a home screen user interface (e.g., home screen user interface 618) or a user interface of a respective software application, which in some embodiments are only accessible while the computer system is in the unlocked state). In some embodiments in accordance with the determination that the user is authenticated to use the computer system, the computer system is transitioned to the unlocked state (e.g., the displaying of the second user interface is indicative of the computer system transitioning to the unlocked state). In some embodiments the transition from the first user interface to the second user interface starts before an end of the animation indicating that the computer system is being unlocked. Upon successful biometric authentication to unlock the computer system, using the status region to display an unlock animation while transitioning from a locked-state user interface to an unlocked-state user interface outside of the status region makes more efficient use of the display area while speeding up the transition to the unlocked state, in contrast to implementations where the unlock animation must finish playing before the transition to an unlocked-state user interface can take place.

In some embodiments, while displaying the first user interface, prior to detecting the one or more inputs, the computer system displays (1346), in the first user interface, an indication that the computer system is locked (e.g., a closed lock symbol), and in response to detecting the one or more inputs, displays an animation of the indication moving from the first user interface to the status region. For example, in FIG. 6F, the lock icon is initially displayed in the user interface 612 (e.g., above the time indication and/or date indication), and in response to user input 613, the lock icon is moved to the session region 611-1. Moving the indication that the computer system is locked from display area outside of the status region into the status region upon detecting an authentication attempt to unlock the computer system causes the device to automatically allocate more display area that can be used for displaying feedback about the authentication process while continuing to provide feedback about a state of the device.

In some embodiments, in response to detecting the one or more inputs, the computer system updates (1348) an appearance of the indication in accordance with the status of the biometric authentication process, for example as illustrated in session region 611-2 in FIG. 6G. In some embodiments, the computer system displays an animation representing performing the biometric authentication process and/or whether authentication has succeeded and the computer system is transitioning to the unlocked state, or whether authentication has failed and the computer system remains in the locked state. Updating the appearance of the indication that the computer system is locked, based on the progress of the biometric authentication process, while the indication is displayed in the status region reduces the display area needed for viewing feedback about a state of the device.

In some embodiments, in response to detecting the one or more user inputs, in accordance with a determination that the user is authenticated to use the computer system (e.g., in response to successful authentication of the user), the computer system displays (1350) a respective user interface that is not accessible while the computer system is in the locked state, for example home screen user interface 618 in FIG. 6L is displayed in accordance with successful authentication. In some embodiments, the respective user interface is a home screen user interface or a user interface of a respective software application, which in some embodiments are only accessible while the computer system is in the unlocked state. In some embodiments, in accordance with the determination that the user is authenticated to use the computer system, the computer system is transitioned to the unlocked state (e.g., the displaying of the respective user interface is indicative of the computer system transitioning to the unlocked state). In some embodiments, the computer system updates the indication (e.g., displaying an animation changing the appearance of the indication) from a locked (or unauthenticated) appearance to an unlocked (or authenticated) appearance (e.g., animating the opening of a closed lock and/or displaying a check mark), as illustrated by the unlocked lock icon in session region 611-5 in FIG. 6K. Upon successful biometric authentication, updating the indication displayed in the status region to indicate that the computer system has been unlocked, and displaying an unlocked-state user interface in display area outside of the status region, provides feedback about a state of the device.

In some embodiments, in response to detecting the one or more user inputs, in accordance with a determination that the user is not authenticated to use the computer system (e.g., in response to failure of the authentication of the user), the computer system displays (1352) an animation of the indication moving from the status region to the first user interface (optionally at least partially reversing the animation of the indication moving from the first user interface to the status region). For example, after the unsuccessful attempt to authenticate described with reference to FIGS. 6H-6I, the lock icon is animated as moving from display within session region 611-4 to the display area outside of the session region. In some embodiments the computer system maintains display of the first (e.g., lock screen) user interface outside of the status region. In some embodiments the computer system transitions to displaying a different lock screen user interface for a different means of authentication (e.g., a user interface for passcode entry rather than biometric authentication). Upon failure of the biometric authentication for unlocking the computer system, displaying an animation of the lock indication moving out of the status region into the locked-state user interface displayed in display area outside of the status region gives visual prominence to feedback provided about a state of the device.

In some embodiments, detecting the one or more user inputs includes (1354) receiving a first form of authentication from the user (e.g., biometric information, captured via one or more optical and/or biometric sensors of the computer system, about a respective biometric feature of the user). In some embodiments, in response to detecting the one or more inputs, in accordance with a determination that the user is not authenticated to use the computer system, based on a determination that the first form of authentication received from the user is not enrolled with the computer system, the computer system increases a size of the indication that the computer system is locked and displays a third user interface prompting the user to input a second form of authentication that is different from the first form of authentication (e.g., biometric information about a different biometric feature, such as a fingerprint instead of a face, or a form of authentication other than biometric information, such as a passcode or password), for example, user interface 616 (FIG. 6J) prompts the user for a passcode. In some embodiments the larger indication that the computer system is locked is displayed in the third user interface. In some embodiments the third user interface prompting input of a different form of authentication is a password or passcode entry user interface that includes a plurality of buttons (e.g., alphanumeric and/or symbol keys) that are activatable via user input directed to the buttons to enter characters of a password or passcode. Upon failure of the biometric authentication for unlocking the computer system, increasing the size of the lock indication (whether the lock indication is maintained in the status region or is moved out of the status region) and automatically displaying, in display area outside of the status region, a user interface for the user to input a different form of authentication causes the device to automatically present a different way to provide proper authentication credentials and gives visual prominence to feedback provided about a state of the device.

In some embodiments, in response to detecting the one or more inputs, in accordance with the determination that the user is not authenticated to use the computer system, the computer system continues (1356) to display the indication in the status region (and optionally increases the size of the indication while displaying the indication in the status region), as illustrated in FIGS. 6H-6J. In some embodiments if the indication continues to be displayed in the status region, the size of the indication is maintained (e.g., not increased). Continuing to display the lock indication in the status region if the biometric authentication for unlocking the computer system has failed provides feedback about a state of the device in a consistent region of the display, thereby reducing an amount of time needed to perform a particular operation on the device.

In some embodiments, in response to detecting the one or more inputs, in accordance with the determination that the user is not authenticated to use the computer system, the computer system ceases (1358) to display, in the status region, the feedback about the status of the biometric authentication process. For example, the session region 611-4 collapses to the minimized session region and ceases to display the lock icon, or other indication of biometric authentication. Upon failure of the biometric authentication for unlocking the computer system, ceasing to display in the status region an indication that biometric authentication is in progress and/or feedback about the biometric authentication process provides feedback about a state of the device.

In some embodiments, the computer system displays (1360), in the status region, status information about one or more software applications on the computer system (e.g., distinct from software for the biometric enrollment process and/or the biometric authentication process), as described with reference to FIG. 5A. In some embodiments the status information about a respective application of the one or more software applications is displayed in accordance with a determination that the status region is associated with active session of the respective application, such as any of the different types of status information and associated software applications or system software described herein with reference to method 9000, and is in some cases displayed while the computer system is locked and/or after the computer system has been unlocked (e.g., while the computer system is unlocked). In some embodiments status information that is displayed in the status region during an associated active session remains in the status region as the computer system is transitioned from the locked state to the unlocked state or vice versa. In some embodiments some status information (e.g., for certain types of software applications or system software) that is displayed in the status region while the computer system is unlocked is displayed outside of the status region while the computer system is locked, as described herein with reference to method 1000. In some embodiments the status information about the one or more software applications is displayed concurrently with feedback about biometric enrollment and/or biometric authentication. In some embodiments the status information about the one or more software applications and/or system software is displayed outside of when the status region is being used to display feedback about biometric enrollment and/or biometric authentication (e.g., during the biometric enrollment or biometric authentication processes, the status region temporarily ceases to display status information about other active software applications and instead displays the feedback about the biometric enrollment or biometric authentication processes). Displaying information about the current states of active applications in the same status region in which feedback associated with biometric authentication is displayed enables the user to view different types of status information for the computer system in a consistent region of the display, thereby reducing an amount of time needed to perform a particular operation on the device.

It should be understood that the particular order in which the operations in FIGS. 13A-13E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 1100, 1200, 1400, 1500, and 1600) are also applicable in an analogous manner to method 1300 described above with respect to FIGS. 13A-13E. For example, the session regions and user inputs described above with reference to method 1300 optionally have one or more of the characteristics of the session regions and user inputs described herein with reference to other methods described herein (e.g., methods 9000, 1000, 1100, 1200, 1400, 1500, and 1600). For brevity, these details are not repeated here.

FIGS. 14A-14C are flow diagrams illustrating method 1400 of displaying updates for a virtual assistant in a sensor region in accordance with some embodiments. Method 1400 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

In some embodiments, method 1400 is performed at a computer system (1402) that is in communication with one or more sensors (e.g., one or more optical sensors) and with a display generation component having a display area, wherein the one or more sensors are positioned within (e.g., entirely within) one or more sensor regions that are surrounded by the display area, the display generation component is not capable of displaying content within the one or more sensor regions (e.g., one or more non-display regions that form holes in the display area), and a first display region (e.g., a session display region) of the display area encompasses the one or more sensor regions.

The computer system detects (1404) a user input invoking a virtual assistant of the computer system. For example, voice command 803 (FIG. 8A) invokes the virtual assistant.

The computer system, in response to detecting the user input invoking the virtual assistant, displays (1406), in the first display region, a visual indication that the virtual assistant is active and receives a voice command directed to the virtual assistant (e.g., as part of the user input invoking the virtual assistant, or after invoking the virtual assistant and while the virtual assistant is active), for example session region 802-2, FIG. 8B.

The computer system, in response to receiving the voice command directed to the virtual assistant (1408), performs (1410) an operation responsive to the voice command and updates (1412) the first display region, including displaying an outcome of the operation performed in response to the voice command, wherein the updating includes displaying visual elements that are selected so as to avoid overlapping locations of the one or more sensors in the first display region. For example, if the voice command poses a question, the computer system updates the first display region to include a response to the query, such as responding to the voice command 804 "what's the weather" with a response in the session region 802-4 and optionally information displayed in user interface element 806 outside of the session region, as illustrated in FIGS. 8C-8D. In another example, if the voice command is a search query, the computer system performs a search on the search query and displays one or more search results in the first display region. In other examples, if the voice command includes a request to set a timer or reminder, the computer system sets the timer or reminder and displays progress of the timer or a preview of the reminder in the first display region. Displaying, in a dedicated status region that encompasses one or more display cutouts for one or more sensors, feedback for invoking or interacting with a virtual assistant, including displaying visual elements that are selected so as to avoid overlapping the cutouts causes the device to automatically reduce the visual intrusiveness of the display cutouts and make more efficient use of the display area, as well as automatically optimize the placement of the status information to avoid truncation or distortion of the virtual assistant feedback.

In some embodiments, in response to detecting the user input invoking the virtual assistant, the computer system outputs (1414) feedback indicating that the virtual assistant has been invoked. For example, the icon displayed in session region 802-2 (FIG. 8B) is an icon that represents the virtual assistant. In some embodiments the feedback indicating that the virtual assistant has been invoked includes the visual indication that the virtual assistant is active. In some embodiments the feedback indicating that the virtual assistant has been invoked includes audio and/or tactile feedback. In some circumstances, the user input invoking the virtual assistant is detected while a respective application has an active session and visual elements associated with the respective application (e.g., indicating a current state of the respective application) are already displayed in the first display region. In some embodiments in response to detecting the user input invoking the virtual assistant, the visual elements associated with the respective application cease to be displayed (e.g., temporarily) while the virtual assistant is active (e.g., while visual elements associated with the virtual assistant, such as the visual indication that the virtual assistant is active and/or the outcome of the operation performed in response to the voice command directed to the virtual assistant, are displayed). In some embodiments, in response to an input dismissing the virtual assistant, the visual elements associated with the respective application are redisplayed in the first display region. Displaying, in the status region, an indication that the virtual assistant has been invoked provides feedback about a state of the device.

In some embodiments, detecting the user input invoking the virtual assistant includes (1416) detecting, via a microphone of the computer system, voice input that includes a predefined keyword phrase associated with the virtual assistant (e.g., the virtual assistant is invoked, and the visual indication that the virtual assistant is active is displayed, in accordance with a determination that the predefined keyword phrase has been detected). For example, voice command 803 corresponds to the keyword phrase "Virtual assistant." In some embodiments voice input that does not include the predefined keyword phrase does not invoke the virtual assistant. Example keyword phrases include a term such as "Agent," "Assistant," "Helper," or similar term for an assistant; and/or a name of the virtual assistant, which could be user-defined or a system default; optionally beginning with a greeting such as "Hey," "Hello," "Okay," or similar greeting. Detecting a spoken keyword phrase associated with the virtual assistant enables the virtual assistant to be invoked without displaying additional controls.

In some embodiments, detecting the user input invoking the virtual assistant includes (1418) detecting activation of an input device of the computer system using a predefined input gesture associated with the virtual assistant (e.g., a tap or single press, double tap or double press, long press, or other gesture on a touch-sensitive surface, button, or keypad of the computer system). For example, in FIG. 8A, instead of voice command 803, the user is enabled to invoke the virtual assistant using a gesture and/or selection of a button. Detecting a predefined input gesture associated with the virtual assistant enables the virtual assistant to be invoked without displaying additional controls.

In some embodiments, in response to receiving the voice command directed to the virtual assistant, the computer system associates (1420) the first display region with an active session of a respective application (e.g., by executing the respective application or otherwise establishing the active session) associated with the operation performed, wherein the visual elements displayed in the first display region represent the active session of the respective application and indicate a current state of the respective application. For example, in FIG. 8F, session region 802-6 is updated to display status information for the active timer session that was initiated by the virtual assistant. Displaying a response from the virtual assistant in the same status region as the indication that the virtual assistant was invoked enables the user to view different types of feedback associated with the virtual assistant in a consistent region of the display, thereby reducing an amount of time needed to perform a particular operation on the device.

The In some embodiments, performing the operation responsive to the voice command includes (1422) setting a timer (and, optionally, starting the timer) (e.g., the voice command includes a request to set a timer), and the visual elements displayed in the first display region include one or more elements of a timer user interface (e.g., a timer or stopwatch icon, an amount of time remaining, and/or a stop and/or start button), as illustrated in session region 802-6 (FIG. 8F). In some embodiments the computer system establishes an active session of a clock application (e.g., in a stopwatch, alarm, or timer mode). Using a voice command to a virtual assistant to set a timer, and displaying a status of the timer in the status region using elements of an associated timer user interface, reduces the number of inputs needed to set a timer and the amount of display area needed for viewing feedback about a state of the device.

In some embodiments, performing the operation responsive to the voice command includes (1424) setting an alarm (e.g., the voice command includes a request to set an alarm), and the visual elements displayed in the first display region include one or more elements of an alarm clock user interface (e.g., an alarm clock icon, a time when the alarm will ring, a button to confirm setting the alarm, and/or a button to cancel setting the alarm). For example, the voice command 808 in FIG. 8E is a request to set an alarm. Using a voice command to a virtual assistant to set an alarm, and displaying a status of the alarm in the status region using elements of an associated alarm clock user interface, reduces the number of inputs needed to set an alarm and the amount of display area needed for viewing feedback about a state of the device.

In some embodiments, performing the operation responsive to the voice command includes (1426) obtaining navigation instructions to a destination (e.g., the voice command includes a request for directions to a destination), and the visual elements displayed in the first display region include one or more of the navigation instructions to the destination (e.g., an initial navigation instruction starting from the current location of the computer system). In some embodiments the visual elements include one or more other elements of a map application user interface (e.g., in a turn-by-turn navigation mode), such as a graphic indicating a current orientation or travel direction of the computer system, a portion of a map of the vicinity of the computer system, the name of the current street on which the computer system is located or traveling, a direction of a next turn (e.g., indicating whether to turn left, right, or continue ahead), a distance to the next turn, and/or the street name of the next turn). For example, the voice command 808 in FIG. 8E is a request to for directions. Using a voice command to a virtual assistant to request directions to a destination, and displaying the resulting navigation instructions in the status region, optionally using elements of an associated map user interface, reduces the number of inputs needed to obtain navigation instructions and the amount of display area needed for viewing them.

In some embodiments, the computer system displays (1428), in display area outside of the first display region, a user interface of respective software (e.g., an operating system or a particular software application) that is different from the respective application whose active session is associated with the first display region. In some embodiments, after updating the first display region in response to receiving the voice command directed to the virtual assistant, the computer system detects one or more user inputs directed to the user interface of the respective software. Examples of inputs directed to respective software displayed outside of the first display region include presses of a button, icon, menu, or other affordance in the user interface of the respective software, inputs to scroll, pan, and/or zoom content displayed in the user interface, and drag and drop inputs to move content of the user interface from one place to another. In some embodiments, in response to detecting the one or more user inputs directed to the user interface of the respective software, the computer system performs one or more operations defined by the respective software while continuing to display, in the first display region, the visual elements representing the active session of the respective application and indicating the current state of the respective application, including updating the visual elements in accordance with one or more changes in the current state of the respective application (e.g., the visual elements are updated repeatedly over time based on changes in the current state of the respective application over time). For example, session region 802-7 continues to be updated with status information for the timer session in FIG. 8G even as the user navigates to other user interfaces. Continually updating information about the current state of an active application and/or feedback associated with an invoked virtual assistant in the same status region, during interaction with one or more other applications in display area outside of the status region, enables the user to view different types of status information for the computer system in a consistent region of the display while making more efficient use of the display area, thereby reducing an amount of time needed to perform a particular operation on the device.

In some embodiments, displaying the outcome of the operation performed in response to the voice command includes (1430) displaying text and/or image content that is responsive to the voice command (e.g., an answer to a question, search results in response to a search query, or directions to and/or an image of a requested destination). For example, session region 802-4 in FIG. 8D illustrates content that is responsive to the voice command 804. Displaying, in the status region, text and/or image content as part of a response to a voice command directed to a virtual assistant reduces the amount of display area needed for viewing feedback about a state of the device.

In some embodiments, the visual elements include (1432) the text and/or image content and are positioned so as to avoid overlapping locations of the one or more sensors in the first display region (e.g., the visual elements are displayed in their entirety in the first display region, without being clipped or truncated by one or more sensor regions cut out from the display area within the first display region). For example, session region 802-4 in FIG. 8D illustrates content that is responsive to the voice command 804, without overlapping the sensor cutouts. Positioning text and/or image content in the status region so as to avoid overlapping locations of one or more sensors in the status region causes the device to automatically reduce the visual intrusiveness of the display cutouts and make more efficient use of the display area, as well as automatically optimize the placement of the status information to avoid truncation or distortion of the virtual assistant feedback.

Figure 8G:
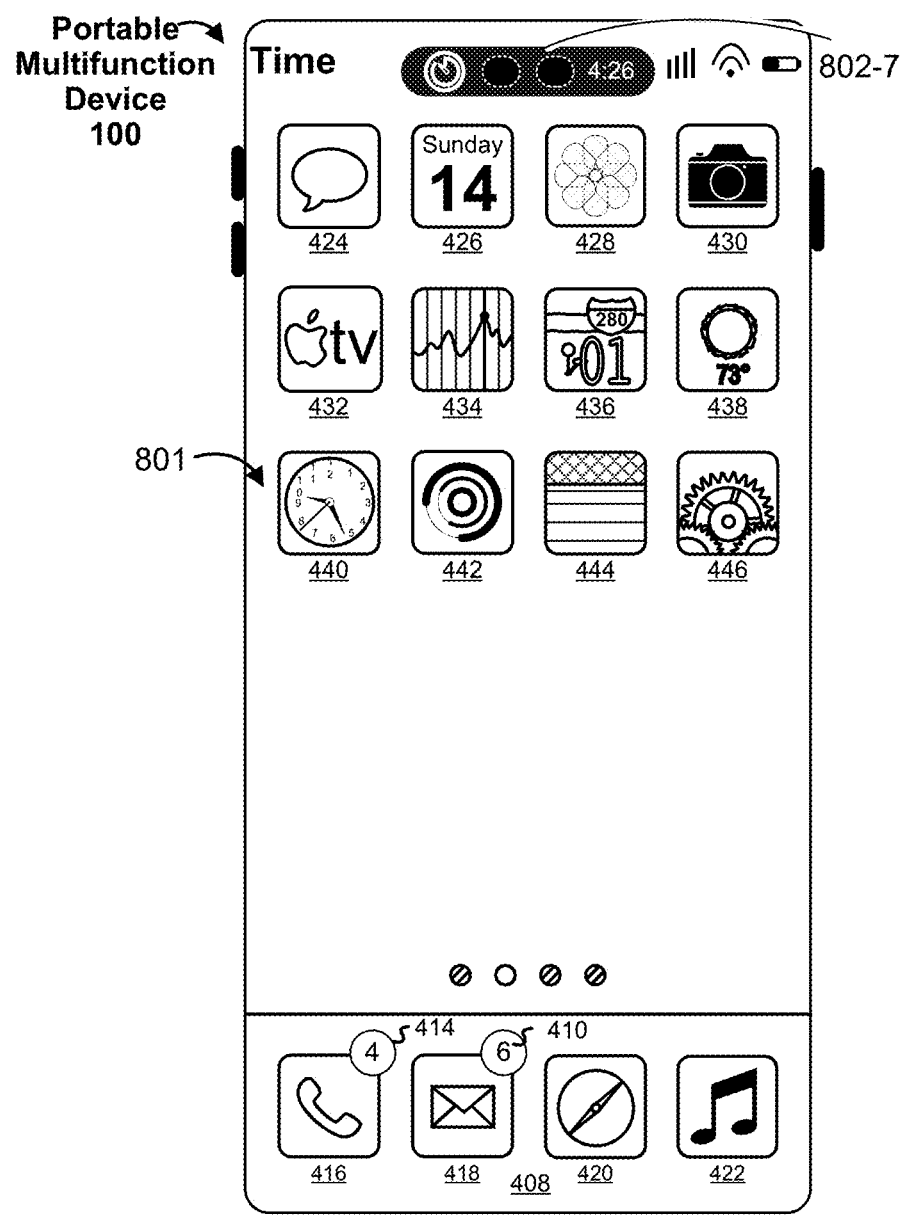
Figure 9A:
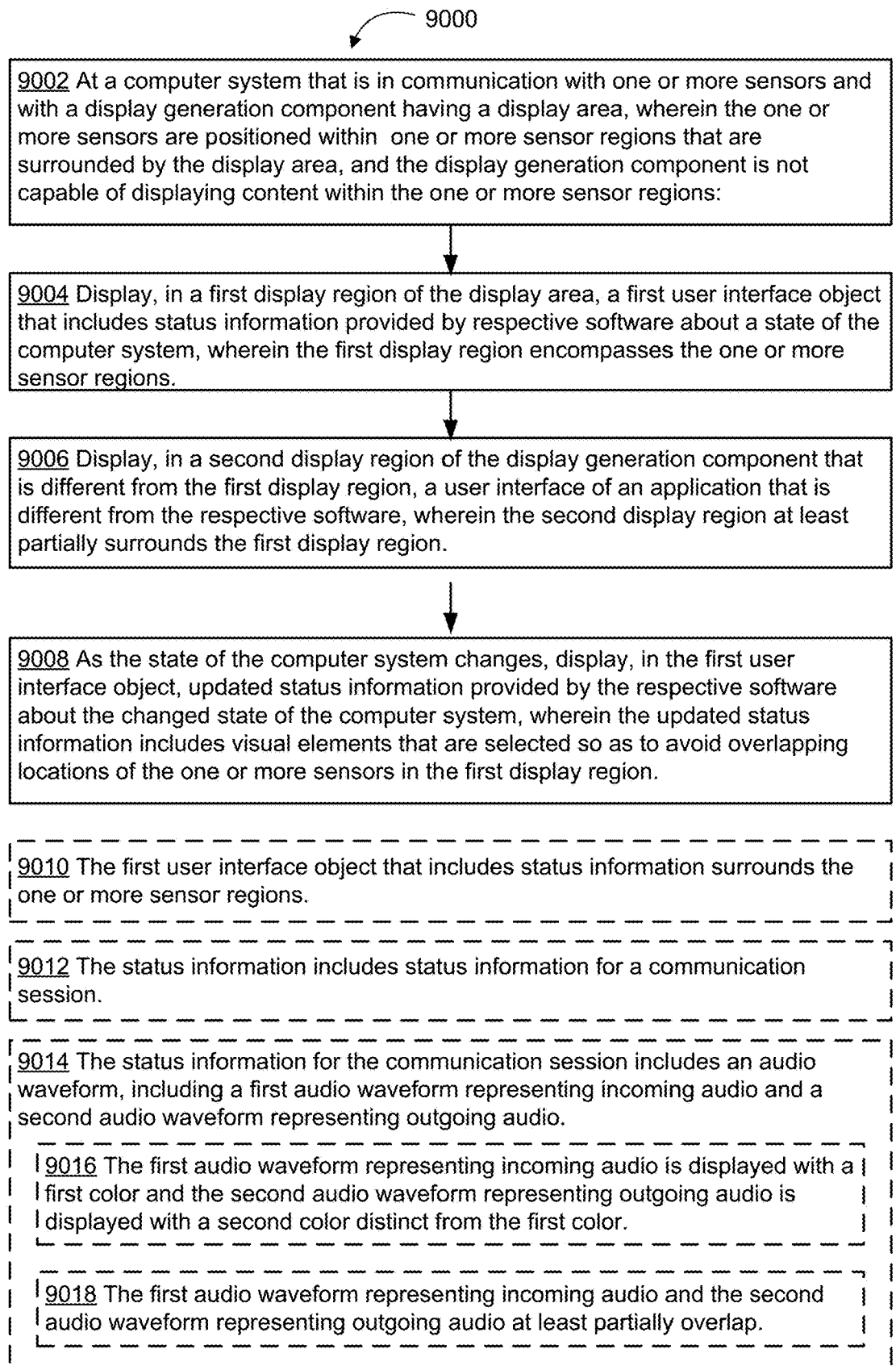
Figure 9D:
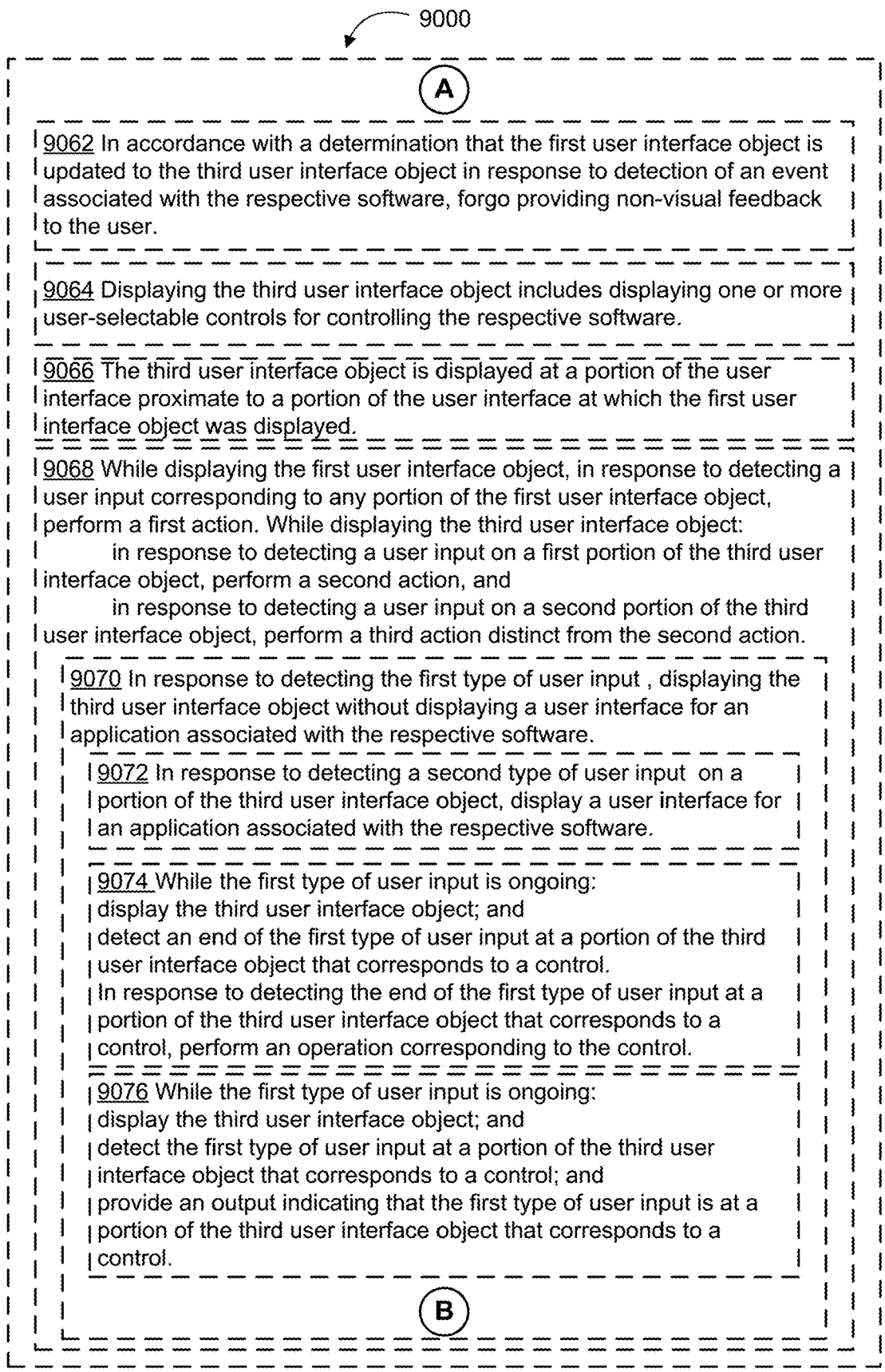
Figure 10A:
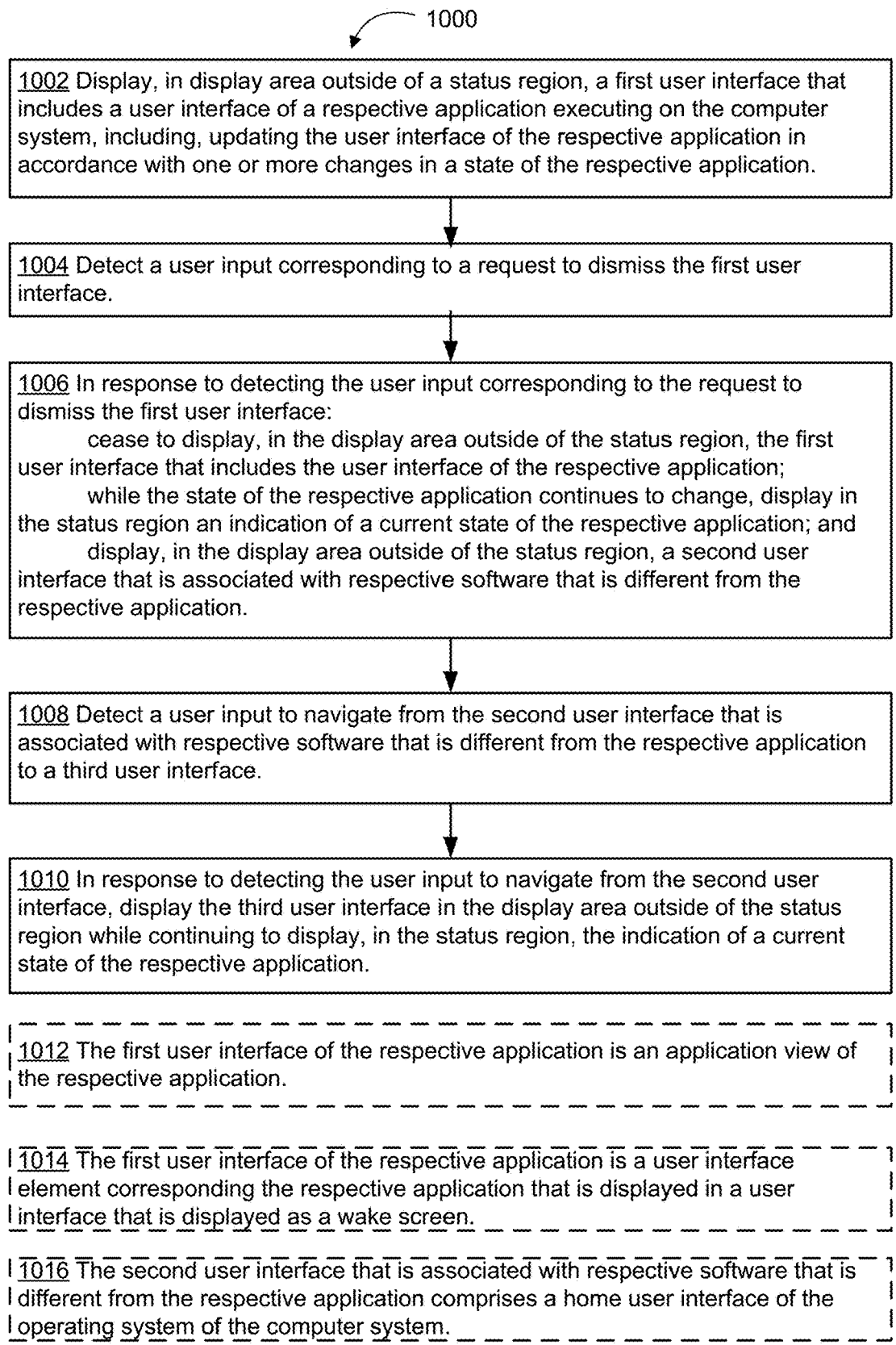
Figure 11A:
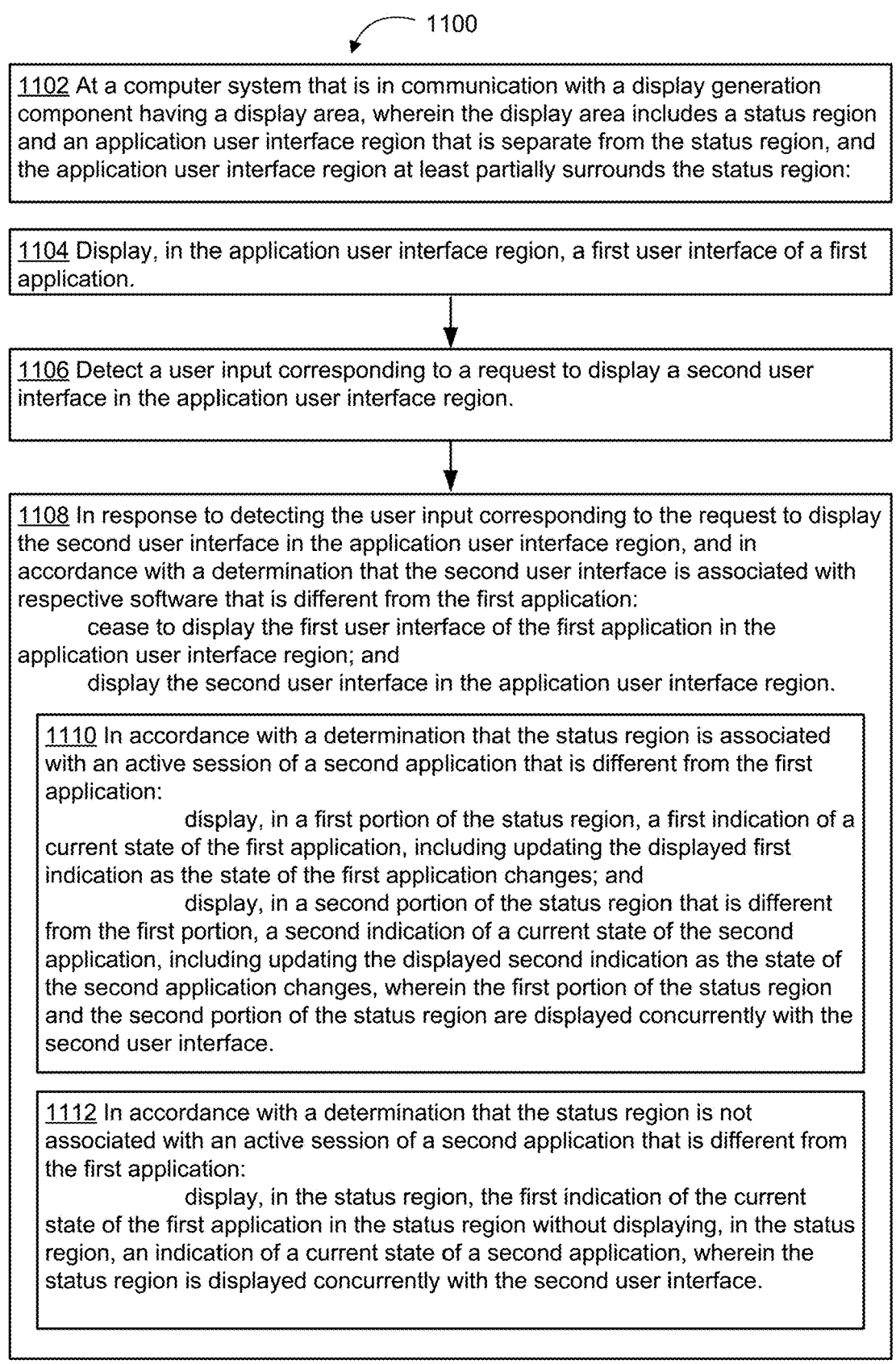
Figure 12A:
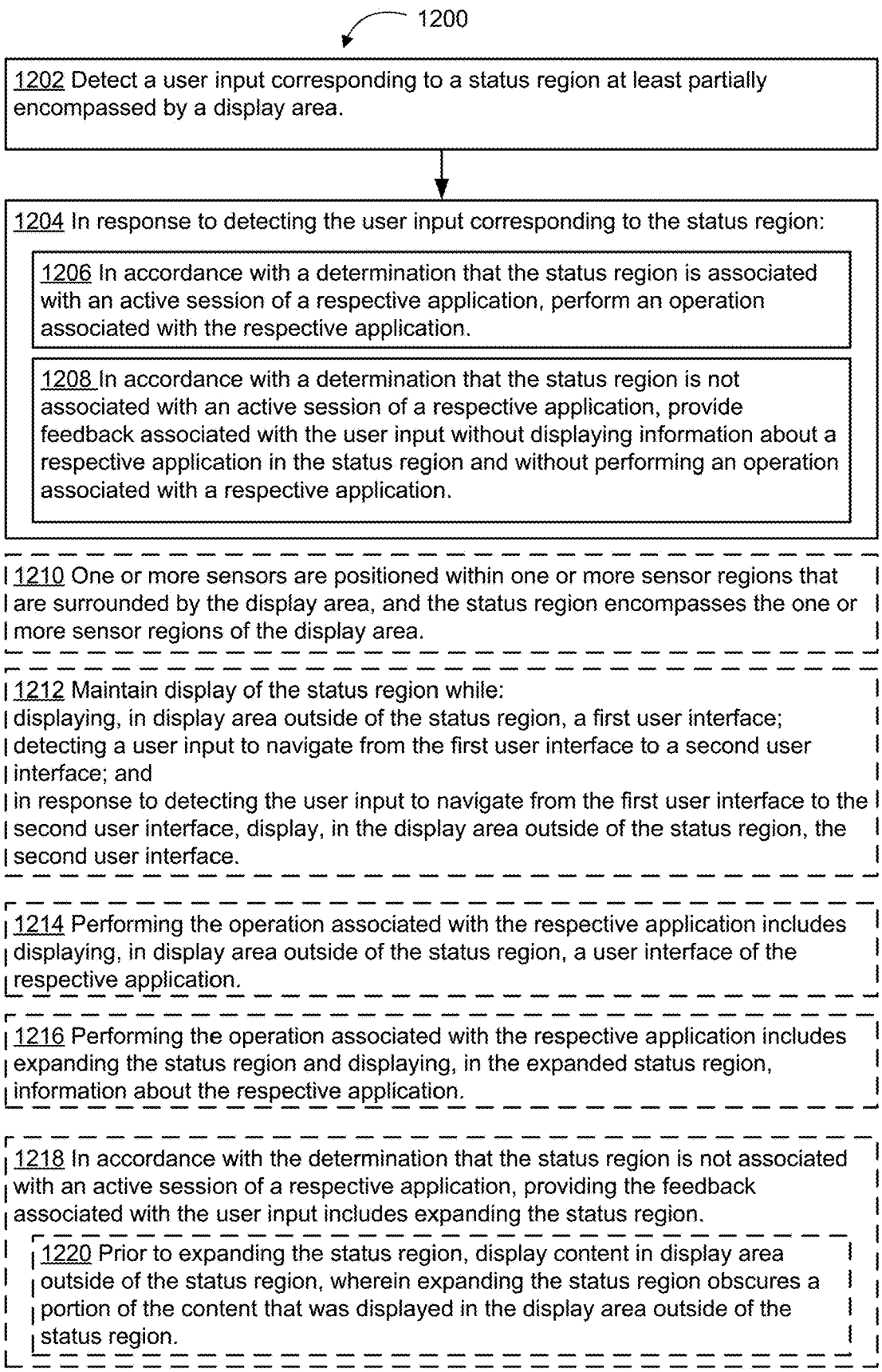
Figure 13A:
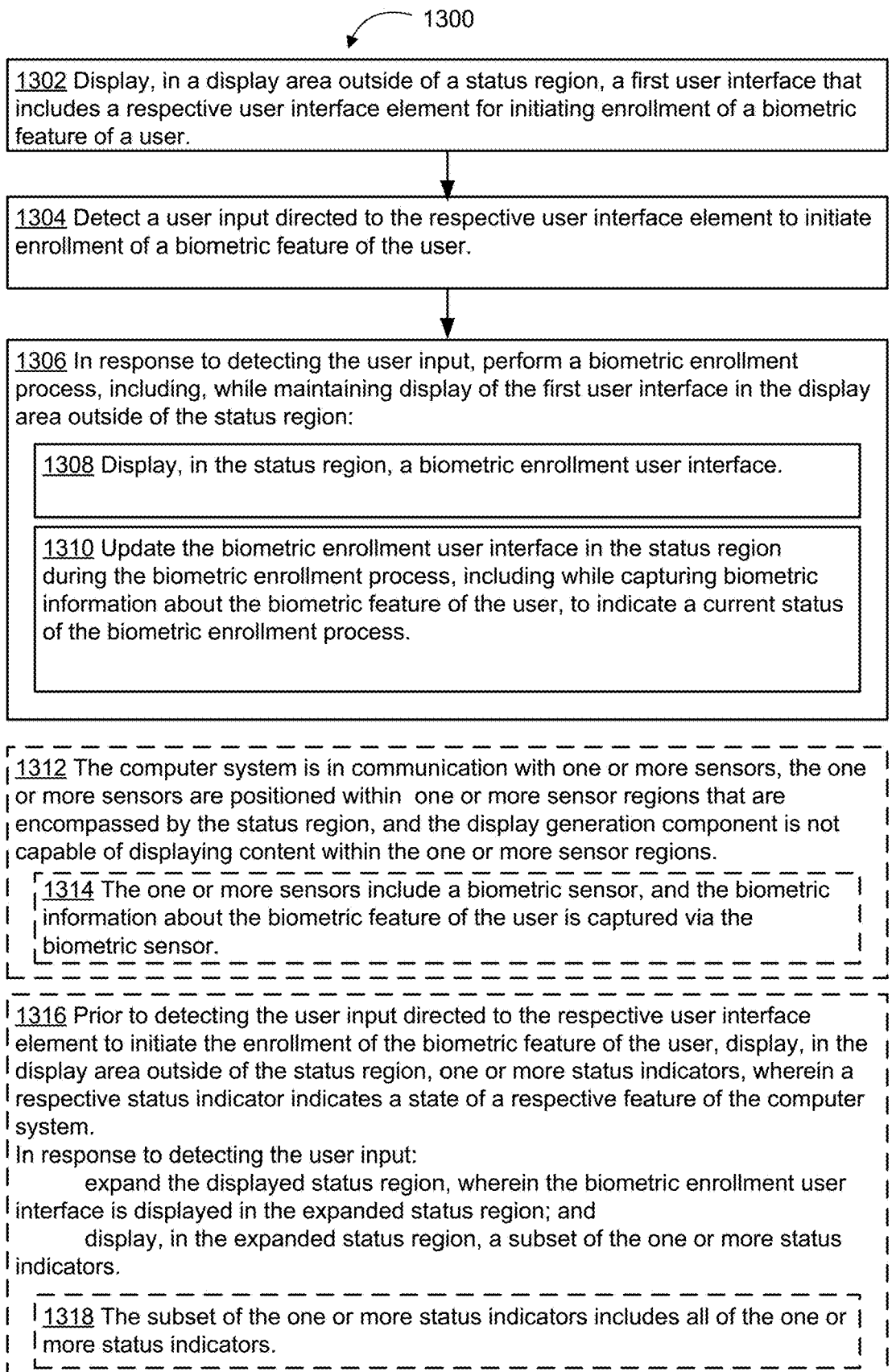
Figure 13C:
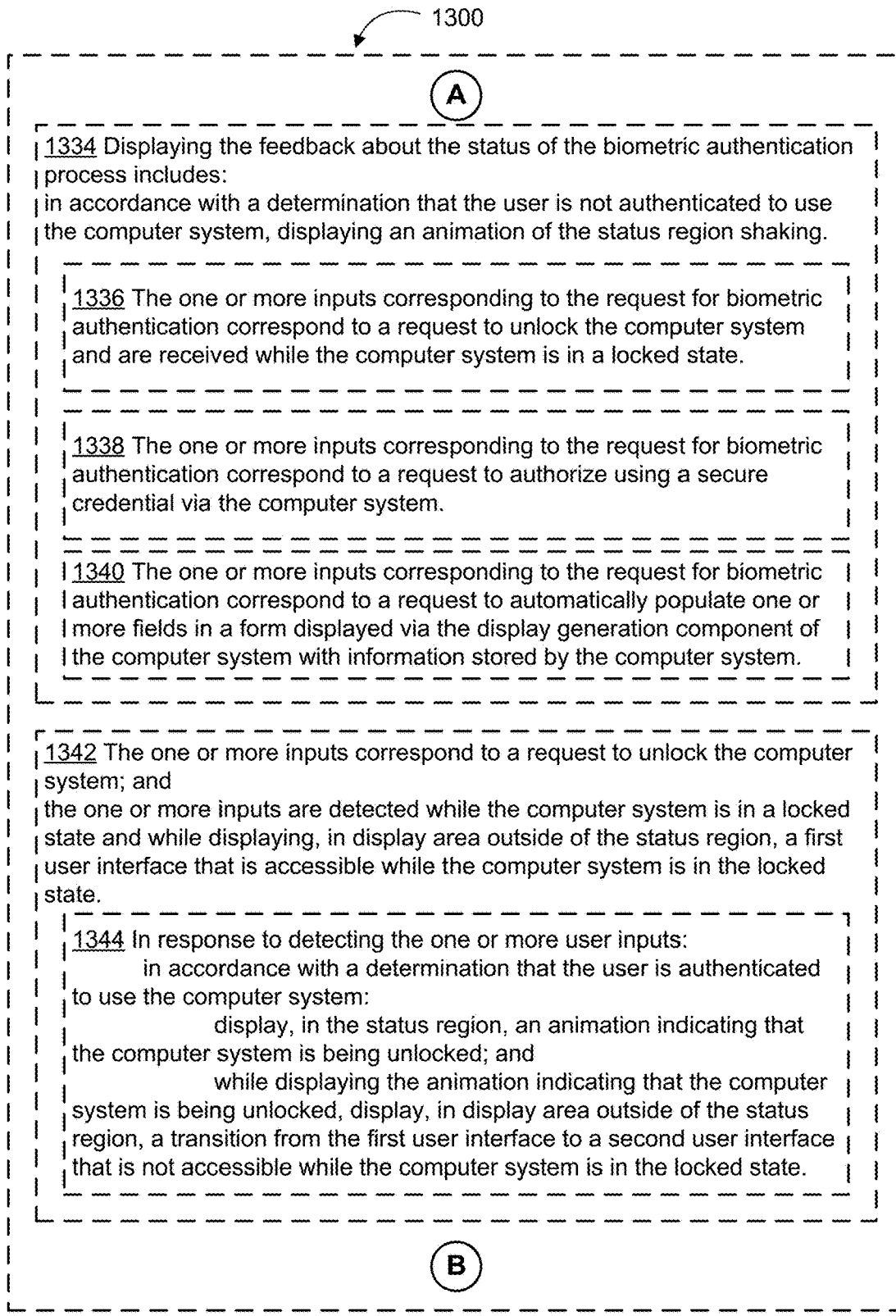
Figure 13D:
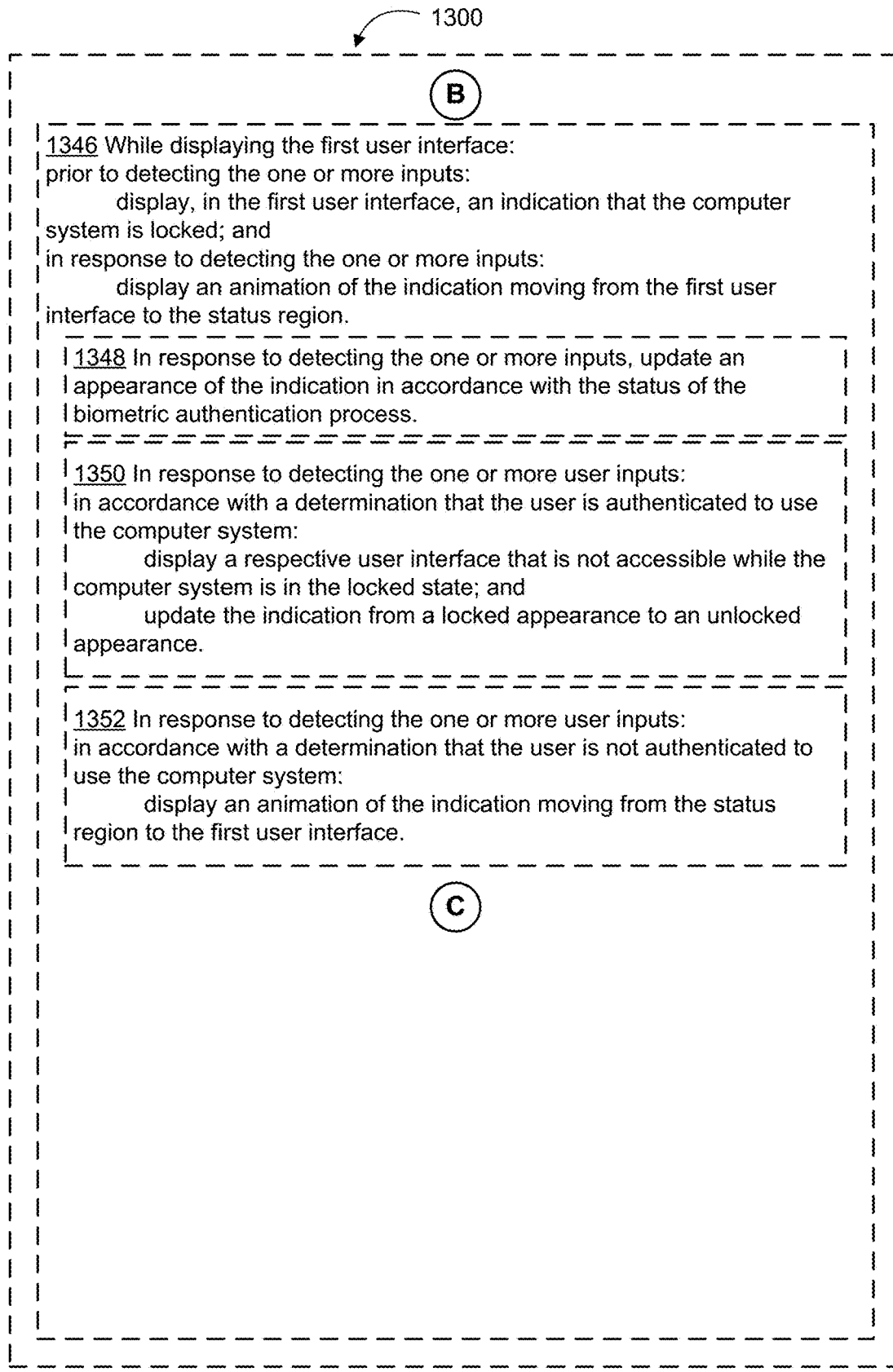
Figure 13E:
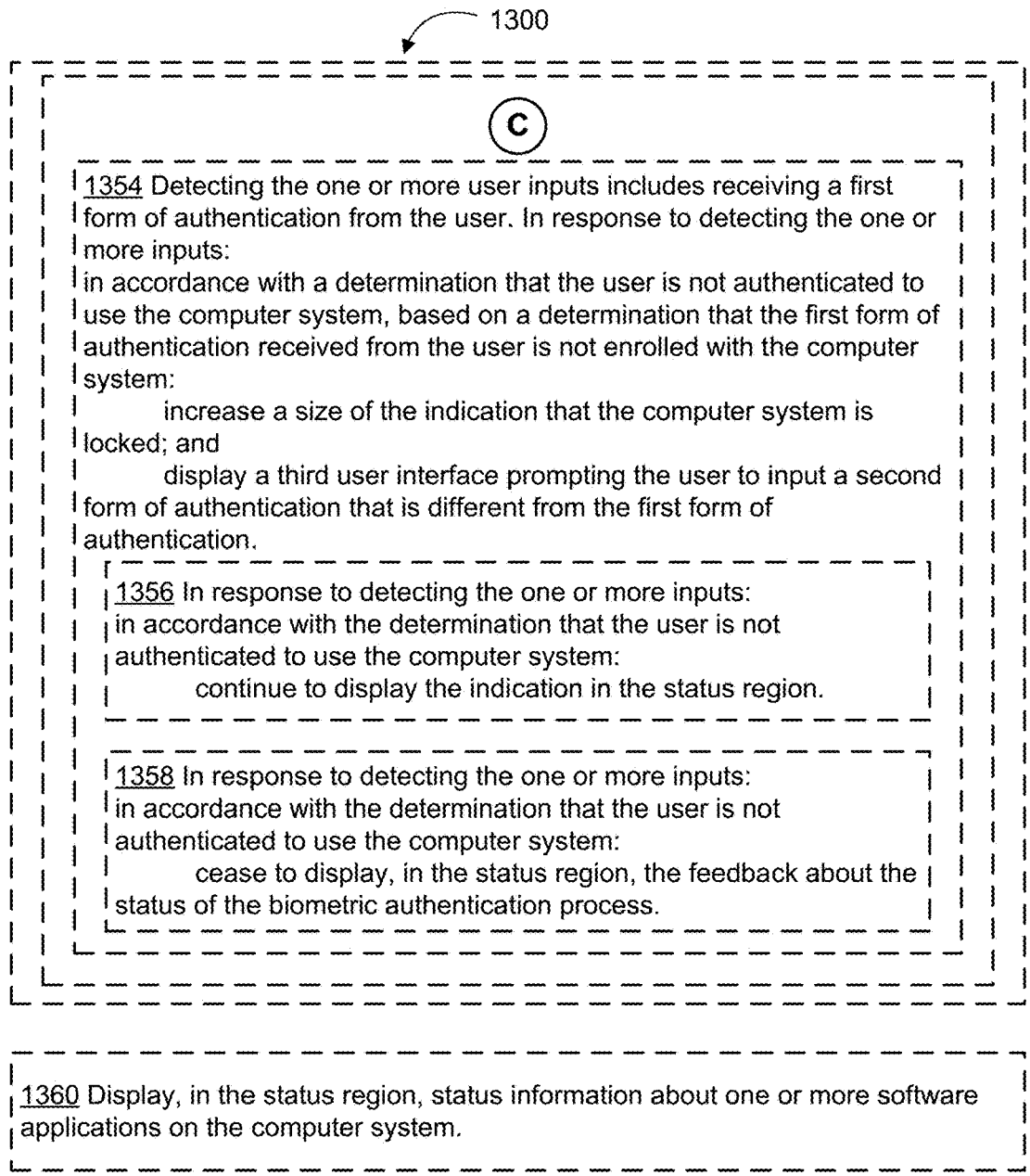

In some embodiments, prior to detecting the user input invoking the virtual assistant of the computer system, in accordance with a determination that the first display region is associated with an active session of a first application, the computer system displays (1434), in the first display region, an indication of a current state of the first application, and in accordance with a determination that the first display region is associated with an active session of a second application, displays, in the second display region, an indication of a current state of the second application. For example, FIG. 8G illustrates a timer session updating in the session region 802-7. In some embodiments, as additional and/or alternative sessions are active, the session region updates to display status information for currently active sessions, as described with reference to method 9000. In some embodiments if, in response to receiving the voice command directed to the virtual assistant, the first display region is associated with an active session of another application, an indication of the other application is displayed in the first display region in addition to other indications for other active sessions, if any. Displaying indications of the current states (also called status information) of one or more applications or other software with active sessions associated with the first display region (also called a status region) is explained in more detail herein with reference to method 9000. Any of the different types of status information described with reference to method 9000 may be displayed in the first display region before the virtual assistant is invoked and interacted with, and in many cases after as well. Displaying information about the current states of active applications in the same status region in which feedback associated with a virtual assistant is displayed enables the user to view different types of status information for the computer system in a consistent region of the display, thereby reducing an amount of time needed to perform a particular operation on the device.

It should be understood that the particular order in which the operations in FIGS. 14A-14C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 1100, 1200, 1300, 1500, and 1600) are also applicable in an analogous manner to method 1400 described above with respect to FIGS. 14A-14C. For example, the session regions and user inputs described above with reference to method 1400 optionally have one or more of the characteristics of the session regions and user inputs described herein with reference to other methods described herein (e.g., methods 9000, 1000, 1100, 1200, 1300, 1500, and 1600). For brevity, these details are not repeated here.

FIGS. 15A-15E are flow diagrams illustrating method 1500 of changing a visual appearance of a session region depending on a current state of the device in accordance with some embodiments. Method 1500 is performed at an electronic device (e.g., device 300, FIG. 3, or portable multifunction device 100, FIG. 1A) with a display generation component, optionally a touch-sensitive surface, and optionally one or more sensors. In some embodiments, the display is a touch-screen display and the touch-sensitive surface is on or integrated with the display. In some embodiments, the display is separate from the touch-sensitive surface. Some operations in method 1500 are, optionally, combined and/or the order of some operations is, optionally, changed.

A method 1500 is performed at a computer system that is in communication with a display generation component having a display area, wherein the display area includes a system user interface region (e.g., a first display region of the display area). In some embodiments, the system user interface region is also referred to herein as a status region and/or a session region (e.g., session region 502-1). In some embodiments the system user interface region encompasses a cutout from the overall display area and in some embodiments forms an island in the surrounding display area.

The computer system displays (1502), in display area outside of the system user interface region (e.g., in a second display region of the display area), a first user interface. In some embodiments the first user interface includes a user interface of a respective application, for example user interface 542 in FIG. 5AE. In some embodiments the first user interface is displayed in an application user interface region that optionally adjoins and surrounds the system user interface region (e.g., the boundary of the system user interface region forms an interior boundary of a second display region where the user interface of the respective application is displayed). In some embodiments the user interface of the respective application is displayed over substantially all (e.g., greater than 80%, 85%, 90%, or 95%) of the display area outside of the system user interface region. In some embodiments the user interface of the respective application is displayed over less than all (e.g., between 20% and 80%) of the display area outside of the system user interface region, such as in a widget region (e.g., the first user interface being a lock screen user interface that is displayed while the computer system is in a locked state with the display generation component active, and that includes one or more widget regions for respective application user interfaces) that optionally does not surround the system user interface region (e.g., the boundary of the system user interface region is not within the boundary of a second display region occupied by the user interface of the respective application).

In accordance with a determination that (e.g., while) the system user interface region is displayed in a first display state (1504), the computer system displays (1506) the system user interface region with a first visual edge treatment. In some embodiments, the first user interface is displayed in a first display state in accordance with a determination that the computer system is in a dark mode. In some embodiments, the first user interface is displayed in a first display state in accordance with a luminance of displayed content that surrounds the system user interface region, optionally without regard to whether the computer system is set to light or dark mode. For example, if the luminance of content in the first user interface that is displayed proximate to the system user interface region satisfies a threshold (e.g., is dark in color), the first user interface is displayed in the first display state, for example user interface 584 (FIG. 5AG) is displayed with a dark background. In some embodiments displaying the system user interface region with the first visual edge treatment includes displaying a border of the system user interface region, and in some embodiments the border of the system user interface region is a keyline, as illustrated in the borders of portions 502-8 and 502-9 of the session region in FIG. 5AG. and the first visual edge treatment of the border changes brightness of the keyline over time (e.g., periodically). In some embodiments, the first visual edge treatment causes the border to be displayed with a color, or color palette, that is selected based on a color associated with an application that is currently providing updates to the system user interface region (e.g., an application whose state is changing over time, where the system user interface region is updated over time based on the changes in state of the application).

In accordance with a determination that (e.g., while) the system user interface region is displayed in a first display state (1504), the computer system displays (1508) a background of an interior portion of the system user interface region with a first appearance (e.g., a first background color and/or fill). For example, in FIG. 5AG, the type and arrangement of content within the portions of the session regions 502-8 and 502-9 does not change, with the exception of updating the status information to be current, relative to the portions of the session region in FIG. 5AF. In some embodiments, the interior portion of the system user interface region comprises a color-filled background (e.g., a color that matches a color of one or more sensors arranged in sensor cutouts that are encompassed by the system user interface region). In some embodiments, the system user interface region comprises information for a status of an application executing on the computer system, and the information is updated as the status of the application changes. In some embodiments the appearance of the background of the system user interface region is maintained as the displayed information about the status of the application is updated in the system user interface region.

In accordance with a determination that (e.g., while) the system user interface region is displayed in a second display state distinct from the first display state (1510), the computer system displays (1512) the system user interface region with a second visual edge treatment that is distinct from the first visual edge treatment and displays (1514) the background of the interior portion of the system user interface region with the first appearance (e.g., the same first background color and/or fill). For example, in FIG. 5AF, portion 502-8 is displayed with the same type of content as portion 502-8 in FIG. 5AG, but with a distinct edge treatment. Displaying the status region with different edge treatments depending on the display state of the status region, while maintaining an interior appearance of the status region, causes the device to automatically adjust the edge treatment of the status region to make the status region more or less prominent against background content as needed, particularly where the interior appearance of the status region is specifically chosen to reduce the visual intrusiveness of one or more sensor regions encompassed by the status region and is not modified along with background content.

In some embodiments, the system user interface region is (1516) displayed in the first display state while a portion of the first user interface that is adjacent to (and in some embodiments encompasses) the system user interface region has a first color (e.g., a first color scheme or palette), and the system user interface region is displayed in the second display state while the portion of the first user interface that is adjacent to (and in some embodiments encompasses) the system user interface region has a second color (e.g., a second color scheme or palette), wherein the second color is different from the first color. For example, in FIG. 5AF, the portions 502-8 and 502-9 of the session region are surrounded by user interface 501-2 with a light background, and in FIG. 5AG, the portions 502-8 and 502-9 of the session region are surrounded by user interface 584 with a dark background. Displaying the status region with different edge treatments depending on the appearance of background content surrounding the status region causes the device to automatically adjust the edge treatment of the status region to make the status region more or less prominent against background content as needed.

In some embodiments, the first color of the portion of the first user interface is (1518) lighter than the second color of the portion of the first user interface (e.g., less saturated and/or brighter, in a hue-saturation-brightness color model), and the first visual edge treatment of (e.g., a border of) the system user interface region is less visually prominent (e.g., thinner, more transparent, lower contrast, and/or more blurred) than the second visual edge treatment of (e.g., the border of) the system user interface region, as described with reference to FIGS. 5AF and 5AG. Conversely, when the first color of the first portion of the user interface is darker than the second color of the portion of the first user interface (e.g., more saturated and/or less bright, in a hue-saturation-brightness color model), the first visual edge treatment of the border of the system user interface region is more visually prominent (e.g., thicker, more opaque, higher contrast, and/or sharper) than the second visual edge treatment of the border of the system user interface region. More generally, the visual edge treatment of the system user interface region is more prominent against darker background content just outside of the system user interface region than against lighter background content just outside of the system user interface region. In some embodiments when the portion of the first user interface that is adjacent to the system user interface region includes light-colored content and/or background, the visual edge treatment of the system user interface region makes the border of the system user interface region less prominent and in some cases even imperceptible to a user against the light-colored surrounding user interface. In some embodiments the visual edge treatment of the system user interface region includes applying a color blending function to the surrounding user interface portions, where the color blending function renders the border of the system user interface region with the greatest transparency (e.g., fully transparent) over white user interfaces and with the lowest transparency over black user interfaces (e.g., the border is present, but not always perceptible to the user, depending on the result of the color blending function). Displaying a less prominent edge treatment for the status region when background content surrounding the status region is lighter in color than when the background content surrounding the status region is darker in color, particularly where the interior of the status region is a dark color, causes the device to automatically adjust the edge treatment of the status region to delineate and give visual emphasis to the status region against darker background content as needed.

In some embodiments, the first display state is selected (1520) for the system user interface region when the computer system has selected a first size for the system user interface region (or is within a first range of sizes or areas, or has a respective dimension, such as height, that has a first value). In some embodiments the first size (or first range of sizes or areas, or first value of the dimension) is associated with a first amount of information displayed in the system user interface region about a respective application with an active session that is associated with the system user interface region. In some embodiments, the second display state is selected for the system user interface region when the computer system has selected a second size for the system user interface region (or is within a different second range of sizes or areas, or has a second value for the respective dimension, such as a second height), as described with reference to FIG. 5AF. In some embodiments, the second size (or second range of sizes or areas, or second value of the dimension) is associated with a second amount of information displayed in the system user interface region for the respective application. In some embodiments, the first size corresponds to an unexpanded state of the system user interface region, and the second size corresponds to an expanded state (e.g., the visual edge treatment for the system user interface region is different for an unexpanded system user interface region than for an expanded system user interface region). In some embodiments the first size corresponds to a first expanded state of the system user interface region, and the second size corresponds to a second expanded state (e.g., the visual edge treatment for the system user interface region is different for a system user interface region that is expanded a first amount than for a system user interface region that is expanded a second amount). Displaying the status region with different edge treatments depending on the size of the status region causes the device to automatically adjust the edge treatment of the status region to make the status region more or less prominent against background content as needed.

In some embodiments, the first size of the system user interface region corresponds (1522) to an unexpanded state of the system user interface region (e.g., in which no information is displayed in the system user interface region, or in which, according to some embodiments, the system user interface region is not expanded to make room for any information displayed, such as where any information displayed fits in the display area between two or more sensor regions in the system user interface region). In some embodiments, displaying the system user interface region with the first visual edge treatment includes displaying the system user interface region without a border. In some embodiments, the second size of the system user interface region corresponds to an expanded state of the system user interface region (e.g., in which one or more applications have active sessions associated with the system user interface region and corresponding status information displayed in the system user interface region). In some embodiments, displaying the system user interface region with the second visual edge treatment includes displaying the system user interface region with a border (e.g., with an appearance that is based, as described herein, on factors such as background content just outside of the system user interface region, an application whose status information is represented in the system user interface region, and/or whether the computer system is displaying content in a light mode or in a dark mode), as described with reference to FIG. 5AF. In some embodiments while the system user interface region is not expanded to make room for any information displayed, yet displays information in the display area between two or more sensor regions in the system user interface region, the system user interface region is displayed with a border (e.g., considered to be in an expanded state). Displaying the status region without a border when status information is not displayed in the status region, and with a border when status information is displayed in the status region, causes the device to automatically adjust the edge treatment of the status region to make the status region more prominent against background content when the status region includes information to note.

In some embodiments, the first size of the system user interface region corresponds (1524) to an unexpanded state of the system user interface region (e.g., in which no information is displayed in the system user interface region, or in which, according to some embodiments, the system user interface region is not expanded to make room for any information displayed, such as where any information displayed fits in the display area between two or more sensor regions in the system user interface region). In some embodiments, displaying the system user interface region with the first visual edge treatment includes displaying the system user interface region without a shadow. In some embodiments, the second size of the system user interface region corresponds to an expanded state of the system user interface region (e.g., in which one or more applications have active sessions associated with the system user interface region and corresponding status information displayed in the system user interface region) for example session region 502-1 (FIG. 5C) is displayed without a shadow. In some embodiments, displaying the system user interface region with the second visual edge treatment includes displaying the system user interface region with a shadow (e.g., a shadow effect around one or more edges of the system user interface region, where the shadow effect is optionally considered part of a border of the system user interface region), for example session region 502-3 is displayed with shadow 514-1 in FIG. 5D. In some embodiments the shadow is present while the system user interface region is in an expanded state, even if in some circumstances the shadow is not perceptible to the user, such as when the portion of the first user interface that is adjacent to the system user interface region is displayed with a background color against which the shadow does not show up (e.g., a dark shadow over a dark user interface, or a light shadow over a light user interface). Displaying the status region without a shadow when status information is not displayed in the status region, and with a shadow when status information is displayed in the status region, causes the device to automatically adjust the edge treatment of the status region to make the status region more prominent against background content when the status region includes information to note.

In some embodiments, the second size of the system user interface region corresponds (1526) to a first expanded state of the system user interface region (e.g., in which the system user interface region includes more than a respective amount of information for an active session of respective software), and the system user interface region is displayed without a shadow (optionally as part of displaying the system user interface region with a third visual edge treatment that is distinct from the first visual edge treatment for the first display state and/or distinct from the second visual edge treatment for the second display state). In some embodiments, the background of the interior portion of the system user interface region is displayed with the first appearance (e.g., the same first background color and/or fill) when the computer system has selected a third size for the system user interface region that corresponds to a second expanded state of the system user interface region (e.g., in which the system user interface region includes the respective amount of information for the active session of the respective software) that is different from the first expanded state (e.g., the system user interface region is displayed in a third display state overall), as described with reference to FIGS. 5C-5D. In some embodiments the system user interface region with the third size is nevertheless displayed with a border in accordance with the system user interface region being in an expanded state (e.g., one of multiple expanded states of the system user interface region). Displaying the status region without a shadow when the status region includes status information yet is in a condensed state, and with a shadow when the status region includes status information and is displayed in an expanded state, causes the device to automatically adjust the edge treatment of the status region to make the status region more prominent against background content when the status region includes more information and/or more interactive elements.

In some embodiments, while displaying the system user interface region in an expanded state with a shadow, the computer system displays (1528) the shadow with a lower intensity (e.g., length, opacity, and/or darkness) while the system user interface is expanded to a first extent than while the system user interface is expanded to a second extent that is greater than the first extent, as described with reference to shadow 514-1 in FIG. 5D. In some embodiments the shadow displayed for the system user interface region is increased in intensity as the size of the system user interface region increases and/or as the amount of information displayed in the system user interface region for an associated active session of respective software increases. Increasing the intensity of the shadow with increasing size of the status region causes the device to automatically adjust the edge treatment of the status region to make the status region more prominent against background content when the status region is larger.

In some embodiments, while displaying the system user interface region in an expanded state, the computer system visually deemphasizes (1530) (e.g., blurring, fading, darkening, and/or otherwise obscuring) a region of the first user interface that is near or adjacent to the system user interface region. For example, the blurred visual effect 512 is applied over a portion of user interface 500 in FIG. 5D. Visually deemphasizing the background content near the status region when the status region includes status information and is displayed in an expanded state causes the device to automatically adjust the edge treatment of the status region to make the status region more prominent against background content when the status region includes more information and/or more interactive elements.

In some embodiments, while the system user interface region is displayed in a first expanded state, the computer system visually deemphasizes (1532) the region of the first user interface that is near or adjacent to the system user interface region in a first manner. In some embodiments, while the system user interface region is displayed in a second expanded state that is different from the first expanded state (e.g., the system user interface region includes different amounts of information in the different expanded states), the computer system visually deemphasizes the region of the first user interface that is near or adjacent to the system user interface region in the first manner (e.g., the same manner of visual deemphasis is applied regardless of how expanded the system user interface region is), as described with reference to FIG. 5D. In some embodiments in different expanded states, the system user interface region includes different amounts of information for an associated active session of respective software (e.g., in one expanded state, more information and/or functionality associated with the respective software is presented than in another expanded state). Displaying the same manner of visual deemphasis of the background content near the status region when the status region includes status information and is displayed in an expanded state (e.g., with additional status information and/or one or more selectable controls), regardless of the size of the status region, causes the device to automatically provide consistent feedback that the background content is not currently in focus.

In some embodiments, the visual deemphasis is applied (1534) to less than all of the first user interface (e.g., less than 30%, 50%, or 60% of the first user interface), as described with reference to the blurred visual effect 512 in FIG. 5D. For example, if the system user interface region is displayed within a top portion of the first user interface, the visual deemphasis is applied to the top X % of the first user interface region, where X is a value less than 100. In some embodiments the amount of area of the first user interface (or more generally of the display area outside of the system user interface region) to which the visual deemphasis is applied is predetermined based on a maximum possible size of the system user interface region (e.g., as predefined in operating system or application programming interface software). For example, if a maximum size of the system user interface region (e.g., when expanded) is 30% of the display area, the visual deemphasis may be applied to at least 30% and less than 100% of the first user interface. Visually deemphasizing only a portion of the background content causes the device to automatically indicate that the background content, while temporarily not in focus, remains available to be reactivated for interaction.

In some embodiments, a first part of the region of the first user interface is (1536) more visually deemphasized than a second part of the region of the first user interface, as described with reference to FIG. 5D, the blurred visual effect 512 gradually changes according to a distance from session region 502-3. In some embodiments the degree of visual deemphasis decreases, in some embodiments gradually, along a respective direction (e.g., the top of the region is more visually deemphasized than the bottom, optionally in accordance with the system user interface region being positioned toward the top of the region). In some embodiments the degree of visually deemphasis decreases, in some embodiments gradually, with increasing distance from the system user interface region (e.g., the part of the region that is adjacent to the system user interface region is the most visually deemphasized). Visually deemphasizing some portions of the background content more than others (e.g., by decreasing the visual deemphasis with increasing distance from the status region) causes the device to automatically adjust the visual deemphasis of the background content to make portions of the background content more or less prominent relative to the status region as needed.

In some embodiments, while displaying a transition (e.g., an animation) of the system user interface region changing from an unexpanded state to an expanded state, the computer system visually deemphasizes (1538) the region of the first user interface by gradually increasing the visual deemphasis applied to the region of the first user interface (e.g., increasing the degree and/or extent of the visual deemphasis across the region of the first user interface) as the system user interface region expands, as described with reference to FIGS. 5C-5D. In some embodiments the visual deemphasis is represented by a mask or filter that is gradually moved into place (e.g., appears to slide onscreen) over the region of the first user interface (e.g., shifted downward from a top edge of the display area, or in another direction from another edge). Gradually expanding the visual deemphasis of the background content as the status region expands causes the device to automatically make the status region more prominent against background content, as appropriate for the current size of the status region, by correlating the change in the background content to the change in the status region.

In some embodiments, while displaying a transition of the system user interface region changing from an expanded state to an unexpanded state (e.g., in response to dismissing the expanded state of the system user interface region, such as by a tap or other input selecting a control in the system user interface region or interacting with display area outside of the system user interface region, or due to the system user interface region automatically shrinking after a predetermined amount of time has elapsed), the computer system gradually reduces (1540) the visual emphasis applied to the region of the first user interface (e.g., decreasing the degree and/or extent of the visual deemphasis across the region of the first user interface) as the system user interface region contracts, as described with reference to FIGS. 5D-5E. In some embodiments where the visual deemphasis is represented by a mask or filter that is gradually moved into place over the region of the first user interface as the system user interface region expands, the movement is gradually reversed (e.g., the mask or filter appears to slide offscreen) as the system user interface region contracts. Gradually reducing the visual deemphasis of the background content as the status region contracts causes the device to automatically make the status region less prominent against background content, as appropriate for the current size of the status region, by correlating the change in the background content to the change in the status region.

In some embodiments, the computer system detects (1542) a user input directed to the system user interface region and, in response to detecting the user input directed to the system user interface region, expands the system user interface region (e.g., from a state in which a first amount of information for an active session of respective software is displayed in the system user interface region to a state in which a greater, second amount of information for the active session of the respective software is displayed in the system user interface region). For example, user input 522 causes session region 502-4 (FIG. 5F) to expand to session region 502-6 (FIG. 5I). Expanding the status region (e.g., to include additional status information and/or one or more selectable controls) in response to a user input directed to the status region reduces the number of inputs needed to interact with an application currently represented by the status region.

In some embodiments, the computer system detects (1544) the occurrence of an event at the computer system (e.g., an incoming notification to the computer system, or an alert of an event occurring within an application, particularly an application with an active session represented in the system user interface region). In some embodiments, in response to detecting the occurrence of the event, the computer system expands the system user interface region, and displays, in the expanded system user interface region, information associated with the event. For example, an incoming telephone call causes the session region 502-1 to expand to session region 502-3, as described with reference to FIGS. 5C-5D. Expanding the status region (e.g., to include additional status information and/or one or more selectable controls) automatically in response to the occurrence of a software event causes the device to automatically present feedback about a state of the device when needed.

In some embodiments, the first user interface includes (1546) video content displayed in an unexpanded state in a portion of the first user interface. In some embodiments, the computer system detects a request to display the video content of the first user interface in an expanded state (e.g., a full-screen display mode). For example, the request includes a user input, such as a tap or other touch input, corresponding to a displayed full-screen mode affordance or performing a gesture such as a de-pinch gesture on the displayed video content to expand the video content. In some embodiments, in response to detecting the request to display the video content of the first user interface in the expanded state, the computer system expands the video content (e.g., to occupy substantially all, or at least 80%, 90%, or 95% of the display area of the display generation component, for example by displaying the video content at a maximum scale at which the video content is displayed without cropping, and optionally displaying any other display area that does not include video content with a black or otherwise visually inconspicuous background), and ceases to display the system user interface region (e.g., including ceasing to display a border of the system user interface region). For example, in response to user input 5038 (FIG. 5BJ), the device 100 displays a movie user interface in a full-screen display mode, as illustrated in FIG. 5BK, wherein the portion 502-25*a* and 502-26*a* are optionally not displayed. Ceasing to display the status region, including ceasing to display a border of the status region, while content such as video content is being displayed full screen causes the device to automatically reduce the number and visual intrusiveness of displayed user interface elements to reduce distraction from full screen content.

In some embodiments, the first display state is (1548) selected for the system user interface region when the system user interface region includes first content of a first software application and the second display state is selected for the system user interface region when the system user interface region includes second content of a second software application, as described with reference to the border 552 in FIG. 5W. Displaying the status region with different edge treatments depending on the application represented in the status region supplements other visual elements of the application that are displayed as part of the status information in the status region, thereby reducing the amount of time needed to view feedback about a state of the device.

In some embodiments, the first software application is (1550) different from the second software application. In some embodiments, displaying the system user interface region with the first visual edge treatment, in accordance with the determination that the system user interface region includes the first content of the first software application, includes displaying a border of the system user interface region in a first color that is associated with the first software application. In some embodiments, displaying the system user interface region with the second visual edge treatment, in accordance with the determination that the system user interface region includes the second content of the second software application, includes displaying the border of the system user interface region in a second color that is associated with the second software application, wherein the first color that is associated with the second software application is different from the second color that is associated with the first software application. In some embodiments different software applications are associated with different colors, as described with reference to the border 552 in FIG. 5W. For example, while the system user interface region is associated with a maps application, the border of the system user interface region, if displayed (e.g., based on other conditions described herein), is blue (or other first color); whereas, while the system user interface region is associated with a phone call, the border would be green if displayed (or other second color); and while the system user interface region is associated with a timer, the border would be orange if displayed (or other third color). One of ordinary skill in the art will recognize that different mappings of colors to applications may be used. In some embodiments where the system user interface region displays content of multiple software applications in distinct portions of the system user interface region, the distinct portions of the system user interface region may have different edge treatments and border colors (e.g., a maps portion of the system user interface region may have a blue border whereas a timer portion of the system user interface region may have a yellow border). Displaying the status region with different color borders for different applications represented in the status region supplements other visual elements of the application that are displayed as part of the status information in the status region, thereby reducing the amount of time needed to view feedback about a state of the device.

In some embodiments, the first software application is (1552) the same as the second software application. In some embodiments, displaying the system user interface region with the first visual edge treatment, in accordance with the determination that the system user interface region includes the first content of the first software application, includes displaying a border of the system user interface region in a color that is associated with the first content. In some embodiments, displaying the system user interface region with the second visual edge treatment, in accordance with the determination that the system user interface region includes the second content of the second software application, includes displaying the border of the system user interface region in a color that is associated with the second content, wherein the second content is different from the first content, and the color that is associated with the second content is different from the color that is associated with the first content. In some embodiments different application content is associated with different colors, as described with reference to the border 552 in FIG. 5W. For example, while the system user interface region is displaying status information about audio playback (e.g., music, podcasts, audiobooks, or other audio), the border of the system user interface region, if displayed (e.g., based on other conditions described herein), is displayed in a color that is based on a color of album art for a currently selected audio track (e.g., song, episode, book or chapter, or other audio type). In another example, while the system user interface region is displaying status information about an ongoing event (e.g., a sporting event or other event that has periodic updates), the border of the system user interface region would be displayed using one or more colors associated with the sporting event (e.g., a color indicative of the type of sport, one or more colors associated with sports teams or athletes participating in the event, or other representative color). Displaying the status region with different color borders depending on the application content currently represented in the status region supplements other visual elements of the application that are displayed as part of the status information in the status region, thereby reducing the amount of time needed to view feedback about a state of the device.

In some embodiments, displaying the system user interface region with the first visual edge treatment includes (1554) displaying a border of the system user interface region in a color that corresponds to a light mode when the computer system is displaying the first user interface in the light mode. In some embodiments, displaying the system user interface region with the second visual edge treatment includes displaying the border of the system user interface region in a color that corresponds to a dark mode when the computer system is displaying the first user interface in the dark mode, wherein the color that corresponds to the dark mode is different from the color that corresponds to the light mode, as described with reference to FIGS. 5AF-5AG. In some embodiments a light mode is a display mode that uses darker foreground colors (e.g., dark-colored text and outlines) on a light background, typically with negative contrast (e.g., the background is lighter than the foreground content). In some embodiments a dark mode is a display mode that uses lighter foreground colors (e.g., light-colored text and outlines) on a dark background, typically with positive contrast (e.g., the foreground content is lighter than the background), optionally with more vibrancy for foreground content so that the foreground content stands out against the darker backgrounds. In some embodiments the color that corresponds to the light mode is less visually prominent (e.g., against a light background) than is the color that corresponds to the dark mode (e.g., against a dark background). In some embodiments, in accordance with the computer system transitioning from displaying content such as the first user interface in the light mode to displaying content in the dark mode, the border color of the system user interface is changed from the color corresponding to the light mode to the color corresponding to the dark mode, and vice versa. Displaying the status region with different color borders depending on whether the computer system is displaying user interfaces in a light mode or in a dark mode causes the device to automatically adjust the edge treatment of the status region to make the status region more or less prominent against background content as needed.

In some embodiments, while displaying the system user interface region with a respective visual edge treatment (e.g., any of the visual edge treatments described herein), the computer system displays (1556) an animation that changes (e.g., gradually changes, through a plurality of intermediate states) an appearance of the respective visual edge treatment over time (e.g., by increasing and then decreasing the thickness, transparency, feathering, and/or other visual property of an edge treatment, such as a border, periodically over time), as described with reference to FIGS. 5AF-5AG. Animating the edge treatment of the status region over time causes the device to automatically give visual emphasis to the status region and accordingly to status information therein, thereby reducing the amount of time needed to view feedback about a state of the device.

It should be understood that the particular order in which the operations in FIGS. 15A-15E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 1100, 1200, 1300, 1400, and 1600) are also applicable in an analogous manner to method 1500 described above with respect to FIGS. 15A-15E. For example, the session regions and user inputs described above with reference to method 1500 optionally have one or more of the characteristics of the session regions and user inputs described herein with reference to other methods described herein (e.g., methods 9000, 1000, 1100, 1200, 1300, 1400, and 1600). For brevity, these details are not repeated here.

FIGS. 16A-16F are flow diagrams illustrating method 1600 of transitioning between displaying different types of information in a status region in accordance with some embodiments. Method 1600 is performed at an electronic device a computer system (e.g., device 300, FIG. 3, or portable multifunction device 100, FIG. 1A) that is in communication with a display generation component, optionally a touch-sensitive surface, and optionally one or more sensors. In some embodiments, the display is a touchscreen display and the touch-sensitive surface is on or integrated with the display. In some embodiments, the display is separate from the touch-sensitive surface. Some operations in method 1600 are, optionally, combined and/or the order of some operations is, optionally, changed.

A method 1600 is performed at a computer system that is in communication with a display generation component having a display area, wherein the display area includes a status region. In some embodiments, the computer system is in communication with one or more sensors. In some embodiments, the one or more sensors are positioned within one or more sensor regions that are encompassed by the status region, and the display generation component is not capable of displaying content within the one or more sensor regions.

The computer system displays (1602), in the status region, first information that includes status information about (e.g., provided by) first software (e.g., a first application executing on the computer system or first system software of an operating system of the computer system). The status region is associated with an active session of the first software (e.g., the status information about the first software is updated over time as a state of the first software changes). For example, in FIG. 5BP, session region 502-30 corresponds to a music session associated with a music application of device 100.

While displaying, in the status region, the first information (1604), the computer system detects occurrence of a first event corresponding to a transition to displaying (e.g., in the status region) second information that is different from the first information (e.g., an event corresponding to second software that is different from the first software). For example, as described with reference to FIGS. 5BP-5BR, in response to detecting user input 5062, the session region is updated to replace display of session region 502-30 associated with a music session with session region 502-34 associated with a navigation session.

In response to detecting the occurrence of the first event, the computer system displays (1606) a transition that includes: ceasing (1608) to display the first information in the status region; displaying (1610) the second information in the status region, wherein the second information includes status information about (e.g., provided by) second software that is different from the first software (e.g., a second application, different from the first application, executing on the computer system), and the status region is associated with an active session of the second software (e.g., the status information about the second software is updated over time as a state of the second software changes); and, while transitioning from displaying the first information in the status region to displaying the second information in the status region (1612), reducing a size of the status region (e.g., at least partially overlapping with ceasing to display the first information in the status region) and, after reducing the size of the status region, increasing the size of the status region (e.g., at least partially overlapping with displaying the second information in the status region). For example, FIG. 5BQ illustrates that minimized session region 502-32 is displayed during the transition between displaying status region 502-30 (FIG. 5BP) and status region 502-34 (FIG. 5BR).

In some embodiments, the first information and the second information are displayed as overlapping during at least a portion of the transition. In some embodiments, the transition includes reducing the status region from a first size to a second (e.g., non-zero) size, and then increasing from the second size to a third size. In some embodiments, at the beginning of the transition, the first information is displayed in the status region that is the first size. In some embodiments, at the end of the transition, the second information is displayed in the status region that is the third size. In some embodiments, the first information ceases to be displayed gradually (e.g., is gradually blurred and/or faded out) over a period of time that starts with and at least partially overlaps with the period of time over which the status region is reduced in size. In some embodiments, the second information is displayed in the status region gradually (e.g., is gradually sharpened and/or faded in) over a period of time that ends with and at least partially overlaps with a period of time over which the status region is increased in size. In some embodiments, during the transition, one or more spatial relationships between the status region and the display area is maintained (e.g., the status region remains centered and/or edge-aligned relative to the display area). For example, as described with reference to FIG. 5CA, the animated transition of the session region includes decreasing a size of the session region (e.g., including first portion 502-56 and second portion 502-58 of the session region) until the session region is displayed as minimized session region 502-60 (FIG. 5CB), before gradually increasing the session region to display expanded session region 502-62 (FIG. 5CC).

While changing which information is displayed in the status region, reducing a size of the status region (e.g., while ceasing to display the prior information) and then increasing the size of the status region (e.g., while displaying new information) visually deemphasizes information that is less relevant and/or being dismissed and visually emphasizes information that is more relevant and/or of greater interest to the user, thereby providing feedback about a state of the device. As described herein with reference to other methods described herein, displaying information about an active session of software, such as an application, in a status region (e.g., during interaction with a user interface of another application displayed in display area outside of the status region) enables the user to view different types of status information for the computer system in a consistent region of the display while making more efficient use of the display area, thereby reducing an amount of time needed to perform a particular operation on the device.

In some embodiments, the display area includes (1614) a user interface region that is adjacent to the status region (e.g., surrounding or partially surrounding), and the status region is visually distinguished from the user interface region. More generally, in some embodiments the status region is a first region, the user interface region is a second region, and the second region is adjacent to or encompasses the first region. Visually distinguishing the status region from the surrounding user interface gives visual emphasis to status region and the information that is displayed in the status region and actively being updated, thereby providing feedback about a state of the device. For example, FIG. 5BP illustrates that session region 502-30 includes a border (e.g., similar to border 552, FIG. 5W) that is displayed around the edges of session region 502-30.

In some embodiments, visually distinguishing the status region from the user interface region includes (1616) displaying the status region with a border (e.g., a keyline and/or other visual edge treatment), wherein the border contracts (e.g., in size and/or width) as the status region is reduced in size and expands (e.g., in size and/or width) as the status region is increased in size (e.g., the border is maintained at the edge of the status region as the status region contracts and expands). Displaying the status region with a border that expands as the size of the status region increases and that contracts as the size of the status region decreases causes the device to automatically give visual emphasis to the status region while information is displayed in the status region, and reduce the amount of display area occupied by the status region during transitions between different information displayed in the status region. For example, as described with reference to FIG. 5BQ, the border is displayed around the edges of the session region as the size of the session region changes (e.g., gradually increases and/or decreases in size).

In some embodiments, visually distinguishing the status region from the user interface region includes (1618) displaying a background of the user interface region with a first range of values for a respective visual property (e.g., a first set of colors, opacities, blurring, or other visual property), and displaying a background of the status region with a second value, different from (e.g., outside of) the first range of values, for the respective visual property (e.g., a second color, opacity, blurring, or other visual property of the user interface region), wherein reducing the size of the status region reduces a size of the background of the status region, and increasing the size of the status region increases the size of the background of the status region. In some embodiments, the size of the status region, and accordingly the size of the background of the status region, is reduced to a non-zero minimal size (e.g., minimized session region 502-32 (FIG. 5BQ)). For example, in FIG. 5BS1, session region 502-38 is displayed with a respective background color that is different from the background color of music application user interface 5066; minimized session region 502-40 in FIG. 5BS2 continues to be displayed with the respective background color of session region 502-38, which is different from the background color(s) of user interface 5104; and, in FIG. 5BS3, redisplayed session region 502-38 has the same respective background color, which is different from the background color of user interface 5106. In another example, in FIG. 5BP, session region 502-30 is displayed with a background color, optionally that matches a color of the one or more sensors within the session region (e.g., as described with reference to FIG. 5A), and the color of the session region is maintained, including while reducing the size of session region 502-30 (FIG. 5BP) and while displaying minimized session region 502-32 (FIG. 5BQ). In some embodiments, the background of the status region continues to be displayed with the second value for the respective visual property as the background is reduced in size and increased in size. Displaying the status region with a background that contrasts with the surrounding user interface and that expands as the size of the status region increases and contracts as the size of the status region decreases causes the device to automatically give visual emphasis to the status region while information is displayed in the status region, and reduce the amount of display area occupied by the status region during transitions between different information displayed in the status region.

In some embodiments, the second information (e.g., that is different from the first information) is (1620) displayed in the status region as the size of the status region is increased (e.g., the second information is displayed gradually, over a period of time that at least partially overlaps with the period of time over which the status region is increased in size). For example, session region 502-34 (FIG. 5BR) corresponding to a navigation session includes text and/or icons for the navigation session that are displayed as the session region increases in size from the minimized session region 502-32. Increasing the size of the status region while displaying new information in the status region visually emphasizes information that is more relevant and/or of greater interest to the user, thereby providing feedback about a state of the device.

In some embodiments, the computer system ceases (1622) to display the first information gradually over a first period of time; and displays the second information gradually over a second period of time; wherein the first period of time partially overlaps with the second period of time (e.g., the end of the first period of time overlaps with the beginning of the second period of time). For example, the first information crossfades or dissolves to the second information during the overlap. For example, in the transition illustrated in FIGS. 5BZ-5CC, in some embodiments, the device 100 gradually ceases to display text and/or icons displayed in the first portion 502-56 and second portion 502-58 of the session region, and optionally does not fully minimize to minimized session region 502-60 (FIG. 5CB). For example, as the text and/or icons cease to be displayed in the first portion 502-56 and second portion 502-58 of the session region, text and/or icons displayed in expanded session 502-62 are gradually displayed (e.g., fade in and/or increase in size), optionally without displaying minimized session region 502-60. Alternatively, with respect to any of the transitions in which the session region is minimized, as described herein with reference to FIGS. 5BP-5CY, displaying first information that was displayed prior to minimizing the session region partially overlaps with displaying second information that is displayed after re-expanding the session region, where the minimized session region is optionally displayed amid the overlap. Beginning to display new information in the status region before old information has completely ceased to be displayed causes the device to automatically smooth the transition between new information and old information in the status region.

In some embodiments, after displaying the second information in the status region, the computer system: ceases (1624) to display the second information in the status region; displays third information in the status region, wherein the third information is different from the second information; and, while transitioning from displaying the second information in the status region to displaying the third information in the status region, reduces a size of the status region (e.g., to a non-zero size) (e.g., at least partially overlapping with ceasing to display the second information in the status region) and, after reducing the size of the status region, increasing the size of the status region (e.g., at least partially overlapping with displaying the third information in the status region). In some embodiments, displaying the third information in the status region is performed in response to detecting the occurrence of an event that corresponds to a transition to displaying the third information (e.g., a request to switch which application user interface is displayed in a user interface region outside of the status region), and in accordance with a determination that the occurrence of the event is detected after a threshold amount of time has passed since detecting the occurrence of the first event. For example, after displaying session region 502-34 (FIG. 5BR), in response to detecting user input 5068, device 100 displays third information that includes first portion 502-36 and second portion 502-38 of the session region, optionally after displaying an animated transition that includes minimizing session region 502-34 to a minimized size (e.g., analogous to minimized session region 502-32, FIG. 5BQ). While changing which information is displayed in the status region, reducing a size of the status region (e.g., while ceasing to display the prior information) and then increasing the size of the status region (e.g., while displaying new information) visually deemphasizes information that is less relevant and/or being dismissed and visually emphasizes information that is more relevant and/or of greater interest to the user, thereby providing feedback about a state of the device.

In some embodiments, displaying the third information includes (1626) redisplaying the first information (e.g., the third information includes status information about the first software) (e.g., without detecting the occurrence of an event that corresponds to the transition to displaying the third information). In some embodiments, in response to detecting the occurrence of the first event, the computer system displays the second information in the status region temporarily (e.g., for up to 0.5 s, 1 s, 2 s, 5 s, or other predefined amount of time), and afterwards ceases to display the second information and redisplays the first information. For example, as described with reference to FIGS. 5BP-5BS7, session region 502-30 (FIG. 5BP) corresponds to a music session. In some embodiments, in response to detecting one or more inputs (e.g., user input 5068, user input 5102, user input 5108, and/or user input 5110), device 100 updates the session region to display session information for one or more other sessions, such as a navigation session, before redisplaying the music session in session region 502-46 (FIG. 5BS7). In another example, after transitioning from displaying session region 502-30 corresponding to a music session to displaying session region 502-34 corresponding to a navigation session (e.g., in conjunction with transitioning from displaying user interface 5060 for a maps application to displaying user interface 5066 for a music application) (FIGS. 5BP-5BR), device 100 receives an input 5110 transitioning from displaying user interface 5066 for the music application back to displaying user interface 5060 for the maps application, and accordingly transitions from displaying session region 502-42 corresponding to the navigation session back to displaying session region 502-46 corresponding to the music session (FIGS. 5BS5-5BS7). While changing which information is displayed in the status region, including when redisplaying information that previously was temporarily dismissed so that other information could be temporarily displayed, reducing a size of the status region (e.g., while ceasing to display the temporarily displayed information) and then increasing the size of the status region (e.g., while redisplaying the previous information) visually deemphasizes information that is no longer relevant and/or being dismissed and visually emphasizes information that is relevant again and/or of interest to the user again, thereby providing feedback about a state of the device.

In some embodiments, the third information (e.g., that is different from the second information) is (1628) displayed in response to detecting occurrence of a second event corresponding to a transition to displaying (e.g., in the status region) the third information, and the third information includes status information about (e.g., provided by or corresponding to) third software (e.g., a third application or the operating system) that is different from the first software (e.g., a first application or the operating system) and from the second software (e.g., a second application or the operating system). In some embodiments, the status region is associated with an active session of the third software. For example, as described with reference to FIGS. 5CO-5CU, in some embodiments, session region 502-98*b* is associated with third software that includes saved card information, which is displayed in response to detecting wireless terminal 5154. As described with reference to FIGS. 5CV-5CY, in some embodiments, in response to detecting occurrence of an application event, such as a change in playback of a media item for a music session, the third information comprises session region 502-110 (FIG. 5CY) corresponding to an expanded music session, that is distinct from the application(s) associated with sessions displayed in the session region prior to detecting occurrence of the application event (e.g., first portion 502-100 corresponding to a timer session and second portion 502-102 corresponding to a navigation session (FIG. 5CV)). While changing which information is displayed in the status region, reducing a size of the status region (e.g., while ceasing to display the prior information) and then increasing the size of the status region (e.g., while displaying new information) visually deemphasizes information that is less relevant and/or being dismissed and visually emphasizes information that is more relevant and/or of greater interest to the user, thereby providing feedback about a state of the device.

In some embodiments, while displaying, in the status region, first respective information (e.g., the first information, the second information, the third information, or other information), the computer system detects (1630) occurrence of a third event corresponding to a transition to displaying (e.g., in the status region) fourth information. In some embodiments, after detecting the occurrence of the third event, the computer system detects occurrence of a fourth event corresponding to a transition to displaying (e.g., in the status region) fifth information that is different from the fourth information. In some embodiments, the fourth event is the very next event, after the third event, that is associated with transitioning the information displayed in the status region. In some embodiments, in response to detecting the occurrence of the third event, the computer system displays a transition that includes: ceasing to display the first respective information in the status region; and, in accordance with a determination that the occurrence of the fourth event is detected after a predefined threshold amount of time since detecting the occurrence of the third event, prior to displaying a transition responsive to detecting the occurrence of the fourth event: displaying the fourth information in the status region; and while transitioning from displaying the first respective information in the status region to displaying the fourth information in the status region, reducing the size of the status region and, after reducing the size of the status region, increasing the size of the status region. In some embodiments, in response to detecting the occurrence of the third event, the computer system displays a transition that includes the ceasing to display the first respective information in the status region; and, in accordance with a determination that the occurrence of the fourth event is detected within the predefined threshold amount of time since detecting the occurrence of the third event: reducing the size of the status region while ceasing to display the first respective information in the status region, without increasing the size of the status region in response to detecting the occurrence of the third event (e.g., the size of the status region is not increased prior to displaying a transition responsive to detecting the occurrence of the fourth event or a later event). For example, as described with reference to FIGS. 5BT-5BU, in some embodiments, in accordance with a determination that the user input satisfies quick-switching criteria, the device 100 forgoes expanding the minimized session region while the user provides additional user inputs to switch between application user interfaces.

In some embodiments, in response to detecting the occurrence of the fourth event, the computer system displays a transition that includes ceasing to display the fourth information in the status region and, while ceasing to display the fourth information in the status region, reducing the size of the status region. In some embodiments, displaying a transition responsive to detecting the occurrence of the fourth event includes, after reducing the size of the status region, increasing the size of the status region while displaying the fifth information in the status region. In some embodiments, displaying a transition responsive to detecting the occurrence of the fourth event includes maintaining the status region at the reduced size (e.g., without increasing the size of the status region prior to displaying a transition responsive to detecting the occurrence of an event that follows the fourth event). For example, as described herein with reference to FIGS. 5BP-5BR, in response to user input 5062, the device 100 ceases to display session region 502-30 for a music session, and decreases a size of the session region as minimized session region 502-32. After decreasing the size of the session region, the device 100 increases the size of the session region to display session region 502-34 for a navigation session. In some embodiments, in accordance with a determination that user input 5068 satisfies quick-switching criteria (e.g., user input 5068 is detected within a predefined time period relative to user input 5062), device 100 forgoes displaying session region 502-34 (FIG. 5BR) and maintains minimized session region 502-32 (FIG. 5BQ) before displaying the first portion 502-36 and second portion 502-38 of the session region illustrated in FIG. 5BS1. In some embodiments, for example, while displaying first portion 502-56 and second portion 502-58 of the session region (FIG. 5BZ), device 100 detects user input 5126 corresponding to a request to open an application user interface for the clock application associated with the timer session displayed in first portion 502-56. In some embodiments, in response to user input 5126, device 100 transitions the session region, including decreasing a size of the session region to minimized session region 502-64, illustrated in FIG. 5CD. In some embodiments, before the device 100 increases a size of the session region to display session region 502-66, which includes information for the navigation session, the device 100 detects a user input corresponding to a request to display another user interface (e.g., a system user interface or another application user interface). For example, user input 5130 is detected while displaying minimized session region 502-64 (e.g., user input 5130 is detected during the scenario of FIG. 5CD, before the scenario of FIG. 5CE occurs), and in response to user input 5130, the device 100 continues to display the session region in its minimized state (as illustrated in FIG. 5CF), and updates the display area outside of the session region to display another user interface for a messaging application, as illustrated in FIG. 5CG. In some embodiments, device 100 increases the size of the minimized session region 502-68, as shown in FIGS. 5CG-5CH, in accordance with a determination that another event (e.g., a user input, an application event, and/or a system-level event) has not been detected within a predefined time period relative to user input 5130. Maintaining the reduced size of the status region while switching between successive application user interfaces outside of the status region within a threshold amount of time causes the device to automatically reduce the visual prominence of the status region when the switching is performed too quickly for the status region to be increased in size and to legibly display information.

In some embodiments, the computer system includes one or more input devices, and detecting the occurrence of the first event includes (1632) detecting, via the one or more input devices, a first input corresponding to a request to switch from displaying, in display area outside of (e.g., adjacent to, substantially adjacent to, surrounding, or partially surrounding) the status region (e.g., in an application content region), a user interface of a first application to displaying a user interface of a second application that is different from the first application. In some embodiments, detecting the first input includes detecting a single input. In some embodiments, detecting the first input includes detecting a plurality of inputs (or a plurality of input portions) that together correspond to a request to switch from displaying the user interface of the first application (e.g., the second software, or other software) to displaying the user interface of the second application (e.g., the first software, or other software). In some embodiments, in response to detecting the first input, the computer system switches from displaying the user interface of the first application to displaying the user interface of the second application (e.g., ceasing to display the user interface of the first application and displaying the user interface of the second application). For example, in FIG. 5BP, user input 5062 corresponds to a request to display another application user interface, and in response to user input 5062, device 100 replaces display of user interface for maps application 5060 with a user interface for music application 5066 (FIG. 5BR), including displaying an animated transition of the session region by minimizing the session region and/or an animated transition of sliding user interfaces on and/or off the display area outside of the session region, as described with reference to FIG. 5BQ. Changing which information is displayed in the status region in conjunction with switching which application's user interface is displayed outside of the status region (e.g., if the information previously displayed in the status region corresponds to the same application whose user interface is presently being displayed outside of the status region, such that the previously status region information would have been redundant of the newly displayed application user interface) causes the device to automatically reallocate available space in the status region.

In some embodiments, while second respective information (e.g., information described herein or other information) is displayed in the status region (1634), the computer system detects a second input corresponding to a request to switch from displaying, in display area outside of the status region, the user interface of the second application to displaying a user interface of a third application that is different from the second application. In some embodiments, in response to detecting the second input, the computer system: switches from displaying the user interface of the second application to displaying the user interface of the third application; and displays a transition that includes: reducing a size of the status region (e.g., while ceasing to display, fading out, and/or visually deemphasizing the second respective information in the status region, such as by blurring, dimming, shrinking, obscuring, or other visual effect); and after reducing the size of the status region, increasing the size of the status region (e.g., while redisplaying, fading in, and/or at least partially reversing visual deemphasis of the second respective information in the status region). For example, in FIGS. 5BS1-5BS3, in response to detecting user input 5102, device 100 displays a transition of the session region, including displaying minimized session region 502-40 before redisplaying the same first portion 502-36 and second portion 502-38 in the session region. While switching which application's user interface is displayed outside of the status region, reducing a size of the status region while ceasing to display information in the status region and then increasing the size of the status region while displaying information in the status region, even if the same information is redisplayed, visually deemphasizes the status region and visually emphasizes the transition between different application user interfaces outside of the status region, thereby providing feedback about a state of the device.

In some embodiments, the transition that is displayed in response to detecting the occurrence of the first event is (1636) displayed in accordance with a determination that the first input includes a swipe gesture (e.g., a touch input including a contact on a touch-sensitive surface and lateral movement along the touch-sensitive surface, or lateral wave or movement of a user's finger or hand in air), and optionally in accordance with a determination that the first input is a swipe gesture along an edge of the display area (e.g., a swipe gesture substantially horizontally along a bottom or top edge or substantially vertically along a left or right edge of the display area, such as along an edge of a touch-sensitive display). For example, in FIG. 5BP, user input 5062 comprises a swipe input, and specifically a swipe input along the bottom edge of the display area of device 100. Examples of other user inputs that include a swipe input are described with reference to user input 5068 (FIG. 5BR), user input 5102 (FIG. 5BS1), user input 5110 (FIG. 5BS5), user input 5152 (FIG. 5CK), and other user inputs that include a swipe input. Changing which information is displayed in the status region in accordance with switching which application's user interface is displayed outside of the status region in response to a swipe gesture reduces the number of inputs needed to view different application user interfaces, without displaying additional controls, and causes the device to automatically reallocate available space in the status region.

In some embodiments, at least a portion of the transition that is displayed in response to detecting the occurrence of the first event is (1638) displayed in response to detecting an end of the first input (e.g., the transition is not displayed until the end of the first input has been detected). Detecting the end of the first input includes, for example, detecting liftoff of a touch input from a touch-sensitive surface or completion of an air gesture. In some embodiments, switching from displaying the user interface of the second application to displaying the user interface of the third application begins while the first input is detected (e.g., before detecting the end of the first input, such as before detecting liftoff of a contact or the end of a gesture), whereas the transition that includes reducing and increasing the size of the status region is not displayed until after the end of the first input is detected. For example, as described with reference to FIGS. 5BV-5BW, the device 100 initiates the transition of the session region 502-48 after detecting liftoff of the user input 5118-2. Forgoing changing which information is displayed in the status region until an end of the input for switching which application's user interface is displayed outside of the status region causes the device to automatically delay performance of the operation associated with the input until the user has committed to the input, thereby helping the user achieve an intended outcome and reducing user mistakes.

In some embodiments, in response to detecting the first input: the computer system ceases (1640) to display the user interface of the first application by moving the user interface of the first application across the display area in a first direction toward a first edge of the display area (e.g., sliding the user interface of the first application off of the display past a first edge in a direction of the first input); and the computer system displays the user interface of the second application by moving the user interface of the second application across the display area in the first direction from a second edge of the display area that is opposite the first edge (e.g., sliding the user interface of the second application onto the display from the opposite edge in the direction of the first input). Stated more generally, the computer system switches from displaying the user interface of the first application to displaying the user interface of the second application. In some embodiments, switching from displaying the user interface of the first application to displaying the user interface of the second application includes displaying progressively less of the user interface of the first application (e.g., starting from the second edge of the display and progressing toward the first edge) and displaying progressively more of the user interface of the second application (e.g., starting from the second edge of the display and progressing toward the first edge). For example, as described with reference to FIG. 5BQ, the user interface 5064 displays a portion of the maps application user interface gradually sliding off the right side of the display as a portion of the music application user interface gradually slides onto the left side of the display, optionally in a same direction as detected user input 5062. Switching the application user interface that is displayed outside of the status region via an animated transition in which the user interface of the first application appears to move out of the display area in a particular direction while the user interface of the second application appears to move into the display area in the same direction from the opposite side provides feedback about a state of the device.

In some embodiments, detecting the first input corresponding to the request to switch from displaying the user interface of the first application to displaying the user interface of the second application includes (1642) detecting a plurality of input portions (e.g., the first input is a compound input that is made up of a plurality of inputs). In some embodiments, the computer system detects a first input portion of the plurality of input portions (e.g., an upward swipe gesture from a bottom edge of the display area, a double press of a button, or other input); and, in response to detecting the first input portion, the computer system transitions from displaying the user interface of the first application to displaying a first system user interface (e.g., a recently open application selection user interface) that includes a plurality of representations of recently open (e.g., recently active, recently used, or recently displayed) applications (e.g., including a representation of the first application). For example, in response to detecting user input 5136-1 (FIG. 5CH), device 100 displays multitasking user interface 5138 (FIG. 5CI). In some embodiments, a respective representation of a respective recently open application includes a user interface of the respective application (e.g., the representation of the first application includes the user interface of the first application). In some embodiments, the size of the status region is reduced while transitioning from displaying the user interface of the first application to displaying the first system user interface (e.g., as described with reference to FIGS. 5CH-5CI). In some embodiments, the size of the status region is not reduced (e.g., is maintained) while transitioning from displaying the user interface of the first application to displaying the first system user interface (e.g., as described with reference to FIGS. 5CH-5CI).

In some embodiments, after detecting the first input portion of the plurality of input portions, the computer system detects a second input portion of the plurality of input portions (e.g., a tap gesture, air pinch, or other selection input) that is directed to a representation of the second application; and, in response to detecting the second input portion, wherein the second input portion follows the first input portion, the computer system transitions from displaying the first system user interface to displaying the user interface of the second application (e.g., the second input portion corresponds to selection of a representation of the second application displayed in the recently open application selection user interface). For example, as described with reference to FIGS. 5CJ-5CN, while displaying multitasking user interface 5138, the device 100 detects user input 5144, or user inputs 5142 and 5148, or user input 5150 or 5152, corresponding to a request to display the respective application user interface. In some embodiments, if the size of the status region was reduced while transitioning from displaying the user interface of the first application to displaying the first system user interface, the size of the status region is increased while transitioning from displaying the first system user interface to displaying the user interface of the second application. In some embodiments, if the size of the status region was not reduced (e.g., was maintained) while transitioning from displaying the user interface of the first application to displaying the first system user interface, the size of the status region is maintained while transitioning from displaying the first system user interface to displaying the user interface of the second application. For example, device 100 optionally forgoes displaying a minimized session region while transitioning from displaying messages application user interface 5134 to displaying multitasking user interface 5138 (FIGS. 5CH-5CI); and/or device 100 optionally forgoes displaying minimized session region 502-80 while transitioning from displaying multitasking user interface 5138 to displaying the user interface for the clock application 5156 (FIGS. 5CK and 5CN). As part of a process for switching from displaying a user interface of a respective application to a user interface of a different application, displaying an application switching system user interface, in which a plurality of representations of recently open applications are displayed and selectable to display the user interface for the corresponding application, reduces the number of inputs and amount of time needed to view which applications were recently open and to select a specific application, particularly an application whose position relative to the respective application in the sequence of recently open applications may be distant or unknown.

In some embodiments, after detecting the first input portion and before detecting the second input portion, the computer system detects (1644) a third input portion of the plurality of input portions (e.g., a swipe gesture, air drag, or other navigation input). In some embodiments, in response to detecting the third input portion, the computer system: navigates (e.g., by scrolling) through the plurality of representations of recently open applications (e.g., including ceasing to display one or more representations of one or more recently open applications and displaying one or more representations of one or more recently open applications that were not displayed prior to navigating through the plurality of representations of recently open applications); and while navigating through the plurality of representations of recently open applications, maintains the size of the status region (e.g., whether or not the size of the status region was reduced while transitioning from displaying the user interface of the first application to displaying the first system user interface). For example, FIGS. 5CI-5CJ illustrate detecting user inputs 5140 and 5142 corresponding to a request to navigate through the plurality of representations of applications, and in response to detecting user inputs 5140 and 5142, the session region is maintained, including first portion 502-74 and second portion 502-76. Maintaining the size of the status region while navigating through the plurality of representations of recently open applications that are displayed in an application switching system user interface causes the device to automatically visually deemphasize the status region (while optionally continuing to display the information visible in the status region) and reduce unintended interaction with the status region (e.g., that might occur if the status region were to be increased in size) while the user is in the process of selecting a specific application from the plurality of recently open applications.

In some embodiments, while displaying the first system user interface that includes the plurality of representations of recently open applications, the computer system detects (1646) an input corresponding to a request to display a second system user interface (e.g., a home user interface, a wake screen user interface, or a control panel user interface) that is different from the first user interface. In some embodiments, in response to detecting the input corresponding to the request to display the second system user interface, the computer system: displays the second system user interface; and maintains an appearance of the status region (e.g., continuing to display the status region with the same size and/or with the same information in the status region while transitioning to displaying the second system user interface and while displaying the second system user interface). For example, as described with reference to FIGS. 5CK and 5CR, in response to detecting user input 5150 or user input 5152 while displaying multitasking user interface 5138, device 100 displays home user interface 501 while maintaining the session region to include first portion 502-90 and second portion 502-92 (FIG. 5CR) (analogous to first portion 502-74 and second portion 502-76 in FIG. 5CK), where displaying an animated transition (e.g., as described with reference to FIGS. 5CP-5CQ) that minimizes the session region before redisplaying the first portion 502-90 and second portion 502-92 of the session region is optional. Maintaining the appearance of the status region when switching between different system user interfaces, such as from a system user interface that includes a plurality of representations of recently open applications to another system user interface, causes the device to automatically visually deemphasize the status region (while optionally continuing to display the information visible in the status region) and reduce unintended interaction with the status region (e.g., that might occur if the status region were to be increased in size) while the user is in the process of performing a system navigation operation.

In some embodiments, the first information further includes (1648) status information about the second software; the status information about the first software is displayed in a first portion of the status region, and the status information about the second software is displayed in a second portion of the status region that is different from the first portion; detecting the occurrence of the first event includes detecting, via one or more input devices of the computer system, an input directed to the second portion of the status region (e.g., a tap input or other selection input); and displaying the second information in the status region in response to detecting the occurrence of the first event includes redisplaying the status information about the first software in the status region without displaying the status information about the second software in the status region. In some embodiments, in response to detecting the occurrence of the first event (e.g., in response to detecting the input directed to the second portion of the status region), a user interface of the second software is displayed in a user interface region outside of the status region. In some embodiments, displaying the second information in the status region in response to detecting the occurrence of the first event includes displaying additional status information about the first software (e.g., due to some space in the status region no longer being taken up by the second software). In some embodiments, displaying the second information in the status region in response to detecting the occurrence of the first event includes displaying status information about software that is different from the first software and from the second software (e.g., due to some space in the status region no longer being taken up by the second software). More generally, detecting the occurrence of the first event includes detecting an input directed to one of multiple portions of the status region, in response to which the status region shrinks and then expands to redisplay the status information of the other, unselected portion(s) of the status region (optionally as a user interface of the selected portion is displayed outside of the status region). For example, as described with reference to FIG. 5BZ, in response to detecting user input 5126 of a second type (e.g., a tap input or other type of input) directed to the first portion 502-56 of the session region corresponding to a timer session, the device 100 displays the application user interface for the clock application 5128 associated with the timer session, as illustrated in FIG. 5CD. Where multiple sets of status information for different software is displayed in different portions of the status region, in response to an input directed to the portion of the status region that displays status information for particular software, reducing a size of the status region while ceasing to display the multiple sets of status information and then increasing a size of the status region while displaying status information for other software, optionally as a user interface of the particular software is displayed outside of the status region, causes the device to automatically reallocate available space in the status region and provide additional feedback about the particular software that is of interest to the user.

In some embodiments, the first information further includes (1650) status information about the second software; the status information about the first software is displayed in a first portion of the status region, and the status information about the second software is displayed in a second portion of the status region that is different from the first portion; detecting the occurrence of the first event includes detecting, via one or more input devices of the computer system, an input directed to the second portion of the status region (e.g., a long press input, or other input corresponding to a request to expand the status region); and displaying the second information in the status region in response to detecting the occurrence of the first event includes displaying additional status information about the second software (e.g., more than is included in the first information, optionally including one or more controls for performing operations of the second software, and optionally without displaying the status information about the first software). More generally, detecting the occurrence of the first event includes detecting an input directed to one of multiple portions of the status region, in response to which the status region shrinks and then expands to display a contextual menu for the selected portion (optionally without displaying the status information of the other, unselected portion(s)). For example, as described with reference to FIG. 5BZ, in response to detecting user input 5126 of a first type (e.g., a long press input or other type of input) directed to the first portion 502-56 of the session region corresponding to a timer session, the device 100 displays expanded session region 502-62, which optionally includes additional information and/or controls for the timer session, as illustrated in FIG. 5CC. Where multiple sets of status information for different software is displayed in different portions of the status region, in response to an input directed to the portion of the status region that displays status information for particular software, reducing a size of the status region while ceasing to display the multiple sets of status information and then increasing a size of the status region while displaying expanded status information for the particular software causes the device to automatically reallocate available space in the status region and provide additional feedback about the particular software that is of interest to the user.

In some embodiments, the second software is (1652) a software application executing on the computer system, and the first event is an event associated with a change in status of the software application (e.g., in accordance with a determination that a next step in navigation instructions will occur within a predefined threshold (e.g., within 1 mile and/or within 2 minutes), in accordance with playback of a next media content item (e.g., one song ending and another song beginning), in accordance with a determination that a timer or alarm has reached an interval or end time, or other application-related (e.g., application-generated) alert). More generally, the first event occurs independently of user input (e.g., the first event is an automatically initiated event by the computer system). For example, as described with reference to FIGS. 5CV-5CY, in response to detecting the occurrence of an application event, such as the end of playback of a first media item and the start of playback of a second media item, the session region is updated from displaying first portion 502-100 and second portion 502-102 to display information about the application event in expanded session region 502-110. In response to detecting a status change event in a software application executing on the computer system, switching to displaying, in the status region, information about the software application provides feedback about a state of the device.

In some embodiments, detecting the occurrence of the first event includes (1654) detecting that the computer system is brought into proximity with (e.g., within a predefined range or distance of) a wireless terminal. In some embodiments, detecting that the computer system is in proximity with a wireless terminal is based on detection of a short-range wireless signal emitted by the wireless terminal (e.g., Bluetooth, near-field communication (NFC), radio-frequency identification (RFID), or other short range communication protocol). In some embodiments, the computer system transmits a secure credential (e.g., a payment method, identification card, or wireless entry key) to the wireless terminal for use by the wireless terminal to authenticate the user of the computer system, and, optionally, the status region is updated to provide feedback about the status or progress of the authentication. For example, as described with reference to FIGS. 5CR-5CU, in response to detecting wireless terminal 5154, device 100 updates the session region, including first portion 502-90 and second portion 502-92, to display stored card information in session region 502-98*b*. Changing the information that is displayed in the status region in response to detecting that the computer system is brought into proximity with (e.g., communicating with) a wireless terminal provides feedback about a state of the device.

In some embodiments, the first event corresponds (1656) to a system operation of the computer system (e.g., performance of biometric, passcode, password, or other form of authentication, detection of an error or alert state such as a low battery or loss of wireless connection, or other system event). For example, as described with reference to FIGS. 5CV-5CY, in some embodiments, in response to detecting a system-level event, such as performing authentication and/or detecting an error and/or alert status of device 100, the device 100 displays an animated transition of the session region to display information for the system-level event. Changing the information that is displayed in the status region in response to detecting a system operation of the computer system provides feedback about a state of the device.

It should be understood that the particular order in which the operations in FIGS. 16A-16F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 1100, 1200, 1300, 1400, and 1500) are also applicable in an analogous manner to method 1600 described above with respect to FIGS. 16A-16F. For example, the session regions and user inputs described above with reference to method 1600 optionally have one or more of the characteristics of the session regions and user inputs described herein with reference to other methods described herein (e.g., methods 9000, 1000, 1100, 1200, 1300, 1400, and 1500). For brevity, these details are not repeated here.

The operations described above with reference to FIGS. 9A-9G, 10A-10D, 11A-11D, 12A-12E, 13A-13E, 14A-14C, 15A-15E, and 16A-16F are, optionally, implemented by components depicted in FIGS. 1A-1B. For example, detection operation 9058, performing a first action 9068, and detecting operation 1004 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system that is in communication with a display generation component having a display area, wherein the display area includes a status region:
displaying, in the status region, first information that includes status information about first software, wherein the status region is associated with an active session of the first software;
while displaying, in the status region, the first information, detecting occurrence of a first event corresponding to a transition to displaying second information that is different from the first information; and
in response to detecting the occurrence of the first event, displaying a transition that includes:
ceasing to display the first information in the status region;
displaying the second information in the status region, wherein the second information includes status information about second software that is different from the first software, and the status region is associated with an active session of the second software; and
while transitioning from displaying the first information in the status region to displaying the second information in the status region, reducing a size of the status region and, after reducing the size of the status region, increasing the size of the status region.

2. The method of claim 1, wherein the display area includes a user interface region that is adjacent to the status region, and the status region is visually distinguished from the user interface region.

3. The method of claim 2, wherein visually distinguishing the status region from the user interface region includes displaying the status region with a border, wherein the border contracts as the status region is reduced in size and expands as the status region is increased in size.

4. The method of claim 2, wherein visually distinguishing the status region from the user interface region includes displaying a background of the user interface region with a first range of values for a respective visual property, and displaying a background of the status region with a second value, different from the first range of values, for the respective visual property, wherein reducing the size of the status region reduces a size of the background of the status region, and increasing the size of the status region increases the size of the background of the status region.

5. The method of claim 1, wherein the second information is displayed in the status region as the size of the status region is increased.

6. The method of claim 1, including:
ceasing to display the first information gradually over a first period of time; and
displaying the second information gradually over a second period of time;
wherein the first period of time partially overlaps with the second period of time.

7. The method of claim 1, including, after displaying the second information in the status region:
ceasing to display the second information in the status region;
displaying third information in the status region, wherein the third information is different from the second information; and
while transitioning from displaying the second information in the status region to displaying the third information in the status region, reducing a size of the status region and, after reducing the size of the status region, increasing the size of the status region.

8. The method of claim 7, wherein displaying the third information includes redisplaying the first information.

9. The method of claim 7, wherein the third information is displayed in response to detecting occurrence of a second event corresponding to a transition to displaying the third information, and the third information includes status information about third software that is different from the first software and from the second software.

10. The method of claim 1, including:
while displaying, in the status region, first respective information, detecting occurrence of a third event corresponding to a transition to displaying fourth information;
after detecting the occurrence of the third event, detecting occurrence of a fourth event corresponding to a transition to displaying fifth information that is different from the fourth information;
in response to detecting the occurrence of the third event, displaying a transition that includes:
ceasing to display the first respective information in the status region;
in accordance with a determination that the occurrence of the fourth event is detected after a predefined threshold amount of time since detecting the occurrence of the third event, prior to displaying a transition responsive to detecting the occurrence of the fourth event:
displaying the fourth information in the status region; and
while transitioning from displaying the first respective information in the status region to displaying the fourth information in the status region, reducing the size of the status region and, after reducing the size of the status region, increasing the size of the status region; and
in accordance with a determination that the occurrence of the fourth event is detected within the predefined threshold amount of time since detecting the occurrence of the third event:
reducing the size of the status region while ceasing to display the first respective information in the status region, without increasing the size of the status region in response to detecting the occurrence of the third event.

11. The method of claim 1, wherein the computer system includes one or more input devices, and detecting the occurrence of the first event includes detecting, via the one or more input devices, a first input corresponding to a request to switch from displaying, in display area outside of the status region, a user interface of a first application to displaying a user interface of a second application that is different from the first application.

12. The method of claim 11, including:
while second respective information is displayed in the status region, detecting a second input corresponding to a request to switch from displaying, in display area outside of the status region, the user interface of the second application to displaying a user interface of a third application that is different from the second application; and
in response to detecting the second input:
switching from displaying the user interface of the second application to displaying the user interface of the third application; and
displaying a transition that includes:
reducing a size of the status region; and
after reducing the size of the status region, increasing the size of the status region.

13. The method of claim 11, wherein the transition that is displayed in response to detecting the occurrence of the first event is displayed in accordance with a determination that the first input includes a swipe gesture.

14. The method of claim 11, wherein at least a portion of the transition that is displayed in response to detecting the occurrence of the first event is displayed in response to detecting an end of the first input.

15. The method of claim 11, including, in response to detecting the first input:
ceasing to display the user interface of the first application by moving the user interface of the first application across the display area in a first direction toward a first edge of the display area; and
displaying the user interface of the second application by moving the user interface of the second application across the display area in the first direction from a second edge of the display area that is opposite the first edge.

16. The method of claim 11, wherein detecting the first input corresponding to the request to switch from displaying the user interface of the first application to displaying the user interface of the second application includes detecting a plurality of input portions, and the method includes:
detecting a first input portion of the plurality of input portions; and
in response to detecting the first input portion, transitioning from displaying the user interface of the first application to displaying a first system user interface that includes a plurality of representations of recently open applications;
after detecting the first input portion of the plurality of input portions, detecting a second input portion of the plurality of input portions that is directed to a representation of the second application; and
in response to detecting the second input portion, wherein the second input portion follows the first input portion, transitioning from displaying the first system user interface to displaying the user interface of the second application.

17. The method of claim 16, including:
after detecting the first input portion and before detecting the second input portion, detecting a third input portion of the plurality of input portions; and
in response to detecting the third input portion:
  navigating through the plurality of representations of recently open applications; and
  while navigating through the plurality of representations of recently open applications, maintaining the size of the status region.

18. The method of claim 16, including:
while displaying the first system user interface that includes the plurality of representations of recently open applications, detecting an input corresponding to a request to display a second system user interface that is different from the first system user interface; and
in response to detecting the input corresponding to the request to display the second system user interface:
  displaying the second system user interface; and
  maintaining an appearance of the status region.

19. The method of claim 1, wherein:
the first information further includes status information about the second software;
the status information about the first software is displayed in a first portion of the status region, and the status information about the second software is displayed in a second portion of the status region that is different from the first portion;
detecting the occurrence of the first event includes detecting, via one or more input devices of the computer system, an input directed to the second portion of the status region; and
displaying the second information in the status region in response to detecting the occurrence of the first event includes redisplaying the status information about the first software in the status region without displaying the status information about the second software in the status region.

20. The method of claim 1, wherein:
the first information further includes status information about the second software;
the status information about the first software is displayed in a first portion of the status region, and the status information about the second software is displayed in a second portion of the status region that is different from the first portion;
detecting the occurrence of the first event includes detecting, via one or more input devices of the computer system, an input directed to the second portion of the status region; and
displaying the second information in the status region in response to detecting the occurrence of the first event includes displaying additional status information about the second software.

21. The method of claim 1, wherein the second software is a software application executing on the computer system, and the first event is an event associated with a change in status of the software application.

22. The method of claim 1, wherein detecting the occurrence of the first event includes detecting that the computer system is brought into proximity with a wireless terminal.

23. The method of claim 1, wherein the first event corresponds to a system operation of the computer system.

24. A computer system, comprising:
a display generation component having a display area that includes a status region;
one or more processors; and
memory storing one or more programs, wherein the one or more programs are configured to be executed by the one or more processors, the one or more programs including instructions for:
  displaying, in the status region, first information that includes status information about first software, wherein the status region is associated with an active session of the first software;
  while displaying, in the status region, the first information, detecting occurrence of a first event corresponding to a transition to displaying second information that is different from the first information; and
  in response to detecting the occurrence of the first event, displaying a transition that includes:
    ceasing to display the first information in the status region;
    displaying the second information in the status region, wherein the second information includes status information about second software that is different from the first software, and the status region is associated with an active session of the second software; and
    while transitioning from displaying the first information in the status region to displaying the second information in the status region, reducing a size of the status region and, after reducing the size of the status region, increasing the size of the status region.

25. The computer system of claim 24, wherein the display area includes a user interface region that is adjacent to the status region, and the status region is visually distinguished from the user interface region.

26. The computer system of claim 25, wherein visually distinguishing the status region from the user interface region includes displaying the status region with a border, wherein the border contracts as the status region is reduced in size and expands as the status region is increased in size.

27. The computer system of claim 25, wherein visually distinguishing the status region from the user interface region includes displaying a background of the user interface region with a first range of values for a respective visual property, and displaying a background of the status region with a second value, different from the first range of values, for the respective visual property, wherein reducing the size of the status region reduces a size of the background of the status region, and increasing the size of the status region increases the size of the background of the status region.

28. The computer system of claim 24, wherein the second information is displayed in the status region as the size of the status region is increased.

29. The computer system of claim 24, wherein the one or more programs further include instructions for:
  ceasing to display the first information gradually over a first period of time; and
  displaying the second information gradually over a second period of time;
  wherein the first period of time partially overlaps with the second period of time.

30. The computer system of claim 24, wherein the one or more programs further include instructions for, after displaying the second information in the status region:
  ceasing to display the second information in the status region;
  displaying third information in the status region, wherein the third information is different from the second information; and while transitioning from displaying the second information in the status region to displaying the third information in the status region, reducing a size of the status region and, after reducing the size of the status region, increasing the size of the status region.

31. The computer system of claim 30, wherein displaying the third information includes redisplaying the first information.

32. The computer system of claim 30, wherein the third information is displayed in response to detecting occurrence of a second event corresponding to a transition to displaying the third information, and the third information includes status information about third software that is different from the first software and from the second software.

33. The computer system of claim 24, wherein the one or more programs further include instructions for:
  while displaying, in the status region, first respective information, detecting occurrence of a third event corresponding to a transition to displaying fourth information;
  after detecting the occurrence of the third event, detecting occurrence of a fourth event corresponding to a transition to displaying fifth information that is different from the fourth information;
  in response to detecting the occurrence of the third event, displaying a transition that includes:
    ceasing to display the first respective information in the status region;
    in accordance with a determination that the occurrence of the fourth event is detected after a predefined threshold amount of time since detecting the occurrence of the third event, prior to displaying a transition responsive to detecting the occurrence of the fourth event:
      displaying the fourth information in the status region; and
      while transitioning from displaying the first respective information in the status region to displaying the fourth information in the status region, reducing the size of the status region and, after reducing the size of the status region, increasing the size of the status region; and
    in accordance with a determination that the occurrence of the fourth event is detected within the predefined threshold amount of time since detecting the occurrence of the third event:
      reducing the size of the status region while ceasing to display the first respective information in the status region, without increasing the size of the status region in response to detecting the occurrence of the third event.

34. The computer system of claim 24, wherein the computer system includes one or more input devices, and detecting the occurrence of the first event includes detecting, via the one or more input devices, a first input corresponding to a request to switch from displaying, in display area outside of the status region, a user interface of a first application to displaying a user interface of a second application that is different from the first application.

35. The computer system of claim 34, wherein the one or more programs further include instructions for:
  while second respective information is displayed in the status region, detecting a second input corresponding to a request to switch from displaying, in display area outside of the status region, the user interface of the second application to displaying a user interface of a third application that is different from the second application; and
  in response to detecting the second input:
    switching from displaying the user interface of the second application to displaying the user interface of the third application; and
    displaying a transition that includes:
      reducing a size of the status region; and
      after reducing the size of the status region, increasing the size of the status region.

36. The computer system of claim 34, wherein the transition that is displayed in response to detecting the occurrence of the first event is displayed in accordance with a determination that the first input includes a swipe gesture.

37. The computer system of claim 34, wherein at least a portion of the transition that is displayed in response to detecting the occurrence of the first event is displayed in response to detecting an end of the first input.

38. The computer system of claim 34, wherein the one or more programs further include instructions for, in response to detecting the first input:
  ceasing to display the user interface of the first application by moving the user interface of the first application across the display area in a first direction toward a first edge of the display area; and
  displaying the user interface of the second application by moving the user interface of the second application across the display area in the first direction from a second edge of the display area that is opposite the first edge.

39. The computer system of claim 34, wherein detecting the first input corresponding to the request to switch from displaying the user interface of the first application to displaying the user interface of the second application includes detecting a plurality of input portions, and the one or more programs further include instructions for:
  detecting a first input portion of the plurality of input portions; and
  in response to detecting the first input portion, transitioning from displaying the user interface of the first application to displaying a first system user interface that includes a plurality of representations of recently open applications;
  after detecting the first input portion of the plurality of input portions, detecting a second input portion of the plurality of input portions that is directed to a representation of the second application; and
  in response to detecting the second input portion, wherein the second input portion follows the first input portion, transitioning from displaying the first system user interface to displaying the user interface of the second application.

40. The computer system of claim 39, wherein the one or more programs further include instructions for:
  after detecting the first input portion and before detecting the second input portion, detecting a third input portion of the plurality of input portions; and
  in response to detecting the third input portion:
    navigating through the plurality of representations of recently open applications; and
    while navigating through the plurality of representations of recently open applications, maintaining the size of the status region.

41. The computer system of claim 39, wherein the one or more programs further include instructions for:

while displaying the first system user interface that includes the plurality of representations of recently open applications, detecting an input corresponding to a request to display a second system user interface that is different from the first system user interface; and in response to detecting the input corresponding to the request to display the second system user interface: displaying the second system user interface; and maintaining an appearance of the status region.

42. The computer system of claim 24, wherein:

the first information further includes status information about the second software;

the status information about the first software is displayed in a first portion of the status region, and the status information about the second software is displayed in a second portion of the status region that is different from the first portion;

detecting the occurrence of the first event includes detecting, via one or more input devices of the computer system, an input directed to the second portion of the status region; and displaying the second information in the status region in response to detecting the occurrence of the first event includes redisplaying the status information about the first software in the status region without displaying the status information about the second software in the status region.

43. The computer system of claim 24, wherein:

the first information further includes status information about the second software;

the status information about the first software is displayed in a first portion of the status region, and the status information about the second software is displayed in a second portion of the status region that is different from the first portion;

detecting the occurrence of the first event includes detecting, via one or more input devices of the computer system, an input directed to the second portion of the status region; and displaying the second information in the status region in response to detecting the occurrence of the first event includes displaying additional status information about the second software.

44. The computer system of claim 24, wherein the second software is a software application executing on the computer system, and the first event is an event associated with a change in status of the software application.

45. The computer system of claim 24, wherein detecting the occurrence of the first event includes detecting that the computer system is brought into proximity with a wireless terminal.

46. The computer system of claim 24, wherein the first event corresponds to a system operation of the computer system.

47. A non-transitory computer readable storage medium storing one or more programs, the one or more programs comprising instructions that, when executed by a computer system that is in communication with a display generation component having a display area that includes a status region, cause the computer system to:

display, in the status region, first information that includes status information about first software, wherein the status region is associated with an active session of the first software;

while displaying, in the status region, the first information, detect occurrence of a first event corresponding to a transition to displaying second information that is different from the first information; and in response to detecting the occurrence of the first event, display a transition that includes:

ceasing to display the first information in the status region;

displaying the second information in the status region, wherein the second information includes status information about second software that is different from the first software, and the status region is associated with an active session of the second software; and while transitioning from displaying the first information in the status region to displaying the second information in the status region, reducing a size of the status region and, after reducing the size of the status region, increasing the size of the status region.

48. The non-transitory computer readable storage medium of claim 47, wherein the display area includes a user interface region that is adjacent to the status region, and the status region is visually distinguished from the user interface region.

49. The non-transitory computer readable storage medium of claim 48, wherein visually distinguishing the status region from the user interface region includes displaying the status region with a border, wherein the border contracts as the status region is reduced in size and expands as the status region is increased in size.

50. The non-transitory computer readable storage medium of claim 48, wherein visually distinguishing the status region from the user interface region includes displaying a background of the user interface region with a first range of values for a respective visual property, and displaying a background of the status region with a second value, different from the first range of values, for the respective visual property, wherein reducing the size of the status region reduces a size of the background of the status region, and increasing the size of the status region increases the size of the background of the status region.

51. The non-transitory computer readable storage medium of claim 47, wherein the second information is displayed in the status region as the size of the status region is increased.

52. The non-transitory computer readable storage medium of claim 47, wherein the one or more programs further include instructions that, when executed by the computer system, cause the computer system to:

cease to display the first information gradually over a first period of time; and display the second information gradually over a second period of time;

wherein the first period of time partially overlaps with the second period of time.

53. The non-transitory computer readable storage medium of claim 47, wherein the one or more programs further include instructions that, when executed by the computer system, cause the computer system to, after displaying the second information in the status region:

cease to display the second information in the status region;

display third information in the status region, wherein the third information is different from the second information; and while transitioning from displaying the second information in the status region to displaying the third information in the status region, reduce a size of the status region and, after reducing the size of the status region, increase the size of the status region.

54. The non-transitory computer readable storage medium of claim 53, wherein displaying the third information includes redisplaying the first information.

55. The non-transitory computer readable storage medium of claim 53, wherein the third information is displayed in response to detecting occurrence of a second event corresponding to a transition to displaying the third information, and the third information includes status information about third software that is different from the first software and from the second software.

56. The non-transitory computer readable storage medium of claim 47, wherein the one or more programs further include instructions that, when executed by the computer system, cause the computer system to:
while displaying, in the status region, first respective information, detect occurrence of a third event corresponding to a transition to displaying fourth information;
after detecting the occurrence of the third event, detect occurrence of a fourth event corresponding to a transition to displaying fifth information that is different from the fourth information;
in response to detecting the occurrence of the third event, display a transition that includes:
ceasing to display the first respective information in the status region;
in accordance with a determination that the occurrence of the fourth event is detected after a predefined threshold amount of time since detecting the occurrence of the third event, prior to displaying a transition responsive to detecting the occurrence of the fourth event:
displaying the fourth information in the status region; and
while transitioning from displaying the first respective information in the status region to displaying the fourth information in the status region, reducing the size of the status region and, after reducing the size of the status region, increasing the size of the status region; and
in accordance with a determination that the occurrence of the fourth event is detected within the predefined threshold amount of time since detecting the occurrence of the third event:
reducing the size of the status region while ceasing to display the first respective information in the status region, without increasing the size of the status region in response to detecting the occurrence of the third event.

57. The non-transitory computer readable storage medium of claim 47, wherein the computer system includes one or more input devices, and detecting the occurrence of the first event includes detecting, via the one or more input devices, a first input corresponding to a request to switch from displaying, in display area outside of the status region, a user interface of a first application to displaying a user interface of a second application that is different from the first application.

58. The non-transitory computer readable storage medium of claim 57, wherein the one or more programs further include instructions that, when executed by the computer system, cause the computer system to:
while second respective information is displayed in the status region, detect a second input corresponding to a request to switch from displaying, in display area outside of the status region, the user interface of the second application to displaying a user interface of a third application that is different from the second application; and
in response to detecting the second input:
switch from displaying the user interface of the second application to displaying the user interface of the third application; and
display a transition that includes:
reducing a size of the status region; and
after reducing the size of the status region, increasing the size of the status region.

59. The non-transitory computer readable storage medium of claim 57, wherein the transition that is displayed in response to detecting the occurrence of the first event is displayed in accordance with a determination that the first input includes a swipe gesture.

60. The non-transitory computer readable storage medium of claim 57, wherein at least a portion of the transition that is displayed in response to detecting the occurrence of the first event is displayed in response to detecting an end of the first input.

61. The non-transitory computer readable storage medium of claim 57, wherein the one or more programs further include instructions that, when executed by the computer system, cause the computer system to, in response to detecting the first input:
cease to display the user interface of the first application by moving the user interface of the first application across the display area in a first direction toward a first edge of the display area; and
display the user interface of the second application by moving the user interface of the second application across the display area in the first direction from a second edge of the display area that is opposite the first edge.

62. The non-transitory computer readable storage medium of claim 57, wherein detecting the first input corresponding to the request to switch from displaying the user interface of the first application to displaying the user interface of the second application includes detecting a plurality of input portions, and the one or more programs further include instructions that, when executed by the computer system, cause the computer system to:
detect a first input portion of the plurality of input portions; and
in response to detecting the first input portion, transition from displaying the user interface of the first application to displaying a first system user interface that includes a plurality of representations of recently open applications;
after detecting the first input portion of the plurality of input portions, detect a second input portion of the plurality of input portions that is directed to a representation of the second application; and
in response to detecting the second input portion, wherein the second input portion follows the first input portion, transition from displaying the first system user interface to displaying the user interface of the second application.

63. The non-transitory computer readable storage medium of claim 62, wherein the one or more programs further include instructions that, when executed by the computer system, cause the computer system to:
after detecting the first input portion and before detecting the second input portion, detect a third input portion of the plurality of input portions; and in response to detecting the third input portion:
  navigate through the plurality of representations of recently open applications; and
  while navigating through the plurality of representations of recently open applications, maintain the size of the status region.

64. The non-transitory computer readable storage medium of claim 62, wherein the one or more programs further include instructions that, when executed by the computer system, cause the computer system to:
  while displaying the first system user interface that includes the plurality of representations of recently open applications, detect an input corresponding to a request to display a second system user interface that is different from the first system user interface; and
  in response to detecting the input corresponding to the request to display the second system user interface:
  display the second system user interface; and
  maintain an appearance of the status region.

65. The non-transitory computer readable storage medium of claim 47, wherein:
  the first information further includes status information about the second software;
  the status information about the first software is displayed in a first portion of the status region, and the status information about the second software is displayed in a second portion of the status region that is different from the first portion;
  detecting the occurrence of the first event includes detecting, via one or more input devices of the computer system, an input directed to the second portion of the status region; and
  displaying the second information in the status region in response to detecting the occurrence of the first event includes redisplaying the status information about the first software in the status region without displaying the status information about the second software in the status region.

66. The non-transitory computer readable storage medium of claim 47, wherein:
  the first information further includes status information about the second software;
  the status information about the first software is displayed in a first portion of the status region, and the status information about the second software is displayed in a second portion of the status region that is different from the first portion;
  detecting the occurrence of the first event includes detecting, via one or more input devices of the computer system, an input directed to the second portion of the status region; and
  displaying the second information in the status region in response to detecting the occurrence of the first event includes displaying additional status information about the second software.

67. The non-transitory computer readable storage medium of claim 47, wherein the second software is a software application executing on the computer system, and the first event is an event associated with a change in status of the software application.

68. The non-transitory computer readable storage medium of claim 47, wherein detecting the occurrence of the first event includes detecting that the computer system is brought into proximity with a wireless terminal.

69. The non-transitory computer readable storage medium of claim 47, wherein the first event corresponds to a system operation of the computer system.

* * * * *